United States Patent [19]

Knight et al.

[11] Patent Number: 4,477,847

[45] Date of Patent: Oct. 16, 1984

[54] TELEVISION SIGNAL DISC DRIVE RECORDER

[76] Inventors: Howard W. Knight, 600 Matsonia Dr., Foster City, Calif. 94404; Edwin W. Engberg, 80 Dartmouth, San Carlos, Calif. 94070

[21] Appl. No.: 48,357

[22] Filed: Jun. 14, 1979

Related U.S. Application Data

[63] Continuation of Ser. No. 763,795, Jan. 28, 1977.

[51] Int. Cl.³ ........................ G11B 15/04; H04N 5/78

[52] U.S. Cl. ........................ 360/60; 360/33.1

[58] Field of Search ........................ 360/60, 40, 39

[56] References Cited

U.S. PATENT DOCUMENTS 3,340,539 9/1967 Sims, Jr. ........................ 360/60
3,588,375 6/1971 Martin .
3,824,563 7/1974 Lutz .

*Primary Examiner*—Vincent P. Canney
*Attorney, Agent, or Firm*—Fitch, Even, Tabin, Flannery & Welsh

[57] ABSTRACT

Apparatus is disclosed for selectively prohibiting certain recording operations in a recording and reproducing machine that has generally random accessibility to a plurality of separate portions of information, such as still images recorded on separate tracks of disc packs of a generally standard computer disc drive. The apparatus specifies a group of the tracks as bulk tracks and a second group as working tracks, with the greater proportion of the total number of tracks comprising the bulk tracks which may be a relatively permanent library of the information recorded thereon. The apparatus generally prohibits erasing or overrecording of bulk tracks, unless an enabling signal is generated, which can be produced from an operator controlled keyswitch.

18 Claims, 183 Drawing Figures

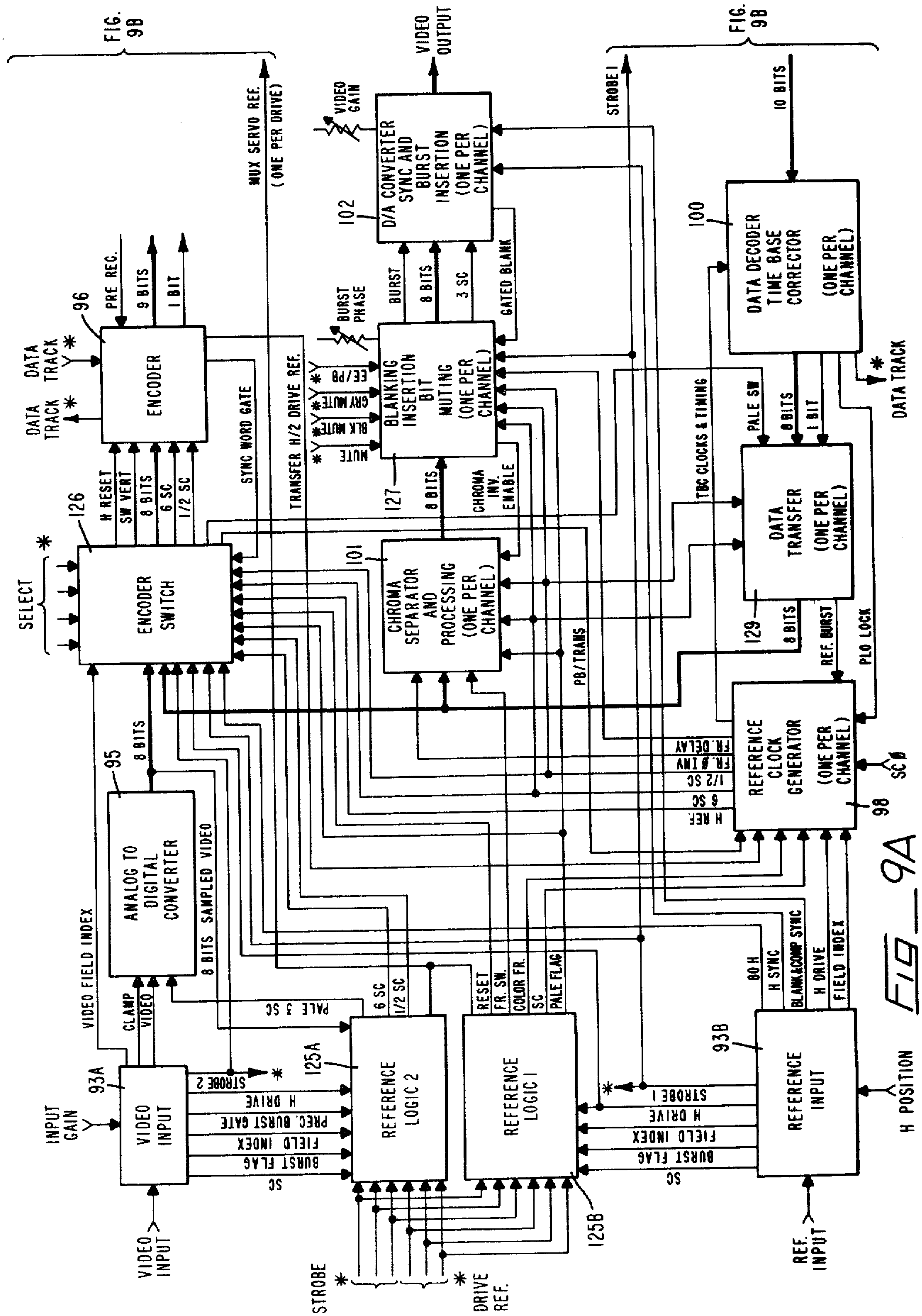
FIG_9A

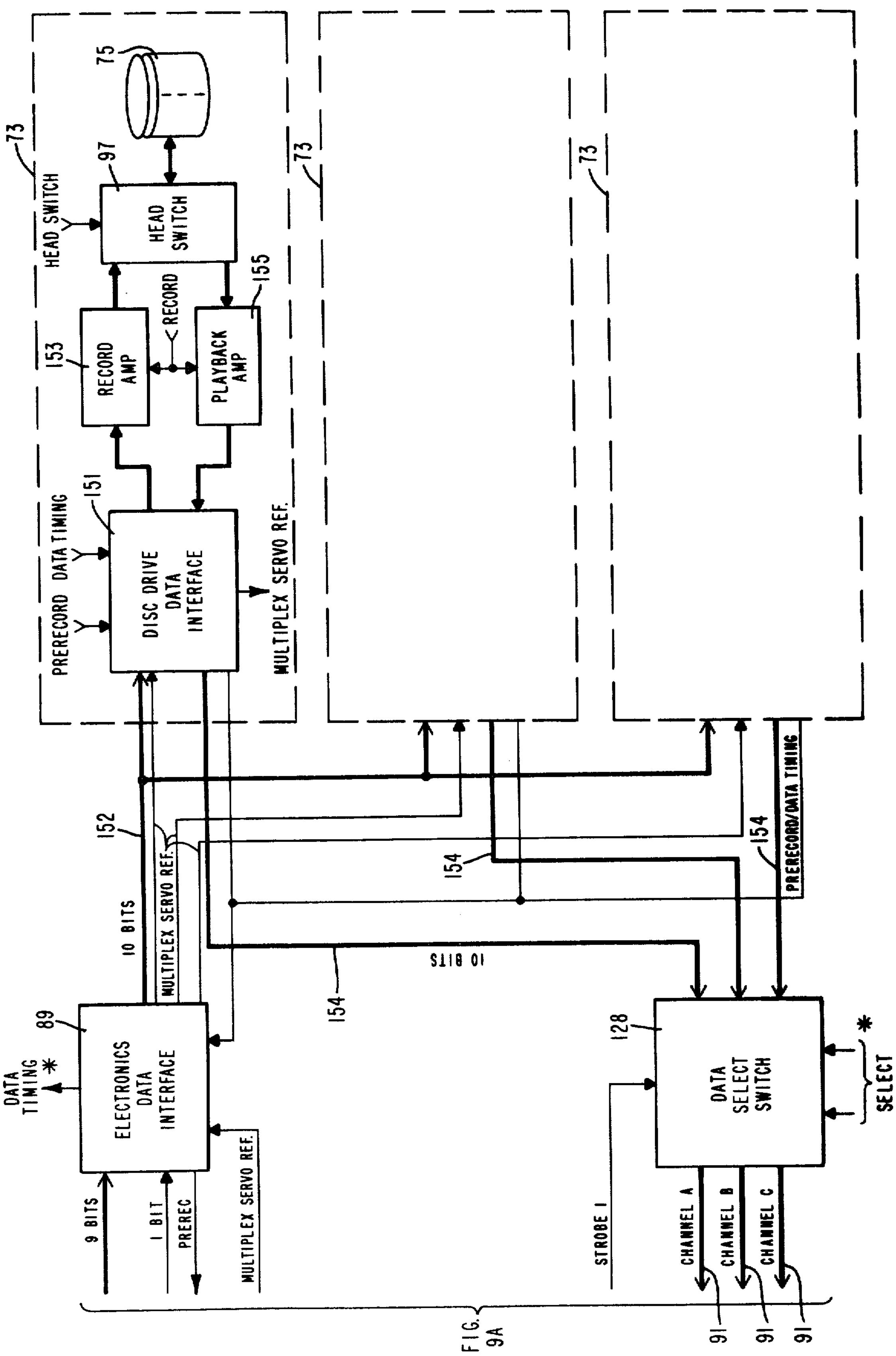
FIG_9B

FIG. 12C
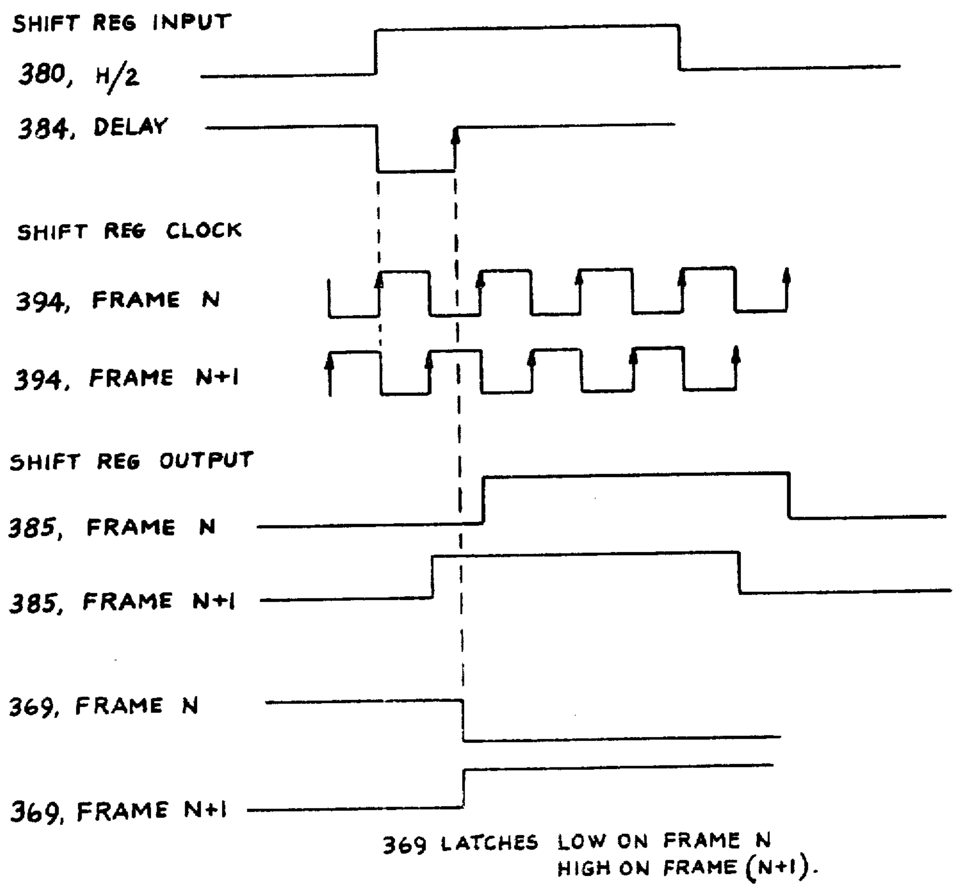
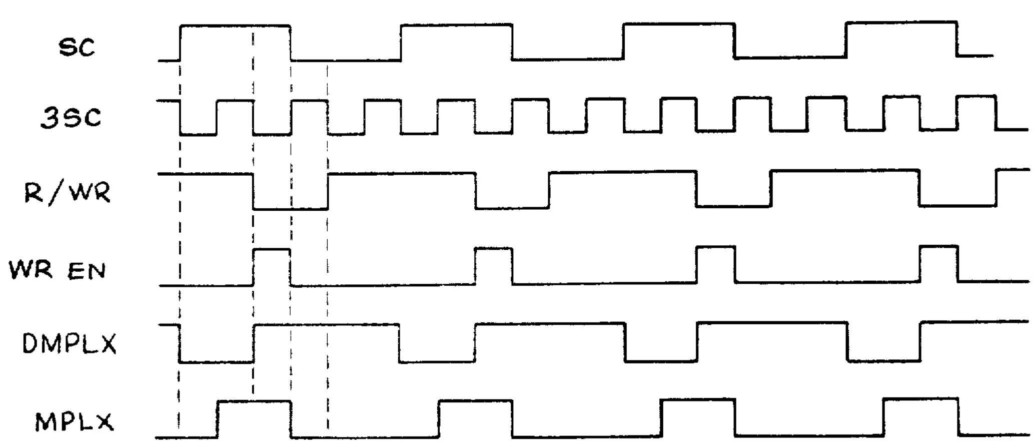
FIG. 12B

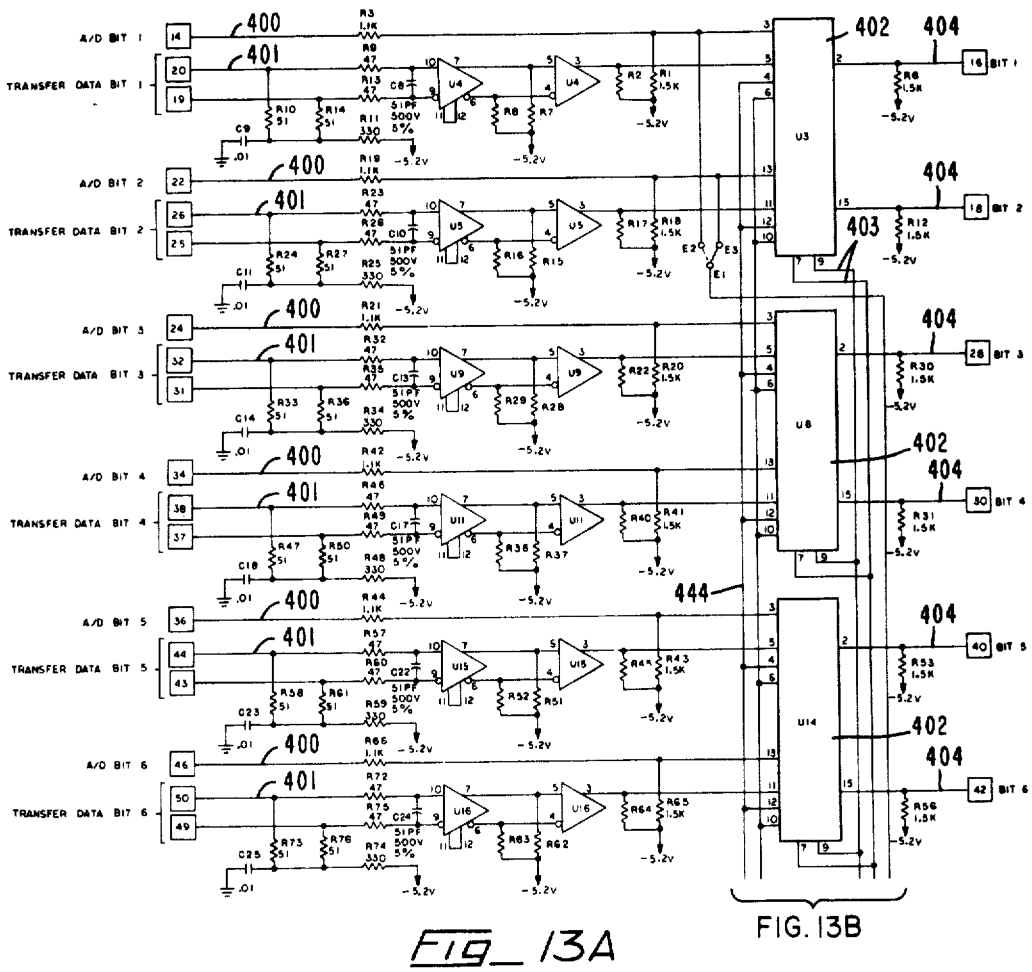
FIG_ 13A

| REFERENCE SELECT | STATE |
|---|---|
| REF LOGIC #1 (REF INPUT) | H |
| REF LOGIC #2 (VIDEO INPUT) | L |

| DATA SELECT MODE | 2¹ | 2⁰ |
|---|---|---|
| TEST | H | H |
| DELETE | H | L |
| TRANSFER | L | H |
| VIDEO INPUT | L | L |

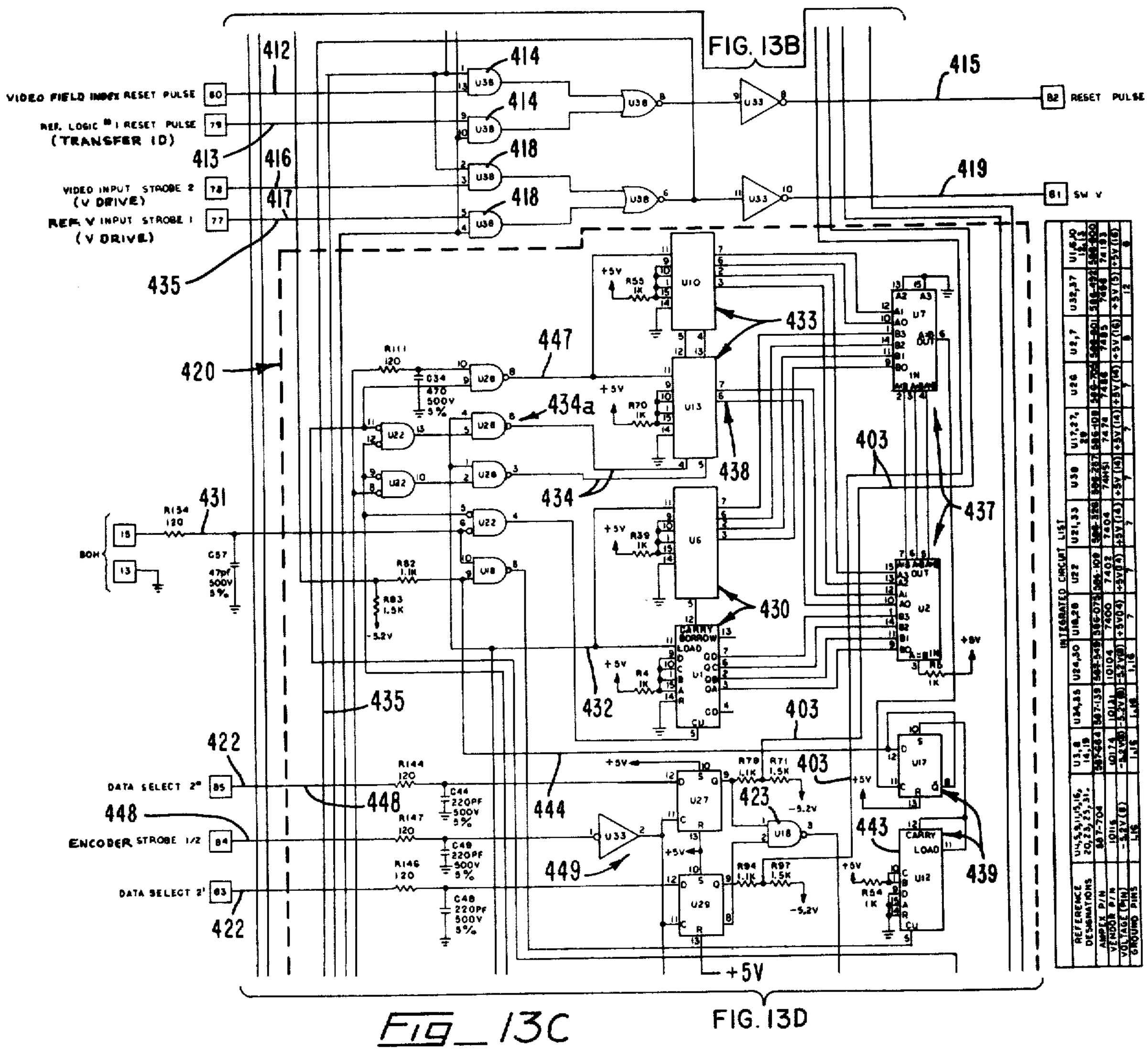
Fig_13C

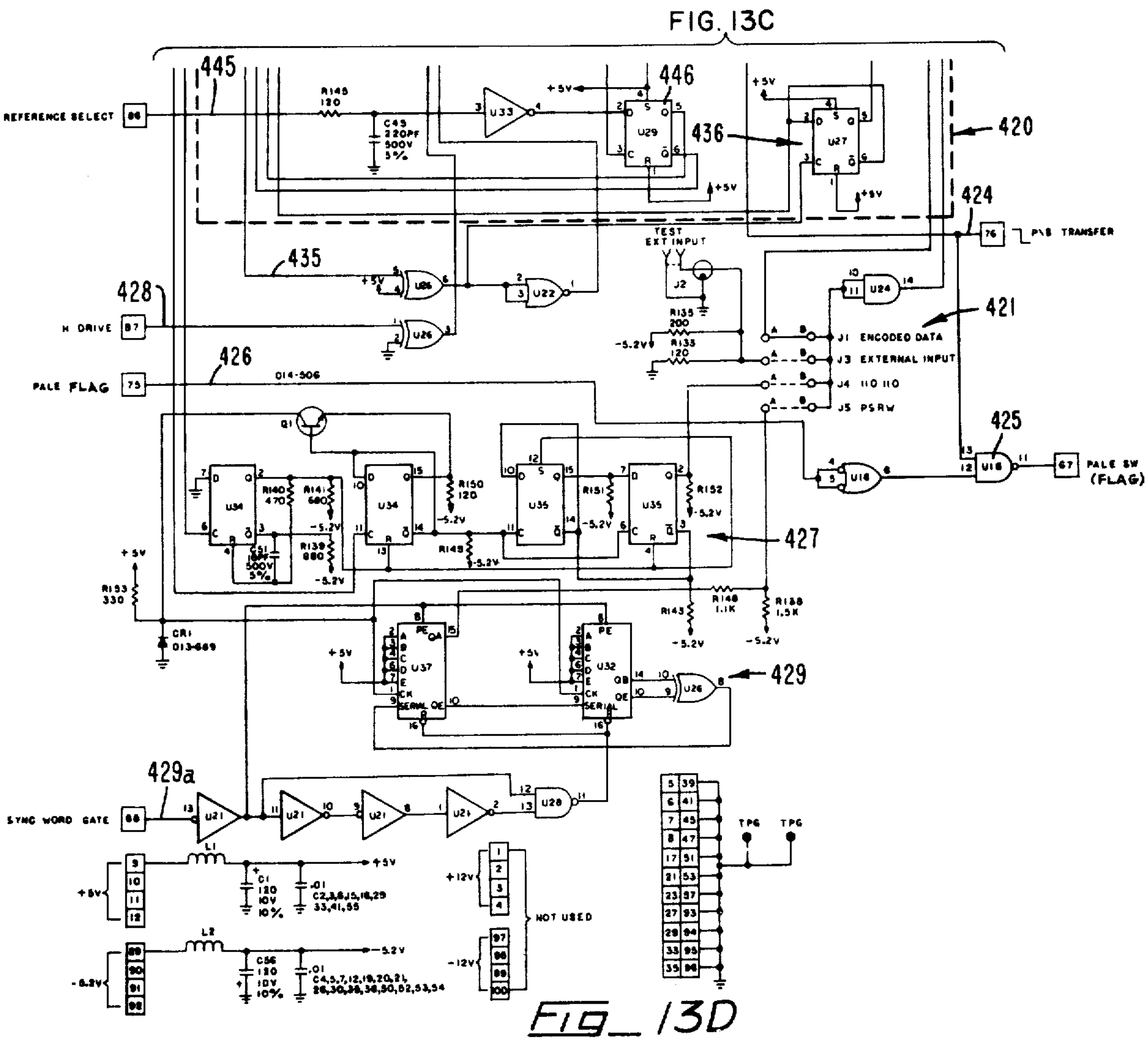
FIG_ 13D

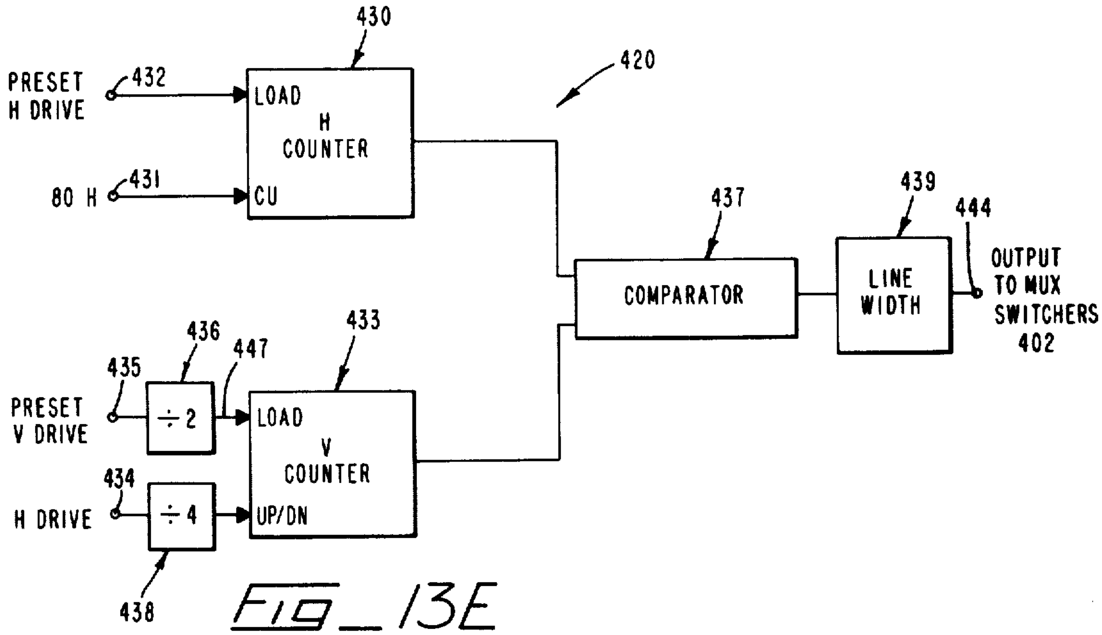
FIG_13E
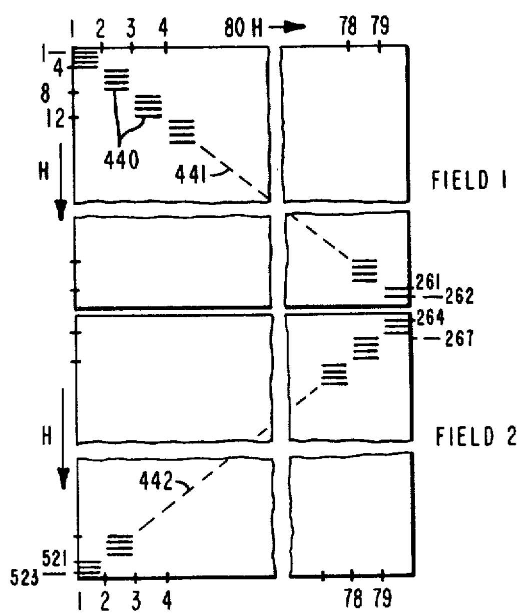
FIG_13F

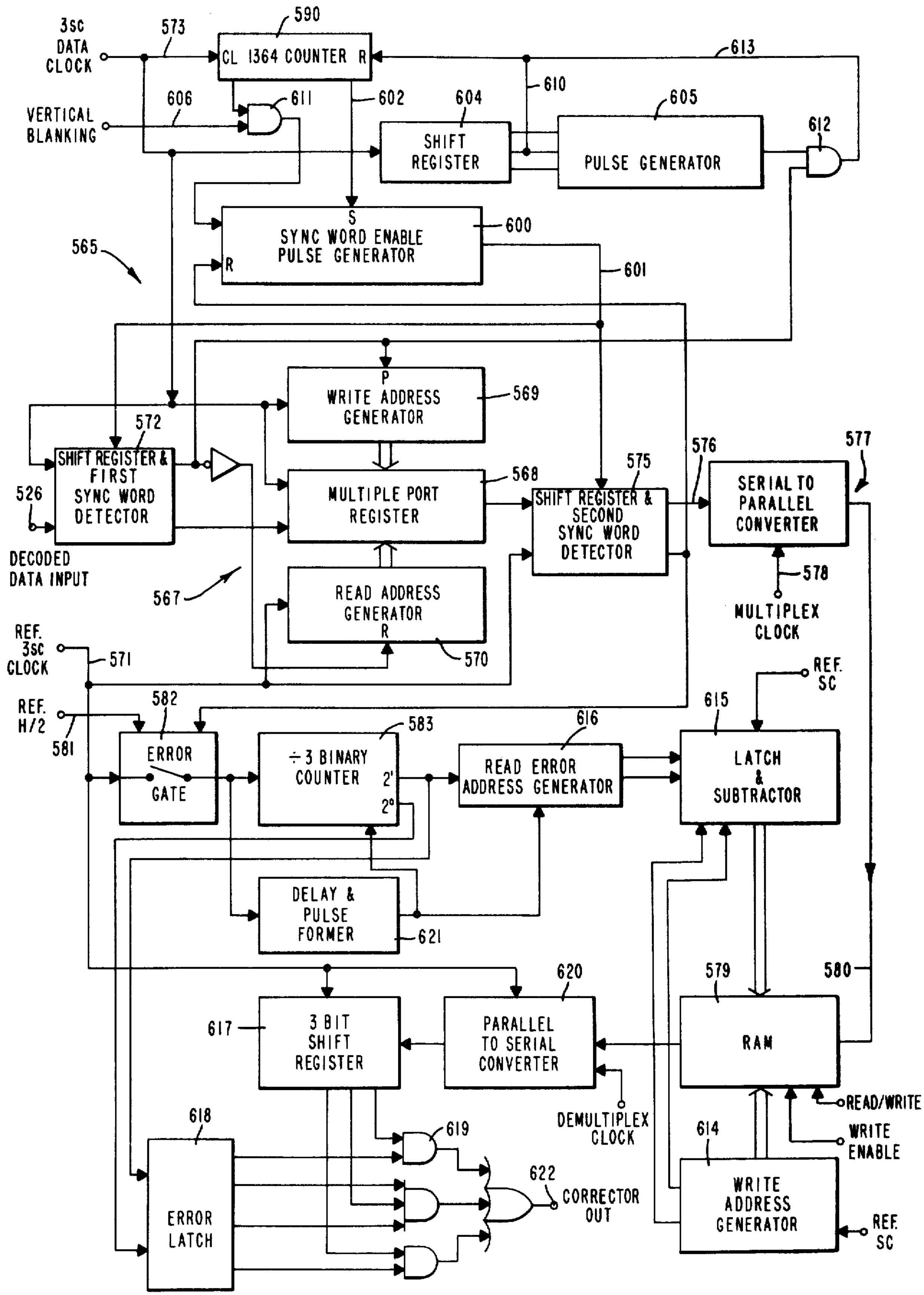
FIG_15A

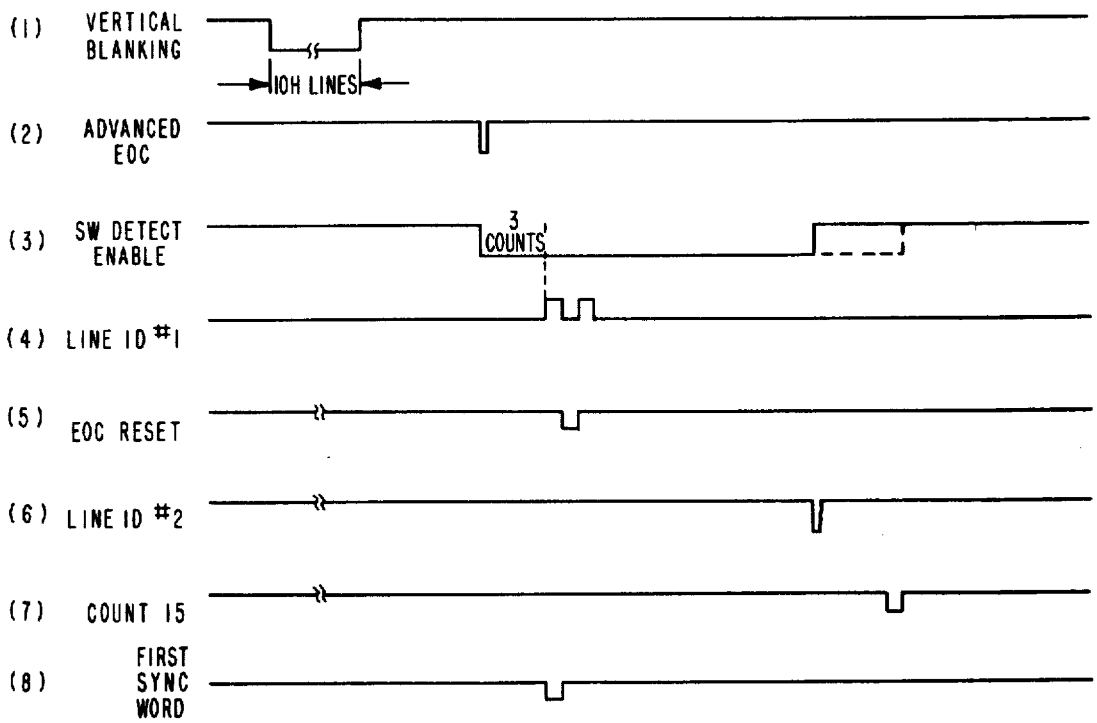
FIG_15B
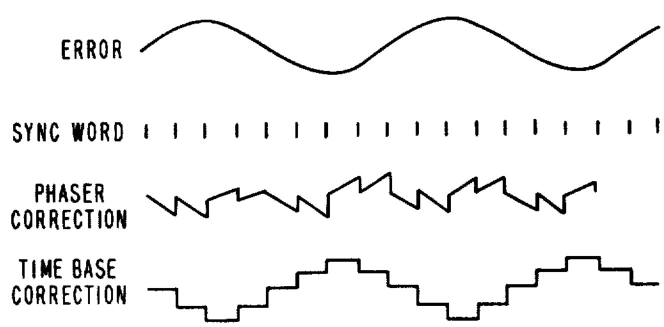
FIG_15C

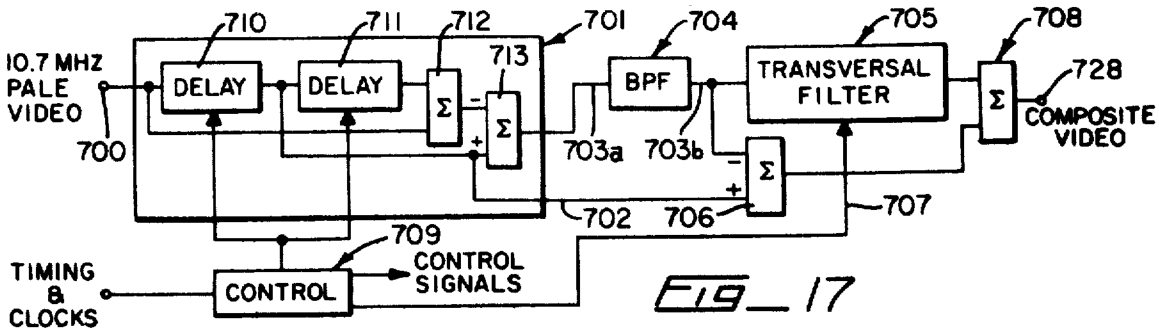
FIG_17
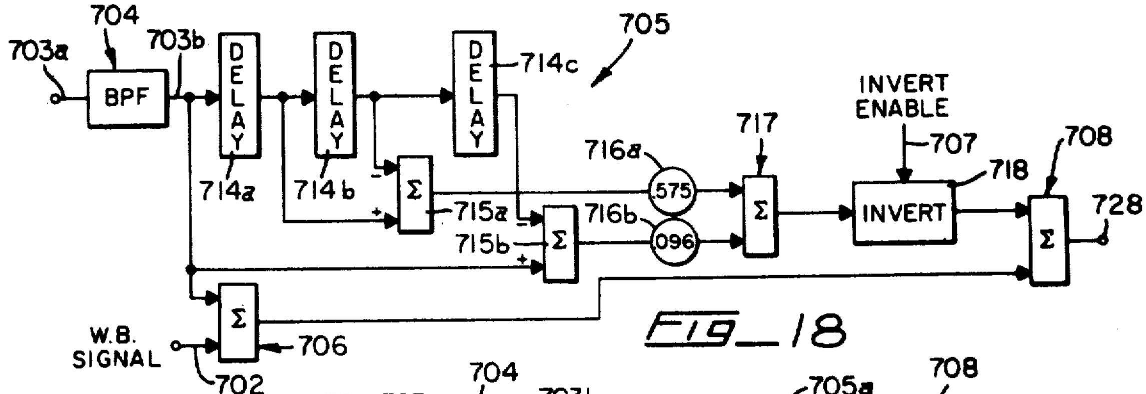
FIG_18
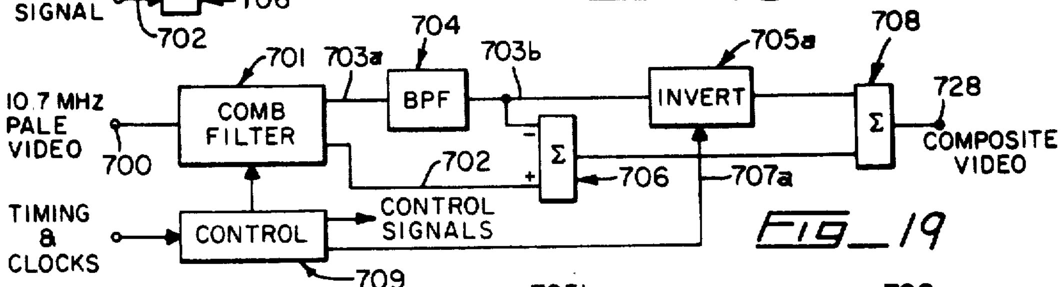
FIG_19
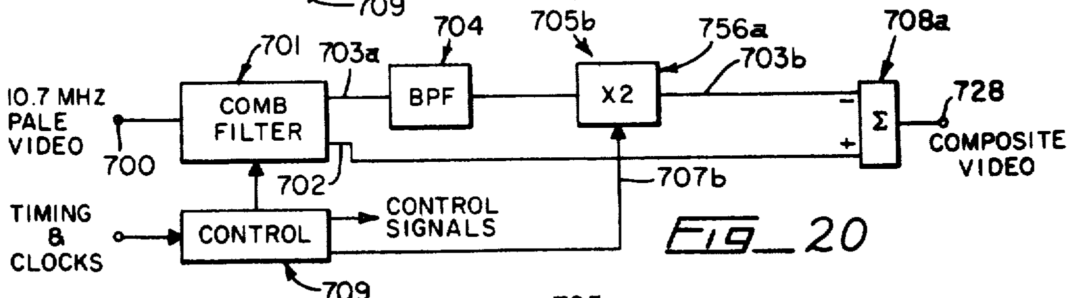
FIG_20
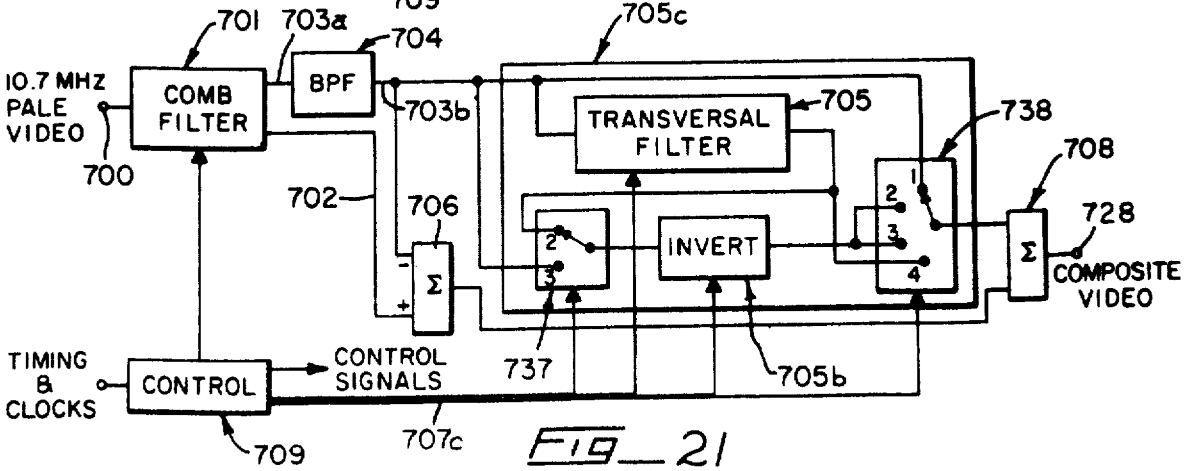
FIG_21

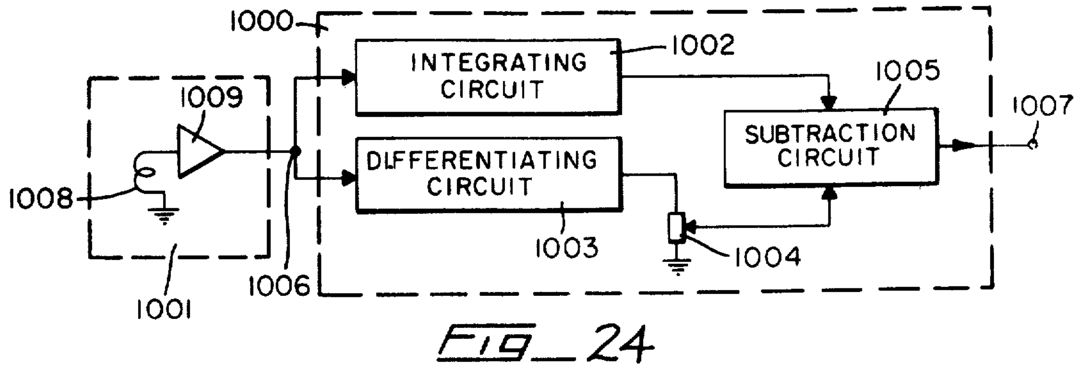
FIG_24
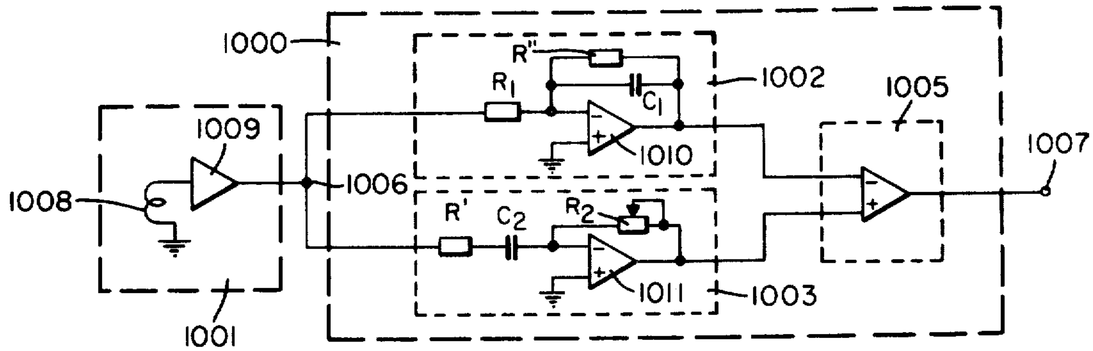
FIG_25
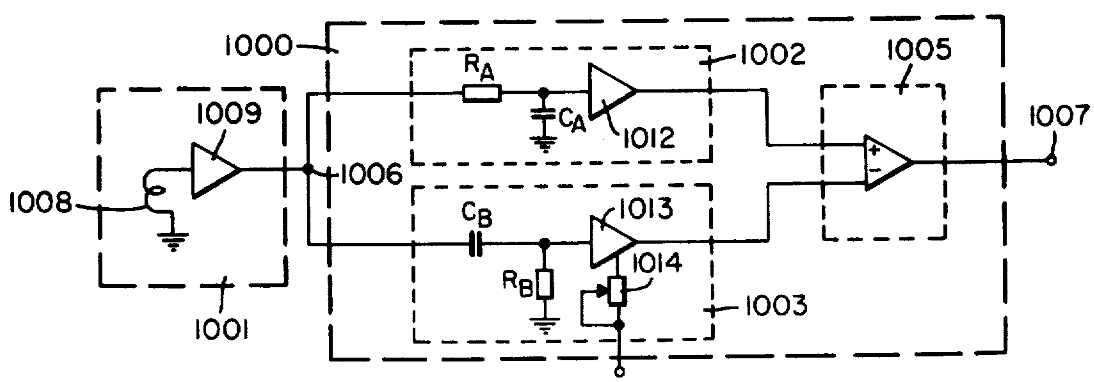
FIG_26
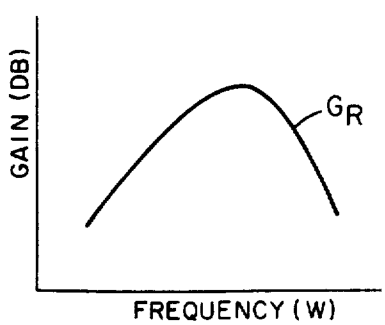
FIG_27
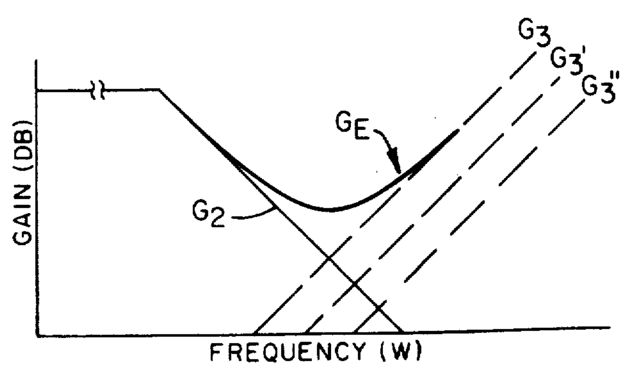
FIG_28

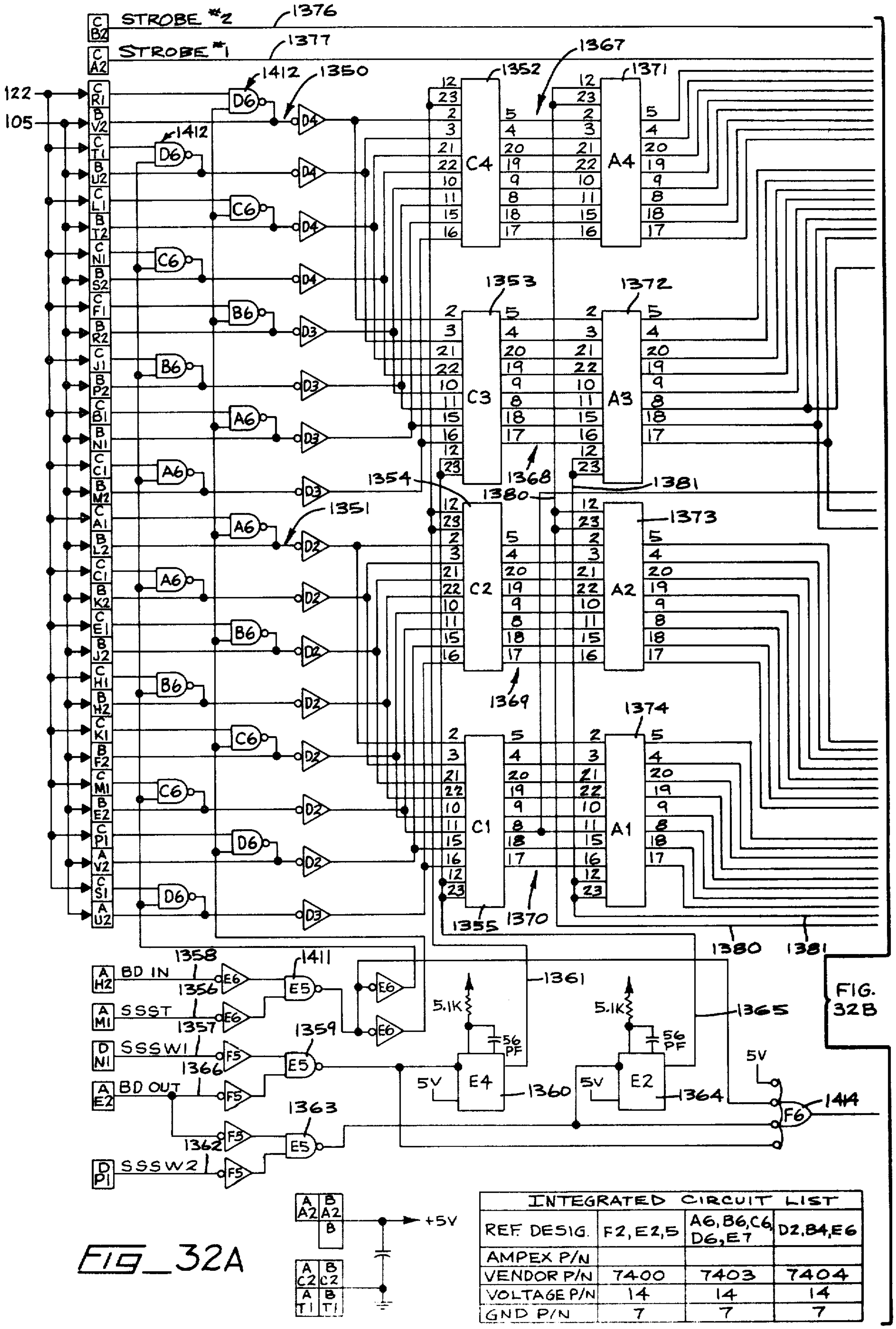
FIG_32A
| INTEGRATED CIRCUIT LIST | | | |
|---|---|---|---|
| REF. DESIG. | F2, E2, 5 | A6, B6, C6, D6, E7 | D2, B4, E6 |
| AMPEX P/N | | | |
| VENDOR P/N | 7400 | 7403 | 7404 |
| VOLTAGE P/N | 14 | 14 | 14 |
| GND P/N | 7 | 7 | 7 |

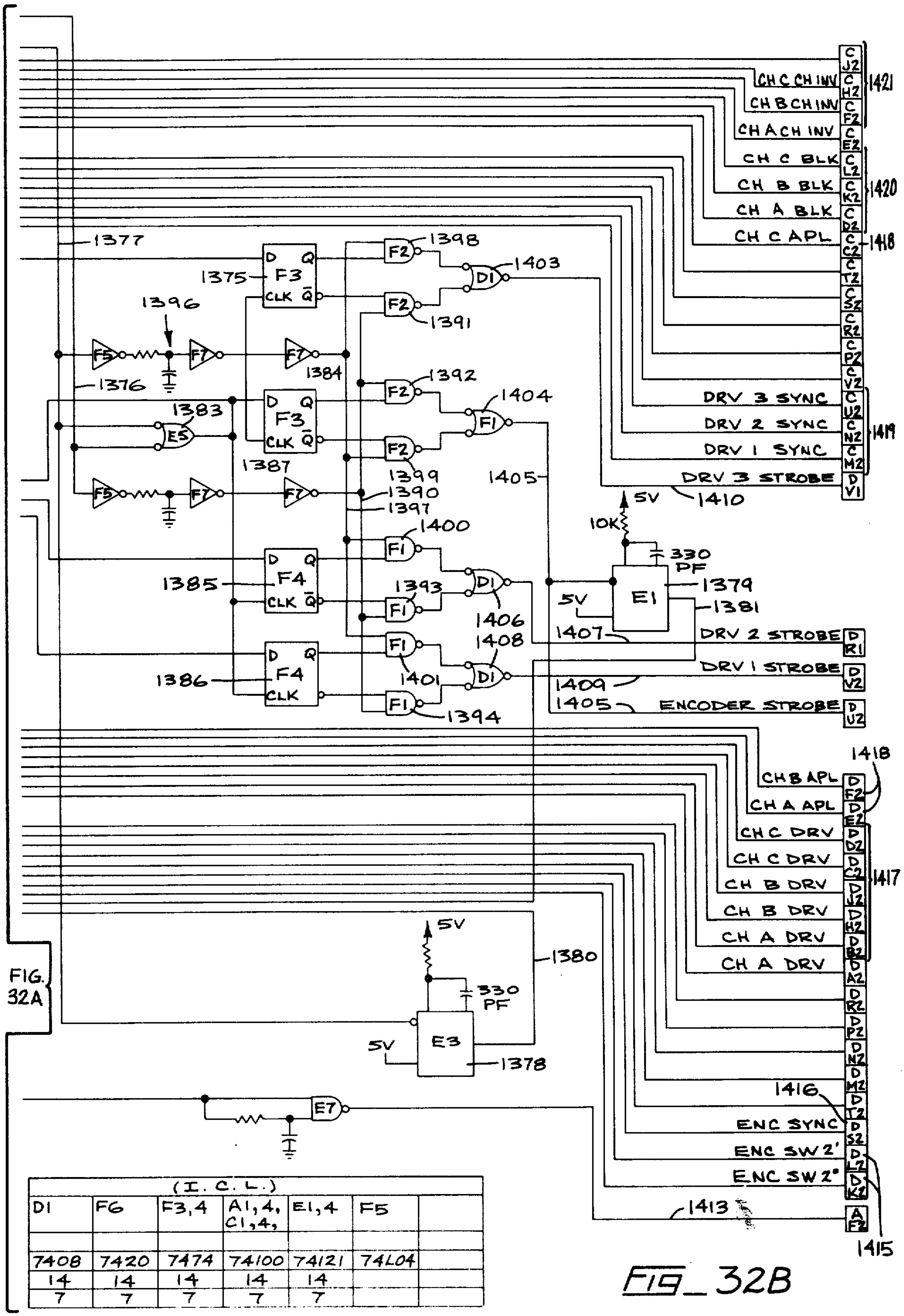
| (I. C. L.) | | | | | | |
|---|---|---|---|---|---|---|
| D1 | F6 | F3,4 | A1,4, C1,4, | E1,4 | F5 | |
| | | | | | | |
| 7408 | 7420 | 7474 | 74100 | 74121 | 74L04 | |
| 14 | 14 | 14 | 14 | 14 | | |
| 7 | 7 | 7 | 7 | 7 | | |
FIG_32B

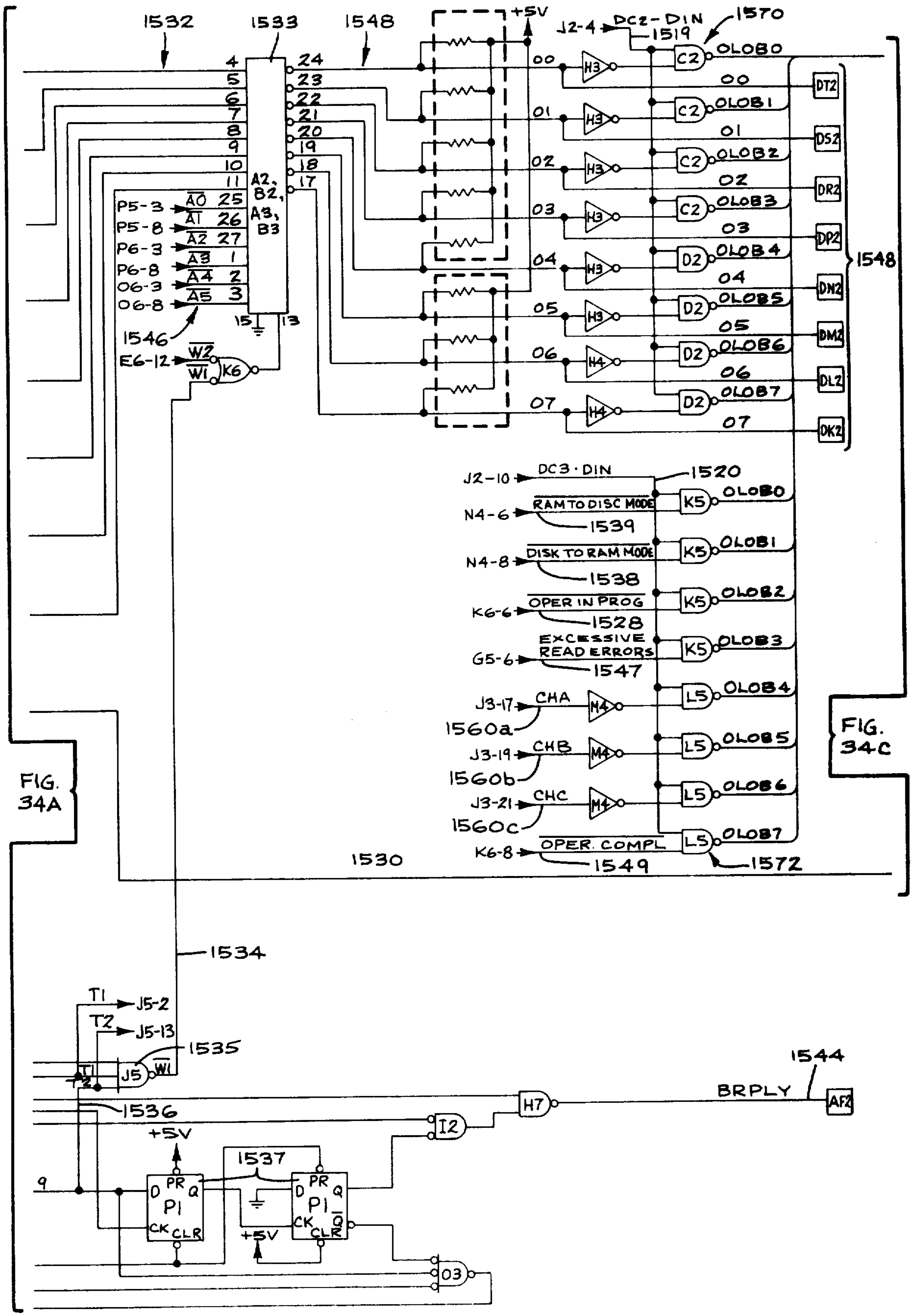
FIG_34B

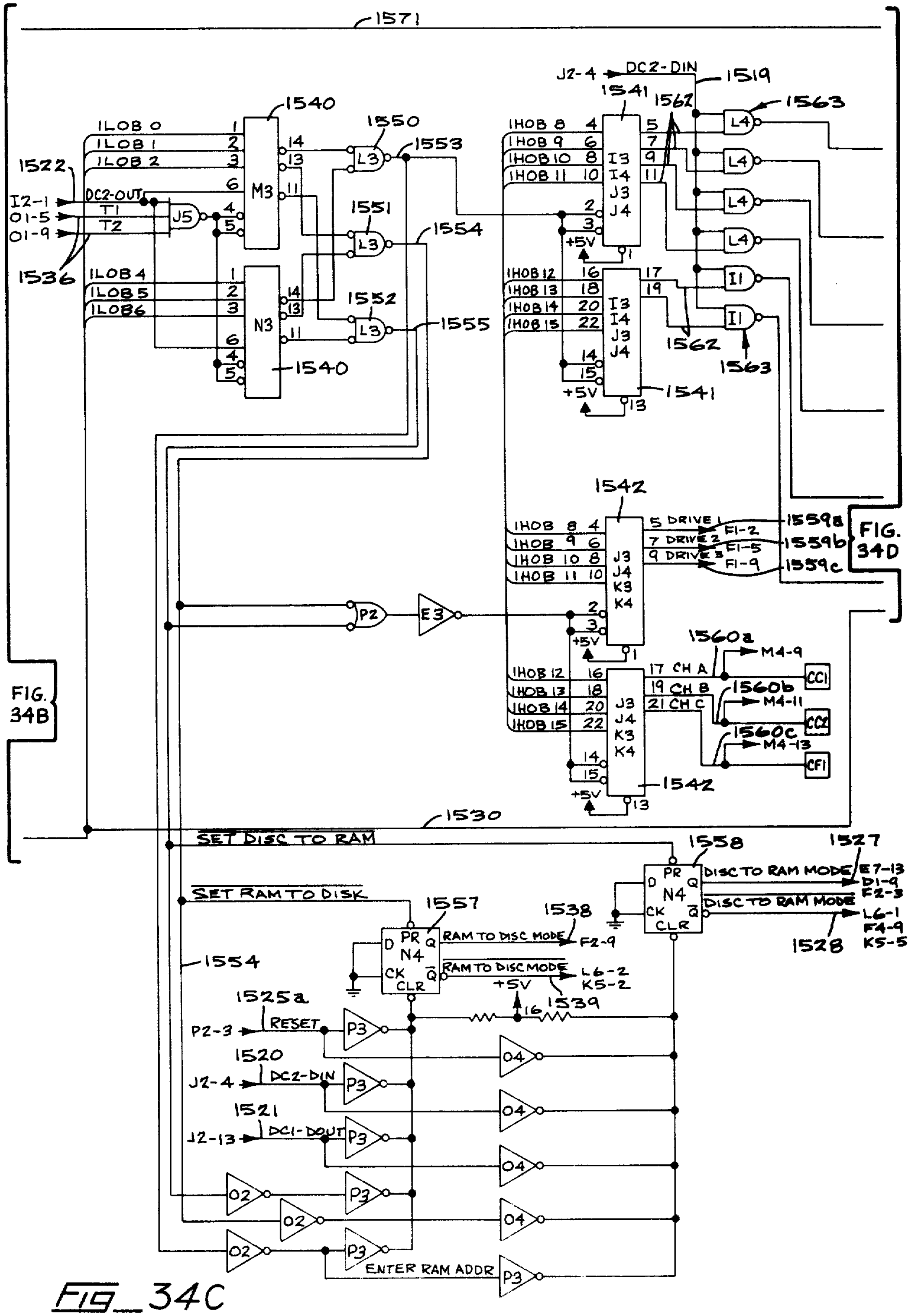
FIG_34C

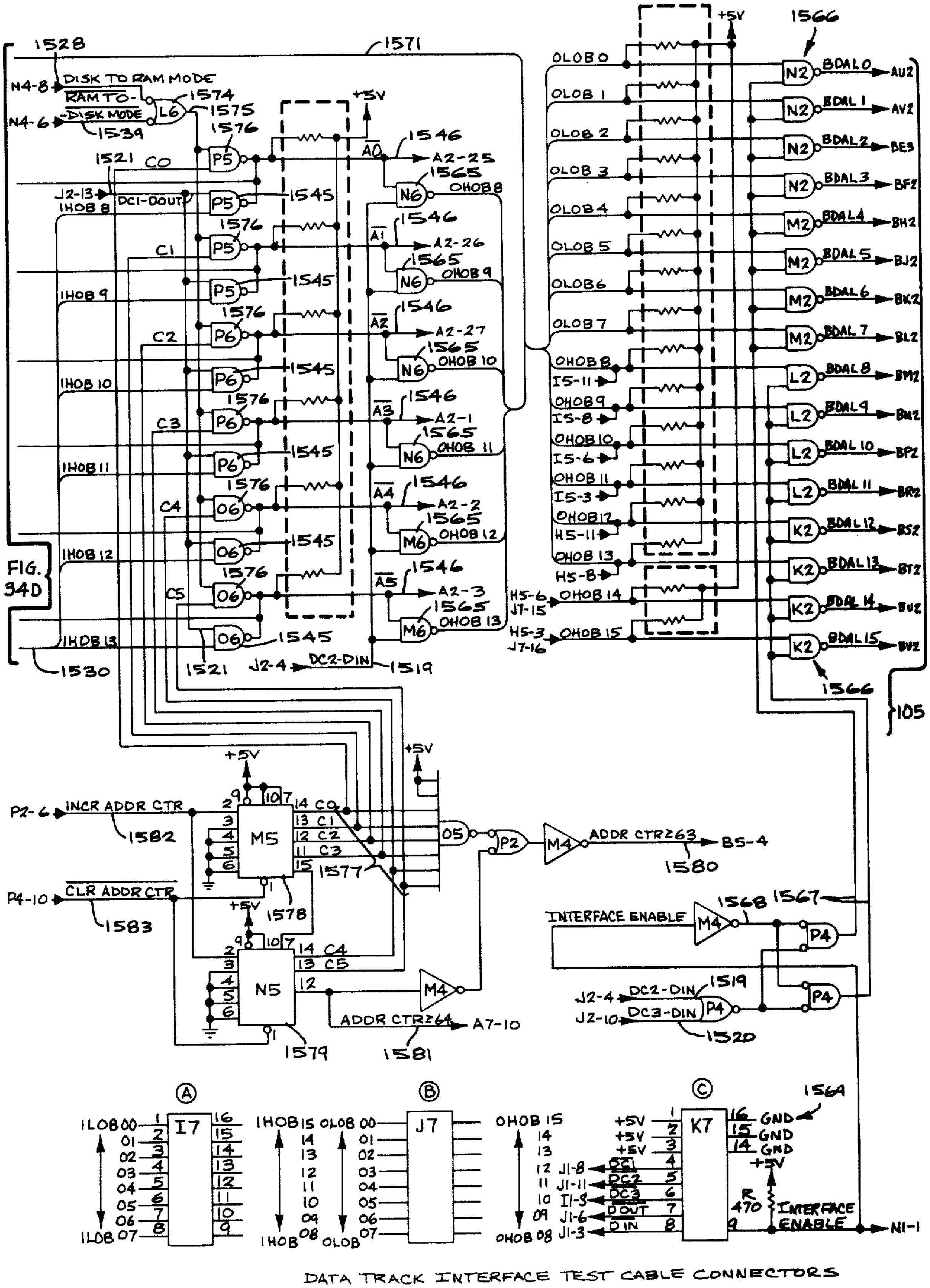
FIG_34D

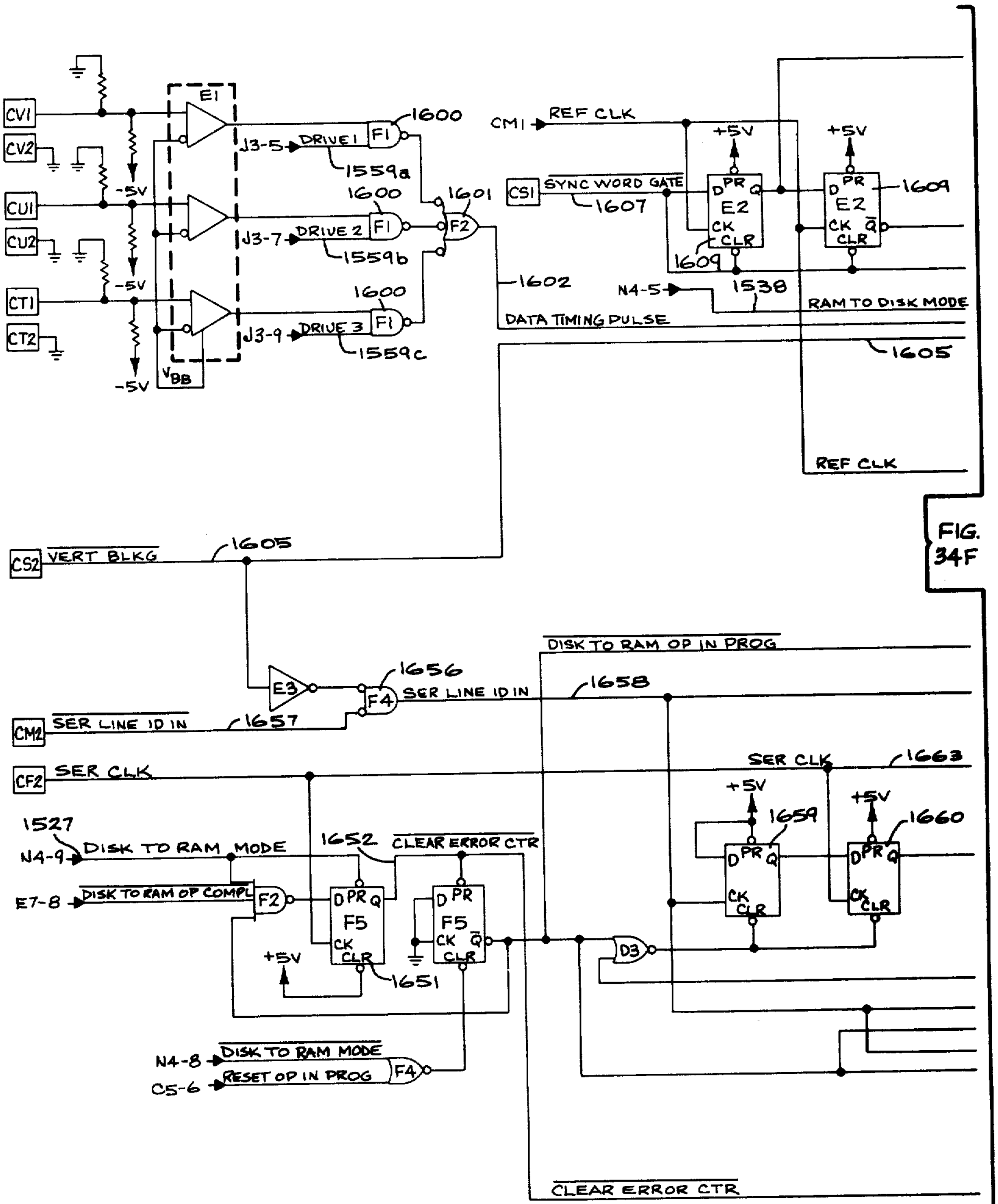
INTEGRATED CIRCUIT LIST
| REF. DESIG. | A1,B1,C1,2,D1,2,I1,5,J1, K1,2,5, L1,2,4,5,M1,2,6, N1,2,6,O6,P5,6, H7 | A4,5,6,B6,C2,4,7,D4, D5,6,7,E4,5,7, F5,G5,L6, N4, O1, P1 | I2,J2, D3,B4,F4, P4,C6 | O2,H3,4, M4,C5, E3,I6 | F1,P2, B5,L6, A7 | F2,3 J5,E6 | O4,P3 H6 | F1,B5 K6 | O3,G4, B7 | G3 |
|---|---|---|---|---|---|---|---|---|---|---|
| AMPEX P/N | | | | | | | | | | |
| VENDOR P/N | 7403 | 7474 | 7402 | 7404 | 7400 | 7410 | 7405 | 7408 | 7427 | 7420 |
| VOLTAGE PIN | 14 | 14 | 14 | 14 | 14 | 14 | 14 | 14 | 14 | 14 |
| GROUND PIN | 7 | 7 | 7 | 7 | 7 | 7 | 7 | 7 | 7 | 7 |
FIG_34E

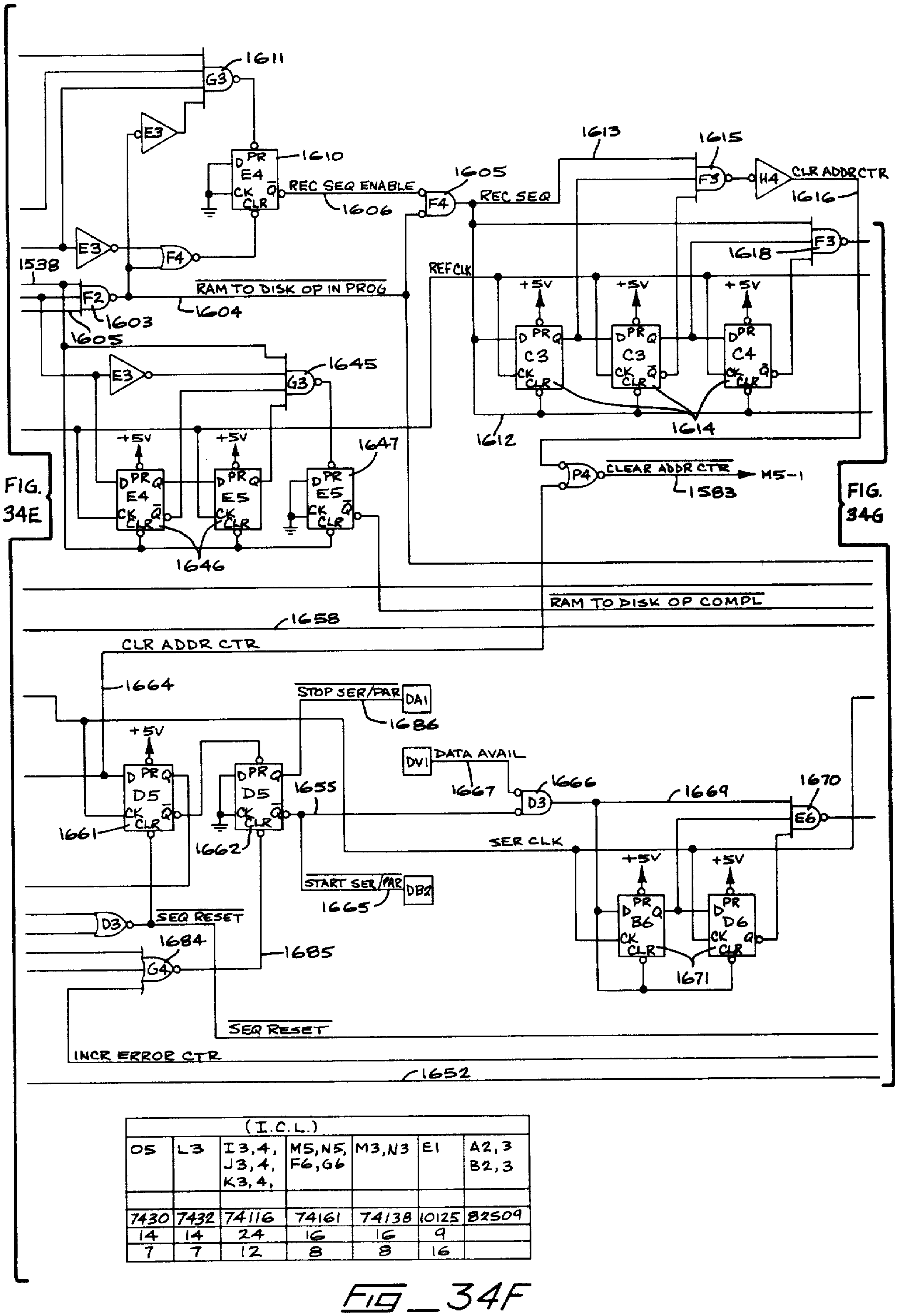
| (I.C.L.) | | | | | | |
|---|---|---|---|---|---|---|
| OS | L3 | I3,4, J3,4, K3,4, | M5,N5, F6,G6 | M3,N3 | E1 | A2,3 B2,3 |
| | | | | | | |
| 7430 | 7432 | 74116 | 74161 | 74138 | 10125 | 82S09 |
| 14 | 14 | 24 | 16 | 16 | 9 | |
| 7 | 7 | 12 | 8 | 8 | 16 | |
FIG_34F

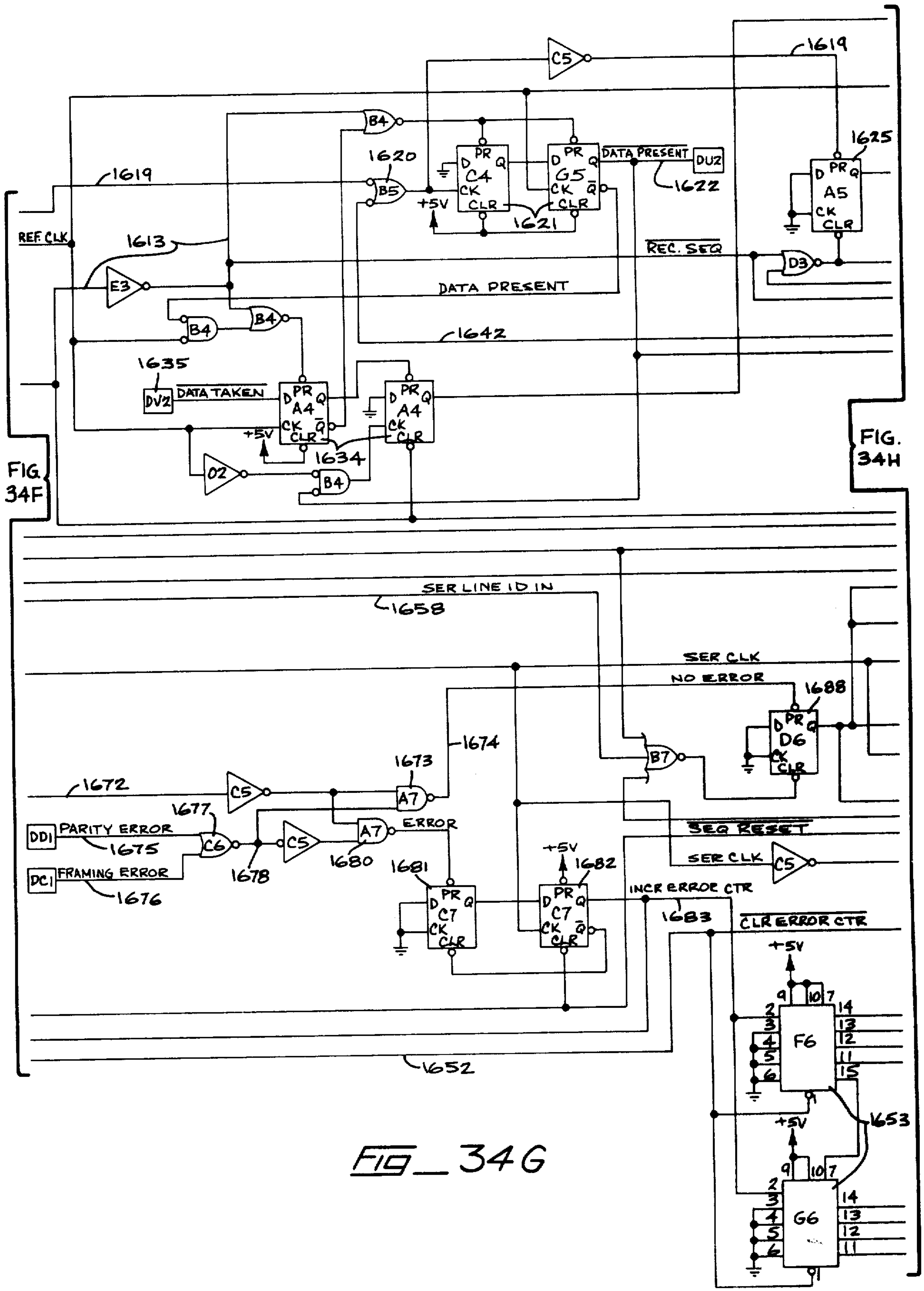
FIG_34G

FIG_34H

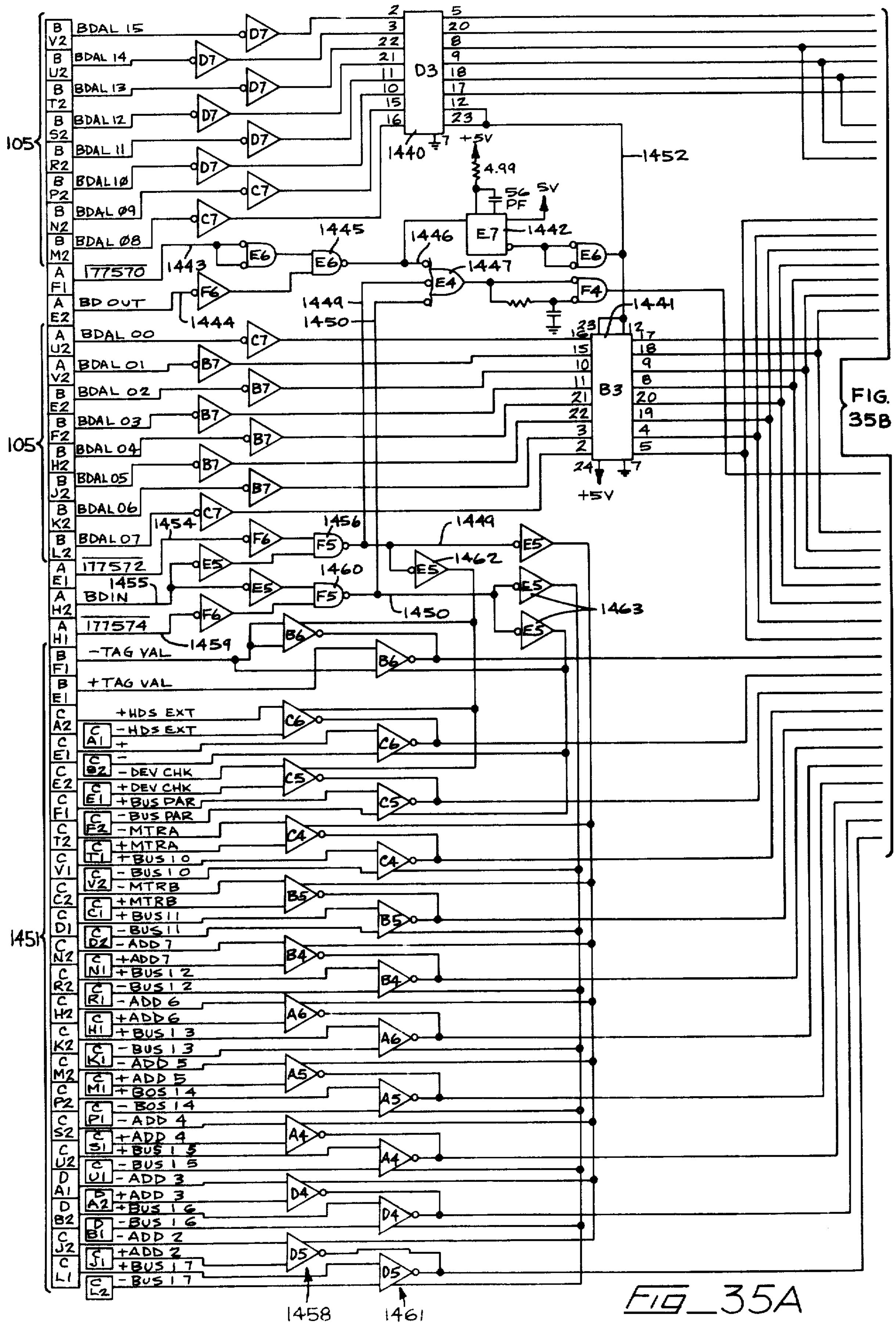
FIG_35A

INTEGRATED CIRCUIT LIST

| REF. DES. | A1,2,B1,B2,C2,D2 | A4-6,B4-6,C4-6,D4-5 | A3,E3 | B3,D3 | B7,C7,D7,F6 | E4 | E5 | E6,F5 | E7 | F4 |
|---|---|---|---|---|---|---|---|---|---|---|
| AMPEX P/N | | | | | | | | | | |
| VENDOR P/N | 75114 | 75115 | 74180 | 74100 | 74L04 | 7410 | 7404 | 7400 | 74121 | 7403 |
| VOLT. PIN | 16 | 16 | 14 | 24 | 14 | 14 | 14 | 14 | 14 | 14 |
| GND PIN | 8 | 8 | 7 | 7 | 7 | 7 | 7 | 7 | 7 | 7 |

FIG_35B

IC LIST

| REF. DES. | A1-3, B2-4, B6, C3, D4 | A4, A6, B1, C2 | A5, D1 |
|---|---|---|---|
| AMPEX PN | 587-510 | 587-533 | 587-765 |
| VENDOR PN | 74LS00 | 74LS04 | 74LS20 |
| VOLTAGE | 14 | 14 | 14 |
| GND | 7 | 7 | 7 |
| REF DES | B5, D2, 3 | C1 | C4, C6 |
| AMPEX PN | 587-283 | 587-279 | 587-778 |
| VENDOR PN | 74LS10 | 74LS138 | 74LS30 |
| VOLTAGE | 14 | 16 | 14 |
| GND | 7 | 8 | 7 |

| I.C. LIST | | | | | | | | | | | |
|---|---|---|---|---|---|---|---|---|---|---|---|
| REF DES. | A1,3,4 | A2,5,6 | B1,D1,6 | B2 | B3,D2,3 | B4,C4 | B5,C3 | B6 | C1,5 | C6 | D4,5 | C2 |
| AMPEX P/N | 587-510 | 587-533 | 587-387 | 587-534 | 587-885 | 587-758 | 587-952 | 587-778 | 587-750 | 587-765 | 587-007 | 586-326 |
| VENDOR P/N | 74LS00 | 74LS04 | 74LS74 | 74LS08 | 74LS164 | 74LS279 | 74LS27 | 74LS30 | 74LS02 | 74LS20 | 9305 | 7404 |
| VOLTAGE PIN | 14 | 14 | 14 | 14 | 14 | 16 | 14 | 14 | 14 | 14 | 14 | 14 |
| GRD PIN | 7 | 7 | 7 | 7 | 7 | 8 | 7 | 7 | 7 | 7 | 7 | 7 |

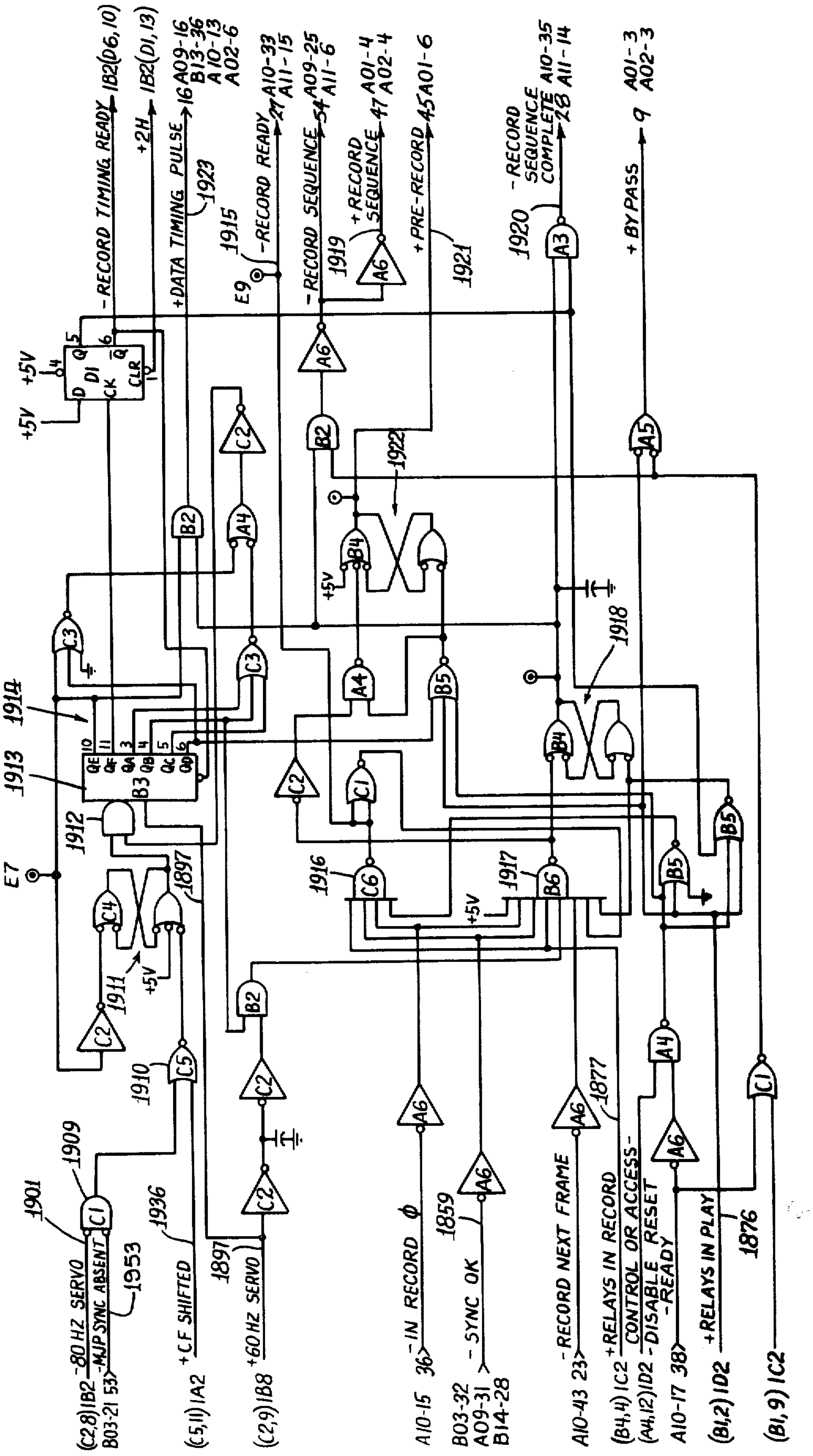
FIG_38B

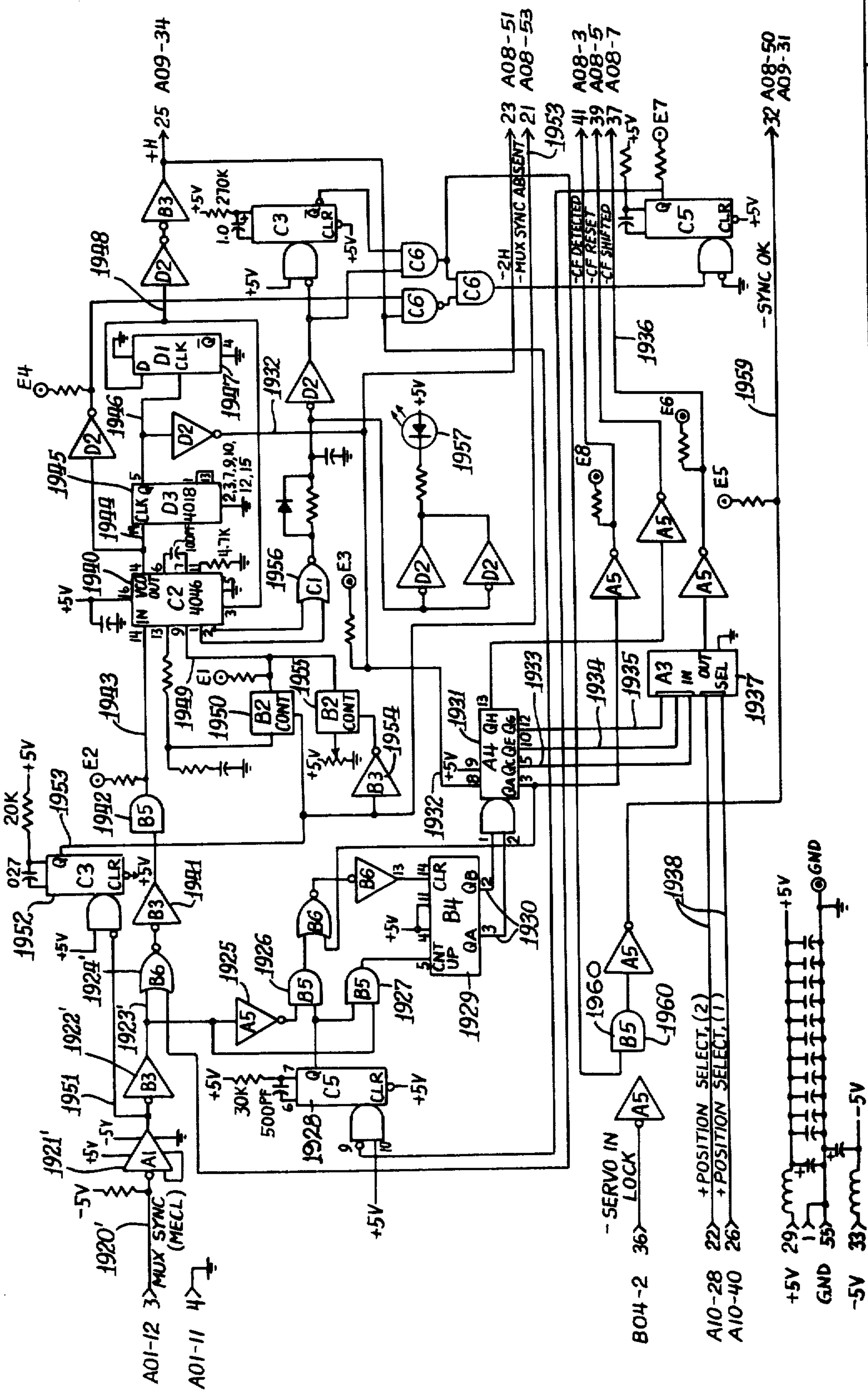
| REFERENCE DESIGNATIONS | A1 | B2 | C1 | C2 | D1 | D2 | D3 | C3,5 | B5,C6 | B3,A5 | B4 | B6 | A3 | A4 |
|---|---|---|---|---|---|---|---|---|---|---|---|---|---|---|
| AMPEX P/N | 587-285 | 587-680 | 587-318 | 587-428 | 587-446 | 587-332 | 587-972 | 587-535 | 587-534 | 587-533 | 589-132 | 587-750 | 587-777 | 587-895 |
| VENDOR P/N | 10125 | CD4066 | CD4001 | CD4046 | CD4013 | CD4049 | CD4018 | 74LS123 | 74LS08 | 74LS04 | 74LS192 | 74LS02 | 74LS153 | 74LS164 |
| VOLTAGE PIN | 9+5 8-5 | 14 | 14 | 16 | 14 | 16 | 16 | 16 | 14 | 14 | 16 | 14 | 16 | 14 |
| GROUND PIN | 16 | 7 | 7 | 8 | 7 | 8 | 8 | 8 | 7 | 7 | 8 | 7 | 8 | 7 |
FIG_39

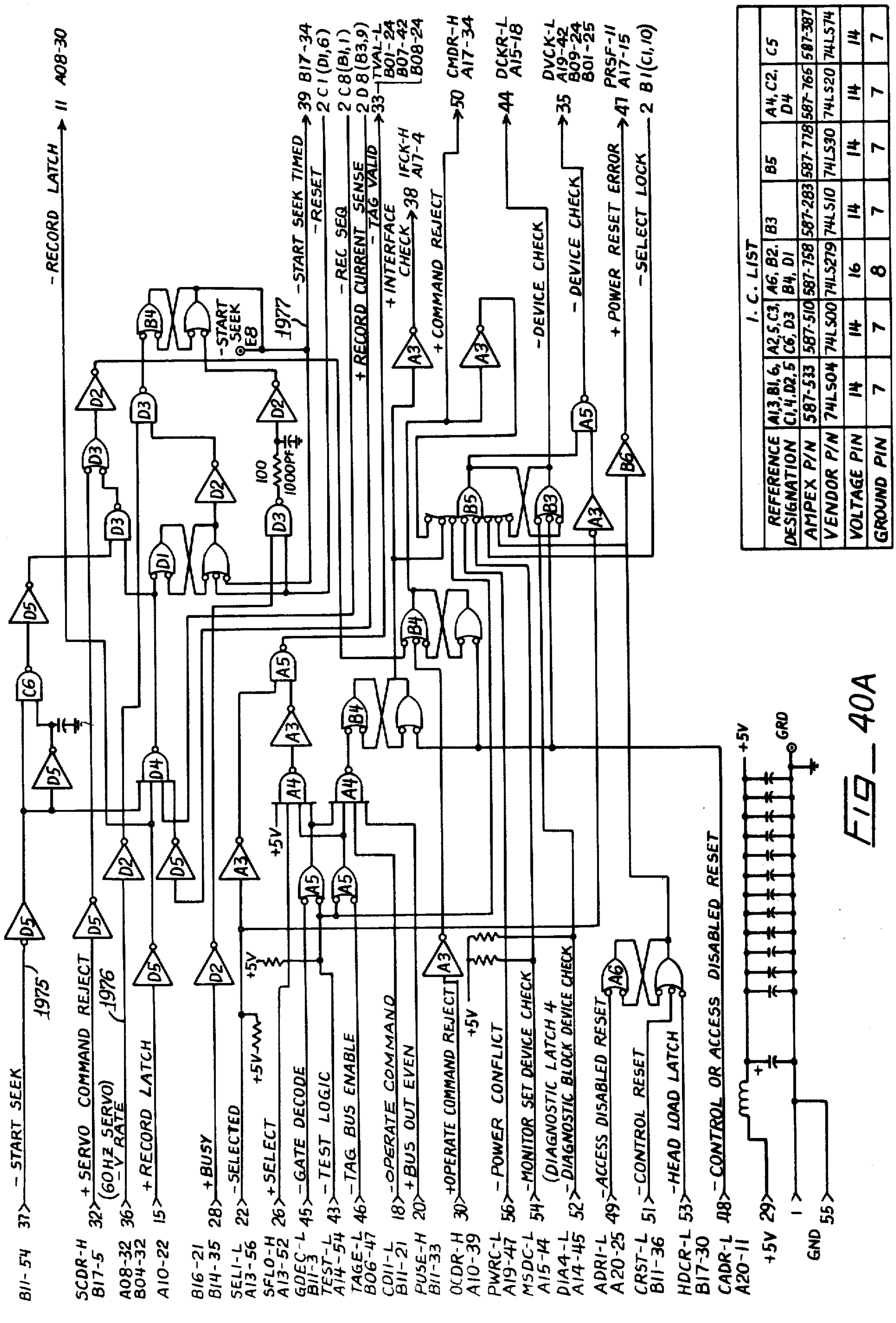
I. C. LIST
| REFERENCE DESIGNATION | A1,3,B1,6, C1,4,D2,5 | A2,5,C3, C6,D3 | A6,B2, B4,D1 | B3 | B5 | A4,C2, D4 | C5 |
|---|---|---|---|---|---|---|---|
| AMPEX P/N | 587-533 | 587-510 | 587-158 | 587-283 | 587-778 | 587-765 | 587-387 |
| VENDOR P/N | 74LS04 | 74LS00 | 74LS279 | 74LS10 | 74LS30 | 74LS20 | 74LS74 |
| VOLTAGE PIN | 14 | 14 | 16 | 14 | 14 | 14 | 14 |
| GROUND PIN | 7 | 7 | 8 | 7 | 7 | 7 | 7 |
FIG_40A

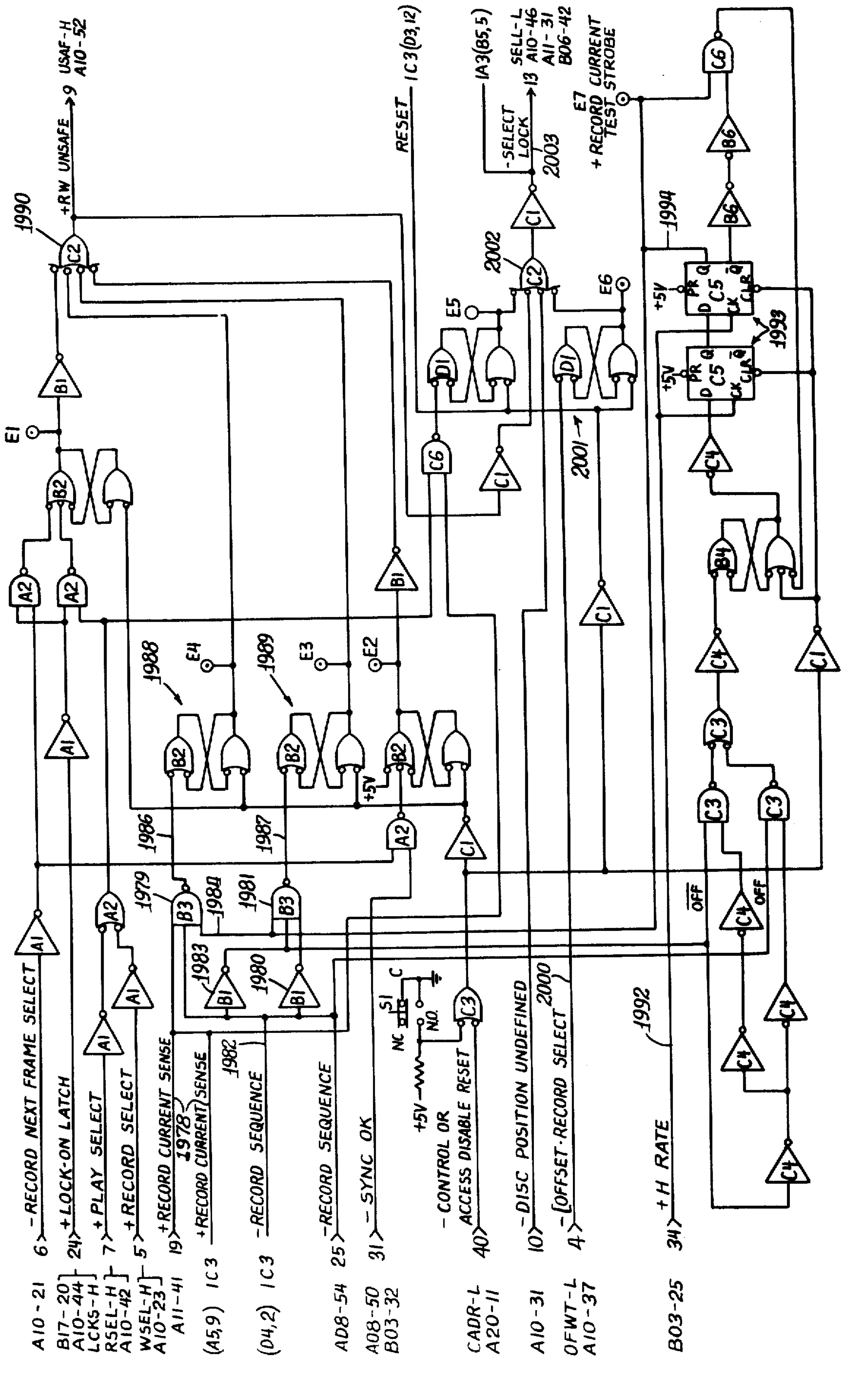
FIG_40B

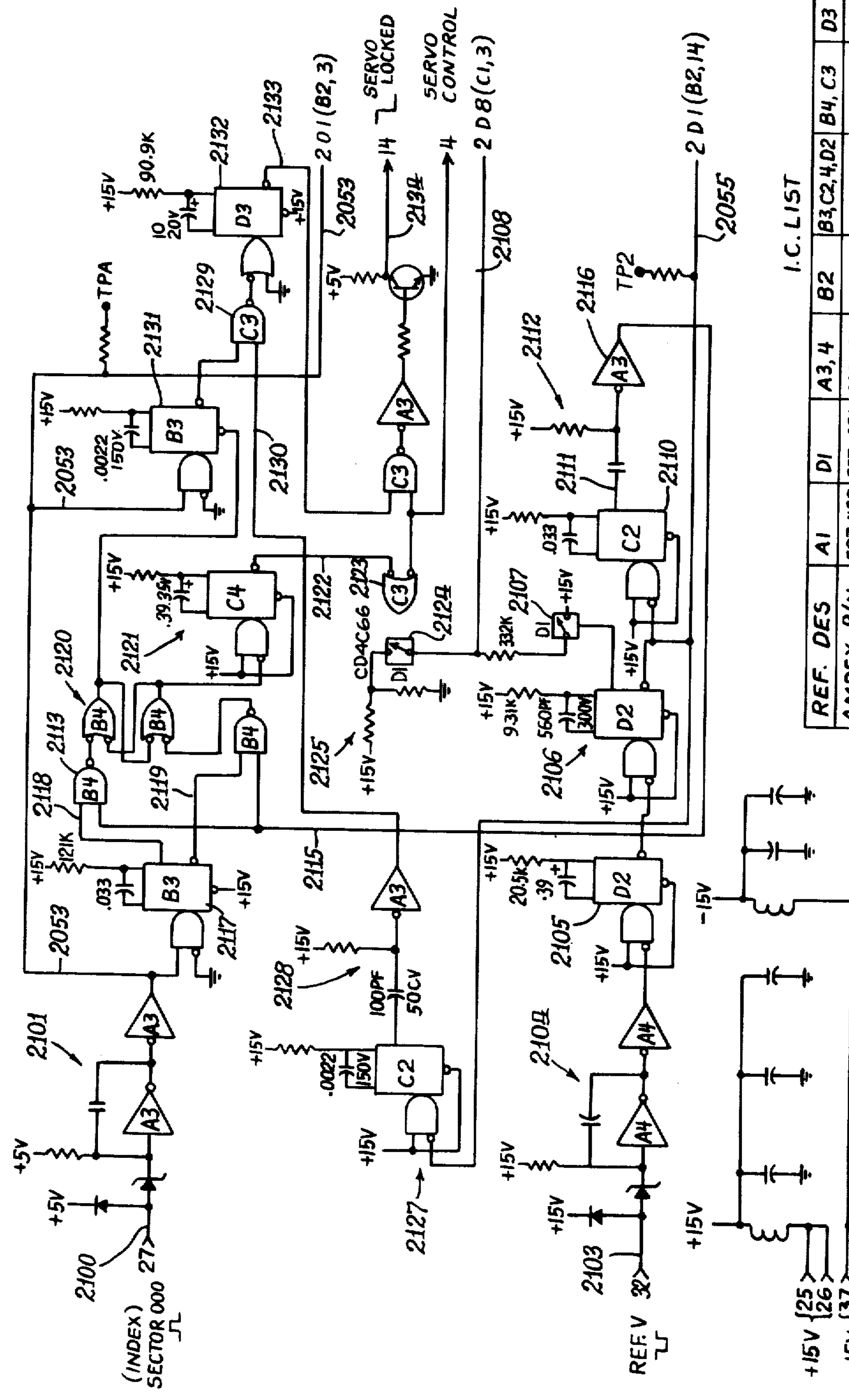
I.C. LIST
| REF. DES | A1 | D1 | A3,4 | B2 | B3,C2,4,D2 | B4,C3 | D3 | C1 | A2 |
|---|---|---|---|---|---|---|---|---|---|
| AMPEX P/N | 587-458 | 587-680 | 587-322 | 587-428 | 589-019 | 587-319 | 587-051 | 589-083 | 586-683 |
| VENDOR P/N | MC3403 | CD4066 | CD4049 | CD4046 | 74C221 | CD4011 | MC14528 | LF356H | 4N26 |
| VOLTAGE | 4 | 14 | 1 | 16 | 16 | 14 | 16 | +15-7 | — |
| GND | 11 | 7 | 8 | 8 | 8 | 7 | 8 | -15-4 | — |
FIG_41A

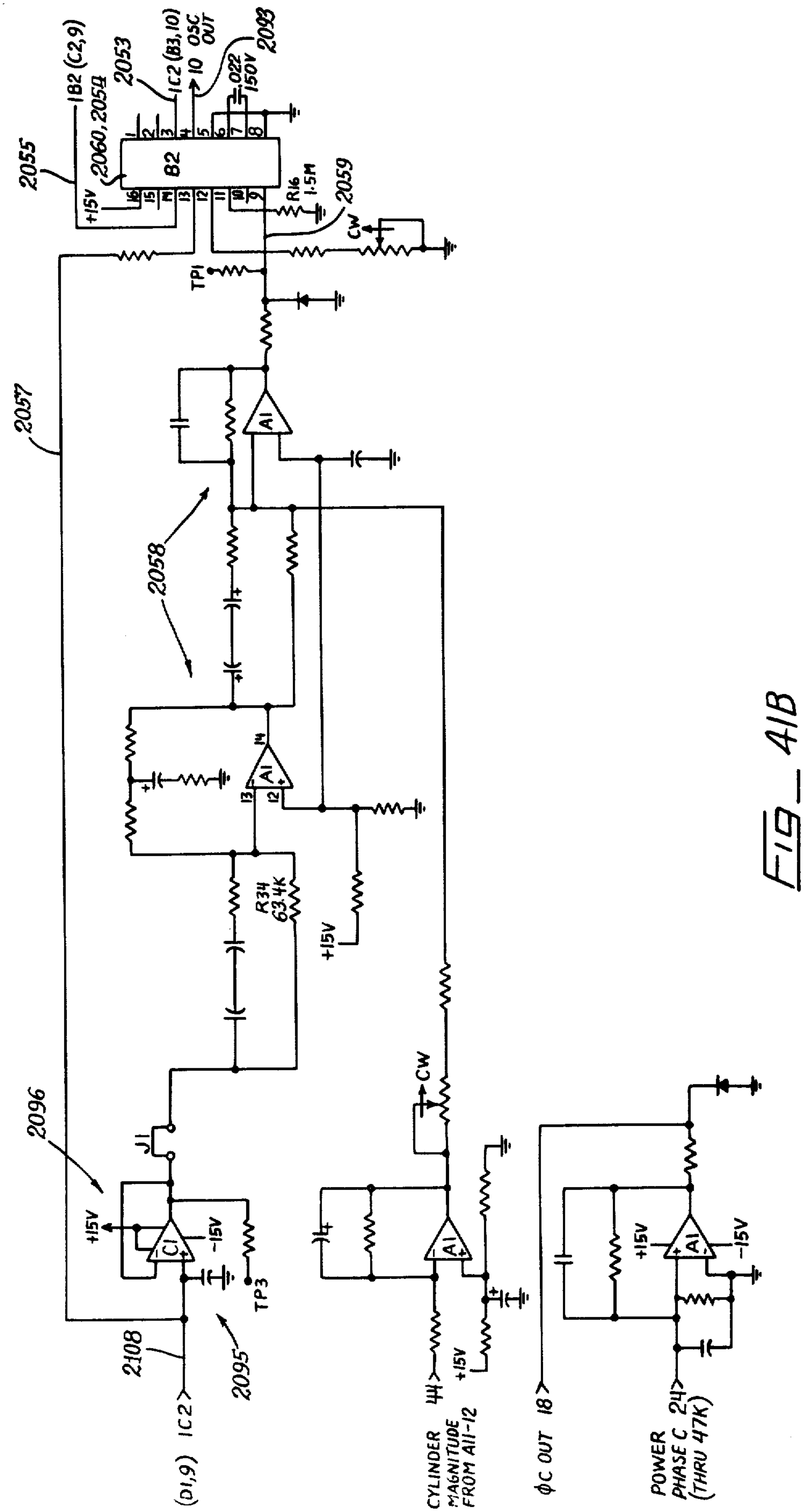
FIG_ 41B

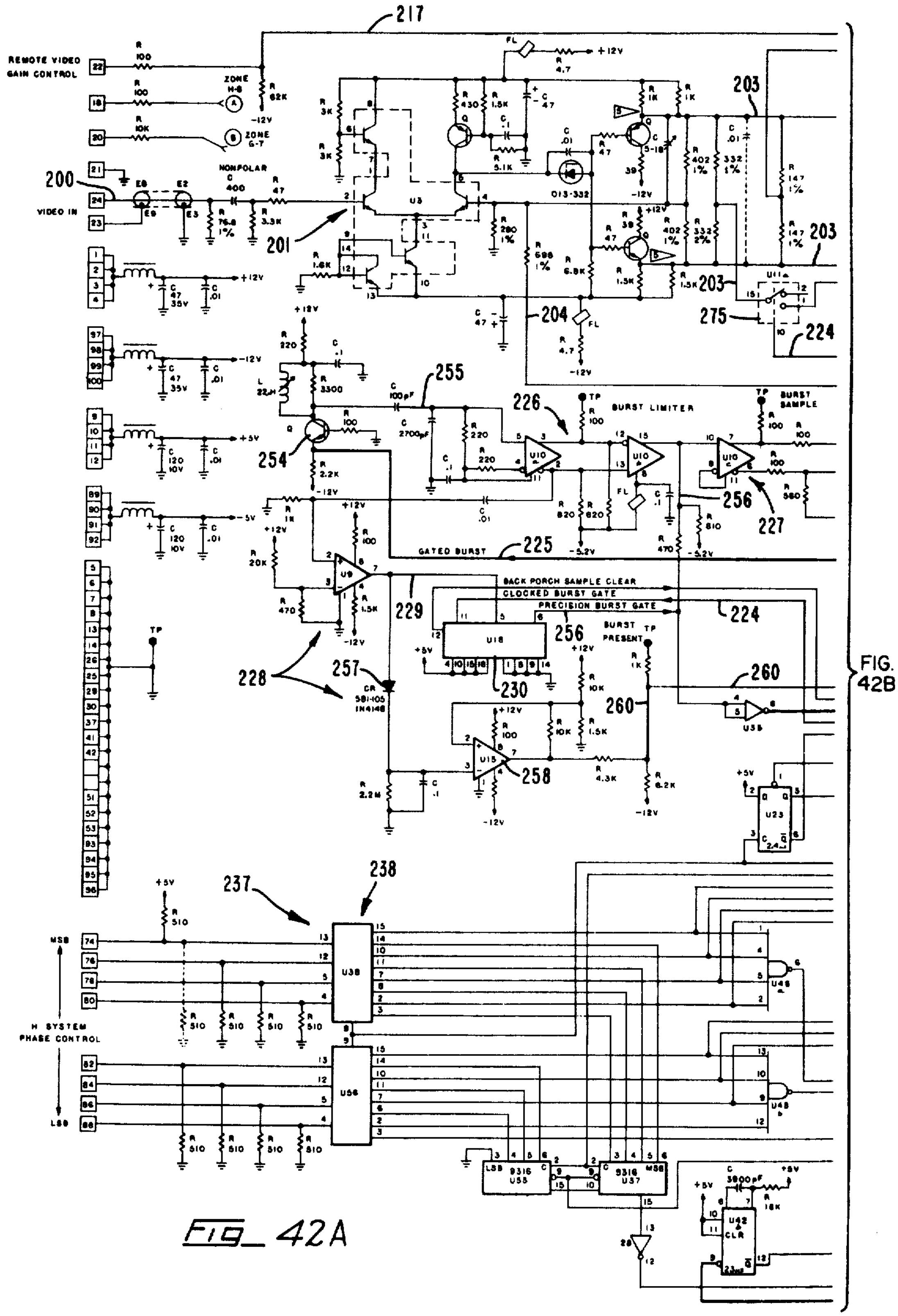
FIG_ 42A

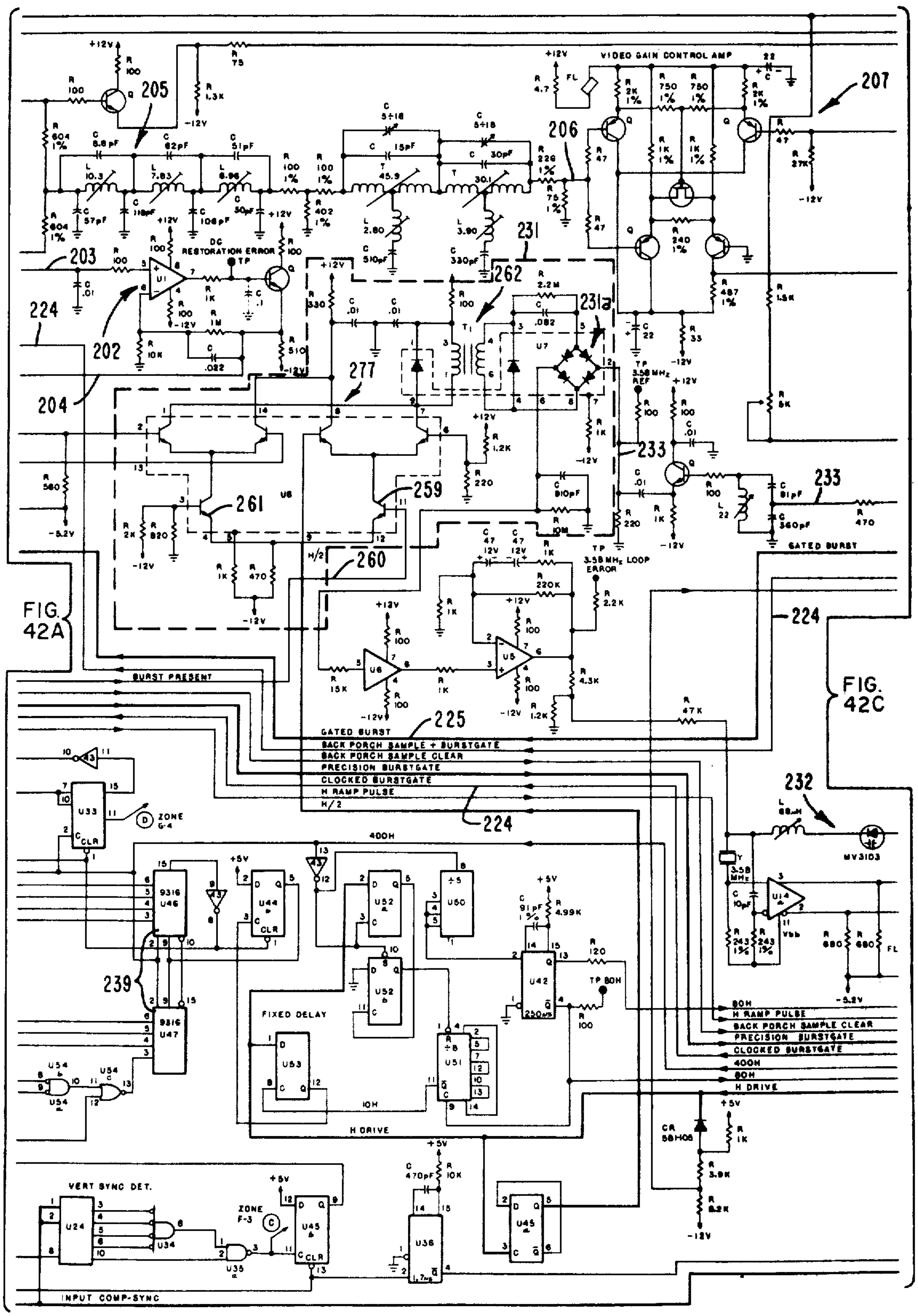
FIG_42B

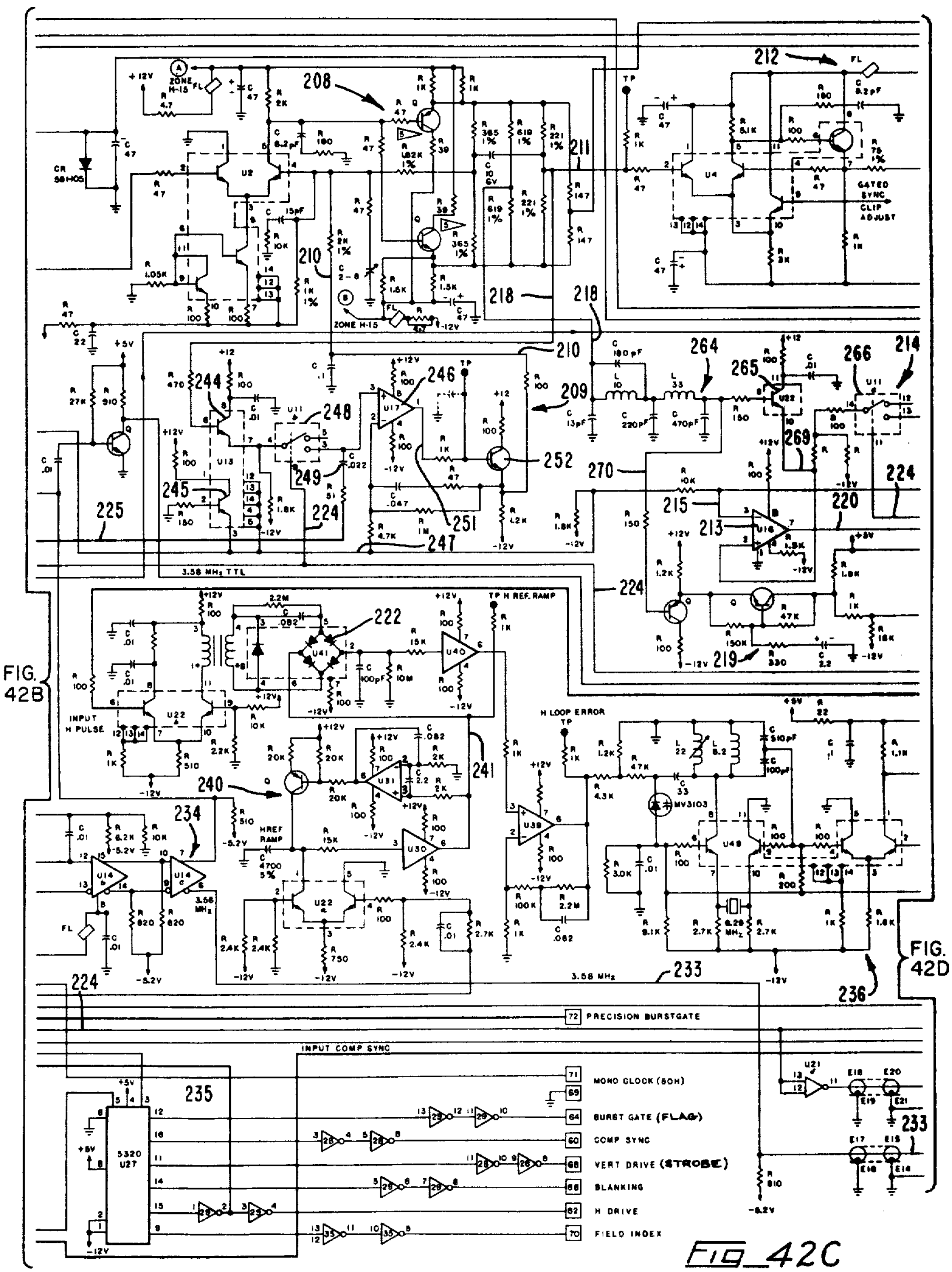
FIG_42C

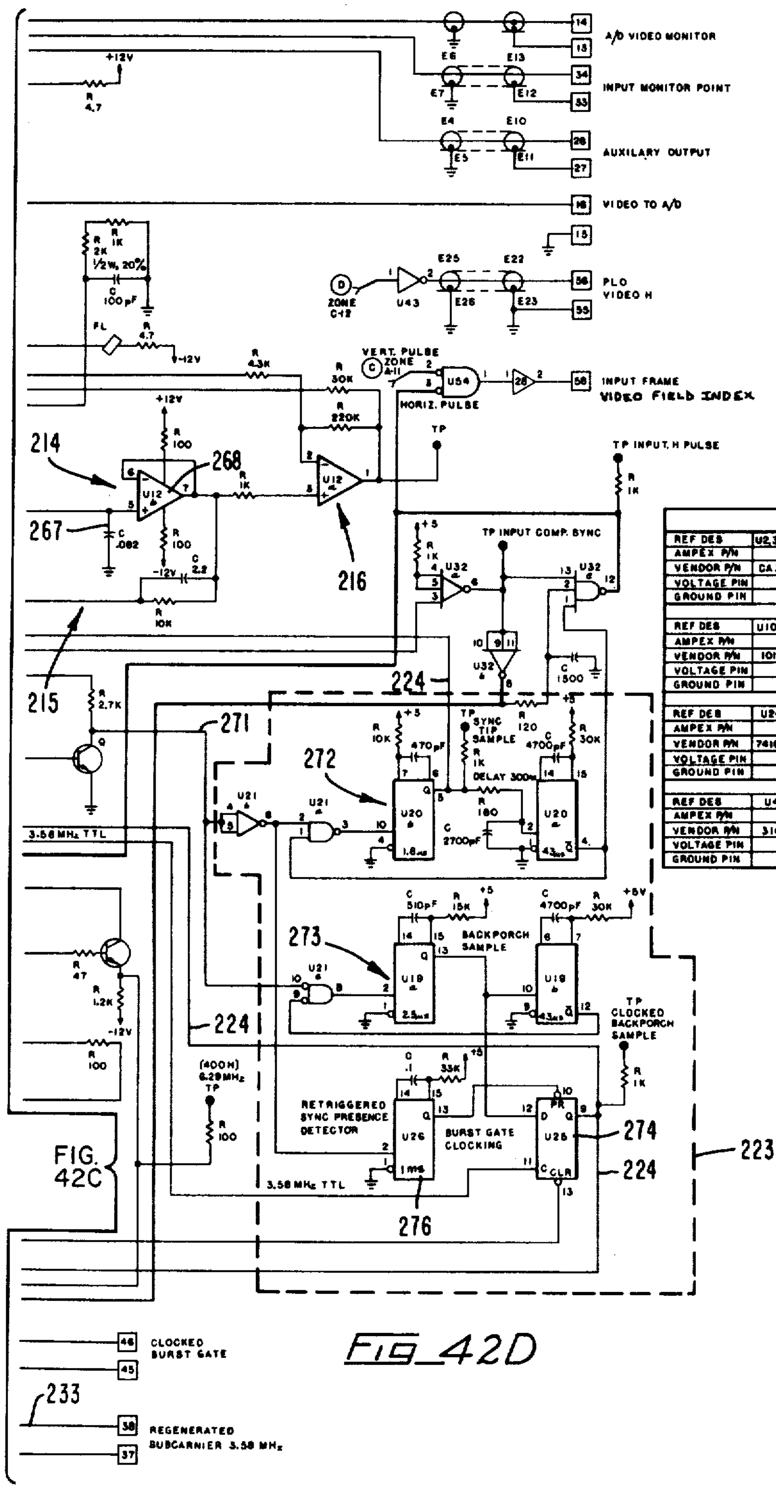
FIG_42D
INTEGRATED CIRCUIT LIST
| REF DES | U2,3,4,13,22 | U1,12,17 | U5,31,39 | U6,30,40 | U9 | U8,15,16 |
|---|---|---|---|---|---|---|
| AMPEX P/N | | | | | | |
| VENDOR P/N | CA3046 | 1458 | 741 | 302 | CA3054 | 710 |
| VOLTAGE PIN | | | | | | |
| GROUND PIN | | | | | | |
| REF DES | U10,14 | U12,17 | U16 | U19,20,26,36,42 | U21,35 | U23,29,44,45,52 |
|---|---|---|---|---|---|---|
| AMPEX P/N | | | | | | |
| VENDOR P/N | 10116 | 1458 | 74193 | 74123 | 7400 | 7474 |
| VOLTAGE PIN | | | | | | |
| GROUND PIN | | | | | | |
| REF DES | U24 | U32 | U33,37,46,47,55 | U34 | U38,51,56 | U7,41 | U48 |
|---|---|---|---|---|---|---|---|
| AMPEX P/N | | | | | | | |
| VENDOR P/N | 74164 | 7410 | 9316 | 7425 | 74LS175 | 3019 | 7420 |
| VOLTAGE PIN | | | | | | | |
| GROUND PIN | | | | | | | |
| REF DES | U49 | U50 | U53 | U54 | U11 |
|---|---|---|---|---|---|
| AMPEX P/N | | | | | |
| VENDOR P/N | 3103 | 9308 | 74164 | 7402 | |
| VOLTAGE PIN | | | | | |
| GROUND PIN | | | | | |

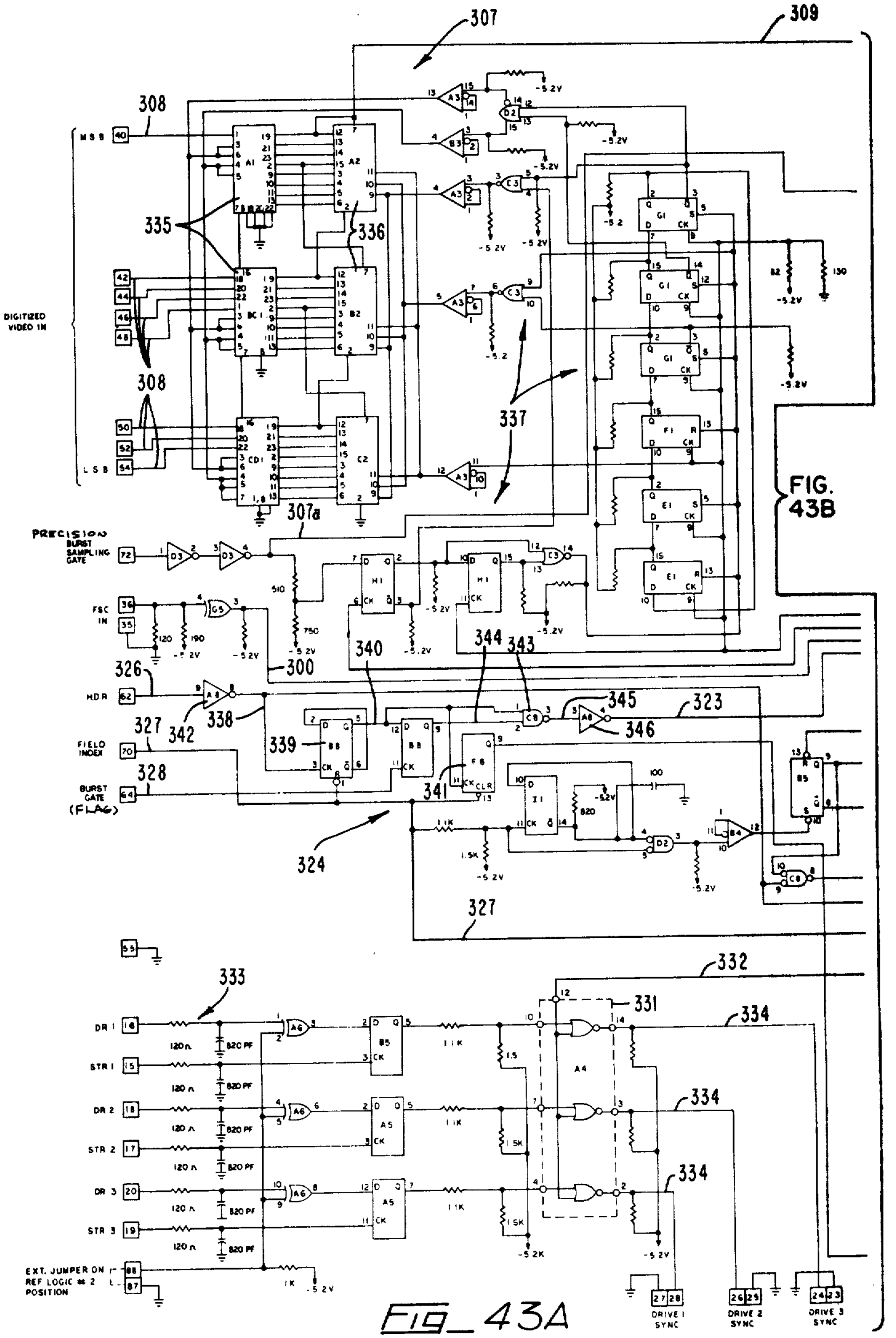
FIG_43A

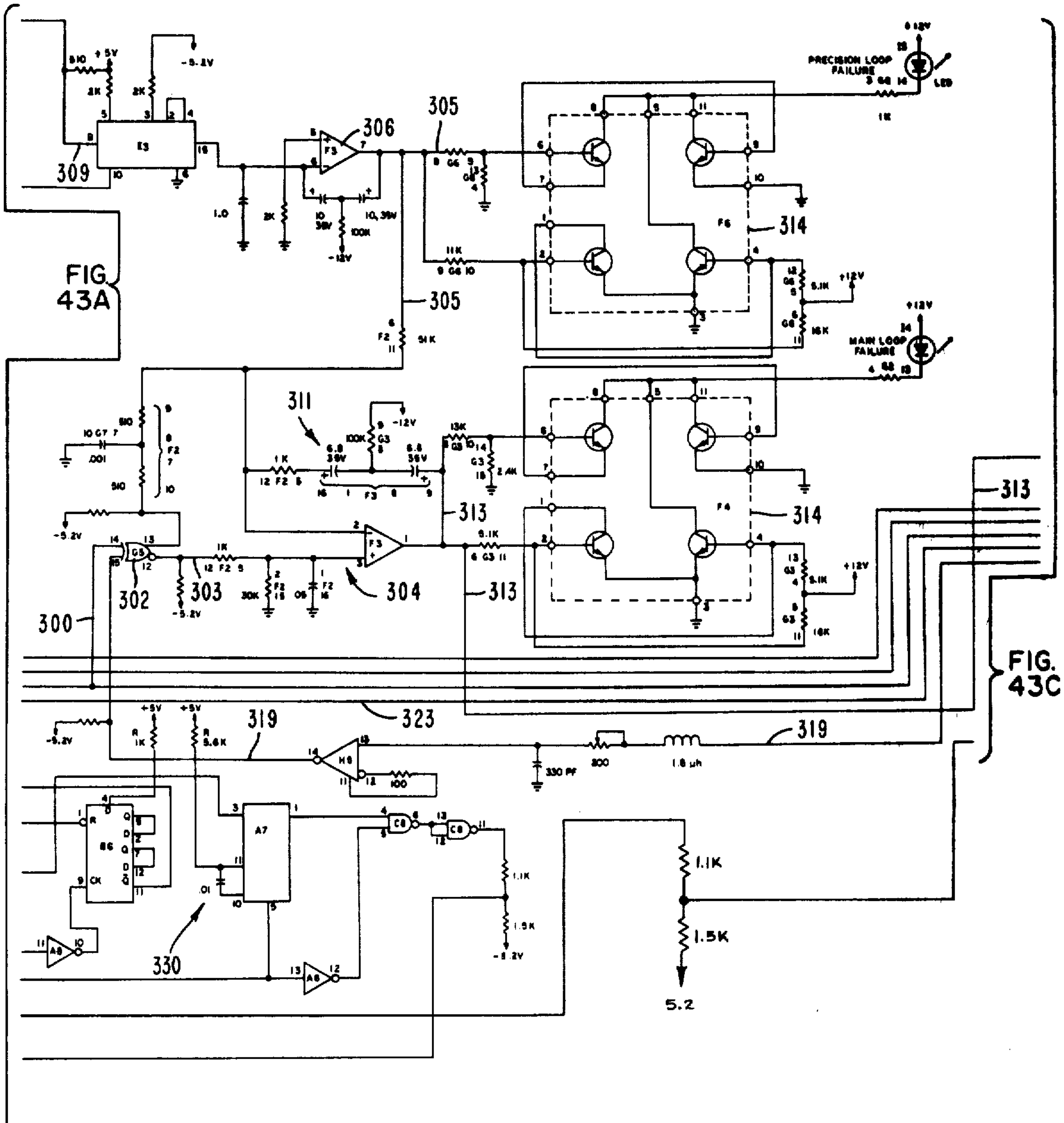
| I.C. LIST | | | | | | | | | | | |
|---|---|---|---|---|---|---|---|---|---|---|---|
| REF. DES. | F4, F6 | D7 | E3 | F3 | F7 | C8 | A8, D3 | A6 | A7 | A5, B5, 8 | B6 |
| AMPEX P/N | – | – | – | 586-905 | 586-764 | 586-075 | 586-328 | 586-705 | 586-633 | 587-075 | 587-767 |
| VENDOR P/N | CA3046 | CA3028 | CD4063 | MC1458 | LM741 | 7400 | 7404 | 7486 | 74121 | 74LS74 | 74LS175 |
| VOLTAGE (PIN) | – | – | +5V (16) | – | – | +5V (14) | +5V (14) | +5V (14) | +5V (14) | +5V (14) | +5V (16) |
| GROUND PIN | – | – | 8 | – | – | 7 | 7 | 7 | 7 | 7 | 8 |
| REF. DES. | A1, BC-1, CD1 | A2, B2, C2 | A4, D4, D5, D8, E2, E4, E5, F8 | C6 | C3, C4, D2, H4 | G5 | E6, H7 | A3, B3, B4 | C5, C7, D8, E1, F1, G1, G4, G8, H1, H2, H3, I1 |
|---|---|---|---|---|---|---|---|---|---|
| AMPEX P/N | 587-100 | 587-824 | 587-203 | 587-206 | 587-703 | 587-747 | 587-704 | 587-285 | 587-139 |
| VENDOR P/N | 74S181 | 74S194 | 10101 | 10102 | 10106 | 10107 | 10116 | 10125 | 10131 |
| VOLTAGE (PIN) | +5V (24) | +5V (16) | –5.2V (8) | –5.2V (8) | –5.2V (8) | –5.2V (8) | –5.2V (8) | +5V (9), –5.2V (8) | –5.2V (8) |
| GROUND PIN | 12 | 8 | 1, 16 | 1, 16 | 1, 16 | 1, 16 | 1, 16 | 16 | 1, 16 |
31
TRANSFER
ID RESET
FIG_43B

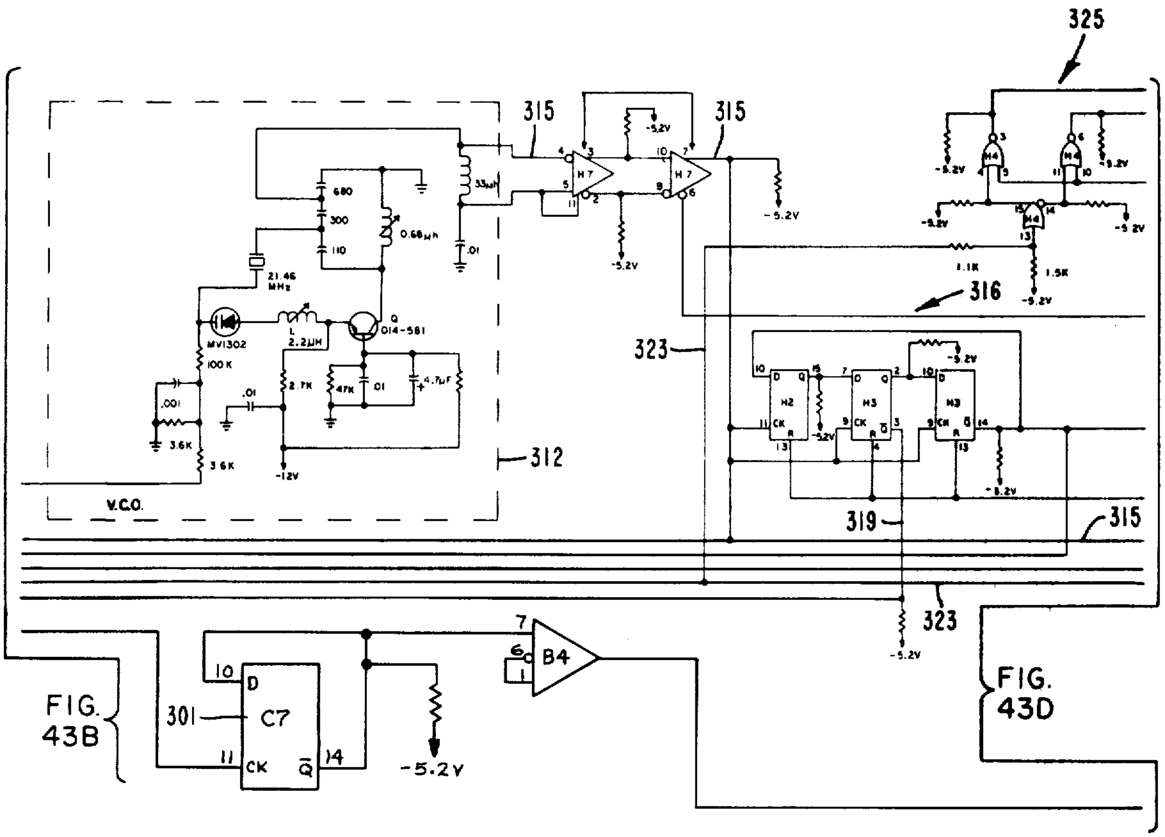
FIG_43C

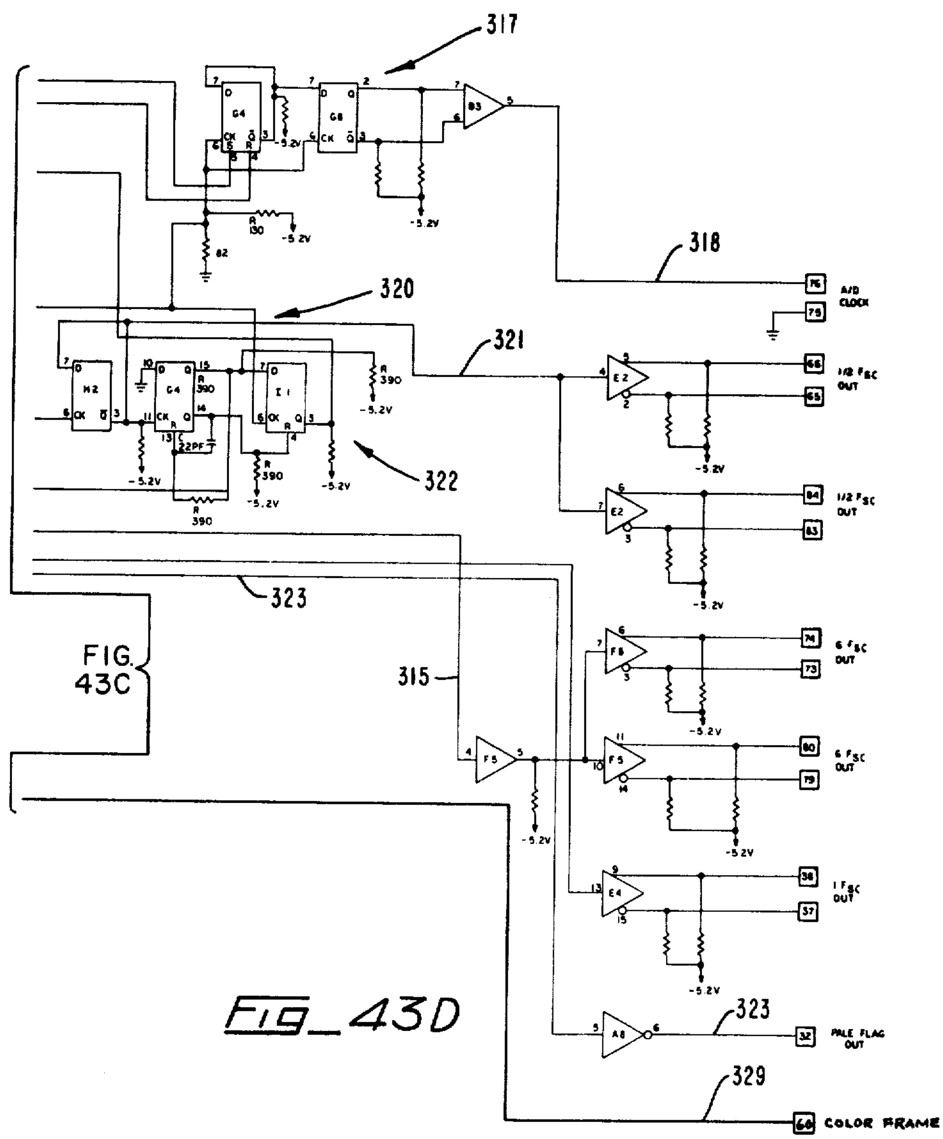
FIG_43D

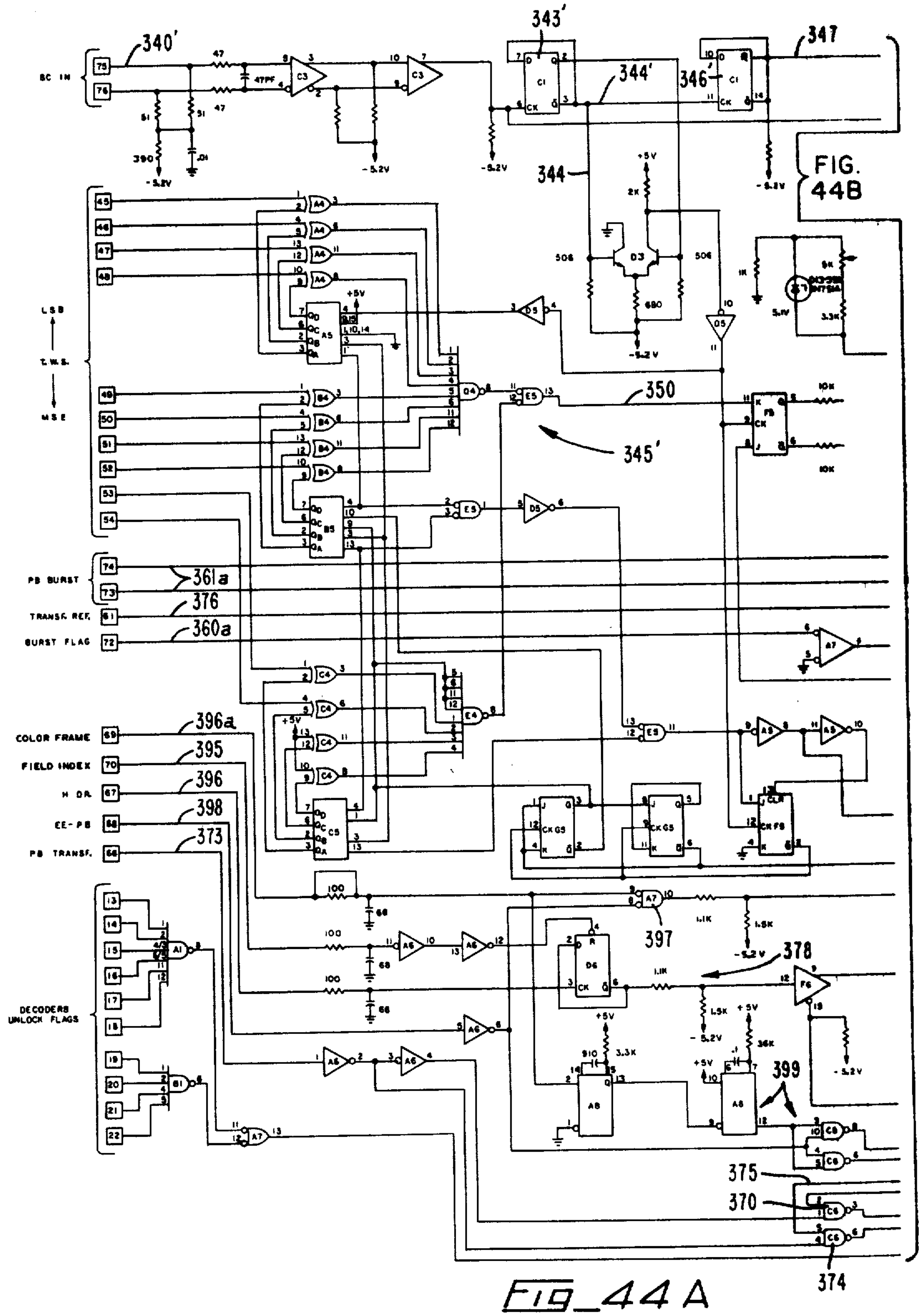
FIG_44A

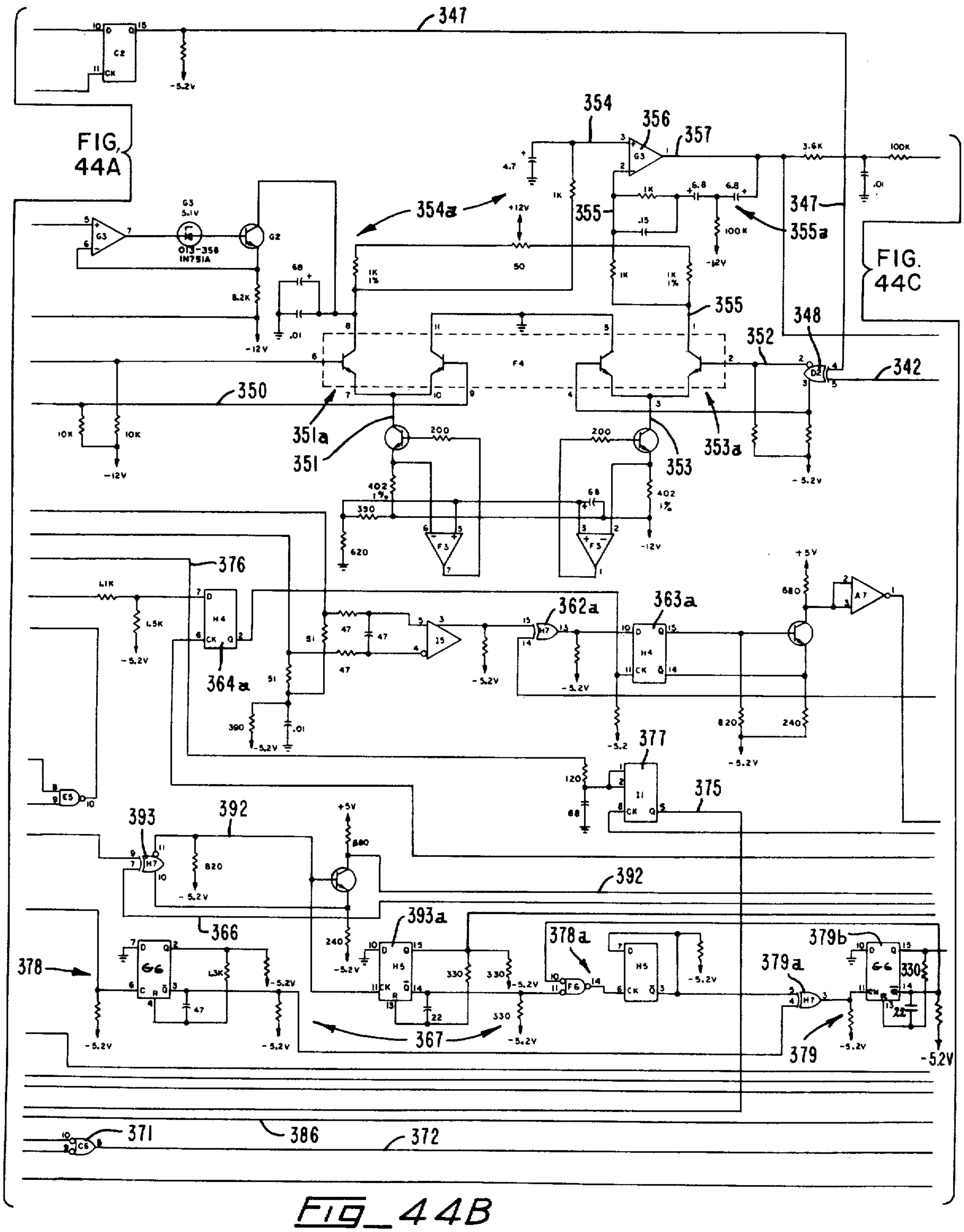
FIG_44B

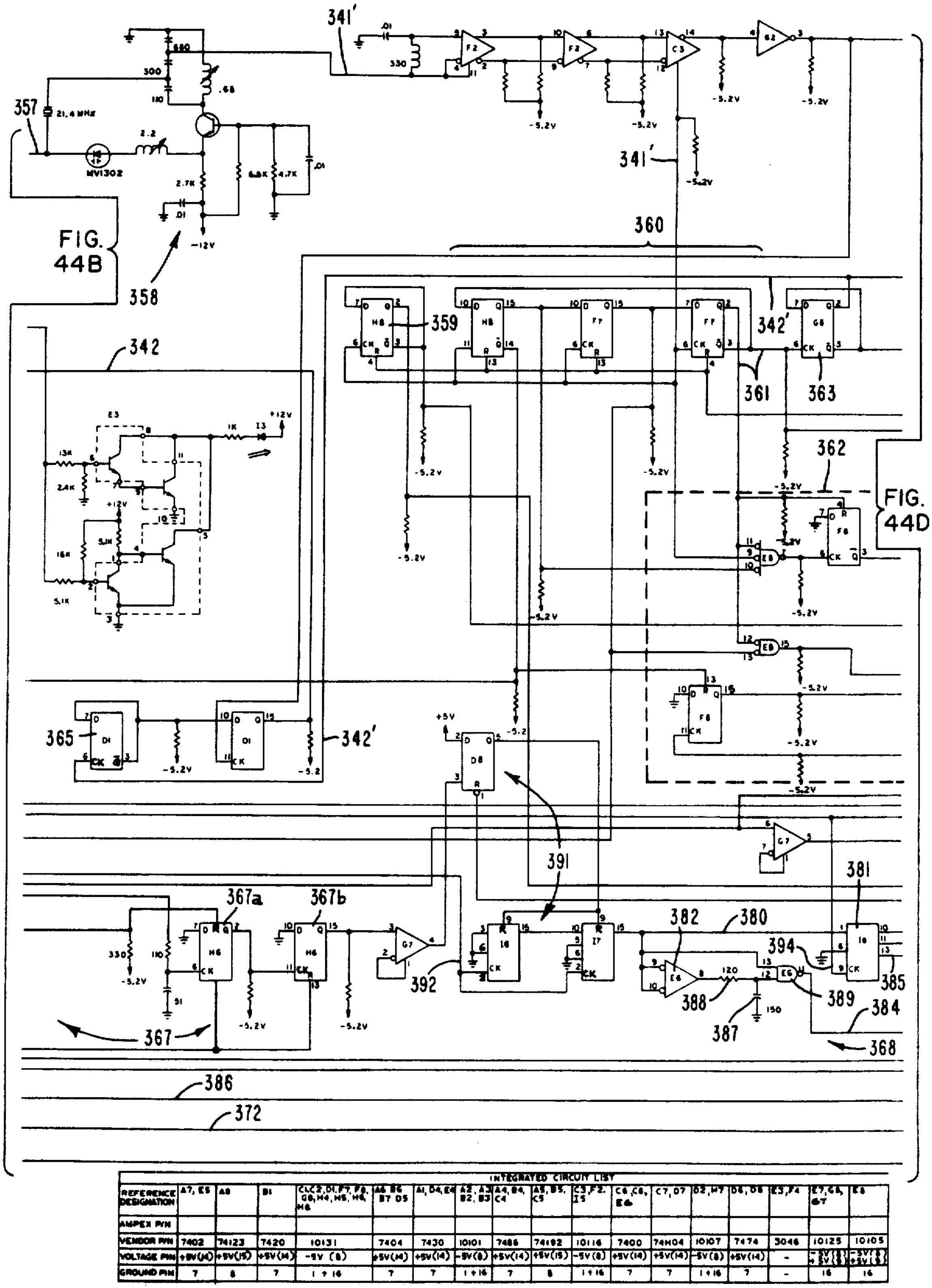
| INTEGRATED CIRCUIT LIST | | | | | | | | | | | | | | | | | |
|---|---|---|---|---|---|---|---|---|---|---|---|---|---|---|---|---|---|
| REFERENCE DESIGNATION | A7, E5 | A8 | B1 | C1,C2,D1,F7,F8, G8,H4,H5,H6, H8 | A6 B6 B7 D5 | A1, D4, E4 | A2, A3 B2, B3 | A4, B4, C4 | A5, B5, C5 | C3,F2, I5 | C6,C8, E6 | C7, D7 | D2, H7 | D6, D8 | E3, F4 | E7, G6, G7 | E8 |
| AMPEX P/N | | | | | | | | | | | | | | | | | |
| VENDOR P/N | 7402 | 74123 | 7420 | 10131 | 7404 | 7430 | 10101 | 7486 | 74192 | 10116 | 7400 | 74H04 | 10107 | 7474 | 3046 | 10125 | 10105 |
| VOLTAGE PIN | +5V(14) | +5V(15) | +5V(14) | -5V (8) | +5V(14) | +5V(14) | -5V(8) | +5V(14) | +5V(15) | -5V(8) | +5V(14) | +5V(14) | -5V(8) | +5V(14) | - | -5V([illegible]) +5V([illegible]) | -5V([illegible]) +5V([illegible]) |
| GROUND PIN | 7 | 8 | 7 | 1 + 16 | 7 | 7 | 1 + 16 | 7 | 8 | 1 + 16 | 7 | 7 | 1 + 16 | 7 | - | 16 | 16 |
Fig_44C

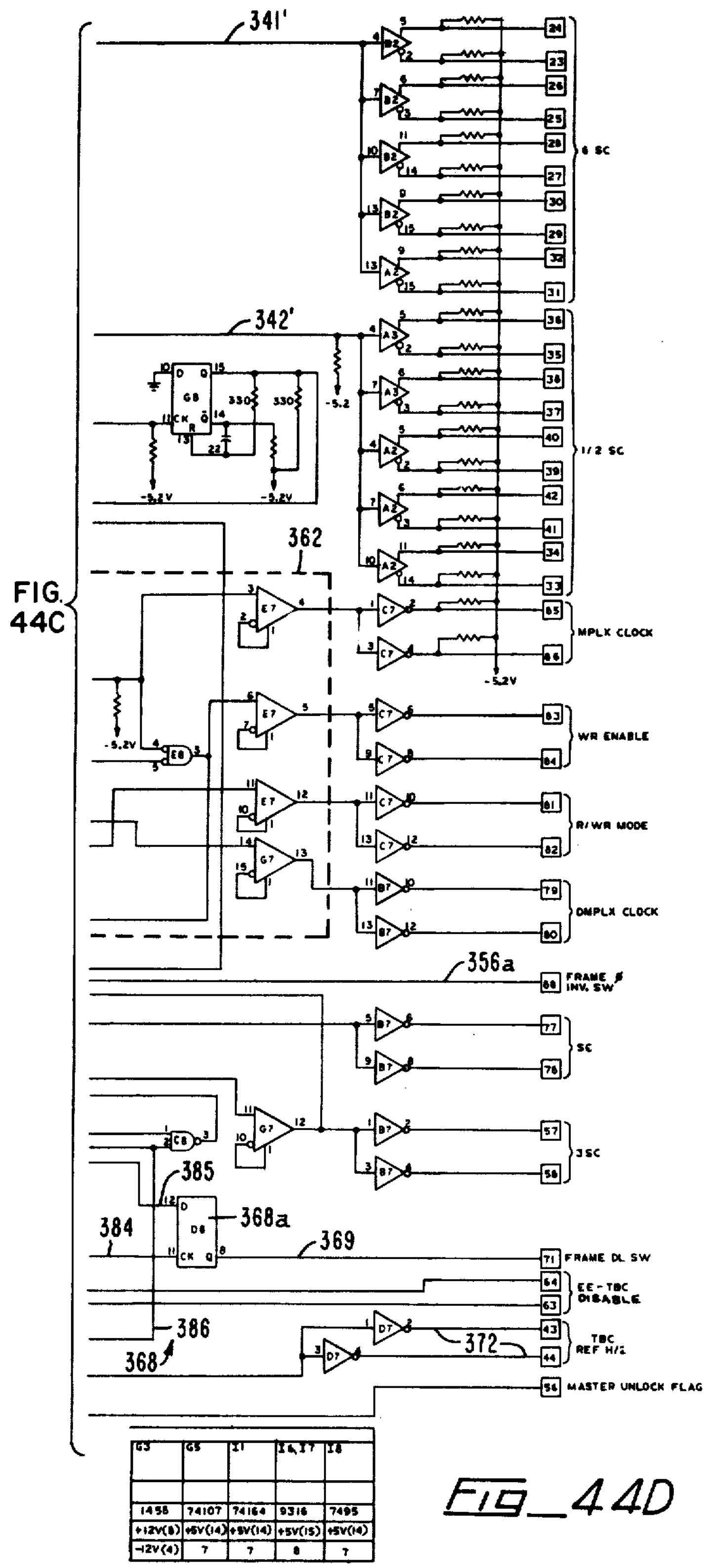
| G3 | G5 | I1 | I6, I7 | I8 |
|---|---|---|---|---|
| | | | | |
| 1458 | 74107 | 74164 | 9316 | 7495 |
| +12V(8) | +5V(14) | +5V(14) | +5V(15) | +5V(14) |
| -12V(4) | 7 | 7 | 8 | 7 |
FIG_44D

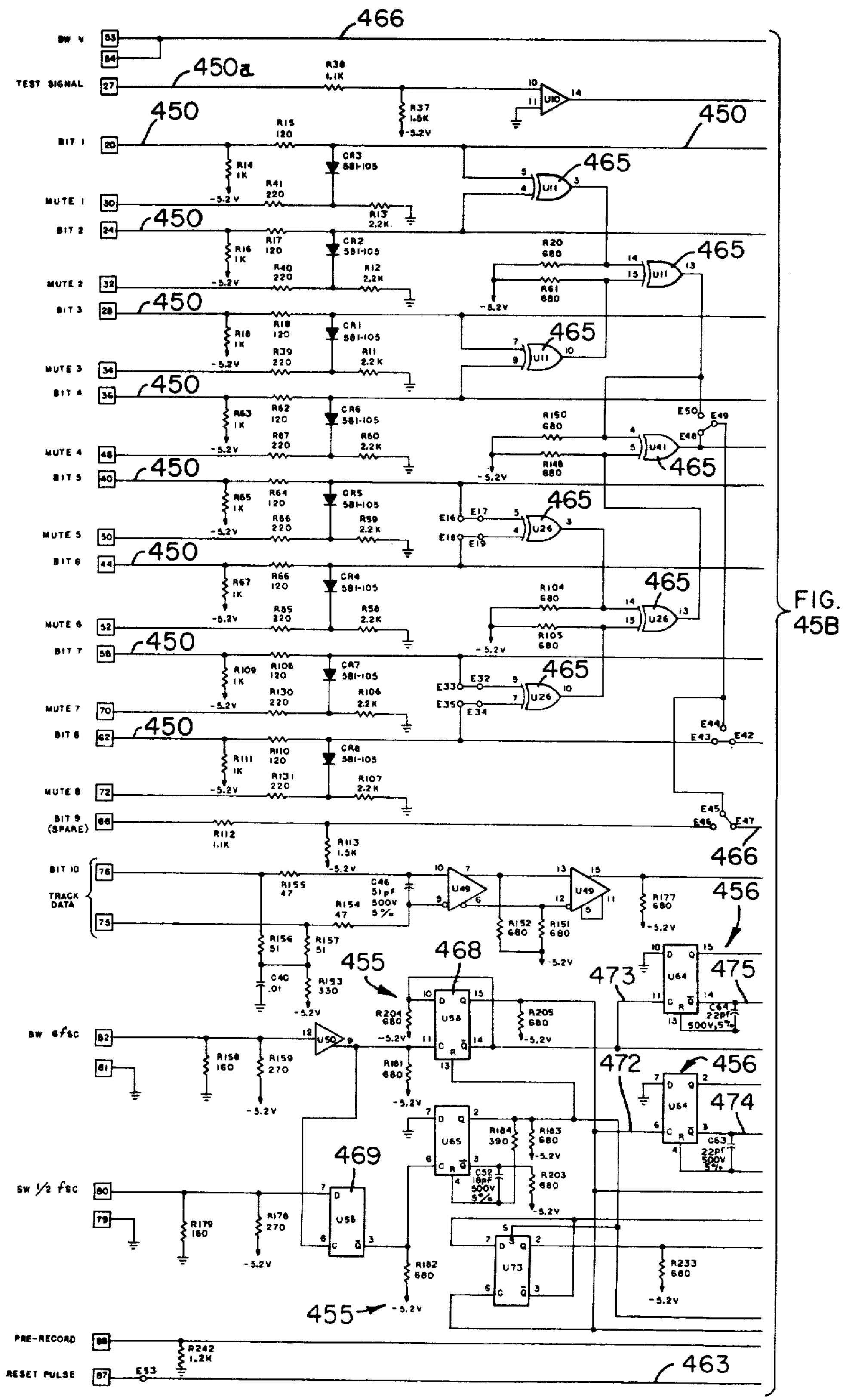
FIG_45A

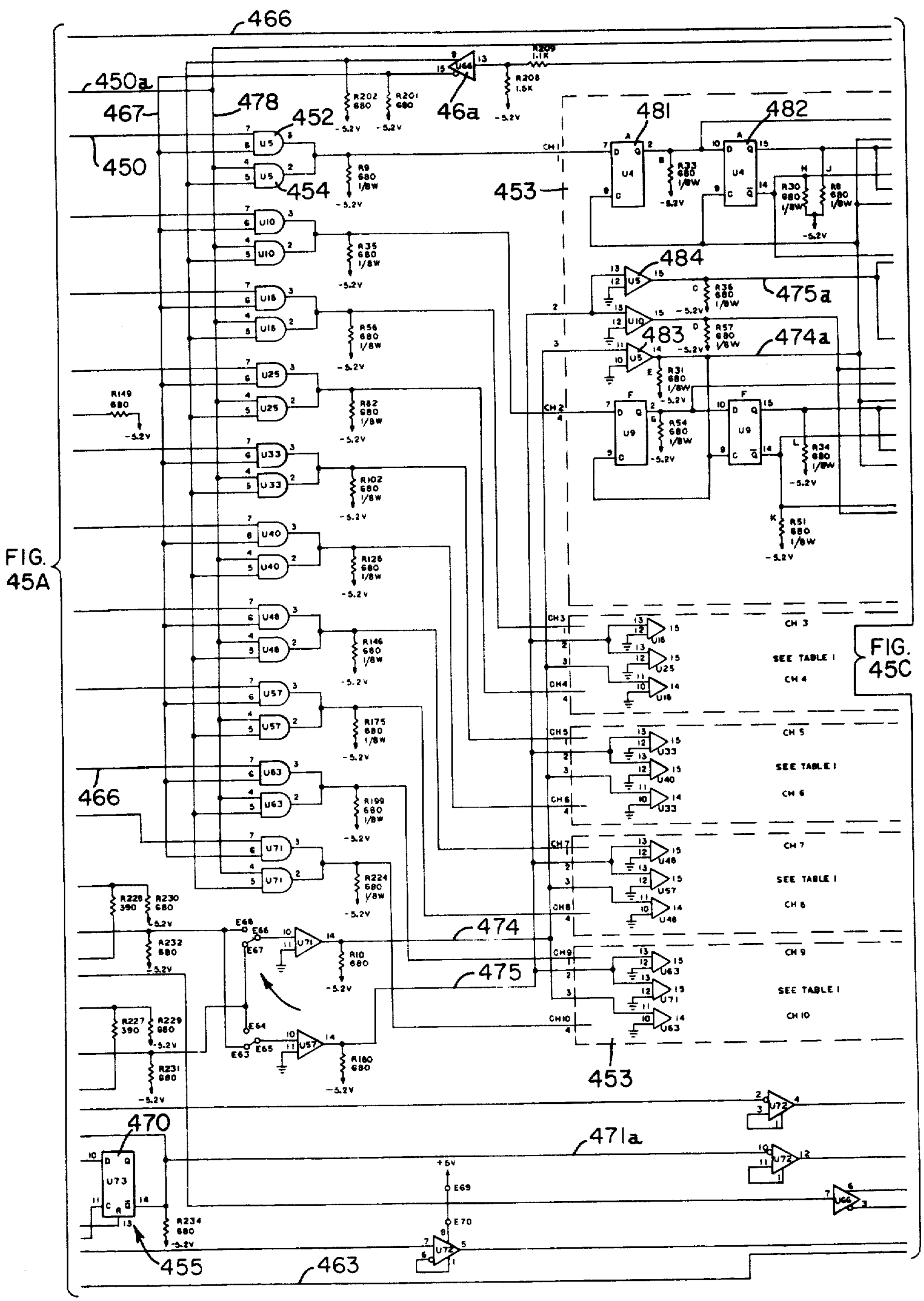
Fig_45B

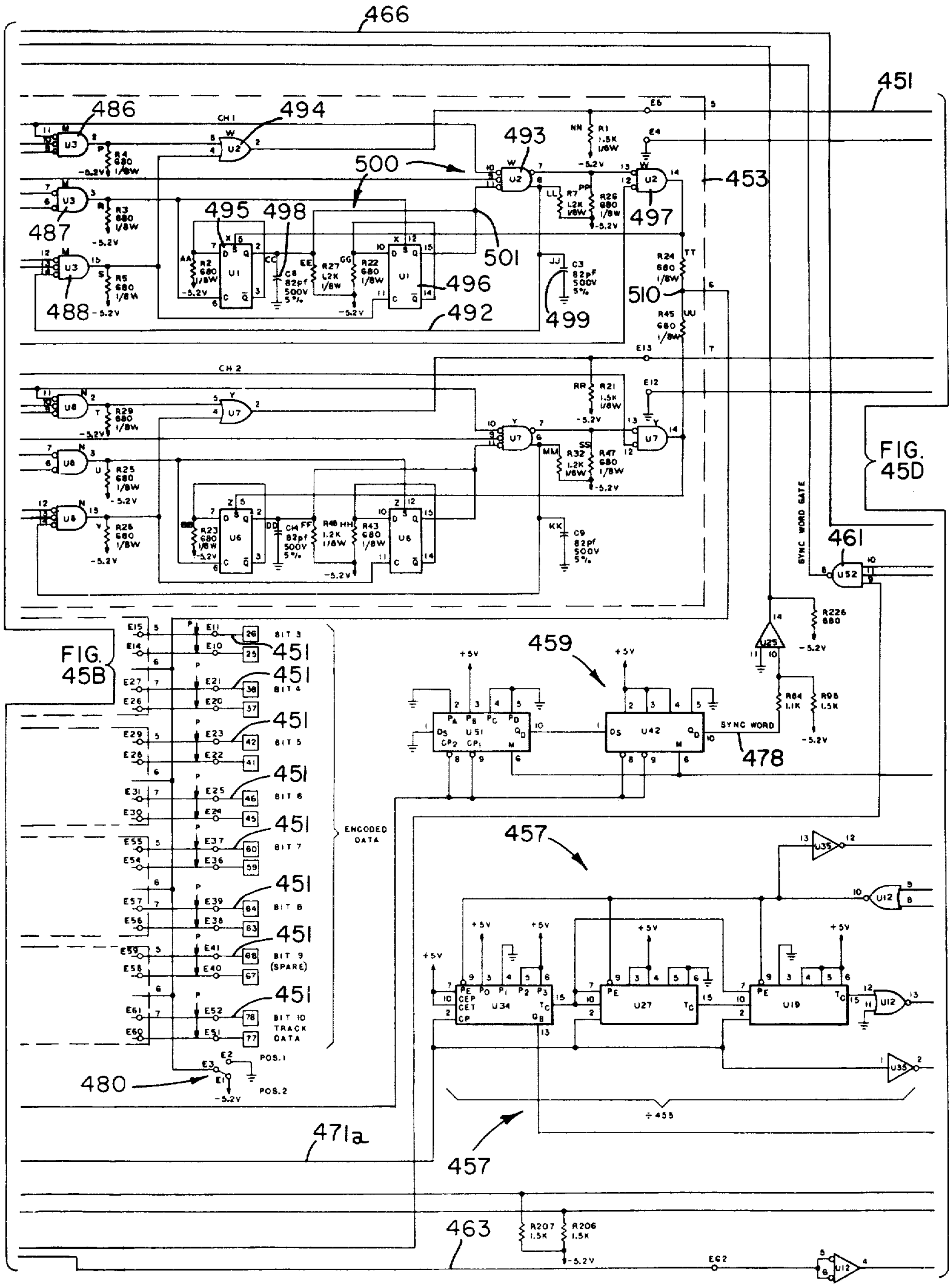
FIG_45C

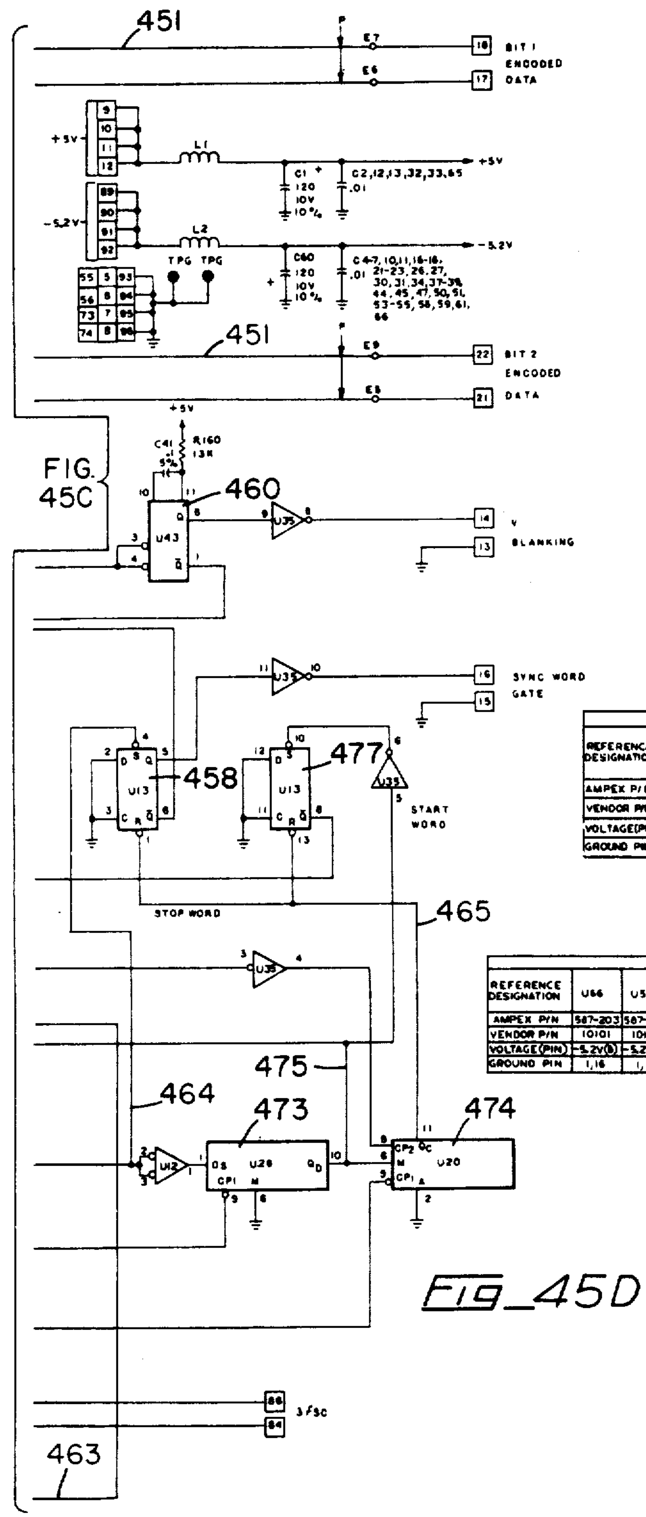

Fig_45D

| TABLE I | | | | | |
|---|---|---|---|---|---|
| COMPONENT | CH 1,2 | CH 3,4 | CH 5,6 | CH 7,8 | CH 9,10 |
| A | U4 | U17 | U32 | U47 | U62 |
| B | R33 | R80 | R126 | R173 | [illegible] |
| C | R36 | R83 | R129 | R176 | [illegible] |
| D | R57 | R103 | R147 | R200 | R240 |
| E | R31 | R78 | R124 | R171 | R220 |
| F | U9 | U24 | U39 | U56 | U70 |
| G | R54 | R100 | R144 | R197 | R241 |
| H | R30 | R77 | R123 | R170 | R218 |
| J | R8 | R55 | R101 | R145 | R196 |
| K | R51 | R97 | R141 | R194 | R239 |
| L | R34 | R81 | R127 | R174 | R223 |
| M | U3 | U16 | U31 | U46 | U61 |
| N | U8 | U23 | U38 | U55 | U69 |
| P | R4 | R50 | R96 | R140 | R193 |
| R | R3 | R46 | R92 | R136 | R189 |
| S | R5 | R49 | R95 | R139 | R192 |
| T | R29 | R76 | R122 | R169 | R218 |
| U | R25 | R72 | R118 | R165 | R214 |
| V | R28 | R75 | R121 | R168 | R217 |
| W | U2 | U15 | U30 | U45 | U60 |
| X | U1 | U14 | U29 | U44 | U59 |
| Y | U7 | U22 | U37 | U54 | U68 |
| Z | U6 | U21 | U36 | U53 | U67 |
| AA | R2 | R44 | R90 | R134 | R187 |
| BB | R23 | R70 | R116 | R163 | R212 |
| CC | C8 | C19 | C28 | C42 | C56 |
| DD | C14 | C24 | C35 | C48 | C62 |
| EE | R27 | R74 | R120 | R167 | R216 |
| FF | R48 | R94 | R138 | R191 | R234 |
| GG | R22 | R69 | R115 | R162 | R211 |
| HH | R43 | R89 | R133 | R186 | R235 |
| JJ | C3 | C15 | C25 | C36 | C49 |
| KK | C9 | C20 | C29 | C43 | C57 |
| LL | R7 | R53 | R99 | R143 | R196 |
| MM | R32 | R79 | R125 | R172 | R221 |
| NN | R1 | R42 | R88 | R132 | R185 |
| PP | R26 | R73 | R119 | R166 | R215 |
| RR | R21 | R68 | R114 | R161 | R210 |
| SS | R47 | R93 | R137 | R190 | R237 |
| TT | R24 | R71 | R117 | R164 | R213 |
| UU | R45 | R91 | R135 | R188 | R236 |

| INTEGRATED CIRCUIT LIST | | | | | | | | |
|---|---|---|---|---|---|---|---|---|
| REFERENCE DESIGNATION | U52 | U13 | U12 | U35 | U20,28, 42,51. | U43 | U19,27, 34 | U1,4,6,9,14,17,21, 24,29,32,36, 39,44,47,53,56, 58,59,62,64,65, 67,70,73 |
| AMPEX P/N | 586076 | 586-108 | 586-109 | 586-326 | 586-407 | 586-533 | 586-952 | 587-139 |
| VENDOR P/N | 7410 | 7474 | 7402 | 7404 | 7495 | 74121 | 9316 | 10131 |
| VOLTAGE(PIN) | +5V(14) | +5V(14) | +5V(14) | +5V(14) | +5V(14) | +5V(14) | +5V(16) | -5.2V (8) |
| GROUND PIN | 7 | 7 | 7 | 7 | 7 | 7 | 8 | 1,16 |

NOTES: UNLESS OTHERWISE SPECIFIED.

1. RESISTANCE VALUES ARE IN OHMS, 1/4W, 5%.
2. CAPACITANCE VALUES ARE IN MICROFARADS, 50V.
3. SCHEMATIC REFLECTS PWA 1403332-01, REVISION "A"

| INTEGRATED CIRCUIT LIST | | | | | | | | |
|---|---|---|---|---|---|---|---|---|
| REFERENCE DESIGNATION | U66 | U50 | U11, 26, 41 | U3,8,16,23,31, 38, 46, 55, 61, 69 | U5, 10, 18, 25, 33, 40, 48, 57, 63, 71 | U2, 7, 15, 22, 30, 37, 45, 54, 60, 68 | U49 | U72 |
| AMPEX P/N | 587-203 | 587-205 | 587-747 | 587-324 | 587-549 | 587-703 | 587-704 | 587-285 |
| VENDOR P/N | 10101 | 10102 | 10107 | 10106 | 10104 | 10105 | 10116 | 10125 |
| VOLTAGE(PIN) | -5.2V(8) | -5.2V(8) | -5.2V(8) | -5.2V (8) | -5.2V (8) | -5.2V (8) | -5.2V(8) | -5.2V(8)+5V(9) |
| GROUND PIN | 1,16 | 1,16 | 1,16 | 1,16 | 1,16 | 1,16 | 1,16 | 16 |

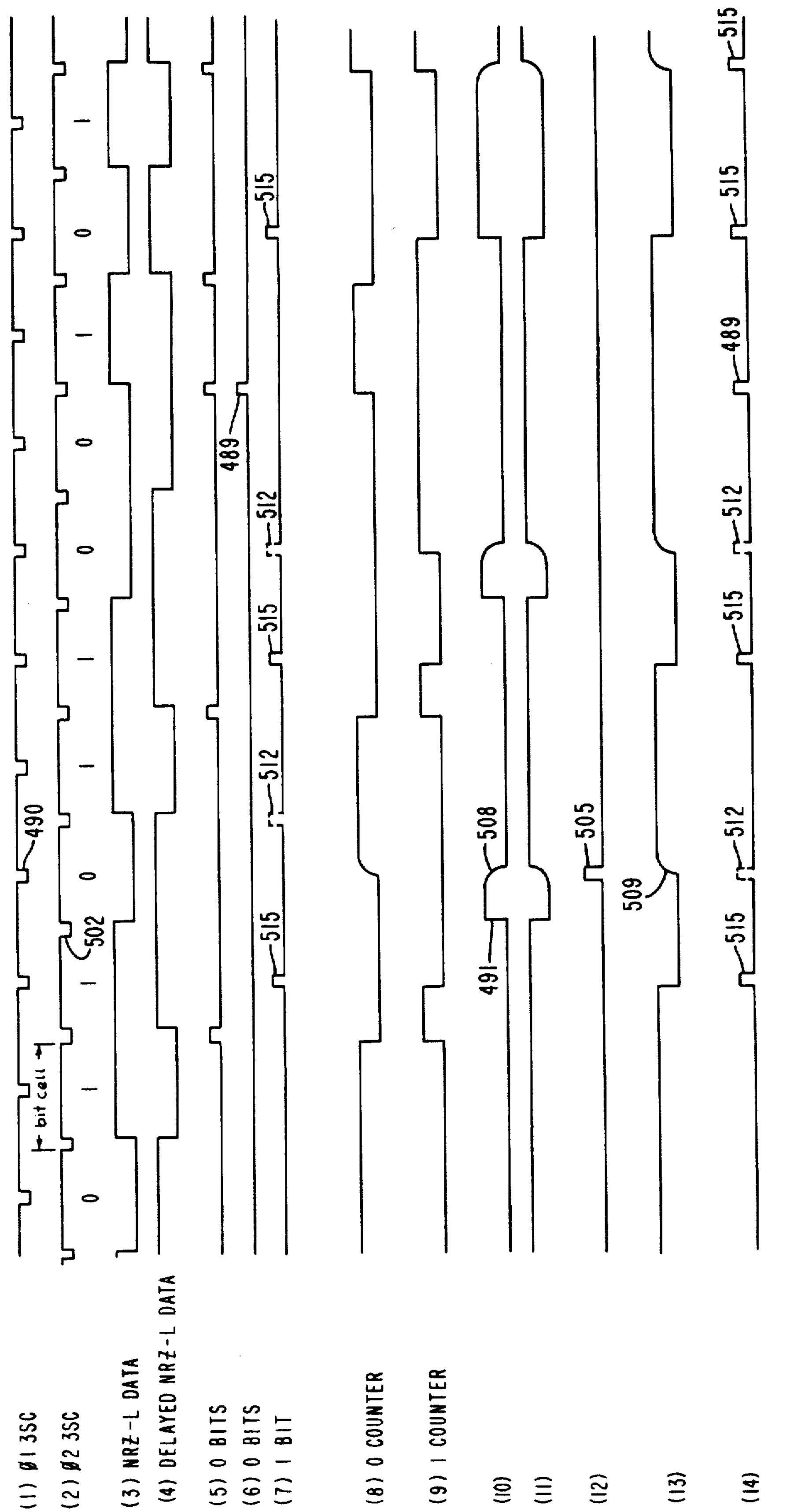
FIG_45E

FIG_46A

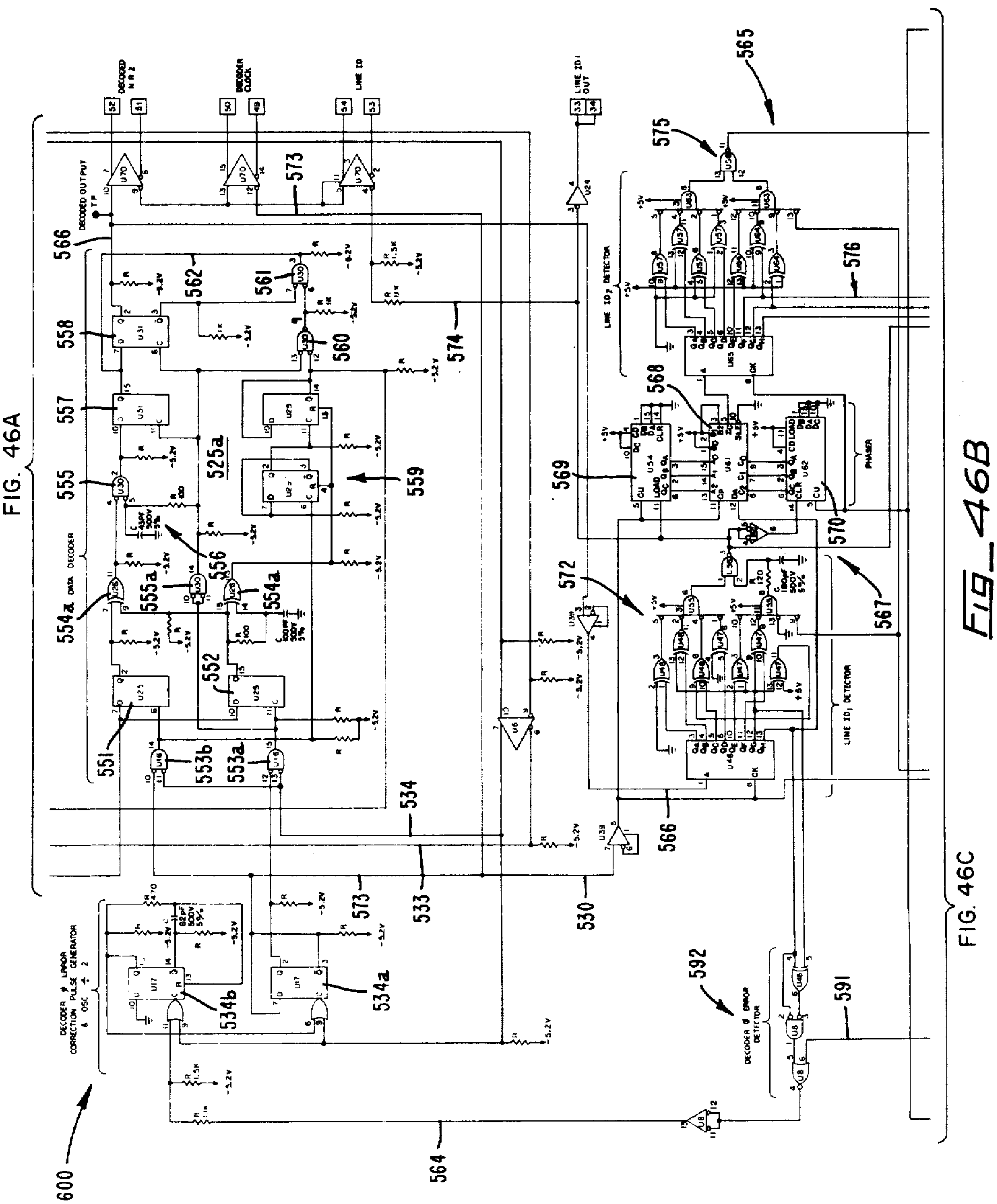
FIG_46B

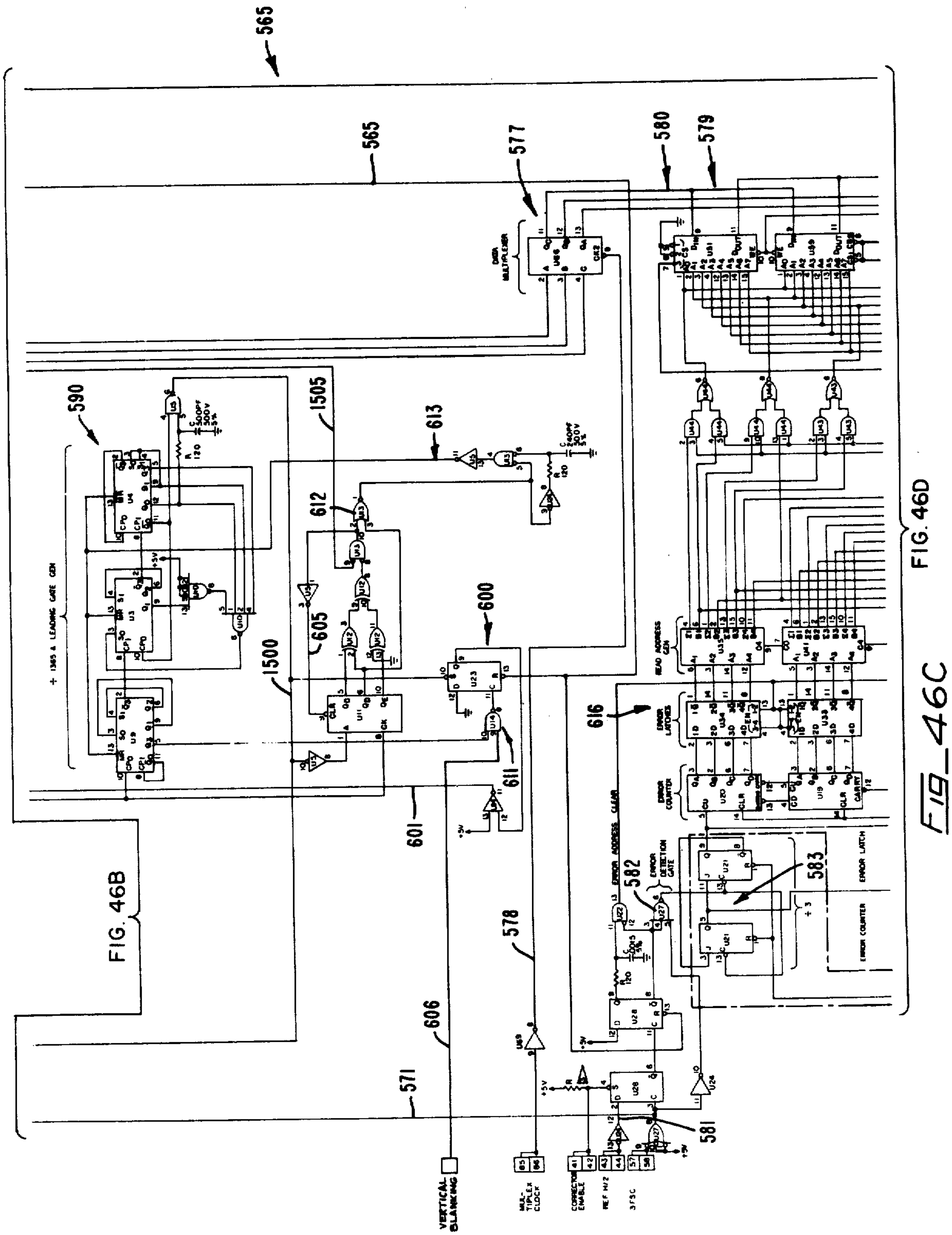
FIG_46C

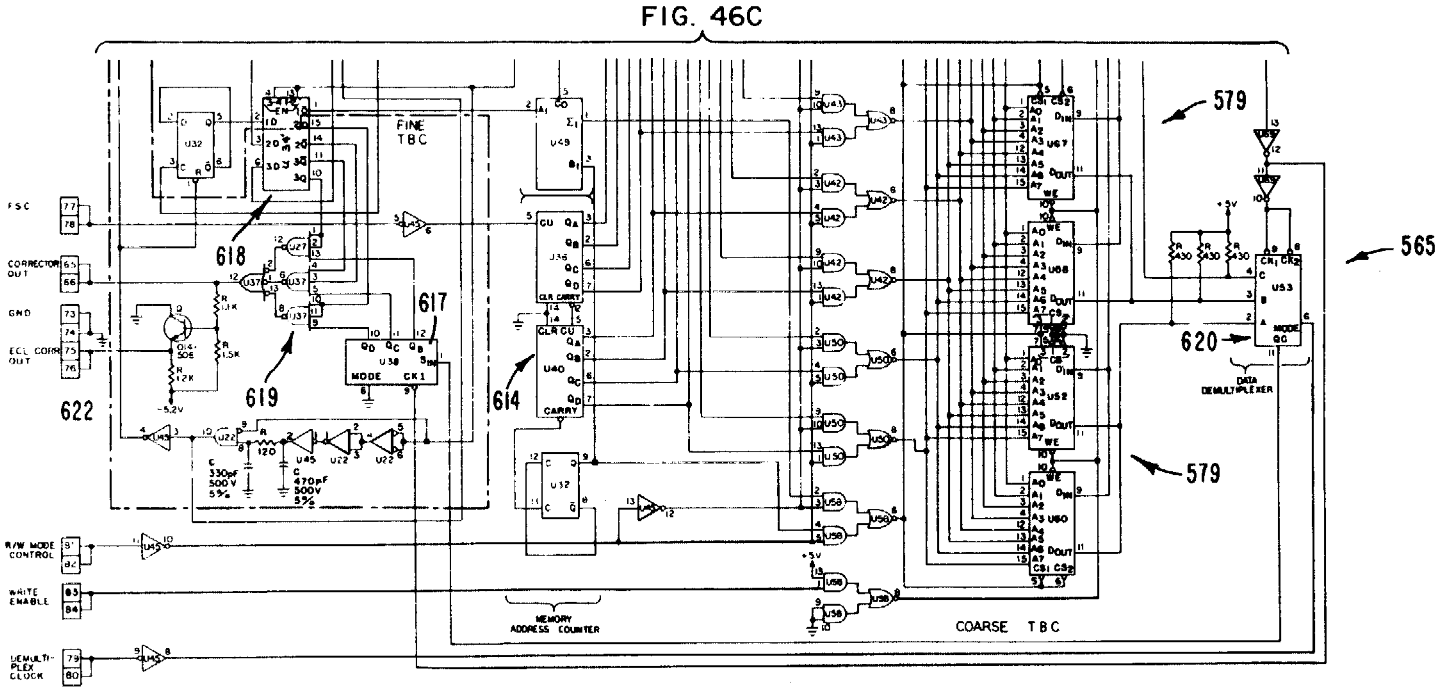
I. C. LIST
| | | | | | | | | | | | | | | | |
|---|---|---|---|---|---|---|---|---|---|---|---|---|---|---|---|
| REF DES | U14,56 | U10 | U23,32 | U13,8 | U42-44,50,58 | U24 | U18,33,34,39 | U36,48,53 | U49 | U69 | U12,47,[illegible] | U5 | U45 | U27,37 | U22 |
| AMPEX P/N | 586-075 | 586-077 | 586-108 | 586-109 | 586-287 | 586-326 | 586-445 | 586-497 | 586-550 | 586-[illegible] | 586-705 | 586-830 | 586-831 | 587-018 | 586-277 |
| VENDOR P/N | 7400 | 7420 | 7474 | 7402 | 74H51 | 7404 | 7475 | 7495 | 7482 | 74104 | 7486 | 74S00 | 74S04 | 74S10 | 74S02 |
| VOLTAGE(PIN) | +5V(14) | +5V(14) | +5V(14) | +5V(14) | +5V(14) | +5V(14) | +5V(5) | +5V(14) | +5V(4) | +5V(14) | +5V(14) | +5V(14) | +5V(14) | +5V(14) | +5V(14) |
| GROUND PIN | 7 | 7 | 7 | 7 | 7 | 7 | 12 | 7 | 11 | 7 | 7 | 7 | 7 | 7 | 7 |
| REF DES | U21 | U11,46,65 | U35,41 | U3,4,9 | U61 | [illegible] | U55,63 | U39 | U2,6,70 | U7,15,17,25,29,31 | U26 | U16,30 | U1 | U28 | [illegible] |
| AMPEX P/N | 587-710 | 586-450 | 587-495 | 587-007 | 589-127 | 587-040 | 587-051 | 587-285 | 587-704 | 587-139 | 587-747 | 587-205 | 589-129 | 586-700 | 586-800 |
| VENDOR P/N | 74S114 | 74164 | 74283 | 9305 | 9338 | 9340 | 7425 | 10125 | 10116 | 10131 | 10107 | 10102 | CA3102 | 74H74 | 74193 |
| VOLTAGE(PIN) | +5V(14) | +5V(14) | +5V(16) | +5V(14) | +5V(16) | +5V(16) | +5V(14) | +5V(9) -5.2V(8) | -5.2V(8) | -5.2V(8) | -5.2V(8) | -5.2V(8) | | +5V(14) | +5V(16) |
| GROUND PIN | 7 | 7 | 8 | 7 | 8 | 8 | 7 | 16 | 1,16 | 1,16 | 1,16 | 1,16 | | 7 | 8 |
FIG_46D

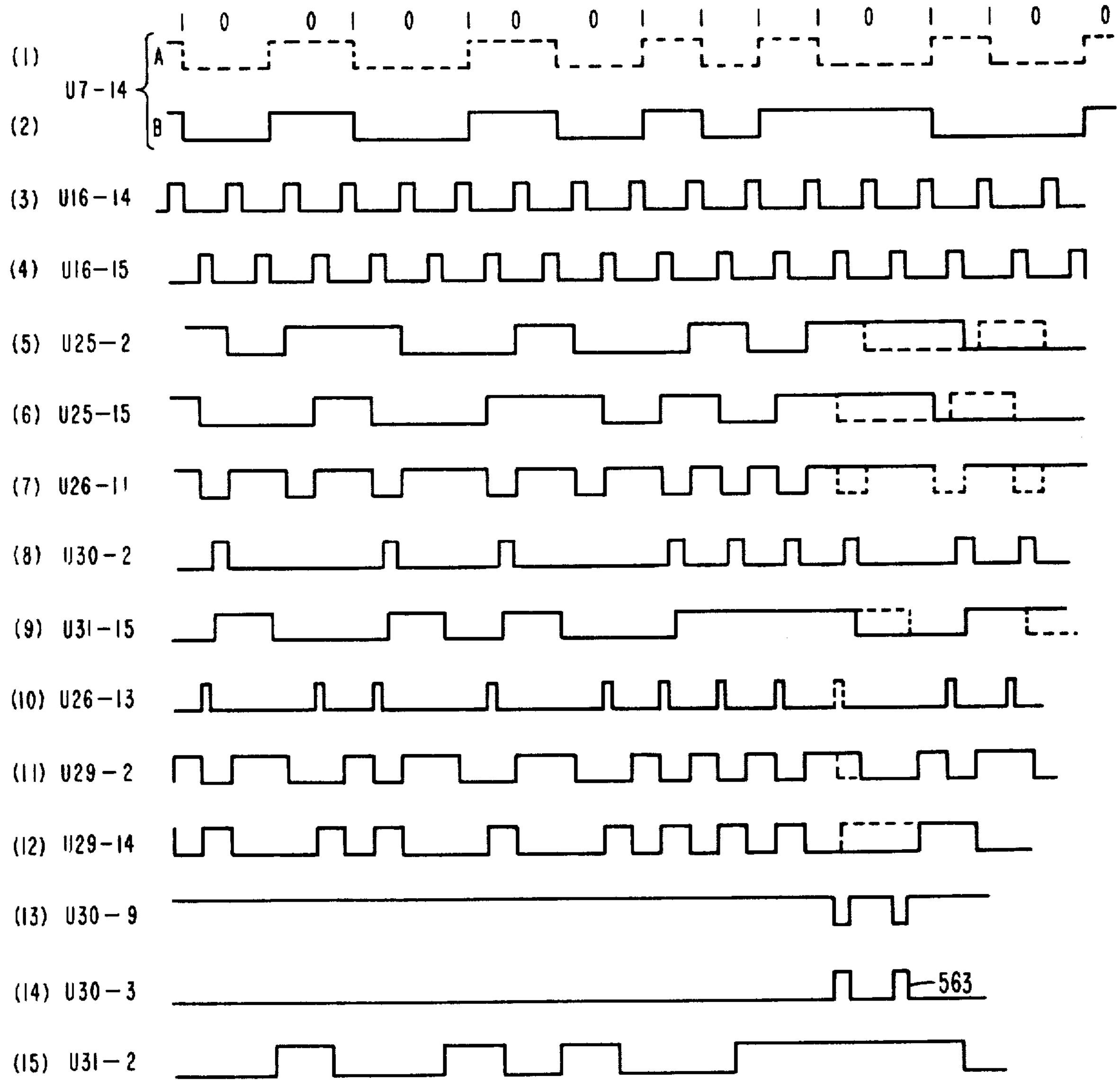
FIG_46E

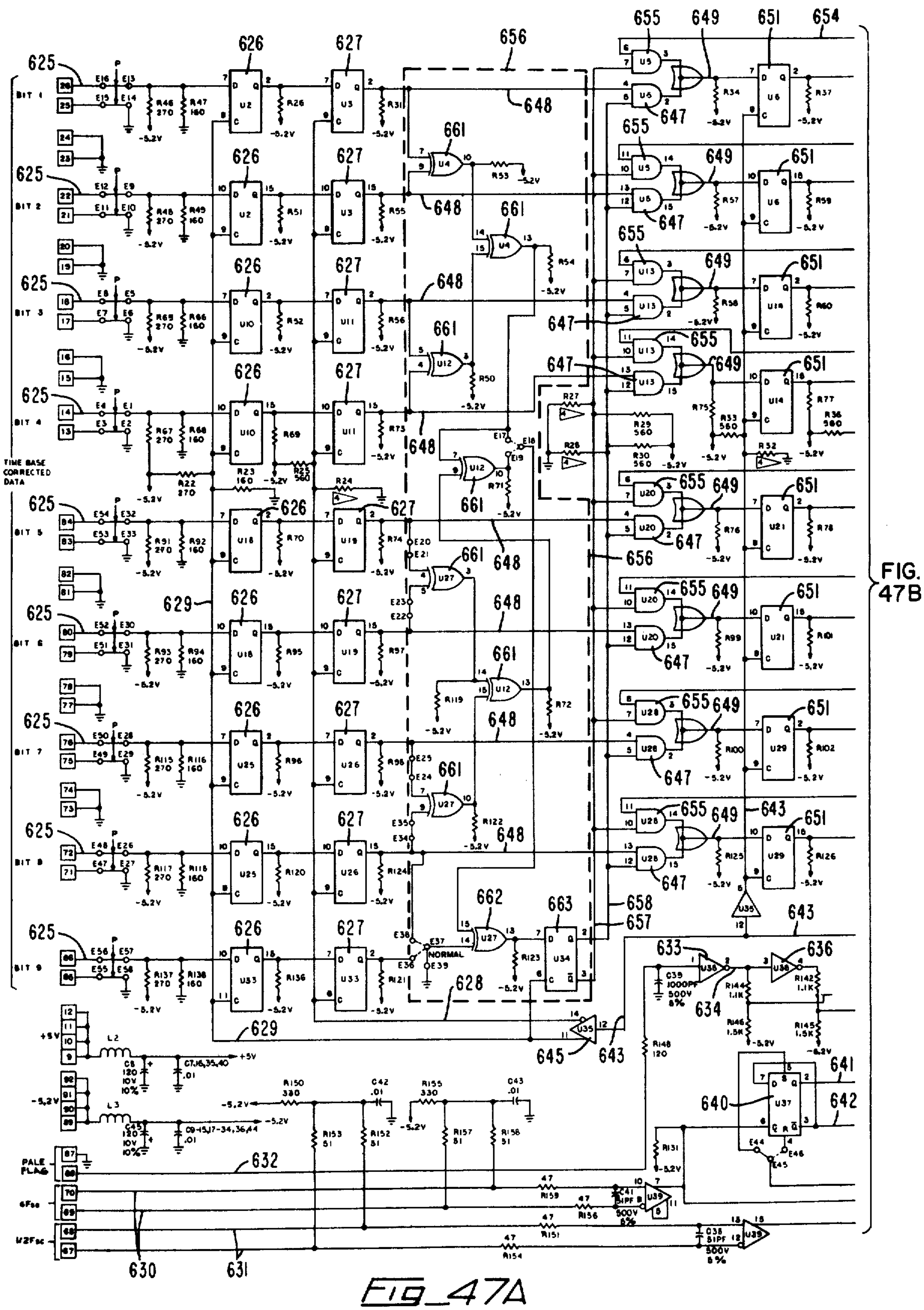
FIG_47A

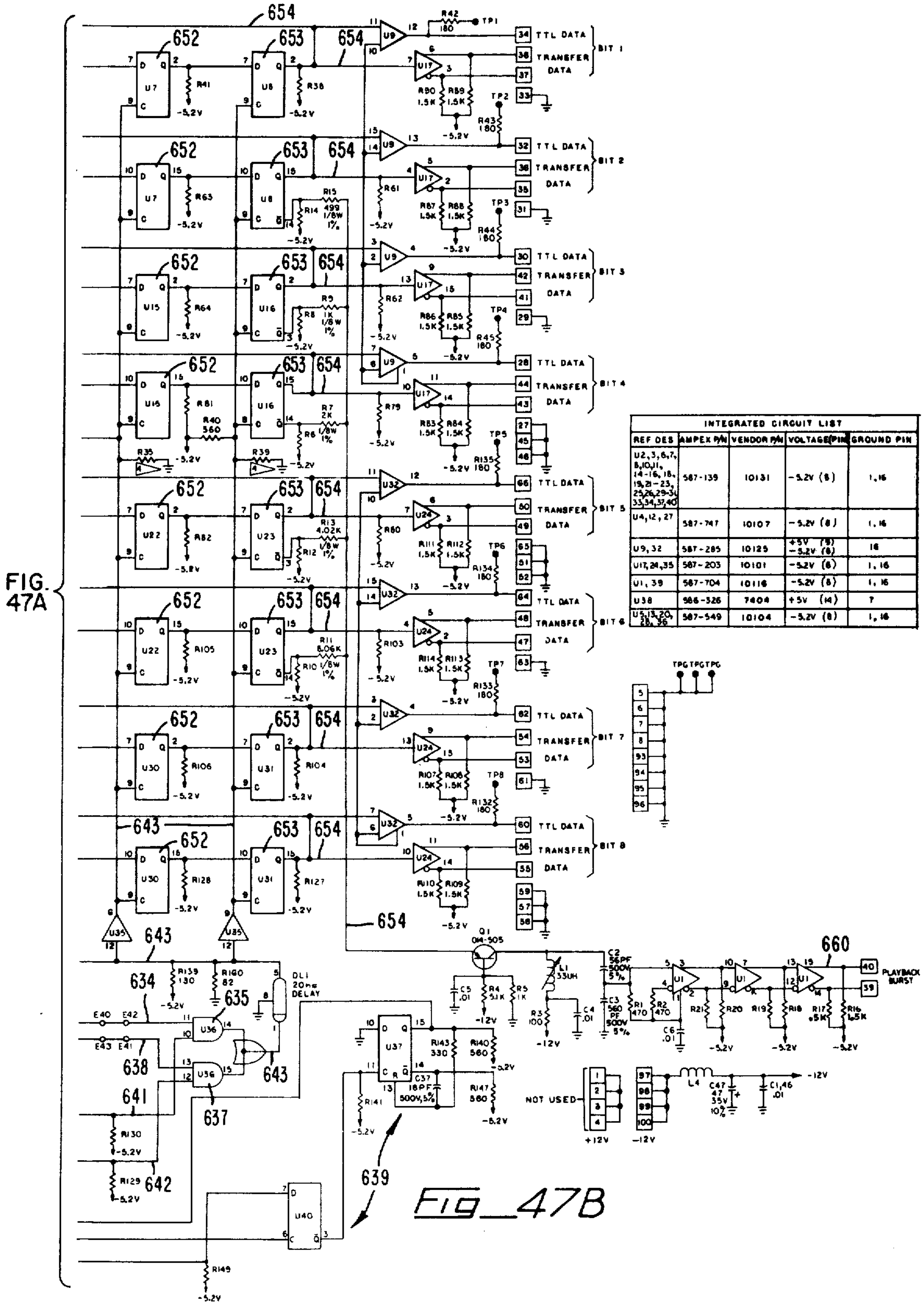
| INTEGRATED CIRCUIT LIST | | | | |
|---|---|---|---|---|
| REF DES | AMPEX P/N | VENDOR P/N | VOLTAGE(PIN) | GROUND PIN |
| U2,3,6,7, 8,10,11, 14-16, 18, 19,21-23, 25,26,29-31, 33,34,37,40 | 587-139 | 10131 | -5.2V (8) | 1,16 |
| U4,12,27 | 587-747 | 10107 | -5.2V (8) | 1,16 |
| U9,32 | 587-285 | 10125 | +5V (9) -5.2V (8) | 16 |
| U17,24,35 | 587-203 | 10101 | -5.2V (8) | 1,16 |
| U1,39 | 587-704 | 10116 | -5.2V (8) | 1,16 |
| U38 | 586-326 | 7404 | +5V (14) | 7 |
| U5,13,20, 28,36 | 587-549 | 10104 | -5.2V (8) | 1,16 |
Fig_47B

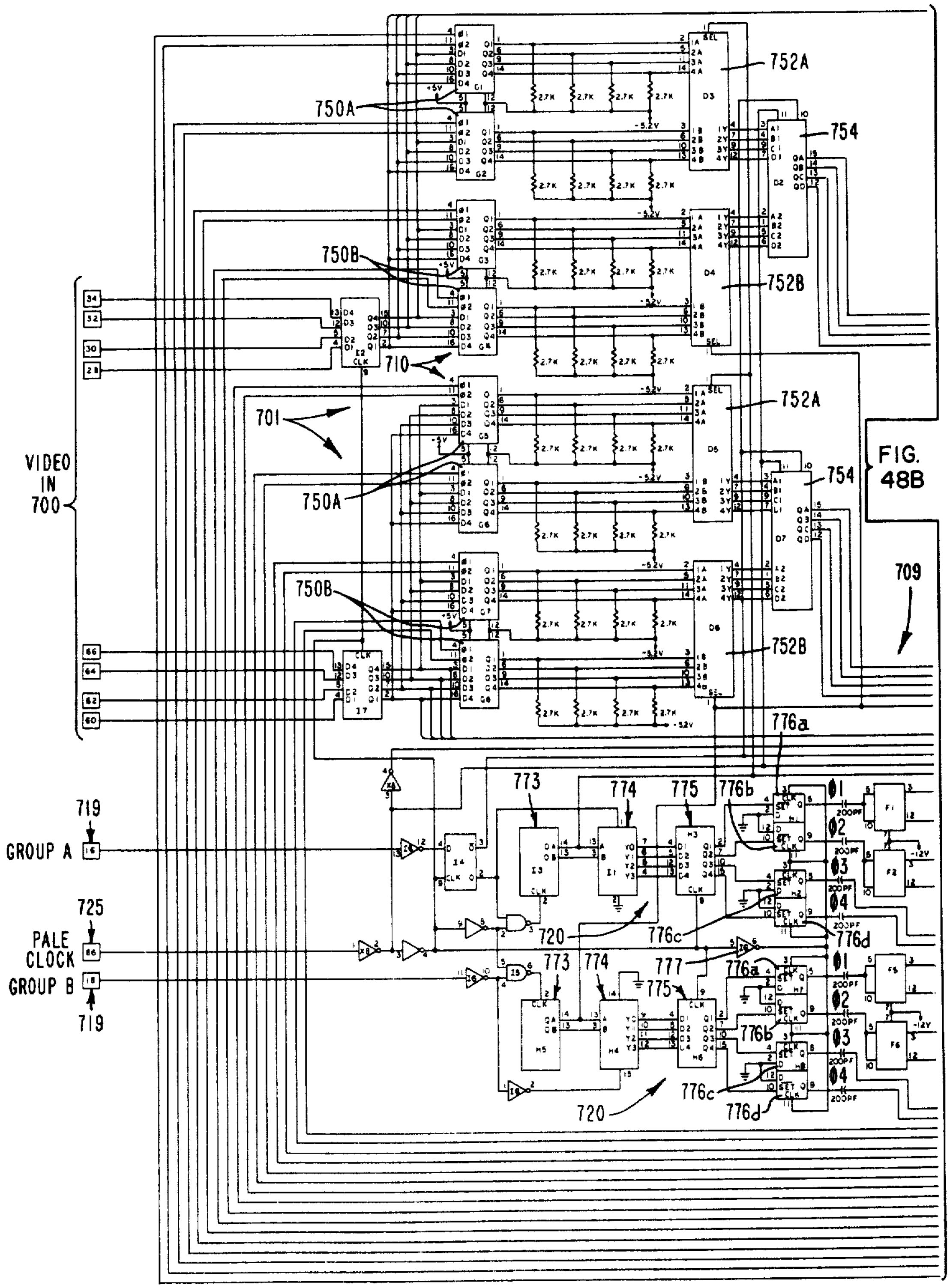
FIG_48A

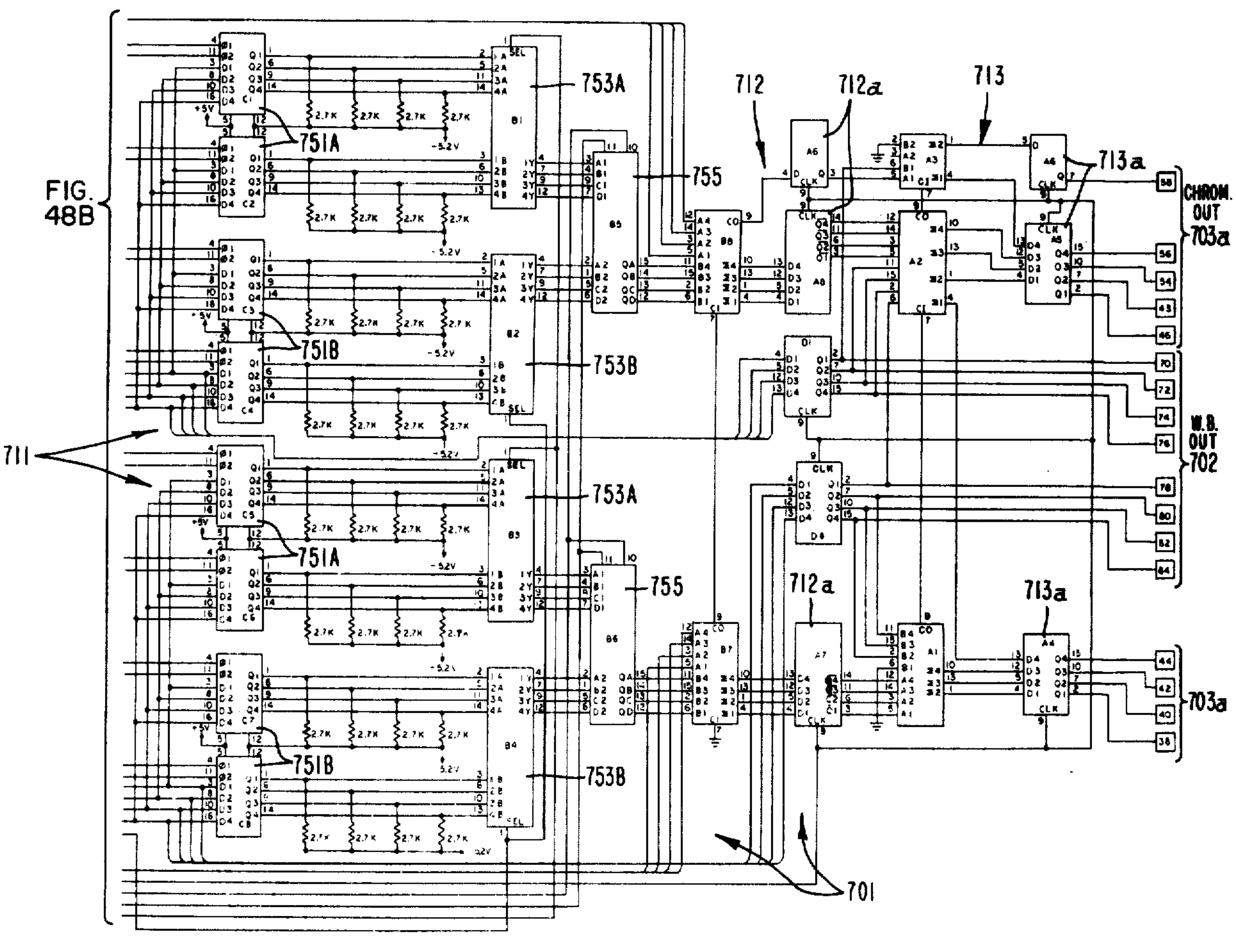
| REFERENCE DESIGNATION | A4,5,6,7,8,D1,8 H3,H6,I2,I7 | I6 X8 | I5 | I3, H5 | I4, H4 | H1,2,7,8 | B5,B6 D2,D7 | F1,2,3,4, 5,6,7,8 | A1,2,3, B7,B8 | B1,2,3,4, D3,4,5,6 | C1,2,3,4,5,6,7,8, G1,2,3,4,5,6,7,8 |
|---|---|---|---|---|---|---|---|---|---|---|---|
| AMPEX P/N | 587-152 | 586-831 | 586-850 | 589-007 | 587-814 | 587-875 | 587-901 | 589-128 | 587-814 | 587-760 | 587-052 |
| VENDOR P/N | 74S175N | 74S04 | 74S00 | 74S163 | 74S155 | 74LS74 | 74LS155 | 0026CL | 74LS283 | 74LS157 | 25028 |
| VOLTAGE PIN | 16 | 14 | 14 | 16 | 16 | 14 | 16 | 7,14 | 16 | 16 | 5,12 |
| GROUND PIN | 8 | 7 | 7 | 8 | 8 | 7 | 8 | — | 8 | 8 | — |
FIG_48C

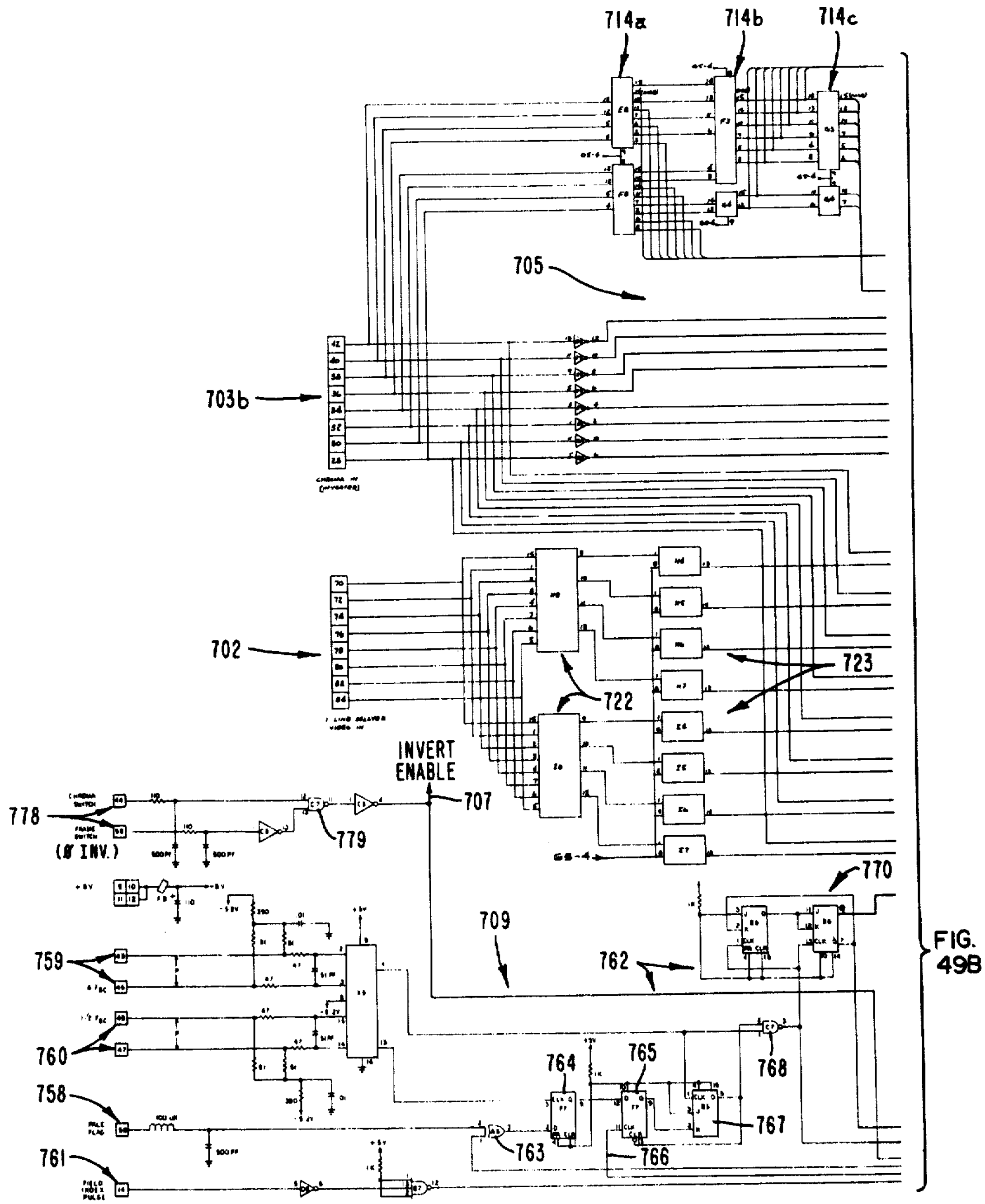
| REFERENCE DESIGNATION | C7 | F7 | A5 | 16, G5, C8 | [illegible] | H5 | [illegible] | [illegible] | [illegible] | [illegible] |
|---|---|---|---|---|---|---|---|---|---|---|
| AMPEX PART NO | 586-530 | 587-088 | 586-706 | 586-531 | 586-575 | 587-158 | 587-192 | 587-200 | 587-514 | 588-007 |
| VENDOR PART NO | 7400N | 74S74N | 7486N | 7404N | 74S112N | MC10125L | 74S175N | 74S153N | 74LS253N | 74S163N |
| VOLTAGE PINS | 14 | 14 | 14 | 14 | 16 | 9,8 | 16 | 16 | 16 | 16 |
| GROUND PIN | 7 | 7 | 7 | 7 | 8 | 16 | 8 | 8 | 8 | 8 |
FIG_49A NOTE:
1) ALL LS164s HAVE PINS 2 AND 9 TIED HIGH
2) CONTENTS OF .575 PROM = .575 × 2'S COMPLEMENT OF ADDRESS
3) CONTENTS OF .096 PROM = .096 × 2'S COMPLEMENT OF ADDRESS
4) CONTENTS OF 27/32 PROM = 27/32 OF ADDRESS
5) ⟵ IS A LINE TIED HIGH
| | |
|---|---|
| 74LS164 | H4, H5, H6, H7, I4, I5, I6, I7 |
| 74S175 | E8, F8, C5, D5, C3, D3, E1, E2, C1, C2, A2, B2, A4, A5, H2, H3 |
| 74S04 | E5, G5 |
| 74LS283 | E3, E4, A1, B1, F1, F2, B4, B5, I2, I3 |
| 74LS174 | F3, G3, G4, I1, H1, G1, G2 |
| 6301-1 | C4, D4, D1, D2, H8, I8 |
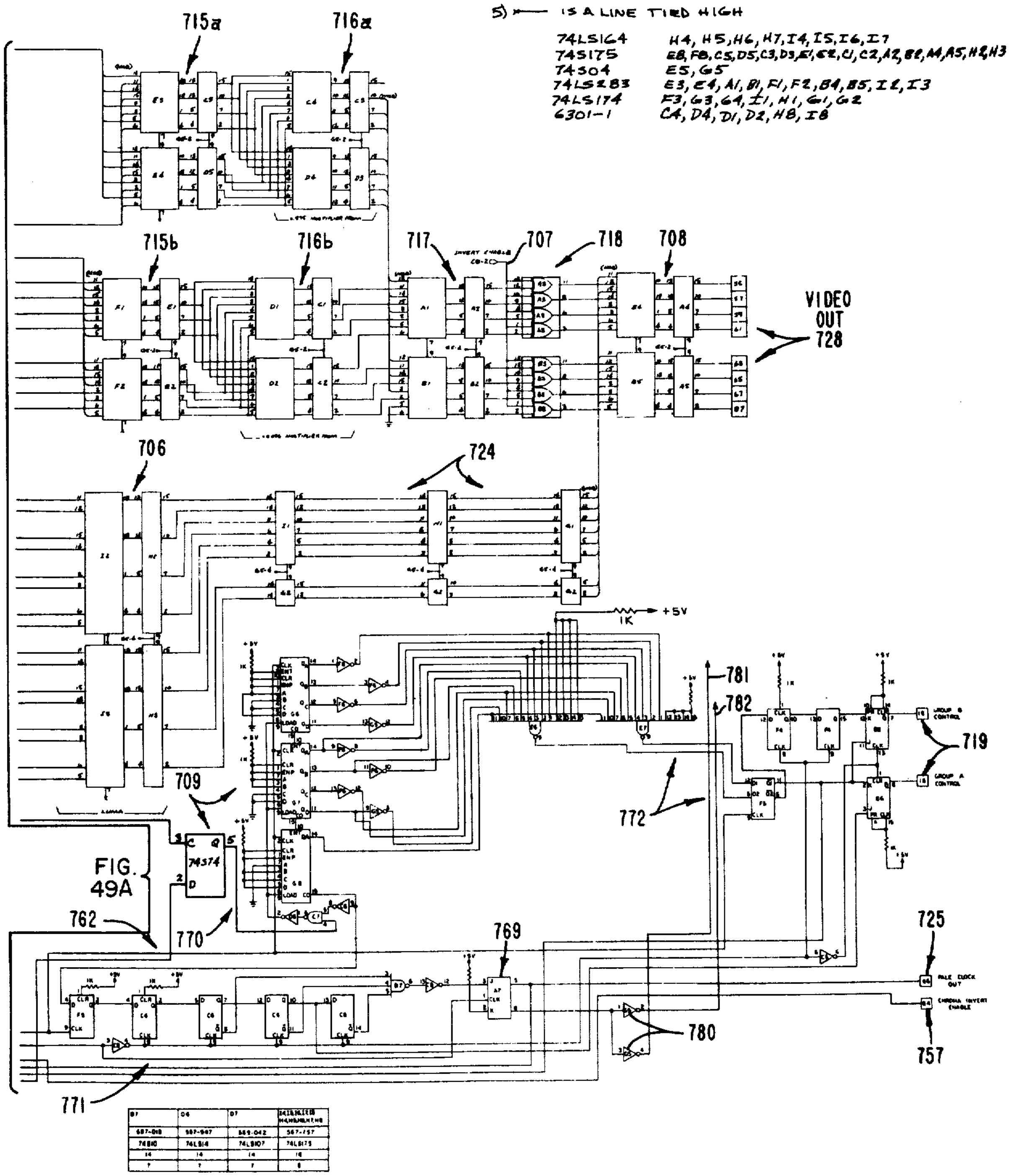
| B7 | C6 | D7 | I4,I5,I6,I7,I8 H4,H5,H6,H7,H8 |
|---|---|---|---|
| 687-018 | 587-947 | 589-042 | 587-157 |
| 74S10 | 74LS14 | 74LS107 | 74LS175 |
| 14 | 14 | 14 | 16 |
| 7 | 7 | 7 | 8 |
FIG_49B

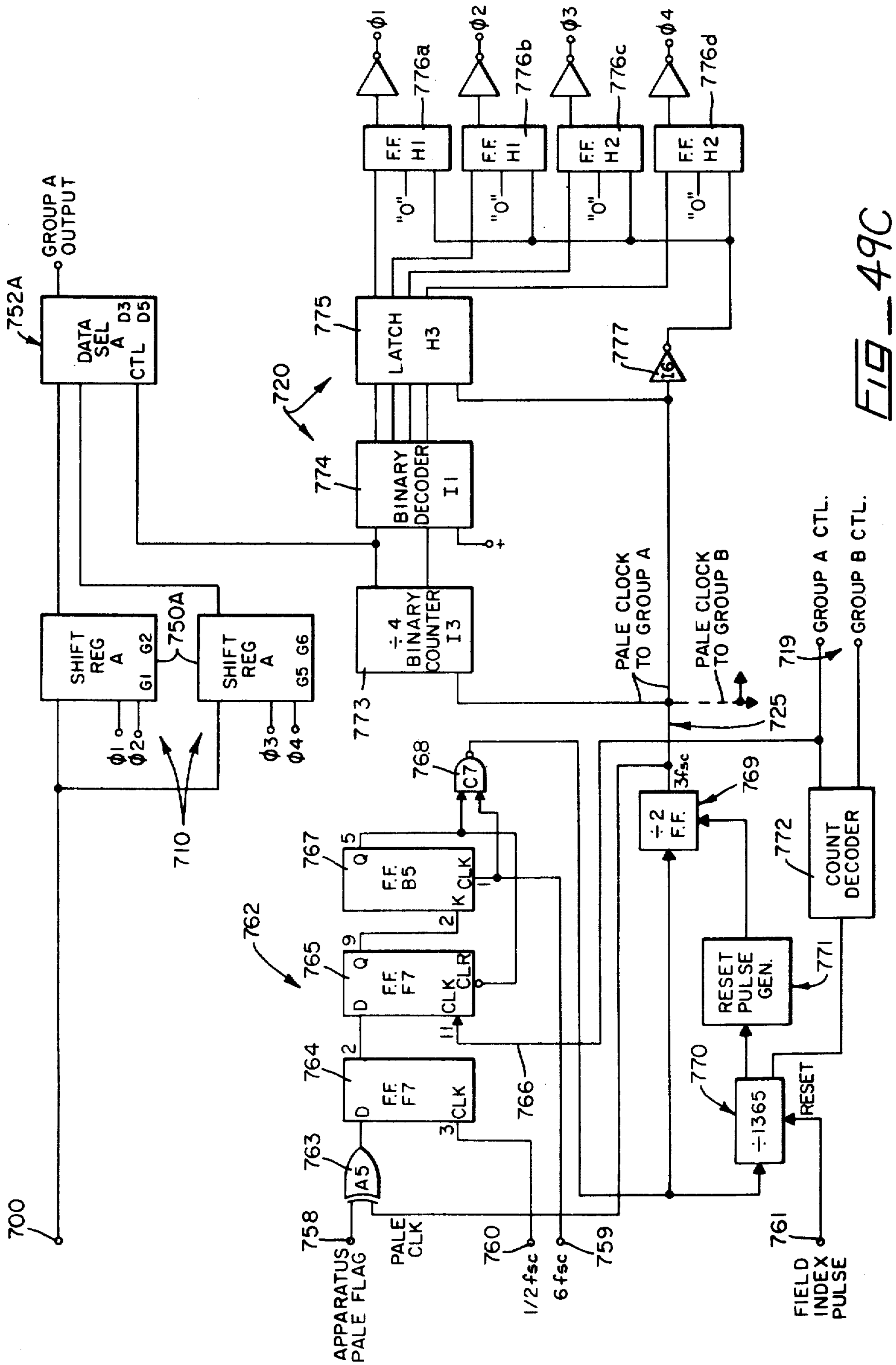
FIG_49C

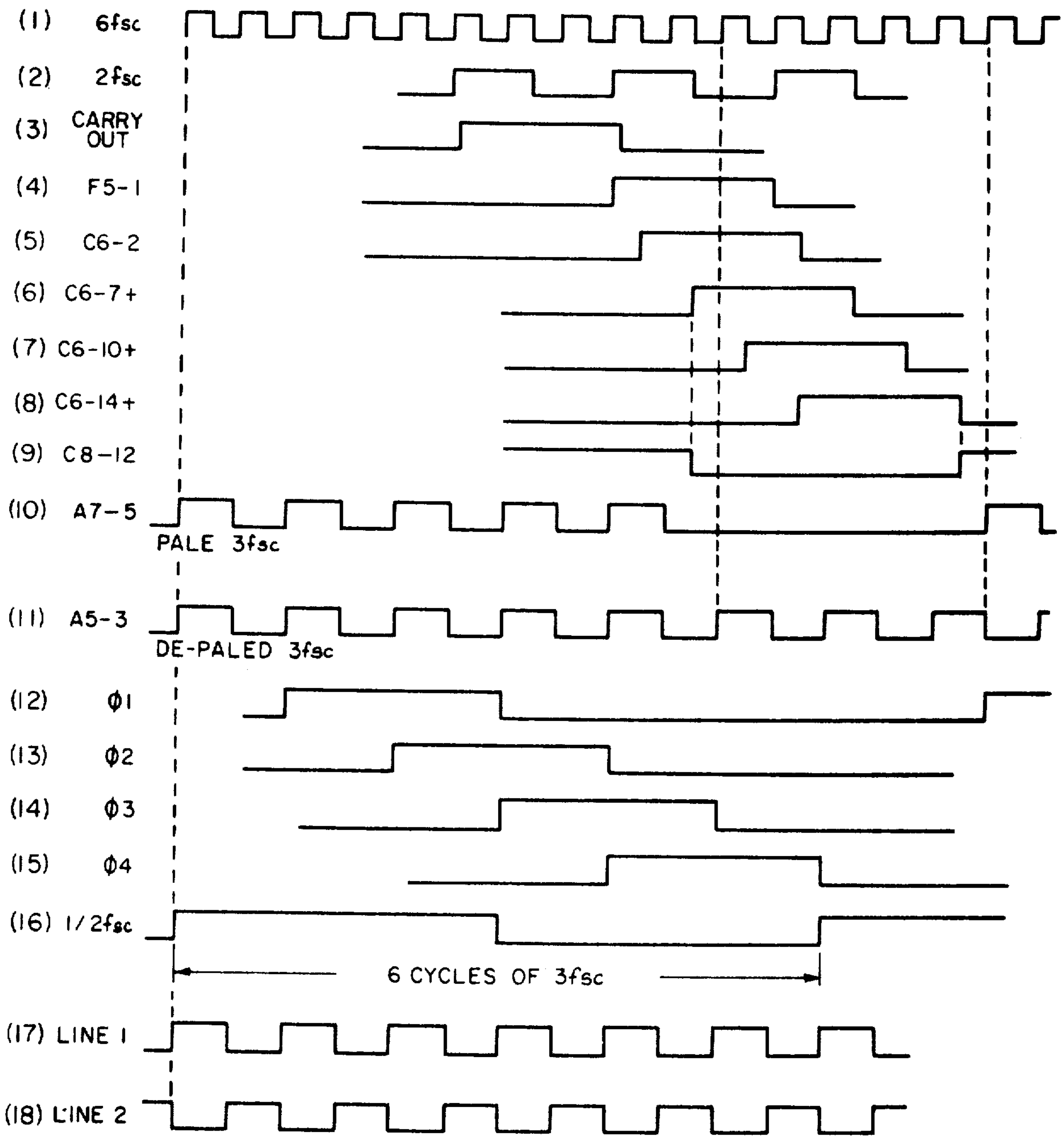
FIG_49D

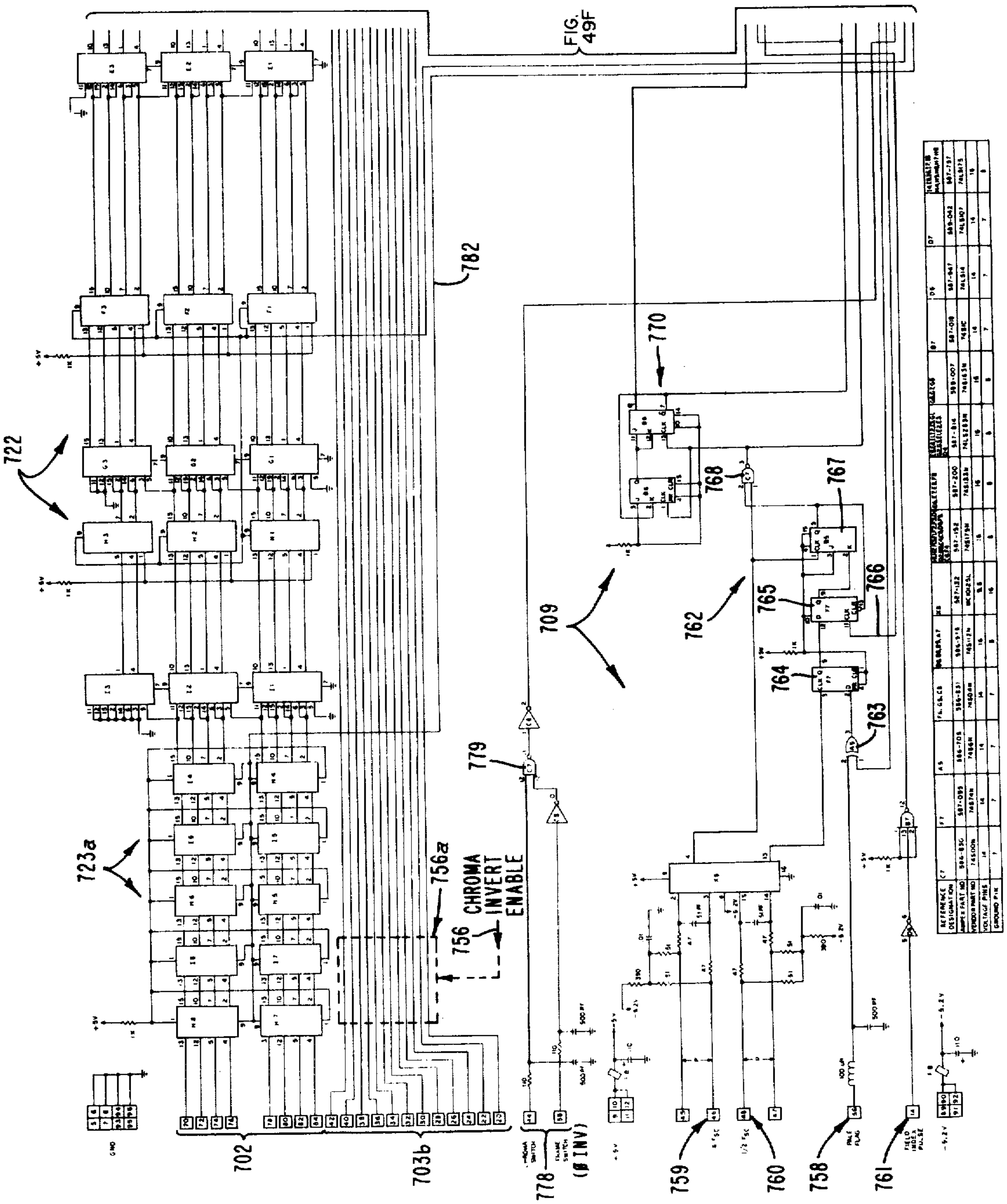
FIG_49E

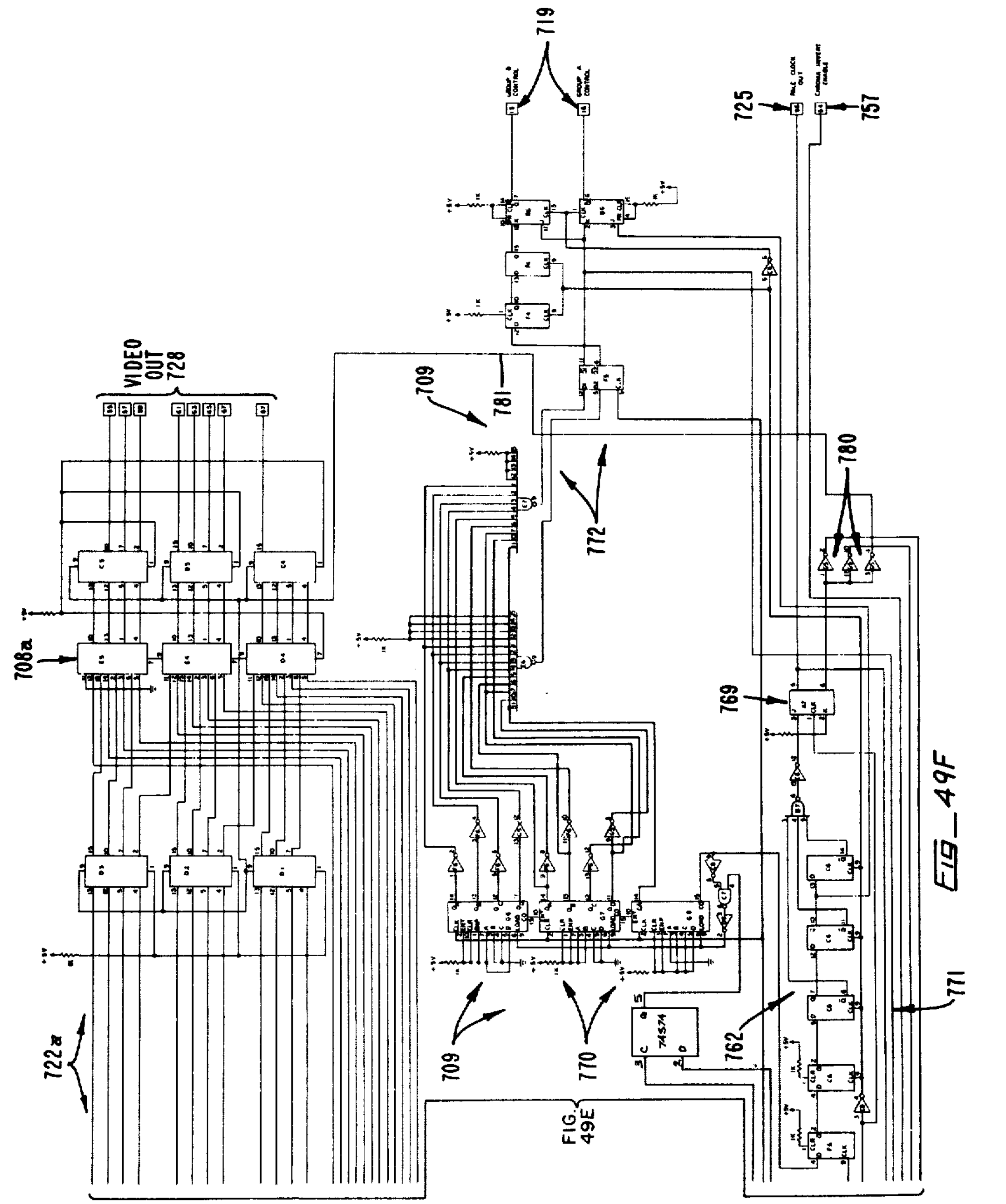
FIG_49F

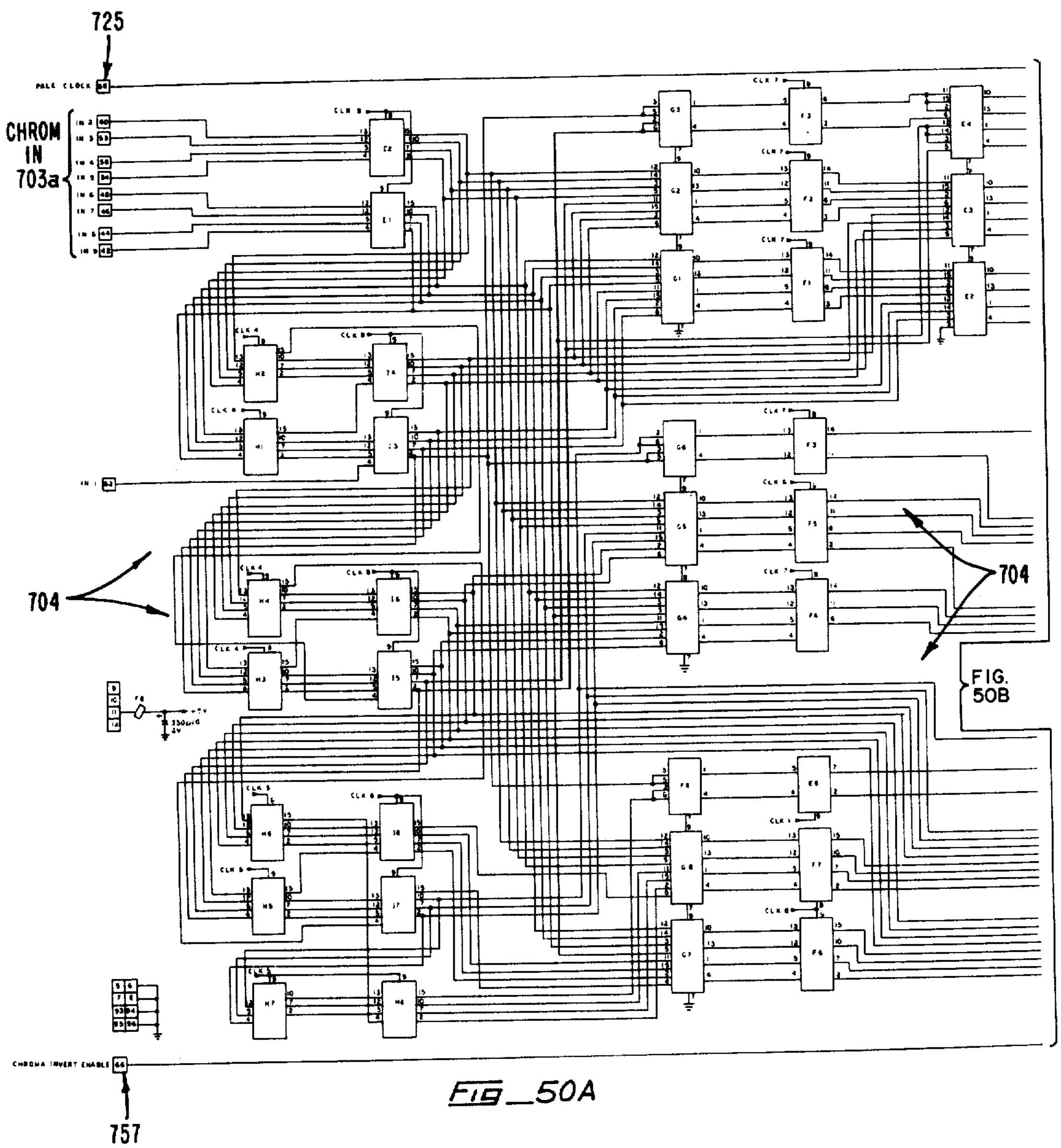
FIG_50A

| AMPEX P/N | VENDOR P/N | VCC | GND | REF. DESIGNATION |
|---|---|---|---|---|
| 587-152 | 74S175 | 16 | 8 | F1, F2, F3, F4, F5, F6, F7, E8, D3, D4, D5, C2, C3, C4, D6, D7, D8, B6, B7, B8, B1, B2, B3 |
| 587-757 | 74LS175 | 16 | 8 | I1, I2, I3, I4, I5, I6, I7, I8, H1, H2, H3, H4, H5, H6, H7, H8, |
| 587-814 | 74LS283 | 16 | 8 | G1, G2, G3, G4, G5, G6, G7, G8, E3, E4, E2, F8, C1, D1, D2, E5, E6, E7, C6, C7, C8, C5, B4, B5 |
| 586-831 | 74S04 | 14 | 7 | X8, E1 |
NOTE: PIN 1 OF ALL 74S175 AND 74LS175 TIED THROUGH 1K Ω RES TO +5V
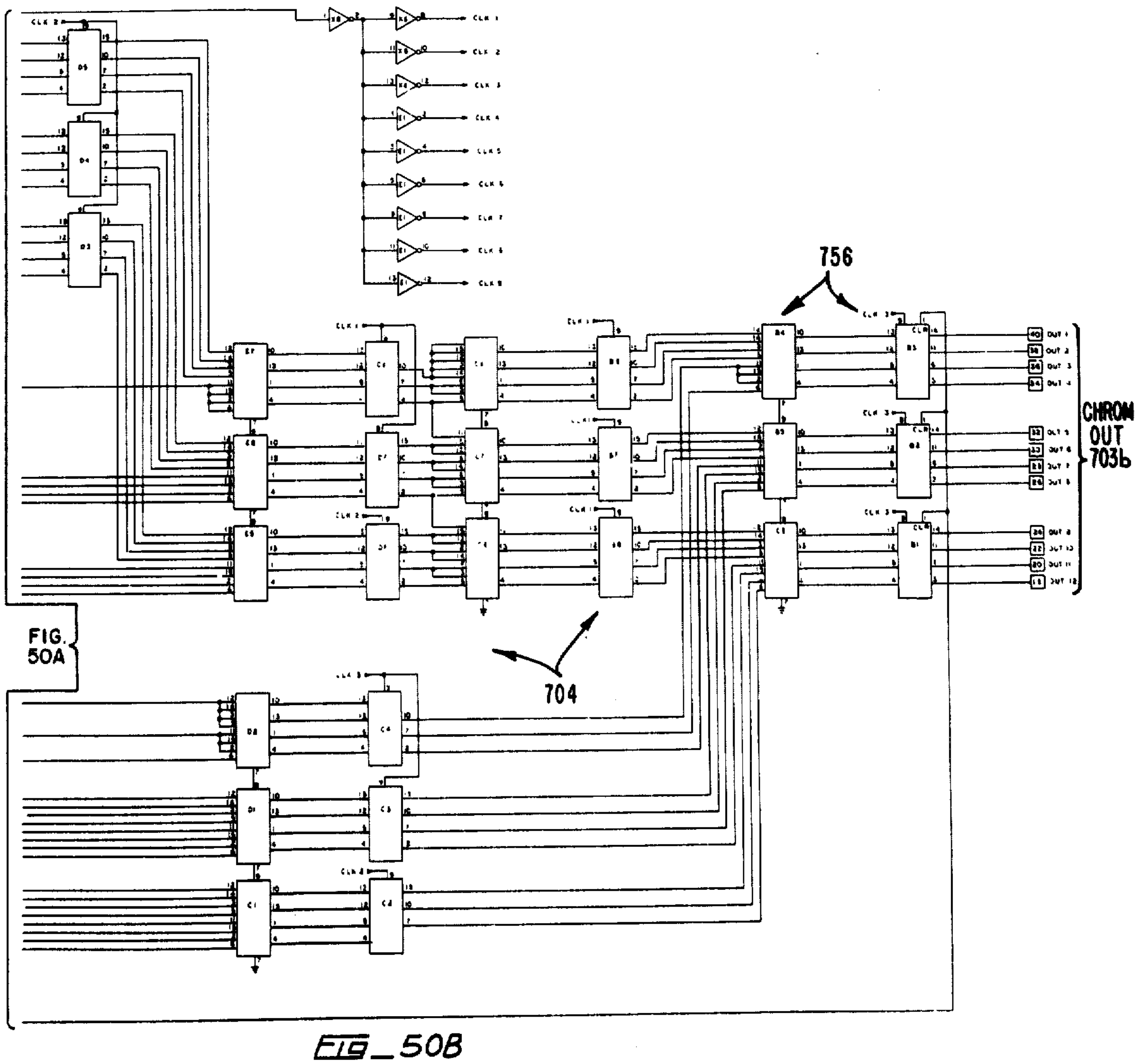
FIG_50B

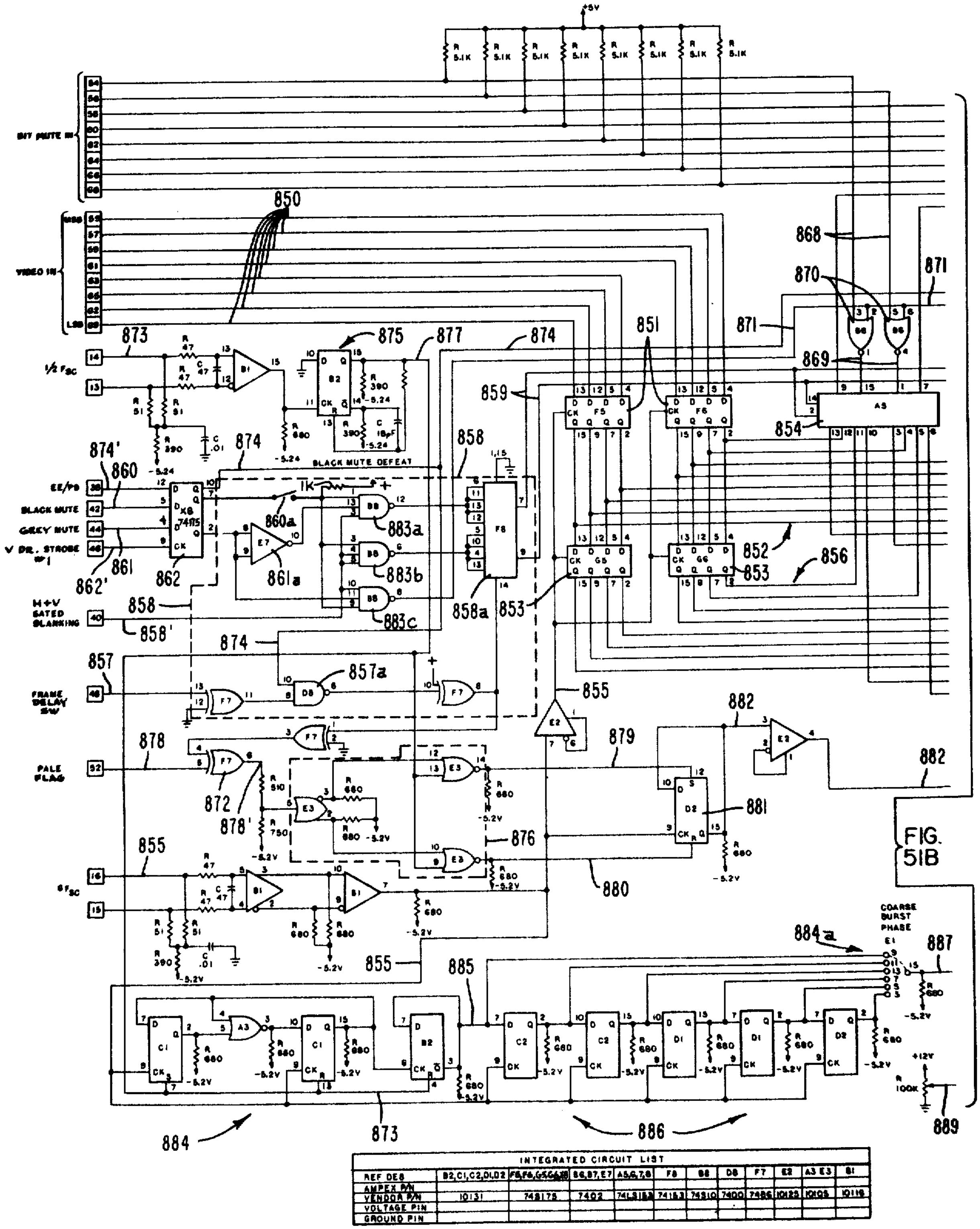
| INTEGRATED CIRCUIT LIST | | | | | | | | | | | |
|---|---|---|---|---|---|---|---|---|---|---|---|
| REF DES | B2,C1,C2,D1,D2 | F5,F6,G5,G6,A8 | B6,B7,E7 | A5,6,7,8 | F8 | B8 | D8 | F7 | E2 | A3 E3 | B1 |
| AMPEX P/N | | | | | | | | | | | |
| VENDOR P/N | 10131 | 74S175 | 7402 | 74LS153 | 74153 | 74S10 | 7400 | 7486 | 10125 | 10105 | 10116 |
| VOLTAGE PIN | | | | | | | | | | | |
| GROUND PIN | | | | | | | | | | | |
Fig_51A

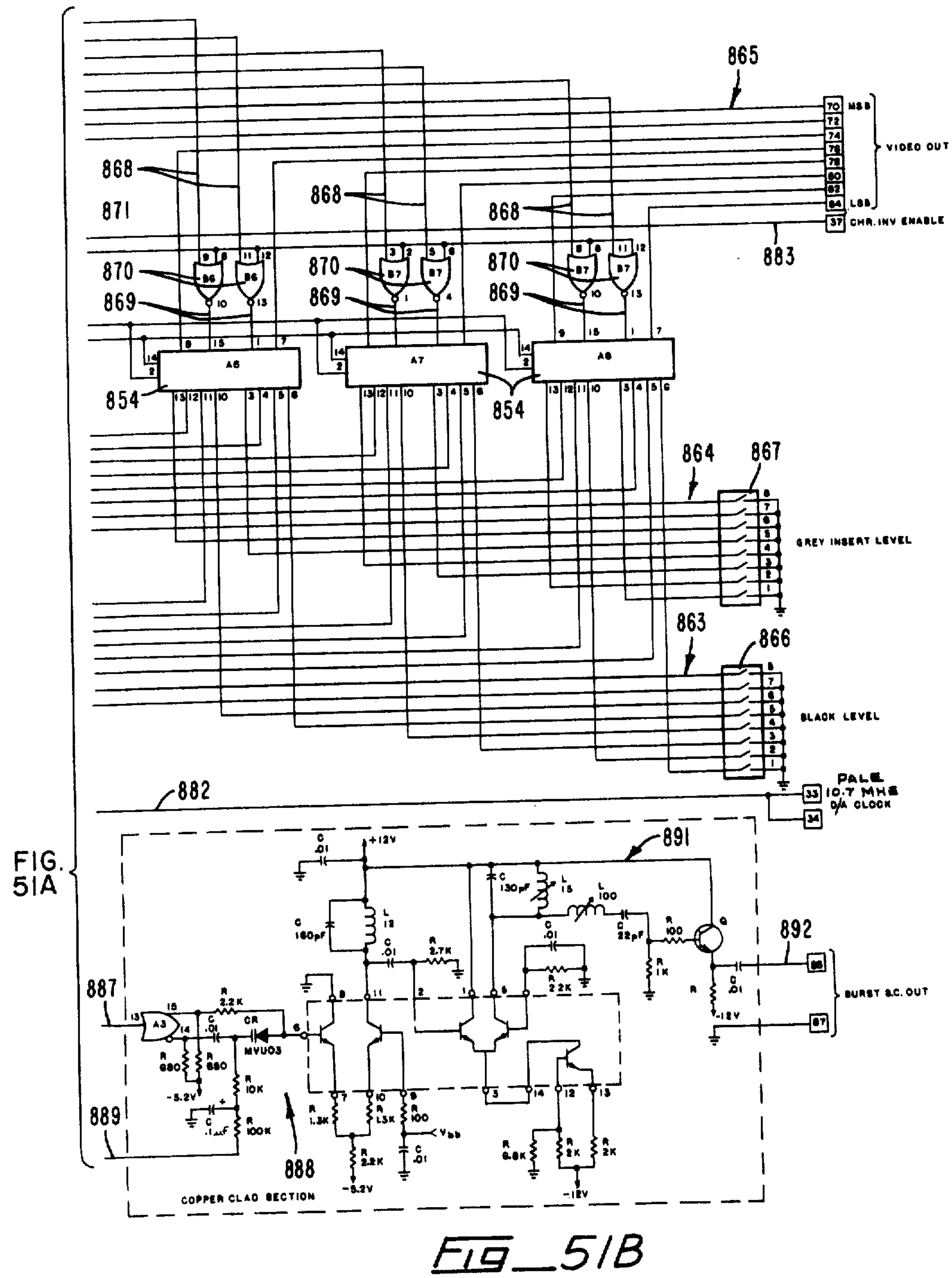
FIG_51B

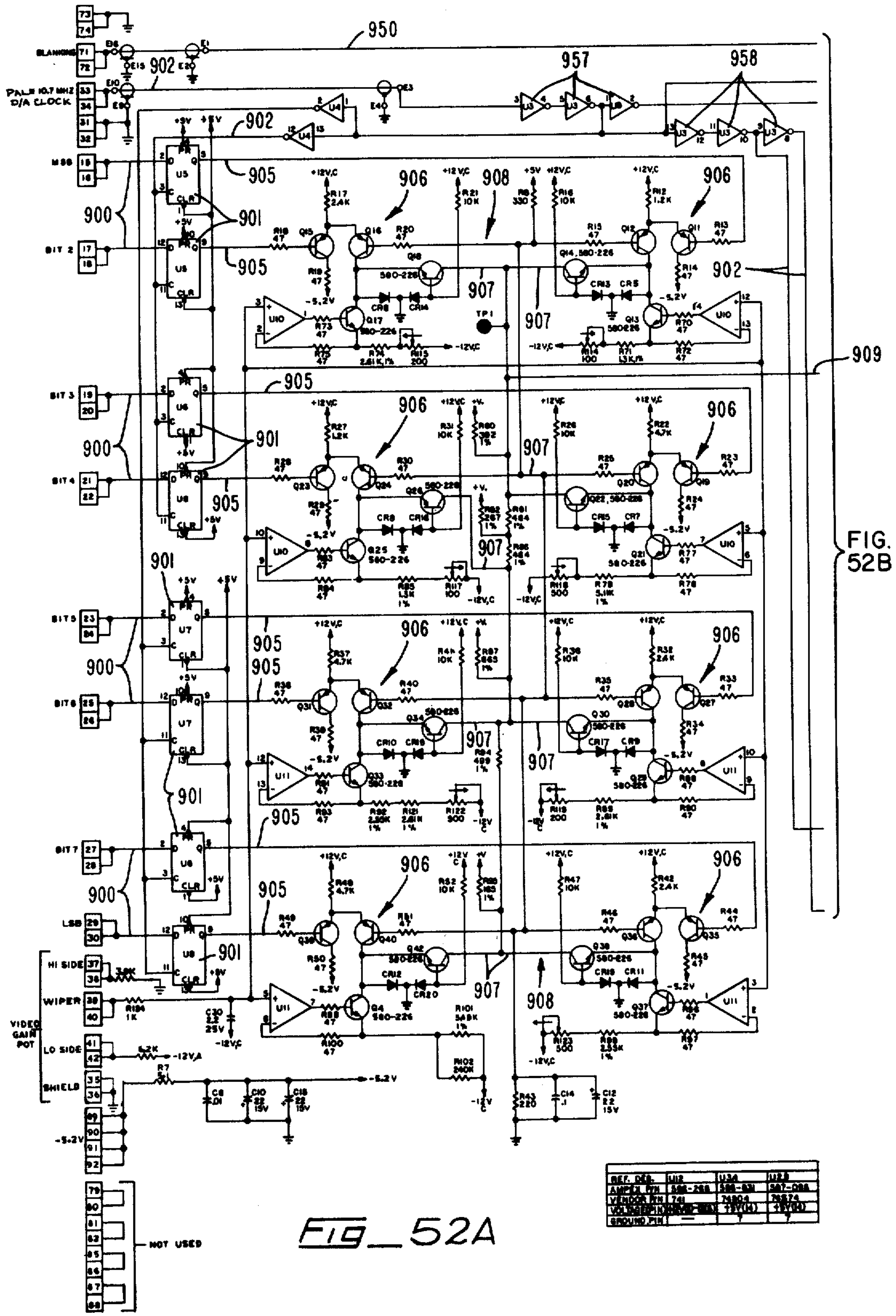
FIG_52A

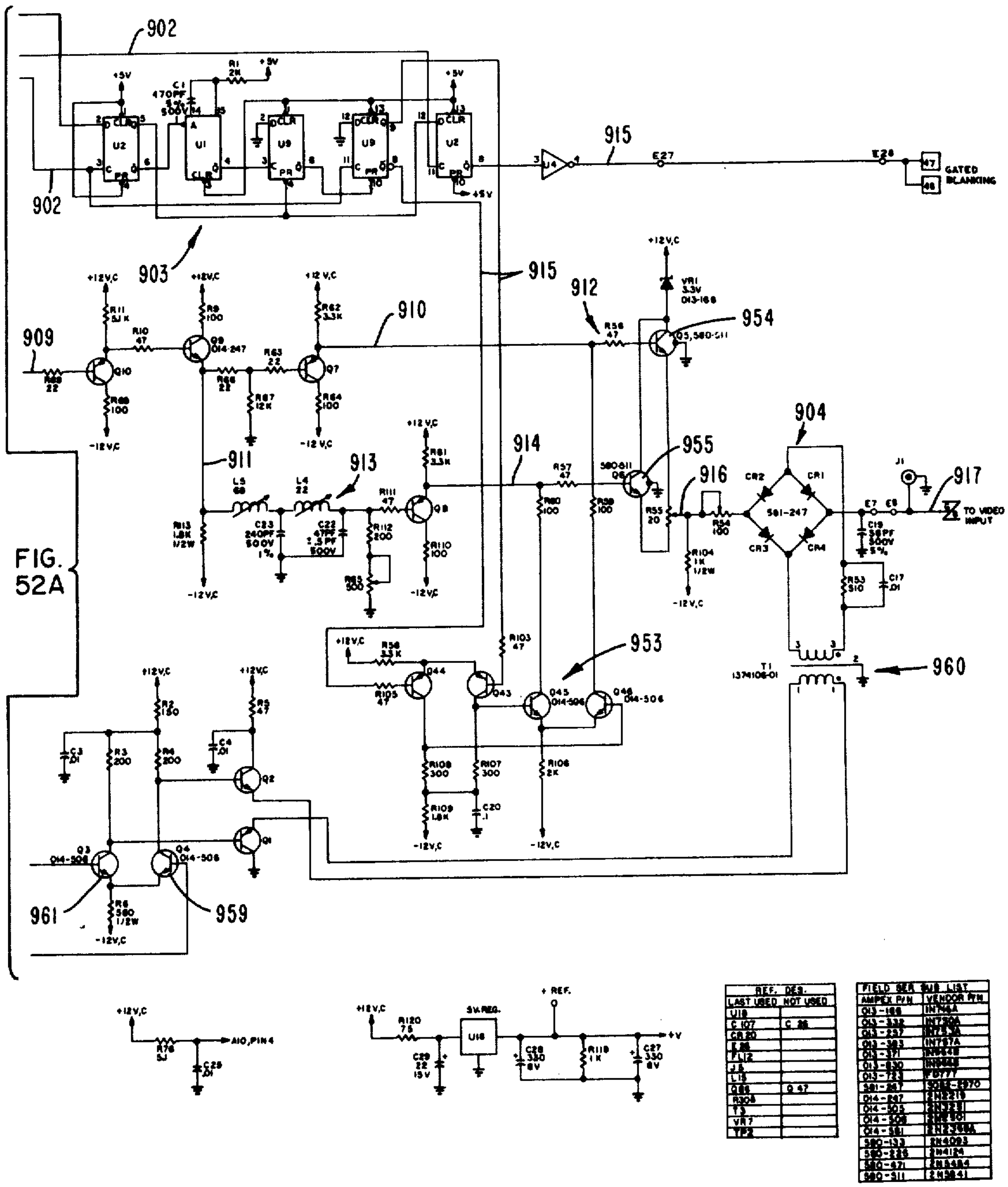
| REF. DES. | |
|---|---|
| LAST USED | NOT USED |
| U19 | |
| C 107 | C 26 |
| CR 20 | |
| E 28 | |
| FL12 | |
| J 5 | |
| L 15 | |
| Q 88 | Q 47 |
| R304 | |
| T 3 | |
| VR 7 | |
| TP2 | |
| FIELD SER SUB LIST | |
|---|---|
| AMPEX P/N | VENDOR P/N |
| 013-168 | IN746A |
| 013-332 | IN730A |
| 013-237 | IN753A |
| 013-383 | IN757A |
| 013-371 | [illegible] |
| 013-830 | [illegible] |
| 013-723 | FD777 |
| 581-247 | 5082-6370 |
| 014-247 | 2N2219 |
| 014-505 | 2N3251 |
| 014-506 | [illegible] |
| 014-581 | 2N2369A |
| 580-133 | 2N4093 |
| 580-226 | 2N4124 |
| 580-471 | 2N5484 |
| 580-511 | 2N3841 |
| I.C. LIST | | | | | | |
|---|---|---|---|---|---|---|
| U14 | U5-8 | U1 | U12,17 | U15,16 | U10,11 | U18 |
| 587-533 | 587-587 | 587-537 | 586-316 | [illegible] | 587-552 | 587-771 |
| 74LS04 | 74LS74 | 74LS21 | CA3086 | CA3094 | MC3403P | 78L05ANC |
| +5V(14) | +5V(14) | +5V(14) | -12V(10) | -12V(5) | [illegible] | — |
| 7 | 7 | 8 | — | — | — | — |
FIG_52B

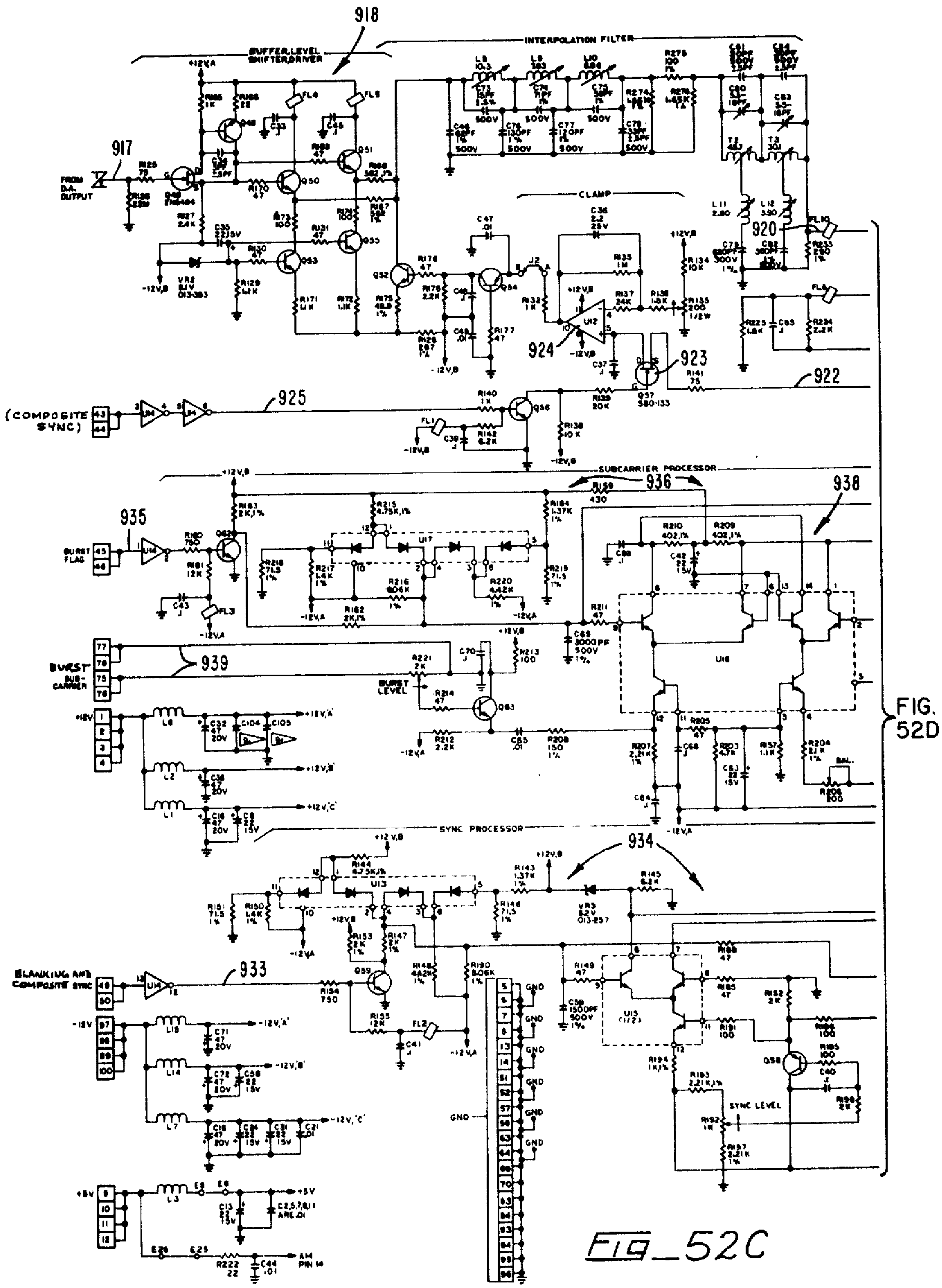
FIG_52C

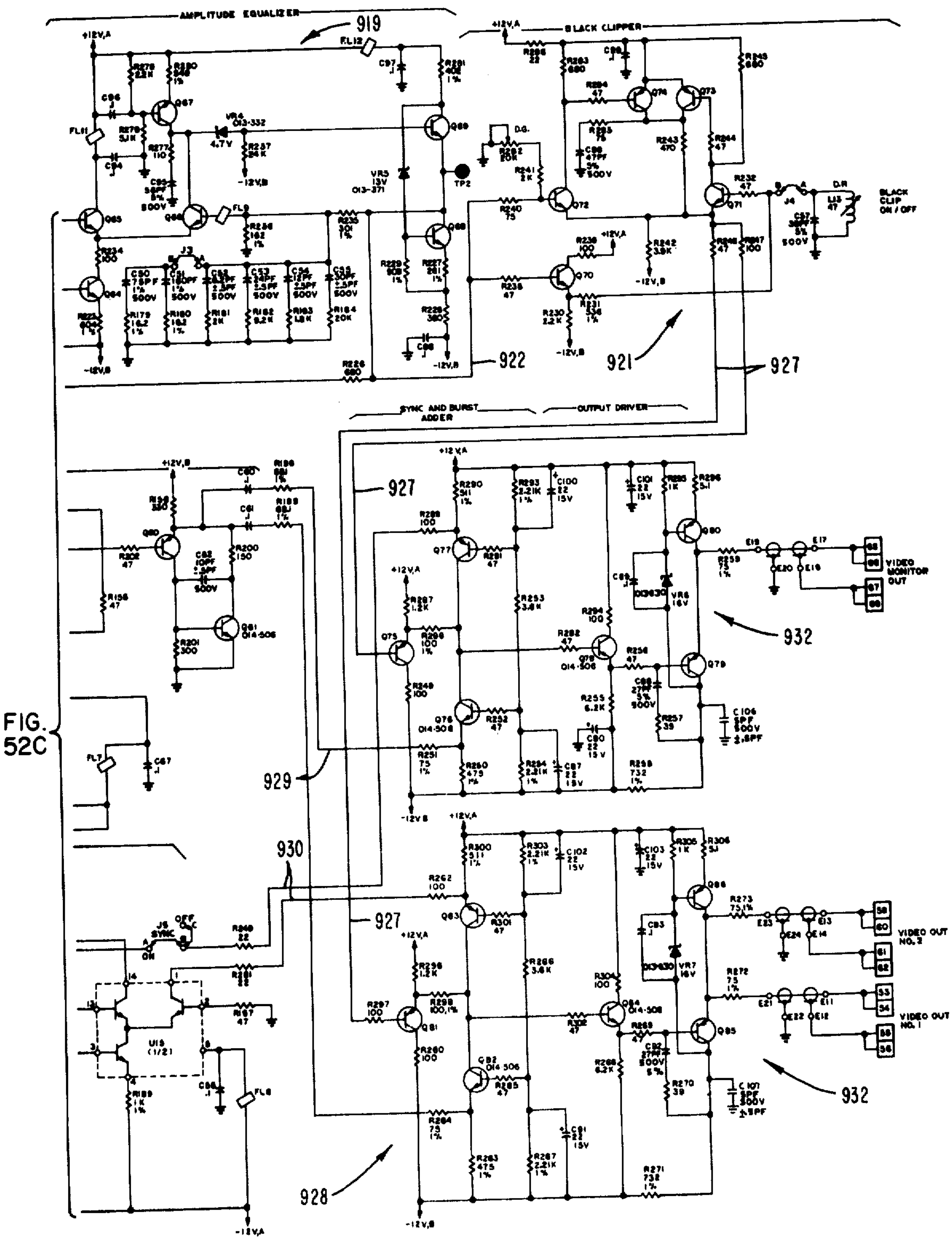
FIG_52D

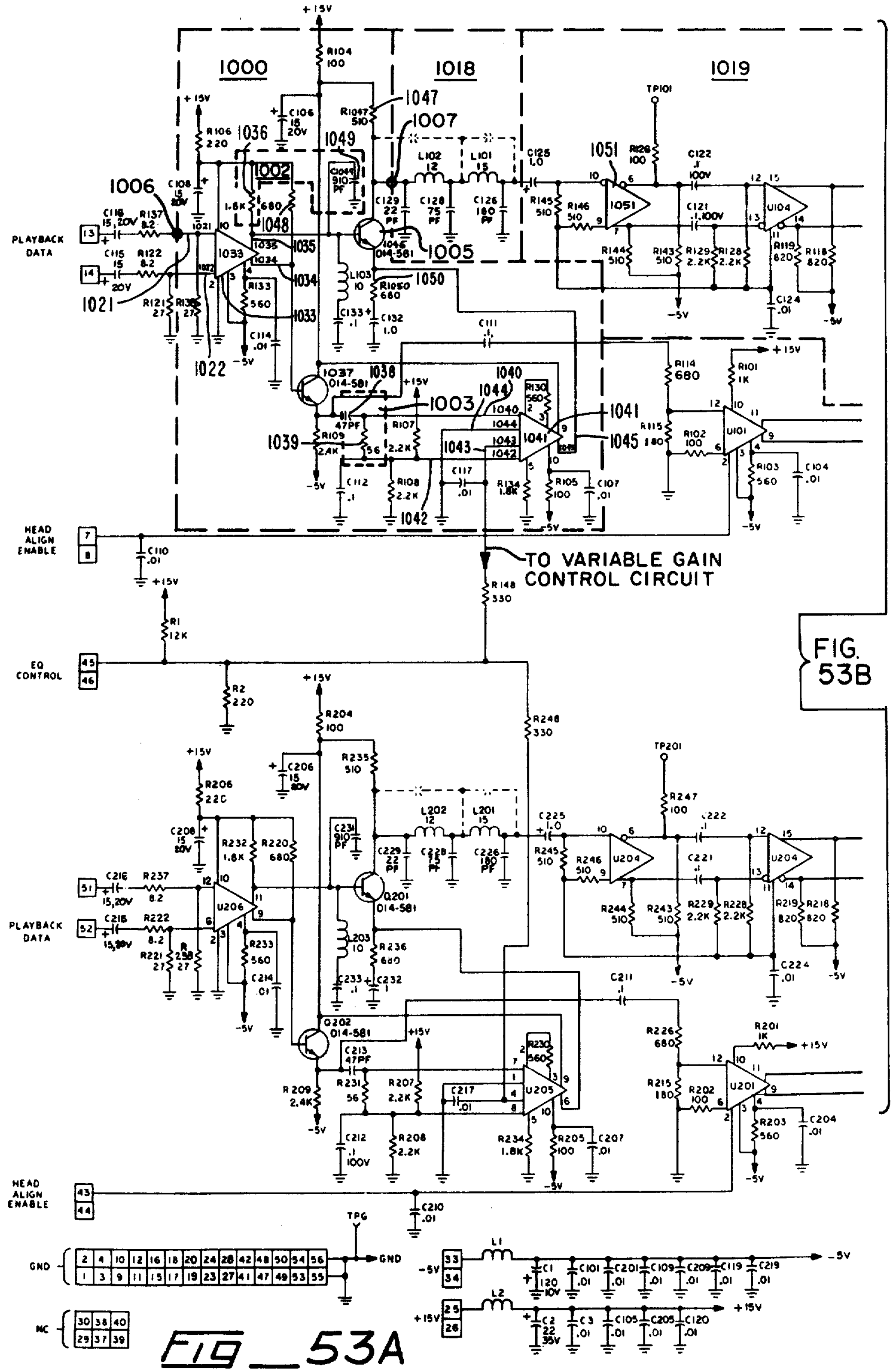
FIG_53A

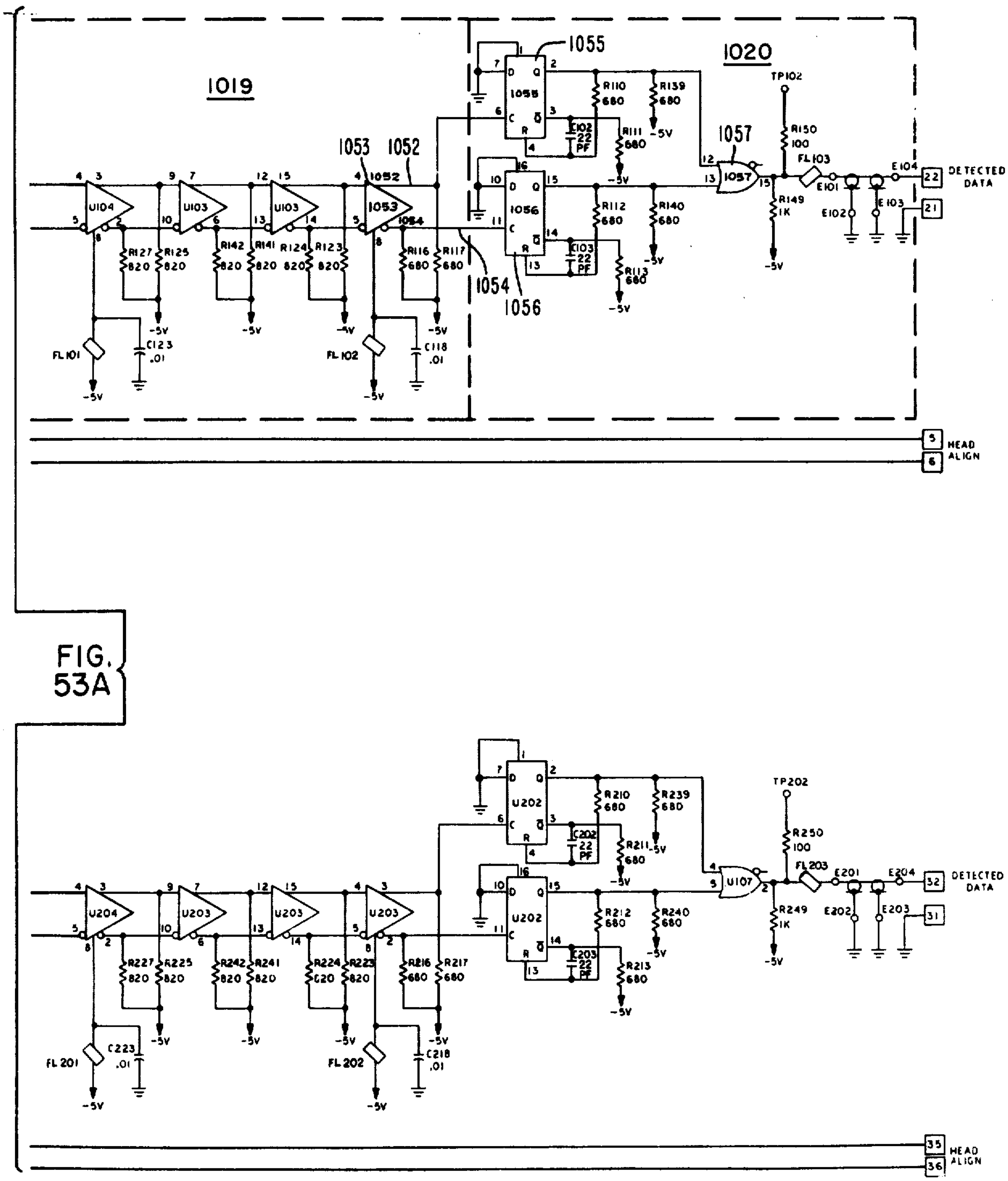
| INTEGRATED CIRCUIT LIST | | | | | | |
|---|---|---|---|---|---|---|
| REFERENCE DESIGNATIONS | U201, U206, U101, U106 | U105, U205 | U203, U204, U103, U104 | U102, U202 | U107 | |
| AMPEX P/N | 588-223 | 686-959 | 587-704 | 587-139 | 587-703 | |
| VENDOR P/N | CA 3004 | MC1496 | MC10116P | MC10131L | MC10105P | |
| VOLTAGE (PIN) | — | — | 8 | 8 | 8 | |
| GROUND PIN | — | 1 | 1, 16 | 1, 16 | 1, 16 | |
FIG_53B
| REFERENCE DESIGNATION | | | | | | |
|---|---|---|---|---|---|---|
| FIRST | UPPER CHAN. | LOWER CHAN. | LAST | UPPER CHAN | LOWER CHAN | DELETED |
| C1 | C101 | C201 | C3 | C133 | C233 | C4-100, |
| | FL101 | FL201 | | FL103 | FL203 | C133-200, |
| L1 | L101 | L201 | L2 | L103 | L203 | C220 |
| R1 | R101 | R201 | R2 | R150 | R247 | R3-100, |
| | Q101 | Q201 | | Q102 | Q202 | R151-200 |
| | TP101 | TP201 | | TP102 | TP202 | C127, 130 |
| | U101 | U201 | | U107 | U206 | C227, 230 |

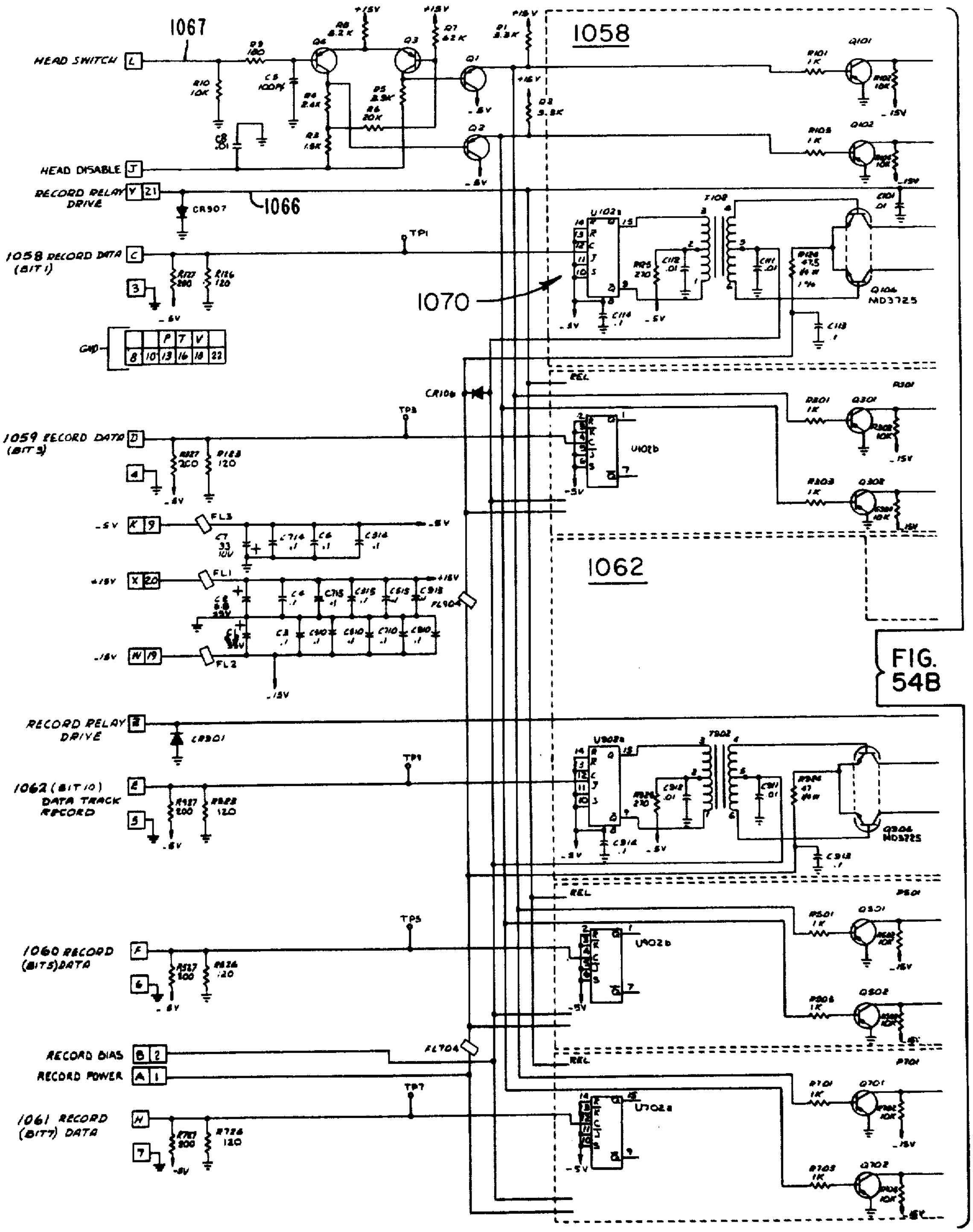
| INTEGRATED CIRCUIT LIST | | |
|---|---|---|
| REF DESIG | U101 | U102a,b, 402a,b, 702a |
| AMPEX P/N | 587-106 | 586-669 |
| VENDOR P/N | NE592K | 1232L |
| VCC PIN | | 8 |
| GND PIN | | 16 |
FIG_54A

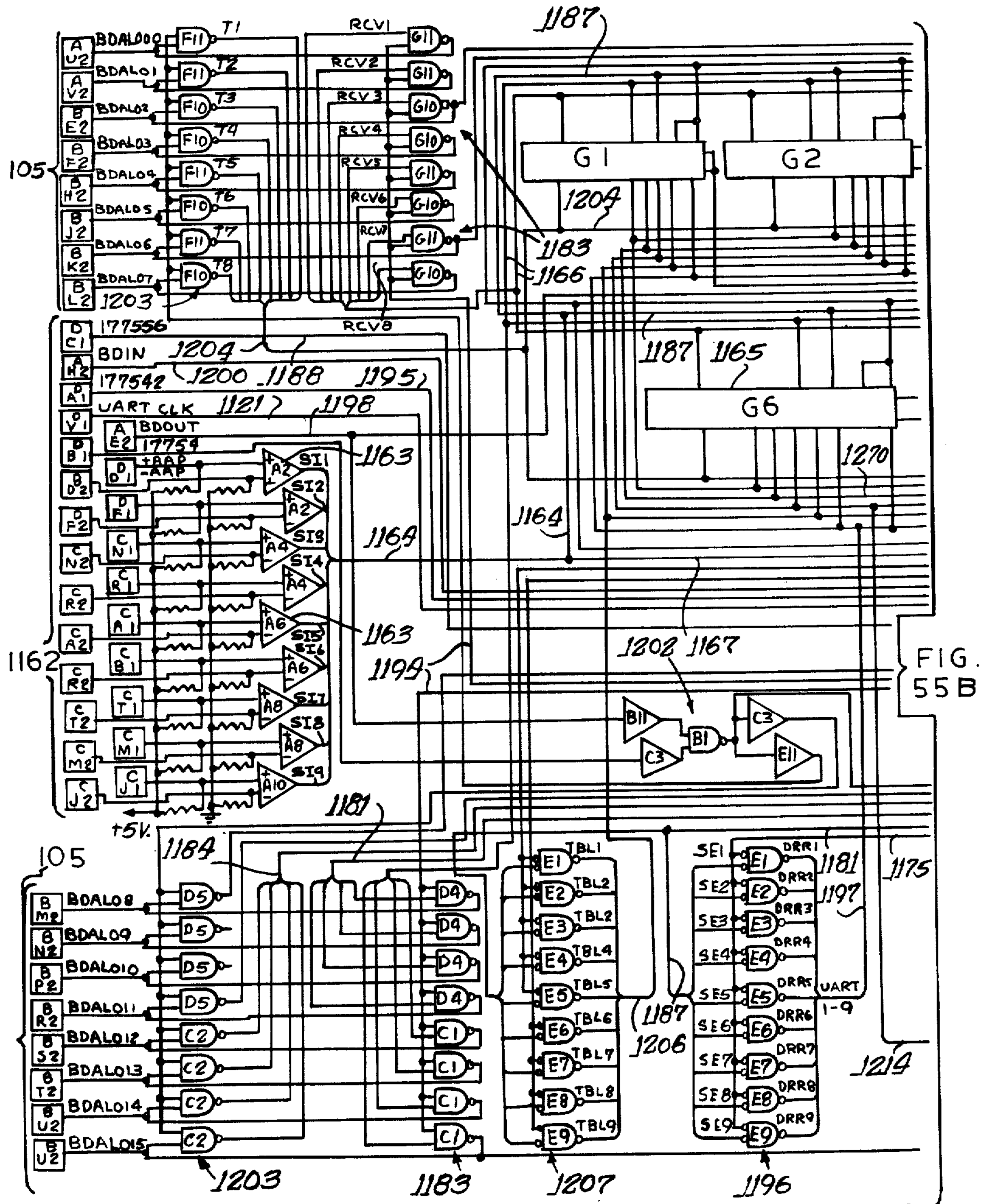
| INTEGRATED CIRCUIT LIST | | | | | | | | |
|---|---|---|---|---|---|---|---|---|
| REFERENCE DESIGNATIONS | B1, B9 C2, D5, B10 | A11 C1 D9 G10 D4 G11 | D8 C3 C9 E11 | B2-B4 B6-B8 B10-D10 | E1-19 | B3, B7 C10 | C7, D6 D11 | C6, C8 D7 |
| AMPEX P/N | 586-179 | 586-581 | 586-451 | 586-175 | 586-918 | 587-082 | 587-027 | 587200 |
| VENDOR P/N | 7400 | 7403 | 7404 | 7474 | 7432 | 7408 | 74121 | 7145133 |
| VOLTAGE PIN | 14 | 14 | 14 | 14 | 14 | 14 | 14 | 16 |
| GROUND PIN | 7 | 7 | 7 | 7 | 7 | 7 | 7 | 8 |
FIG_55A

| C5 | D1 | D-2-C4 | C11 | A2-A6 A4-A10 A8 | A1-A5 A3-A9 A7 | D3 | G1-9 | B5 F10,11 | B11 |
|---|---|---|---|---|---|---|---|---|---|
| 587-413 | 586-912 | 586-925 | 586-174 | 589-087 | 587-120 | 586-903 | 587-257 | 587-510 | 587-533 |
| 74197 | 74154 | 74175 | 7410 | 75115 | 75114 | 74157 | TR1402A | 74LS00 | 747500 |
| 16 | 24 | 16 | 4 | 16 | 16 | 16 | +5 -12 34 2 | 14 | 14 |
| 8 | 12 | 8 | 7 | 8 | 8 | 8 | 3,39 | 7 | 7 |

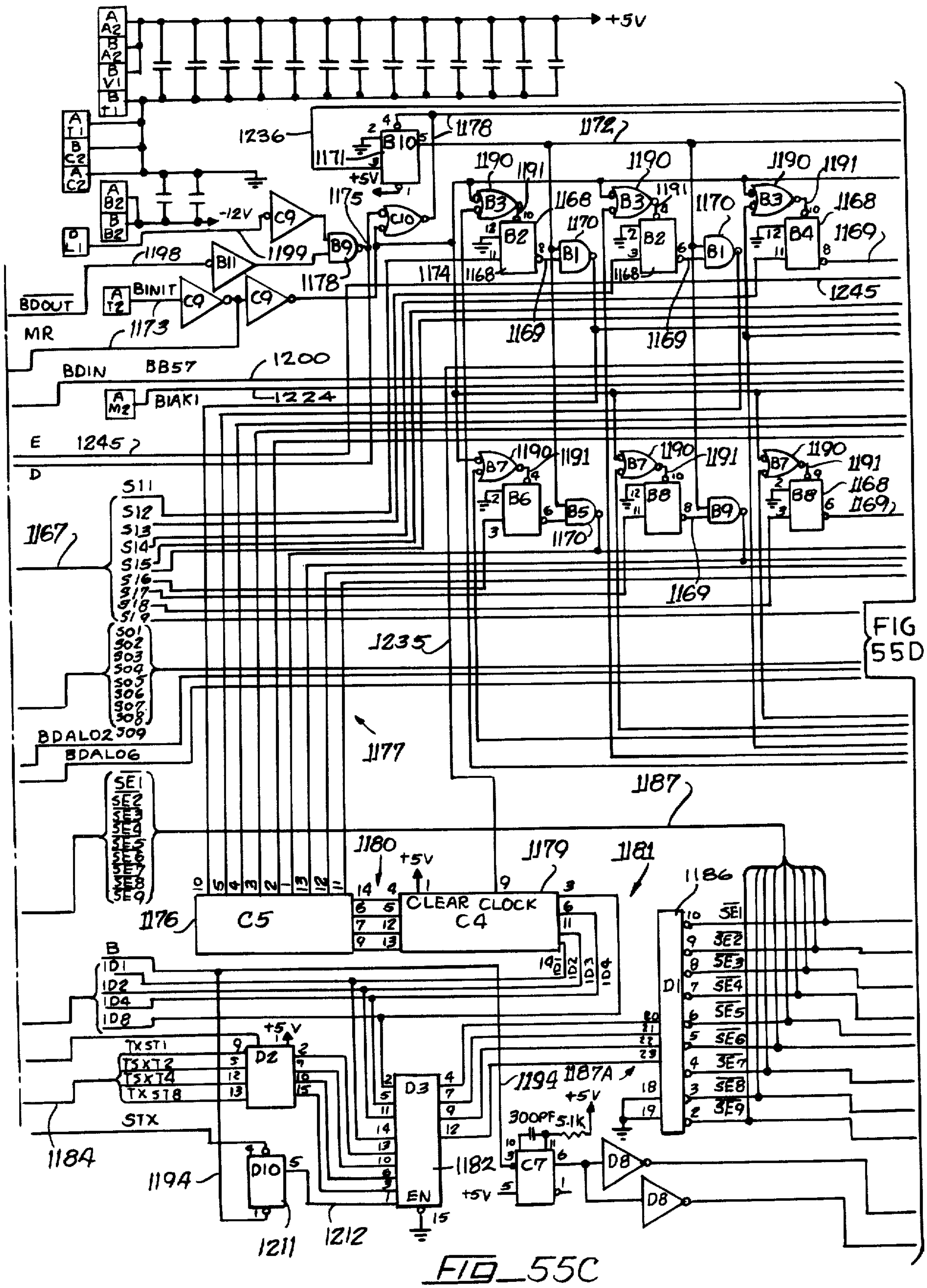
FIG_55C

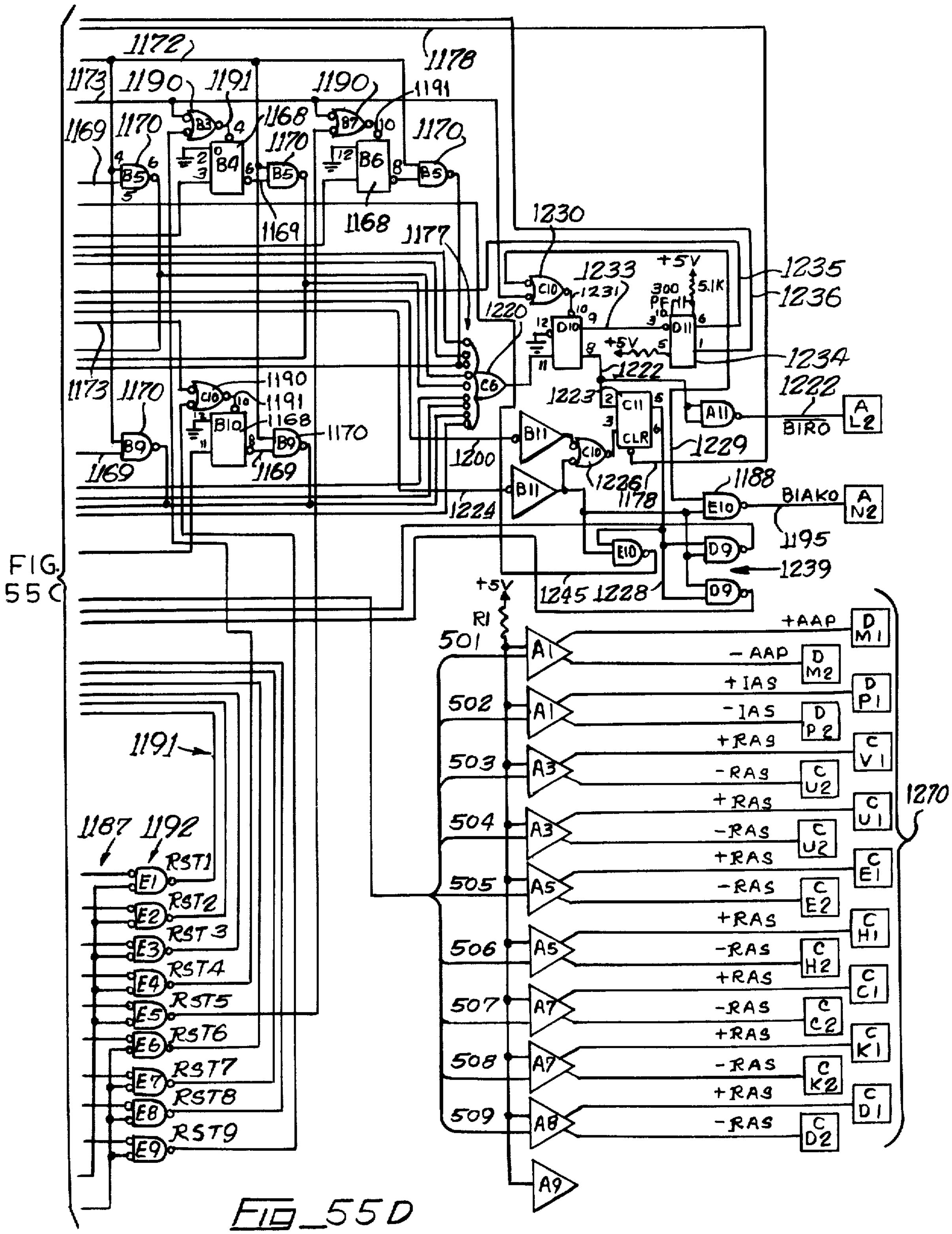
FIG_55D

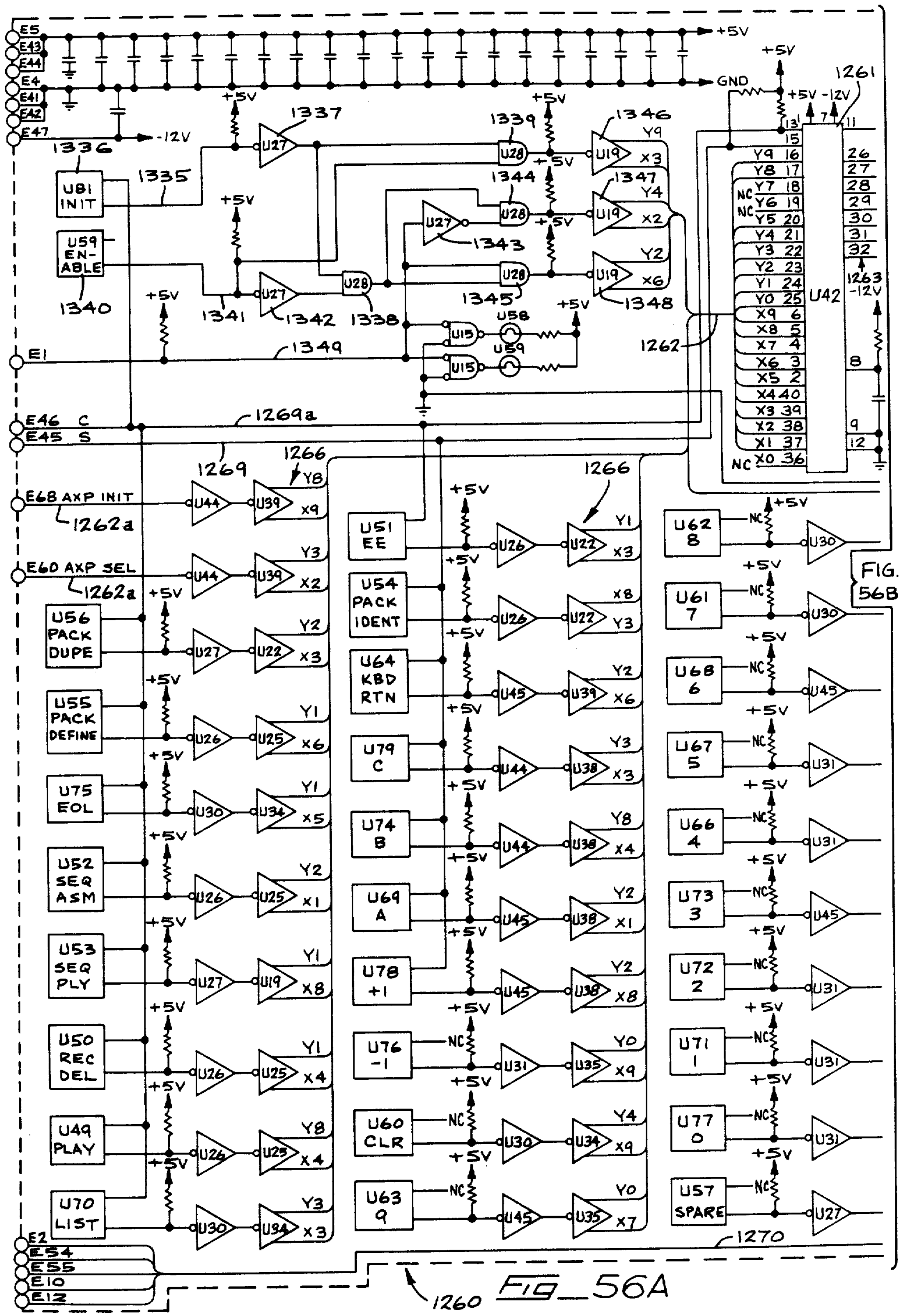
FIG_56A

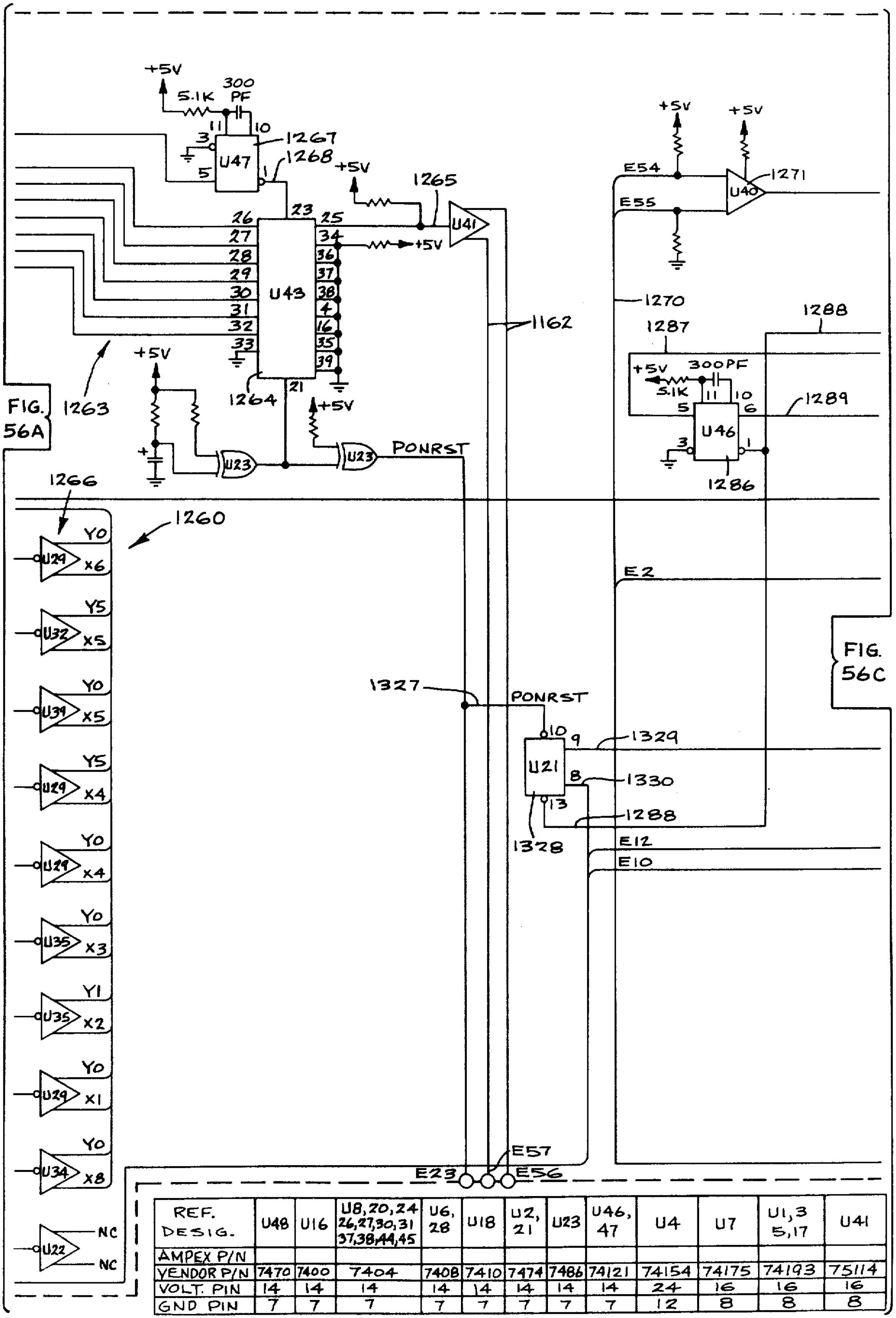
| REF. DESIG. | U48 | U16 | U8, 20, 24 26, 27, 30, 31 37, 38, 44, 45 | U6, 28 | U18 | U2, 21 | U23 | U46, 47 | U4 | U7 | U1, 3 5, 17 | U41 |
|---|---|---|---|---|---|---|---|---|---|---|---|---|
| AMPEX P/N | | | | | | | | | | | | |
| VENDOR P/N | 7470 | 7400 | 7404 | 7408 | 7410 | 7474 | 7486 | 74121 | 74154 | 74175 | 74193 | 75114 |
| VOLT. PIN | 14 | 14 | 14 | 14 | 14 | 14 | 14 | 14 | 24 | 16 | 16 | 16 |
| GND PIN | 7 | 7 | 7 | 7 | 7 | 7 | 7 | 7 | 12 | 8 | 8 | 8 |
FIG_56B

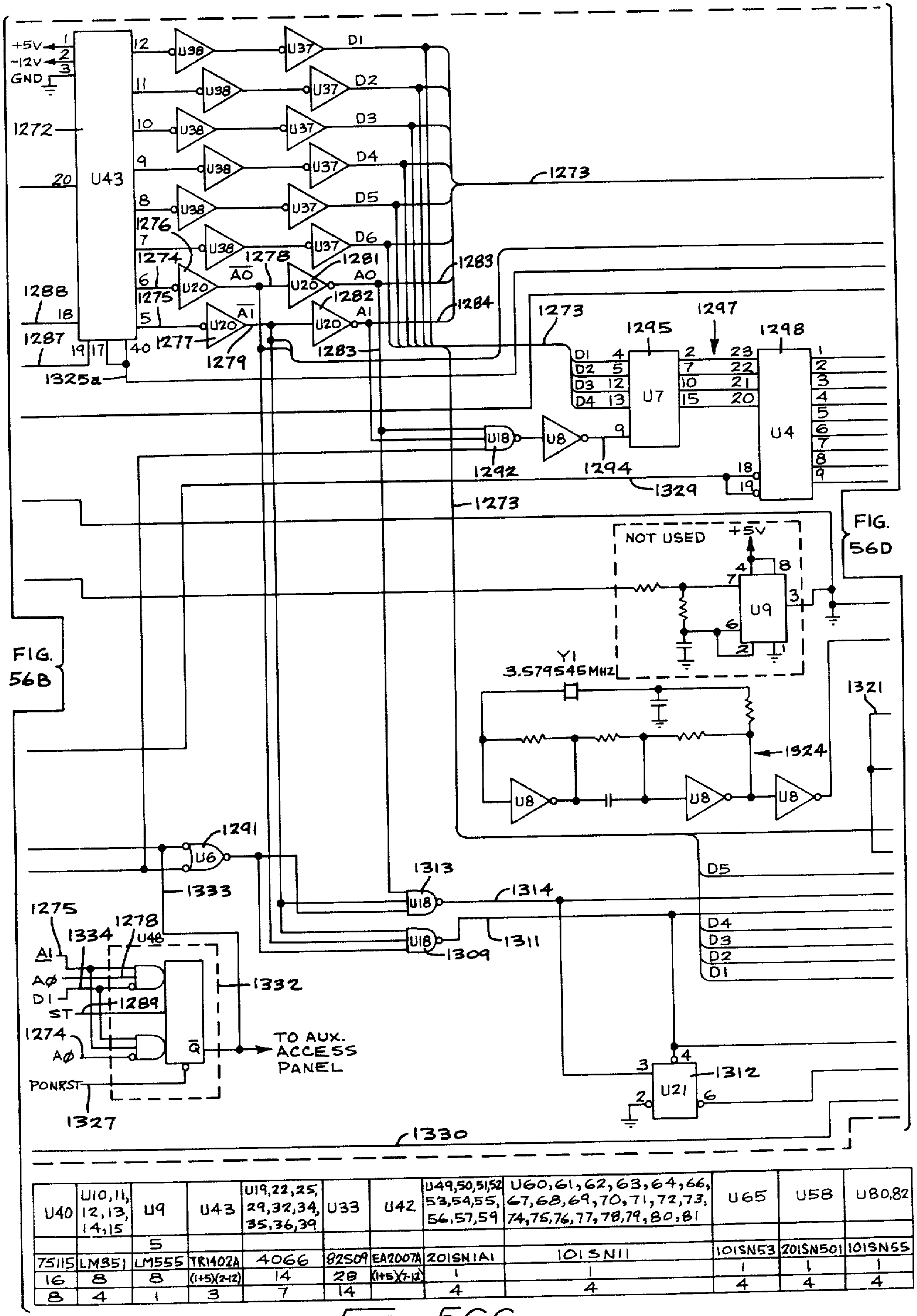
| U40 | U10,11, 12,13, 14,15 | U9 | U43 | U19,22,25, 29,32,34, 35,36,39 | U33 | U42 | U49,50,51,52, 53,54,55, 56,57,59 | U60,61,62,63,64,66, 67,68,69,70,71,72,73, 74,75,76,77,78,79,80,81 | U65 | U58 | U80,82 |
|---|---|---|---|---|---|---|---|---|---|---|---|
| | | 5 | | | | | | | | | |
| 75115 | LM351 | LM555 | TR1402A | 4066 | 82S09 | EA2007A | 201SN1A1 | 101SN11 | 101SN53 | 201SN501 | 101SN55 |
| 16 | 8 | 8 | (1+5)(2-12) | 14 | 28 | (1+5)(7-12) | 1 | 1 | 1 | 1 | 1 |
| 8 | 4 | 1 | 3 | 7 | 14 | | 4 | 4 | 4 | 4 | 4 |
FIG_56C

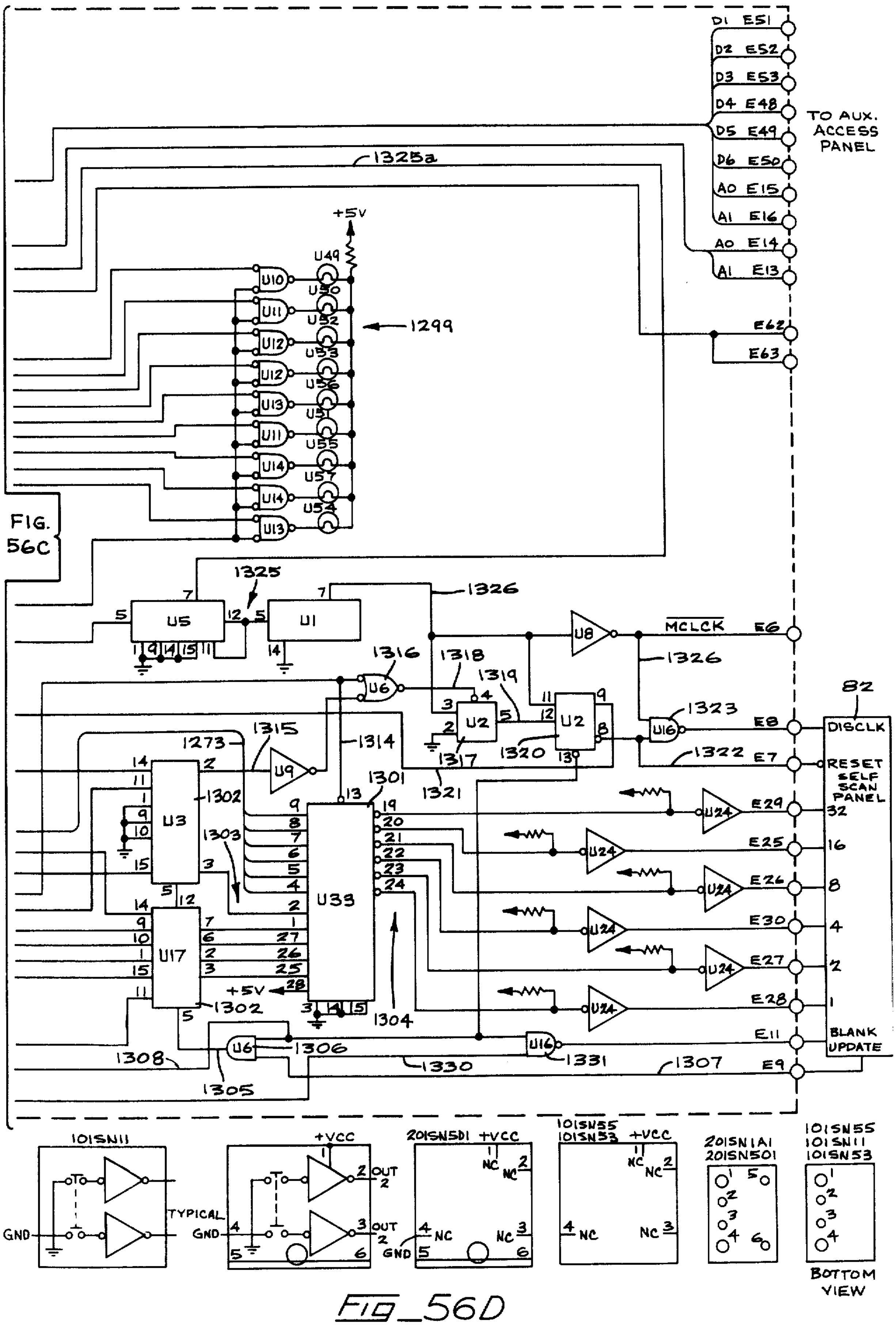
FIG_56D

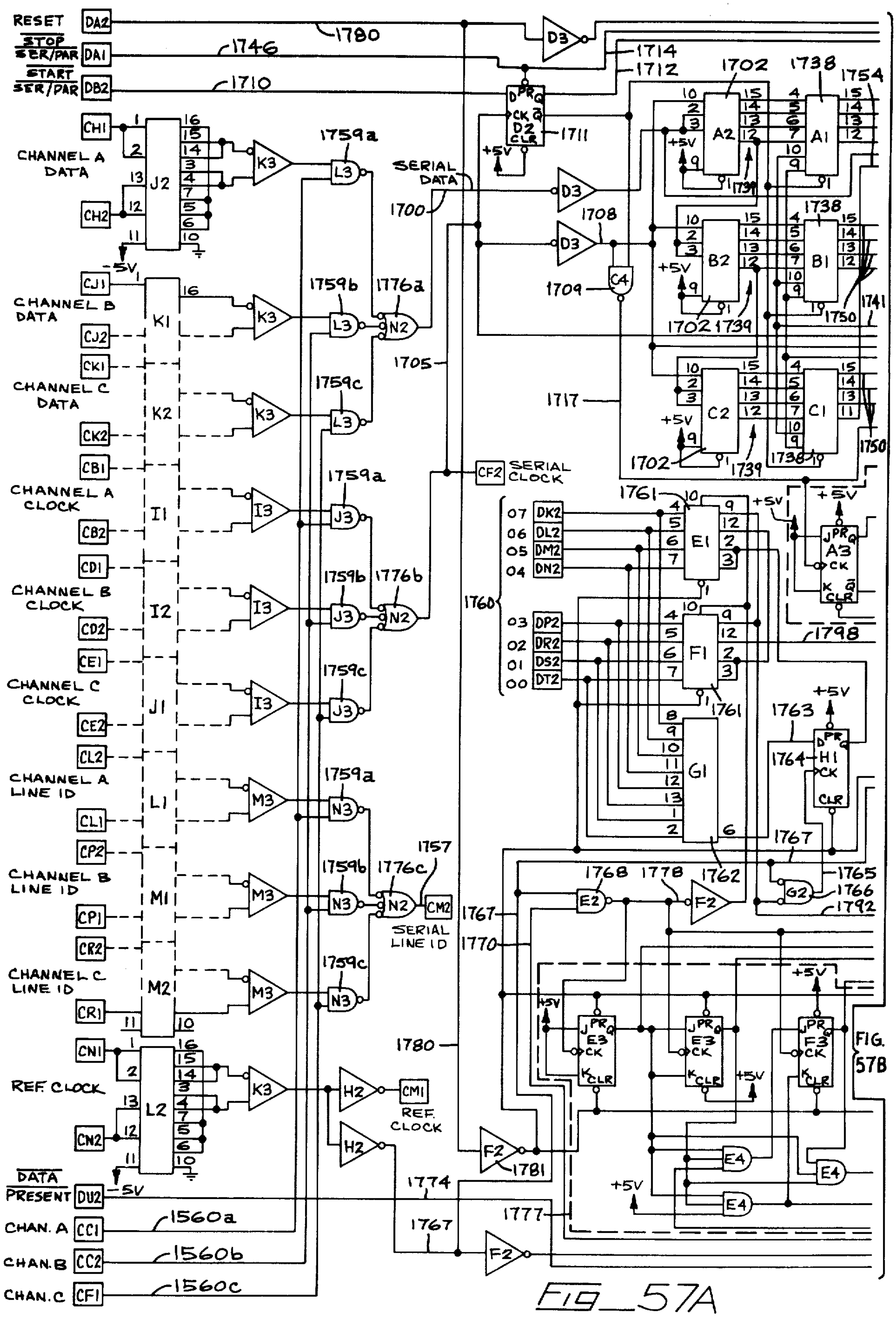
FIG_57A

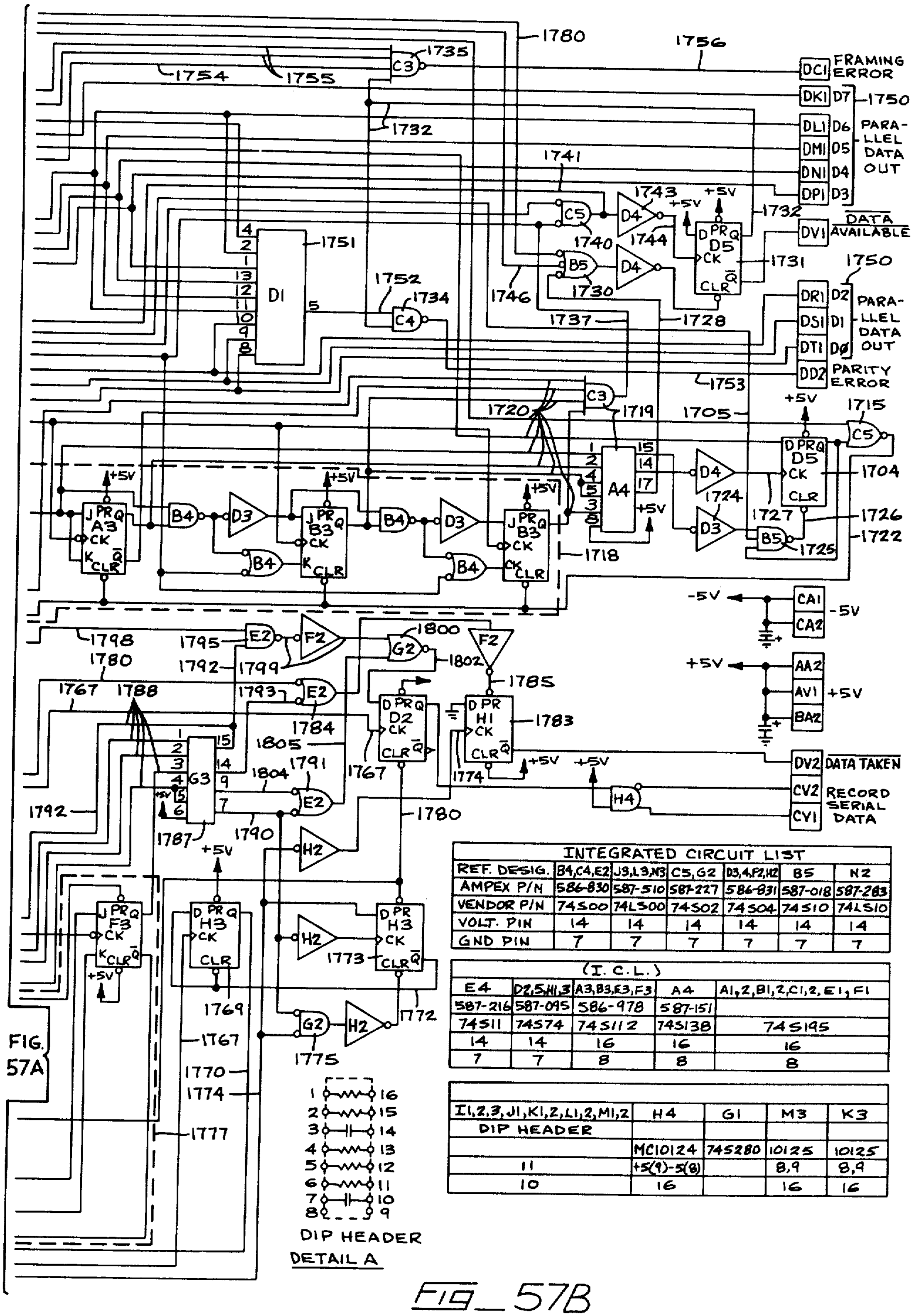
| INTEGRATED CIRCUIT LIST | | | | | | |
|---|---|---|---|---|---|---|
| REF. DESIG. | B4,C4,E2 | J3,L3,N3 | C5,G2 | D3,4,F2,H2 | B5 | N2 |
| AMPEX P/N | 586-830 | 587-510 | 587-227 | 586-831 | 587-018 | 587-283 |
| VENDOR P/N | 74S00 | 74LS00 | 74S02 | 74S04 | 74S10 | 74LS10 |
| VOLT. PIN | 14 | 14 | 14 | 14 | 14 | 14 |
| GND PIN | 7 | 7 | 7 | 7 | 7 | 7 |
| (I. C. L.) | | | | |
|---|---|---|---|---|
| E4 | D2,5,H1,3 | A3,B3,E3,F3 | A4 | A1,2,B1,2,C1,2,E1,F1 |
| 587-216 | 587-095 | 586-978 | 587-151 | |
| 74S11 | 74S74 | 74S112 | 74S138 | 74S195 |
| 14 | 14 | 16 | 16 | 16 |
| 7 | 7 | 8 | 8 | 8 |
| | | | | |
|---|---|---|---|---|
| I1,2,3,J1,K1,2,L1,2,M1,2 | H4 | G1 | M3 | K3 |
| DIP HEADER | | | | |
| | MC10124 | 74S280 | 10125 | 10125 |
| 11 | +5(9)-5(8) | | 8,9 | 8,9 |
| 10 | 16 | | 16 | 16 |
FIG_57B

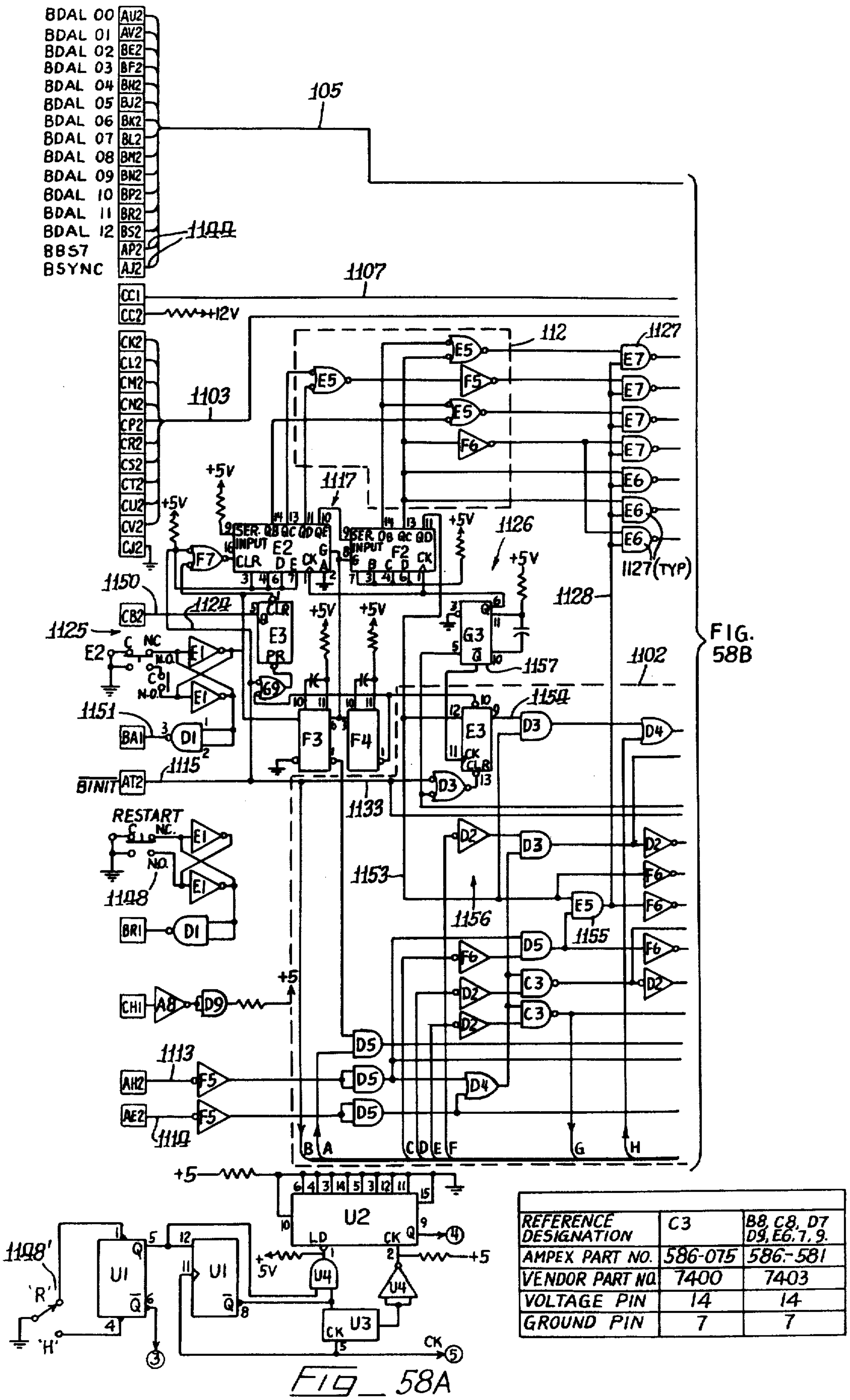
| REFERENCE DESIGNATION | C3 | B8, C8, D7 D9, E6, 7, 9. |
| --- | --- | --- |
| AMPEX PART NO. | 586-075 | 586-581 |
| VENDOR PART NO. | 7400 | 7403 |
| VOLTAGE PIN | 14 | 14 |
| GROUND PIN | 7 | 7 |
FIG_ 58A

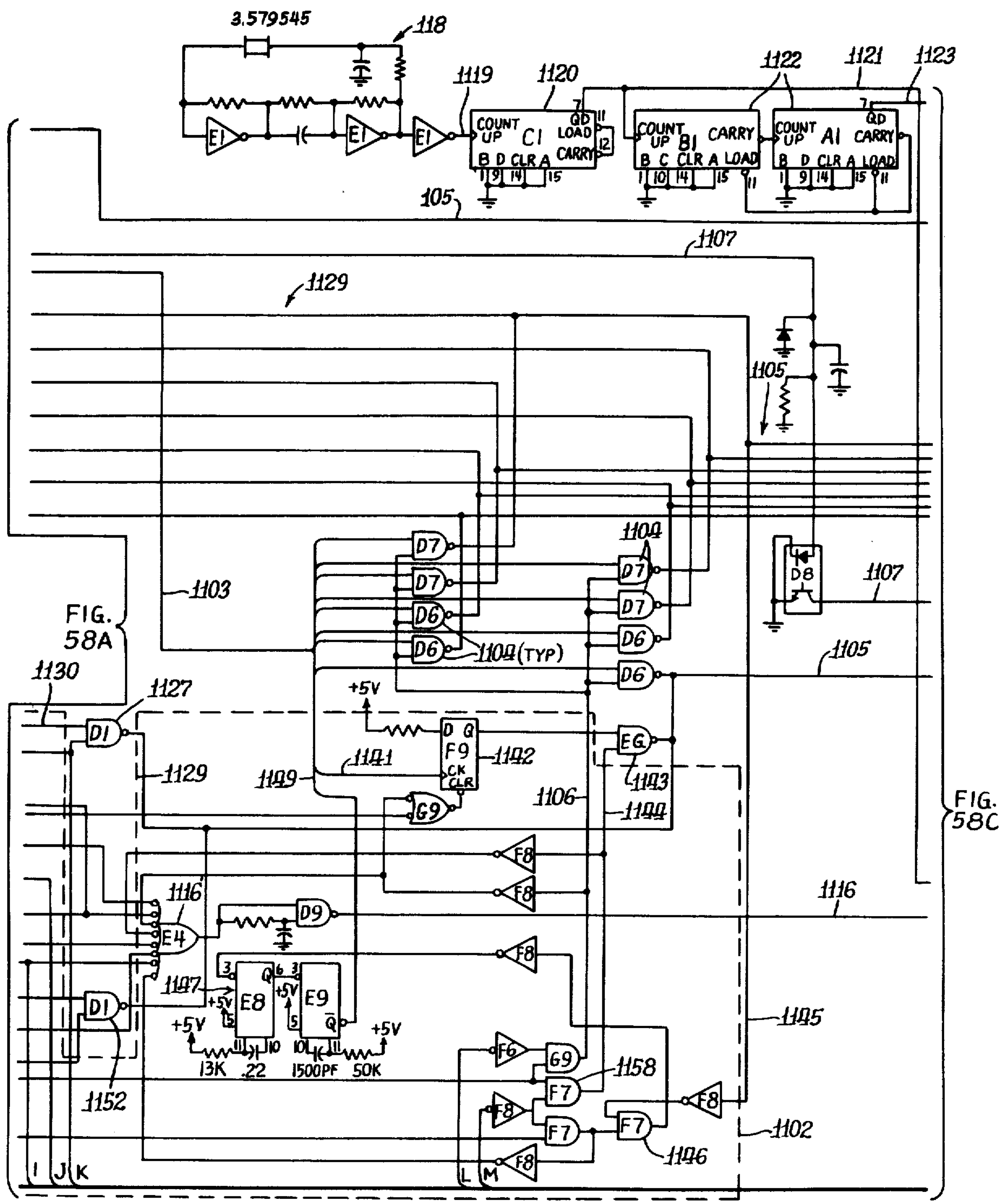
| I. C. LIST | | | | | | | | | | | | |
|---|---|---|---|---|---|---|---|---|---|---|---|---|
| E1, D2, F6 | A5,6,7,8, A9, F5 | C6,7,D3,5, E5,F7,G9 | D4 | A3, B3, A4, B4 | E3, C4, U1 | E2, F2 | F3, G3 F4, E8 | E4 | A2, C2 | B5, B6, B7 | A1, B1, C1, U3 | D8 |
| 586-328 | 586-743 | 586-759 | 586-918 | | 586-108 | 586-492 | 586-533 | 587-200 | 586-192 | 586.924 | | |
| 7404 | 74L04 | 7408 | 7432 | MC7472 | 7474 | 7496 | 74121 | 74133 | 74154 | 74174 | 74193 | 4N26 |
| 14 | 14 | 14 | 14 | | 14 | 5 | 14 | 16 | 24 | 16 | 16 | |
| 7 | 7 | 7 | 7 | | 7 | 12 | 7 | 8 | 12 | 8 | 8 | 2.4 |
FIG_58B

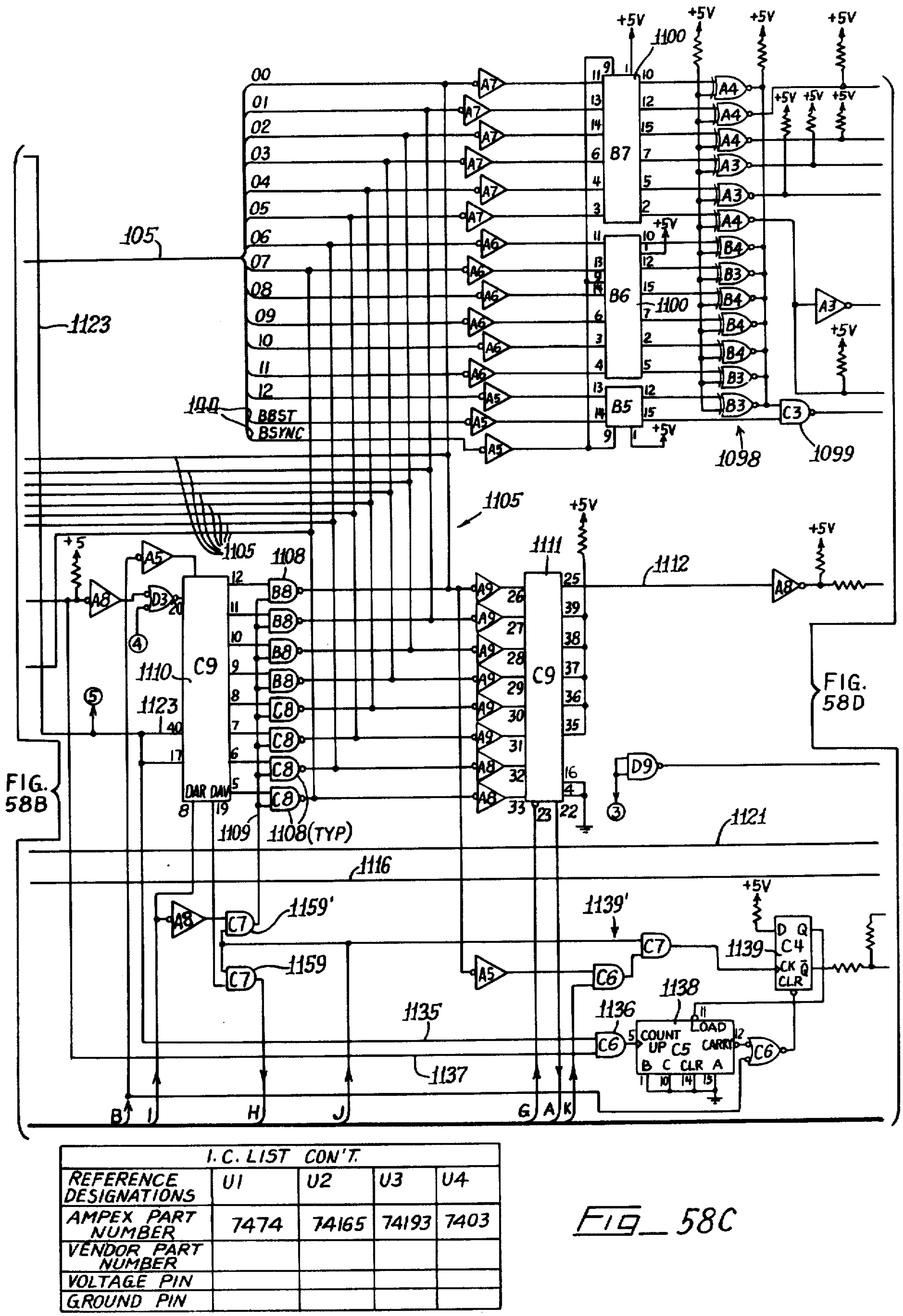
| I.C. LIST CON'T. | | | | |
|---|---|---|---|---|
| REFERENCE DESIGNATIONS | U1 | U2 | U3 | U4 |
| AMPEX PART NUMBER | 7474 | 74165 | 74193 | 7403 |
| VENDOR PART NUMBER | | | | |
| VOLTAGE PIN | | | | |
| GROUND PIN | | | | |
FIG_ 58C

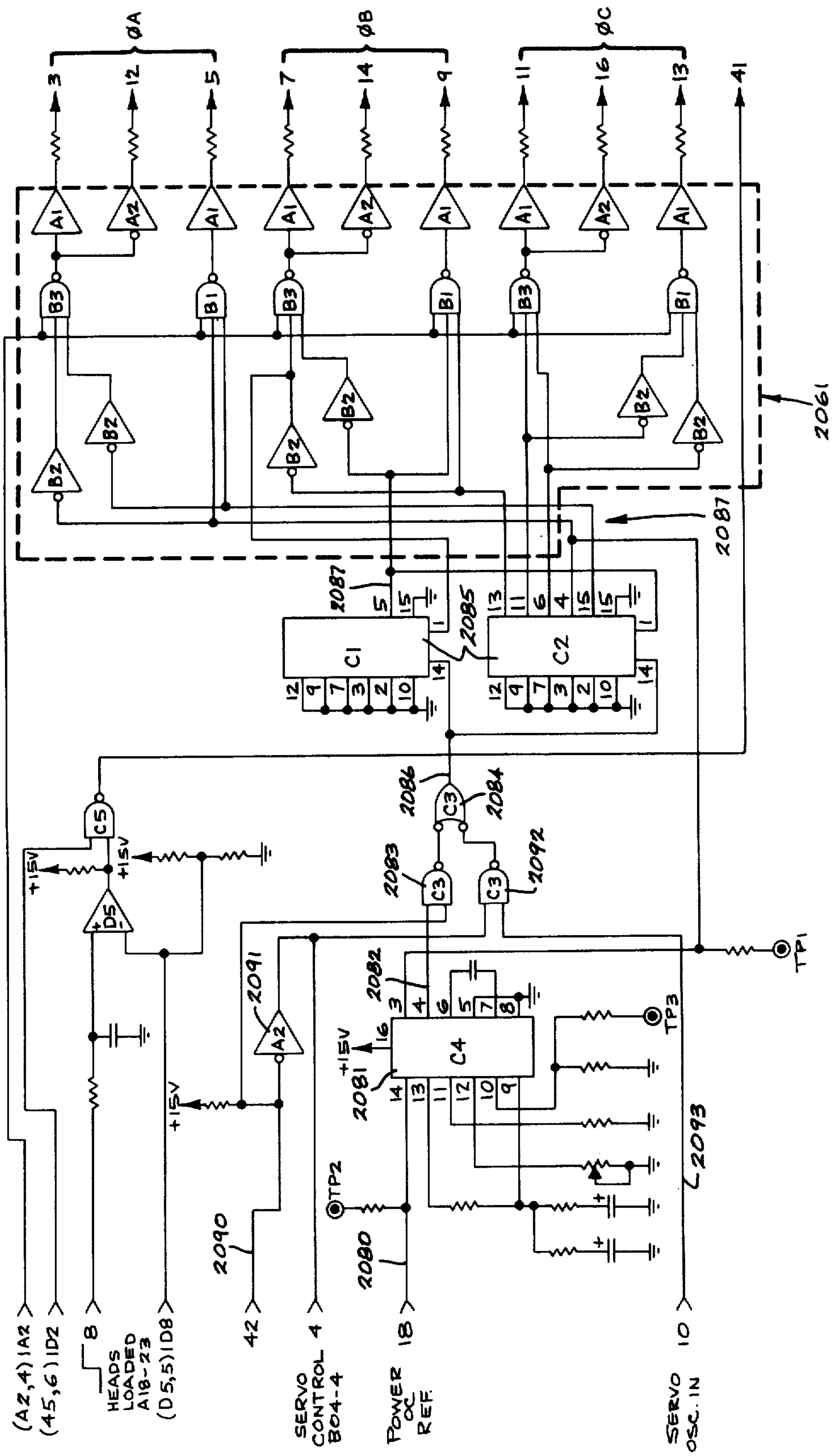
INTEGRATED CIRCUIT LIST
| REF. DESIG. | A1 | A2,5 B2 | A6,B5 | B1,3 | B6,C6 | C1,C2 | C3,5 | C4 | D5 |
|---|---|---|---|---|---|---|---|---|---|
| AMPEX P/N | 587-303 | 587-322 | 587-446 | 587-449 | 589-019 | 587-972 | 589-319 | 587-428 | 580-715 |
| VENDOR P/N | CD4050 | CD4049 | CD4013 | CD4023 | 74C221 | CD4018 | CD4011 | CD4046 | MC3302 |
| VOLT. PIN | 16 | 16 | 14 | 14 | 16 | 16 | 14 | 16 | 3 |
| GND. PIN | 8 | 8 | 7 | 7 | 8 | 8 | 7 | 8 | 12 |
FIG_59A

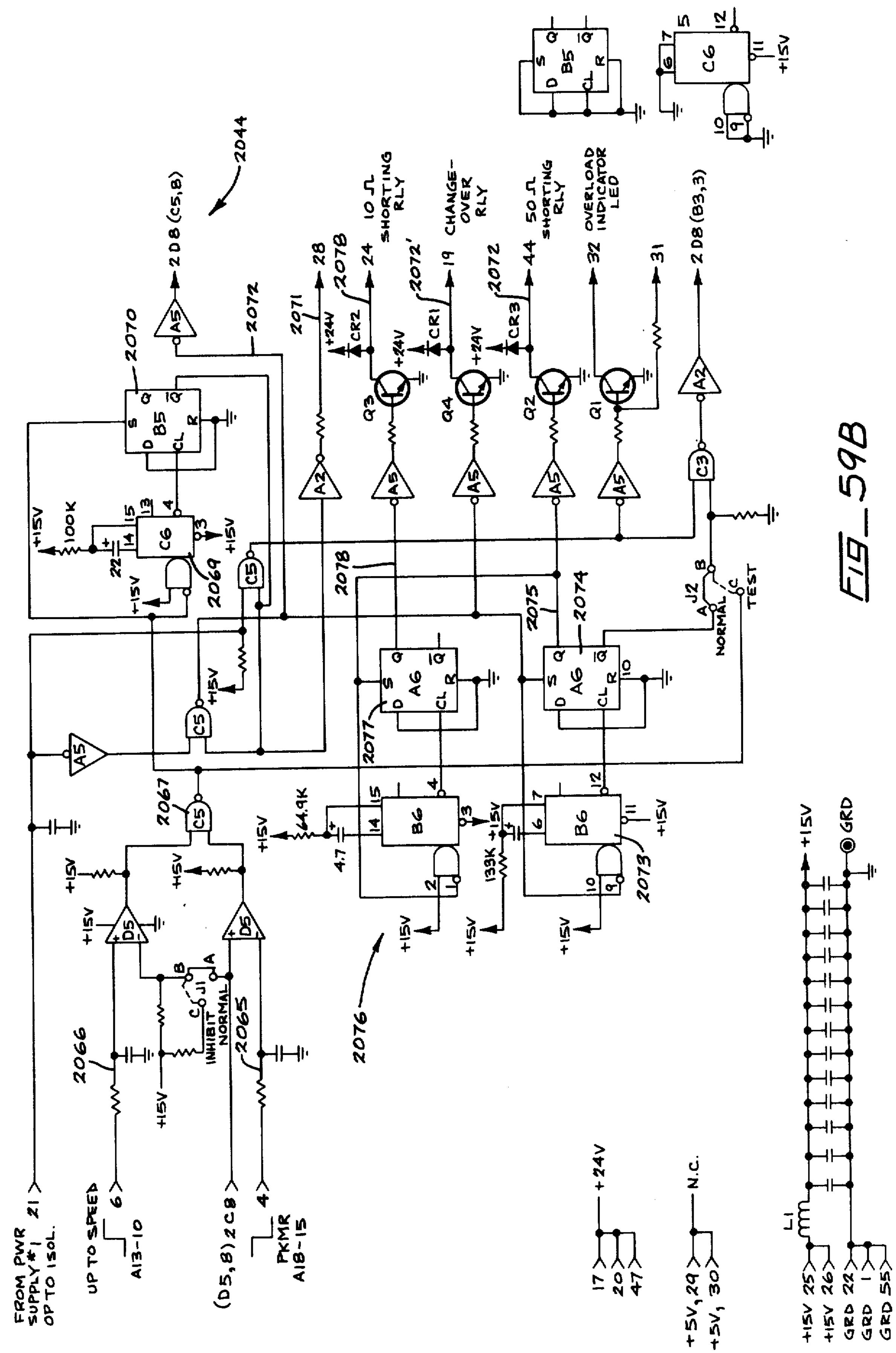
FIG_59B

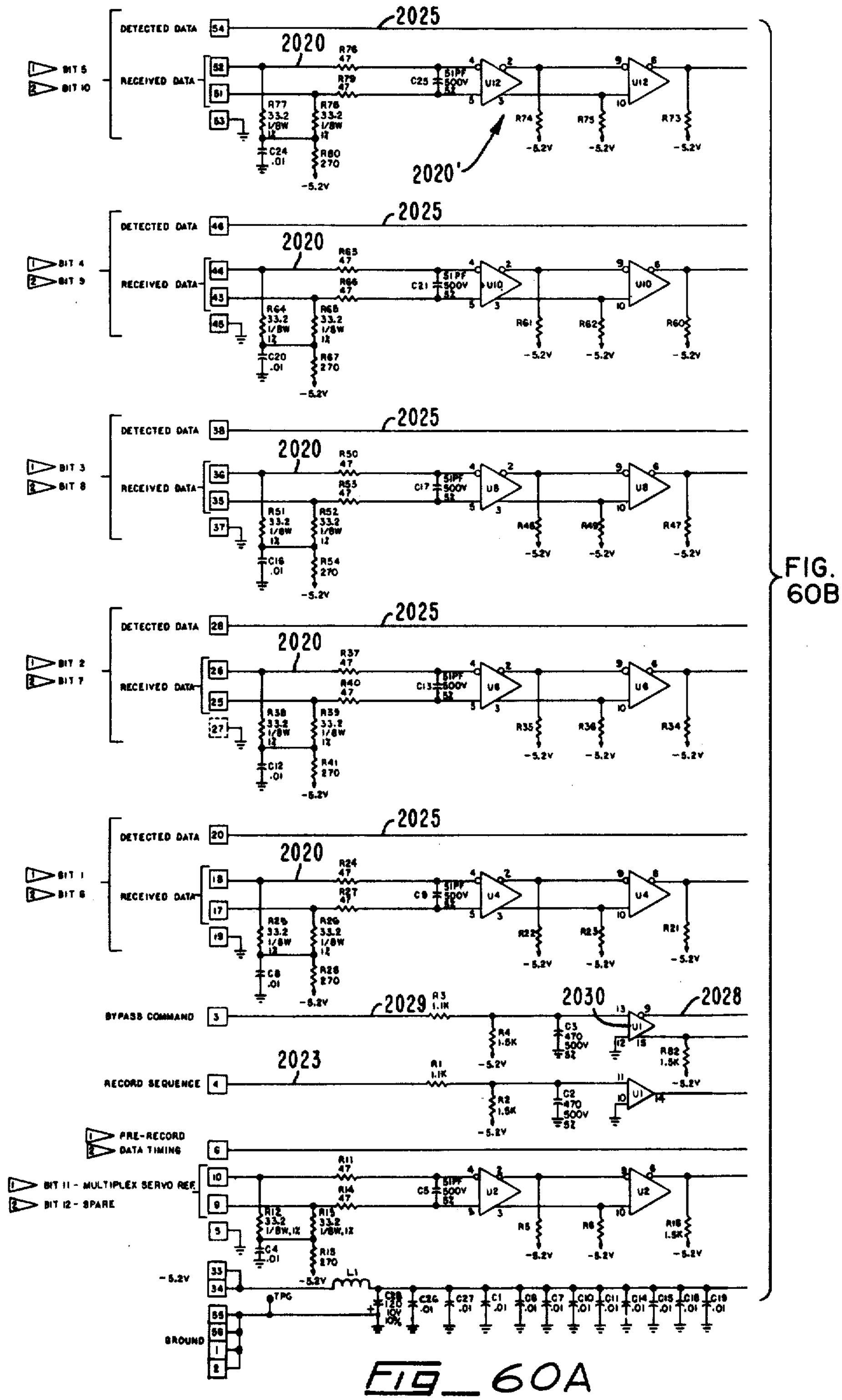
FIG_60A

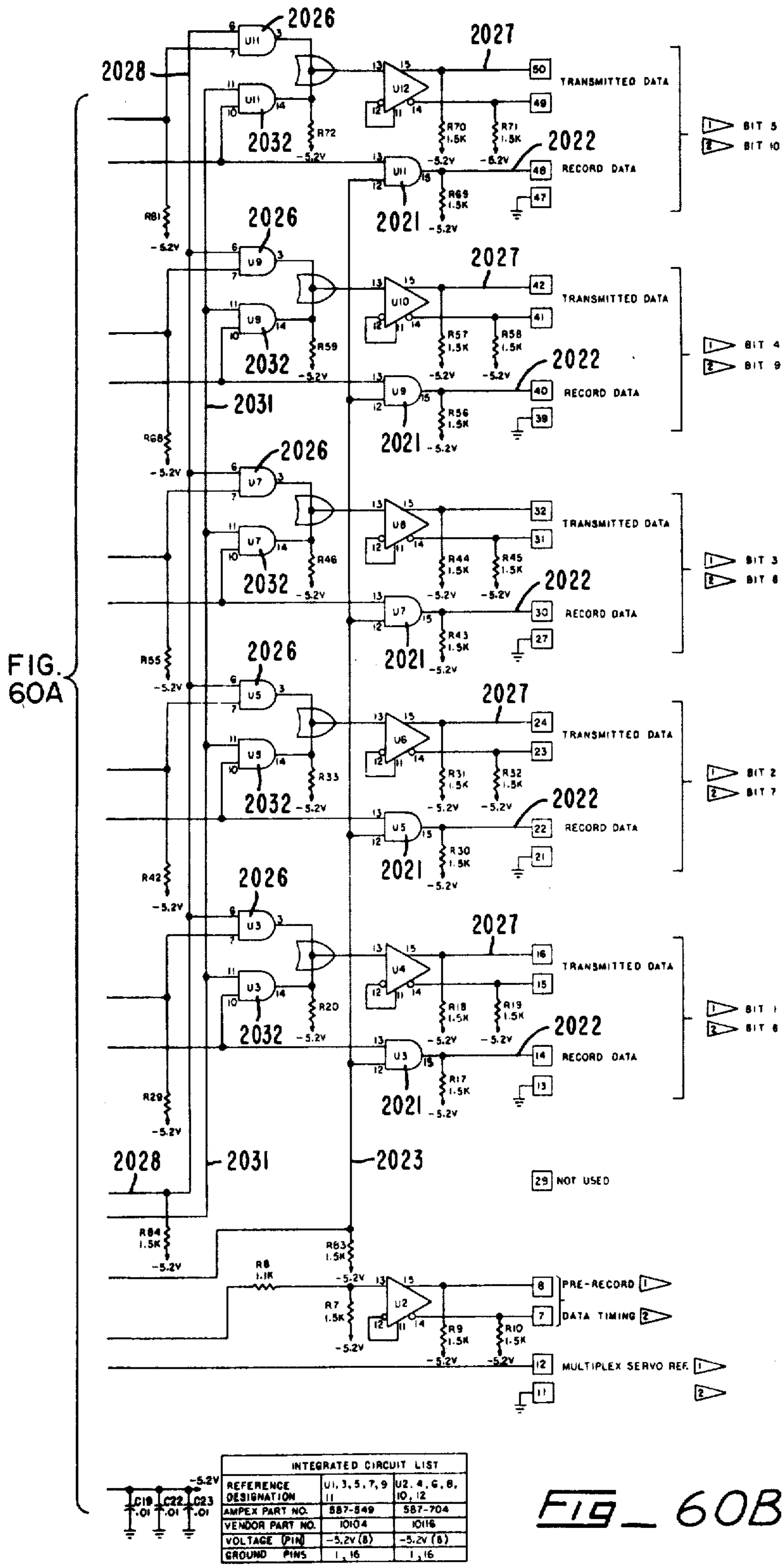
| INTEGRATED CIRCUIT LIST | | |
|---|---|---|
| REFERENCE DESIGNATION | U1, 3, 5, 7, 9, 11 | U2, 4, 6, 8, 10, 12 |
| AMPEX PART NO. | 557-549 | 587-704 |
| VENDOR PART NO. | 10104 | 10116 |
| VOLTAGE (PIN) | -5.2V (8) | -5.2V (8) |
| GROUND PINS | 1, 16 | 1, 16 |
FIG_ 60B

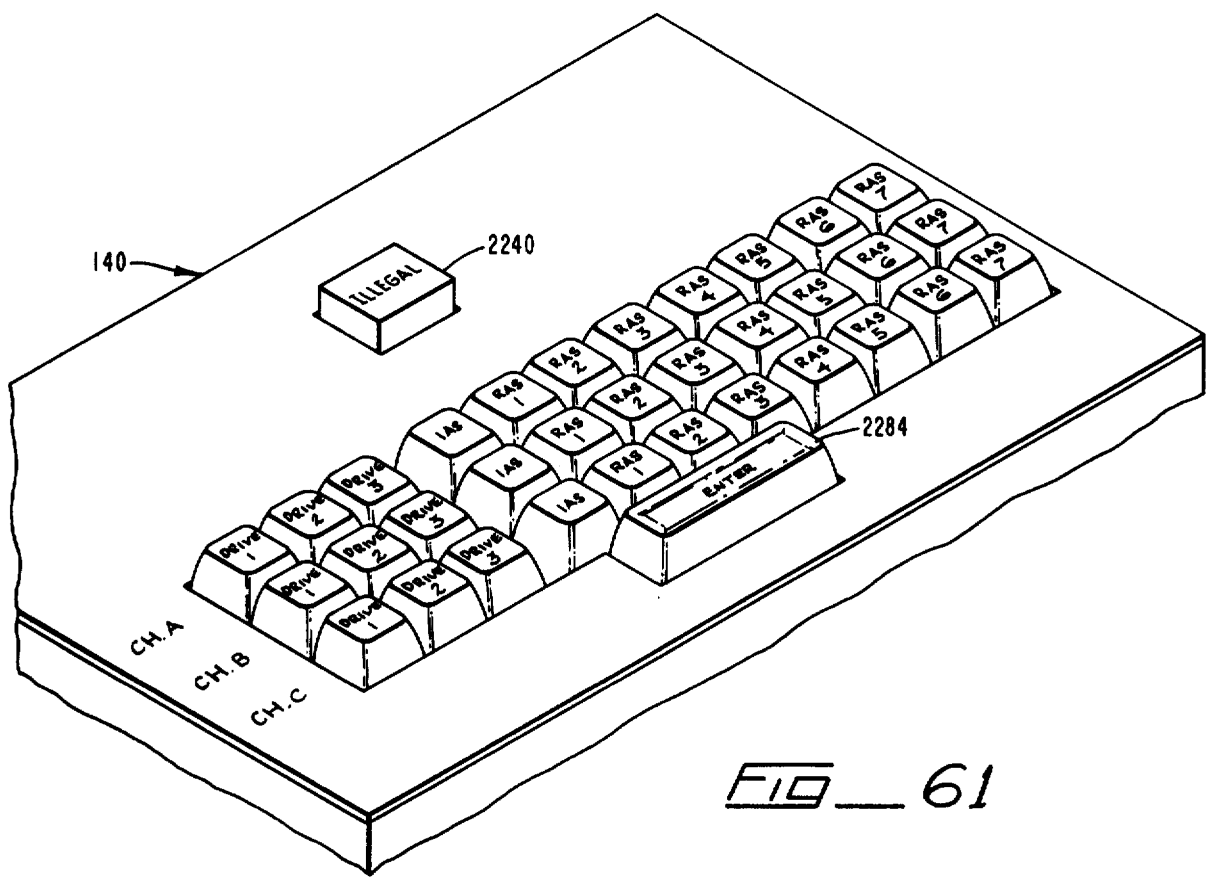
FIG_61

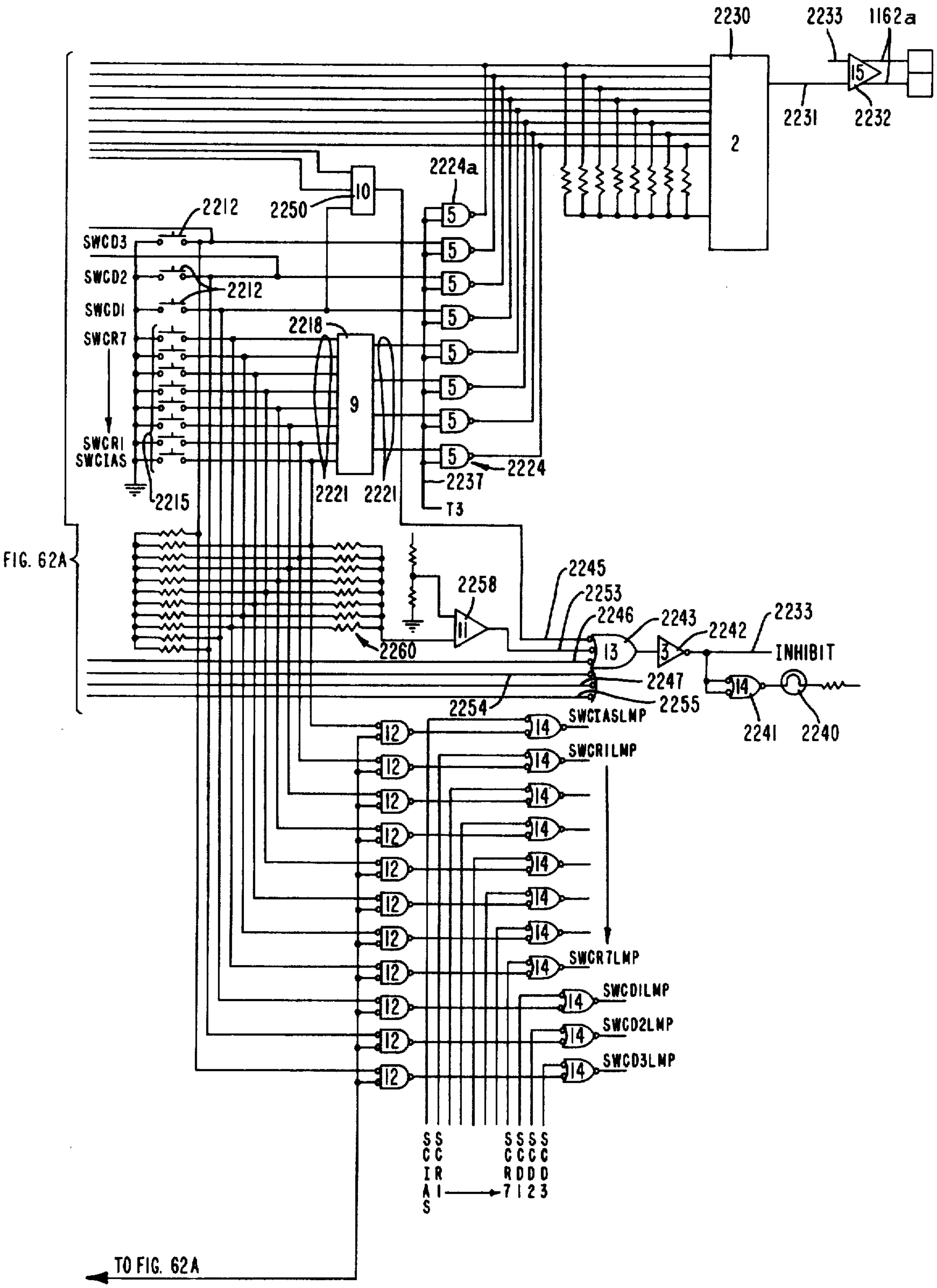
FIG_62B

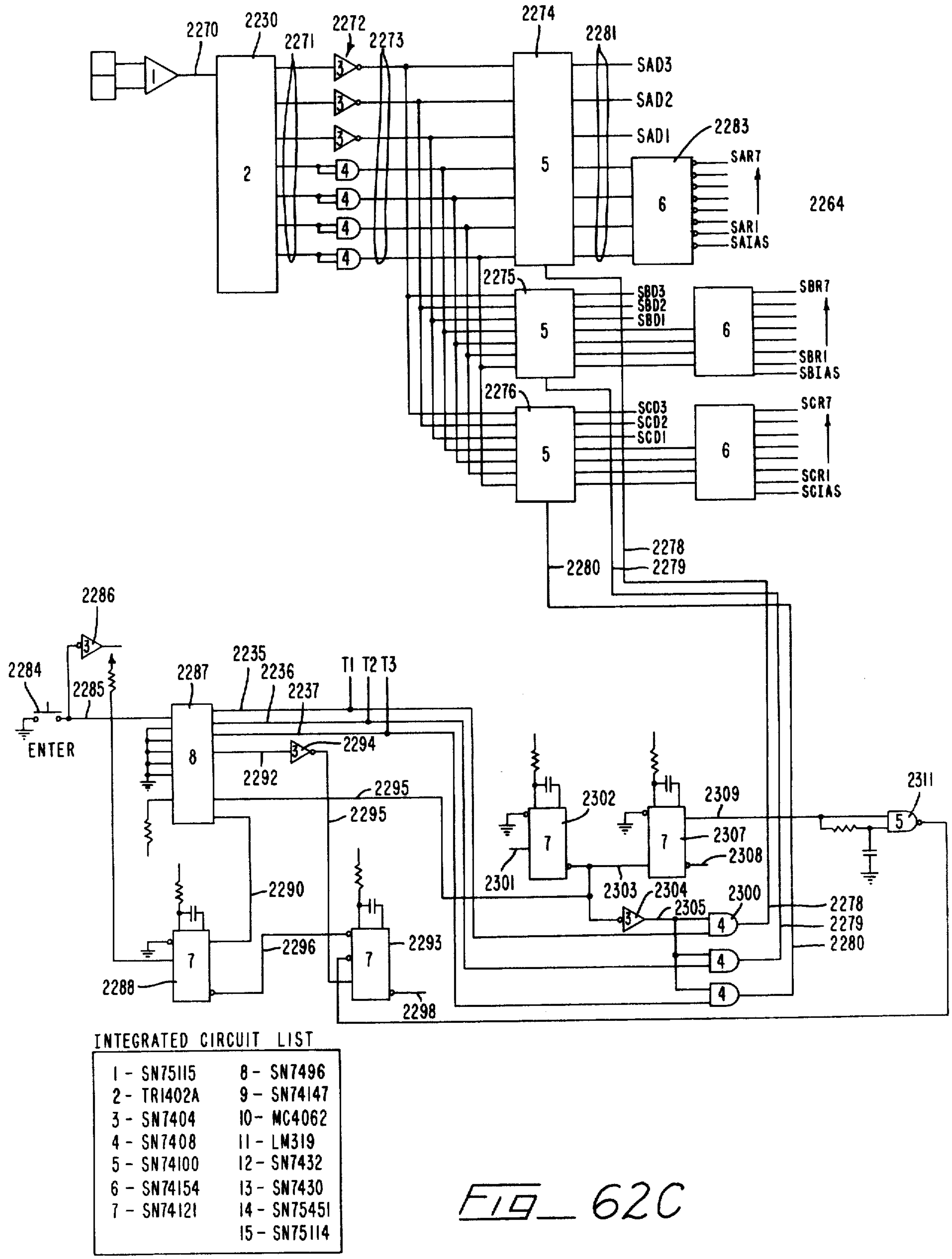
INTEGRATED CIRCUIT LIST
| | |
|---|---|
| 1 - SN75115 | 8 - SN7496 |
| 2 - TR1402A | 9 - SN74147 |
| 3 - SN7404 | 10 - MC4062 |
| 4 - SN7408 | 11 - LM319 |
| 5 - SN74100 | 12 - SN7432 |
| 6 - SN74154 | 13 - SN7430 |
| 7 - SN74121 | 14 - SN75451 |
| | 15 - SN75114 |
FIG_ 62C

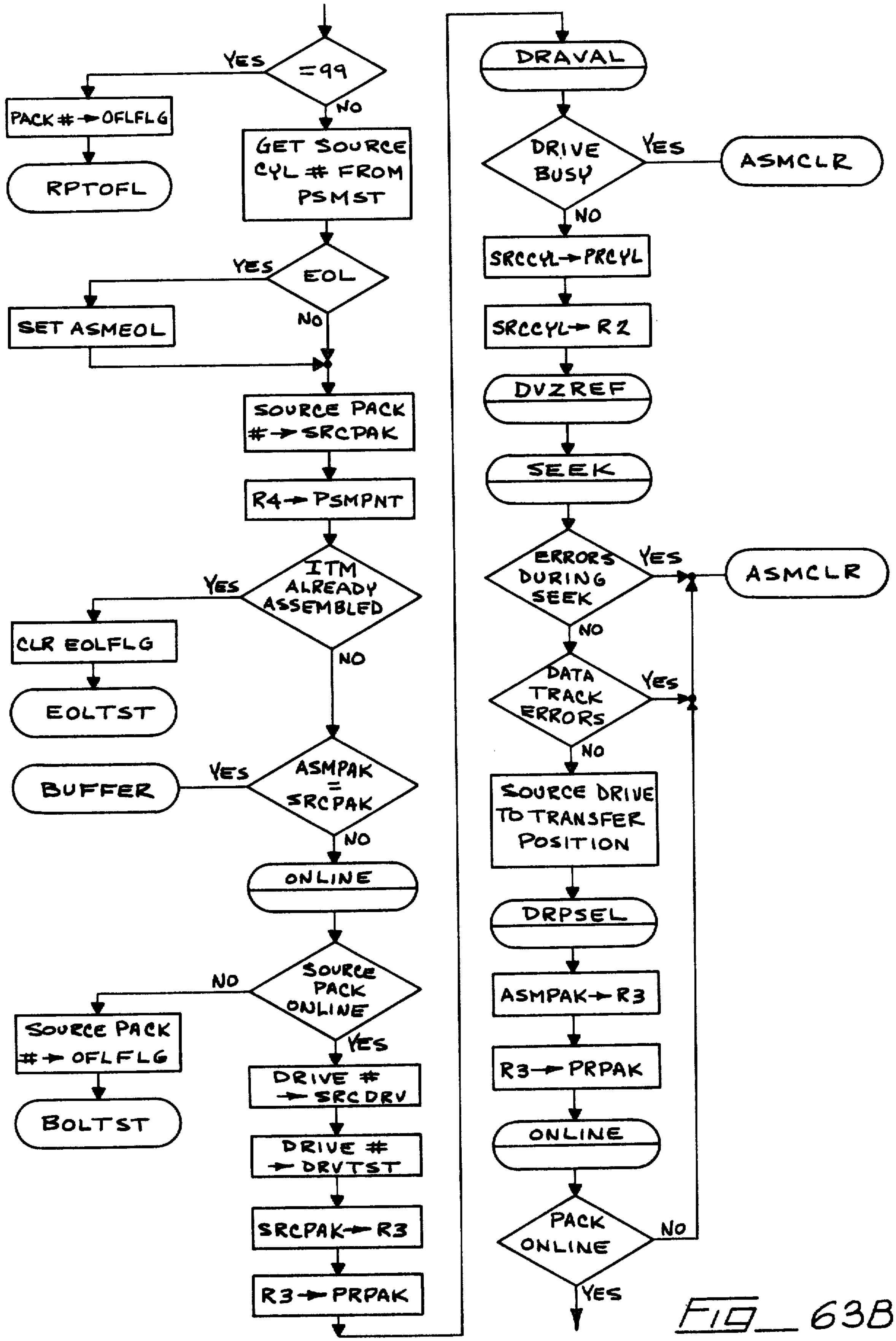
FIG_ 63B

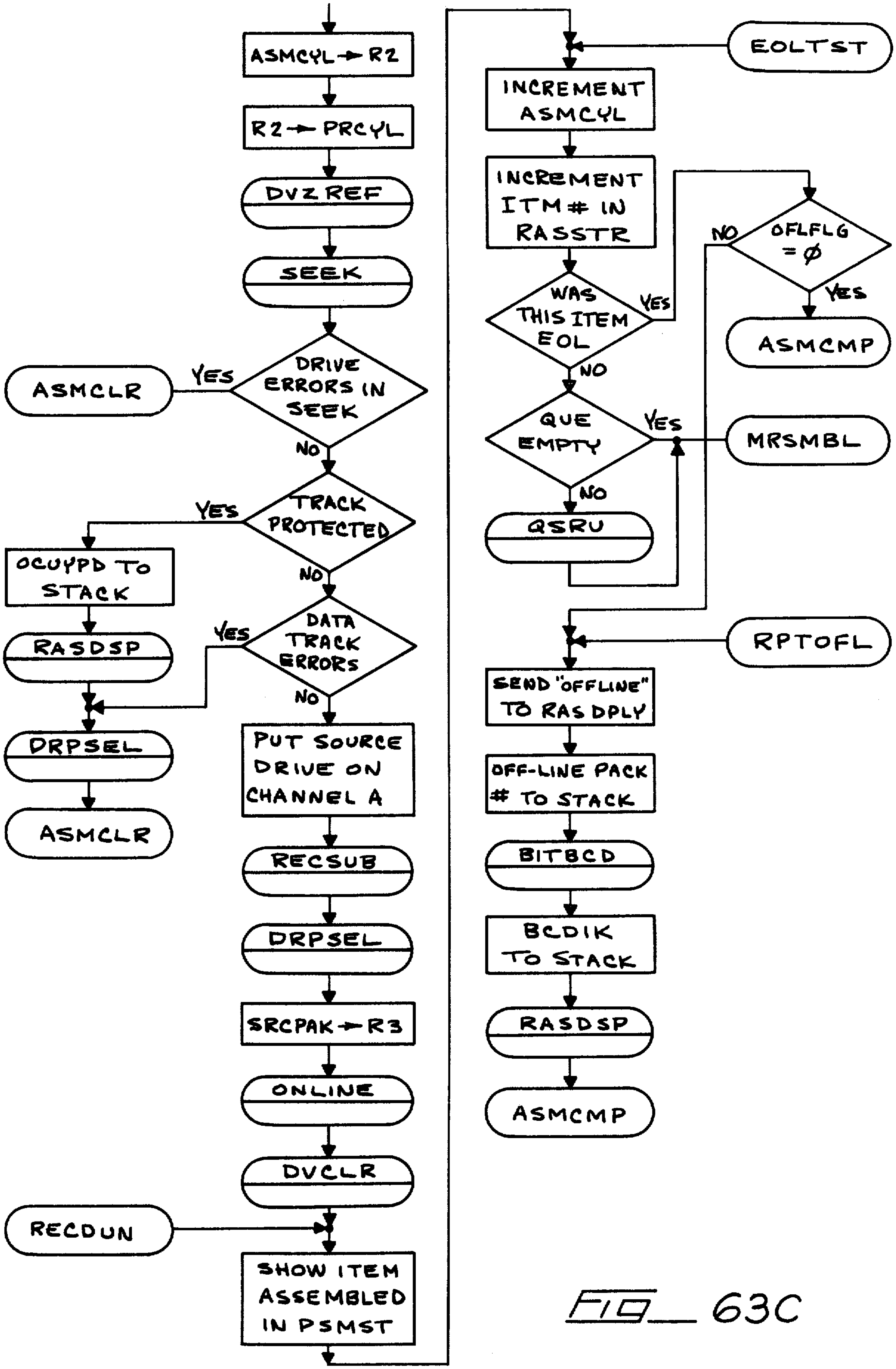
FIG_63C

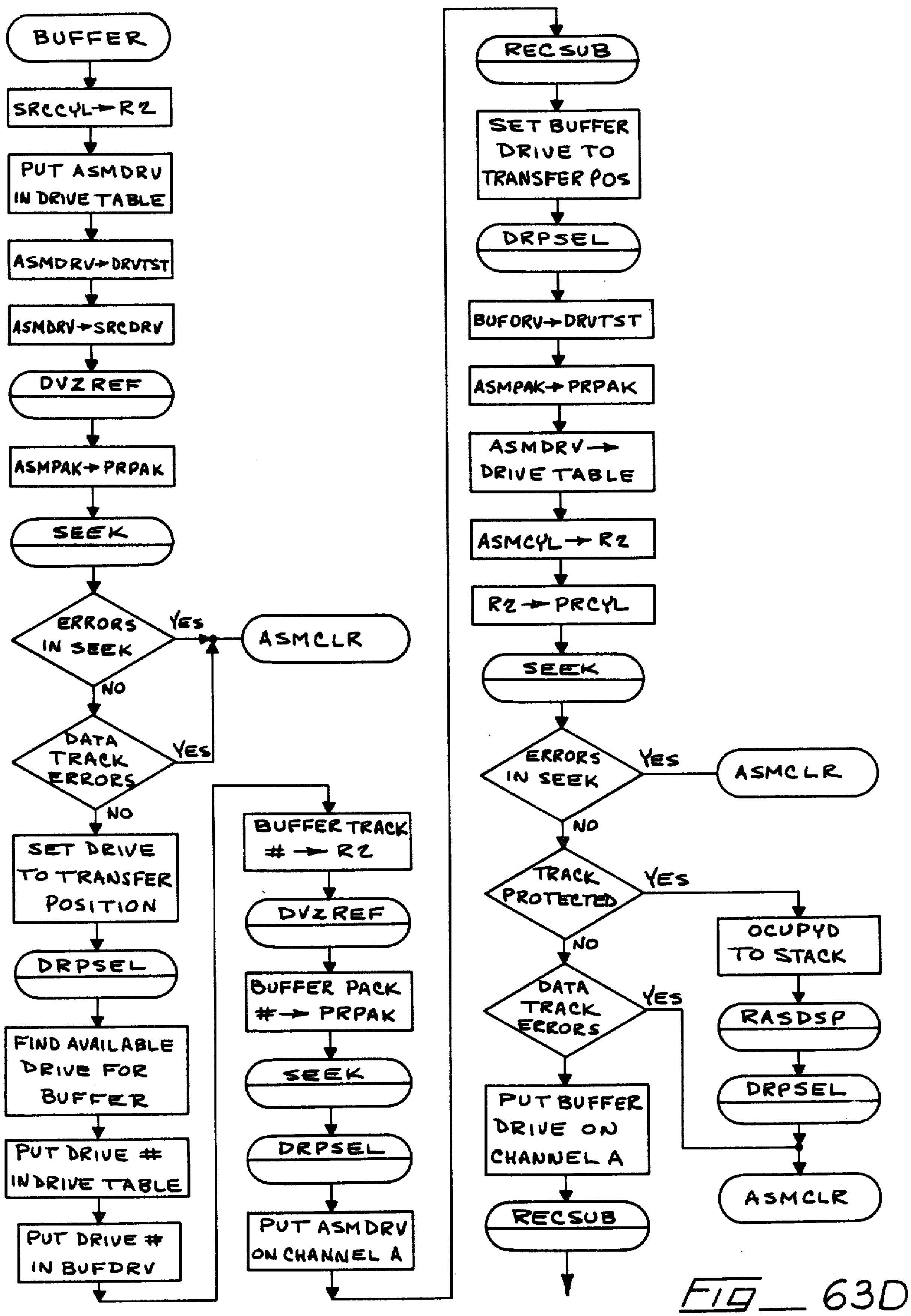
FIG_63D

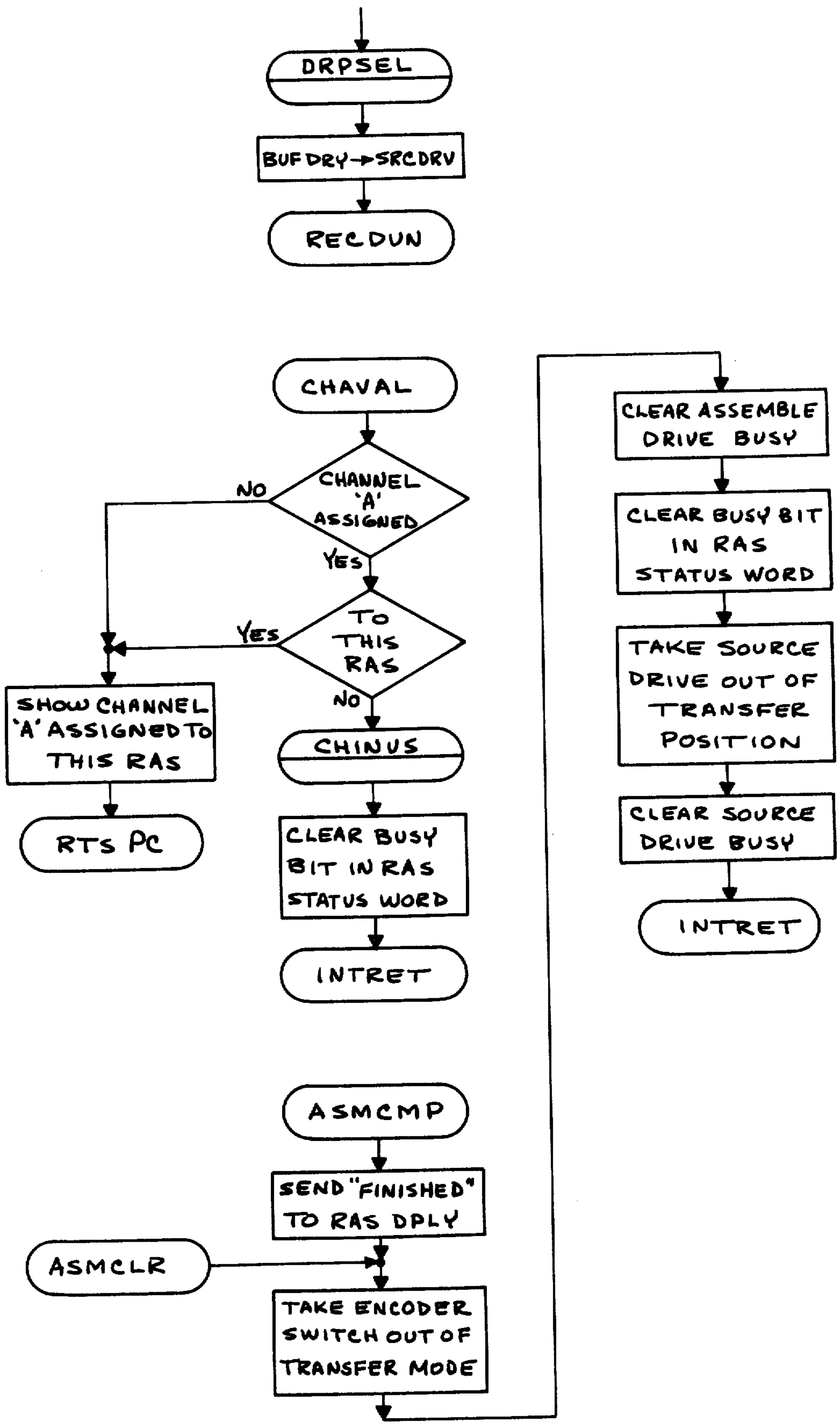
FIG_ 63E

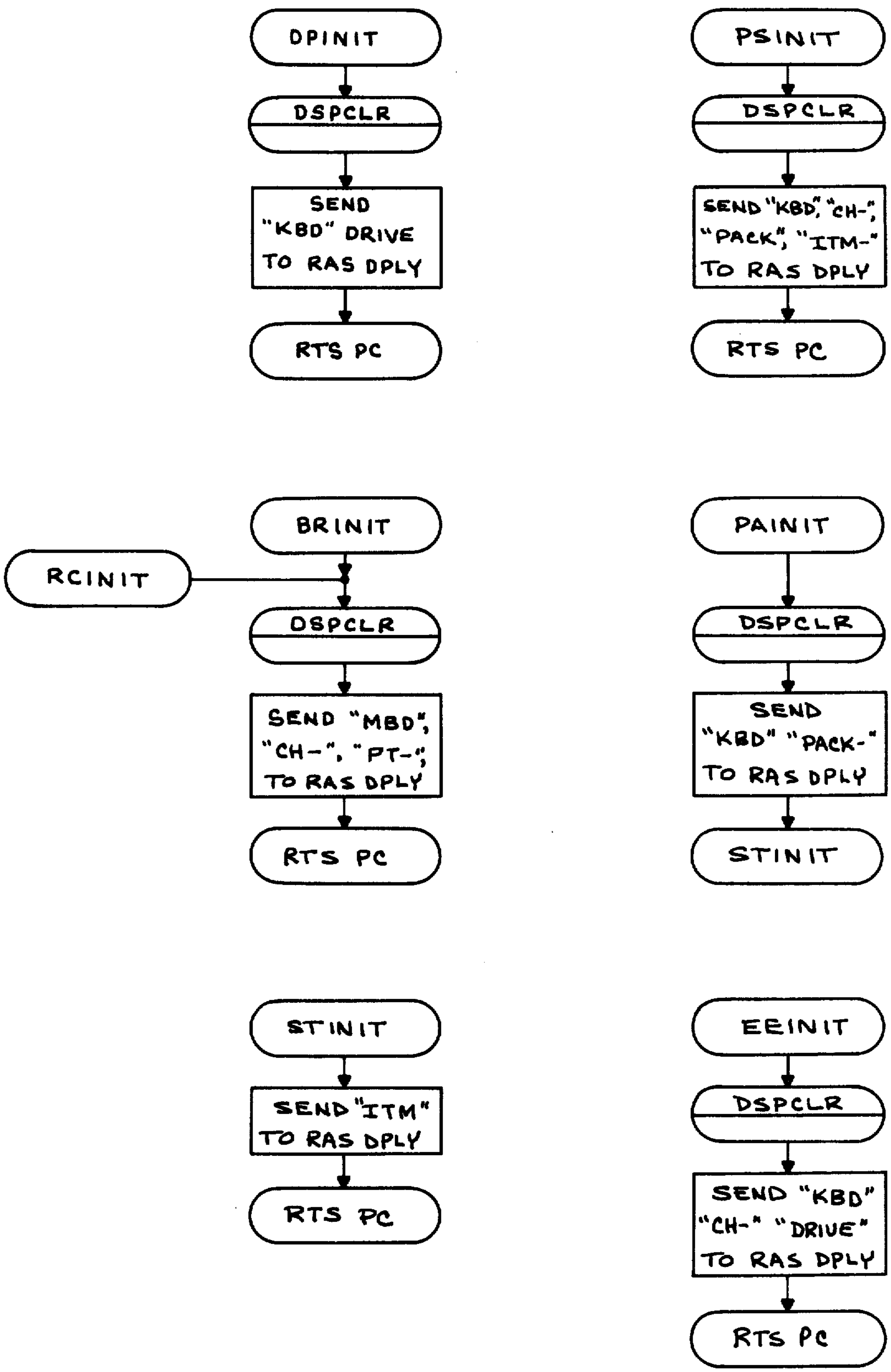
FIG_ 63G

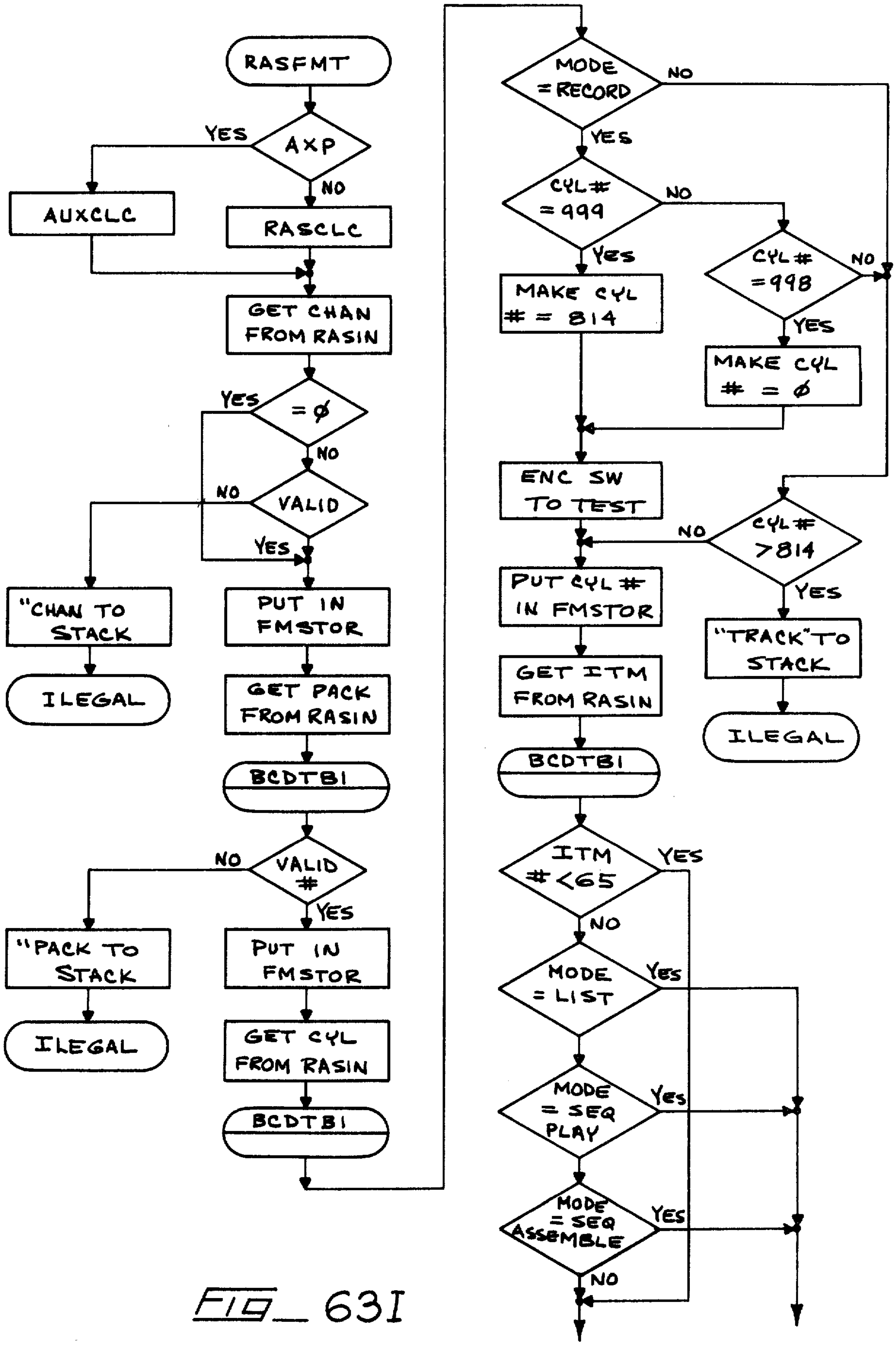
FIG_ 63I

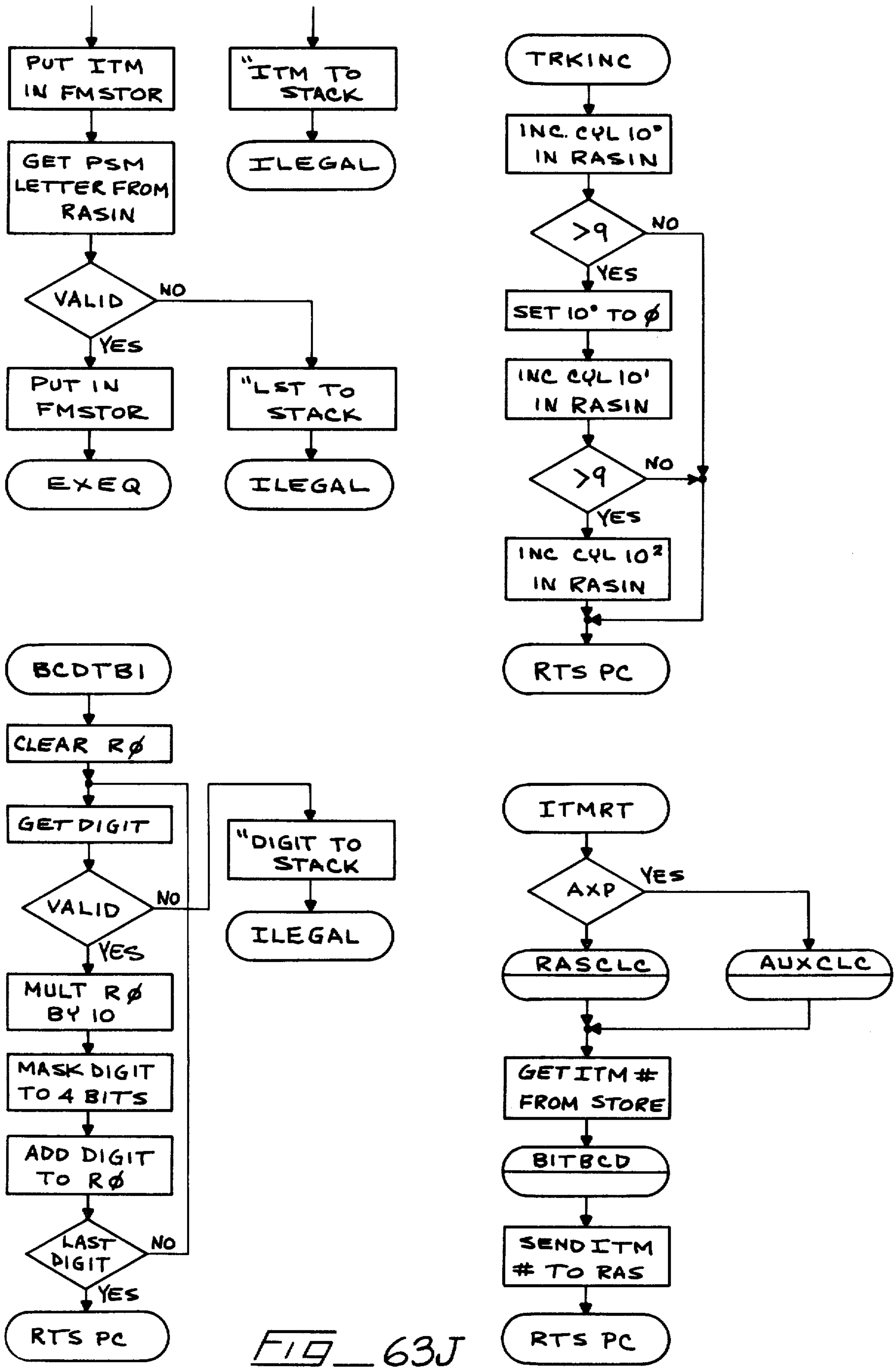
FIG_63J

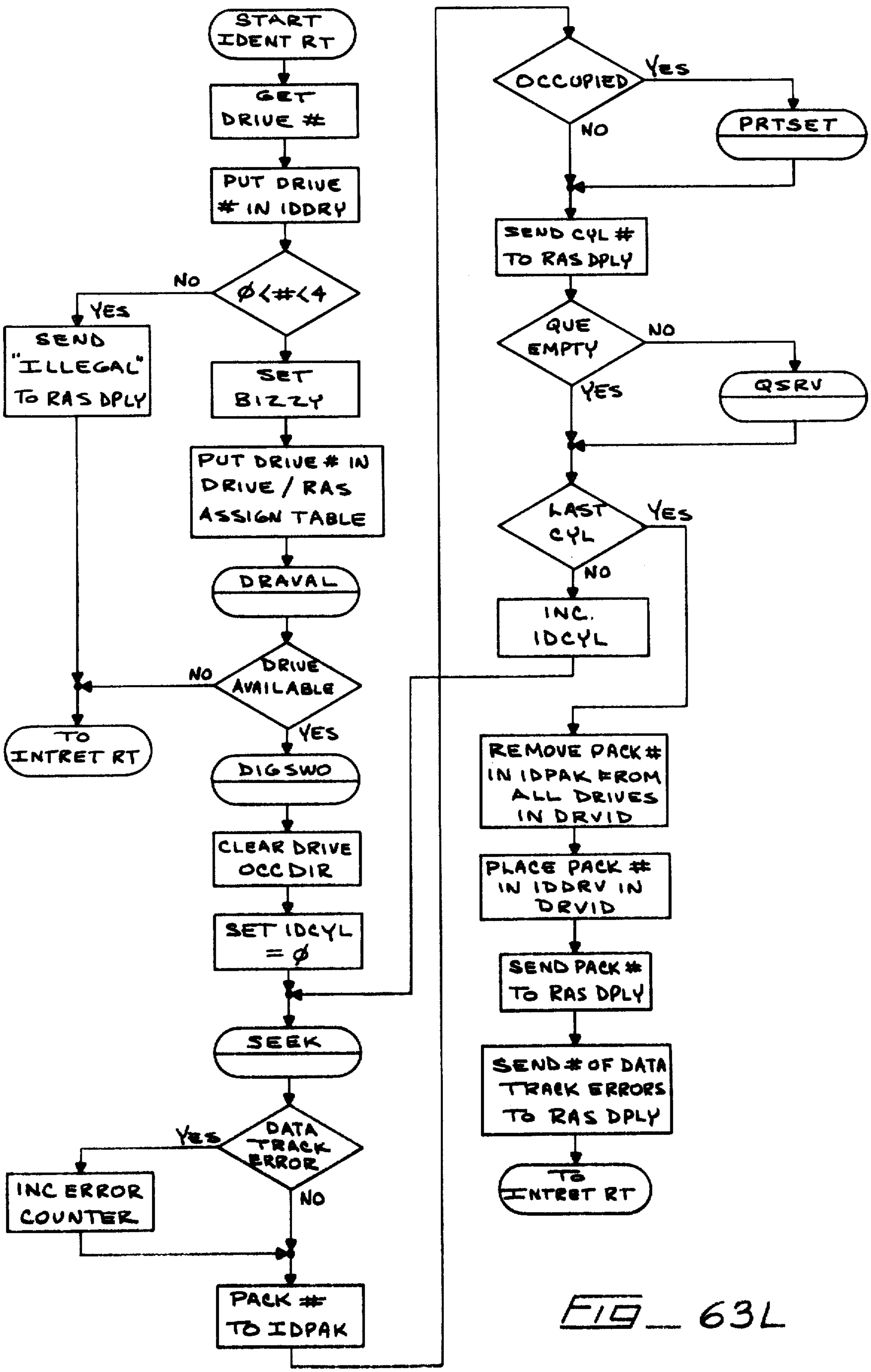
FIG_63L

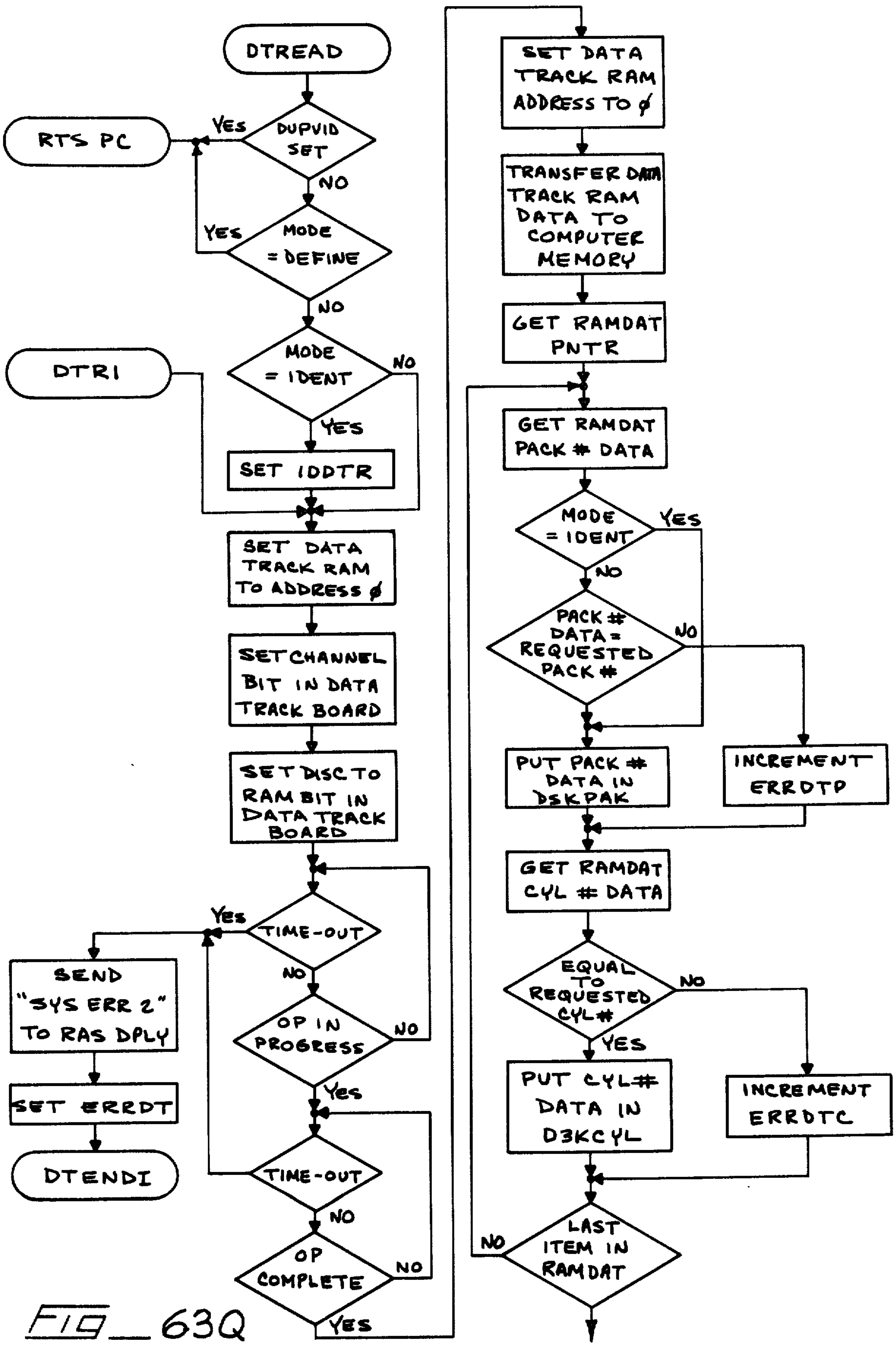
FIG_63Q

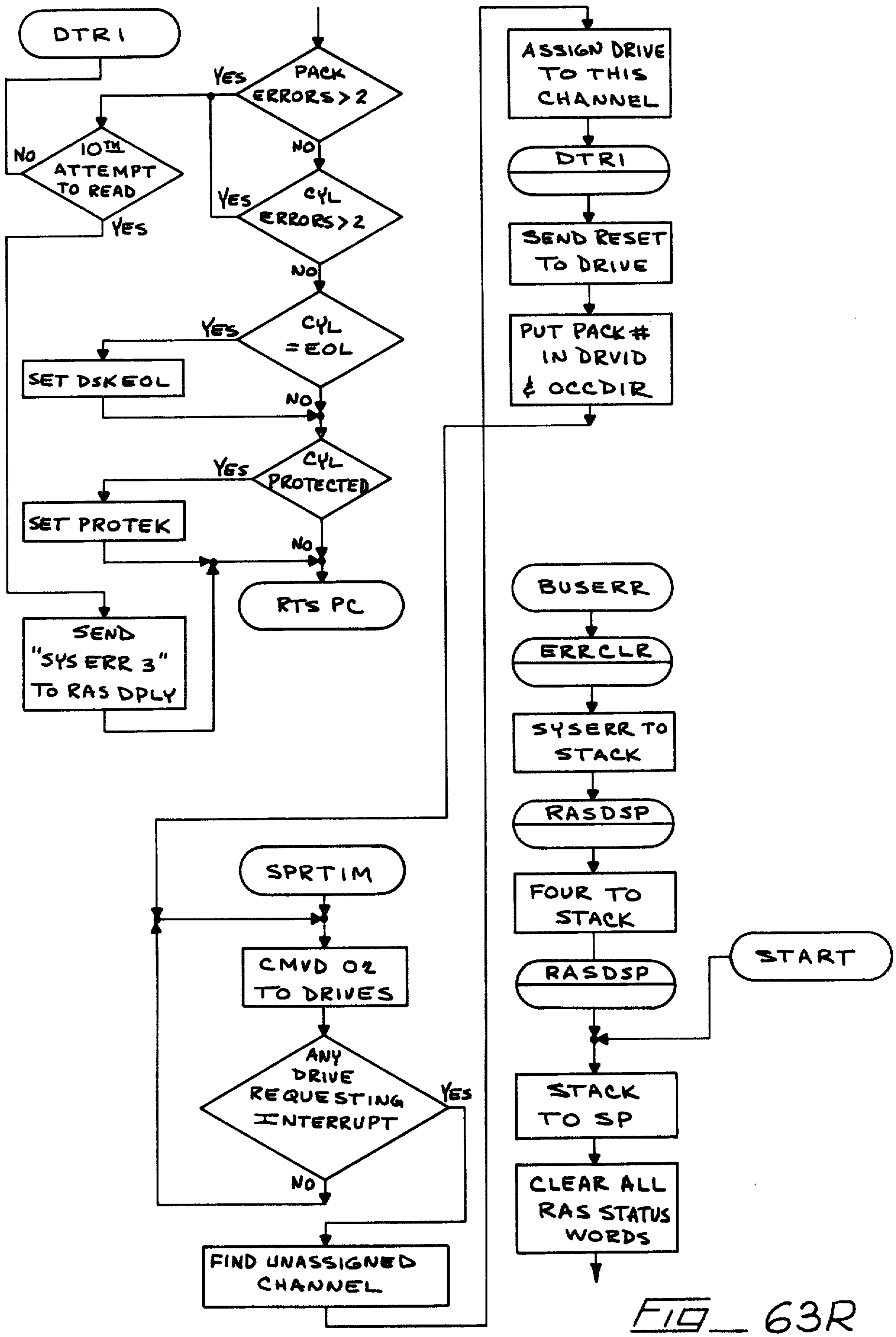
FIG_ 63R

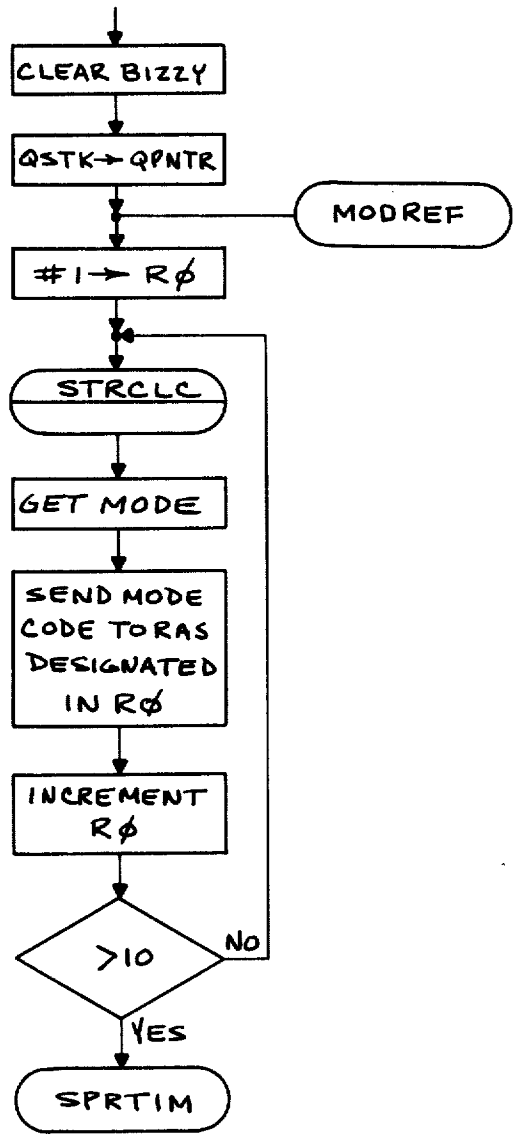
FIG_ 63S

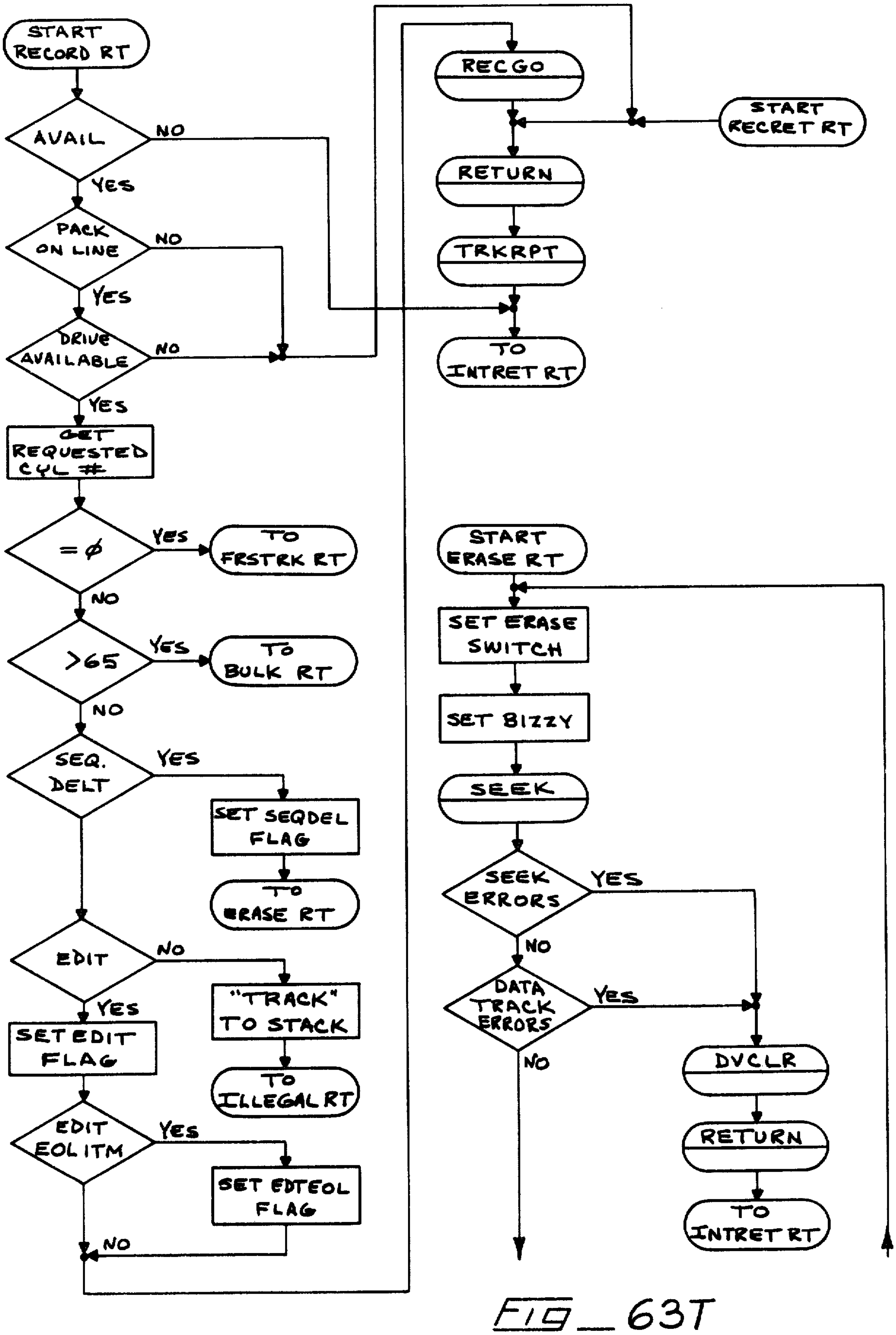
FIG_63T

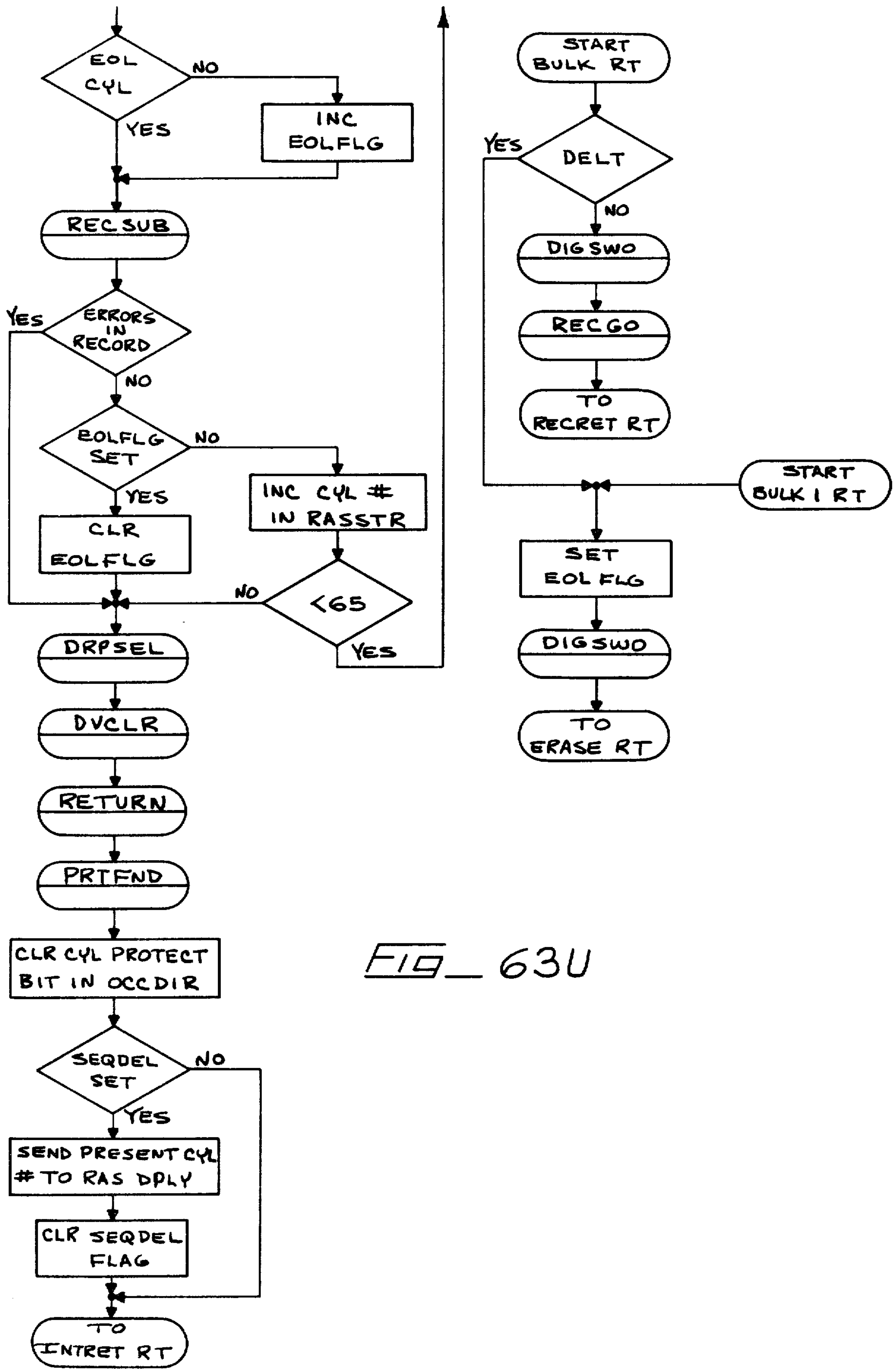
FIG_ 63U

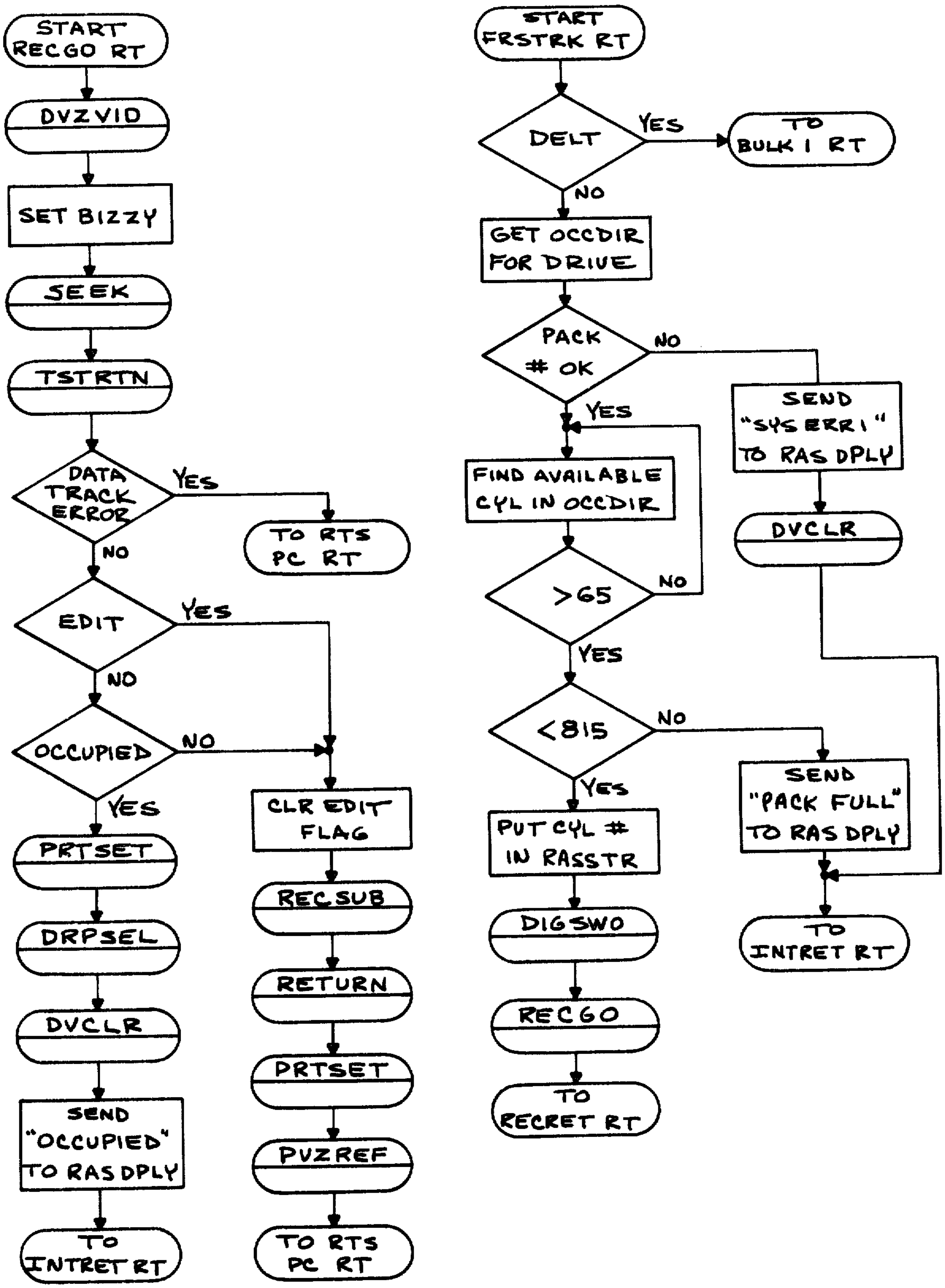
FIG_63V

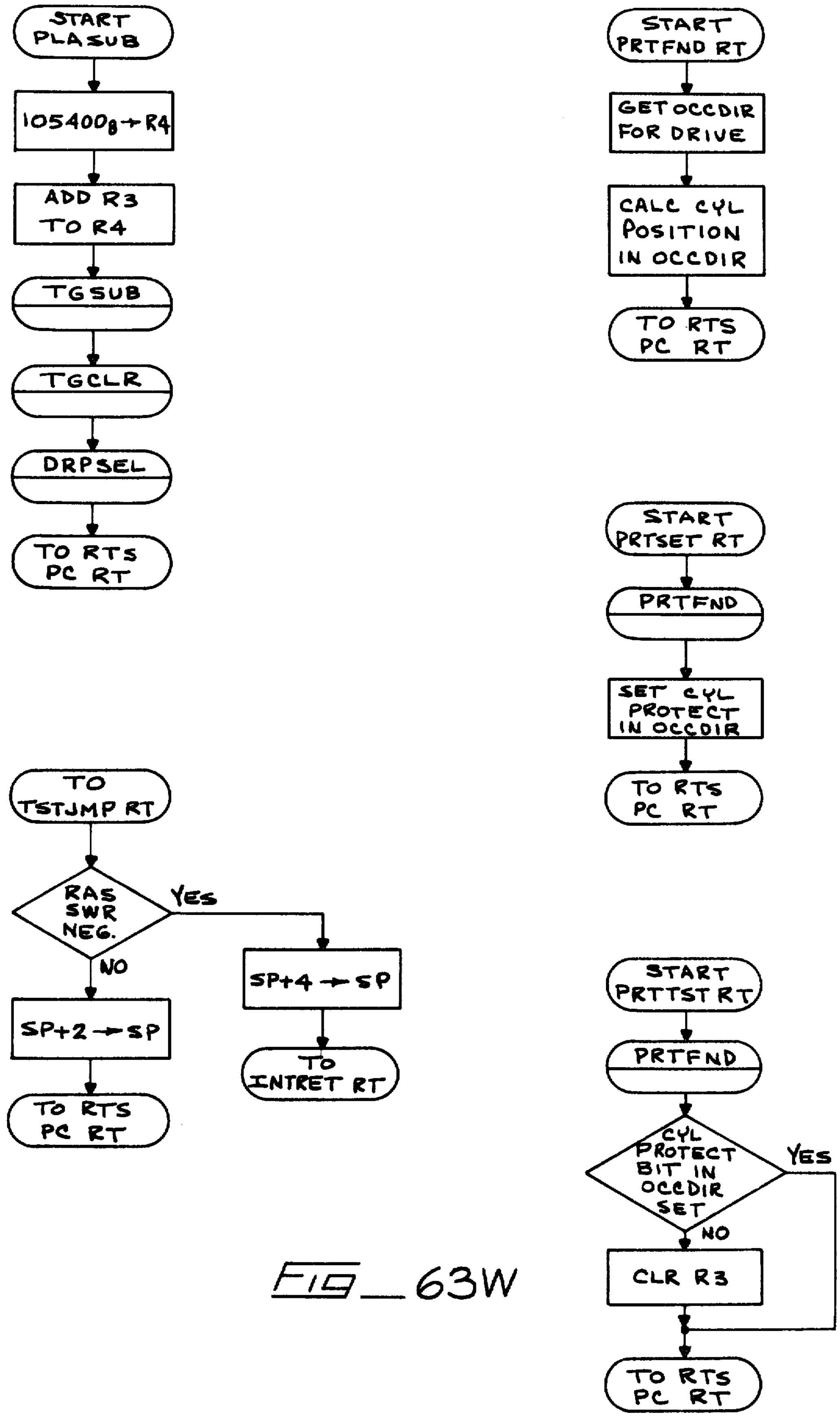
FIG_63W

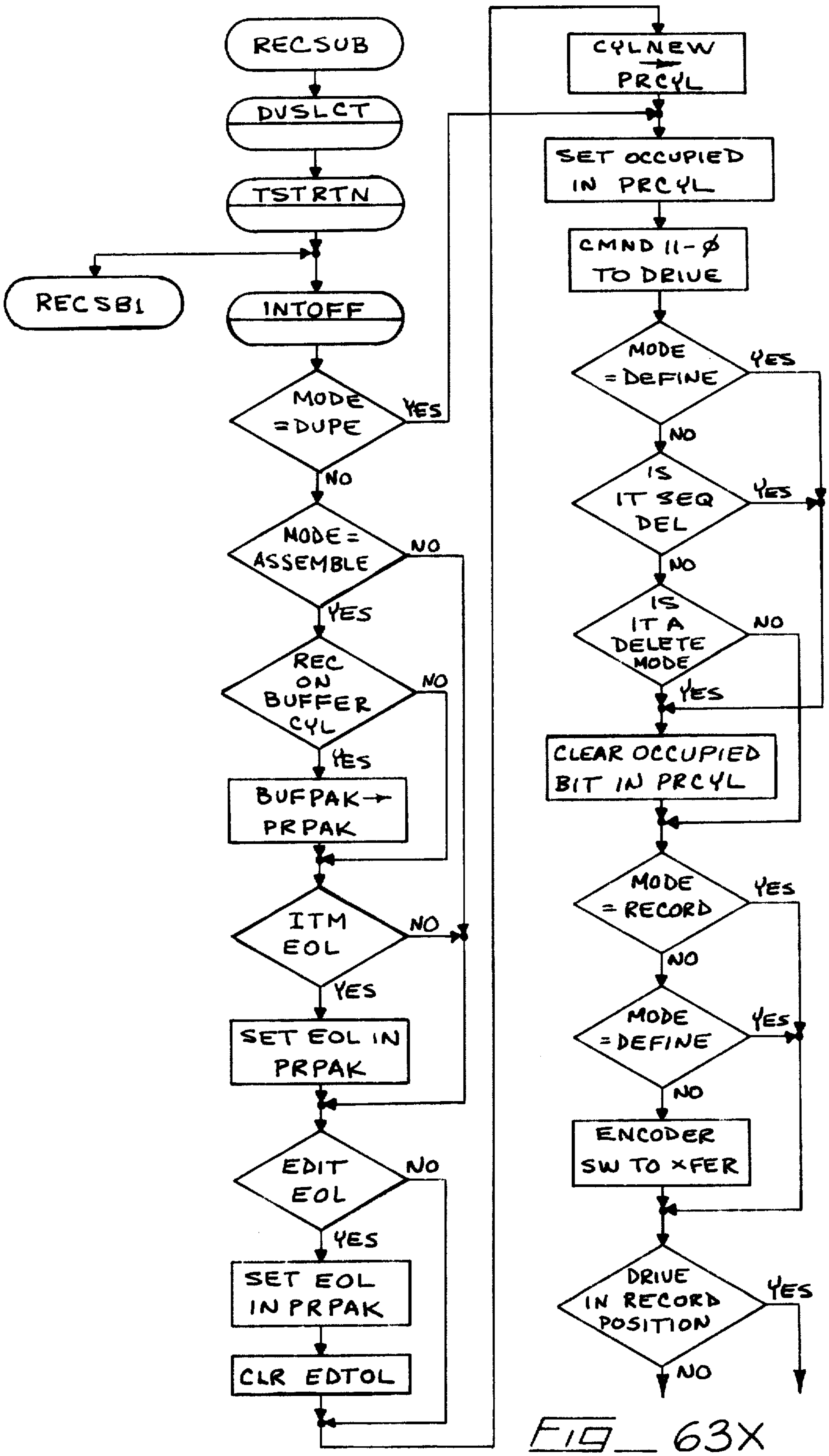
FIG_ 63X

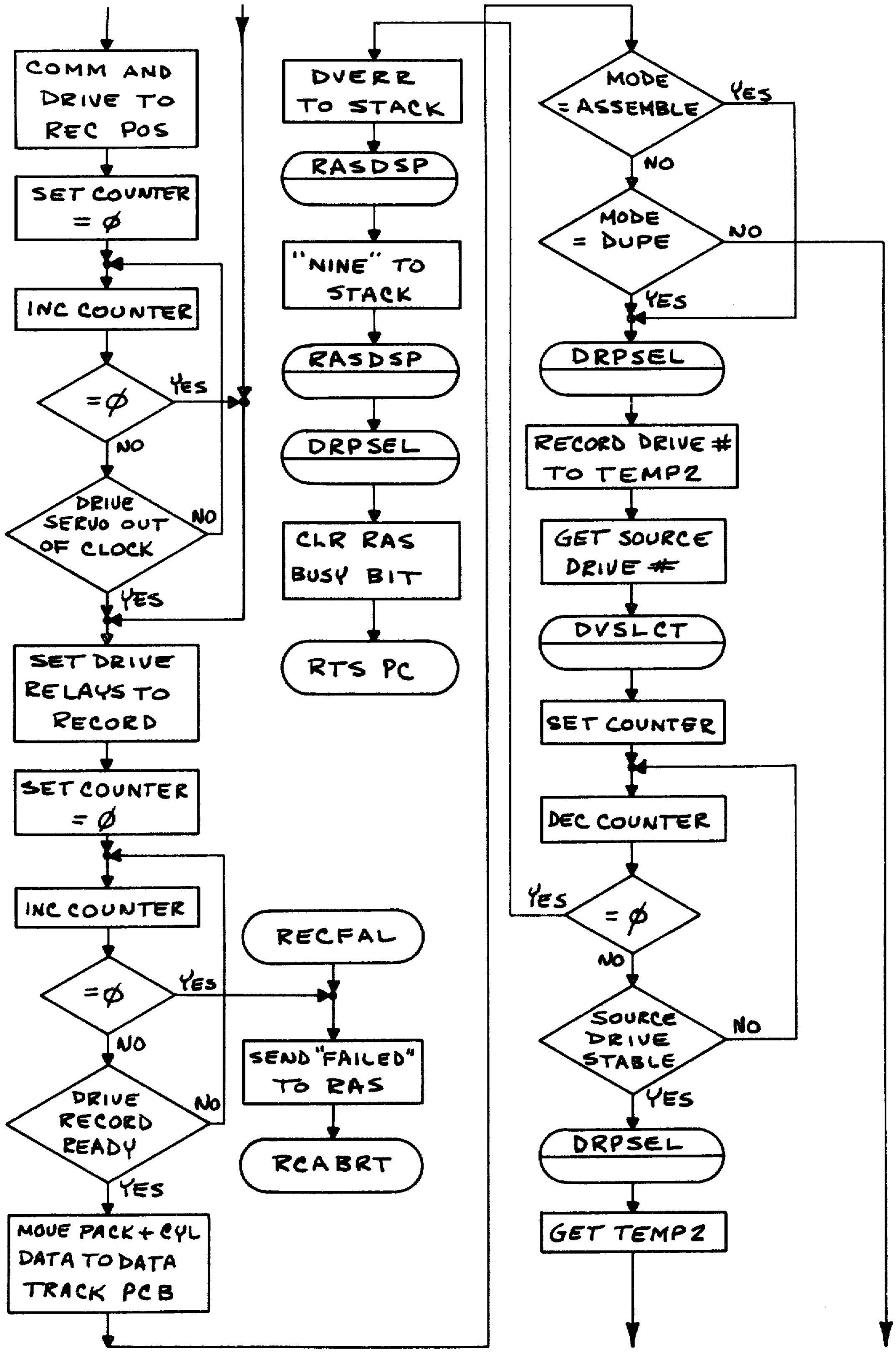
FIG_63Y

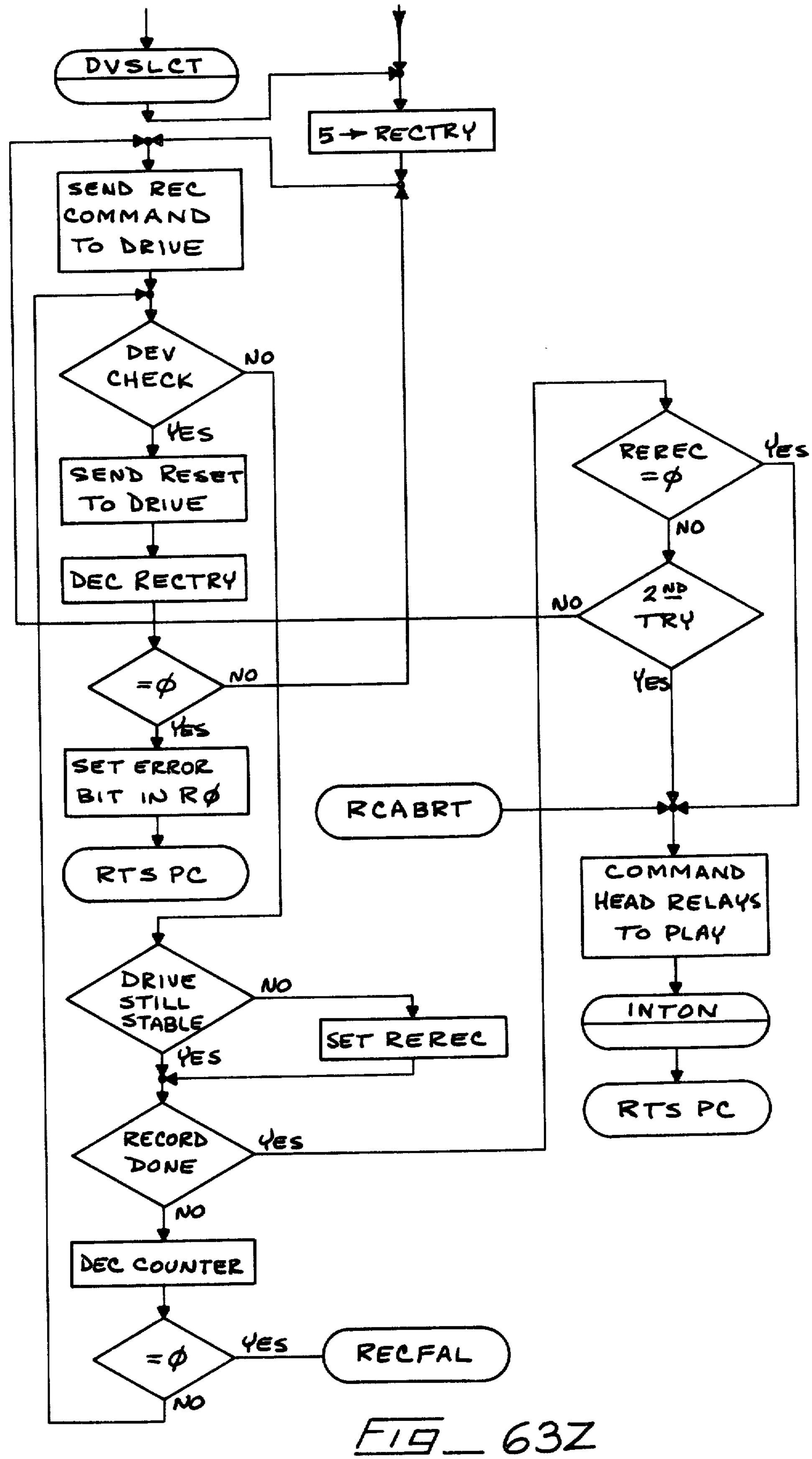
FIG_ 63Z

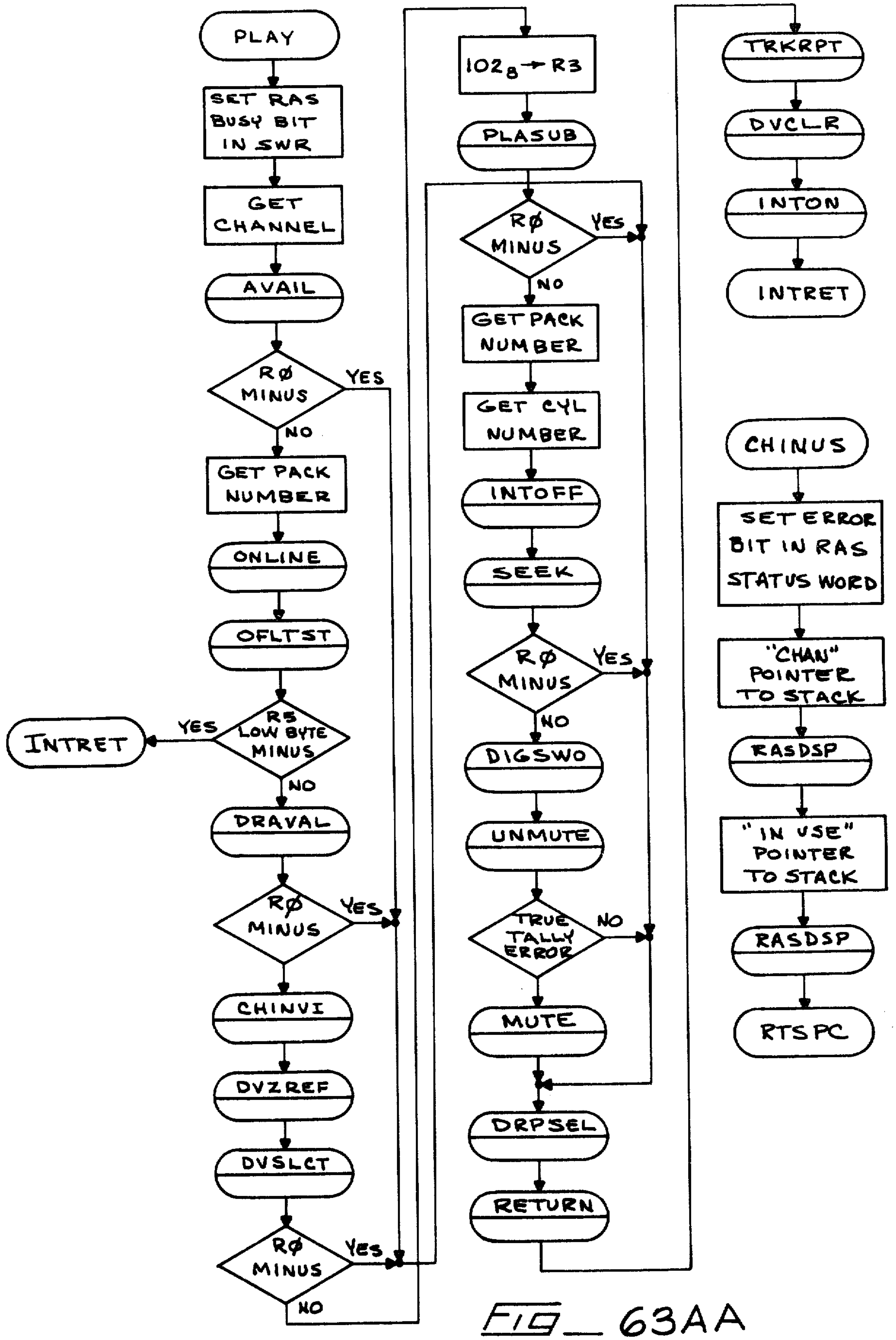
FIG_ 63AA

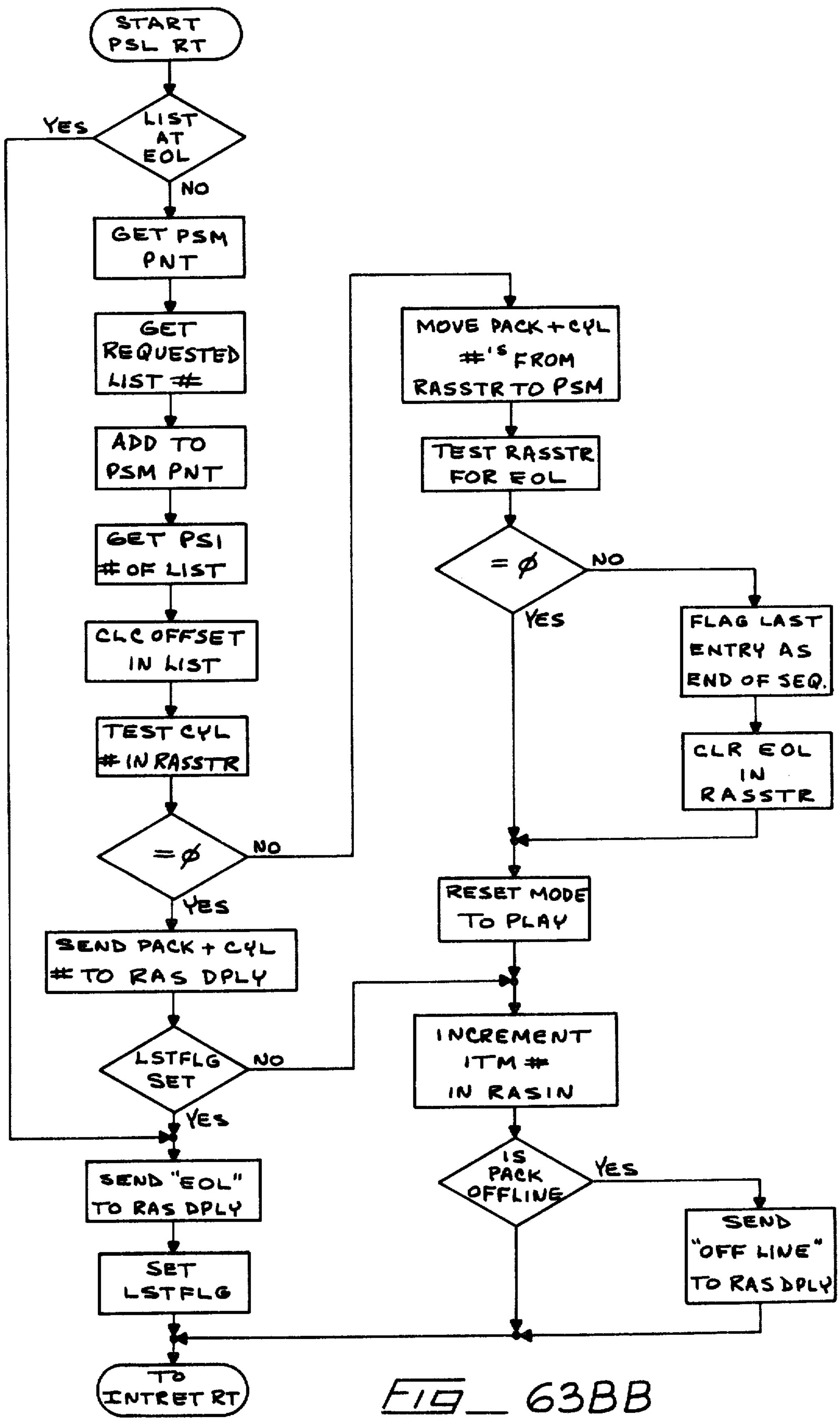
FIG_ 63BB

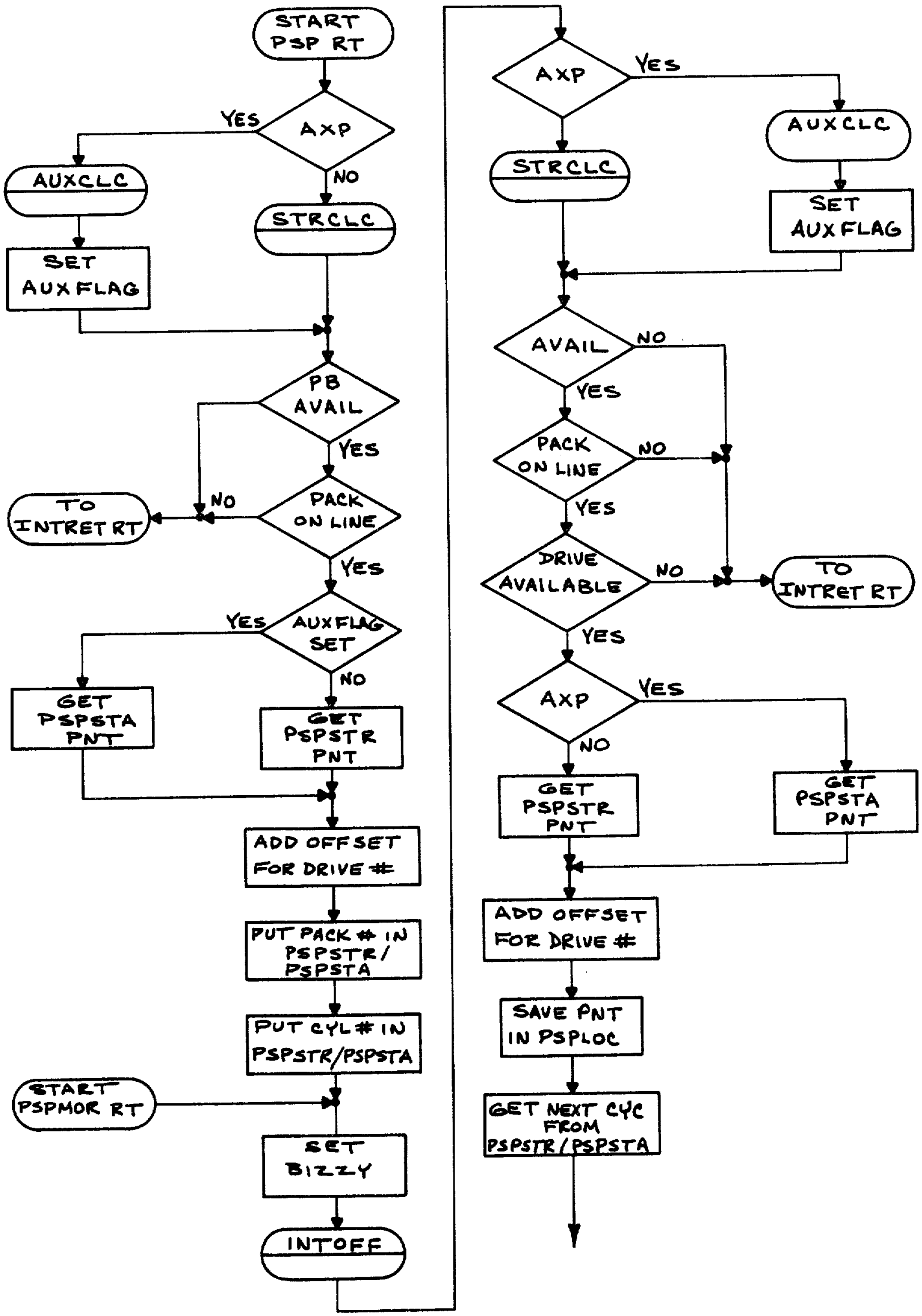
FIG_ 63CC

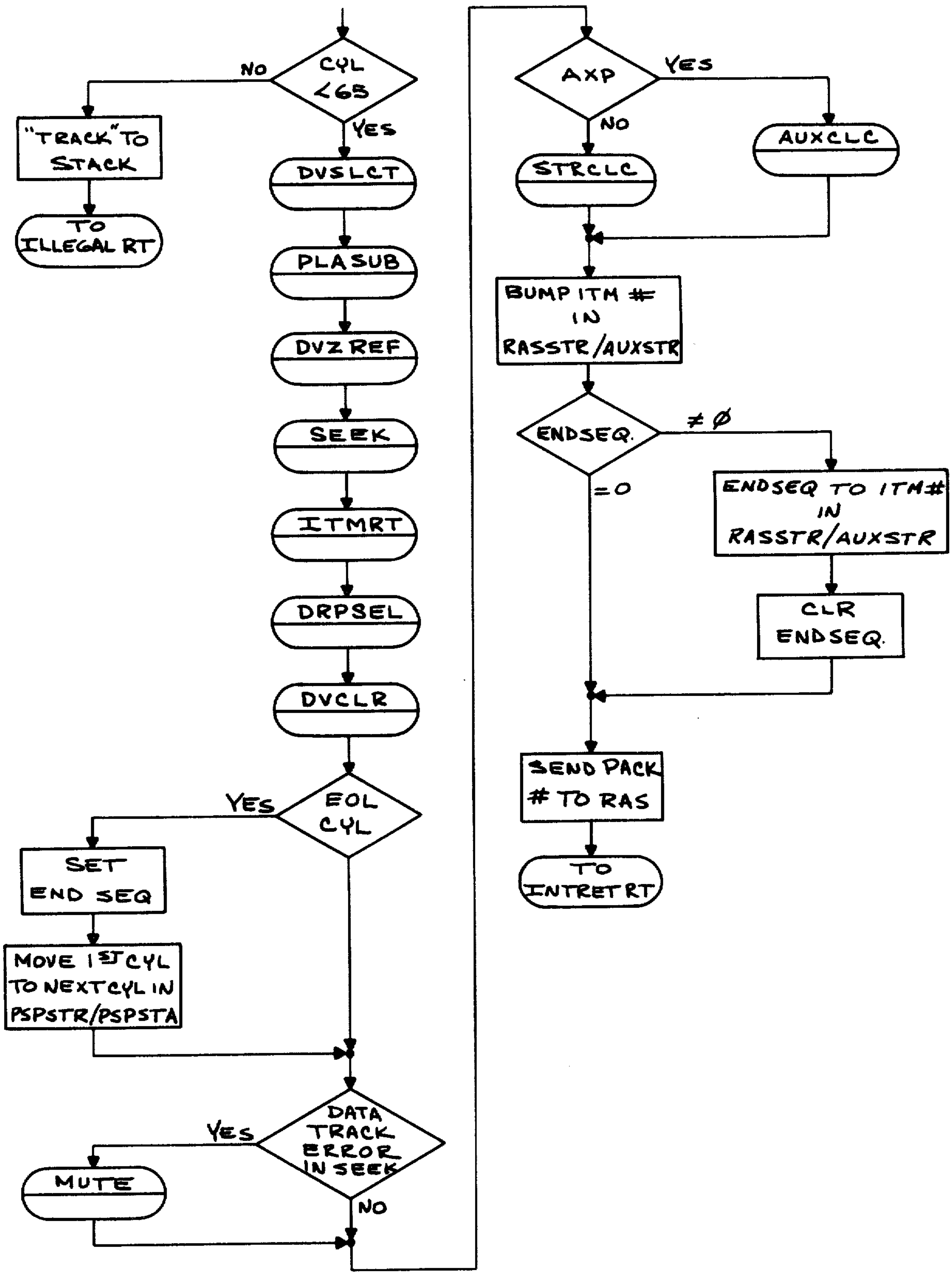
FIG_63DD

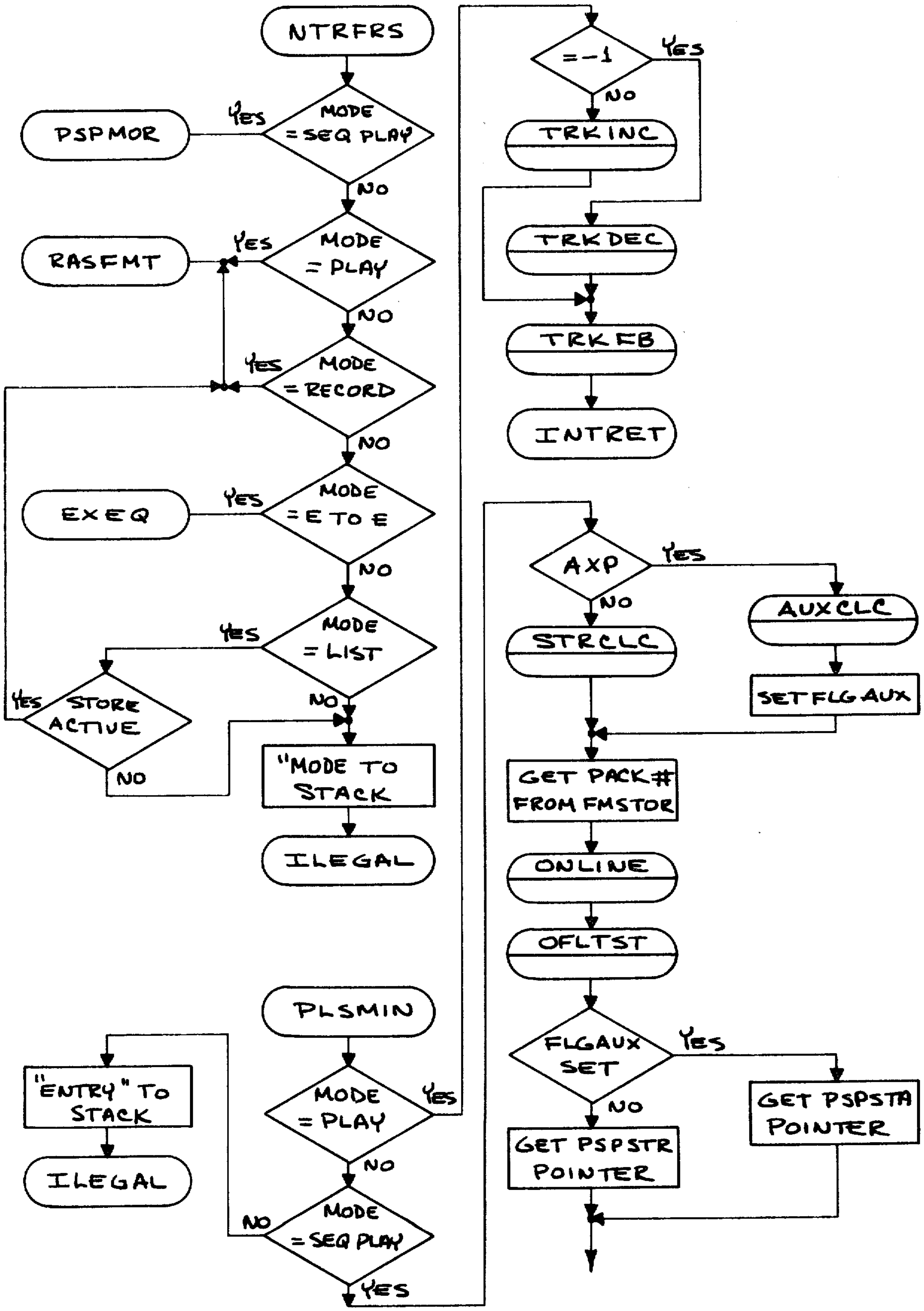
FIG_ 63EE

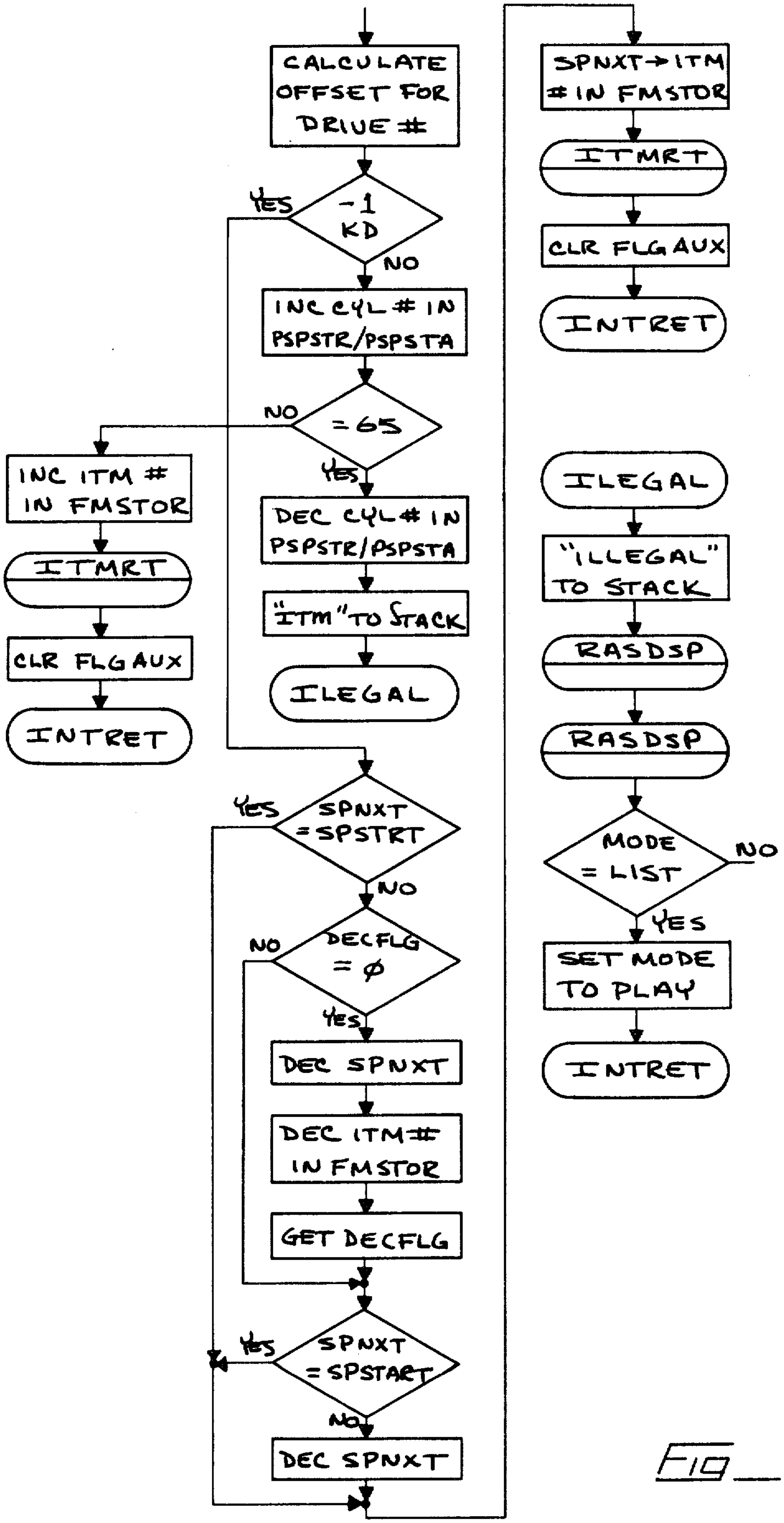
FIG_63FF

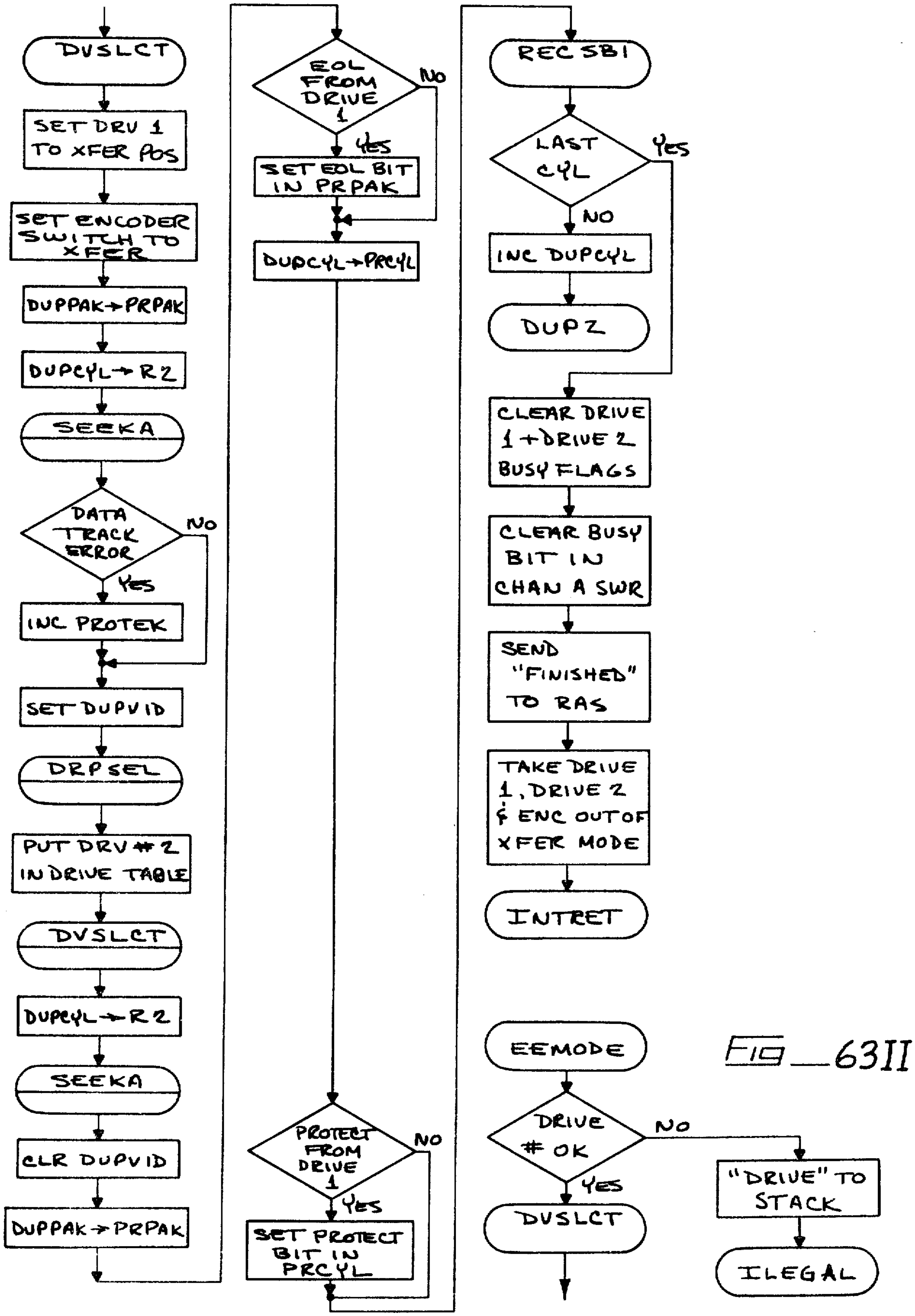
FIG_63II

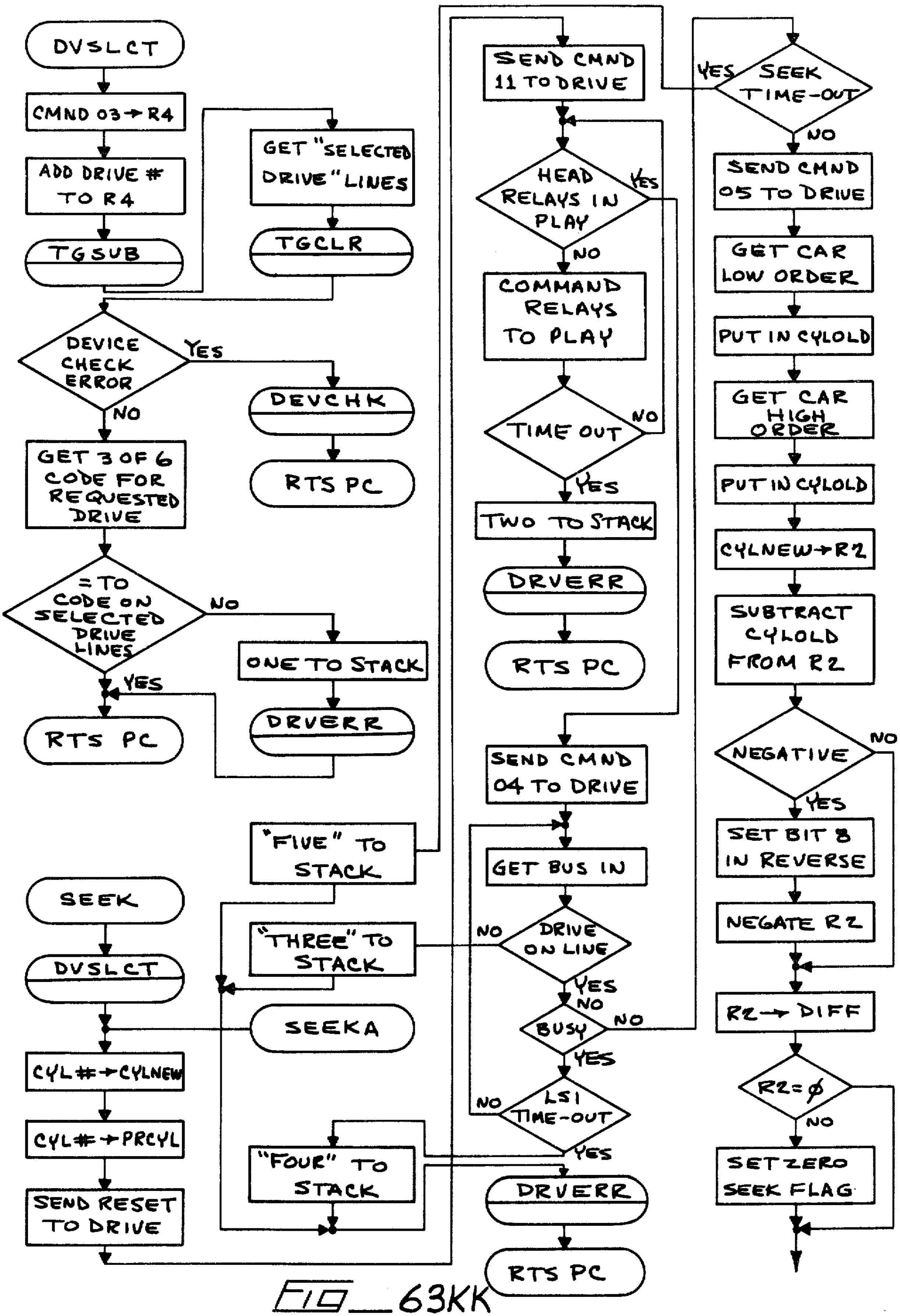
FIG_63KK

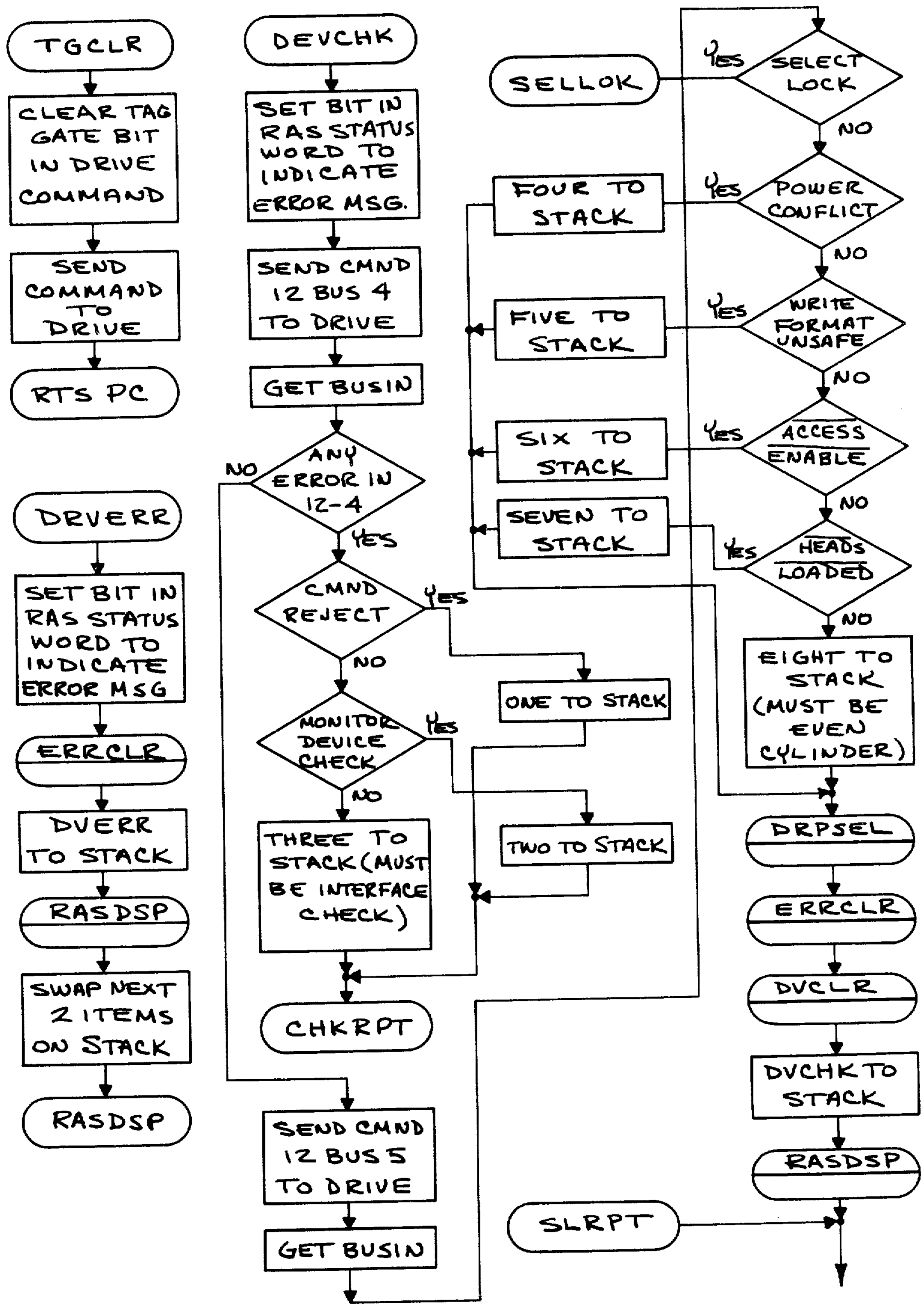
FIG_ 63MM

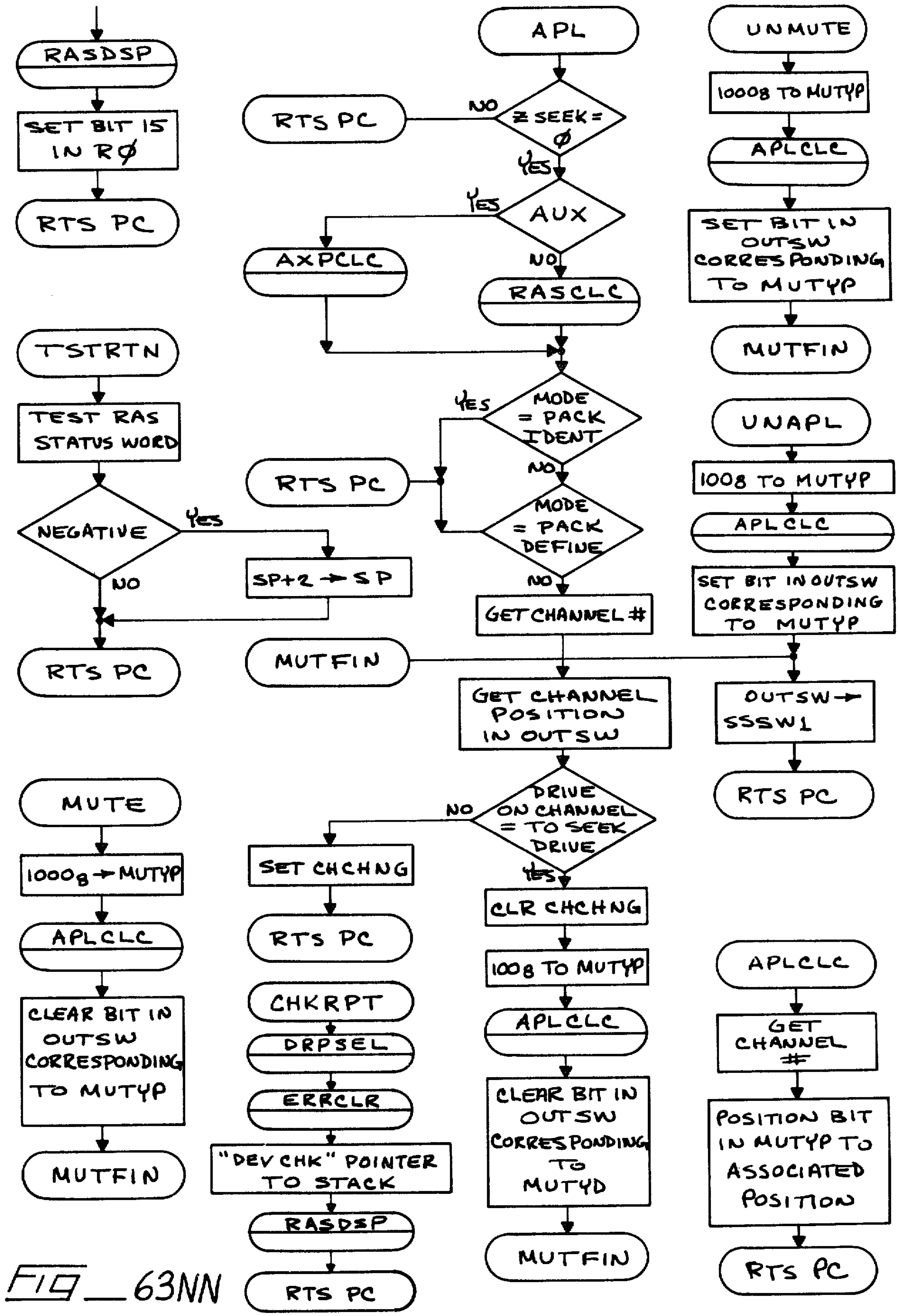
FIG_63NN

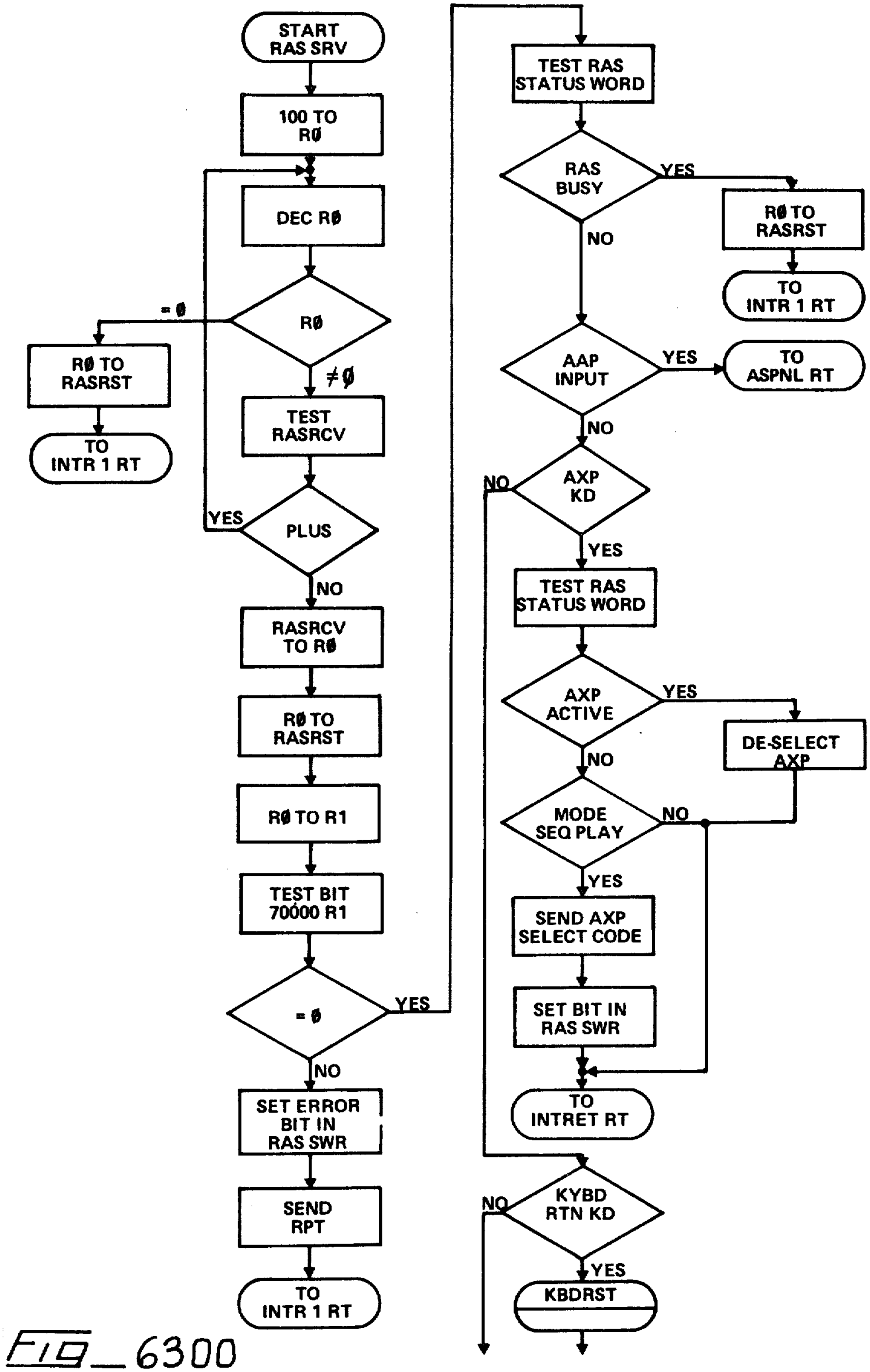
FIG_6300

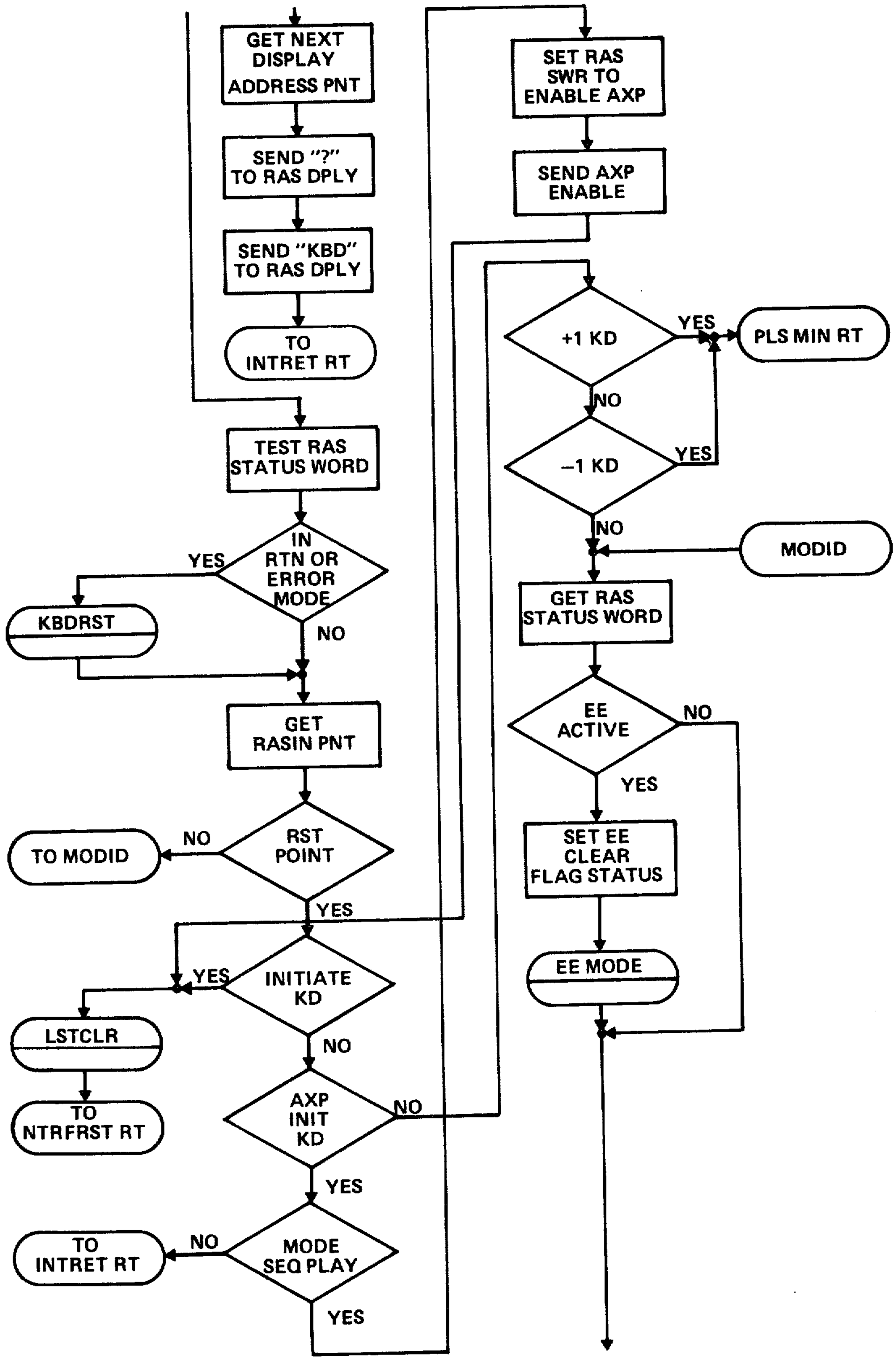
FIG_ 63PP

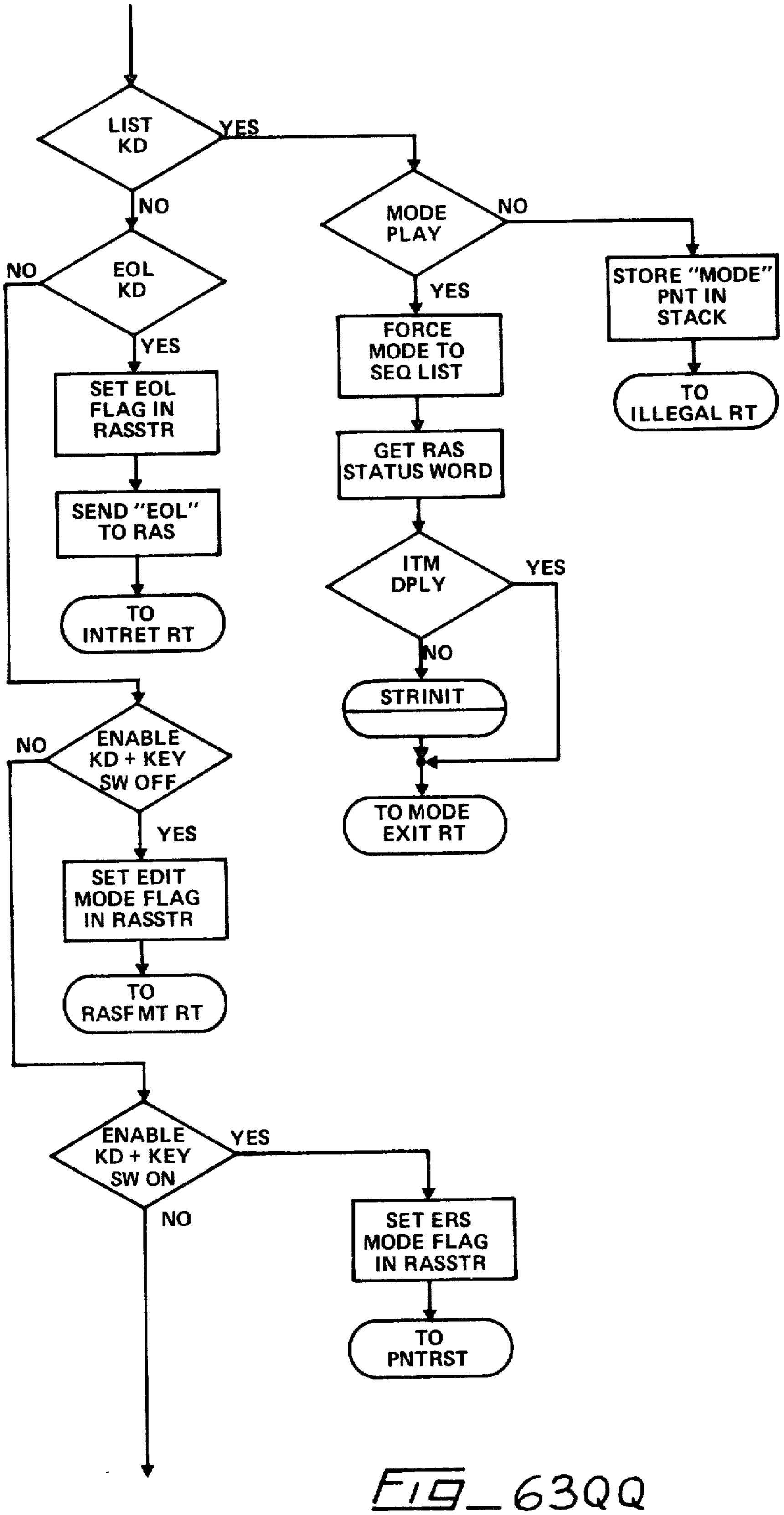
FIG_63QQ

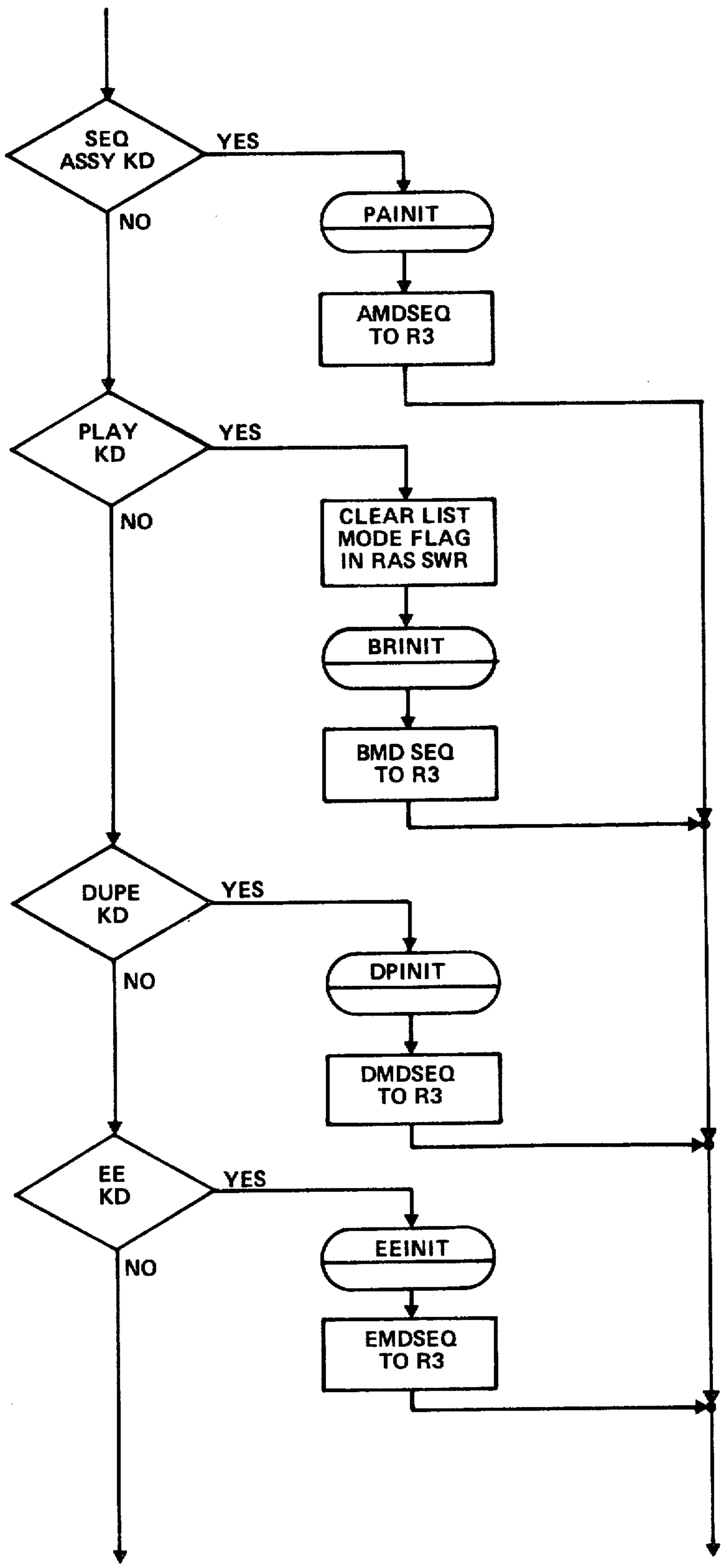
FIG_63RR

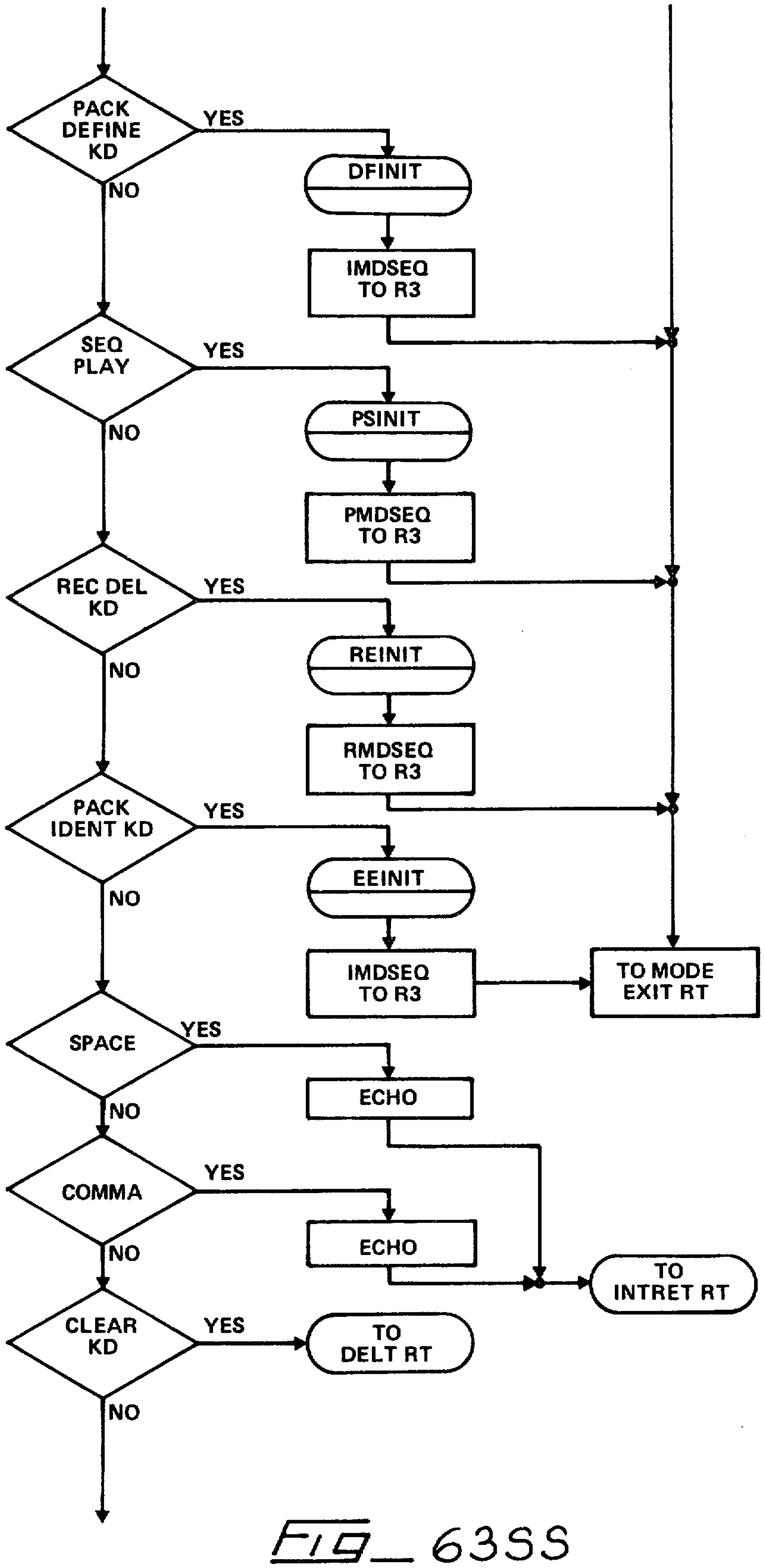
FIG_ 63SS

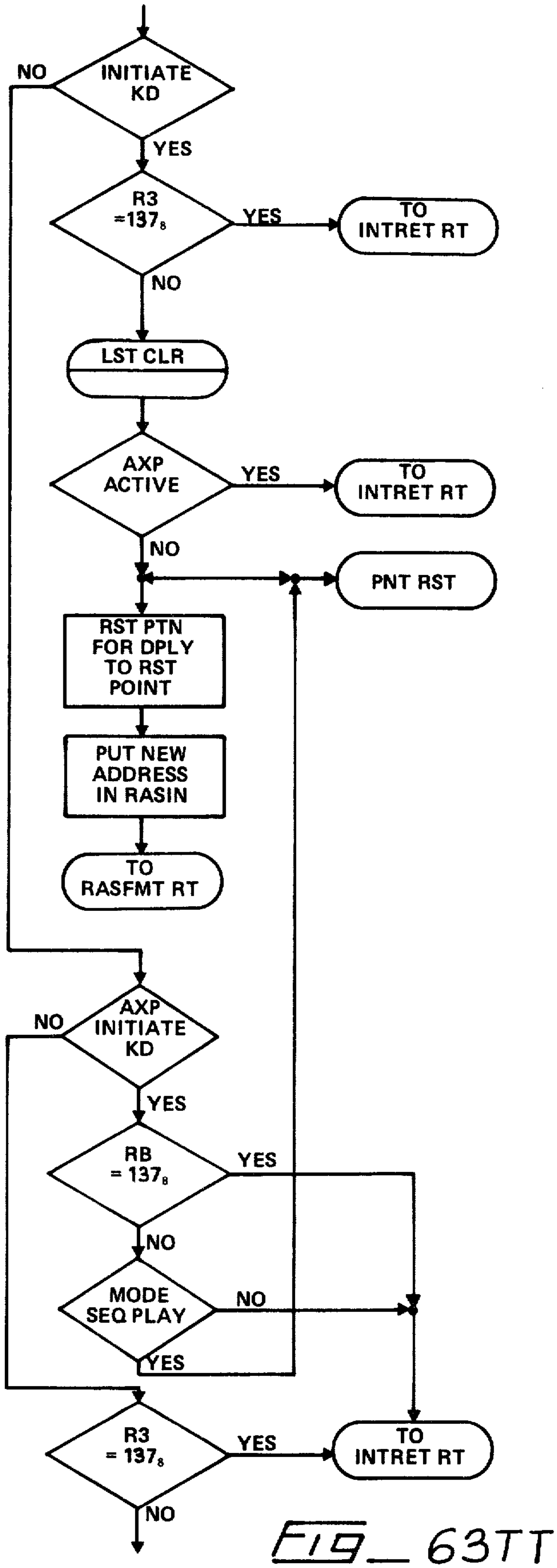
FIG_ 63TT

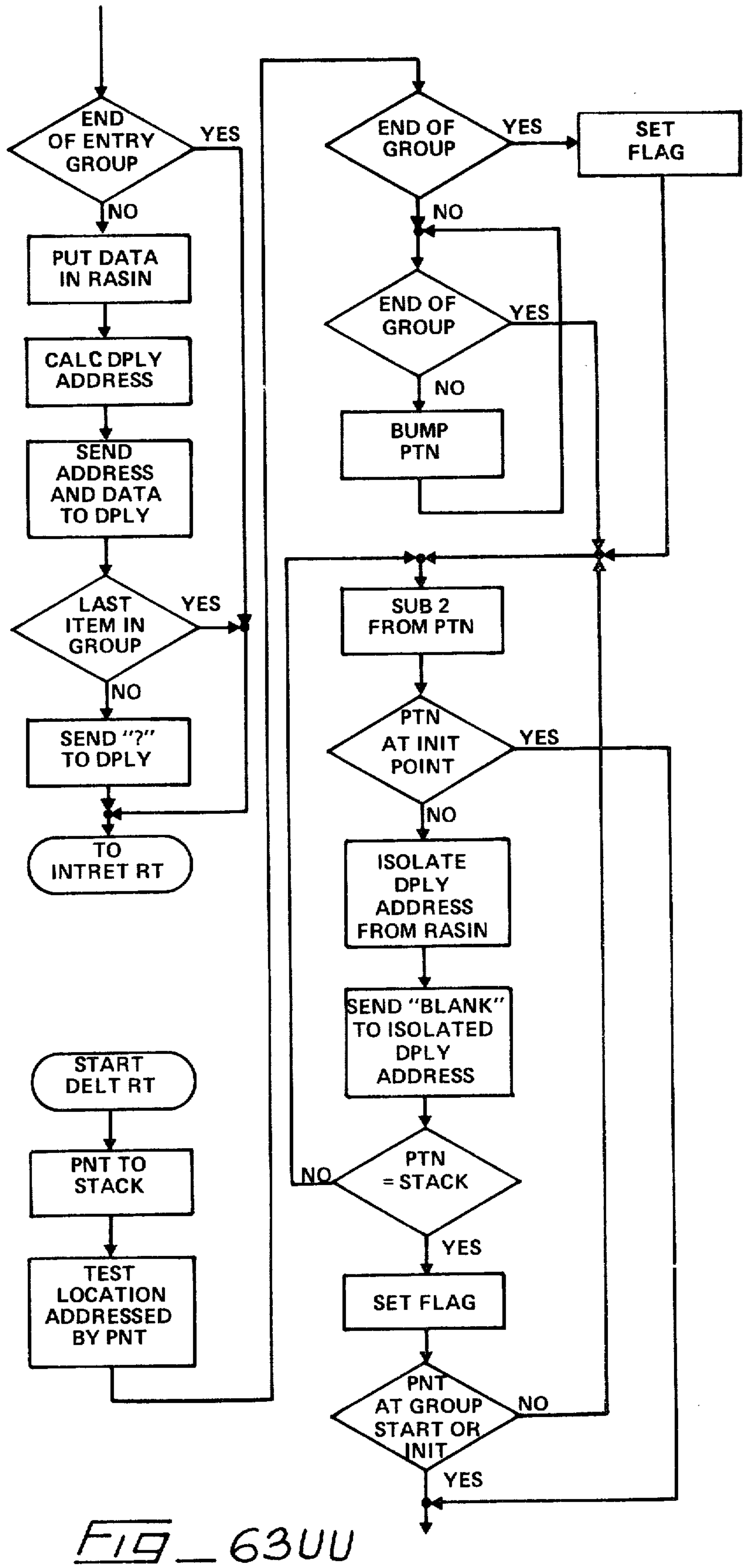
FIG_63UU

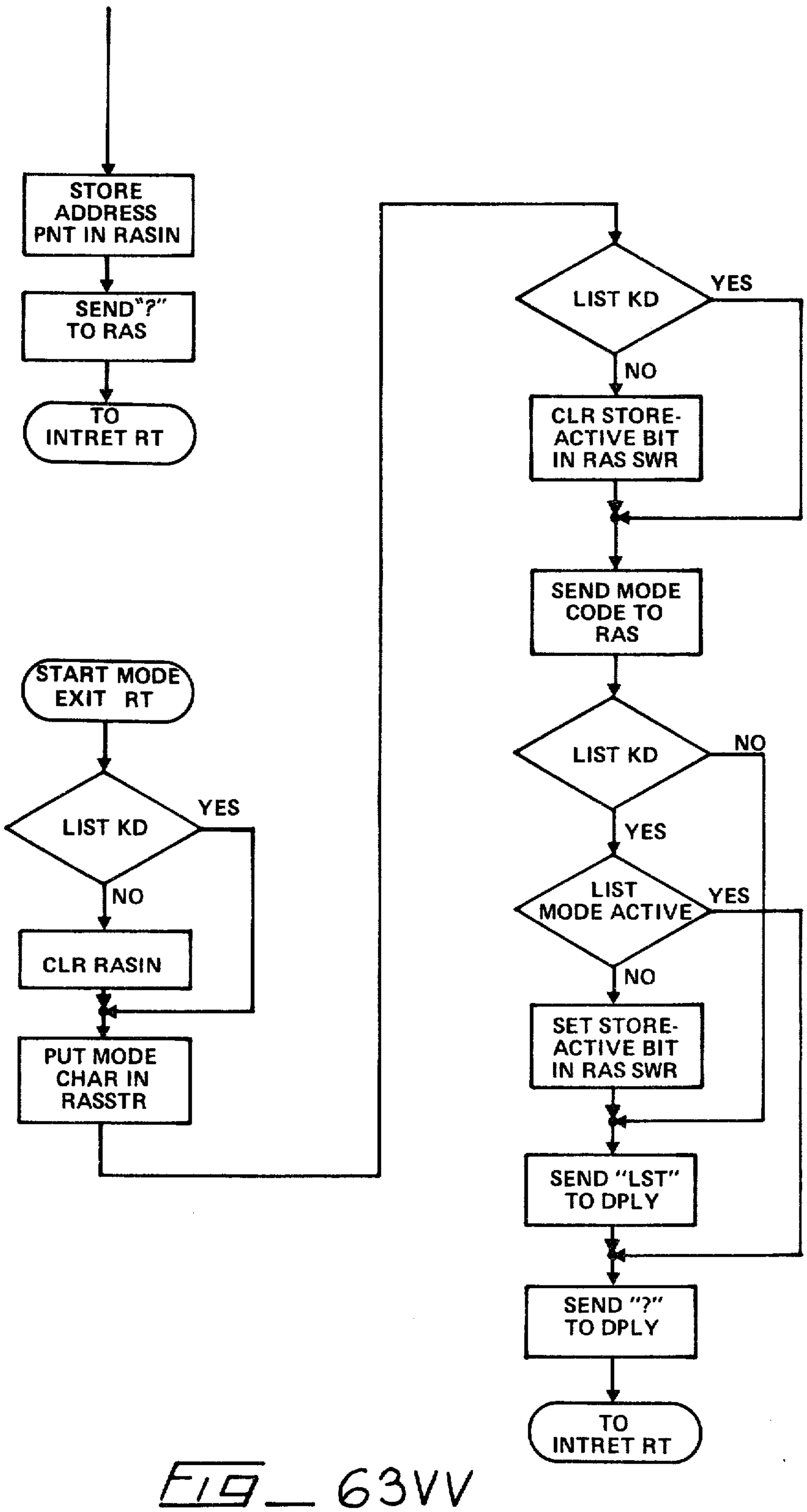
FIG_ 63VV

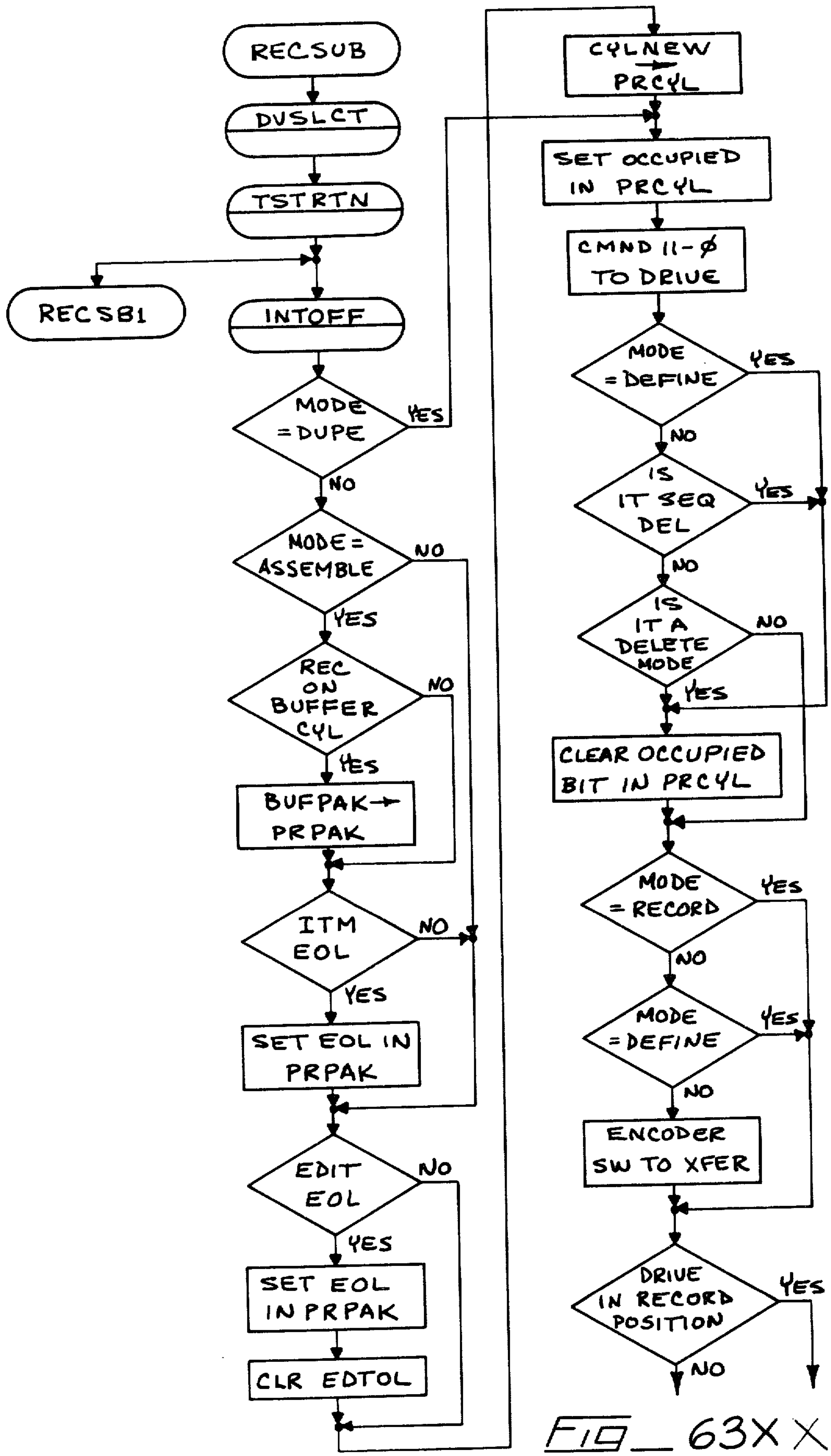
FIG_ 63XX

TELEVISION SIGNAL DISC DRIVE RECORDER

This is a continuation of application Ser. No. 763,795 filed Jan. 28, 1977.

CROSS REFERENCE TO RELATED APPLICATIONS

Video Frame Storage Recording and Reproducing Apparatus, Ser. No. 763,371, filed Jan. 28, 1977, by Joachim P. Diermann and Thomas W. Ritchey, Jr.

Playback Apparatus Assignment Means, Ser. No. 763,462, filed Jan. 28, 1977, by Howard W. Knight and Edwin W. Engberg.

Television Signal Disc Drive Recorder, Ser. No. 763,795, filed Jan. 28, 1977, by Howard W. Knight and Edwin W. Engberg.

Disc Drive Recording Protection Apparatus, Ser. No. 763,761, filed Jan. 28, 1977, by Edwin W. Engberg.

Television Subcarrier Phase Correction for Color Field Sequencing, Ser. No. 763,942, filed Jan. 28, 1977 by Luigi C. Gallo.

Method and Apparatus for Providing DC Restoration Ser. No. 763,461, filed Jan. 28, 1977, by Luigi C. Gallo.

Method and Apparatus for Inserting Synchronizing Words in Digitized Television Signal Data Stream, Ser. No. 763,462, filed Jan. 28, 1977, by Luigi C. Gallo.

Precision Phase Controlled Clock for Sampling Television Signals, Ser. No. 763,453, filed Jan. 28, 1977, by Daniel A. Beaulier, Luigi C. Gallo.

Digital Television Signal Processing System, Ser. No. 763,491, filed Jan. 28, 1977, by Luigi C. Gallo.

Clock Signal Generator Providing Nonsymmetrical Alternating Phase Intervals, Ser. No. 763,792, filed Jan. 28, 1977, by Daniel A. Beaulier and Luigi C. Gallo.

Phase Lock Loop for Data Decoder Clock Generator, Ser. No. 763,793, filed Jan. 28, 1977, by Kenneth Louth and Luigi C. Gallo.

A Circuit for Digitally Encoding an Analog Television Signal, Ser. No. 762,901, filed Jan. 28, 1977, by Daniel A. Beaulier.

High Bit Rate Data Encoder for Data Transmission System, Ser. No. 763,762, filed Jan. 28, 1977, by Luigi C. Gallo.

Data Rate and Time Base Corrector, Ser. No. 763,794, filed Jan. 28, 1977, by Luigi C. Gallo.

A Digital Chrominance Separating and Processing System and Method, Ser. No. 763,251, filed Jan. 28, 1977, by Robert P. MacKenzie Frequency Response Equalizer, Ser. No. 762,902, filed Jan. 28, 1977, by Jerry W. Miller and Luigi C. Gallo.

A Circuit for Generating a Digital Deleted Data, Blinking Cross Signal Which Is Stored in a Deleted Track and Selectively Displayed for Detection, Ser. No. 762,903, filed Jan. 28, 1977, by Luigi C. Gallo and Junaid Sheikh.

BACKGROUND AND FIELD OF THE INVENTION

The present invention generally relates to recording and reproducing apparatus and, more particularly, to apparatus that is adapted to record and reproduce television signals, using digital techniques.

The continued advances in technology have resulted in many changes in the equipment that is currently being used in television broadcast stations. One of the more recent changes that has evolved is the shift away from photographic techniques toward the use of magnetic media in many phases of the operation of the commercial broadcast television station. For example, feature films being broadcast often originate from magnetic tape rather than film and television station news departments are increasingly converting to videotape recording systems rather than using film cameras to provide the visual coverage of the news stories. Moreover, many systems utilize travelling transmitters that can either broadcast on location coverage or transmit such coverage to the station which can either be broadcast "live" or videotaped, edited and broadcast at a later time. Some of the many benefits of these techniques are the ease of handling, flexibility and speed of processing compared to the use of photographic film, coupled with the ability to reuse the magnetic tape when the information that is recorded on them is no longer needed.

One of the last remaining film domains in the present day commercial television broadcasting station is the Telecine island which uses 35 millimeter film transparencies. The Telecine island is used to provide video still images that are used during programming, commercials, news and the like, i.e., wherever a still image may be used during operation. Their use is extensive as is evidenced by the fact that the average commercial broadcast television station maintains a total gile on the order of about 2000 to 5000 35 millimeter transparency slides. The maintenance of the total file represents a laborious operation which requires introduction of new slides, the discarding of obsolete slides and the maintenance of an accurate index so that they can be readily obtained when needed. When slide program sequences are to be assembled, they must be manually carried to the Telecine island, cleaned and manually loaded. Even with the cleaning operation, dust particles and scratches and the like may easily result in an unsatisfactory end product even when the projectionist is careful. Moreover, following their use during broadcasting, the slides must be removed and returned to the file. The entire assembling, use and refiling of the slides represent a substantial labor investment because of the many manual operations that are required. The Telecine operation is considered to be one of the most antiquated operations in many modern broadcast stations and is basically incompatible with a fully automated station operation.

In contrast to the Telecine island or the use of opaque graphic material as the source for generating video still images, the apparatus described herein involves a recording and playback apparatus that will record and reproduce still images, with the still image video information being stored on magnetic media. The apparatus utilizes generally standard computer disc drives (though modified in some respects as will be described) as the magnetic storage media and thereby eliminates the many problems that are associated with slide transparencies. Since the still images are recorded on magnetic media, the problems of physical degradation during use, e.g., dust particles and scratches, are not experienced. Moreover, since the recorded information can be easily accessed, the same still image may be used by operators at different locations almost simultaneously.

As will be described in detail herein, the video information for the still images is recorded in parallel on a plurality of surfaces of the disc pack of the disc drive, with a frame of video information being recorded at each separate radial location or track on the disc pack. With standard disc packs, there are a total of about 815 tracks upon which information can be recorded and, in the illustrated embodiment, each still image is recorded on a track by recording one field on one set of surfaces during one revolution of the disc pack and the second field of the frame on another set of surfaces at the same radial location. Since the still images recorded on the tracks may comprise a relatively permanent library of a commercial broadcast television station, for example, it is therefore desirable that the information be protected from inadvertent or unauthorized erasure or overrecording by operators located at any of the various control stations which can control the recording and reproducing apparatus. On the other hand, it is desirable that other operations such as compiling sequences of still images for use during broadcasting and the like be carried out without substantial restriction.

For this reason, the apparatus of the present invention specifies certain of the tracks as being bulk tracks and others as working tracks and prohibits certain operations from being performed with respect to these classifications of tracks. In the illustrated embodiment, the vast majority of the 815 tracks are specified as bulk tracks and only a total of 64 tracks are specified as working tracks. The working tracks can be used to record and reproduce still frames generally without significant restriction.

However, with respect to the bulk tracks, the apparatus of the present invention prohibits erasure or overrecording thereon in the absence of an enabling signal being produced and the enabling signal is provided by a switch that has a key lock switch or other comparable security switch. Thus, only certain authorized personnel are able to operate the switch and they are able to control the erasure or overrecording of information that is recorded on the bulk tracks. Operators can compile a sequence of still images on the working tracks for subsequent use during programming, for example, and the apparatus of the present invention also prohibits the destruction of the entire sequence in the absence of the enabling signal (one mode of operation of the machine permitting an entire sequence to be erased by carrying out a single set of instructions).

OBJECTS OF THE INVENTION

Accordingly, it is an object of the present invention to provide apparatus for selectively prohibiting certain erasure and overrecording operations with respect to specified tracks of a disc pack of a disc drive to minimize the probability of unwanted destruction of portions of the recorded information.

Another object of the present invention is to provide apparatus of the above type wherein the prohibited erasure or overrecording operations cannot occur unless an enabling signal is provided through the use of a physically lockable key switch or the like.

Other objects and advantages will become apparent upon reading the following detailed description in conjunction with the attached drawings.

DESCRIPTION OF THE DRAWINGS

FIG. 9A is a block diagram illustrating the signal system for the apparatus of the present invention, including control interconnections between the various blocks;

FIGS. 9B and 9C are a timing diagram illustrating sampling of a television signal and phase relationships that occur at different locations of the signal system;

FIGS. 12B and 12C are timing diagram illustrating the operation of portions of the reference clock generator shown in FIG. 12A;

FIGS. 13A, 13B, 13C and 13D together comprise an electrical schematic diagram illustrating the encoder switch which is a portion of the signal system shown in FIG. 9A;

FIG. 13E is a block diagram of the blinking cross delete signal generator included in encoder switch circuitry shown in FIGS. 13A through 13D;

FIG. 13F is a diagrammatic representation of the blinking cross delete signal produced with two television fields upon playback;

FIG. 15A is a functional block diagram of the data rate and time base corrector circuitry which is a portion of the signal system shown in FIG. 9A;

FIGS. 15B and 15C are timing diagrams for the data rate and time base corrector circuitry shown in FIG. 15A;

FIG. 17 is a block diagram of one embodiment of the chroma separator and processing circuitry of the signal system shown in FIG. 9A wherein the chrominance inverter portion is a digital transversal filter with odd symmetry;

FIG. 18 is a more detailed block diagram of the chroma inverter portion of the circuitry shown in the block diagram of FIG. 17;

FIGS. 19 and 20 are block diagrams of alternative embodiments of the chroma separator and processing circuitry of the signal system shown in FIG. 9A;

FIG. 21 is a block diagram of an alternative embodiment of the circuitry employed to reconstitute four fields of color television signals from a single stored field;

FIG. 24 is a block diagram of a playback circuit which includes the equalization circuit of the signal system;

FIG. 25 is a block diagram of one embodiment of the equalization circuit shown in FIG. 24;

FIG. 26 is a block diagram of another embodiment of the equalization circuit shown in FIG. 24;

FIG. 27 is a graph showing the playback response of a conventional reproduce head and preamplifier combination circuit;

FIG. 28 is a graph showing an equalization curve provided by the equalization circuit shown in FIG. 24 which curve compensates for the curve shown in FIG. 27;

FIGS. 32A and 32B together comprise an electrical schematic diagram of the signal system interface portion of the computer control system of the apparatus;

FIGS. 34A, 34B, 34C, 34D, 34E, 34F, 34G and 34H together comprise electrical schematic diagrams of the second data track interface portion of the computer control system of the apparatus;

FIGS. 35A and 35B together comprise an electrical schematic circuit diagram of the disc drive interface portion of the computer control system of the apparatus;

FIGS. 38A and 38B are electrical schematic circuit diagrams of the record timing circuitry for the disc drive portion of the apparatus;

FIG. 39 is an electrical schematic circuit diagram of the timing generator circuitry for the disc drive portion of the apparatus;

FIGS. 40A and 40B are electrical schematic circuit diagrams of the error check circuitry for the disc drive portion of the apparatus;

FIGS. 41A and 41B together comprise an electrical schematic diagram of the disc phase lock control circuitry for the disc drive portion of the apparatus shown in the block diagram of FIG. 36;

FIGS. 42A, 42B, 42C and 42D together comprise an electrical schematic diagram of the input circuitry of the signal system shown in the block diagram of FIG. 10;

FIGS. 43A, 43B, 43C and 43D together comprise an electrical schematic diagram of the reference logic circuitry of the signal system shown in the block diagram of FIG. 11;

FIGS. 44A, 44B, 44C and 44D together comprise electrical schematic diagrams of the reference clock generator of the signal system shown in the block diagrams of FIGS. 12A and 12B;

FIGS. 45A, 45B, 45C and 45D together comprise an electrical schematic diagram of the encoder and sync word inserter circuitry of the signal system shown in the block diagram of FIG. 14;

FIG. 45E is a timing diagram illustrating the operation of the data encoder circuitry shown in FIGS. 45A, 45B, 45C and 45D;

FIGS. 46A, 46B, 46C and 46D together comprise an electrical schematic diagram of the data decoder and the data rate and time base corrector circuitry of the signal system shown in the block diagram of FIG. 15;

FIG. 46E is a timing diagram illustrating the operation of the data decoder circuitry shown in FIGS. 46A and 46B;

FIGS. 47A and 47B together comprise an electrical schematic diagram of the data transfer circuitry of the signal system shown in the block diagram of FIG. 16.

FIGS. 48A, 48B and 48C together comprise electrical schematic diagrams of the chroma separator of the chroma portion of the signal system shown in FIG. 17;

FIGS. 49A and 49B together comprise electrical schematic diagrams of the chroma inverter circuitry for use in the chroma portion embodiment illustrated by the block diagram of FIG. 18 and timing control therefor;

FIG. 49C is a functional block diagram of the timing control portion of the chroma inverter circuitry of the signal system schematically illustrated in FIGS. 48A, 48B, 48C and 48D;

FIG. 49D is a timing diagram illustrating the operation of the timing control portion of the chroma inverter shown in FIG. 49C;

FIGS. 49E and 49F together comprise electrical schematic diagrams of the chroma inverter circuitry for use in the chroma portion embodiment illustrated by the block diagram of FIG. 20 and timing control therefor;

FIGS. 50A and 50B together comprise electrical schematic diagrams of the chroma band pass filter circuitry of the chroma portion of the signal system shown in the block diagram of FIG. 17;

FIGS. 51A and 51B together comprise an electrical schematic diagram of the blanking and bit muting circuitry of the signal system shown in the block diagram of FIG. 22;

FIGS. 52A, 52B, 52C and 52D together comprise an electrical schematic diagram of the digital-to-analog converter and burst and sync insertion circuitry of the signal system shown in the block diagram of FIG. 23;

FIGS. 53A and 53B together comprise an electrical schematic diagram of the equalizer circuits of the signal system shown in the block diagram of FIG. 24;

FIGS. 55A, 55B, 55C and 55D together comprise an electrical schematic diagram of the remote access station interface circuitry of the computer control system shown in the block diagram of FIG. 30;

FIGS. 56A, 56B, 56C and 56D together comprise an electrical schematic diagram of the remote access station and internal access station keyboard circuitry of the computer control system shown in the block diagram of FIG. 31;

FIGS. 57A and 57B together comprise an electrical schematic diagram of the first data track interface circuitry of the computer control system shown in the block diagram of FIG. 33;

FIGS. 58A, 58B, 58C and 58D together comprise an electrical schematic diagram of the central processing unit interface portion of the computer control system of the apparatus;

FIGS. 59A and 59B together comprise an electrical schematic diagram of the disc predriver portion of the disc drive portion of the apparatus shown in the block diagram of FIG. 36;

FIGS. 60A and 60B together comprise an electrical schematic diagram of the data interface portion of the apparatus; and, FIG. 61 shows a keyboard and FIGS. 62A through 62C show an electrical schematic;

BROAD DESCRIPTION OF THE APPARATUS

Figure 1:
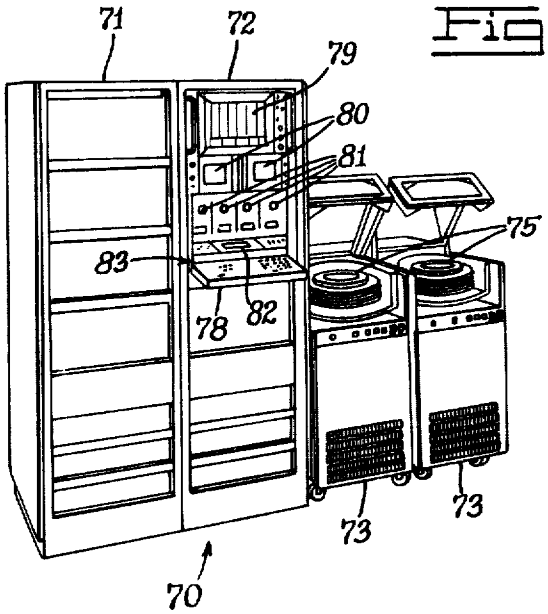
FIG. 1 is a perspective view of the apparatus embodying the present invention, illustrating its overall appearance, including the internal access station and two disc drive units.
Figure 2:
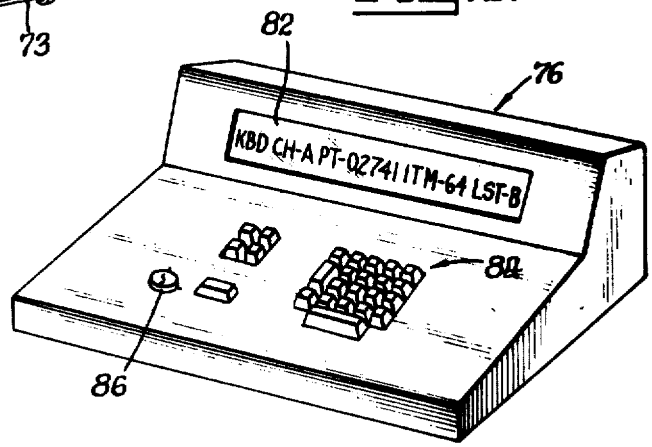
FIG. 2 is an enlarged perspective view illustrating a representative remote access station that an operator can use to control the operation of the apparatus of the present invention.
Figure 3:
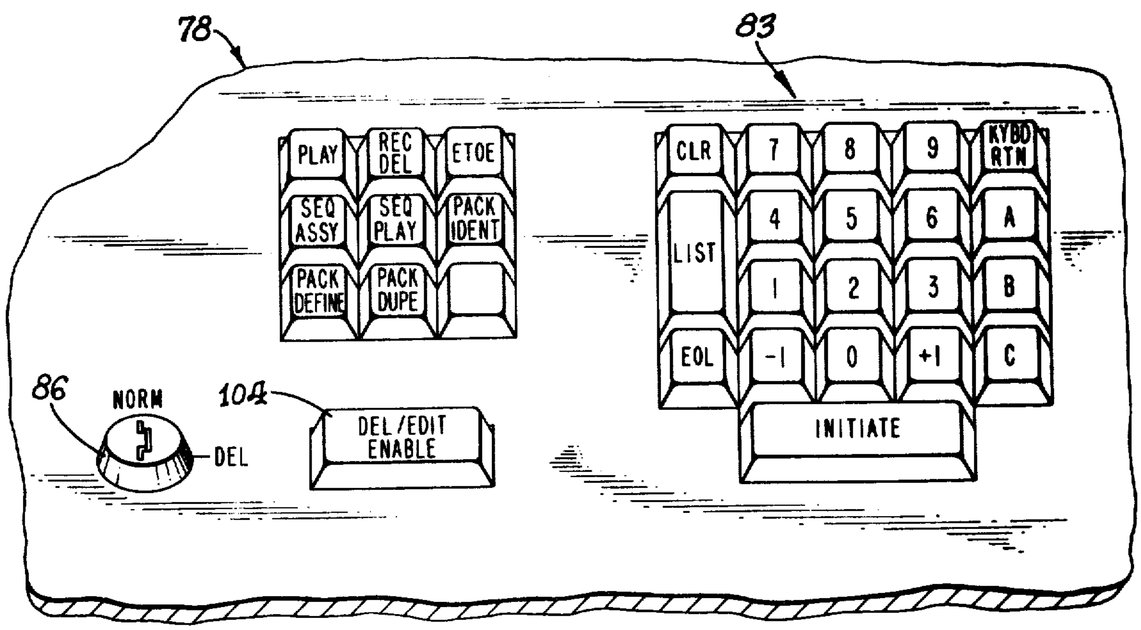
FIG. 3 is an enlarged top view of a portion of the internal access station keyboard shown in FIG. 1 particularly illustrating the various keys and bars that an operator uses during operation.

Broadly stated and referring to FIGS. 1-3, the present invention is directed to a recording and reproducing apparatus, indicated generally at 70 in FIG. 1 which includes two bays 71 and 72 containing electrical circuitry associated with the apparatus, together with the various monitoring and control hardware shown specifically in the upper portion of the bay 72. The system also includes a pair of disc drives 73 located adjacent the rightward bay 72 with each of the disc drives 73 having a disc pack 75 mounted thereon. While two disc drive units are specifically illustrated in FIG. 1, it should be understood that there may be additional disc drives used with the system to increase the on-line storage capacity of the apparatus. It should also be appreciated that a single disc drive may be used, but many desirable functional operations cannot be performed with a single disc drive as will be apparent from the ensuing description. Operational control of the apparatus is performed by one or more operators using either one of many remote access stations, such as the remote access station 76 shown in FIG. 2, or an internal access station 78 which is located in the bay 72. If desired, a video monitor 79, vector and "A" oscilloscopes 80 may be provided as shown in bay 72. Phase control switches 81 are provided above the internal access station 78.

The apparatus is controlled by an operator using either the internal access station 78 or a remote access station 76, both types of which have a keyboard with numerical and function keys and bars, a 32 character display 82, which provides a readout of information that is needed to carry out functional operations during use, as well as to display the information concerning the identity of certain stills being addressed and other information. It should be understood that the remote access station 76 shown in FIG. 2 is representative of each of the remote access stations and that in the preferred embodiment, up to seven remote access stations can be used to control the apparatus 70. The internal access station keyboard indicated generally at 83 in FIG. 1, as shown in the enlarged fragmentary view in FIG. 3, has more expanded operational capability than the remote access stations, whose keyboards have fewer function keys. As will be explained in detail hereinafter, the keyboard contains a large cluster of keys indicated generally at 84 and a smaller cluster of function keys 85 located on the left side of the keyboard. Additionally, a turn key controlled switch 86 may be provided to switch between normal and delete operations to safeguard against the possibility of inadvertent or unauthorized erasure of actively used stills.

Figure 4:
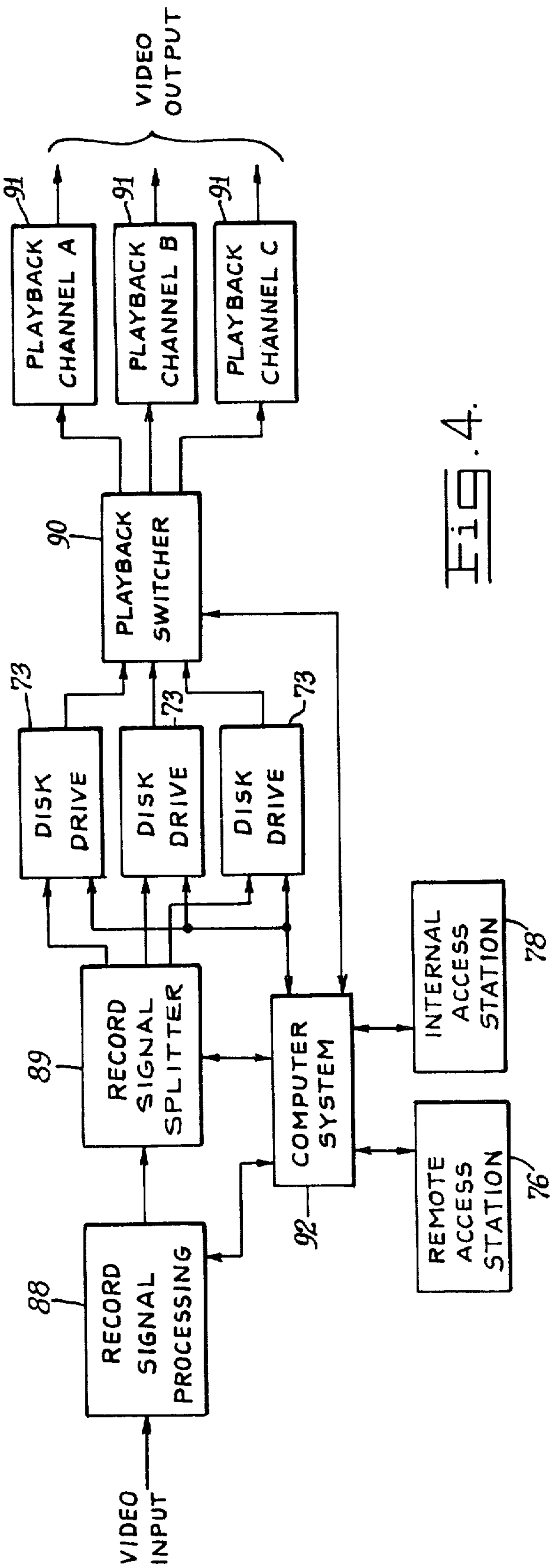
FIG. 4 is a broad functional and simplified block diagram of the entire apparatus of the present invention.

Referring to the very simplified block diagram shown in FIG. 4, the apparatus receives a video input signal which is processed by record signal processing circuitry 88 and is then applied to record signal splitter circuitry 89 which directs the signal to all of the disc drives 73. Gating circuitry located within a selected disc drive 73 is enabled to allow the signal to be recorded on a selected drive. More than one disc drive 73 can be simultaneously selected for recording the video signal provided by the record signal splitter circuitry 89. Switcher circuitry can be substituted for the signal splitter and associated gate circuitry so that the signal provided by the record signal processing circuitry 89 is coupled only to selected disc drives having the disc packs 75 upon which the signal is to be recorded. During playback, a signal originating from one of the disc drives is applied to the playback switching circuitry 90 which directs it to one of the playback channels 91, each of which provides a video output channel. A computer control system 92 is interfaced with the record processing circuitry, signal splitting and switching circuitry and disc drives for controlling the overall operation of the various components of the apparatus and also interfaces the remote access stations and internal access station. As will be hereinafter more fully explained, an operator can select a particular disc in which to store a still, provided that the disc pack is online, i.e., it is physically loaded on one of the disc drives 73. In this regard, it should be understood that the apparatus addresses disc packs rather than disc drives for the reason that the apparatus is adapted to identify up to 64 separate disc packs, only one of which can be located on a disc drive at any one time. Thus, in the event the apparatus has two disc drives, only two disc packs can be online at one time. The operator can use an access station keyboard 83 to enter the address of a disc pack upon which he wishes to record a still and, through the interaction of the computer with the disc drive on which the selected disc pack is loaded, can carry out the recording operation on the selected on-line disc pack. Similarly, an operator can play back a still frame from the disc pack on one of the disc drives and can define the playback channel that he wishes the still frame to be played through.

The apparatus has four major operating modes or conditions, i.e., (1) record/delete, (2) playback or reproduce, (3) sequence assembly and (4) sequence play. The record and play operations will be initially described, while referring to FIGS. 6 and 7 which illustrate somewhat simplified block diagrams of the signal flow paths during recording and playback, respectively, with respect to one of the disc drives 73.

Figure 6:
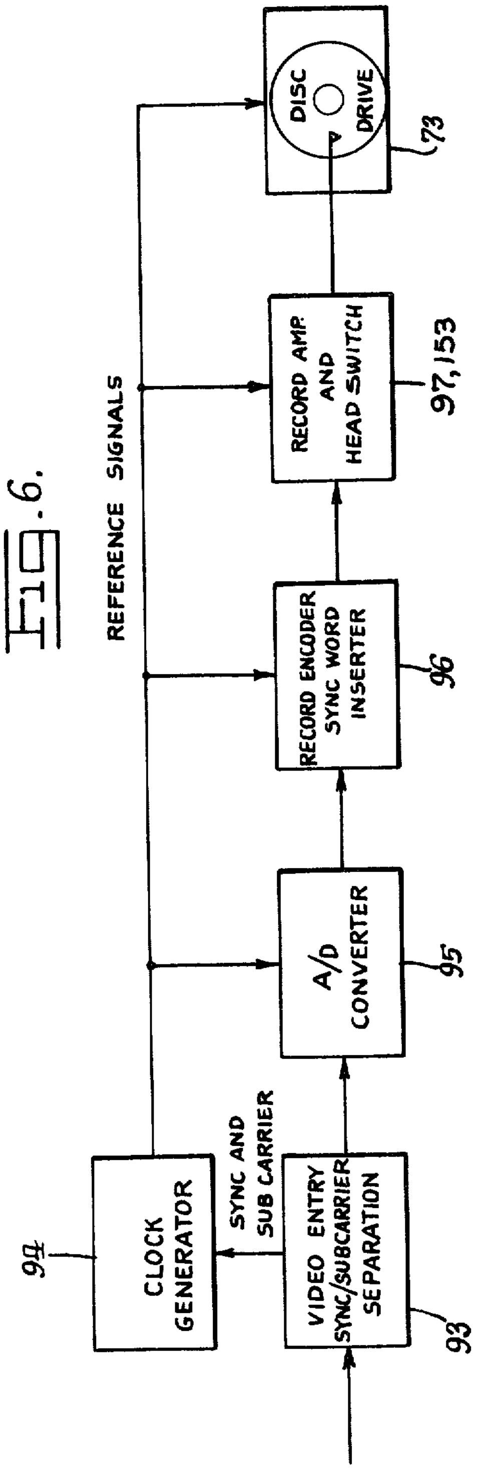
FIG. 6 is a functional block diagram broadly illustrating the signal flow path through the apparatus during a record operation.

Turning first to the record signal flow block diagram of FIG. 6, the composite video input signal is applied to the input stage circuitry 93 where clamping of the signal takes place and the synchronization and subcarrier components are stripped from the composite video signal. The input stage also regenerates the synchronization (hereafter often referred to merely as "sync") and subcarrier signals for later use during reproduction and, accordngly, the regenerated sync and subcarrier signals are directed to a clock generator 94 which also generates reference signals that are used by the downstream elements during operation. The clamped analog video signal with the color burst component is then applied to an analog-to-digital converter (A/D) 95 which provides an output signal at a sample rate of 10.7 megasamples per second, with each of the samples comprising 8 bits of information. The digital video signal is a nonreturn to zero code (NRZ) which means that it is a binary code defining a ONE as a high level and a ZERO as an equivalent low level. The digitized video signal appears on 8 parallel lines, i.e., one bit per line, which is applied to an encoder and sync word inserter 96 which converts the digitized video into a special recording code (referred to herein as a Miller code or a Miller squared code) that is particularly suitable for digital magnetic recording in that it minimizes DC content of a data stream. The circuitry also inserts a synchronizing word on alternate television lines with respect to a particular phase angle of the color subcarrier as represented by the color burst sync component. The sync word is used as a reference for correcting for time base and skewing errors that occur during playback among the eight parallel bits of data that must be combined to define the value represented by each sample. The digital video information in the eight parallel lines is then applied to a recording amplifier circuitry 151 and head switch circuitry 97 associated with the selected disc drive 73 which switches between two groups of eight recording heads for recording the digitized video signal by the disc drive. The disc drive is servo controlled so that its spindle rotational speed is locked to vertical sync, with the rotational disc speed being 3600 revolutions per minute. By locking the spindle drive to vertical sync, the apparatus records one television field per revolution of the disc pack and simultaneously records the eight data streams on eight disc surfaces. At the completion of recording one field, the recording amplifier circuitry 151 and head switch circuitry 97 is commanded to activate another set of heads for simultaneously recording the second field of a television frame on another set of eight disc surfaces so that a full television frame is recorded on two revolutions of the disc drive, using 16 heads. Each disc pack located on a disc drive preferably contains 815 cylinders, each of which has 19 recording surfaces and can therefore store 815 digital television frames. There is one read/write head for each of the 19 disc recording surfaces of a disc pack and all heads are mounted vertically aligned on a common carriage whose position is controlled by a linear motor. It should be understood that a cylinder is defined to comprise all recording surfaces that are located on the same radius of a disc pack. However, the term track, rather than cylinder, is preferred herein and, accordingly, a track is meant to include all recording surfaces on a same radius, i.e., all surfaces on a cylinder. Thus, an addressed track for recording or playing back a still actually refers to the 19 individual surfaces on the cylinder available at that radius. Of the 19 surfaces that are available for recording, one is used to record the address and other housekeeping information, rather than active video information, and it is specifically referred to as the "data track". Two of the 19 surfaces are available for recording a parity bit and 16 surfaces are used to record the video data as will be explained further hereinbelow. Also one of the heads, generally referred to as the servo head, travels on the 20th disc pack surface that contains only servo track information prerecorded by the pack manufacturer. The servo tracks carry out two functions, i.e., following a seek command the head stack traverses servo tracks that are counted to determine the instantaneous location of the heads and, after completion of a seek phase, the servo head generates an error signal that is used to control the linear motor position to hold the head carriage centered on the appropriate servo track. By using such a feedback system, it is possible to achieve a radial packing density of about 400 tracks per inch or a total of 815 tracks per disc pack.

Since the present apparatus does not record analog video signals because of frequency response limitations of disc pack memories, the video signal is digitized for recording. Because the digitized signal is recorded, the video signal to noise ratio of the system is primarily determined by quantization noise rather than recording media and preamplifier noise as is the case with conventional videotape recorders. Thus, the present apparatus delivers a signal to noise ratio of about 58 dB and effects such as moiré and residual time base error do not exist, the digital random error of the storage channels being typically low enough to make occasional transmission errors virtually invisible.

By recording a digital data stream at a rate of 10.7 megabits per second on each of the eight disc surfaces, the linear packing density of the apparatus is about 6000 bits per inch which is about 60% greater than is used in conventional disc drive usage in data processing.

Figure 7:
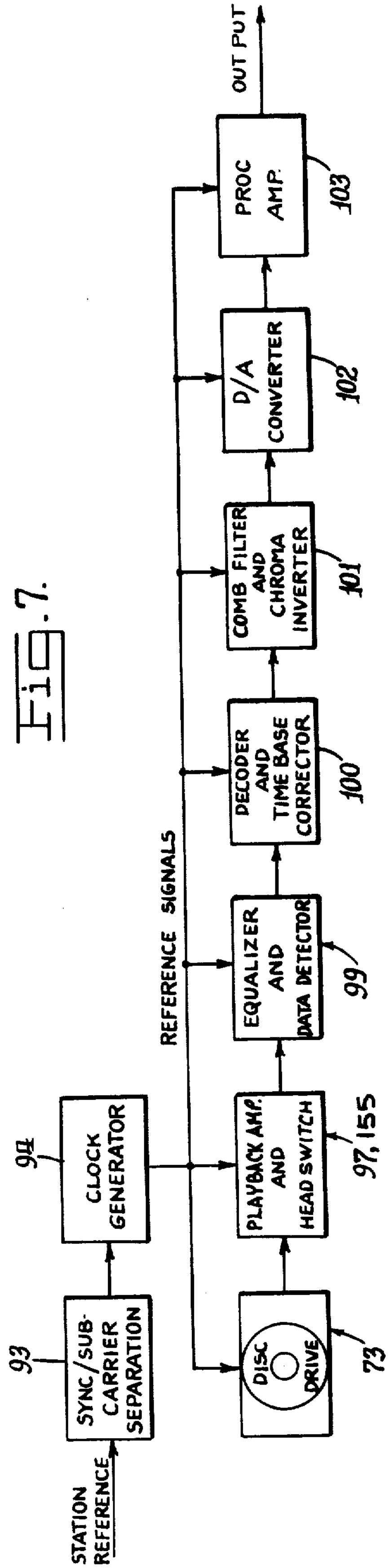
FIG. 7 is a functional block diagram broadly illustrating the signal flow path through the apparatus during a playback operation.

During playback and referring to FIG. 7, the heads read, i.e., reproduce the digital video information from the eight surfaces per field and obtain the recorded channel encoded digital video signal from the odd and even fields. The reproduced signal is applied to a playback amplifier circuitry 153 and head switch circuitry 97 associated with the selected disc drive 73 which amplifies the data streams of digital video information carried by the eight data bit lines and applies the same to equalizer and data detector circuits 99. The equalizer compensates for phase and amplitude distortion introduced to the signal by the band limiting effects of the record and reproduce processes and insures that the zero crossings of the reproduced signal are distinct and accurately positioned. Following equalization, the channel encoded signals in each data bit lines are processed as described hereinbelow for transmission to the playback circuitry of the signal system over a twisted pair line. The processed channel encoded signals are in the form of a pulse for each zero crossing or signal state transition of the channel encoded signal. The twisted pair lines for the eight data bits of the digital video information apply the processed channel encoded signals to the decoder and time base corrector circuitry 100 of one or more of the playback channels 19 of the apparatus. The decoder and time base corrector circuitry 100 reprocesses the received signals to place them in the channel encoded format, decodes the signal to the non-return to zero digital form and time base corrects the digital signal with respect to station reference to remove inter-data bit line time displacement errors (commonly referred to as skew errors) and timing distortion within each of the data streams carried by the data bit lines. Thus, the time base corrector portion of the circuitry 100 serves to align the eight bits defining a single sample and remove timing distortion in each of the data bit lines relative to station reference. It should be realized that each playback channel 91 is provided with decoder and time base corrector circuitry 100 and within each playback channel each of the eight data bit streams travels through a separate decoder and time base corrector. The output of the circuitry 100 is then applied to a comb filter and chroma inverter 101 which separates the chroma information and selectively inverts and recombines the signal for reconstruction of a four field NTSC sequence. This reconstructed digital signal is applied to a digital-to-analog converter 102 which provides an analog video signal. The new sync and burst are then added by a process amplifier 103 to produce a composite video analog output signal of the playback channel 91 as is desired.

DESCRIPTION OF OPERATION OF APPARATUS USING ACCESS STATIONS

Figure 8:
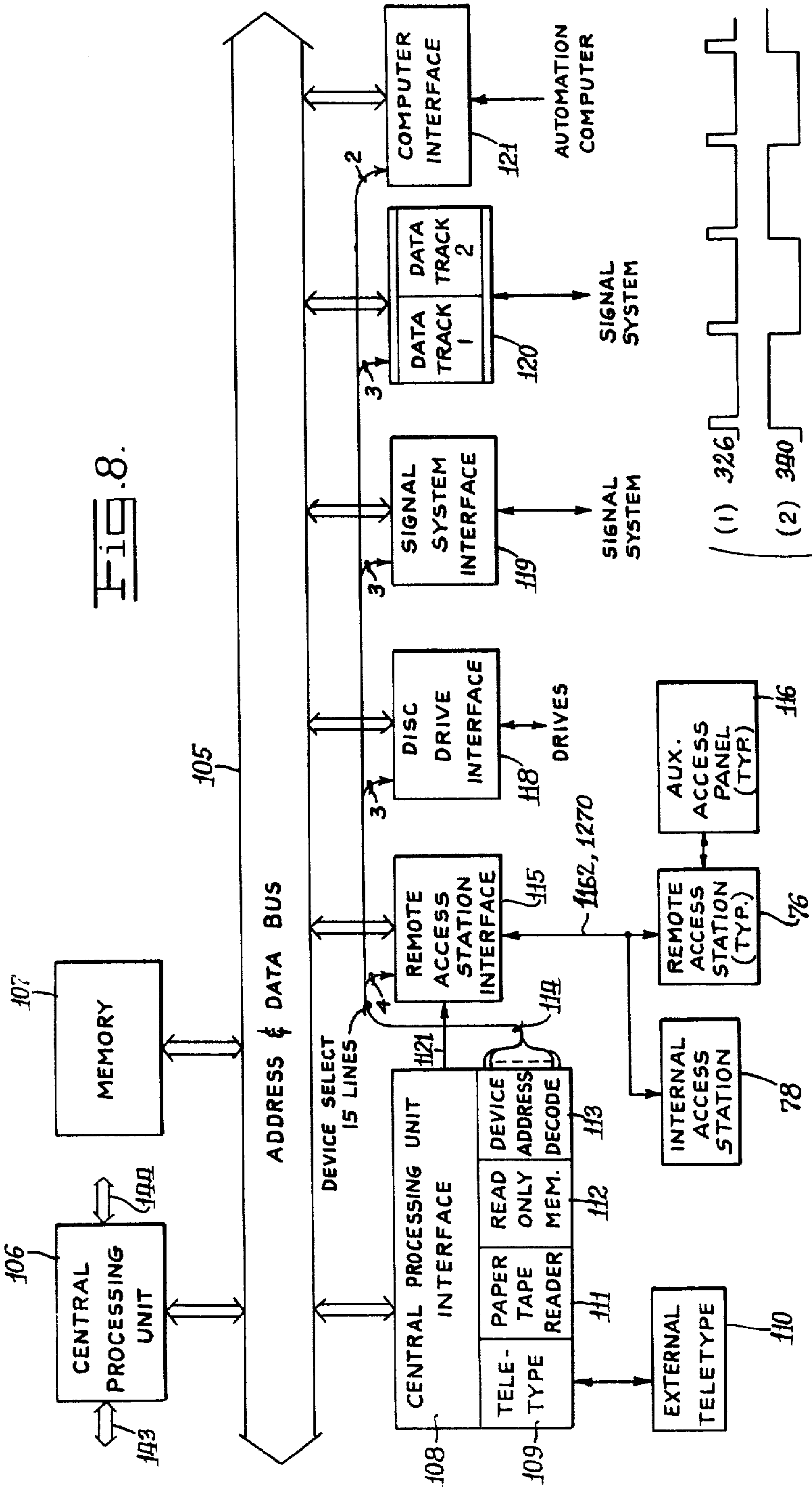
FIG. 8 is a block diagram illustrating the internal computer control system that controls the operation of the signal system, disc drives and their associated control system and the access stations used by the operators.

The general operation of the apparatus will now be described in the context of an operator using either the internal access station or remote access station keyboard for performing the various functions that can be carried out using the apparatus. The apparatus also can be operated from the keyboard of an auxiliary access panel 116 (see FIG. 8) connected to operate through either a remote access station 76 as shown in FIG. 8 or an internal access station 78. As previously mentioned, the remote access station shown in FIG. 2 has a leftward cluster of functional keys 85 as does the internal access station located in the apparatus bay 72 shown in FIG. 1. The remote access station left cluster 85 has only four functional keys as contrasted with nine keys on the internal access station, so that more functional operations can be carried out at the internal access station than a remote access station.

More specifically, the internal access station has a total of nine functional keys, one of which is a spare, the others of which can be pressed to place the apparatus in a particular condition, including the following: PLAY, for playing back or reproducing a still image; REC/DEL, for a recording or deleting operation; SEQ ASSY, for assembling a sequence of stills; and, SEQ PLAY, for playing a sequence of stills. These four operations can be carried out by an operator at the internal access station as well as at a remote access station. However, in addition to these described functional operations, the internal access station also is adapted to carry out the following additional operations: E-to-E, for operating in an electronic to electronic operation where the video input signal is processed through the entire record circuitry up to the disc drive and is then applied to the playback switcher and processed back through the playback circuitry so that virtually everything is done to the video input signal except record it on the disc drives (essentially a testing operation); PACK IDENT, for checking the identification data that is recorded on the data tracks of a specified disc drive; PACK DEFINE, for entering the identification data onto all data tracks of a new pack that may become part of the disc pack library; PACK DUPE, for making an exact duplicate disc pack which contains the entire digital video information stored on a specified disc pack. Thus, the above eight functional operations broadly define the operation of the apparatus in terms of the modes or conditions of operation.

Each of the remote access stations 76 as well as the internal access station 78 has the rightward cluster of keys 84 and is identical for both stations. As can be seen from FIG. 3, the keyboard cluster 84 includes the numerals 0 through 9 for entering addresses, sequence list items and the like, "+1" and "−1" keys for incrementing and decrementing entered still addresses by one, respectively, keys A, B and C for entering video channel or sequence list letters, a LIST bar for loading sequence list items into memory, an EOL key for informing the computer system that the last item on a sequence list is to be entered, a KYBD RTN or keyboard return key for changing the origin of the display's messages and an INITIATE bar for generating initiating commands to complete the entry of data into the computer system. Additionally, the entire keyboard 83 has a DEL/EDIT ENABLE bar 104 which, when activated in conjunction with the previously mentioned key switch 86 allows individual still frames in bulk tracks or whole sequences in working tracks to be deleted. In this regard, there are 64 tracks of the 815 tracks on each disc pack that are defined as working tracks (addresses 1–64), and it is on these tracks that sequence of stills are assembled for play; except for two, the remaining tracks are defined as bulk tracks which provide the permanent library or file. Certain precautions and constraints are built into the apparatus to insure that stills are not easily, or at least inadvertently, erased or otherwise destroyed. Thus, the DEL/EDIT ENABLE bar can be activated to allow edit of material on the working tracks, but must be used together with the key switch 86 to allow deletion of stills from the bulk storage memory or deletion of an entire sequence of stills in the working tracks.

As is shown in FIGS. 1 and 2, each of the access stations 76 and 78 have a display 82 that is used to present message origin codes, operator data entries, computer system requests and responses. The display unit is an alpha numeric dot matrix, self scanning display preferably having a capacity of 32 characters. The computer system 92 is preferably programmed so that display words and symbols appear which will indicate a status, request or identify an improper or illegal entry or other error. Moreover, as will be hereinafter described, when an operator enters a mode on the leftward cluster of one of the access stations, the mode identified requires the entry of data in a specific order. When a mode is selected, the display guides the operator through the entry sequence with a cursor symbol which advances through the display until all elements of the data message have been entered. The entry can be cleared and corrected at any time prior to the INITIATE bar being depressed which initiates operation by the computer system 92. On receipt of the data, the computer system 92 switches the display to a return message (RTN) which may either be a data validation or an equipment status response. If the data is validated the selected operation will be or has been performed.

Each mode of operation identified in the leftward cluster of keys 85 is performed in three basic steps. The operator first presses a mode select button, then enters data in the form of channel selects, storage addresses and instructions and finally depresses the INITIATE bar to request execution of the operation.

The various modes will now be described in terms of the interaction of the display and keyboard controlled by the operator.

In the PLAY mode, random access to any on-line still is provided, i.e., any still image that is located on a disc pack that is on a disc drive rather than being in storage. A still is selected by entering the video channel letter (A, B or C when three channels are provided) and a five digit still address number. The computer system 92 accesses a requested still when the INITIATE bar is pressed and the address is shown on the display. If an illegal or off-line still address is requested, the computer system will so advise the operator through the display. If the address read from the still's identification data differs from the entered address and the computer system cannot resolve the discrepancy (a true tally error), the output video will go to black and an error message will be shown on the display. If an adjustment still in a pack is to be addressed, the next or previous still can be addressed by pressing either the "+1" or "−1" key and then the INITIATE bar.

To compose a sequence list, the operator enters on-line or off-line five digit addresses into the memory which is divided into two sections of 64 items each. One section is identified as LST A and the other list LST B. Each list includes item numbers 1 through 64. To list an address, the still is first selected by entering the video channel letter and the five digit still address. The LIST bar on the keyboard is then pressed and the first item number and list identification will be requested of the operator. When these characters have been entered into the keyboard, the INITIATE bar is pressed and transfer into the memory occurs. The display switches to return (RTN) message and advises the operator of the completed transfer. The next still can then be selected for listing. The item (ITM) number is automatically incremented by one by the computer control system so that subsequent listings are made simply by entering the still address, pressing the LST and then the INITIATE bar. Following the last ITM number on a list, the END-of-LIST (EOL) button must be pressed before pressing the INITIATE bar. If it is desired to view a still before listing, the still's address is entered and the INITIATE bar is pressed before the LST bar. Subsequent listing of the still is effected as described above. If the selected still is off line it can still be stored in the list, but the still obviously cannot be viewed. From the sequence list stored in memory, a sequence can be assembled as will be described hereinafter.

In the record/delete mode, recordings can be made on deleted bulk tracks and assembled sequences can be deleted as can occupied bulk tracks. It is also possible to over record individual stills of assembled sequences in this mode. The normal procedure for recording a still is to enter the letter of the video channel through which the recorded video is to be monitored, the two digit pack address, i.e., 1 through 64, in which the still is to be recorded and three zeros in lieu of a track address since the still is to be recorded on the next available track. Upon pressing of the INITIATE bar the computer system 92 automatically searches for the next available deleted track in the addressed pack and, following a true tally check, makes a recording. The search occurs in the computer system's status memory and does not require stepping through the tracks to find a deleted one. After recording, the RTN display is updated by the computer system to reflect the five digit address where the still was recorded. If a recording was not permitted, the operator is so notified. When an off line pack is placed on a drive to make a next available track recording, an initial search of all tracks using the pack identification mode is necessary to establish their status in the computer system memory. As long as the pack remains on line, subsequent next available track recordings do not require that this initial search be repeated.

If it is desired to record a still on a specified track, the operator must enter the video channel letter and the five digit address before pressing the INITIATE bar. If a recorded still is present on the specified track, the recording will not occur and the operator will be notified through the display that the track is occupied.

To delete a still, its 5 digit address must be entered and the delete function is initiated by actuating the NORM/DEL key switch and then pressing the DEL/EDIT ENABLE and the INITIATE bars simultaneously. If however, the INITIATE bar is pressed prior to pressing the DEL/EDIT ENABLE bar, the track's video is available for viewing. After viewing, the delete operation can be reinitiated by simultaneously pressing the DEL/EDIT ENABLE and initiate bars. This permits visual checking of a still before it is deleted.

To delete an entire assembled sequence of stills, or a portion of the sequence concluding with the last still of the sequence, the ITM number of the first still to be deleted in the sequence is entered in place of the normal track address entry. The computer system automatically recognizes that the entered number defines a working track and not a bulk track and initiates the deletion of the sequence. The NORM/DEL key is actuated and the DEL/EDIT ENABLE and INITIATE bars are simultaneously pressed to effect the deletion. Deletion will cease after the item identified as EOL (end of list) has been deleted.

In the event last minute editing of a completed assembled sequence is desired it is possible to over record assembled stills in this mode by addressing a working track by its five digit address and simultaneously pressing the DEL/EDIT ENABLE and INITIATE bars. It should be understood that the over record capability does not apply to the bulk tracks, only to the working tracks as previously mentioned.

To assemble a sequence of stills, the SEQ ASSY button is depressed. This mode causes a sequence of items in a sequence list to be automatically assembled in a defined pack. To assemble the sequence, the two digit address of the pack to receive the assembled sequence is entered, followed by the first ITM number in the sequence and the LST letter. When the INITIATE bar is pressed, the computer system automatically assembles the on-line stills onto the working tracks of the addressed pack. If an off-line still is encountered during the assembly operation, off-line status indication will appear on the display. When assembly of on-line items is completed, each off-line pack which includes list items is identified on the display. To include an off-line still to the assembly, another assembly operation is declared when the previously off-line still is placed on-line. It is necessary to assemble the sequence as many times as there are different off-line pack addresses in the sequence list. For each assembly operation, the previously assembled stills are not disturbed. On each disc pack, a working track is dedicated to each item number, providing a maximum assembled sequence length on each pack of 64 items. As each item in a sequence is assembled onto a working track it is recorded with an OCCUPIED status indication. The status prevents an item from another sequence being assembled onto the same working track.

In the sequence play (SEQ PLAY) mode of operation, access to assembled stills in the working track of a pack through their respective sequence item numbers is allowed. To play a sequence, the video channel letter, two digit pack address, initial ITM number must be entered. When the INITIATE bar is pressed, the still assigned to the ITM number is accessed. The RTN display is then updated to contain the accessed still's address, video channel letter and ITM number. Also, the keyboard ITM number is automatically incremented by one so that sequential items in a sequence list can be accessed merely by pressing the INITIATE bar with no new data entered. To skip a next item in a list, the "+1" key in the rightward cluster is pressed which increments the keyboard ITM number by two. Similarly, pressing the "−1" button will decrement the item number by one. When the last ITM in a sequence has been played, the end of list EOL is displayed. If the INITIATE bar is pressed after the EOL item is played, playback stays at the EOL item. With the addition of an auxiliary access panel, stills stored in the working tracks of disc packs located on two drives can be accessed for a sequence play operation. In the apparatus described herein, the auxiliary access panel need only include two keys; an INITIATE bar and an auxiliary access panel select key. An access station is constructed and interfaced with the auxiliary access panel so that the functional keys of the access station are used to enter the data associated with operations to be performed through the auxiliary panel. Once the conditions for sequence play operation have been set for the access station and for the auxiliary access panel, stills from the disc pack on the drive controlled by the auxiliary access panel can be accessed by operating the INITIATE bar of that panel while stills from the disc pack on the drive controlled by the access station can be accessed by operating that access station's INITIATE bar. The display of the auxiliary access panel together with the display 82 of the associated access station are updated as described above to keep the operator or operators informed of the status of the sequence play operation.

The E-to-E mode is set up by pressing the E-to-E button in the leftward cluster in the internal access station and allows bypassing the disc pack to evaluate video performance on a channel independent of the recording and playback process. When selected, the digital video input to a drive is sent directly to the video playback channel and, in this mode, it is possible to select individual video channels for the signal path. To perform the operation, the video channel letter, disc drive number is entered and the INITIATE bar is pressed which causes E-to-E video to be available for monitoring. Pressing the INITIATE bar again returns the system to play mode and the disc video may be viewed. The E-to-E mode is useful in performing diagnostic and maintenance checks to determine performance characteristics.

To enter the pack identification mode, the PACK IDENT key is pressed. This mode provides a means for reading and storing in the computer control system memory the identification data recorded on all data tracks of a disc pack. When this mode is selected and the video channel designator and disc drive number are entered, the INITIATE bar pressed, then a check of each track in the disc pack is made. The number of erroneous pack addresses encountered in the check is also displayed.

The pack definition mode is entered by depressing the PACK DEFINE key and this mode facilitates entering new packs into the library. One of the disc drives, for example, drive No. 1 is designated as the defining disc drive so that any pack on this drive automatically becomes a new pack when this mode is initiated. The mode is initiated by entering the new two digit pack address, activating the NORM/DEL key switch 86, then pressing the DEL/EDIT ENABLE key and the INITIATE bar simultaneously. At the disc drive, the pack's data tracks are recorded with new identification data and each track is recorded with a deleted indication. Completion of the definition operation is signalled by a FINISHED message on the display.

In the pack duplication mode, achieved by pressing the PACK DUPE key, an exact duplicate of the entire digital video information recorded on a disc pack can be made. In this mode, one of the disc drives, for example, drive No. 1 is defined as the source and another defined as the receptor for the duplication operation. To initiate the pack duplication mode, the operator enters the two digit pack address, actuates the NORM/DEL key switch 86 and then presses the DEL/EDIT ENABLE and INITIATE bars simultaneously. The apparatus automatically transfers the contents of each of the source packs' tracks to the corresponding tracks in the pack that is on the receptor disc drive. The receptor pack number becomes the pack number that was entered following selection of the duplication mode. Completion of the duplication operation is signalled by a FINISHED message on the display.

It should also be understood that the keys in the leftward cluster 85 which define the mode of operation that is to be carried out preferably are of the type which light when they have been placed in an active status. Thus, when the play operation is selected by pressing the PLAY key, it will light and will remain lighted until the apparatus is taken out of that mode of operation.

The flow chart of the control program that carries out the above functional description in terms of the operation of the access stations controlling the computer control system 92 is contained in FIG. 63.

COMPUTER CONTROL SYSTEM

Referring more specifically to the computer control system 92 shown in the block diagram of FIG. 4, it is shown in more detail in the block diagram of FIG. 8. The computer system 92 is shown to comprise a central processing unit or CPU 106 and associated program storage memory unit 107 communicating with several interfacing devices to effect control of the various devices used in the operation of the apparatus. A single main bus 105 is provided for transferring both address and data information between the CPU 106, the memory unit 107 and the several interfaces, the address and data information being time multiplexed along the bus 105. Interrupt bus 143 comprised of several lines is provided to connect the CPU 106 to the access stations used by operators to direct the performance of functions by the apparatus. Whenever an access station requires the service of the CPU 106, the station causes an interrupt command to be sent by the remote access station interface 115 to the CPU over a line of the bus 143. This causes the CPU to interrupt its operation and service the calling station. In addition, a control bus 144 comprised of several control lines is provided to interconnect the units, and interfaces and access stations for transmitting control, timing and status information between them. Under the direction of the control program stored in the memory unit 107, the CPU 106 interprets a set of instructions received in response to the operation of an access station, panel or other system access device and executes the necessary routines and arithmetic functions to direct the computer system 92 to cause the requested functional operations to be performed by the apparatus. The manner in which the control program causes the CPU 106 to execute received instructions to perform the various functional operations capable of the apparatus is described in the flow chart contained in FIG. 63. The control program described by the flow chart is arranged to operate with a CPU manufactured by Digital Equipment Corporation and identified hereinbelow.

To effect control of the apparatus, the CPU 106 and memory unit 107 are connected through the main bus 105 to a central processing unit interface 108 that includes an address decode unit 113 which identifies the system unit selected for either receiving information from or transmitting information to the CPU 106. For the Digital Equipment Corporation manufactured CPU, a 16 bit address is employed to identify the selected system unit. The 3 most significant bits of the 16 bit address identifies whether a peripheral device or one of the memory banks in the memory unit 107 is selected for interconnection with the CPU 106. The next 13 most significant bits of the address forms the address word identifying the particular address location requested within the selected system unit. A byte organized addressing scheme is employed in the Digital Equipment Corporation manufactured CPU and the least significant bit of the address word identifies whether an odd or even byte address is received.

The CPU 106 operates asynchronously with the other system units comprising the apparatus. However, the other units operate synchronously with respect to a system clock. The time interfacing of the asynchronously operated CPU 106 and the other synchronously operated system units is effected at the address time during the address/data multiplex cycle of the main bus 105 and is accomplished by a bus sync signal issued by the CPU 106 at the address time and transmitted over one of the control lines 144 to the CPU interface 108. The CPU interface 108 is responsive to the bus sync signal to issue the appropriate device select signal determined by the address word at address time and, thereby, permit the selected system unit to be interfaced with the CPU 106.

In the apparatus described herein, several peripheral devices are employed for performing the various functional operations desired of the apparatus. When the 3 most significant bits of the 16 bit address identifies that a peripheral device has been requested for interfacing with the CPU 106, the address decode unit 113 is commanded by the CPU to decode the 13 bit address word and identify which of the 21 separate device select lines are to be activated for effecting the interface between the CPU and the requested peripheral device. Six of the device select lines are used to activate either a teletype interface device 109 for communicating with an external teletype keyboard 110, or a paper tape reader 111 or a read only memory 112 for receiving from or transmitting to the CPU 106. The 15 separate device select lines which go to the right in FIG. 8 as shown by the group of lines 114 are used to activate additional peripheral devices for interfacing with the CPU 106. Control signals issued by the CPU 106 over control lines 144 to the requested peripheral unit determine in accordance with the functional operations to be performed by the apparatus whether the requested peripheral device is conditioned to receive from or transmit to the CPU 106. With respect to the remote access station interface 115, a UART clock timing signal is generated by the CPU interface 108 provided to this interface over line 1121 when it is requested for interfacing with the CPU 106.

With reference to the peripheral devices associated with the device select lines 114, a remote access station interface 115 interfaces the bus 105 with the remote access stations 76, an auxiliary access panel 116, via a remote access station or the internal access station 78 and requires 4 device select lines as indicated. A disc drive interface 118 interconnects the bus with the disc drive circuitry of 3 disc drives and requires 3 device select lines. A signal system interface 119 performs the same interfacing function for the recording and playback processing circuitry of the signal system and requires 3 device select lines. The data track interfaces 120 provide a similar interfacing function with respect to the data track surfaces of each of 3 disc drives and the operatively associated circuitry located in the disc drives and the signal system and requires 3 device select lines. A computer interface 121 may be provided to interface the bus 105 and central processing unit 106 with an automation computer that may direct the operations of an entire television studio including other video recording devices and the like. Two device select lines are available for interfacing automation computers with the CPU 106.

In the computer control system 92 employed in the apparatus described herein, at least 2 device select lines are employed to effect selection of each peripheral device. Normally a line is activated when data is to be transmitted to the CPU 106 and another is activated when data is to be received from the CPU. However, some of the peripheral devices associated with the interfaces require more data from the CPU 106 to perform the many functional operations desired from the apparatus than can be accommodated in the 16 bit binary word system around which the Digital Equipment Corporation manufactured CPU is organized. To enable retention of 16 bit binary word organization and thereby enable the utilization of the above-identified Digital Equipment Corporation manufactured CPU, the 16 line main bus 105 is used to transmit all data to such interfaces in the form of 16 bit binary words and additional device select lines are provided when the interface requires more data than can be accommodated in one 16 bit binary word. The plurality of device select lines is selectively activated so that certain data is transmitted over the 16 lines of the main bus 105 when one of the device select lines is activated and other data when other of the device select lines are activated. For the apparatus described herein, a maximum of 2 device select lines is used in those interfaces requiring more data from the CPU 106 than can be accommodated in a 16 bit binary word.

Figure 29:
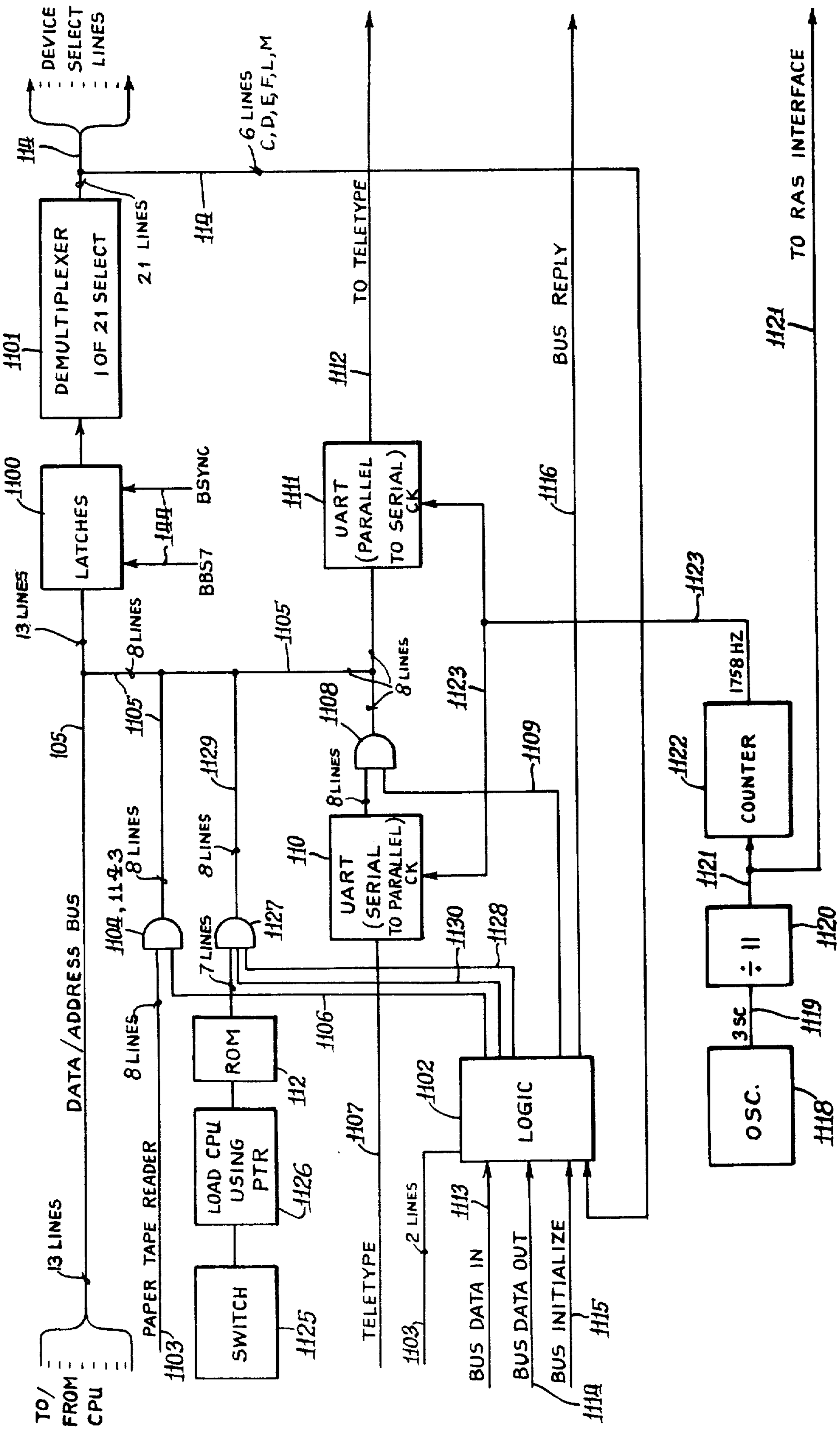
FIG. 29 is a functional block diagram of the central processing unit interface portion of the computer control system of the apparatus.

The central processing unit is preferably a microprocessor or microcomputer and, in the apparatus described herein, it comprises an LSI-11 system made by the Digital Equipment Corporation of Maynard, Mass. More specifically, the apparatus of the present invention incorporates as the CPU a model KD11-F microcomputer type LSI-11 system which contains a microprocessor and a 4k by 16 bit semi-conductor read/-write memory. The detailed description and nature of the operation of the LSI-11 microcomputer is described in the Digital Equipment Corporation LSI-11 Users Manual, identified as part No. EK-LSI11-TM-002 copyright 1975, which is incorporated by reference herein. A block diagram of the central processing unit interface 108 is shown in FIG. 29 and detailed electrical schematic digaram shown in FIGS. 58A through 58D. The remote access station interface 115 is shown in a functional block diagram in FIG. 30 and the detailed schematics of the same are shown in FIGS. 55A through 55D. The detailed electrical schematic diagrams for the disc drive interface are shown in FIGS. 35A and 35B. The first data track interface portion is shown in the functional block diagrams of FIGS. 33A and 33B and the detailed schematic diagrams thereof are shown in FIGS. 57A and 57B. Similarly, the second data track interface is shown in the detailed electrical schematic diagrams shown in FIGS. 34A through 34H. The detailed electrical schematic diagrams of the signal system interface are shown in FIGS. 32A and 32B. The above mentioned interfaces will be described in detail hereinafter.

VIDEO SIGNAL SYSTEM

While the signal flow paths for both the recording and playback operations have been briefly and broadly described, the signal processing system for the composite television signal is much more detailed than is shown by the signal flow diagrams contained in FIGS. 6 and 7. The video signal system will now be described in greater detail in conjunction with the block diagram illustrated by FIGS. 9A and 9B which contains additional blocks than previously identified. However, the reference numbers previously identified will remain where corresponding functions are performed. The block diagram of FIGS. 9A and 9B also includes wider lines representing the video data flow through the signal system as well as other interconnecting lines that are necessary for controlling the timing and synchronization of the circuitry represented by the various blocks. The interconnection of the signal system with the computer control system (described in conjunction with the block diagram of FIG. 8) is also shown, in that the input and output lines from the various blocks in FIGS. 9A and 9B which have an asterisk adjacent to them are lines which extend to the computer control system 92.

It should also be understood that the apparatus of the present invention will be described herein with respect to use in an NTSC system which has a television field comprised of 525 lines, horizontal synchronizing pulses occurring at a rate of about 15,734 Hz (often referred to herein as "H sync") which means that the period between successive H pulses is approximately 63.5 microseconds. Moreover, the vertical blanking rate in the NTSC system occurs at a 60 Hz frequency and the chrominance information is modulated on a subcarrier signal having a frequency of about 3.58 megahertz (MHz). The subcarrier frequency of 3.58 MHz will often be referred to herein simply as SC which means 1 times the subcarrier frequency and, similarly, other commonly used clocking frequencies in the described apparatus include ½SC, 3SC and 6SC. The 3 times subcarrier frequency (3SC) often occurs for the reason that during sampling of the analog composite video signal for digitizing the signal, a sampling rate of 3 times the subcarrier frequency, i.e., 10.7 MHz is used.

Referring again to FIG. 9A, but before discussing the functions of each of the blocks shown therein, some broad general considerations should be understood with respect to the overall operation of the illustrated signal system. Firstly, the video input signal that is fed to the video input circuitry 93A is an analog signal which is processed and applied to an analog-to-digital converter 95. The output of the converter contains the video information in digital format and the digitized data is further processed and recorded on a disc pack in a digital format. Similarly, it is played back from the disc pack, time base corrected and chroma separated and processed using digital techniques and is not converted to an analog signal until one of the final steps where the digital-to-analog converter and sync and burst insertion circuitry provides the analog composite video output as shown.

In the analog-to-digital converter 96, the analog composite video signal is sampled three times per nominal subcarrier cycle, or at a sampling rate of 3SC (10.7 MHz), and each sample is digitally quantized into an 8 bit digital word. A sampling clock having a frequency of three times or any odd multiple of the NTSC subcarrier frequency is necessarily an odd multiple of one-half of the horizontal line frequency. If such a sampling clock is phase continuous from line to line, its phase at the start of consecutive lines changes. Using such line to line phase continuous sampling clocks will result in the instantaneous amplitude of the analog signal being sampled during consecutive lines at different times relative to the start of the consecutive lines. Because of this, the quantized samples are not in vertical alignment from line to line. Vertical alignment of the samples from line to line is desired to facilitate the use of a digital comb filter to obtain a separated chrominance component of a television signal by combining quantized samples from three consecutive (all odd or all even fields) television lines of a television field, which may be designated T (for top), M (for middle), and B (for bottom) in proportion to the formulae (Chrominance) $C=M-\frac{1}{2}(T+B)$ (Luminance) $Y=M+\frac{1}{2}(T+B)$.

It should be appreciated that if the samples of the NTSC television signal are taken at an even multiple of the subcarrier frequency, the comb filtering technique would be ideal because the phase of the sampling clock would not change from line to line. Hence, the digital code words or quantized samples would describe the instantaneous amplitudes of each line of the analog signal at the same times relative to the start of each line and all of the samples in the consecutive lines would be aligned vertically from top to middle to bottom.

Figure 9C:
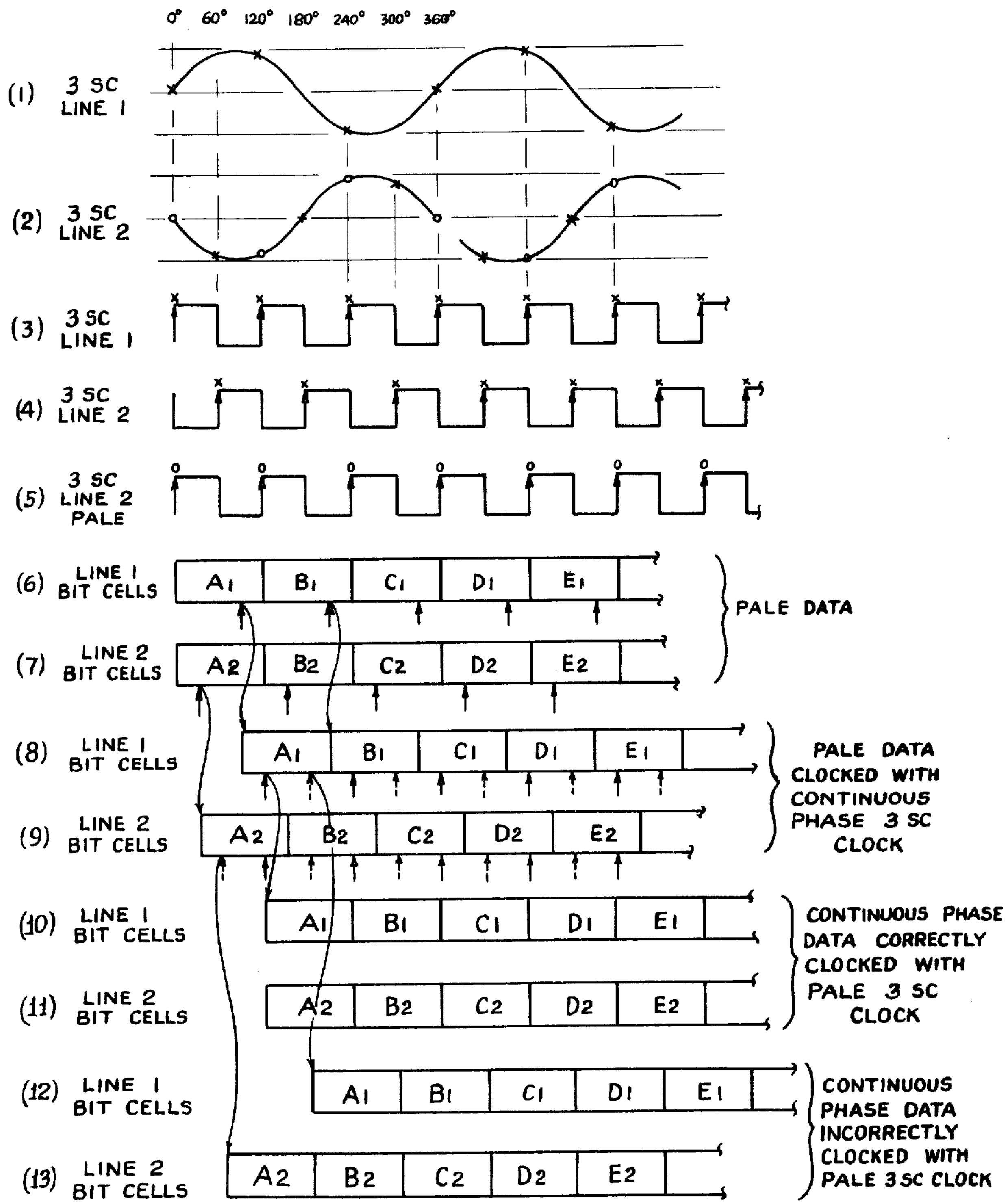

The lack of vertical alignment of the samples of consecutive lines when using a 3SC, line to line phase continuous sampling clock can be more readily appreciated with reference to FIG. 9C(1) which shows a number of cycles of subcarrier in television line 1 that are sampled by the positive transition of a 3SC sample clock (FIG. 9C(3)) wherein the upward transition has an arrow depicting an "X" sample point that is also placed on the subcarrier for television line 1 at every sample point (FIG. 9C(1)). As shown, there are three samples for each cycle of the subcarrier. However, during television line 2, i.e., the next consecutive line, the subcarrier has a reversed phase as shown in FIG. 9C(2) and similarly, the sampling clock 3SC is of opposite phase (FIG. 9C(4)) relative to its phase in line 1 (FIG. 9C(3)) so that during television line 2 the samples are taken where shown by the X's of the television line 2 subcarrier (FIG. 9C(2)) on the upward transitions and it is seen that the X samples from line 1 to line 2 are misplaced by 60° with reference to SC, which detrimentally affects the response of the comb filter, which utilizes the instantaneous amplitude of the analog signal in the above mentioned equations for properly deriving the chrominance information. It should be appreciated that the samples taken on all odd lines will be vertically aligned and that the samples taken on all even lines will be vertically aligned but that the samples taken on even lines will be displaced 60° with reference to SC relative to those samples on the odd lines.

To avoid the problem created by sampling at an odd multiple of subcarrier frequency, i.e., 3SC in the present apparatus described herein, vertical alignments of samples in all lines can be achieved by changing the phase of the sampling clock on alternate lines. In the examples shown in FIG. 9C, reference is made to FIG. 9C(5) which illustrates the 3SC sampling clock for television line 2 which has its phase reversed relative to what it would have been for television line 2, which is shown in FIG. 9C(4). By sampling on the upward transitions at the "0" sample points, samples marked by the "0" on the subcarrier for line 2 result as shown in FIG. 9C(2). Thus, the sample points in the subcarrier for television line 1 ("X's") are vertically aligned relative to the sample points ("0's") that are sampled using the alternated phase sample clock shown in FIG. 9C(5) rather than what would have normally occurred as shown by FIG. 9C(4). This technique is commonly referred to as phase alternate line encoding or PALE and the terms PALEd, PALEing and the like will commonly be referred to throughout the description of the apparatus described herein.

While the apparatus described herein utilizes comb filtering techniques together with a sampling rate of 3SC or 10.7 MHz and requires the use of a PALE sampling clock, it should be appreciated that a 4SC sampling frequency would eliminate the need for PALEing. The use of a 4SC sampling frequency is within the contemplation of the apparatus described herein in the event that the frequency response of the recording media, i.e., the disc packs on the disc drives is sufficient to permit operation at the 4SC, 14.3 MHz frequency. In this regard, it is to be appreciated that standard disc drives used in data processing applications typically operate in the range of about 6½ megabits and the recording at a rate of 10.7 megabits represents a significant increase in the packing density of the disc packs themselves.

Another important aspect of the operation of the present apparatus that is a result of the use of PALEing will also be described with respect to FIG. 9C. By changing the phase of the sampling clock on every consecutive line, a phase discontinuity necessarily occurs with respect to SC. It is more convenient during the channel encoding of the signal for use in subsequent recording to channel encode the digitally quantized samples with respect to a continuous phase clock, i.e., no phase discontinuities from line to line. For this reason during recording, the PALEd data that results at the output of the analog-to-digital converter is clocked out of the channel encoder with a clock that has a continuous (i.e., no discontinuities) 3SC phase from line to line. However, clocking the encoder with a line to line continuous phase clock shifts the data in time on alternate lines by ½ cycle of 3 SC, which disturbs the line to line sample time alignment created by sampling with a PALE clock. Since during playback the chroma processing circuitry requires the samples of data to be vertically aligned from line to line, which was the reason that a PALE sample clock was used in the analog-to-digital converter in the first place, it is necessary to retime or reclock the data from the continuous phase clock back to the PALE clock so that the sample time disturbance is removed and the chroma processing comb filter can process the data without error. Succinctly stated, the A/D converter samples the analog signal using a PALE clock having line to line phase discontinuities. For recording, the channel encoder encodes the PALE data with a line to line continuous phase clock, which requires, during playback and after decoding, the retiming of the NRZ information to a PALE clock for use by the chroma processing circuitry. However, the latter retiming from a continuous to a PALE clock is not performed during transfer modes of operation when the video data recorded on one disc drive memory is played back to be transferred and recorded on another disc drive memory. In such case, the line to line continuous phase data clocking of the played back video data is retained and the data is rerecorded without disturbing the data clocking.

The above considerations will now be described in conjunction with FIG. 9C where the PALE data for lines 1 and 2 are shown in FIGS. 9C(6) and 9C(7), respectively. The bits A1 through E1 are consecutive bit cells that represent the instantaneous samples of the analog video signal that occur in line 1 corresponding to the X's shown in FIG. 9C(1), with each bit cell lasting a full clock cycle of the 3 SC clock shown in FIG. 9C(3). Similarly, the line 2 bit cells A2 through E2 represent data that is derived by the sampling at the "0's" in FIG. 9C(2) using the PALE sample clock, which for television line 2 is shown in FIG. 9C(5). To clock the PALE data with a line to line continuous phase 3 SC clock, arrows beneath the bit cells shown in FIGS. 9C(6) and 9C(7) depict the clocking points of the line to line continuous phase clock that produce the bit cells that are shifted and are in the relation shown in FIGS. 9C(8) and 9C(9). The start of each bit cell occurs at the clocking point and the level of the cell will be continuous through the bit cell interval so that the bit cells maintain their identity during the clocking.

To retime the data from the line to line continuous phase clock back to PALE clock so that the bit cells (samples) are vertically aligned as they should be, i.e., A2 is vertically aligned with A1, B2 with B1, etc., the retiming from the continuous phase clock to the PALE clock must be correctly done or misalignment of the bit cells will result. In this regard, the retiming or reclocking must be complementary, i.e., a bit cell that was clocked in the right portion thereof in a PALE-to-continuous reclocking must be left clocked in the continuous-to-PALE reclocking to insure proper playback. Thus, given the line to line continuous phase clocked data shown in FIGS. 9C(8) and 9C(9), the solid arrows illustrate the proper complementary clocking for the two television lines and produce the retiming of the data to the PALE clock having the A1 and A2 bits vertically aligned as shown in FIGS. 9C(10) and 9C(11). It should be noted that where bit cells that were right clocked going from PALE-to-continuous reclocking, are left clocked in the opposite conversion as is evident from viewing any of the bit cells, e.g., A1, with their associated clocking arrows in FIGS. 9C(6) and 9C(8). In the event that complementary clocking is not performed, then the bits will not be properly aligned as is shown by the dotted clocking arrows in FIGS. 9C(8) and 9C(9) which produce the relationship shown in FIGS. 9C(12) and 9C(13). The reclocking from either PALE to continuous or the converse is performed at various locations as will be evident from the ensuing description.

It should also be realized that the NTSC television signal does not have any specified, defined relationship between the horizontal sync pulse occurring at each line and the phase angle of the subcarrier signal with the exception that the phase of the subcarrier changes 180° from line to line. In other words, the phase angle of the subcarrier signal relative to the H sync signal can vary from one video source to another and this variance makes the H sync an undesirable signal to control the operation of the apparatus. Accordingly, the apparatus herein uses the input signal's subcarrier as represented by the color burst sync component as the basic timing reference for the system and defines a new H sync related signal that is used for timing purposes instead of the signal's H sync. The new H sync related signal is chosen to be at a frequency of ½ of the nominal horizontal line frequency because it represents a whole number of cycles of the subcarrier frequency, i.e., two complete horizontal lines of subcarrier frequency or 455 cycles. Moreover, the H sync related signal is given a definite relation to the subcarrier, i.e., it is synchronized with respect to the phase angle of the subcarrier. In the record portion of the signal system a synchronizing word is inserted in the video signal on alternate television lines at a location corresponding approximately to that of the video signal's H sync and phase coherent with respect to a particular phase angle of SC generated from the video signal color burst subcarrier synchronizing component. The location of the new H sync related signal is defined at the beginning of each frame and is maintained for the duration of the frame to provide the video signal with an H sync related signal accurately and consistently defined with respect to the phase of the video signal's subcarrier. For the playback portion of the signal system, an H sync related signal designated H/2 is provided that is redefined to be coherent with respect to a particular phase angle of the reference input subcarrier, which phase angle is selectable through the playback system phase control.

The redefined H sync related signal, H/2, is used as a basic timing reference signal for the system during playback operations.

By using the redefined H sync related signal as the horizontal sync reference for the system, processing signals for recording, playback and other operations of the system is facilitated because a consistent time relationship is established between the video signal's subcarrier and redefined H sync related signal.

Additionally, the use of internal horizontal and subcarrier reference signals that can be varied in time relative to the television station reference sync, permits timing control that will enable the television signal to reach a remote location at the proper time after having experienced the usual propagation delays that occur.

Referring again to the block diagram of FIGS. 9A and 9B, the analog video input is applied to the input of input circuitry 93A where several operations occur in the processing of the analog video signal before it is applied to the analog-to-digital converter 95. More specifically, the input circuitry 93A amplifies the analog video signal, provides DC restoration, separates the sync components contained in the video signal for use in generating timing signals for the signal system, detects the level of the tip of the H sync and thereafter clips the same. Moreover, the H sync is separated using a precision sync circuit for use in producing a regenerated sync. The circuit also produces a regenerated SC signal that is derived from the burst of the video input or, in the absence of burst, from an H/2 reference signal that is generated and is derived from the video input H sync.

It should be understood that the video input circuitry 93A and the reference input circuitry 93B shown in the lower left of FIG. 9A perform similar functions, the video input circuitry primarily for the signal recording portion of the signal system and reference input circuitry primarily for the playback portion of the signal system. Therefore, for convenience of manufacturing and service, identical circuitry is used. However, the input circuits are connected in the apparatus to receive only the input signals required to perform their respective functions and while the same signals are produced by each circuit, they are not all utilized from each circuit. The reference input to the reference input circuitry is the station reference color black video signal which contains all components of a color television signal except that the active video portion of it is at a black level. Thus, the burst, H sync and the like are present at the reference input circuitry 93B as they are at the video input circuitry 93A. In addition, the reference input circuitry 93B uses an H phase position adjusting circuit that receives H position control signals from an operator controlled thumb wheel switch or the like for adjusting the H phase position of the regenerated H sync used in the playback portion of the signal system.

As shown, many of the output signals provided by the input circuits 93A and 93B are applied to the reference logic circuits 125A and 125B associated with the respective input circuits. The reference logic circuit 125A during the record mode of operation uses the inputs from the video input circuitry 93A, the analog-to-digital converter 95 and the computer control system 92 and through precision phase lock loop circuitry, generates a number of recording clocks at frequencies of 6SC, 3SC, ½SC and a PALE flag signal. The PALE flag and 3SC signals are used by the reference logic circuit 93A to generate a 3SC PALE sampling clock signal whose phase is set for each line of the video signal by the PALE flag, which is at a frequency of H/2. The PALE flag signal changes state at that rate although it does so asymmetrically, i.e., the two states of the PALE flag signal are of unequal time intervals. It is made asymmetrical so that the sampling clock phase for the color burst portion of the video signal is constant with the phase of the subcarrier and only the portion of the television line thereafter has a sampling phase which is alternated on consecutive lines. This PALE clock is coupled to the analog-to-digital converter 95 and is the sampling clock signal for deriving the samples at 3SC or 10.7 MHz.

The reference logic circuit 125B uses inputs from the reference input circuitry 93B and the computer control system 92 and generates a clock reference signal at a frequency of SC and various other timing control signals. These signals are used in the operation of the apparatus in modes other than that of recording input video signals.

During the record and playback modes of operation, the reference logic circuits also generate servo sync signals for each of the disc drives for properly operating the disc drives at the proper phase.

During playback and other modes of operation other than that of recording input video signals, a reference clock generator 98 generates various clocks and additional timing control signals required by the various parts of the signal system used in such modes. The reference clock generator uses the inputs from reference input circuitry 93B, reference logic 125B, the playback portion of the signal system, an operator's control switch and generates clock signals at frequencies of 6SC, 3SC, SC and ½SC and various other timing control signals. The reference logic circuitry 125A and 125B and the reference clock generator circuitry 98 together comprise the signal system's clock generator 94 that provides the system timing control signals.

The clamped and H sync stripped analog video signal from the video input board is applied to the analog-to-digital converter 95 which converts the signal to an 8 bit binary coded signal in a PALEd NRZ (non-return to zero) format which is applied to the encoder switch 126. The analog-to-digital converter 95 is not shown in detail herein as it is identical in its design and operation to the one incorporated in the Ampex Corporation digital time base corrector No. TBC-800. More specifically, the schematic diagrams of the analog-to-digital converter 95 are shown in the catalog No. 7896382-02 issued October 1975. The specific circuitry for the analog-to-digital converter is shown in schematic drawing No. 1374256 appearing on page 3-31/32 of the catalog and in schematic drawing No. 1374259 appearing on page 3-37/38 of the catalog. These schematics are incorporated by reference herein.

The outut from the analog-to-digital converter is then fed to an encoder switch 126 which comprises switching circuitry that ordinarily receives either the 8 bit digitized video data from the converter or from data transfer circuitry 129. As will be described hereinafter, the data transfer circuitry 129 enables the video information to be transferred from one disc drive to another disc drive as previously discussed with respect to the operation of the apparatus using the remote or internal access stations. During the transfer mode of operation, the digitized information is read off the disc drive, decoded to the NRZ digital format, time base corrected and is then applied to the encoder switch which can select either source of digitized video information for the encoder 96. Because the channel encoded data recorded on the disc drives 73 has been clocked with a continuous phase clock, the NRZ data received by the data transfer circuitry 129 also is timed with respect to the continuous phase clock. Ordinarily, the data transfer circuitry 129 is provided with a PALE flag signal that is used to effect retiming of the NRZ digital data with respect to a PALE clock signal so that the data provided to the chroma separator and processing circuitry 101 is in the correct PALEd format. During the transfer mode of operation, this retiming is not necessary. The encoder switch 126 has circuitry for interrupting the coupling of the PALE flag signal to the data transfer circuitry 129 and thereby preventing the retiming of the NRZ data with respect to the PALE clock during the data transfer mode.

The encoder switch 126 is controlled by the computer control system 92 to gate the video data from either the video or transfer paths. It also switches between video and reference 6SC and ½SC timing signals since the reference timing signals are used during the data transfer mode and the video timing signals during the record mode. The encoder switch is also adapted to generate a signal that will produce a blinking cross through the TV image which is a visual indication that the still location or address for a still is unoccupied and therefore available for recording and also to provide signals for performing diagnostic functions.

The 8 bit data from the encoder switch 126 is then applied to the encoder 96 which initially generates a parity bit and then encodes the PALEd data into a Miller squared channel code format, which is a self-clocking, DC free, non-return to zero type of code. While PALEd data is applied to the encoder, the output of the encoder is a 9 bit data stream (if parity is included) that has a phase continuity with respect to 3SC. The continuous phase clocked data is easier to process, particularly, during the decoding operations. The DC free code avoids any possible DC component that could occur due to a preponderance of one logical state over a period of time which could have an effect of disturbing the data in the playback process. Reference is made to the application by Jerry Wayne Miller U.S. Ser. No. 668,679, entitled "DC Free Encoding For Data Transmission System" filed Mar. 19, 1976 and assigned to the same assignee as the present invention.

As is comprehensively described therein, the coded format can be characterized as a DC free, self-clocking, non-return to zero format. It provides for transmitting binary data over an information channel of limited bandwidth and signal to noise, where the data is transmitted in self-clocking format that is DC free.

In limited bandwidth information channels which do not transmit DC, binary waveforms suffer distortions of zero crossing location which cannot be removed by means of linear response compensation networks. These distortions are commonly referred to as base line wander and act to reduce the effective signal to noise ratio and modify the zero crossings of the signals and thus degrade the bit reliability of the decoded signals. A common transmission format or channel data code that is utilized in recording and reproducing systems is disclosed in Miller U.S. Pat. No. 3,108,261 issued Oct. 22, 1963. In the Miller code, logical 1's are represented by signal transitions at a particular location, i.e., at mid-cell, and logical 0's are represented by signal transitions at a particular earlier location, i.e., near the leading edge of the bit cell. The Miller format involves the suppression of any transition occurring at the beginning of 1 bit interval following an interval containing a transition at its center. Asymmetry of the waveform generated by these rules can introduce DC into the coded signal and the so-called Miller "squared" code used in the present apparatus effectively eliminates the DC content of the original Miller format and does so without requiring either large memory or the necessity of a rate change in the encoding and decoding.

The encoder circuitry 96 also generates a unique sync word in the form of a 7 digit binary number and inserts the sync word on alternate lines in a precise location determined by the 6SC and ½SC clock signals. In the record mode of operation, clock signals generated from the synchronizing components of the input video signal by the reference logic circuitry 125A are provided to the encoder circuitry 96 by the encoder switch 126 and result in the sync word being inserted at a location that approximately corresponds to where the video signal's horizontal sync pulse was previously located. In other modes of operation, the 6SC and ½SC clock signals are generated from the synchronizing components of the station reference color black video signal by the cooperative action of the reference logic circuitry 125B and reference clock generator 98. The encoder gates the H sync related sync word into the data stream on alternate television lines at the proper time relative to the regenerated subcarrier phase.

Data track information to be recorded on the data track of the disc drives 73 is also encoded by the encoder 96 prior to recording. The data track information is provided by the computer control system 92 through its data track interface 120.

With reference to FIG. 9B, the ten data streams of encoded digital data appearing at the output of the encoder 96 is applied to an electronics data interface 89 which is merely signal splitting and buffering circuitry. which couples the encoded data to the three disc drives 73 for selective recording on the disc pack 75. Each disc drive includes a disc drive interface 151 adapted to receive the encoded digital data from the electronics data interface 89 and send it to the record amplifier circuitry 153 and head switch circuitry 97 for recording on an associated disc pack 75 as well as to receive reproduced or detected data from the playback amplifier circuitry 155 and head switch circuitry 97 and send it to the data select switch 128. In addition, the disc drive interface 151 receives the multiplex servo reference signal through the electronics data interface and sends it to the timing generator (FIG. 39) of the disc drive control circuitry. This signal is selected by the computer control system 92 from either reference logic circuitry 125A or 125B. The timing generator employs the multiplex servo reference signal to time the operation of the disc drive system so that record and playback operations and the rotational position of the disc pack 75 within the disc drive 73 are synchronized to the appropriate signal system timing reference.

The disc drive control circuitry returns pre-record timing and data timing signals through the disc drive data interface 151 to the electronics data interface 89 of the signal system. In the particular embodiment of the apparatus described herein, only two fields of the four field NTSC color television signal color code sequence are recorded, with each of the two fields recorded during separate revolutions of the disc pack 75. Immediately prior to the recording of the two fields of video data, the pre-record timing signal is generated and coupled to the electronics data interface 89. The interface sends the pre-record timing signal to the encoder 96 to cause the generation for an interval equivalent to two fields data equivalent to color black, which is digitally defined by logical 0's in the apparatus described herein. The two field interval of color black data is returned through the interfaces for recording on the disc pack at the track location selected for recording video data and its associated data track information. The recording of the two fields of color black data occurs during two revolutions of the disc pack 75 immediately preceding the two revolutions during which the two fields of video data are to be recorded. This conditions the track location for the subsequent over recording of the video and data track data. Because over recording previously recorded digital data with new digital data can be conducted to obliterate the previously recorded digital data and leave a recorded signal of sufficient quality to provide an acceptable signal to noise ratio upon playback, the pre-record cycle of operation could be eliminated from the apparatus and the recording of the two fields of video data and associated data track data accomplished in only two revolutions of the disc pack 75.

The data timing signal is returned to the electronics data interface 89 to time the generation and recording of the data track information during the second or last field of the two fields of video data. The signal is a pulse which begins after the vertical sync occurring between the two fields of video data and terminates at the end of the second field. It is during this interval that the data track information is recorded on the data track of the disc pack 75. The electronics data interface 89 couples the returned data timing signal to the data track interface 120 of the computer control system 92 for identifying the data track recording interval to the system. In response, the computer control system 92 performs functions incident to the recording of data track information, including the provision to the signal system of the data track information associated with recording video data on a specified track of a specified disc pack. The encoder 96 receives the data track information and processes it as described herein for sending to the disc drive 73 and recording simultaneously with the last field of video data.

The record and playback amplifier circuitry 153 and 155, the head switch circuitry 97, and the disc drive control circuitry of the apparatus described herein are arranged together so that the playback amplifier circuitry 155 and head switch circuitry 97 are activated to reproduce data from the associated disk pack 75 at all times except when a record operation is being performed. Hence, except during record operations, reproduced data is always being received by the disc drive interface 151, which in turn always provides the reproduced data to the data select switch 128. To record data, a record command provided by the disc drive control circuitry is coupled to the record and playback amplifier circuitry 153 and 155 to activate the record amplifier circuitry 153 and disable the playback amplifier circuitry 155. The disc drive control circuitry also provides a 30 Hz head switch signal to the head switch circuitry 97 during record operations to cause the head switch circuitry to couple the data streams to one set of heads during the first field of two consecutive fields of data to be recorded and to the second set of heads during the second field. The 30 Hz head switch signal is continuously available and is similarly employed during playback operations to control the head switch circuitry 97 to switch the playback amplifier circuitry 155 between the two sets of heads for the reproduction of both fields of a desired video data signal.

Returning to FIG. 9A, during playback operations, the reference input circuitry 93B together with the reference logic 125B produces the regenerated subcarrier frequency for application to the reference clock generator 98 and the reference clock generator has outputs of 6SC, ½SC and H/2 for providing the basic timing for playback operations. The reference clock generator outputs are applied to the data decoder and time base corrector 100, data transfer circuitry 129 and the chroma separator and processor 101 in addition to a video playback output circuit 127 that inserts blanking, performs selective bit muting, and provides a selected monochrome video signal for output by the signal systems when the heads associated with a disc drive coupled to the playback channel are moved between track locations. The 8 bits of digital information are then applied to the digital-to-analog converter and sync and burst insertion circuitry 103. Moreover, during the transfer and diagnostic modes of operation, the reference clock generator 98 supplies the basic timing clocks for the encoder 96 through the encoder switch 126 as shown.

During playback, the 10 bit parallel data stream comprising 8 bits of video data, the parity bit and data from the data track reproduced from a disc pack is amplified, equalized and detected by circuitry shown and described herein with reference to FIGS. 24 through 28, 53 and 54 and is then applied through the disc drive data interface circuitry 151 to a data select switch 128 which can switch any of the outputs of the three disc drives onto one or more of three channels. Thus, the data select switch can switch the information from disc drive No. 1 into channel A, or to two channels while simultaneously applying a data stream from another disc drive onto another channel. While information from two drives can not be simultaneously applied to a single channel, the converse is possible. The data select switch 128 comprises conventional switching circuits which are not set forth in detail herein.

Each of the detected nine bit streams of video data and parity data from the data select switch 128 is then applied to nine individual data decoders and time base correctors 100 which decode the data and then independently time base correct each of the nine data streams with respect to a common H/2 reference which is defined with respect to the phase of the regenerated reference subcarrier to remove any timing errors that may be present among the nine lines of data, i.e., it aligns all sync words so that each 9 bit parallel byte comprises the correct 9 bits of data. The other bit stream from the data track is coupled by the data select switch 128 to only the decoder portion of the decoder and time base corrector circuitry 100 and the decoder data track information is coupled to the data track interface 120 for transmission to the CPU 106. The time base corrector does its correction using a continuous phase clock. However, the data is again retimed with respect to a PALE clock by the data transfer circuitry 129, i.e., the phase of the signal is alternated by reclocking it at every horizontal line, so that the 8 bit data stream that comes from the data transfer circuitry is a true PALEd signal again. The data transfer circuitry 129 also performs a parity check of the off disc data and performs error masking of individual byte errors when they occur by substituting what is likely to be the most similar previously appearing byte for the byte that was detected as being in error. In this regard, the byte that is substituted is the third previous byte, which is the most recent sample that was taken with the same phase relation to SC.

The output of the data transfer circuitry is applied to the chroma separator and processing circuitry 101 in the event that the video information is desired for viewing, as opposed to being recorded on another disc drive (transfer), in which case the data from the data transfer circuitry 129 is coupled to the encoder switch 126. The chroma separation and processing circuitry 101 works in the digital domain and separates the chroma information from the luminance using comb filter techniques and inverts the chroma information on alternate frames to form a four field composite NTSC signal that is then applied to the video playback output circuitry 127 which inserts a reference black level during the blanking period, inserts grey level signals during the interval between the playback of consecutive stills, and performs bit muting operations if desired. The bit muting effectively mutes any bit or bits of an 8 bit television signal by shutting down that data bit stream and by so doing, achieves unusual visual effects in the resulting television signal such as producing exaggerated tones, ghostlike images and the like. The output from the blanking insertion and bit muting circuitry 127 is then applied to the digital-to-analog converter 103. The digital-to-analog converter receives clock signals from the playback output circuitry 127 and converts the data to its analog form and also inserts the sync and burst components of the signal to produce a full composite analog television signal.

While the foregoing generally describes the overall operation of the signal system in a general manner, a more specific description of each of the blocks that are contained in FIGS. 9A and 9B will be described either with respect to the separate functional block diagrams or the specific electrical schematic diagrams for the circuits themselves. Also where functional block diagrams are used to describe the operation of the individual blocks of FIGS. 9A and 9B, the electrical schematic diagrams corresponding to those more detailed block diagrams are also included herein.

VIDEO AND REFERENCE INPUT CIRCUITRY

The video input and reference input circuitry 93A and 93B broadly described with respect to the block diagram of FIG. 9A contain substantially similar circuitry in both locations, although different inputs are received by each and all of the outputs that are available from each are not used. During record operations, the composite video input signal to be recorded is applied to the video input circuitry 93A which is used to obtain a regenerated subcarrier signal, and various vertical and horizontal sync rate related signals that are used by the apparatus in the performance of the record operations. The video input circuitry also provides an amplified and filtered video signal suitable for feeding the A/D converter 95. During playback operations, a reference color black video signal is applied to the reference input circuitry 93B which provides similar signals for use by the apparatus in the performance of the playback operations.

Figure 10:
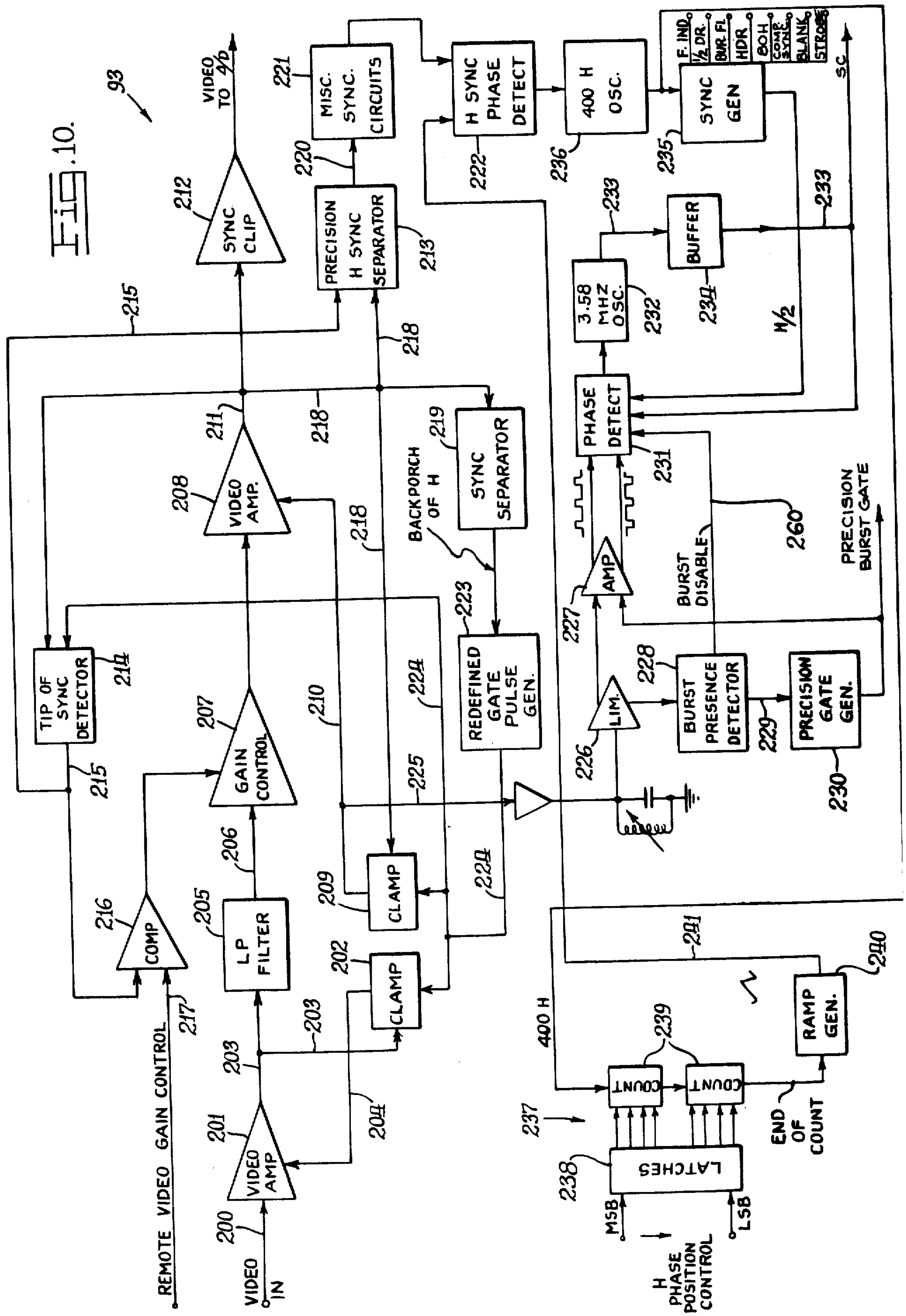
FIG. 10 is a functional block diagram of the video input circuitry (substantially similar to the reference input circuitry) which is a portion of the signal system shown in FIG. 9A.

Referring more specifically to the block diagram for the video and reference input circuits shown in FIG. 10, the video signal is applied on line 200 into a video amplifier 201 which amplifies the signal and restores the DC component through a clamp 202. The clamp 202 samples the output of the amplifier on line 203 and produces a DC component on line 204 that extends to the amplifier 201. The DC restored video signal on line 203 is then passed through a low pass filter 205, the output of which appears on line 206 extending to a video gain control amplifier 207. The amplifier 207 is connected to another video amplifier 208 where a second clamp circuit 209 assures that the blanking level of the signal is at ground level by the application of a DC control signal via the line 210 to the video amplifier 208. The output of the video amplifier appears on line 211 and is coupled by one of the lines 218 extending therefrom to the sampling input of the clamp 209. Line 211 also extends to a gated sync clipping circuit 212 as well as to a precision sync separator 213. A tip of sync detector 214 detects the level of the tip of sync which appears on line 215 that extends to a comparator 216 as well as to the precision sync separator 213. In the video input circuitry 93A, a remote video gain control signal on line 217 is also applied to the comparator 216 for controlling the gain control amplifier 207 from a remote location. In the reference input circuitry 93B, the gain of amplifier 207 is not controlled from a remote location. The output of the tip of sync detector 214, which may contain alternating current ripple, is applied to one input of the precision H sync separator 213 while the other input to the separator is provided by one of lines 218 that extends from the output of the video amplifier 208. The two inputs to the precision sync separator 213 will both have AC ripple thereon if present in the signal and, accordingly, they are common moded so that the separator produces an AC ripple free precision separated sync on line 220 that is applied to miscellaneous sync circuits 221 and to an input of a horizontal sync phase detector 222. Another of the lines 218 from the output of the video amplifier 208 extends to a less precise sync separator 219 that produces a generally less precise separated sync signal which is applied to a gate pulse generator 223, outputs of which appear on lines 224 that extend to both clamps 202 and 209 as well as to the tip of sync detector 214. When the horizontal sync signal is detected and separated, a gate is produced by the pulse generator 223 which closes the clamps as well as the sync tip detector at the appropriate time during horizontal blanking.

The clamp 209 is closed during burst time for a whole, integral number of cycles, rather than an arbitrary period, so that the blanking level of the video signal can be accurately obtained using integration techniques as will now be described in detail. The burst appears on line 210 as well as on line 225 which is applied to a burst limiter circuit 226 that is in turn connected to an amplifier 227 providing complementary outputs of the limited burst input. The output of the limiter circuit 226 is also connected to a burst presence detector circuit 228 having an output on line 229 that extends to a precision gate generator 230 as well as an output on line 260 that extends to a phase detector 231. When the presence of burst is detected, the precision gate generator 230 generates a precision burst gate signal that is coupled to enable the amplifier 227 and permit it to pass the middle three cycles of burst to apply them to the phase detector 231. The phase detector responsively provides an error signal to a voltage controlled oscillator 232 that reflects the difference in phase between the output of the oscillator and the phase of the burst cycles from the amplifier 227. The effect of the phase detector circuit controlling the oscillator 232 is to correct for longer term changes and not short term changes in the phase of the three cycles of burst that are used on every line as the subcarrier reference. The output of the oscillator 232 appears on line 233 after having been buffered by a buffer 234. The output of the oscillator is a continuous regenerated subcarrier signals SC (3.58 MHz) that is phase locked to the color burst when burst is present. However, in the event that the burst detector circuit 228 fails to detect burst, then the phase detector 231 compares the phase of an H/2 signal with the regenerated subcarrier output of the oscillator 232, the H/2 signal being produced by a sync generator 235 from an oscillator 236 that is controlled by the horizontal sync phase detector 222.

A horizontal phase position control, indicated generally at 237, is provided for use in the reference input circuitry 93B to adjust the horizontal positioning of the regenerated sync. An 8 bit binary number is loaded into latches 238 by an operator controlled thumb wheel switch or the like to preset a counter 239 which is clocked by a 400 H clock derived from the oscillator 236. When the counter reaches its terminal count, it triggers a ramp generator 240 having an output 241 which extends to a second input of the H sync phase detector 222. Thus, by adjusting the latches, up to plus or minus 20 microseconds can be inserted in the feedback loop on line 241 and the phase of the regenerated sync signal can be adjusted for horizontal positioning of the picture during playback. Since a delay in the feedback loop means that the regenerated sync will be advanced, the horizontal position control can effectively advance the picture to compensate for propagation delays during transmission of a signal through cabling in a television station. As will be explained hereinafter in the detailed description of the reference clock generator circuitry 98, this horizontal phase position control is operated in conjunction with a subcarrier phase control whereby the amount of delay can be controlled in small increments, which in the embodiment of the apparatus described herein is about $\pm 8.0$ nsec.

The output of the oscillator 236 also is used by the sync generator 235, which is of conventional design for television signal processing equipment, to generate the various vertical and horizontal sync rate related signals indicated in FIG. 10. These sync rate related signals are generated with respect to the phase of the precisely regenerated H sync as provided by the phase detector 222 and, therefore, will always have a phase related to the input signal.

An important aspect of the circuitry shown in FIG. 10 is that the H sync of the video signal is clipped at precisely ½ its value and the level of the blanking is precisely clamped to ground. The regenerated subcarrier is phase locked with the burst and a precision horizontal sync signal is regenerated utilizing the precision sync separator. This signal is used by the sync generator 235 to provide a reset pulse (30 Hz field index pulse) for resetting a line identification or sync word inserter that will be hereinafter described. Since the clamp circuitry 209 examines for a zero average level of video at burst time using a clamping pulse which lasts precisely a whole number of cycles of burst, there is no need for low pass filtering the video and rejecting the burst before clamping is performed. This is due to the fact that resulting integration of the burst is equal to zero and there is no H/2 ripple introduced by integrating a signal that does not contain complete cycles of burst.

The block diagram shown in FIG. 10 describes the functional operation of the input circuitry and specific circuitry which can be used to carry out the operation thereof is shown in FIGS. 42A through 42D which together comprise a single circuit diagram for the input board.

With respect to the operation of the clamp 209 (see FIG. 42C), the voltage at the output of the amplifier 208 appears on lines 211 and 218, one of the latter of which extends downwardly to the base of an emitter follower transistor 244 that provides a voltage drop. Under equilibrium conditions, the blanking level of the video signal appearing on line 218 will be at ground potential. This signal is shifted by about 0.7 V toward the negative as a result of the voltage drop through the emitter follower 244. A matching emitter follower transistor 245 with its emitter connected to the negative input of a differential amplifier 246 by line 247 shifts the comparison level (ground) toward the negative as does transistor 244. The emitter of the transistor 244 is connected to the positive input of the differential amplifier 246 when a transmission gate or switch 248 is closed during and for a whole number of cycles of burst by a signal on the line 224 that is produced by the redefined gate pulse generator 223 shown in FIG. 42D. Thus, during the burst time, switch 248 is closed charging a capacitor 249 to the average level of the burst. The switch is closed for an integral number of cycles of the subcarrier. This eliminates the need for low pass filtering the video to remove the burst before the clamping is performed, which is ordinarily done in the prior art in order to eliminate H/2 modulation of the clamping level. The charge on the capacitor 249 reflects exactly the average value of the burst and the differential amplifier 246 output represents an error that is applied to the video amplifier 208 through line 251, transistor 252 and line 210 which is connected to the emitter of the transistor 252. The blanking level of the signal on line 211 is thus held very close to ground due to the high DC gain of the differential amplifier 246. The operation of the clamp 202 is substantially similar to the operation of the clamp 209 and is shown in FIGS. 42A and 42B.

Referring again to FIG. 42C, the closing of the switch 248 gates burst through the switch into capacitor 249 and onto line 225 which extends leftwardly to FIG. 42A which is connected to the emitter of a transistor 254 and the burst therefore appears on the collector and on line 255 that extends to the burst limiter circuit 226. When burst is present, the burst presence detector circuit 228 provides a limited burst signal on its output line 229 that clocks the precision gate generator 230. A counter is employed as the precision gate generator and counts cycles of the limited burst signal and produces a precision burst gate during the middle three cycles of the nine to eleven cycle burst interval that is coupled by line 256 to enable the amplifier 227. Therefore, except for the middle three cycles of burst, the amplifier 227 is disabled by the output of the burst presence detector circuit 228. When burst is present, the diode detector 257 and following latch circuit 258 of the detector circuit 228 provides a more negative level on line 260 extending to a switching transistor 259 (FIG. 42B) of the phase detector 231. When burst is present, switching transistor 259 is shut off and another switching transistor 261 of the detector 231 is turned on. When transistor 261 is on, the three cycles of burst from the amplifier 227 is applied by the driver 277 to a transformer 262 of the detector 231. The driver is in turn connected to the phase comparator **231*a* for comparing the phase of the burst with the phase of the output of the 3.58 MHz (SC) oscillator 232 that is present on line 233. When burst is not detected by the detector circuit 228, transistor 259 is switched on, which applies the signal H/2 to the other input of the driver 277 that is also connected to the transformer 262 and the phase of the oscillator output on line 233** is compared with the phase of the H/2 signal.

Turning now to the detailed circuitry for performing the precision H sync separation and referring to FIG. 42C, the sync is taken from the amplifier 208 on the line 218 extending to a low pass filter 264 whose output is coupled to the base of a transistor 265. The emitter of transistor 265 is connected to a transmission gate or switch 266 that is closed during the presence of sync by control line 224. The level of the sync is determined by charging a following capacitor 267 (FIG. 42D), which is buffered by a unity gain amplifier 268, and ½ of the DC level of the tip of sync together with the full level of AC ripple present in the signal is then applied via line 215 to one input of comparator 213, the other of which is supplied by line 269 that comes from the emitter follower transistor 265. In this manner, the output on line 220 is a separated sync whose timing is not affected by AC ripple on the video, because any AC ripple will appear on both inputs of the comparator 213 and will be prevented from appearing in the output of the comparator because of common mode rejection. The sync appearing on line 220 is a precision sync that is used by other parts of the signal system to generate horizontal line related synchronizing signals redefined in relation to a particular phase angle of the subcarrier signal which serve as timing references in the signal system for processing the video signals. Also, the horizontal line related synchronizing signal used in the system is at a rate of ½H sync because there are a whole number of subcarrier cycles for every two horizontal lines (227.5×2=455) and this consideration becomes important in the operation of apparatus described herein as will be evident from the ensuing description.

A less precise separated sync is also developed by taking the sync from the low pass filter 264 via line 270 to the imprecise sync separator 219, the output of which appears on line 271 that is applied to the gate pulse generator 223 which includes a one shot serving as a sync presence detector 276. The upper circuit, indicated generally at 272, generates a gate for use by the switch 266 to close the switch during the presence of sync, a circuit 273 produces a backporch sample and a circuit 274 redefines with respect to SC phase a burst gate signal. With respect to the detector 223, it should be appreciated that if no sync is present and therefore does not appear on line 271 from the imprecise sync detector 219, the sync presence detector 276 will through circuit 274 close the switch 248 in the clamp circuit 209 as well as a similar switch 275 in the clamp 202 so that all clamps operate on a DC feedback loop rather than permitting them to remain open. Thus, if sync is not present, the level on line 224 is placed high until sync returns and is detected. In addition, as a precautionary measure in the event the precision gate generator 230 does not receive the necessary number of burst cycles to clock it to its terminal state or count after its count cycle has been initiated, the detector 276 is coupled through circuit 274 to provide the burst gate signal to the precision gate generator 230 to assure termination of its count cycle and provision of the precision burst gate signal. This assures that the precision gate generator 230 will always properly respond to every input burst signal.

Because of the desirability of having a field index signal in the encoder switch 126 that is accurately related in phase to the input video signals's vertical sync, the output of the precision H sync separator 213 and an output of a vertical sync detector 278 (FIG. 42B) are provided to a NOR gate 279 (FIG. 42D) which provides the desired field index signal.

REFERENCE LOGIC CIRCUITRY

The reference logic circuitry 125A and 125B shown in the block diagram of FIG. 9A receive various signals from the input circuitry 93A or 93B relating to horizontal and vertical sync signals, regenerated subcarrier and the like and respectively generate a number of clock and timing control signals used in the operation of the apparatus. In addition, the computer control system 92 provides control signals to both logic circuitry 125A and 125B which cause the generation of servo sync signals which control the operating phase of the disc drives in accordance with the operation, viz, record, playback, transfer and the like, being performed by the apparatus. The reference logic circuitry is essentially duplicated so that one reference logic circuit is provided for use with the video input circuitry 93A and another for the reference input circuitry 93B, with the function of the reference logic circuitry being somewhat different during different operations of the apparatus such as recording, playback, transfer and the like. Because the logic circuitry 125A and 125B perform different functions, different inputs are received by each and all outputs that are available from each are not used.

The operation of the reference logic circuitry will now be explained in further detail with reference to a functional block diagram shown in FIG. 11A that has a dotted line extending horizontally in approximately the middle of the drawing. As is shown thereon, the upper portion of the circuitry is used only during a recording operation, whereas the lower portion is used during recording, playback and other operations performed by the signal system. The function of the upper portion of the circuitry is to generate various phase locked clock signals for recording operations using the regenerated subcarrier that was produced by the video input circuitry 93A from the color burst as has been previously described. The circuitry also generates a nonsymmetrical PALE flag signal at a rate of H/2 which is used within the circuitry to alternate the phase of the analog-to-digital converter sampling clock on consecutive horizontal lines for the reasons that have been hereinbefore described. The PALE flag is also available as an output from the reference logic circuitry 125B for use by other parts of the signal system, primarily those used in processing playback signals. The circuitry also generates a drive synchronization signal for operation of the servo control of the disc drive motors, providng a set of three pulses at a rate of 15 Hz which is multiplexed with H sync for use in controlling the disc drive servo. Other timing control signals are provided by the reference logic circuitry 125B as will be described in the following detailed description.

Figure 11B:
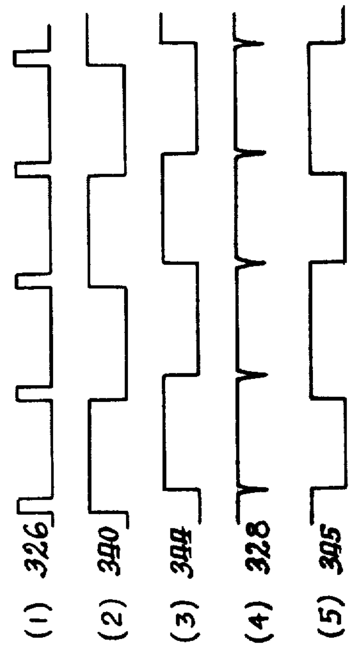
FIG. 11B is a timing diagram for the PALE Flag generator included in the reference logic circuitry shown in FIG. 11A.
Figure 11A:
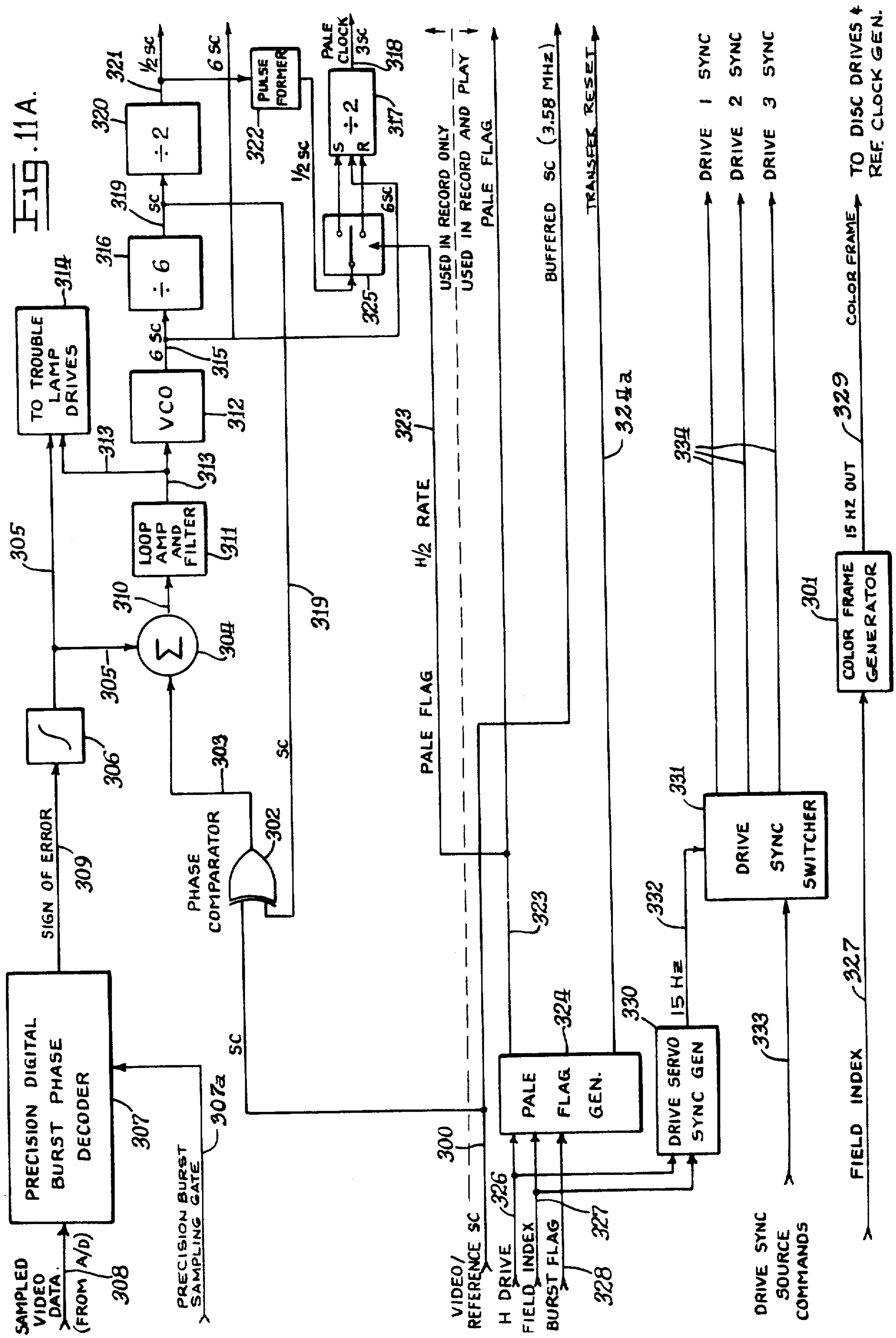
FIG. 11A is a functional block diagram of the reference logic circuitry which is a portion of the signal system shown in FIG. 9A.

Referring to the upper portion of FIG. 11A, the subcarrier signal (SC) from either the video input circuitry 93A for the reference logic circuitry 125A or reference input circuitry 93B for the reference logic circuitry 125B is applied on line 300 and it is extended to a phase comparator 302, the output of which appears on line 303 to a summer 304 that has a second input on line 305 provided by an integrator 306. A precision digital burst phase decoder 307 receives the actual digitized video data taken from the output of the analog-to-digital converter 95 on line 308 and decodes whether the samples were taken at the proper phase of burst and produces a plus or minus error signal to the integrator 306 via line 309 for use in adjusting the phase of the sample clock so that the video signal is always correctly sampled. The output of the summer 304 appears on line 310 which is applied to a loop amplifier and filter 311 that is connected to a voltage controlled oscillator 312 by line 313 which also extends to one of two trouble lamp drivers 314. The output of the oscillator 312 appears on line 315 at a frequency of 6SC which is applied to a divide by 6 counter 316 as well as to a divide by 2 counter 317 which produces a PALE clock output at a frequency of 3SC on line 318. The divide by 6 counter has an output on line 319 at a frequency of 1SC which is applied to a divide by 2 counter 320 as well as to the other input of the phase comparator 302. The output of the divide by 2 counter 320 is a ½SC signal on line 321 which also extends to a pulse former 322 that is used to set and reset the divide by 2 counter 317 on alternate lines, the control being supplied through line 323 at an H/2 rate that is supplied by a PALE flag generator 324 as will be discussed hereinafter.

The operation of the upper portion of the circuit is to generate a 6SC frequency signal at the output of the voltage controlled oscillator 312 that is precisely controlled so that sampling that is performed by the analog-to-digital converter 95 is done precisely at the same phase of the color burst synchronizing signal at all times. This is important when it is considered that the phase of the video that is sampled will ultimately determine the color that is produced by the apparatus. Thus, the phase comparator 302 having one input supplied by the divided output of the VCO 312 through line 319 provides a phase lock loop that will lock the phase of the output relatively close to the video or reference subcarrier phase appearing on line 300 supplied to the other input of the comparator 302. The divided output of the VCO 312 through the phase lock loop produces an SC signal that is generally within approximately 10°. However, the digitized video output from the analog-to-digital converter 95 is also applied through line 308 to the precision digital burst phase decoder 307 which is enabled by the precision burst sampling gate signal received from the video input circuitry 93A over line **307*a* to generate an error signal derived during the burst interval of the video that is integrated by integrator 306 to provide an average value that is applied to the summer 304. This causes the voltage level out of the loop amplifier 311 controlling the VCO 312 to be adjusted to correct variations in the sampling times of the video signal as reflected in the burst samples provided to the decoder 307. The burst samples will represent the same quantity values for all lines if no variation in sampling times occur. By examining the sampled data actually appearing at the output of the analog-to-digital converter, it can be precisely determined whether the samples were taken at the proper phase and in this manner, the VCO output on line 315 which is applied to the divide by 2 counter 317 produces a PALE 3SC clock on line 318 which controls the analog-to-digital converter 95 for keeping the sampling at the proper phase. The precision digital burst phase decoder 307 effectively corrects any errors that may be produced due to temperature drifting and the like which can be on the order of 5° to 10°. In this regard, the phase of the video (or reference) subcarrier on line 300 provides the basic lockup for the VCO 312 and the precision correction that appears on line 305 in the reference logic circuitry 125B** is arranged to change the phase by a few degrees, i.e., up to about 20°.

With respect to the lower portion of the block diagram of FIG. 11A, the PALE flag generator 324 produces a PALE flag signal at the H/2 rate for switching a switch 325 which steers ½SC pulses into the set or reset terminals of the divide by 2 counter 317 that produces the PALE clock on the output line 318. The PALE flag changes state every line as will be described herein with respect to FIG. 11B. The PALE flag signal is nonsymmetrical so that the phase of the 3SC PALE clock is never reversed during the burst interval of the video signal even though it is reversed during the active video of alternate lines. Thus, the net effect is that only the portion of the line after burst is sampled with a clock signal whose phase is reversed on alternate lines, i.e., a nonsymmetrical signal. As is shown in FIG. 11A, the PALE flag generator 324 has inputs from the video (or reference) input circuitry 93A or 93B of H drive applied on line 326, a field index pulse on line 327 and a burst flag on line 328. The burst flag keeps the PALE flag generator from producing the PALE flag signal on output 323 until after burst has occurred, since the sampling phase of burst must not be altered for the operation of the burst phase decoder 307 in the upper portion of FIG. 11A. The PALE flag generator 324 provides an H/2 rate transfer reset pulse which is sent over line 324*a* to the encoder switch 126 which employs it during data transfer operations to generate a signal that is used by the encoder 96 to reset its sync word inserter.

The H drive and field index signals are also applied to a drive servo sync generator 330 which has an output extending to a drive sync switcher 331 through line 332 and it provides the basic drive sync signals on line 334 for each of the disc drives 73 when commanded by the control line 333 from the computer control system 92. The sync signals are required for all operations in which the information is transferred between a disc pack 75 and the signal system. The computer system 92 differentiates whether a record or playback operation is desired. The sync information is in the form of a multiplex sync signal that appears on lines 334 that extend to the disc drive units and includes a set of three consecutive wide pulses to indicate the first field being recorded or played back at a 15 Hz set rate well as horizontal sync pulses (at H rate) and is used for control of the spindle servo motor. Color frame and related sync signals also are provided for control of the servo drive and for use by the reference clock generator in generating control signals used during playback operations. The color frame related sync signal is obtained from a color frame generator 301, which receives the 30 Hz field index pulse signal over line 327 and frequency divides it by 2 to obtain the 15 Hz color frame signal. The color frame signal is sent over line 329 to the disc drives 73 and the reference clock generator 98.

The specific circuitry that can be used to carry out the operation of the block diagram shown in FIG. 11A is illustrated in FIGS. 43A through 43D, which together comprise an electrical schematic diagram of the reference logic circuitry. Since the operation of the circuitry shown in the detailed schematic diagram is carried out generally in the manner as has been previously described with respect to FIG. 11A, it will not be described in detail herein. However, with respect to the digital burst phase decoder 307 shown in the upper portion of FIG. 43A, the digitized video in the form of 8 bits that is derived from the output of the analog-to-digital converter 95, appears on lines 308 which are connected to arithmetic logic units 335 which in turn connect to shift registers 336. The shift registers 336 are clocked by the logic circuitry, indicated generally at 337, which is activated upon receipt of the precision burst sampling gate over line 307*a* and together with the arithmetic logic units 335 perform the arithmetic steps that are necessary to determine the sign of the phase of the digitized color burst on line 309. The error of any sampling is determined by examining the quadrature component of the samples which would be zero if the samples are taken at the proper phase of the subcarrier signal. More specifically, the quadrature component is proportional to the function $X1-\frac{1}{2}(X2+X3)$ where the samples X1, X2 and X3 are 120° apart. The clocking logic 337 performs the sequence that enables the arithmetic units 336 to carry out the arithmetic computation which will produce either a plus or minus signal on line 309 indicating an error in the phase of the actual samples.

Turning now to FIG. 43A which contains circuitry 324 for generating the PALE flag signal on line 323, the H drive signal is inverted by inverter 342 and is applied via line 338 into the clock input of an FF 339 which is a divide by 2 having output line 340 applied to the input of a second FF 341 that is clocked by the burst gate or flag signal on line 328. Line 340 also extends to a NAND gate 343 as does the output line 344 from the FF 341. The operation of the PALE flag generator 324 will now be described in connection with the timing diagrams shown in FIG. 11B which has the H drive signal (line 326) shown in FIG. 11B(1), the signal on line 340 shown in FIG. 11B(2), the signal on line 344 shown in FIG. 11B(3), the burst gate clock on line 328 shown in FIG. 11B(4) and the output of the NAND gate on line 345 appearing in FIG. 11B(5). The PALE flag signal on line 323 is the inverse of the signal on line 345 by virtue of inverter 346. While the PALE flag signal occurs at a rate of H/2, FIG. 11B(5) shows it to be nonsymmetrical because the output of FF 341 appearing on line 344 and applied to the NAND gate 343 is delayed with respect to the output from the first FF 339 because the FF 341 is clocked by the burst gate rather than by H drive.

REFERENCE CLOCK GENERATOR

The reference clock generator 98 produces the basic timing signals for the apparatus during playback, data transfer, diagnostic and other like operations during which input video signals are not recorded and uses as its input timing reference the regenerated SC (3.58 MHz) that is produced by the input circuitry 93B and passed through the reference logic circuitry 125B. The reference clock generator has phase shifting capability for shifting the entire system phase and includes a phase locked loop and assorted counters and logic circuits to generate the timing signals with the desired system phase. It also generates control signals used by the data decoder and time base corrector 100 and the chroma separator and processing circuit 101.

Figure 12A:
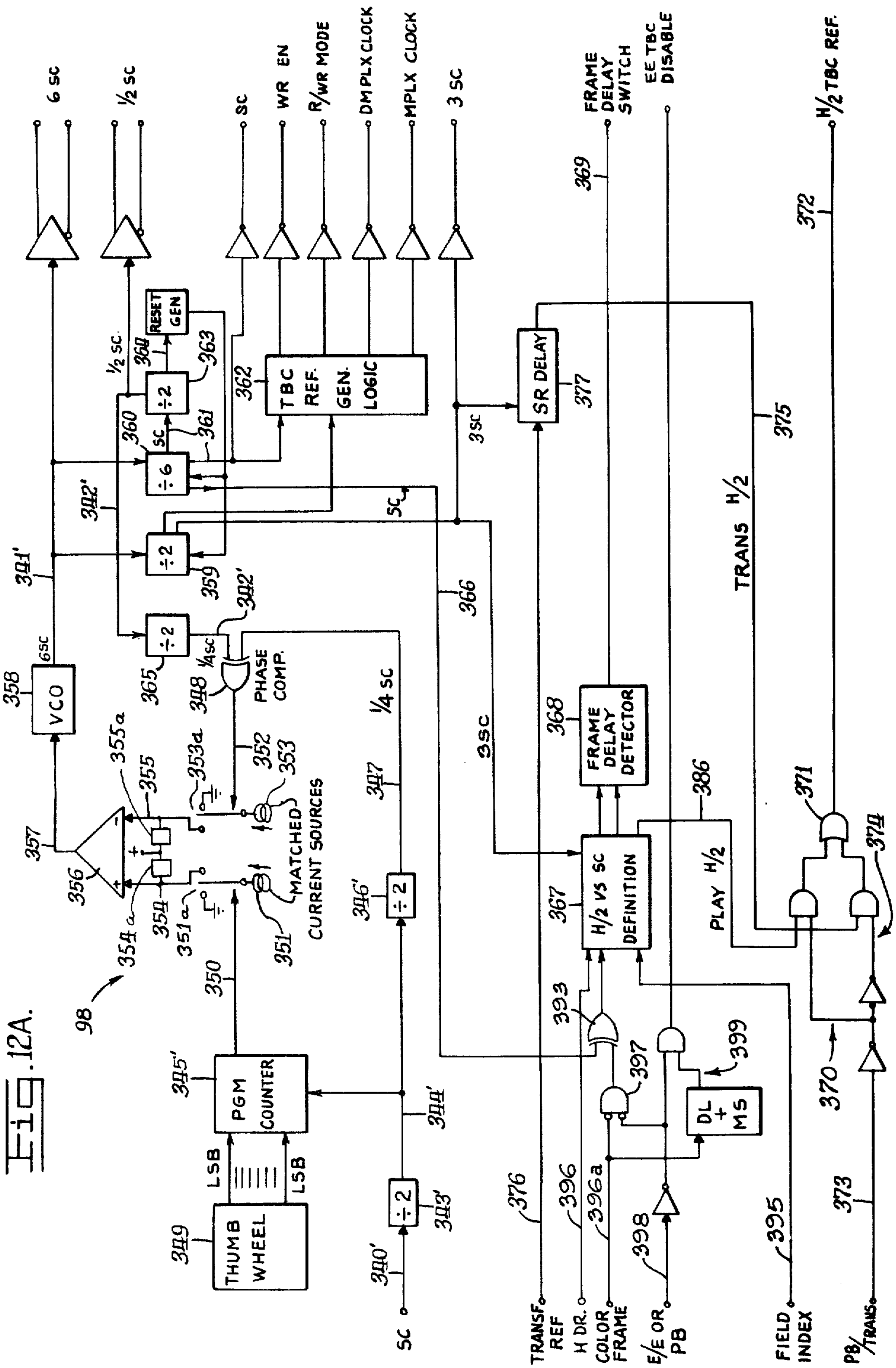
FIG. 12A is a functional block diagram of the reference clock generator circuitry which is a portion of the signal system shown in FIG. 9A.

The operation of the reference clock generator 98 will now be described in more detail in conjunction with the block diagram shown in FIG. 12A. As is shown therein, the top half of the circuitry produces various timing signals including several clock signals and the bottom half uses reference synchronizing information, such as color frame from the reference logic circuitry 125B and field index and horizontal drive signals from the reference input circuitry 93B and generates the control signals used by the time base corrector and chroma circuitry. More specifically, the SC signal is applied to the reference clock generator 98 at input line 340', causing the generator to produce ½SC, SC, 3SC and 6SC clock timing signals and various time base corrector pulse timing signals as indicated at the right of FIG. 12A. The reference clock generator 98 includes circuitry that is controllable by an operator through, for example, a thumb wheel switch 349 so that the phase of the output signals can be adjusted relative to the phase of the regenerated SC signal on the input by introducing various amounts of phase shift into the circuit and thereby set the playback system phase. Using the horizontal sync position control included in the reference input circuitry 93B and the SC phase control together enables an operator to determine and control the delay introduced to the playback signal channel over a large range in small increments. To control the phase of SC, the input regenerated SC signal on line 340' is divided by 2 by a divider 343', the output of which appears on line 344' that extends to two locations, one being the programmable counter 345' while the other is another divide by 2 divider 346' which in turn is connected by line 347 to a phase comparator 348. The thumb wheel switch 349 introduces a ten bit BCD number, ranging from 0 to 399, into the programmable counter 345' which has the effect of varying the phase of the subcarrier over a range of 0° to 399° in 1° increments. The output of the programmable counter, which is a periodic signal whose duty cycle may be varied in increments of precisely 1/720 of its basic period by means of the thumb wheel switch 349, extends to a current switch **351*a* which modulates the current from a current source 351 of one of two matched current sources 351 and 353. This modulated current extends to low pass filter 354*a* which develops a DC voltage proportional to the duty cycle of the signal on line 354**.

A circuit of identical DC characteristics comprising the other matched current source 353, a current switch **353*a* and a low pass filter 355*a*, develops a DC voltage on line 355 which is proportional to the duty cycle of the output of the phase comparator 348. The voltages on lines 354 and 355 are applied to a differential amplifier 356, the output of which is extended by line 357 to the control input of a voltage controlled oscillator 358, which operates at a nominal frequency of 6SC. A number of dividers 360 (divide by 6), 363 (divide by 2) and 365 (divide by 2) sequentially operate on the output of the oscillator 358, producing a signal with a nominal frequency of ¼SC on line 342' which extends to the second input of phase comparator 348, so that the duty cycle of the signal at the phase comparator output varies with the phase angle between its inputs. Under steady state conditions, the duty cycle of the signal on line 352 is forced to be equal to that of the signal on line 350 within a very small margin of error due to close matching of the current sources 351 and the DC impedance of filters 354*a* and 354*b***.

A change in the duty cycle of the signal at the phase comparator 348 output of 1/720 of its basic period requires a change of phase of 0.25° between its inputs, which have a frequency of ¼SC, and this in turn requires a change of 1° between lines 340' and 361, where the frequency is 1SC. Thus, changing the value by one on the thumb wheel switch 349 causes a 1° change in phase of the SC signal on line 361. The total range of phase comparator 348 (180° at ¼SC) corresponds to 720° at 1SC. For convenience, the thumb wheel switch is limited to 399°, which still insures adequate overrange capability with respect to the necessary 360°.

The phase controlled oscillator 358 provides the phase continuous 6SC clock timing signal over its output line 341' and, through the cooperative operation of the chain of dividers 359, 360 and 363, causes phase continuous 3SC, SC and ½SC clock timing signals to be provided at the outputs as designated in FIG. 12A. The dividers also furnish 3SC and SC clock signals to the logic circuitry 362 that produces phase continuous SC rate read/write (R/WR) mode, write enable (WR EN), demultiplex (DMPLX) clock and multiplex (MPLX) clock signals used by the time base corrector circuitry 525. The schematic diagram illustrated by FIGS. 44A through 44D together with the timing diagram of FIG. 12B disclose the operation of one embodiment of logic circuitry 362 for providing phase continuous time base corrector clock signals with the desired timing relationships.

With respect to the lower portion of the circuitry shown in the block diagram of FIG. 12A, the circuitry redefines an H sync related, namely, H/2, signal so that it is synchronous with the phase continuous 3SC signal that is produced by the upper portion of the circuitry and is placed in a proper position relative to reference H sync. As will become apparent upon consideration of the description of H/2 vs SC definition or reclocking circuit 367 hereinbelow, maintaining H/2 at a fixed position with respect to H sync and also so that it occurs at the first line of the first field of every two field sequence (which corresponds to the placement of the sync word in the video signal), requires frame rate phase inversion of the subcarrier rate clock controlling the reclocking circuit 367 to redefine H/2 with respect to the phase of SC. Subsequent reclocking of the redefined H/2 signal with the phase continuous 3SC clock signal within the circuit 367 and use of the thusly reclocked and redefined H/2 in the time base corrector circuitry 525 to correct a repetitively reproduced color video signal composed of only two television fields reintroduces a 46 ns (½ cycle of 3SC) frame to frame motion of H/2 relative to reference H sync. This motion occurs because the reclocked and redefined H/2 is mispositioned relative to the proper H sync position on alternate frames and causes the time base corrector circuitry 525 to misposition the sync word a corresponding amount, or ½ cycle of 3SC, on alternate frames. As will be explained hereinbelow upon consideration of the sync word insertion circuitry portion of the encoder 96, the H/2 rate sync word is inserted in the video signal on alternate frames at a position that is displaced ½ cycle of SC from that corresponding to the reference H sync. This is because the sync word inserter is reset every frame and because the sync word is positioned on the first line of every frame, it being understood that the first line of successive frames have oppositely phased SC. The time base corrector circuitry inherently removes all of this displacement except for the aforementioned ½ cycle of 3SC. A following frame delay detector 368 generates a frame delay switch signal used by the digital-to-analog converter included in the circuitry 102 to correct for such motion. Also, it is not desirable to have the H/2 positive going transition of the unredefined H/2 signal coinciding exactly with a subcarrier transition in the reclocking circuit 367 because an ambiguously timed redefined H/2 pulse signal will be produced for use by the time base correctors 525 and errors in time base correction will result.

To produce an H/2 signal defined with respect to the phase of the phase adjusted, phase continuous regenerated subcarrier signal, SC provided by divider 360 is coupled to one input of a phase inverter 393 formed by an exclusive OR gate circuit. The other input of the phase inverter is coupled through a NAND gate circuit 397 to receive the 15 Hz color frame pulse signal present on input line 396*a*. The level of the color frame pulse signal at the input of the phase inverter 393 determines the phase of SC at the output of the inverter, a high level resulting in the inversion and a low level not. Inversion of the phase of SC is necessary because an H/2 signal is required that is phase coherent with H sync. (In the recorded video signal, a sync word is inserted in the same lines for all frames of the video signal, which in this apparatus is the odd numbered lines of the 525 lines forming an NTSC television frame.) Without inversion of the phase of SC, the phase of the redefined H/2 signal would change at a 15 Hz rate with respect to H sync by one half of an SC cycle. Such an H/2 signal would not be suitable as a reference for use in processing reproduced video signals during playback operations. The SC signal output by the phase inverter 393 is provided to the reclocking circuitry 367 and is used together with the reference H drive signal received over line 396 and the field index signal received over line 395 to generate the H/2 signal defined with respect to the phase of SC. The reclocking circuitry 367 includes logic circuitry to assure that an unambiguously timed H/2 signal is produced and defined with respect to the phase of SC.

The output of the reclocking circuitry 367 is then applied to the frame delay detector 368 which produces the frame delay switch signal on line 369 that identifies the first or second playing of a reproduced still, which is composed of two television fields or a frame, so that the clock generating circuitry for the digital-to-analog converter will know whether to insert an additional ½ period of 3SC offset to the digital-to-analog converter clock for correcting the previously mentioned 46 ns frame to frame motion of H/2.

The redefined H/2 pulse signal generated by the reclocking circuitry 367 appears on line 386 that is gated through AND gate circuitry 370 and 371 to appear on line 372 for use as the basic time base corrector circuitry reference during playback operations signified by an enabling signal provided on line 373 by the encoder switch 126 from control signals issued by the computer control system 92. During playback operations, a high level signal appears on line 373 and the playback H/2 on line 386 will satisfy AND gate circuitry 370 and will appear on line 372.

In other operations, such as E to E and transfer, involving the processing of video signals in a playback channel, the H/2 signal as ordinarily generated by the H/2 vs SC definition circuitry 367 is not used. In E to E operations, continuous time base correction is not necessary since the video signal does not experience a record and reproduce process. Hence, the EE or PB command provided by the encoder switch 126 from control signals issued by the computer control system 92 is coupled over line 398 to the reference clock generator 98 associated with the playback channel selected for use to disable the phase alteration of SC. The phase alteration is disabled through the operation of the NAND gate circuit 397 placing a low level signal on the second input of the phase inverter 393. Furthermore, the EE or PB command is coupled to logic circuitry 399 that responsively generates an EE TBC disable signal used to allow the time base corrector circuitry 525 to operate for approximately ten lines at the beginning of each color frame and, thereby, generate the proper timing correction for each color frame or every 15 Hz. This timing correction is required because during the sync work insertion process for E to E operations the sync word generator is reset every two fields, i.e., frame. This results in a discontinuity of one half SC cycle in the position of the sync word every other frame or every 15 Hz.

When the apparatus is performing a transfer operation through a playback channel, a low level signal is placed on line 373 of the reference clock generator 98 associated with that playback channel. This enables the AND gate circuit 374 to pass a transfer H/2 signal present on line 375 to the OR gate circuit 371 which gates the transfer H/2 to the output on line 372. The transfer H/2 is derived from the sync word inserter portion of the encoder 96 circuitry. An output pulse from the encoder 96 that is coincident with the sync word or line identification is produced and that pulse is used as the time base corrector reference. The pulse appears on line 376 and passes through a shift register delay circuit 377 which correctly positions the pulse that is present on line 376. The transfer H/2 signal is positioned so that the digitized video signal provided to the encoder 96 during a transfer operation has a correctly identified location for insertion of a new sync word.

Specific circuitry that can be used to carry out the operation of the block diagram shown in FIG. 12A is shown in FIGS. 44A through 44D. The operation of the specific schematic circuitry will not be described in detail since it carries out the operation as has been previously described with respect to FIG. 12A. However, with respect to the generation of the H/2 signal so that it is unambiguously redefined with respect to SC, the reclocking circuitry 367 includes an H/2 signal generator 378 comprising a divide by 2 counter and following pulse former respectively formed by an edge triggered flip-flop and following self resetting flip-flop. The counter receives at its clock input H drive signals present on input line 396 and provides an H/2 signal at its output. The H/2 signal is formed into a train of negative pulses, each at a positive going transition, by the H/2 generator's pulse former. The 30 Hz field index signal resets the counter portion of the generator 378 at beginning of the first field of every television frame so that the phase of the H/2 signal is the same at the time of the first line of the first field of every television frame.

The SC signal provided by the phase inverter 393 is also formed into a train of negative pulses by a pulse former 393*a*. A pulse coincidence detector circuit 378*a* formed by a low level AND gate and following D latch examines for a coincidence of the SC transition related pulses received from the pulse former 393*a* and the H/2 transition related pulses provided by a timing selection circuit 379 in response to each negative pulse provided by the pulse former portion of the generator 378. If the positive transition of the H/2 signal provided by the generator 378 becomes too close in time to the positive transition of the SC signal, the transition related pulses will overlap in time at the coincidence detector circuit 378*a* resulting in the toggling of the latch of the detector circuit. Toggling of the latch changes the level at an input of an exclusive OR gate 379*a* included in the timing selection circuit 379 to change it between its inverting and non-inverting mode. The timing selection circuit 379 includes a self resetting, edge triggered flip-flop 379b having its clock input coupled to the output of the exclusive OR gate 379a. By selectively inverting and not inverting the negative pulses provided by the H/2 signal generator 378, the positive edge of the pulse output of the exclusive OR gate is moved relative to SC. The timing selection circuit 379 cooperates with the coincidence detector circuit 378a to position the positive edge of the pulse output of the exclusive OR gate 379a so that unambiguous redefinition of H/2 will always result.

Redefinition of H/2 is performed by the reclocking edge triggered flip-flop 367a having its reset input coupled to an output of the timing selection circuit 379 and its clock input coupled to receive the SC signal provided by the phase inverted 393. Each H/2 transition related pulse resets the flip-flop 367a and the immediately following positive transition of the SC signal received at the clock input changes its state to thereby generate the redefined H/2 transition. A following latch 367b couples the redefined H/2 transition signal to a delay means 391 composed of a counter and following shift register operated to provide a properly timed H/2 signal on the line 380 extending to the frame delay detector circuit 368. The redefined H/2 transition signal output by the latch 367b is coupled to reset the delay means 391 and an SC signal, opposite in phase to that utilized in the reclocking circuitry 367, provided over line 392 clocks the delay means to effect issuance of the redefined H/2 transition signal to the detector 368.

With reference to the frame delay switch signal that appears on line 369 in FIG. 44D, it is a signal that changes level on alternate frames and is used in the blanking and bit muting circuitry 127 for adjusting the half cycle of 3SC as previously discussed. The operation of this portion of the circuitry will now be discussed in connection with FIG. 12C. The signal appearing on line 380 is an H/2 rate pulse signal which has been unambiguously redefined with respect to the phase of the regenerated SC which in turn is inverted on alternate frames so as to insure that the SC redefined H/2 transition signal is stationary with respect to H sync reference. This transition signal is clocked into a shift register 381 by a phase continuous 3SC signal appearing on line 394 and appears on the first output line 385 delayed and synchronized to the 3SC signal. Because the continuous phase 3SC clock is an odd multiple of one half the frame frequency, its phase during a first frame is 180° different with respect to H sync reference than its phase at the same time during the next frame and, hence, is also 180° different frame to frame with respect to the redefined H/2 pulse. Because of this 180° phase relationship difference, the positive transition of the 3SC clock shifts one half cycle frame to frame relative to the redefined H/2 pulse and consequently the clocking of the shift register 381 relative to the occurrence of the stationary H/2 pulse will change frame to frame by one half of the 3SC clock period. To detect the relationship between the redefined H/2 signal and the phase continuous 3SC clock signal, a stationary pulse is generated from the positive transition of the redefined H/2 signal and is used by the frame delay detector latch or D type flip-flop 368a to determine the phase of the 3SC clock at the beginning of alternate frames and provide the phase indicative frame delay switch on line 369 as shown in FIG. 12C. More specifically, the pulse forming circuitry comprised of inverter 382, resistor 386, capacitor 387 and NAND gate 389 generates a stationary pulse from the leading edge of the H/2 pulse signal present on line 380 at the input of the shift register 381. The stationary pulse has an interval of $\frac{3}{4}$ of a cycle of 3SC and its leading edge (as well as that of the H/2 pulse signal) corresponds to the positive transition of the redefined H/2 signal. Because the shift register 381 is clocked by the phase continuous 3SC clock, the H/2 pulse signal will appear on the shift register's output line 385 at different times relative to its presence on the input line 380 depending upon the phase relationship of the redefined H/2 signal and 3SC signals. When the signals are in phase, the H/2 pulse signal appears on line 385 one cycle of 3SC after its presence on the input line 380. When the signals are out of phase, the H/2 pulse signal appears on line 385 $\frac{1}{2}$ cycle of 3SC earlier. The signal level on line 385 is strobed into the D flip-flop 368a by the positive going transition of the stationary pulse on line 384, which occurs $\frac{3}{4}$ of a cycle of 3SC after the occurrence of the redefined H/2 pulse signal at the input of the shift register. The output of latch 368 on line 369 indicates whether the H/2 pulse was present on line 385 after a delay of $\frac{3}{4}$ period thereby determining if the time delay between the positive going signals on lines 394 and 385 is $\frac{1}{2}$ period or 1 period of 3SC. This signal on line 369 in turn selectively inserts a $\frac{1}{2}$ 3SC period offset affecting the D/A clock, compensating for the aforedescribed 46 ns frame to frame motion of the redefined H/2.

With reference to the frame phase inverter switch signal that appears on line 356a in FIG. 44D, it is a signal that changes levels on alternate frames and is used in the chroma separator and processing circuitry 101 to effect inversion of the chrominance component included in the reproduced video signal on alternate reproductions of the two field color video signal. The playback burst is provided on input lines 361a by the data transfer circuitry 129 and is phase compared with the phase continuous SC by the exclusive OR gate 362a. SC and playback burst alternate between in phase and out of phase conditions with alternate reproductions of the two field color video signal, causing the level of the output of the exclusive OR gate 362a to change at a 15 Hz rate with the change occurring at the time of playback burst. The frame phase inverter switch signal is obtained by clocking the output of exclusive OR gate 362a through a latch 363a with one properly timed clock at every burst flag. The latch 364a receives at its D input the burst flag signal provided on line 360a by the reference input circuitry 93B and is clocked by the phase continuous SC provided at its clock input by the divider 360. Each time a burst flag signal is present on input line 360a, the latch 364a issues a pulse to the latch 363a defined with respect to the phase of SC. This pulse is used to clock the level at the input of the latch 363a to its output. Because the level at the input of the latch 363a changes with alternate reproductions of the two field color video signal, the level at the output of the latch 363a also changes with alternate reproductions to produce the 15 Hz frame phase inverter switch signal on line 356a that defines when the chrominance should be inverted or not in the chroma separator and processing circuitry 101.

ENCODER SWITCH

The encoder switch 126 described with respect to the block diagram of FIG. 9A is interconnected with the computer control system 92 and, upon receiving the appropriate commands, performs the principal function of selecting either the video data streams from the analog-to-digital converter 95 when in the record operating mode or the data streams that originate at the data transfer circuitry 129 when a transfer operating mode occurs. In the transfer mode, the still is transferred from one disc drive to another so that the video information does not go through the chroma separator and processing circuitry 101. Instead, it is directed to the encoder switch 126 to be therafter encoded and recorded on another one of the disc drives. The encoder switch 126 also switches between the appropriate clock signals, i.e., 6SC and ½SC. It switches to clock signals generated by the reference logic circuitry 125A which are used when the video information from the analog-to-digital converter 95 is being recorded. During the transfer mode, it switches to the 6SC and ½SC signals provided by the reference clock generator 98 and are used as the basic reference clock signals during the recording of the transferred video signal, all of which is generally shown in the block diagram of FIG. 9A.

The encoder switch also performs functions in addition to switching the proper reference signals, depending upon whether the regular record or transfer modes are being performed. Circuitry is included for generating a blinking cross picture display signal, one diagonal line of which is supplied by one field and the other by the second field which provides an an indication that the track has been deleted and is available to receive a still in that particular location. The encoder switch also includes circuitry that generates a PALE switch signal which terminates PALEing during the transfer process, the PALE switch(or flag) signal extending to the data transfer circuitry 129 which normally PALEs the data going to the chroma circuitry 101. The PALEing by the transfer circuitry is stopped because there is no need of aligning the samples line to line during a transfer mode of operation. The encoder switch also includes circuitry for performing diagnostic testing, which circuitry selectively generates a recurring sequence of digital information, as well as a random word for use in such testing.

More specifically, and referring to FIGS. 13A through 13D which together form a composite electrical schematic diagram of the encode switch 126, the bits of data appear on sets of input lines 400 or 401, there being eight lines for each of the sets corresponding to the eight bits in the data stream from either the analog-to-digital converter 95 or from the data transfer circuitry 129. The lines 400 comprise the eight data lines from the converter 95, while the input lines 401 together represent the eight bits of video information from the data transfer circuitry 129. The input lines are connected to a number of multiplexer switchers 402 which are commanded by signals on lines 403 and pass either the information from the lines 400 and 401 onto output line 404. The multiplexer switchers 402 also pass, on command, the bits forming the blinking cross signal or bits forming the data used for diagnostic testing. To delete information from a track on a disc pack, the blinking cross signal is recorded in the track over the information being deleted. Thus, either the blinking cross signal, diagnostic testing data or the transfer or original digitized video information is provided at the output of the encoder circuitry 96.

Figures 13A, 13B, 13C:
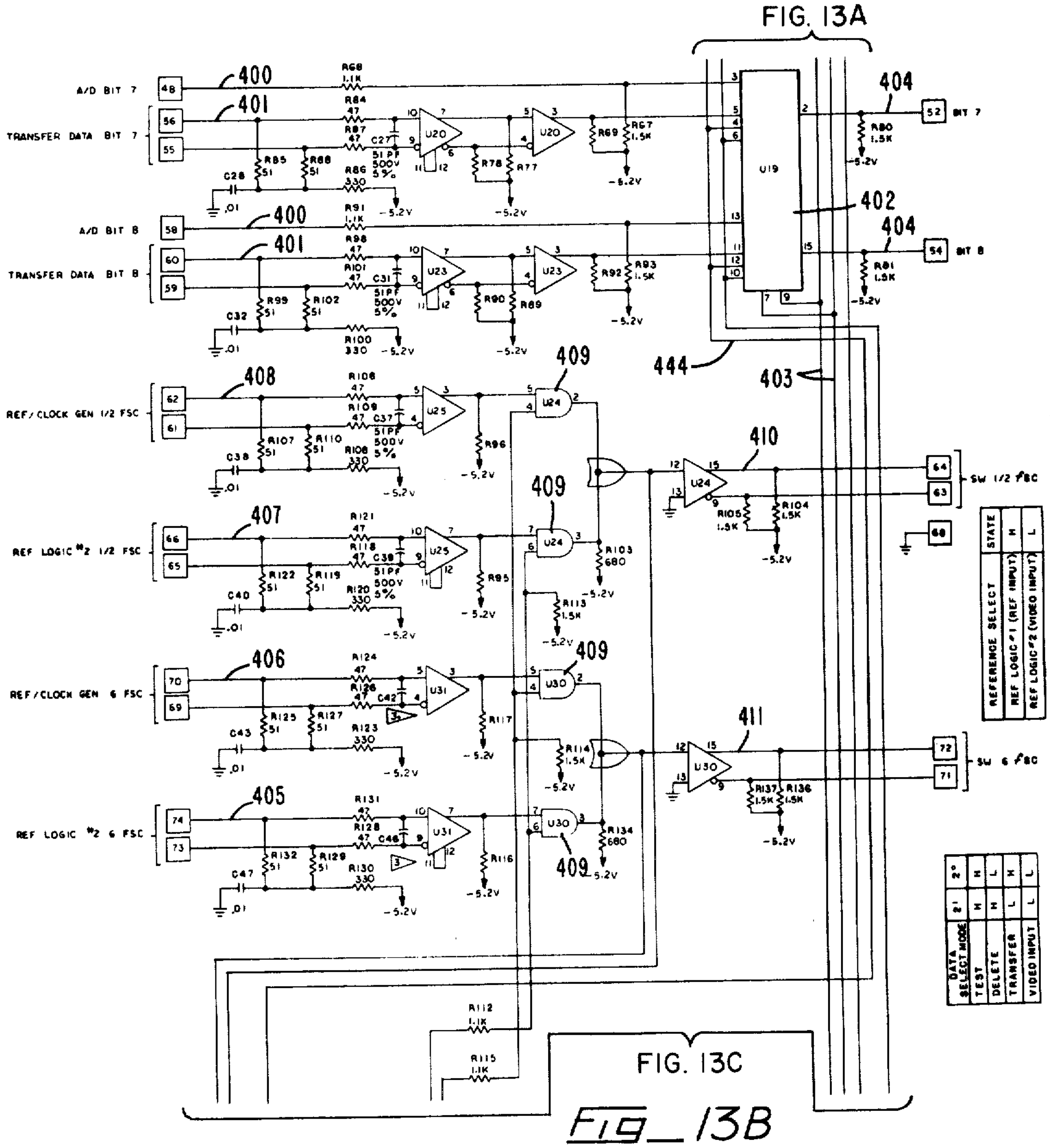

As is best shown in FIG. 13B, the 6SC signal provided by the reference logic circuitry 125A is available on line 405 and a similar reference related 6SC signal is applied to line 406 from the reference clock generator 94. Similarly, ½SC signals from reference logic circuitry 125A appears on line 407 while reference related ½SC signals from the reference clock generator 94 appears on line 408. A number of AND gates 409 are provided to selectively gate through either the 6SC and ½SC signals from either reference logic circuitry 125A or the clock generator 94 to the output lines 410 and 411 which respectively provide the ½SC and 6SC signals that are used by the encoder 96. The logic level of a reference select signal provided by the computer control system 92 on input line 445 and set in the latch 446 by a strobe control signal also provided by the computer control system determine which of the 6SC and ½SC signals are provided to the encoder 96. During the record mode of operation, a reference select signal is provided that enables the AND gates 409 associated with the 6SC and ½SC signals received on lines 405 and 407 from the reference logic circuitry 125. In the other operating modes, i.e., delete data, diagnostic test and data transfer, the provided reference select signal enables the AND gates 409 associated with the 6SC and ½SC signals received on lines 406 and 408 from the reference clock generator 94.

Referring to FIG. 13C, reset pulses from the video input circuitry 93A and the reference logic circuitry 125B are applied to lines 412 and 413, respectively, and one of the lines is gated through AND gate 414 to provide a reset pulse on line 415, the line being gated through determined by the reference select signal latched into latch 446. The reset pulse is used for resetting the sync word generating circuitry in the encoder 96. The input frame signal provided by the video input circuitry 93A and the transfer ID reset signal provided by the reference logic circuitry 125B are used as the reset pulses. Similarly, strobe or V drive, No. 2 and No. 1 pulses generated by sync generating circuit of the video and reference input circuitry 93A and 93B, respectively, are applied to input lines 416 and 417, respectively, one of which is selectively gated through AND gate 418 onto line 419 by the latched reference select signal for use by the sync word generating circuitry in the encoder 96. The gated strobe or V drive pulses are also applied to line 435 for controlling the generation of the deleted track blinking cross signal by the circuitry 420 shown within the dotted line enclosure on FIGS. 13C and 13D, which will be described below.

A number of jumpers, indicated generally in FIG. 13D at 421, are adapted to be connected to an external input, a repeating data word generator 427 or a random word generator 429 controlled by the sync word gate signal provided over line **429*a* by the sync word generating circuitry included in the encoder 96**.

Data select signals on input lines 422 from the computer control system 92 form a two digit command that conditions the command lines 403 for setting the multiplexer switches in the correct state for the operating mode of the apparatus. A strobe control signal on line 448, which also originates from the computer control system, strobes a pair of latches 449 to place the two digit command on the command lines 403 that extend to the multiplexer switches 402. The latched command is also detected by a NAND gate 423 which provides a signal on line 424 identifying whether the apparatus is operating in a transfer mode or normal recording mode. In a transfer mode, a NAND gate 425 (FIG. 13D) provides the PALE switch signal to shut off the PALEing in the transfer circuitry 129, the other input of NAND gate 425 being supplied by a PALE flag control signal on line 426 extending from reference logic circuitry 125B.

The circuitry 420 for generating the deleted track blinking cross signal will now be described with reference to the block diagram of FIG. 13E and the front view of two fields of a television picture in FIG. 13F which exemplifies a visual display of the deleted data signal. A horizontal (H) counter 430 counts down from a preset count in response to an 80H clock which is obtained, for example, from the sync generating circuit of the reference input circuitry 93B, and which inputs on line 431. The 80H clock is at a frequency of 80 times the reference H sync rate. H counter 430 is preset every horizontal line by an H drive signal which is received from the reference input circuitry 93B over line 428 (FIG. 13D) and is input to the counter on line 432. A vertical (V) counter 433 counts up and down in response to the H drive signal steered onto one of the input lines 434 to the counter 433 by steering gate circuitry 434a (FIG. 13C). The V counter 433 is preset after every other field by a preset command placed on line 447 by a divide-by-two flip-flop 436. The preset command is generated from the V drive signals provided by the reference input circuitry 93B over line 417 and placed on the line 435 extending to the input of the flip-flop 436 by one of the AND gates 418 that is enabled by the latch 446 as described above (FIGS. 13C and 13D).

For purposes of forming a preferred geometrical blinking cross shape, a divide-by-four (÷4) means 438 is coupled to the input of the V counter 433 so that four H drive signals must be received to change the count state of the V counter. The divide-by-four means 438 is conveniently formed by shifting the output connections of the V counter 433 by two bit positions with the V counter 433 connected in this manner, the state of its output will change upon receipt of every fourth H drive signal whether counting up or down. A digital comparator 437 is coupled to the H counter 430, and also to the V counter 433 positions so that four H drive signals must be received to change the count state of the V counter whether counting up or down. A line width generator 439 is coupled to the comparator, and the output therefrom comprises the digital signal introduced to the multiplexer switches 402 of previous mention.

In operation, referring also to FIG. 13F, the television picture is divided into an X and Y matrix. For example, the horizontal direction is divided into 80 counts, and the vertical direction is divided into a number of counts corresponding to the lines contained in a field. When the corresponding H and V counters increment equal counts, the comparator 437 detects a point of coincidence and generates a "1" output pulse corresponding to a white level. When no coincidence is detected, the comparator generates a "0", or black level. Both counters 430, 433 are preset via their respective preset inputs, H drive and V drive, the latter being divided down by two so that the V counter 433 is preset every other field. In the first television line of the first field, the H counter 430 is clocked from zero through 80 by the 80H clock. The preset divide-by-four means 438 and V counter 433 are incremented by the first clock pulse of H drive indicating line 1, and as the H counter clocks the first clock pulse, coincidence between the outputs of the counters occurs. This defines point 1—1, which corresponds to the upper, left corner of the raster of horizontal lines forming the displayed field.

The diagonal line width generator 439 includes a counter 443 which counts to a pre-determined number to cause a logical "1" to be placed on the data bit lines, which corresponds to white level. This causes a short line segment from the initial point of coincidence, as depicted at 440 of FIG. 13F. Since the V counter input is divided by four, after the counter 433 is clocked out of its preset state by the first clock or H drive pulse, it takes four H drive pulses to increment the V counter 433 again. Thus, four television lines are scanned on the same output pulse of the V counter 433, whereby lines one through four are in coincidence with the first clock pulse of the 80H clock as it counts the duration of the horizontal line. Thus, four short line segments 440 are generated side-by-side on four adjacent television lines. When the fifth H drive pulse is received, the V drive counter 433 is incremented one count and, for the next four H clock pulses, causes short line segments for another four horizontal lines to be generated, but one count later in the H counter 430 count cycle.

This leads to the generation of the diagonally extending series of diamond shapes which define a diagonal line 441. After every fourth horizontal line occurs, H drive increments the output of V counter one count (to count 2 and so on) for the interval of the next four television lines. The 80H clock increments the H counter 430, whereby coincidence occurs at point 2 during lines 5-8, at point 3 during lines 9-12, etc. The process continues with the point of coincidence moving along the diagonal until the diagonal line 441 ends at the lower right corner of field 1 with television lines 261-262. At this point, no outputs are generated since this is the time period corresponding to the vertical interval.

On the second field, data corresponding to the oppositely directed diagonal line 442 is inserted into the signal. The diagonal lines 441, 442 are purposely drawn on alternative fields to provide a readily visible flicker or blink of 30 Hertz upon playback and display of the recorded blinking cross signal.

To this end, the V counter 433 is maintained at its count at end of the first field. However, the steering gate circuitry 434a causes the H drive signal related pulses to be steered onto the other of the input lines 434 to the divide-by-four means 438 and V counter 433 as a result of clocking the flip-flop 436 by another V drive related signal placed on line 435 at the end of the first field (FIGS. 13C and 13D). The V counter 433 now counts back down from its coincidence point count. For the second field, this corresponds to the upper right corner of the field (which corresponds to its last point at the lower right corner of field 1), as it would be displayed on a monitor. Since the field raster scan always begins at the top of the displayed raster of horizontal lines and scans the lines sequentially to the bottom, the first full horizontal line scanned will be across the top of the displayed raster of lines forming field 2 as shown in FIG. 13F. The H counter 430 operation is unaffected by the V drive signal and continues counting the received 80H signal.

The divide-by-four divider 438 and counter 433 are not incremented until receipt of the H drive or clock pulse at the beginning of the fourth full line, i.e., line 267 in the second field. During this line, the H counter 430 counts until it reaches a count of 79, at which time a coincidence with the V counter 433 occurs. Thereupon, the comparator 437 generates logical "1" bits to be inserted in all the data bit lines via matrix switches 402 (white level) whose duration or line segment length is determined as before by the line width generator 439.

The diamond shapes are drawn on the picture along the opposite diagonal, forming the diagonal line 442 from right to left since the V counter counts down whereby each subsequent coincidence is earlier than the previous one. Since the V counter 433 is not incremented until the fourth full line, the diagonal line 442 is actually shifted slightly to the left of the true diagonal. However, this slight shift is insignificant to the purpose served by the blinking cross and is not noticeable to the observer except upon very close inspection of its display.

The ÷4 means 438 and the line width generator 439 are employed herein to properly determine the angle of the diagonal and to form the diamond shapes which define a thicker, more symmetrical line. However, the above conditions were imposed by the limited input signals available; viz, the 80H signal. If a signal of, for example, 262H were available, the matrix would constitute a 262 by 262 grid and the H and V counters 430, 433 could be arranged to increment together while drawing the diagonal lines 441, 442 from corner to corner, without need for mathematical compensation such as the ÷4 means 438.

The two fields are herein illustrated one below the other to facilitate understanding the manner in which the diagonal line 442 of the field 2 is formed to cause a display to be formed from top-to-bottom and right-to-left. The fields are, in fact, actually interlaced on the same television display device, and thus the diagonals are superimposed from field to field to define the blinking cross.

The output from the line width generator 439 is introduced to the multiplexer switchers 402 of FIGS. 13A–B, which generate a digital deleted data word, which, in the apparatus described herein, is a timed series of "1" bits corresponding to the white level. An output line 444 of the line width generator 439 is selected for parallel passage through the switchers 402 on output lines 404 thereof by the 2-digit command introduced thereto via the latch command lines 403, as previously described. The delete word on lines 404 provides an input to the video recording system and is processed for recording as is the video signal received from the analog-to-digital converter 95 over lines 400 or 401. The blinking cross signal is recorded on a track when a previous record is deleted and provides visual means to indicate a track is available to receive a video signal for storage. If a request to play back data from a thusly identified track is initiated, the delete signal, and thus the blinking cross, is interrogated and reproduced in the same manner as when reproducing a field or frame of stored video.

The various components 430–439 and 444 of the block diagram, FIG. 13E, are shown in schematic diagram in FIGS. 13A–D, wherein like components are similarly numbered. Thus the H and V counters 430, 433 comprise a pair of four bit counters, wherein the output connections of the V counter 433 are shifted two bit positions to provide the divide-by-four function depicted at block diagram 438 of FIG. 1A. The digital comparator 437 provides a carryout pulse upon detecting a point of coincidence of the counters 430, 433, while the line width generator 439 provides the white level output via line 444 thereof, for a selected time period corresponding to the preset number of counts made by the counter 433 thereof representative of the desired length of the short line segments 440 (FIG. 13F) forming the diamond shapes of the diagonal lines 441, 442. The (eight bit) digital delete word is formed herein via the (eight) output lines 404 of the multiplexer switchers 402, as previously mentioned.

Although the circuitry 420 is described with reference to the generation of a blinking cross geometry, it is understood that other geometrical arrangements, pictures, etc., may be used as the deleted data signal, wherein a portion of the display may be generated in one field, with the remaining portion being generated in the alternate field, to cause a readily visible flicker at the 30 Hertz rate. The entire display may be generated in one field if the flickering effect is not desired. However, encoding the deleted data signal to cause a visible flicker upon its display facilitates generation of a distinctive deleted track signal since displays of visual information typically do not flicker. For the video frame storage apparatus, the flicker effect is conveniently obtained by separating parts of the deleted data signal in each of the two television fields recorded in the track of deleted data. It should be appreciated that other techniques can be employed to reduce the repetition rate of the deleted data signal and produce the flicker effect, such as by encoding one of the two television fields with the complete cross while leaving the other field devoid of information.

In addition, a display other than visual may be generated. For example, in a video storage system where audio signals may be recorded in video tracks, the playback deleted data signal would be "displayed" as an audible tone. In a computer oriented, data storage system employing a file of deleted data regions, the computer could be arranged to electronically interrogate and detect the deleted data signals recorded in the deleted tracks, with an electronically detectable display provided if desired. In the system illustrated herein, the display is visual, and the deleted data word is interrogated in playback.

ENCODER

The encoder 96 shown in the block diagram of FIG. 9A of the video signal system contains circuitry which performs functions in addition to channel encoding the digitized data on each of the eight video data bit lines, the parity bit and the data track sequence as described hereinbelow. One of the additional functions involves the use of a parity generator to perform a parity check to verify that the data is correct on all of the eight data bit lines. The parity bit is optional and requires an extra data bit line such as is available in the apparatus described herein. The encoder 96 also generates and inserts the sync word (also referred to herein as the line identification or line ID). The sync word is in the form of a 7-digit binary number which is placed in alternate television lines, generally where the horizontal sync pulse had been previously located, it being understood that the horizontal sync had been stripped from the composite video signal by the video input circuitry 93. The sync word is inserted within 1SC of the location previously occupied by the horizontal sync pulse, and the encoder 96 inserts the sync word into each of the eight video data lines, the parity bit line and the data track line before the channel encoding is performed so that the output of the encoder 96 which is connected to the disc drive interface 89 contains the sync word in each of the 10 data streams recorded on a disc pack 75 (or sent to the playback channel 91 during E to E operations).

Figure 14:
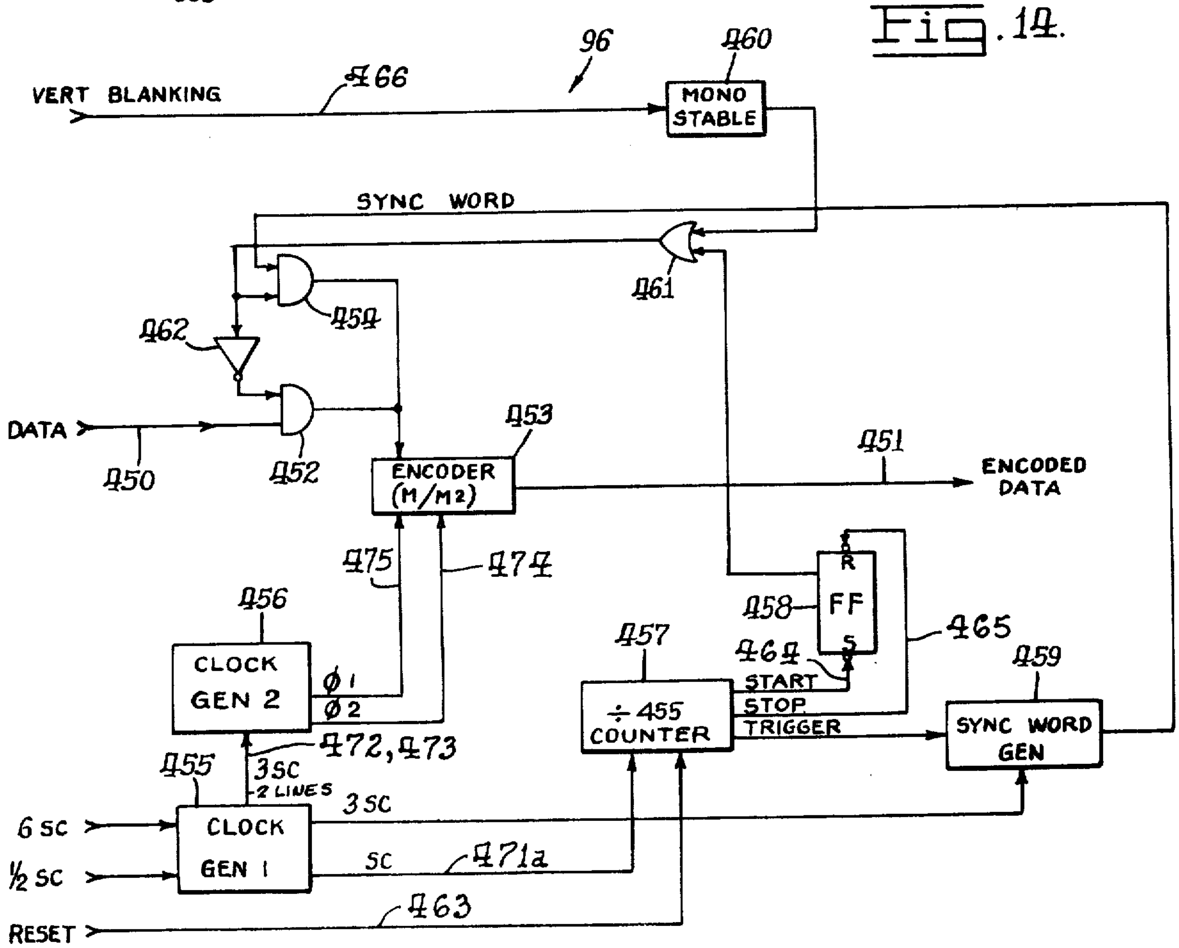
FIG. 14 is a functional block diagram of the encoder and sync word insertion circuitry which is a portion of the signal system shown in FIG. 9A.

The encoder 96 operation will now be described in conjunction with a block diagram shown in FIG. 14 and schematic circuit diagrams of FIGS. 45A–D. NRZ-L data from the encoder switch 126 enters on input line 450 and exits on output line 451 of each data bit line after having been (i) checked for parity, (ii) had the sync word inserted in alternate (odd) lines and (iii) channel encoded in a format that is conducive to magnetic recording and reproducing the digitized information with respect to one of the disc packs 75. The input data on each data bit line is applied to one input of a data input AND gate 452 which is connected to a channel encoder 453, which may be switched between two channel encoding formats, both of which will be described hereinafter. In the schematic circuit diagram of FIGS. 45A–D, identical channel encoders for two video data bit lines are shown in their entirety. Identical channel encoders for the other video, parity and data track data lines are contained in dotted line enclosures below the encoders shown in their entirety. A sync word input AND gate 454 in each of the 10 bit lines is used to gate the sync word into the encoder at the proper time. These AND gates are also arranged to insert a test signal in the 10 bit lines if desired, the test signal being provided on line 450*a* (FIGS. 45A and 45B) by a suitable test signal source, such as digital test pattern generator. A first clock generator 455 has input signals 6SC and ½SC applied thereto by the encoder switch 126 and provides various SC and 3SC outputs as shown. Two of the 3SC outputs are applied by lines 472 and 473 to a second clock generator 456 which provides two time displaced 3SC clock signals on the two lines 474 and 475 that are extended to the channel encoder 453 for clocking the same. The clock signal on line 475 is a Ø1 clock and is displaced one-half cycle of 3SC from the clock signal on line 474, which is a Ø2 clock. During recording operations, these time displaced clocks are derived from the continuous phase 6SC, ½SC signals generated by the reference logic circuitry 125A and provided to the encoder 96 by the encoder switch 126. During other operations, such as recording the blinking cross delete signal, the reference clock generator 98 provides the clock signals. The Ø1 and Ø2 3SC clock signals are used to drive the channel encoder 453 so that a continuous channel encoded digital signal without phase discontinuities is provided at the output on line 451.

The clock generator 455 has an SC clock output 471*a* driving a ÷455 divider 457 which can also be reset by a reset pulse provided by the encoder switch 126 on line 463 at a 30 Hz rate. The divider 457 sets a flip-flop (FF) 458 through the start line 464 and subsequently resets the FF 458 when a pulse appears on the stop line 465 extending to the reset pin. The START and STOP pulses define a window during which a single 7-digit binary sync word provided at the output of a sync word generator 459 can be inserted in all data bit lines simultaneously.

During the vertical blanking period, a pulse is applied to a monostable multivibrator (MS) 460. The MS is active for a period of about 10 lines of the vertical blanking period by switch vertical signal provided on line 466 by the encoder switch 126 and its output is applied to one side of gate 461 (shown in this block to be an OR gate), the other side of which is supplied by the output of the window generating FF 458. The output of the OR gate 461 extends to the other input of the AND gate 454 as well as to one side of the AND gate 452 through an inverter 462.

During the operation of the encoder circuitry 96, it is desired that the data stream for each bit be applied on an input such as input 450 which is representative of the eight separate data input lines, each of which is connected to a separate encoder 453 and the associated data and sync word input AND gates 452, 454 and inverter 462 so that a data output line 451 exists for each of the data bits and each of the data streams is properly channel encoded and has a sync word inserted therein. Since it is desired that the sync word occur close to the former location of the horizontal sync pulse and since it is also desired that it not be confused with data of the data stream, the data bit lines input to the channel encoders 453 are disabled by the data input gates 452 when the sync word is inserted during a sync word gate window that is generated by the divider 457 and FF 458. More specifically, the divider 457 provides a START pulse for setting the FF 458 and this enables one input of each AND gate 454 while simultaneously disabling each AND gate 452 thereby blocking the data entering on lines 450. The divider 457 issues a pulse to the sync word generator 459 twelve data bit intervals after the generation of the START pulse and the sync word generator 459 then generates the 7-digit binary word which is applied to the upper input of all AND gates 454 which have previously been enabled. The AND gates 454 pass the sync word into each channel encoder 453 where it is encoded onto the data stream. After the sync word has been generated, the divider 457 issues a STOP pulse 29 data bits later which resets the FF 458, disabling all AND gates 454 and simultane usly enabling all AND gates 452 so that the data on lines 450 will be passed into the channel encoders. It should be understood that the data stream line 450 is continuous in its flow and that disabling the AND gates 452 merely blocks it from passing. Hence, the information is only discarded in a sense during the insertion of the sync word. However, since the sync word is inserted approximately at the previous location of the horizontal sync pulse, no active video informational data is lost.

During the vertical blanking interval, the MS 460 provides an output to the OR gate 461 which occurs for an interval of about 10 lines. This disables the data input AND gate 452 during the 10-line interval of the blanking period so that the received data is prevented from passing to the channel encoder during this interval. Thus, the only data or logical 1 bits that appear on the output data line 451 during the 10 line interval of the vertical blanking period are those in the sync words that appear every other line, as previously described, and pass through the sync word gate 454. This insures that the decoder and time base corrector circuitry 100 will be locked on the actual sync word during playback rather than some randomly occurring sync word bit pattern that might be contained in the active video information during the flow of the data stream.

Another aspect of the operation of the encoder 96 will be more clearly understood by referring to FIGS. 9A and 9B. The electronics data interface 89, disc drive data interface 151 and data select switch 128 couple the encoder 96, disc drive 73 and decoder and time base corrector circuitry 100. It should be appreciated that during a seek operation when the heads in the disc drive 73 are moving between tracks, it is desirable to prevent the introduction of perturbances in the signal system. Ordinarily, the record signal processing system 88 will provide at the output of its encoder 96 digitized data even in the absence of an input video signal. While this signal will represent noise information, the digital signal processing electronics of the apparatus cannot distinguish between digitized noise and digitized video information. This factor is taken advantage of when the apparatus is performing a seek operation. During seek operation, the transducing heads create noise signals that do not conform to the channel encoded format of the digital data ordinarily present in the signal system. Such noise signals, if permitted to enter the playback channel 91, undesirably perturbs the phase lock loops of the decoder and time base corrector circuitry 100. To avoid such perturbances, the disc drive data interface 151 is switched (as in an E-to-E operation) to reroute the output provided by the encoder 96 to the decoder and time base corrector circuitry 100. In this manner, the decoder and time base corrector circuitry 100 are receiving channel encoded digital signals that maintain the respective phase lock loops in the circuitry 100 within their normal operation range. Hence, when the heads of the disc drive 73 are properly positioned and playback data provided to playback channel 91, the decoder and time base corrector circuitry 100 are prepared to immediately provide the output decoded and time base corrected signals.

In addition, the encoder 96 also serves to cause black level data to be generated for use in recording on the disc surfaces as previously described during the first two revolutions of the disc pack 75 prior to the recording of the video signal information on the subsequent two revolutions of the disc pack. Accordingly, the pre-record line 443 (FIG. 45A) extending from the electronics data interface 89 is activated as a result of signals provided by the disc drive data interface 151 and causes NAND gate 461 to block any logical "1's" as may be present on the input lines 450 thereby producing the black level at the input of the channel encoder circuitry 453. It should be noted, however, that the encoder 96 still functions to insert the sync word in the black level signal.

The NRZ-L data in each data bit line 450 is channel encoded selectively by the channel encoder 453 into the DC free self clocking channel code described in the commonly assigned U.S. application Ser. No. 668,679, by Jerry Wayne Miller or the self clocking channel code descirbed in U.S. Pat. No. 3,108,261. As will be described further hereinbelow, the two position code selection switch 480 selects between the two channel codes. In both codes, the NRZ-L data bit stream on a data bit line is broken into discrete bit times commonly designated as data bit cell times. For the channel code described in the U.S. Pat. No. 3,108,261, the code rules followed result in logical first bits, e.g., logical 1's to be represented by signal transitions at a particular location in the respective bit cells, specifically at mid-cell, and logical second bits or logical 0's to be represented by signal transitions at a particular earlier location in the respective cells, specifically at the beginning or leading edge of each bit cell. Any transition occurring at the beginning of one bit interval following an interval containing a transition at its center is suppressed.

In the channel code described in the above-identified Miller application Ser. No. 668,679, the input data stream in each data bit line may be viewed as the concatenation of variable length sequences of three types: (a) sequences of the form 1111 - - - 111, any number of logical 1's but no logical 0's; (b) sequences of the form 0111 - - - 1110, any odd number of consecutive 1's or no 1's, with 0's in the first and last positions; (c) sequences of the form 0111 - - - 111, any even number of consecutive 1's preceded by a 0. A sequence is of type (c) only if the first bit of the next following sequence is a zero. Sequences of types (a) and (b) are encoded according to the code rules described in the U.S. Pat. No. 3,108,261. A sequence of type (c) is encoded according to the U.S. Pat. No. 3,108,261 rules for all bits except the last logical 1, and for this 1 the transition is simply suppressed. By this means, the type (c) sequence, viewed in isolation, is made to appear the same as a type (b) sequence, that is, the final logical 1 looks like a logical 0.

By definition, the type (c) sequence is followed immediately by a logical 0 at the beginning of the next sequence. No transition is allowed to separate the type (c) sequence from the following 0. Therefore, the special coding is distinctive for decoding purposes. The decoder must merely recognize that when a normally encoded logical 1 is followed by two bit intervals with no transitions, then a logical 1 and logical 0 should be output successively during those intervals. Other transition sequences are decoded as for the Miller code.

The encoding procedure for this code requires that a modulo-2 count be maintained of the number of logical 1's output by the encoder since the last previous 0 which was not the final bit of a type (b) sequence. If the count is 1 (odd number of 1's) and the next two bits to be encoded are 1 and 0 in that order, then no transitions are output during the next two bit intervals. If the next subsequent bit is another 0, then it is separated from its predecessor by a transition in the usual aforementioned U.S. Pat. No. 3,108,261 code fashion. This channel code provides for the transmission of data in binary form over an information channel such as a magnetic record/playback system, incapable of transmitting DC, the information being transmitted in self-clocking fashion.

With respect to the channel code, it makes no difference which binary state is considered logical 1 and which binary state is considered logical 0. In the foregoing and following descriptions the state normally marked by mid-cell transitions is considered the 1 state, whereas the state normally indicated by cell edge transitions is considered the 0 state.

The channel encoders 453 illustrated by the FIGS. 45A through 45D operate in accordance with the aforedescribed code rules. FIG. 45E is a timing diagram depicting the operation of the channel encoder 453 included in one of the data bit lines 450. With switch 480 shown in FIG. 45B in the indicated position, the channel encoders 453 provide encoded data in accordance with the code rules of the aforementioned Miller application. In its other position, the channel encoders 453 provide encoded data in accordance with the code rules aforementioned U.S. Pat. No. 3,108,261.

The channel encoder will now be described with the code selection switch 480 set as shown in FIG. 45B to effect channel encoding of one of data bit streams according to the code rules of the aforementioned Miller application Ser. No. 668,679. A description of the differences in the operation of the encoder when the switch 480 is set in its other position to effect channel encoding of the data bit stream according to the code rules of the aforementioned U.S. Pat. No. 3,108,261 will follow.

As described above, data encoded according to the Miller application code rules requires examining two successive data bits to be encoded whenever the modulo-2 count of logical 1's previously encoded is odd. For this purpose, each channel encoder 453 includes a pair of serially connected input latches 481 and 482 clocked by the trailing positive edge of the Ø2 3SC clock signal (FIG. 45E-(2)) on line 474*a*, which is coupled to line 474 by an inverter 483. The input latches provide a two bit all delay from the input of latch 481 to the output of latch 482. At each trailing positive edge of the Ø2 clock, latch 481 is operated to latch the present data level of the bit stream at its input so that it appears at its output (FIG. 45E-(3)) and latch 482 is operated to latch the preceding data level of the bit stream contained in latch 481 so that it appears at its output (FIG. 45E-(2), (3) and (4)). Therefore, the outputs of the latches 481 and 482 contain the data bits of two consecutive bit cells that are to be encoded.

The outputs of the latches extend to the inputs of three NAND gates 486, 487 and 488 for separately gating through pulses corresponding to logical 1's and 0's in the data bit stream. NAND gate 486 receives three inputs; one from the output of latch 481, one from the output of latch 482 and Ø1 clock pulses (FIG. 45E-(1)) placed on line 475*a* by an inverter 484 connected to the output line 475 of the clock generator 456. This NAND gate is enabled to provide an output pulse 489 (FIG. 45E-(6)) upon receipt of a Ø1 clock whenever its other two inputs are at a low level, which occurs only when successively received data bits are logical 0's. Consequently, NAND gate 486 issues logical 0 related pulses that are marked by transitions in the channel encoded format of the data stream output by the channel encoder 453. A logical 0 bit that immediately follows a logical 1 bit is blocked from passage by the NAND gate because the latch 482 will be high when, for example, the Ø1 clock pulse 490 (FIG. 45E-(1)) occurs. Hence, the channel encoder 453 follows the code rules described in the aforementioned U.S. Pat. No. 3,108,261 for successively occurring logical 0 data bits.

On the other hand, the NAND gate 487 has two inputs and is enabled to provide an output pulse (FIG. 45E-(5)) upon receipt of a Ø1 clock for all logical 0 data bits. Because the output of latch 482 enables the NAND gate 487, the logical 0 related pulses are provided one data cell time after the data has been latched into the channel encoder 453.

NAND gate 488 has three inputs and is enabled by the inverted output of the latch 482 to provide an output pulse (FIG. 45E-(7)) upon receipt of a Ø2 clock for all logical 1 data bits, unless a high level bit suppression command 491 (FIG. 45E-(10)) is placed on the input of the NAND gate by a line 492 extending from a bit suppression NAND gate 493 as will be described hereinbelow. NAND gate 488 generates the logical 1 related pulses during the interval of the Ø2 clock, hence, before the latch 482 is clocked by the trailing positive edge of the Ø2 clock. The logical 1 related pulses are provided by the NAND gate 487 one data cell time after the data has been latched into the channel encoder 453 at latch 481.

An OR gate 494 has two inputs connected to receive the logical 0 pulses 489 (FIG. 45E-(6)) provided by NAND gate 486 according to the U.S. Pat. No. 3,108,261 code rules and the logical 1 pulses 515 (FIG. 45E-(7)) provided by the NAND gate 488. The output of the OR gate 494, which appears on the encoder output line 451, will, therefore, be a train of pulses (FIG. 45E-(14)) that occur according to the code rules for the channel encoder. Hence, the NAND gates 486 and 488 together with the OR gate 494 serve to encode the incoming NRZ-L data stored by the latches 481 and 482 into the selected channel code format. The NAND gate 487 operates with bit suppression logic circuitry 500 described below to control the selective suppression of logical 1 data bit related transition in the channel encoded data. By disabling the bit suppression logic circuitry 500, as would occur by changing the position of the switch 480 from that shown in FIG. 45C, the NAND gates 486 and 488 will encode the data according to the U.S. Pat. No. 3,108,261 rules.

To encode the data bit stream according to the aforementioned Miller application, the bit suppression logic circuitry 500 includes two modulo-2 counters 495 and 496 for counting encoded logical 1's and 0's and, together with cooperating gate circuitry, effecting the generation of the bit suppression command on line 492 that suppresses selective logical 1 bit related transitions in the channel encoded data appearing on line 451. The modulo-2 counter 495 counts the logical 0 related pulses coupled to its clock input by the NAND gate 487. Logical 1 related pulses provided by NAND gate 488 are coupled to the clock input for counting by the modulo-2 counter 496. Counter 495 recognizes the beginning of each sequence by toggling in response to logical 0 pulses each time a logical 0 is encoded and being cleared each time a logical 1 related transition is suppressed. As can be seen from the aforedescribed code rules, counter 495 toggles twice during a type (b) sequence and never changes state during a type (a) sequence, and therefore is in its cleared state before the start of any sequence. The bit suppression logic circuitry 500 must recognize the end of a type (c) sequence. Modulo-2 counter 496 is employed in the performance of this function by toggling in response to logical 1 pulses each time a logical 1 is encoded and being cleared in response to logical 0 pulses each time a logical 0 is encoded. Waveforms (8) and (9) of FIG. 45E illustrate the respective operations of the modulo-2 counters 495 and 496 if their outputs are not connected together at the wired-OR 501. Waveform (13) of FIG. 45E illustrates the actual state at the wire-ORed connection 501. As should be appreciated from the foregoing, if counter 496 is not in its cleared state, the counter 495 is in its cleared state, the present bit to be encoded is a logical 1 and the next following bit is a logical 0, the bit suppression command is provided by NAND gate 493 on line 492 to disable the NAND gate 488 and thereby suppress the encoding of the present logical 1 bit.

Considering the cooperating gate circuitry for controlling the clearing of the two modulo-2 counters 495 and 496, counter 496 has its set terminal coupled to the NAND gate 487 so that its output is set high each time a logical 0 related pulse is output by the NAND gate 487. The counter 495 has its set terminal coupled to the output of a NAND gate 497 so that its output is set high each time a logical 1 related transition is suppressed in the channel encoding of the data bit stream. For reasons that will become apparent from the following description, a pair of capacitors 498 and 499 are connected in the output circuits of the modulo-2 counter 495 and NAND gate 493, respectively, to delay the set logic level of counter 495 appearing at the wired-OR 501 and removal of the bit suppression command from NAND gate 488.

The bit suppression command is generated by the NAND gate 493 that examines the first of consecutive data bits to be encoded and which is present in inverted form at the output of the latch 482, the next following of the consecutive data bits to be encoded and which is present at the output of the latch 481 and the counter states of the modulo-2 counters 495 and 496. If either one of the counter outputs at the wire-OR 501 is high, the NAND gate is disabled. However, whenever the beginning of a type (c) sequence occurs, both counters 495 and 496 will be low, thereby placing an enabling signal at the input of the NAND gate 493. If the next two bits to be encoded are a logical 1 followed by a logical 0, the bit suppression command 491 will be generated and placed on line 492 upon the occurrence of the ø2 clock pulse 502 (FIG. 45E-(2)) immediately preceding the ø1 clock pulse 490 that would effect the generation of the logical 1 related pulse through NAND gate 483. Hence, when the ø1 clock pulse 490 (FIG. 45E (2)) occurs on line 474 that would cause the NAND gate 488 to generate a logical 1 bit pulse, the NAND gate 488 is disabled by the bit suppression command on line 492 and the logical 1 bit pulse is suppressed as represented by the pulses 512 shown in phantom at line (14) of FIG. 45E. The bit suppression command is terminated upon setting the counter 495. The set pulse 505 (FIG. 45E-(12)) is provided by the NAND gate 497 in response to the bit suppression command 491 (FIG. 45E-(10)) on line 510 and the aforementioned ø1 clock pulse 490, which occurs ⅛ cycle of 3SC after the ø2 clock pulse or about 47 nanoseconds. To insure that the counter 495 is not set and the bit suppression command not removed until after the ø1 clock pulse 490 has ended, the delay capacitors 498 and 499 are provided to delay the return of the counter 495 to its high set state, hence, disabling of the NAND gate 493 and to delay the return of NAND gate 493 to its low disabled state, hence, extending the duration of the bit suppression command 491. The effect of the delay is seen at 508 and 509 of the waveforms (10) and (13) of FIG. 45E.

To disable the bit suppression logic circuitry 500, switch 480 is placed in the position that places a high level signal (ground in the channel encoder 453 of this apparatus) on the set line 510 for the counter 495. This places the counter permanently in its set state, thereby placing a disabling high level signal permanently at the wire-OR input of the NAND gate 493. Hence, bit suppression commands 491 can not be generated and bits will not be suppressed.

Commonly, self clocking channel encoded data code formats carry data and clock information as particularly placed transitions between two signal levels. When such encoded data is sent through a transmission channel, it usually experiences some timing distortion because of the non-linear characteristics of most transmission channels. If the timing distortion is significant, errors may result because of the inability of the channel decoder to determine the correct location of the transmitted transitions. Furthermore, at high data rates, such as found in the apparatus described herein, the timing distortion may result in unacceptable errors in the transmitted data. This is particularly the case where, as in the case of the channel codes selected for use in the apparatus herein, oppositely directed transitions carry the data and timing information. Non-linear transmission channels will alter the positively and negatively going transitions in a non-linear manner with respect to time. Hence, level sensitive data detectors commonly used at the terminal of a transmission channel to restore the transmitted data so that it has properly positioned transitions that will position the positive and negative transitions differently. Different positioning occurs because a positive transition with substantial timing distortion will reach the level selected for sensing the presence of transitions at a time after its nominal position that is different from that required by a similarly distorted negative transition.

To enhance the reliability of transmission of channel encoded data in which oppositely directed transitions carry the data and clock information, each of the channel encoders 453 encodes the data bit stream at its input by providing pulses in accordance with the rules of the selected channel code at the transition locations of the channel encoded format. In the particular channel encoder used in the apparatus described herein, logical 1 data bit pulses 515 (FIG. 45E-(7) and (14)) are provided at the data cell boundaries to define logical 1 bit related transitions that appear in the channel encoded data and logical 0 data bit pulses 589 (FIG. 45-(6) and (14)) are provided at center of a data cell to define logical 0 bit related transitions that appear in the channel encoded data. The transition-related pulses are generated by the clock generator 456 to have a precisely defined edge, the leading edge being selected. The second clock generator 456 includes two one-shot multivibrators 456 that are clocked by the oppositely phased 3SC clock signals provided by the first clock generator 468 over lines 472 and 473. Since the leading edges of the positive pulses generated by each of the one-shot multivibrators 456 are defined by rapidly switching the multivibrators from its stable state to its quasi-stable state (there being no significant time constant determining components involved), each leading edge will be identical to all others and occur at a precise time following the occurrence of the positive clocking transition of the clocking signal. The two multivibrators 456 thusly provide ø1 and ø2 clock pulse trains, which in the embodiment described herein have a pulse width of about 17 nsec, with the leading edges of the pulses of each train precisely defined with respect to each other and those of the other train. As described hereinbefore, the ø1 clock pulses provided on line 475 are gated through the NAND gate 488 as logical 1 data bit transition related pulses that appear in the channel encoded data and the ø2 clock pulses provided on line 474 are gated through NAND gate 486 as logical 0 data bit transition related pulses that appear in the channel encoded data. Since the NAND gates 488 and 486 are in an enabled condition at the times the ø1 and ø2 are received for transmission as transition related pulses (FIG. 45E-(4), (7) and (14) for logical 1 bit pulses and FIG. 45E-(3), (4), (5), (6) and (14) for logical 0 bit pulses), their respective leading edges will not be noticeably affected by the transmission through the NAND gates. Because the transmission channel over which the pulses are sent will act on identical pulse edges the same, the precise locations of the transition-related positive pulse edges, hence, data signal transitions themselves, are not lost as a result of any distortion that may be introduced to the pulses by the action of the transmission channel.

Figures 54A, 54B:
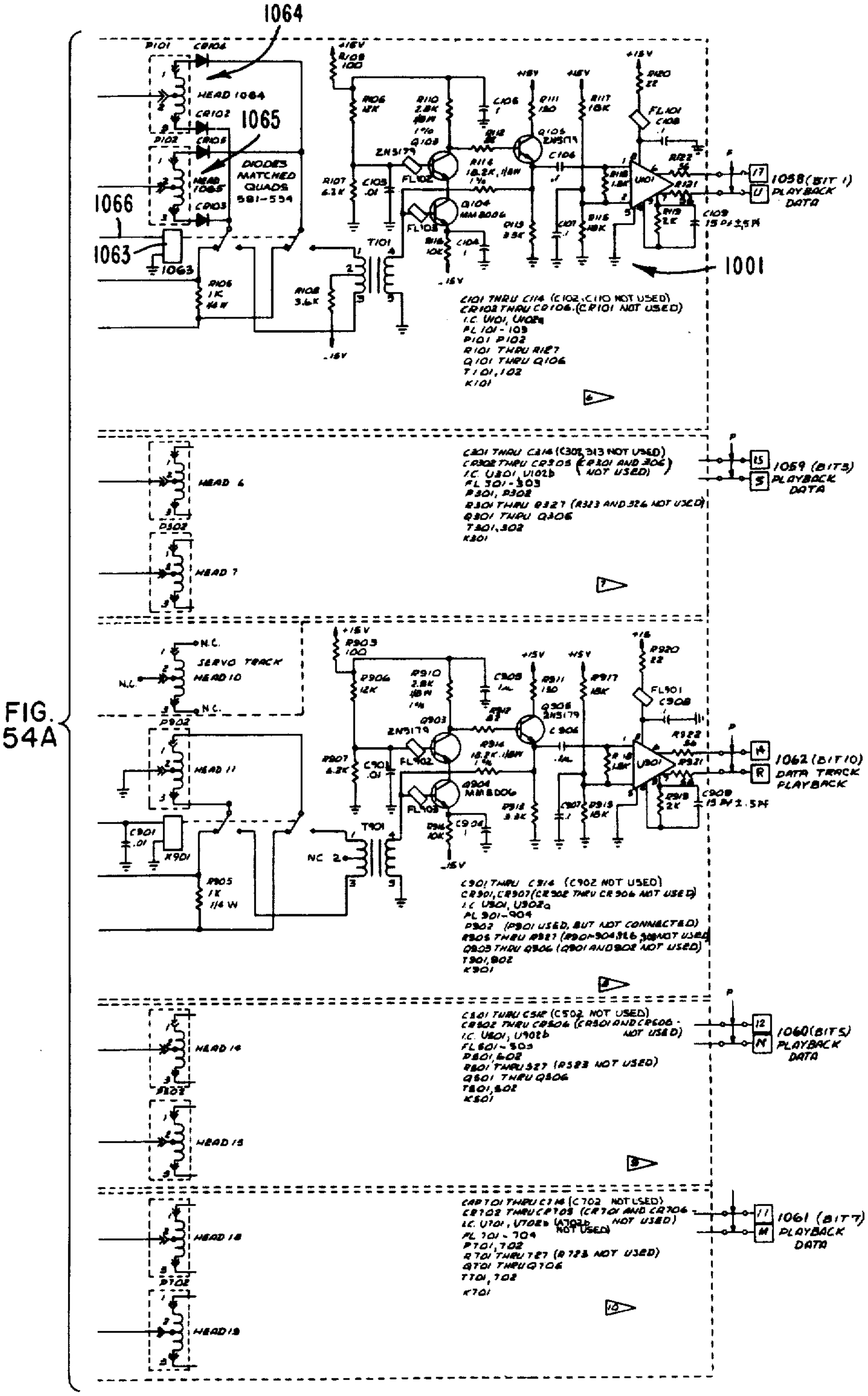
FIGS. 54A and 54B together comprise an electrical schematic diagram of the preamplifier circuits employed in the playback circuit shown in the block diagram of FIG. 24.
Figure 55B:
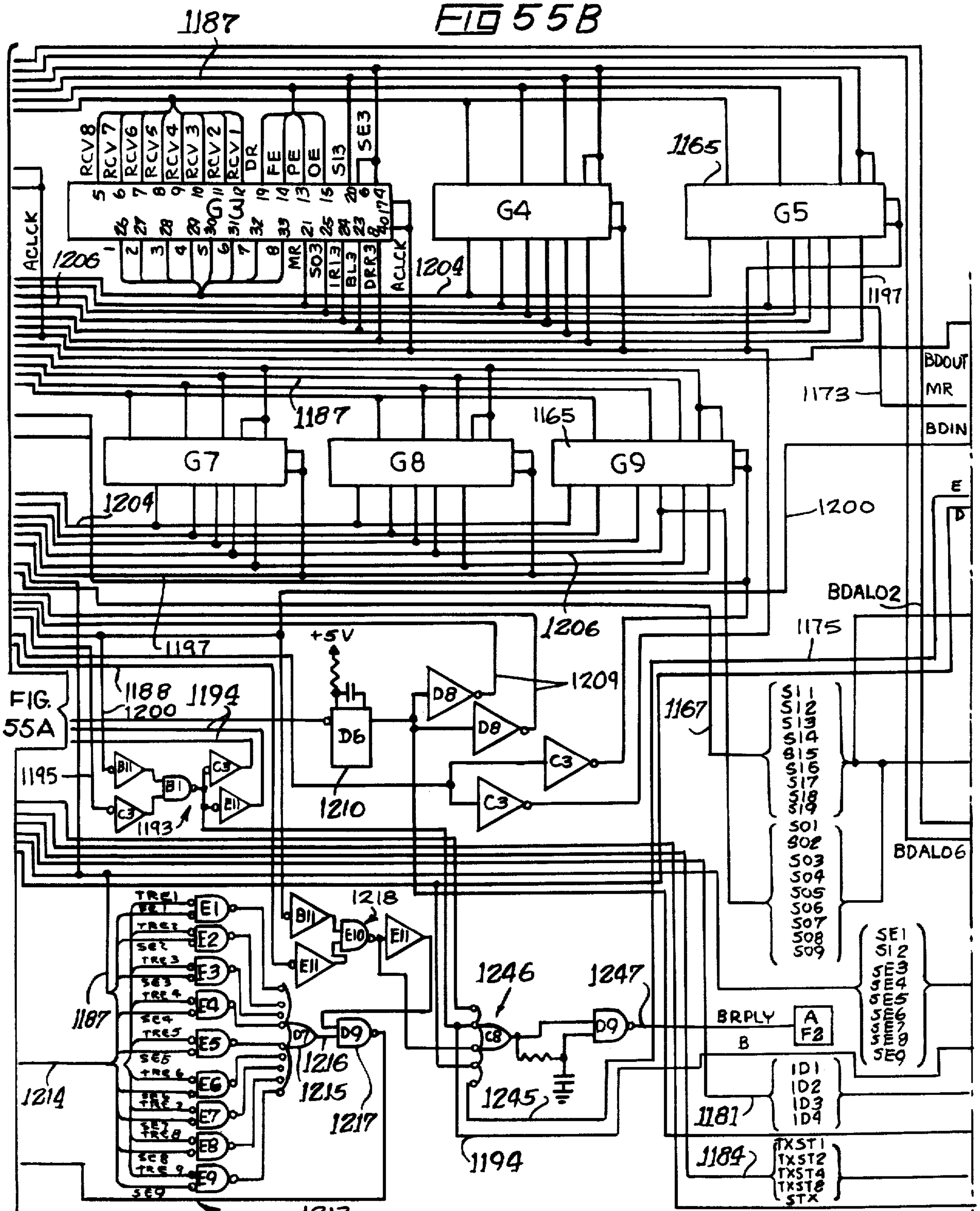

The channel encoded transition related pulses output by the encoder 96 over lines 451 are coupled by the electronics data interface 89 to the transmission line 152 extending to the disc drive data interfaces 151 associated with the disc drives 73. The electronics data interface 89 includes conventional logic converters which convert the TTL logic on lines 451 to emitter coupled logic levels which provide complementary level pulses on two lines in a manner that is used elsewhere at various locations of the apparatus. The interface 151 of the disc drive selected for recording the video data passes the data to the selected drive's record amplifier and head switch circuitry (FIGS. 54A and 54B). A divide by two JK flip flop 1070 included in each data bit line receives the transition related pulses and is responsive to the leading edges of the transmitted pulses to be rapidly switched between its two stable conduction states. This converts the transmitted pulse form of the channel encode data to the level transition form for recording as transitions between two signal states. Prior to being converted by the JK flip-flop 1070, the transmitted pulses in each data bit line are passed through a differential amplifier line receiver 2020' included in the disc drive data interface (FIG. 60A) of the kind previously described herein with respect to the decoder portion 525 (FIG. 46A) included in the data decoder and time base corrector circuitry 100 to regenerate the transmitted pulses with precisely defined leading edges after passage through the associated transmission line of the transmission line bus 152.

DATA DECODER AND TIME BASE CORRECTOR

The 10 data bit streams of channel encoded data, comprising 8 video data bit streams, 1 parity bit stream (if a parity bit is added) and 1 data track bit stream, transmitted by a disc drive 73 (FIG. 9B) over a transmission line bus 154 are received by one or more of the playback channels 91 (FIG. 4) selected by the data select switch 128. At the input of each playback channel, each of the 10 transmitted data bit streams is received by a separate data decoder and time base corrector included in the circuitry 100 for decoding the channel encoded data back to the NRZ-L form of digital code and then time base correcting the NRZ-L data to remove any intra channel inter channel bit time displacement errors that may be present in the received data streams. Bit time displacement errors result from the data transmission channel acting on the transmitted data to introduce intersymbol interference and reflections caused by impedance discontinuities in the transmission channel. This disturbs the timing of the data transmitted in the channel. In a video recorder data transmission channel, bit time displacement errors commonly are a result of changes in record medium dimensions, usually caused by environmental changes, of differences in the relative head to medium record and reproduce velocities of the relatively transported head and record medium and of machine to machine mechanical variations resulting in geometric differences between the heads and record medium. Video disc recorders utilizing rigid record media, such as the disc packs 73 used in the apparatus described herein, ordinarily do not cause large time displacement errors in the transmitted apparatus, particularly, at the data rates common for analog type video disc recorders that are in wide use today. The rigid record media used in such recorders are dimensionally stable and the servo mechanisms used are able to maintain the relative transport of the heads and rigid record media within sufficient tolerances so that time displacement errors are kept small. In some applications of video disc recorders, the time displacement errors are so small as to be insignificant and time base correction is not necessary.

However, as described herein, the present apparatus in which the time base corrector circuitry is used employs (with little modification) highly reliable disc drives that have been specifically designed and manufactured for computer data processing. Unfortunately, the computer disc drives do not maintain the relative head to disc velocity stable enough to avoid the introduction of intolerable bit time displacement errors into the data bit streams when such disc drives are used in the present apparatus to process video data, because the disc pack spindle in the drive is not servoed but instead is driven by a common three phase AC motor referenced to a relatively unstable line voltage and the rotational position of its disc pack is not controllable with respect to an external reference. The resulting positioned errors and bit time displacement errors are particularly detrimental at the high data bit rates, i.e., 10.7 MHz, required to faithfully process broadcast quality video data without reduction in the quality of the video information. Therefore, to take advantage of the mechanical reliability of the existing computer disc drive design, the apparatus described herein is provided with a positional servo for the AC motor and time base corrector circuitry to remove any unacceptable time displacement errors introduced into the data bit streams rather than altering the reliable design of the computer disc drives.

As described above, before the received data bit streams are time base corrected, each channel encoded data bit stream is decoded back to its original NRZ-L digital form. For this purpose, and with reference FIGS. 46A and 46B, the data decoder and time base corrector circuitry 100 includes for each data bit line a channel decoder circuitry portion 525 having a pair of input terminals 526 coupled to the data select switch 128 (FIGS. 9A and 9B0 for receiving channel encoded data, which as described hereinbefore, is in the form of channel encoded transition related pulses, such as pulses 515 and 489 shown in FIG. 45E-(14). The pair of input terminals 526 are coupled to a differential amplifier line receiver circuit 527 connected to reject common mode noise in the pair of complementary transition related pulses received from the transmission line pair included in the transmission line bus 154 after passage through the data select switch 128 (FIG. 9B). In addition, the differential amplifier line receiver circuit 527 regenerates a single transition related pulse from each transmitted pair of complementary transition related pulses so that the regenerated pulse has a well defined leading edge properly positional according to the code rules of the channel code selected for originally encoding the video NRZ-L data. More specifically, the differential amplifier line receiver circuitry 527 provides a single regenerated transition pulse with leading and trailing edges provided when the levels of the edges of the received complementary pulses are the same. By examining the edges of the transmitted complementary pulses in this manner, the leading edges of all regenerated pulses will be properly positioned according to the channel encoding rules because the same sense, i.e., positive going and negative going, edges of each pair of the complementary pulses are employed to define the occurrence of the leading edge of each regenerated transition related pulse. Because the transmission channel through which the transition related pulses are sent to the decoder circuitry 525 effect identical pulse edges the same, any time distortion introduced to the pulse edges will not effect the regeneration of the transition related pulses.

Following the regeneration of the transistion related pulses, they are coupled over line 528 to clock a one shot multivibrator 539 at each occurrence of a regenerated pulse, using the defined leading edge to effect clocking. The one shot 529 is rapidly switched from its stable conduction state to its quasi-stable conduction state to provide the precisely defined leading edge of the transition related pulses. The one shot 529 has one of its outputs connected to line 530*a* that extends to the clock input of a divide by two flip flop 531. Upon the occurrence of each regenerated transition related pulse, the flip flop 531 is rapidly switched between its two stable conduction states by the leading edges of the regenerated pulses and thereby converts the pulse form of the channel encoded data to the level form for subsequent decoding of the data back to its original NRZ-L digital form as will be described hereinbelow.

The one shot 529 provides complementary outputs of the channel encoded data on line 530*a* and 530*b*. The complementary outputs are coupled to a 6SC clock generator 532 which provides complementary 6SC clock signals on its output lines 533 and 534 for use by the data decoder circuitry 100 for decoding the received data. The clock generator includes a 6SC voltage controlled oscillator 537 which is locked by an operatively associated phase detector 535 to the phase of the data clock carried by the channel encoded data. The complementary transition related data pulses output by the one shot 529 on lines 530*a* and 530*b* are coupled to the input of the phase detector 535, which has its output on line 536 coupled to the control input of the 6SC voltage controlled oscillator 537. The phase detector 535 examines the phase of the 6SC clock provided by the oscillator 537 with respect to the received and regenerated transition related data pulses and provides an error correction signal to the oscillator via the phase error smoothing capacitor 538. A change in the phase of the received data causes the phase detector 535 to change the average voltage level on the capacitor 538 by a corresponding amount and thereby cause the phase of the 6SC clock provided by the voltage controlled oscillator 537 to be ajusted to clock carried in the channel encoded data.

The phase detection operation is performed by a pair of matched current sources 540 and 541, each having an output line 542 and 543 respectively connected to the line 536 coupled to the error averaging capacitor 538. In the absence of a transition related data pulse, the line 530*b* extending from the one shot 529 is high, which enables the current source 541. Because the base electrodes of each transistor of the differential pair forming a current switch 545 at the output of the current source 541 are grounded, the current provided by the current source 541 divides equally in the two current paths defined by the current switch 545. Current in the path defined by the current switch 545 connected to the output line 543 flows onto line 536 to change the error smoothing capacitor 538 to a level which, when a data stream is not input to the decoder circuitry 525, will cause the voltage controlled oscillator 537 to provide a 6SC clock at a nominal frequency and phase. Thus, even in the absence of a data bit stream at the input of the decoder circuitry 525, a 6SC clock is provided at its nominal frequency. This facilitates rapid synchronization of the oscillator 537 to data clock when a data bit stream is initially received and proper decoding of the channel encoded data.

When a transition related data pulse is received on the input line 526, the one shot responsively provides a high level signal on line 530*a* and a low level signal on line 530*b* for an interval determined by its time constant circuit 529*a*, which in the decoder circuit described herein is about 17 nsec. The low level signal on line 530*b* disables the current source 541, thereby terminating the provision of charging current through the current switch 545 to the error smoothing capacitor 538. However, the high level signal on line 530*a* enables the other current source 540, which provides charging current to the error detection capacitor 538 in accordance with the relative conduction periods of the halves 544*a* and 544*b* of a current switch 544 formed by the transistors arranged in circuit as a differential pair. The transistors forming the two halves 544*a* and 544*b* of the current switch have their respective base electrodes coupled to receive the 6SC clock provided over line 533. When the clock is at a low level, transistor 544*a* is disabled. However, the other transistor 544*b* is allowed to conduct because the long time constant RC circuit 547 holds the voltage at its base electrode at an average voltage level which is more positive than the low level of the 6SC clock. Consequently, all of the current furnished by the current source 540 will flow through the one enabled transistor 544*b* to the output line 542 of the current source 540.

When the 6SC clock goes high, the base of the transistor 544*a* goes more positive than the base of the transistor 544*b*. Therefore, transistor 544*a* is enabled and transistor 544*b* disabled. This removes the current flow to the error smoothing capacitor 538. If the transition related data pulse received by the current source 540 is positioned in time relative to the 6SC clock provided to the current switch 544 so that low to high level transitions in the 6SC clock occur at the center of the transition related data pulses, each transistor 544*a* and 544*b* of the current switch will be enabled for equal intervals and the voltage on the error detection capacitor 538 will be maintained at an average level corresponding to a correctly phased 6SC clock. Any change in the data bit rate of the received channel encoded data bit stream changes the position of the transition related pulses at the input to the current source 540 relative to the low to high level transitions of the 6SC clock at the input to the current switch 544. If this occurs, one of the transistors of the current switch 544 will be enabled during the period that the current source 540 is enabled (by the transition related pulse) for a longer interval than the other transistor, with one of the transistors enabled for a longer interval depending upon whether the data bit rate increased or decreased. This causes a corresponding change in the current provided to the error smoothly capacitor 538 and a corresponding corrective change in the average voltage level on the capacitor. A change in the voltage level on the capacitor causes the voltage controlled oscillator 537 to change its phase and frequency until the transition related pulses are centered with respect to the low-to-high level change in the 6SC clock provided to the current source 540. With the low to high level change in the 6SC clock adjusted to be centered with respect to the duration of the transmission related pulses, the two halves, 544*a* and 544*b*, of the current switch will individually pass current from the current source 540 for equal intervals. Hence, the average voltage on the capacitor 538 will be maintained at the level required to lock the frequency and phase of the 6SC oscillator 537 to the data clock rate of the received channel encoded data.

If the 6SC voltage controlled oscillator 537 fails to lock to the received data or data is not received by one of the decoder and time base correctors 100 included in one of the 10 bit lines of a playback channel, a frequency unlock signal is provided on an output line 550 that extends to the reference clock generator circuitry 98. All of the lines 550 from the 10 decoder and time base correctors of the playback channel are ORed in the reference clock generator circuitry 98 for coupling a frequency unlock command to the computer control system 92 via the signal system inferface 119 (FIGS. 8, 32A and 32B) in the event that one or more frequency unlock signals are generated in a playback channel. The computer control system 92 responds to the frequency unlock command by providing via the signal system interface a video mute command to the blanking insertion and bit muting circuitry (FIGS. 51A and 51B) that blocks the sending of data to the requesting station. In the channel decoder 525, the frequency unlock signal is generated by detecting the failure of the channel decoder to provide a data bit for 16 cycles of 6SC. The frequency unlock signal is provided by a divide by two circuit 546 that has its clock input coupled to receive a clock pulse provided on line 548 each time the channel decoder 525 fails to detect a data bit for an interval of four cycles of 3SC, hence, 8 cycles of 6SC. If a second clock pulse appears on line 548 before the divide by two circuit 546 is reset by the NAND gate 549, the divide by two circuit 546 provides the frequency unlock signal on line 550. The NAND gate 549 resets the divide by two circuit 546 each time a coincidence occurs between a low level of the 6SC clock provided by the oscillator 537 and a low level on line 530*b*, which occurs when a transition related data pulse is received at the input 526 of the channel decoder.

After the divide by two flip flop 531 converts the channel encoded data from the transition related pulse form to the channel encoded NRZ-L form, the data is coupled by line 531*a* to a pair of latches 551 and 552 at the input of the decoding circuitry 525*a*. The decoding circuitry is able to decode data that is channel encoded according to the code rules of the U.S. Pat. No. 3,108,261 (FIG. 46E (1)) and the Miller application Ser. No. 668,679 identified hereinbefore (FIG. 46E-(2)). The latches are clocked by Ø1 and Ø2 3SC clocks, respectively, derived from the 6SC clock generated by the oscillator 537.

The 6SC clock on line 534 is coupled to one input of each of the NAND gates 553*a* and 553*b*. The other input of each of the NAND gates receives complimentary 3SC square waves generated by the divide by two flip flop 534*a* from the 6SC clock on line 534. The NAND gates are enabled when their inputs are low to issue the positive Ø1 (FIG. 46E-(4)) clock pulses to clock the latch 552 and positive Ø2 (FIG. 46E-(3)) clock pulses to clock the latch 551. The Ø1 and Ø2 clock pulses are displaced in time by one half cycle of 3SC. Hence, the time that the level of the channel encoded NRZ-L data on line 531*a* is latched by latch 551 is displaced one half cycle of 3SC from the time the level is latched by latch 552 (FIG. 46E-(5) and (6)). Both latches are coupled to the two inputs of an exclusive OR gate 554*a*. The exclusive OR gate serves to detect the occurrence of a change in state in the level of the channel encoded NRZ-L data at the input of latches 551 and 552 between the times they are clocked by the displaced Ø1 and Ø2 clocks (FIG. 46E-(7)). To determine if the change in state at the input of latches represented a logical 1 bit, the output of the exclusive OR gate 554*a* is coupled to one input of a NAND gate 555. The other input of the NAND gate receives inverted Ø1 3SC clock pulses coupled from the NAND gate 533*a* by the inverter 555*a*. If the change in state at the input of the latches represents a logical 1 bit, the output of the exclusive OR gate 554*a* will be low at the occurrence of an inverted Ø1 3SC clock pulse. The NAND gate 555 will be enabled, placing a high level on its output. To assure safe latching of the detected logical 1 bit pulse at the output of the NAND gate 555, a delay circuit 556 is connected to the input of the NAND gate 555 receiving the inverted Ø1 clock so that the output of the NAND will be maintained high for an interval longer than the Ø1 3SC clock pulse (FIG. 46E-(8)). This permits the following latch 557 to be clocked with the positive trailing edge of the Ø1 3SC clock to latch the delayed high level provided by the NAND gate 555 (FIG. 46-(9)). If the input data is channel encoded according to the U.S. Pat. No. 3,108,261 code rules, the output of latch 557 will be the channel decoded NRZ-L data. This is represented by the doted lines in the timing diagram shown by FIG. 46E. In the decoder shown by FIGS. 46A and 46B, however, an additional latch 558 is needed to permit decoding of data channel encoded according to the code rules of the aforementioned Miller application Ser. No. 668,679. Howeever, for the U.S. Pat. No. 3,108,261 channel code, the additional latch 558 only delays the output of the decoded data by one cycle of 3SC.

When data is encoded according to the code rules of the Miller application, specified logical 1 bit related transitions are suppressed. If a logical 1 bit related transition has been suppressed, there will be an absence of data transitions for an interval greater than 1½ cycles of 3SC. This is detected by a modulo-4 counter 559 having its clock input coupled to receive Ø0 clock pulses provided by the NAND gate 553*b* and its reset input to the output of the edge detecting exclusive OR gate 554*a*. The exclusive OR gate 554*a* provides a reset pulse to clear the counter 559 each time a transition occurs in the channel encoded data (FIG. 46E-(10)). The ouput of the modulo-4 counter 559 is coupled to one input of a AND gate 560 which also receives Ø0 clock pulses at its other input. Both inputs are low ½ cycle of 3SC after the modulo-4 counter has counted four Ø1 3SC clock pulses without being reset, which corresponds to an absence of data transitions for an interval of 2½ cycles of 3SC (FIG. 46E-(11), (12) and (13)). Ordinarily, this signifies that a logical 1 bit has bit suppressed in the channel encoded data. To make certain that no errors have been introduced to the data stream, a following NAND gate 561 examines an output of the latch 558 at the time when AND gate 560 provides the low state signal representing a suppressed logical 1 bit. If the examined output of the latch 558 is also low, it verifies that a logical 1 bit has been suppressed and outputs pulses on line 562 (FIG. 46E-(14)) that is wire ORed with the output of latch 557. Line (14) of FIG. 46E represents the state of NAND gate 561 as if it was not wire ORed with the output of latch 557. The second pulse 563 provided by the NAND gate 561 occurs at the time of and is latched into the latch 558 by the Ø1 3SC clock. This prevents the ouput of the latch 558 from being return low, thereby, inserting the suppressed logical 1 bit into the decoded NRZ-L data (FIG. 45E-(15)) appearing on line 566. In the data track bit line, the decoded data is coupled by line 566 to the data track interface 120 (FIG. 8) The decoded data clock provided by the flip flop 534*a* on line 573 and the line 10 or sync word from the first shift register and sync word detector circuitry 572 are also coupled to the data track interface.

If the phase of the 3SC decode clock provided by the flip flop 534*a* is incorrect, a one-shot multivibrator 534*b* is enabled by the coincidence of the 6SC clock on line 534 and a pulse provided on line 564. This pulse will be generated 3 cycles of 3SC before the line ID is first detected by sync word detector portion of the circuitry 572 and if the level of the decoded data at that time is low, therefore, incorrect. A counter 590 (FIGS. 15A and 46C) receives 3SC decoded data clock and, as will be described hereinbelow, provides an advanced end of count pulse at H/2 rate on line 591. Because of the known data bit pattern of the sync word interval, which interval ordinarily occurs when the advanced end of count pulse is generated, the decoded data level can be examined at shift register portion of the circuitry 572 to determine if decoding is performed correctly. The gating circuitry 592 issues a pulse on line 564 when the examined decoded data level is low that enables the one-shot 534*b* to provide a disabling signal at the clock input of the flip flop 534*a* for one cycle of 6SC. This results in a shift in the phases of the Ø1 and Ø2 clocks by ½ cycle of 3SC, thereby establishing the right phase for correct decoding of the channel encoded NRZ-L data.

During playback operations, each bit stream of channel decoded NRZ-L data provided at the output line 566 of the decoder circuitry 525 will contain time base errors in the form of bit time displacement errors as previously described. Furthermore, bit line to bit line or skew time displacement errors will be present in the 9 data bit streams that carry the 8 parallel bits of digitized video and 1 parity bit, if included. To remove these bit time displacement errors from the NRZ-L data, a time base corrector 565 is provided in each data bit stream and corrects such errors by electronically adjusting a variable delay through which the NRZ-L data is passed. Each time base corrector contains circuitry which processes the received data so that the data bit rates in all video data and parity bit lines are frequency and phase coherent with respect to the reference 3SC provided by the reference clock generator 98 for the playback channel 91. Furthermore, each of the time base correctors 565 also aligns the data bits in the data bit lines with respect to a common H/2 reference provided by the playback channel's reference clock generator 98. As a result of these combined functions, any relative time displacement errors between the data bits in the 9 bit lines are removed, i.e. line to line or skew errors removed, any bit time displacement errors within a bit line connected.

Figure 46B:
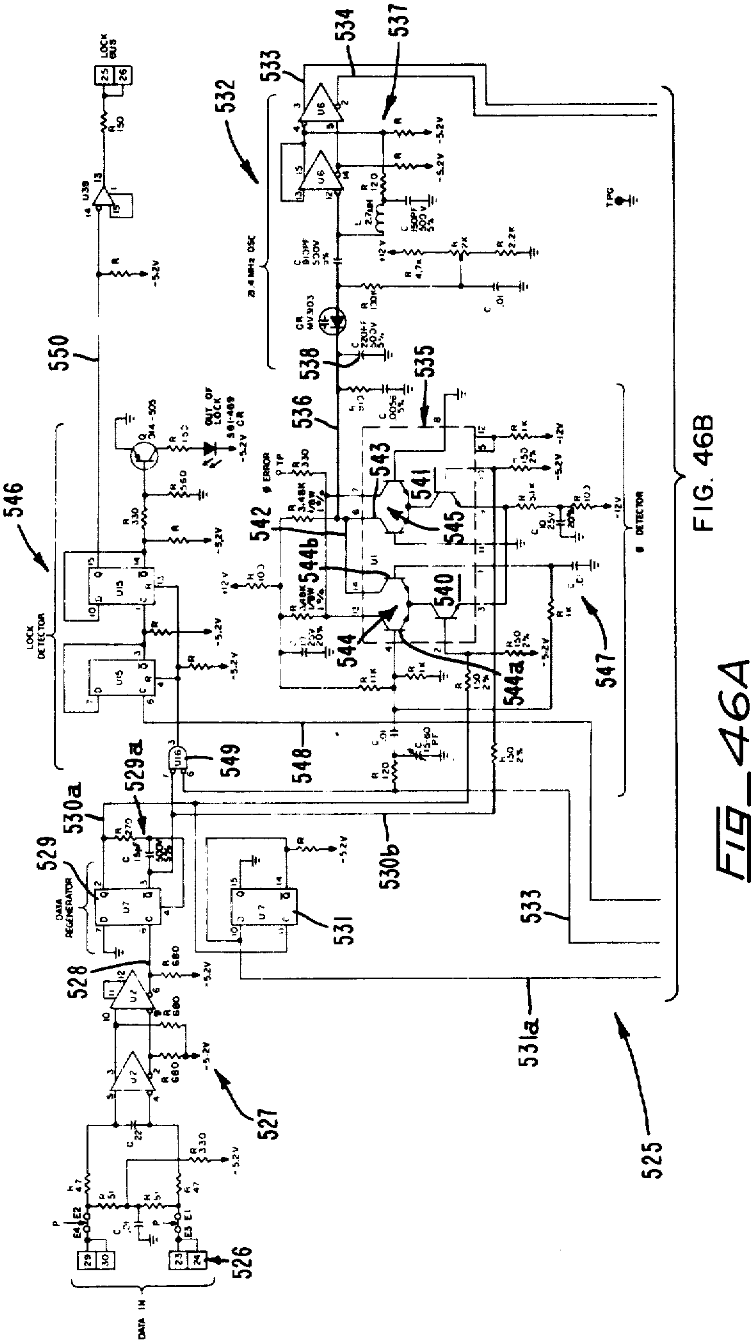

The operation of the time base corrector 565 included in each data bit line will be described in connection with the block diagram shown in FIG. 15A and the timing diagrams of FIGS. 15B and C Specific circuitry which can be used to carry out the operation of the time base corrector is shown in FIGS. 46B, 46C and 46D. The decoded data in each data bit line received from the decoder 525 over line 566 is time base corrected independently of the other 8 data bit lines by using a periodically occurring time reference common to all of the data bit lines and defined in terms of the frequency and phase of a higher rate clock used to encode the data. In video recording and reproducing apparatus such as described herein, horizontal line related H/2 signals derived from the periodically occurring sync words synchronously inserted in each data bit stream in the horizontal blanking interval as hereinbefore described is defined in terms of the frequency and phase of the higher rate (455 times H/2) signal color subcarrier component and the 3SC data clock (1365 times H/2) and is available for use as the periodically occurring timing reference.

To effect time base correction of the reproduced and channel decoded data, the data in all data bit lines are retimed to a common reference 3SC clock by directing the decoded data in each bit line through a phaser 567. In the illustrated embodiment, a multiple port register 568 performs the retiming by having data written into addresses determined by the write address generator 569 clocked by the decoded 3SC data clock provided by the channel decoder 525 on line 573. The data is read out of the register 568 under the control of the read address generator 570 clocked by the reference 3SC clock provided on line 571. Because all of the phaser read address generators in the 9 data bit lines are clocked by the same reference 3SC clock, the data in all of the data bit lines are retimed to the desired stable 3SC reference clock, which for an NTSC television signal standard is 10.7 MHz.

The write and read address generators 569 and 570 are preset and reset respectively to their starting addresses, with the starting write address in advance of the starting read address by four addresses, by the first shift register and sync work detector circuitry 572 each time a sync word is detected in the received decoded data. The decoded data enters a seven bit shift register included in the circuitry 572 and is examined by logic circuits forming the sync word detector portion of the circuitry 572. After passage through the shift register, the data is clocked into the multiple port register 568. The register 568 has an 8 bit capacity and is initially operated to read an address four 3SC cycles following writing of data at the address. Because the write address generator 569 is clocked by the 3SC data clock and the read address generator 570 by the reference 3SC clock data bit displacement errors in the received data will change the time ad address has data written into it relative to the time the address is read. This change in the time between writing data at an address and reading data from the address results in the received data being retimed to the stable 3SC reference. Furthermore, the phaser 567 will retime the received data to the stable 3SC reference even if the sync word is not detected by the first sync word detector 572 as long as unanticipated large time displacement errors do not occur that exceed the storage capacity of the register 568.

The sync word detectors 572 and 575 are enabled for sync word detection by the sync word enable pulse generator 600. This generator is enabled by a divide by 1364 counter 590 clocked by the 3SC data clock. The generator 600 provides a sync word detection enable pulse on line 601 (FIG. 15B-(3)) which is initiated by the advanced EOC pulse (FIG. 15B-(2)) issued by the counter 590 three counts in advance of the occurrence of a sync word at the detector circuitry 572 (FIG. 15B-(6)). The detection of a sync word by detector 575 terminates the enable pulse on line 601 when the counter 590 reaches a count of fifteen after being reset by the EOC reset pulse on line 602. The counter position 15 in the counter 590 terminates the enable pulse if a sync word is not detected by detector 575 (FIG. 15B-(7)). The shift register 604 and the pulse generator 605 cooperate to allow the sync word enable pulse to follow changes in the time of the occurrence of consecutive sync words in the amount of ±1 cycle of 3SC. If the reset enable pulse derived from a sync word arrives one count before the automatic EOC reset pulse, the counter 590 will not be reset (FIG. 15B-(4) and (8)). If the reset enable pulse is provided one count after the occurrence of the EOC reset pulse, the counter 590 will not be reset again. If a sync word is not detected during the interval of the sync word enable pulse, the counter 590 and generator 600 will retain, as a memory, knowledge of when to provide sync word enable pulses until a sync word is detected by resetting it self through shift register 604 and line 610 (FIG. 15B-(5)). When it is not in coincidence with the positive gating waveform (FIG. 15B-(4)) of the generator 605, 612 is enabled to permit the sync word to be placed on line 613 for resetting the counter 590.

The vertical blanking signal on line 606 (FIG. 15B-(1))) is coupled to place the sync word enable pulse generator 600 in the enable state for an interval of ten horizontal lines by disabling gate 611 coupling clocks to generator 600. This enables the recorder/time base corrector circuitry to lock into the sync word detectors 571 and 575 to be enabled at sync word time and set the phaser 568 and error gate 582 for proper operation.

Figure 5B:
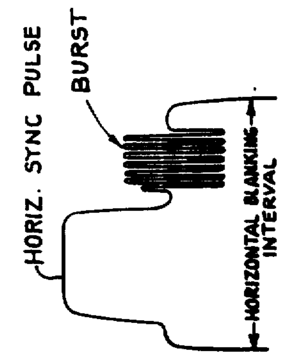
FIG. 5B illustrates a portion of a color television signal, particularly illustrating the horizontal synchronization pulse and color burst signal.
Figure 5A:
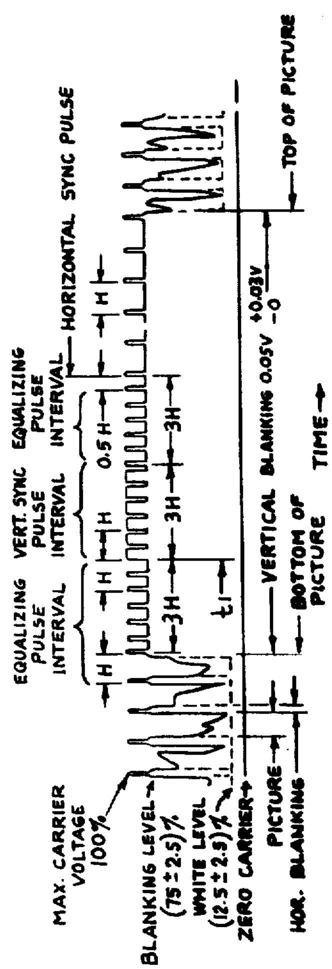
FIG. 5A illustrates a portion of a typical television signal illustrating the vertical interval thereof.

The data is read from the multiple post register 568 with the 3SC reference clock into the shift register portion of the second sync word detector circuitry 575. The shift register portion has three of its output lines coupled to the data input of a serial to parallel converter 577. The multiplex clock provided on line 578 by the reference clock generator 98 is at the SC rate ahd latches the data in blocks of three data bit cells from the shift register portion of the circuitry 575 into the converter 577 for an interval of one cycle of SC. The three output lines 580 of the converter 577 extend to the input of a RAM 579. The final time base correction is performed in RAM 579 whose write address generator 614 is clocked at reference SC, since the operation of the RAM is at SC but the decoded data is at 3SC. The read address generator 615 is also clocked at reference SC to cause the reading of the RAM addresses. Read/write mode signals and write enable signals from the reference clock generator of of FIGS. 44A-D control the reading and writing of the RAM addresses so that a read cycle occurs during one part of a subcarrier cycle and a write cycle at a different part of the cycle sync word than the record sync word detector. Each causes a 3.58 MHz rate counter 615 to count SC rate signals obtained by dividing reference 3SC with divider 583 until the reference H/2 terminates the count of the reference SC signals to the counter 616 at error gate 582. When the reference H/2 is received on line 581 and the error gate 582 is closed, a pulse is generated by the delay and pulse former 621 which causes the latching of error count in the read error address generator 616. Subsequent, a reset pulse is generated from the latch pulse to reset the ÷3 binary counter 583 and read error address generator 616. The counter sets the read addres in accordance with the timing difference between reference H/2 and the sync word detected by the second sync word detector 575 measured in cycles of 3SC divided by three and subtracts this value from the write address to generate the correct read address. Because the clocks representing error are divide-by-three, the RAM will adjust for errors of integral numbers of subcarrier cycles. A 3-bit shift register 617, error latch 618 and gates 619 provide correction of any residual error remaining after the data has passed through the RAM 579 in fractions of one cycle of 3SC. The parallel to serial converter 620 at the output of the RAM receives the demultiplex clock from the reference clock generator 98 and converts the data rate back to 3SC at the input of the shift register 617. FIG. 5C shows the typical correction performed by the phaser 67 and following time base correction by the RAM 579 and shift register 617.

DATA TRANSFER CIRCUITRY

During playback, after the data has been decoded and time base corrected by the data decoder and time base corrector circuitry 100, the eight bit lines of video data plus the added single parity bit line, if parity protection is included, are applied to the data transfer circuitry 129 shown in block diagram of FIG. 9A and the output of the data transfer circuitry is applied to the chroma processing circuitry 101 in the event that a normal playback mode is being used or to the encoder switch 126 in the event the data is being transferred to another disc drive memory using the apparatus in the transfer mode.

The data transfer circuitry performs a parity check of the data coming from the time base correctors and initiates an error masking function in the event that errors are detected during the parity check. The data is appearing at a 3SC rate and every three samples of the NRZ data will represent approximately the same video information. The error masking portion of the circuitry clocks the data streams through a series of flip-flops which provide a three bit memory so that if the parity check detects an error, the third previous data word is reinserted into the position where the error was detected. Reinsertion of the third previous data word masks the error, the assumption being that the third prior data word would be more representative of the correct video information than the data word that contains the error. Every third sample is reinserted in place of the detected error sample because the 0° sample (for example) from the previous cycle of 3SC would probably be more accurate than a sample taken at either 120° or 240°, assuming the level of the signal which is sampled contains chrominance information that remains approximately constant for a period of a few samples.

The data transfer circuitry also clocks the data from the input to the output using a 3SC PALE clock to reposition the samples into the desired vertically aligned positions that was achieved by the original PALEing during sampling in the analog-to-digital converter 95. When the signal was channel encoded, the alignment was changed due to the fact that a line to line continuous phase 3SC clock was used to channel encode the NRZ data. The data emerging from the time base corrector circuitry is thus aligned the same way as the encoded data at the output of the encoder 96. Accordingly, the data transfer circuitry again PALEs the data to realign the samples in the manner as shown in FIGS. 9C(10) and 9C(11).

Figure 16:
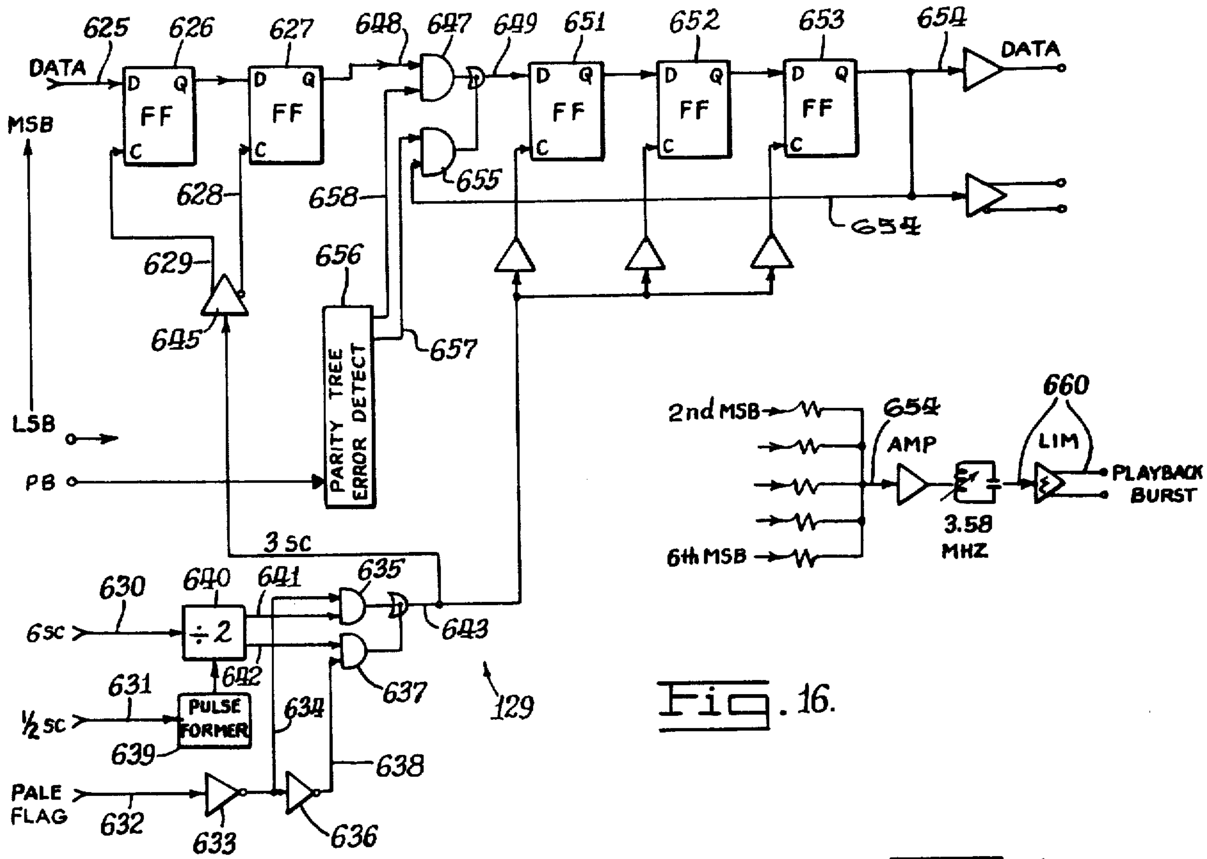
FIG. 16 is a functional block diagram of the data transfer circuitry which is a portion of the signal system shown in FIG. 9A.

Referring to the block diagram of the data transfer circuitry 129 shown in FIG. 16, time base corrected data provided by the decoder and time base corrector circuitry 100 over nine bit lines, i.e., eight bit lines containing video information and one parity line, are applied at nine input lines of the data transfer circuitry. The line 625 in FIG. 16 represents the most significant bit line and is representative of each of the nine input lines provided for each bit stream. The data is clocked into FF 626 and FF 627 using a 3SC PALE clock signal which appears on lines 628 and 629. The PALE clock is generated by a PALE clock generator shown at the lower portion of the block diagram from 6SC and ½SC signals received from the reference clock generator 98 on lines 630 and 631, respectively, and a PALE flag signal received from the reference logic circuitry 125B via the encoder switch 126 on line 632. The PALE flag signal is applied through an inverter 633, line 634 to one input of an AND gate 635. The line 634 also connects to a second inverter 636 which extends to one input of another AND gate 637 via line 638. The $\frac{1}{2}$SC signal on line 631 passes through a pulse former 639 and clocks a divide by 2 FF 640 which produces 3SC output signals of opposite phases on output lines 641 and 642 which respectively extend to the other inputs of the AND gates 635 and 637. The outputs of the AND gates are connected to line 643 and extend to complementary dual output buffer 645 which clocks FF 626 and FF 627. The PALE flag signal on line 632 is a two state or level signal that changes state at an H/2 rate and, upon changing levels, alternately disables AND gate 635 and enables the AND gate 637 to gate one of the 3SC signals from lines 641 and 642 onto the output line 643. Thus, in effect the PALE flag alternately changes the phase of the 3SC signal that is used to clock the data on line 625 through the FF 626 and FF 627 so that consecutive horizontal lines of video data are clocked with opposite phased 3SC signals. This retimes the video data bits from the continuous phase clock back to the PALE clock so that the vertical alignment of samples of consecutive lines is re-established for subsequent chroma separation and processing. As previously described, the video data bits are not to be retimed in the transfer mode of operation. To prevent the retiming, the encoder switch 126 blocks the coupling of the PALE flag from the reference logic circuitry 125B to the data transfer circuitry 129 and instead places a low level signal on line 632. This places an enabling signal on the input of the AND gate 635 and a disabling signal on the input of the AND gate 637, where a line to line continuous phase 3SC clock signal is provided on line 643 through the AND gate 635.

The data on the output of FF 627 extends to an AND gate 647 via line 648 and AND gate 647 has output line 649 connected to the first of three FFs 651, 652 and 653 which serve to shift the serial bits to the output of the last FF which appears on line 654. Line 654 also extends to one input of another AND gate 655. A parity tree error detecting circuit 656 is coupled to receive the data bits of the nine bit streams as described below and has two output lines 657 and 658 which extend to AND gates 655 and 647, respectively. When an error is detected, it disables AND gate 647 to block the bit containing the error and enables AND gate 655 so that the output data on line 654 can be clocked through AND gate 644 onto line 649. This has the effect of replacing the incorrect bit with the third previously occurring bit in the data stream and effectively masks the error with the bit that is approximately correct for the reasons that had been previously discussed.

Five bits, i.e., bits 2 through 6, or the next most significant bit through the sixth most significant bit are also sampled through a resistor ladder arrangement having weighted values to produce an analog conversion of the digital information which approximates digitally encoded analog information and is used to detect if chroma phase needs to be inverted. The output on line 660 extends to the reference clock generator 98 and is compared with the phase of the burst of the station reference video signal to determine if the chroma phase needs to be inverted. The digital-to-analog conversion occurring in the data transfer circuitry is gated to reject all but the burst and produces an imprecise, but sufficiently accurate determination of the burst phase for use by the reference clock generator.

Specific circuitry that can be used to carry out the functions of the block diagram shown in FIG. 16 is illustrated in FIGS. 47A and 47B. Since the operation is essentially the same as that described with respect to the block diagram, a detailed description of the circuitry will not be described herein. Referring to FIG. 47A, the parity tree error detection circuitry 656 comprises a number of exclusive OR gates 661 which are interconnected and associated with the eight data bit lines containing the video information. The outputs of the interconnected exclusive OR gates 661 are connected to one of the inputs of another exclusive OR gate 662 whose other input is coupled to receive the parity bit on channel 9. The exclusive OR gate 662 controls an FF 663 that has output lines 657 and 658 for controlling the AND gates as previously described to either pass the video data bits received on input lines 625 or replace an erroneous byte of 8 bits with the third previously occurring byte of 8 bits. The operation of the remainder of the circuitry shown in the schematic diagram shown in FIGS. 47A and 47B are essentially the same as described with respect to the block diagram of FIG. 16.

CHROMA SEPARATING AND PROCESSING

A television picture with a region of saturated color bounded along the bottom by a region of no color defines a vertical color transition along the horizontal boundary or color edge. Given three successive television lines A, B and C of a field, wherein the lines are within the saturated color region immediately above the color edge, a conventional comb filter generates the vectors representing chrominance in accordance with the relationship, $-\frac{1}{4}A+\frac{1}{2}B-\frac{1}{4}C$.

However, the color subcarrier of an NTSC television signal has a 180° phase shift between alternate lines A, B and C. Thus 180° inversion of, for example, lines A and C and subsequent summation of the vectors $+\frac{1}{4}A+\frac{1}{2}B+\frac{1}{4}C$ generates a full chrominance vector, herein termed 1B or simply, +B, the chrominance on line B. When this chrominance vector +B is subtracted from the wideband signal (which also contains the chrominance vector +B), the chrominance vectors cancel. The comb filter has effected complete chrominance and luminance separation, i.e., all chrominance is in the chrominance channel.

However, in a second case, if lines A and B are in the saturated color region, with line C in the region of no color, line A provides a chrominance vector equal to B in the negative direction and line B a vector equal to B in the positive direction. But line C provides a zero chrominance vector since it lies in a region of no color. When combining the vectors in accordance with the previous relationship, $-\frac{1}{4}$ of vector A is inverted and added to $+\frac{1}{2}$ of vector B, thereby providing a sum of $+\frac{3}{4}$ of a full vector B. It follows that when the chrominance $+\frac{3}{4}B$ is subtracted from the wideband signal, i.e., line B, there is a residual of $+\frac{1}{4}$ of the chrominance vector left in the luminance channel, while only $+\frac{3}{4}$ of the chrominance vector is extracted into the chrominance channel.

A third case exists wherein only line A is within the saturated color region, and lines B and C are in the region of no color. The third case is similar to the second case above, wherein however, the signs are opposite.

The consequence of the second (and third) case given above, wherein line C (or B and C) lies in a region of no color, prove disadvantageous when attempting to reconstitute a composite NTSC color television signal from a single stored color field, or frame. As is well known, when reproducing the composite video signal from a single stored frame, in one frame the chrominance is added directly back to the luminance previously separated therefrom, whereas in the second frame the chrominance component is first inverted and then is added to the luminance. Therefore, in the second case mentioned above wherein line C is in a region of no color, in the non-inverting frame, the $+\frac{1}{4}$ chrominance vector which remained in the luminance channel due to incomplete separation, is added to the $+\frac{3}{4}$ chrominance vector separated into the chrominance channel. Thus the full vector B, i.e., the full chrominance signal, is recovered to define a correctly reconstituted color television signal for the non-inverted frame. However, when reconstituting the second frame of color video from the single stored frame, the chrominance ($+\frac{3}{4}$B) is first inverted, providing a $-\frac{3}{4}$ chrominance vector, when when subsequently added to the $+\frac{1}{4}$ vector in the luminance channel provides only a $-\frac{1}{2}$ chrominance vector for the inverted frame. Thus, in the non-inverted frame, the chrominance is reproduced with full saturation, whereas in the alternate, inverted frame the chrominance is reproduced at $\frac{1}{2}$ saturation. Thus the color saturation defining the color edge between the region of full color and that of no color will flicker at a 15 Hz rate between $\frac{1}{2}$ saturation and full saturation. This visible flicker is objectionable when reproducing the composite NTSC four-field color coded television signal.

The chrominance separating and processing system provides various embodiments of digital circuits which perform the inversion process digitally in combination with a digital comb filter and digital bandpass filter, while further providing a conditioned chrominance signal which, when digitally re-combined to form the composite NTSC color television signal, minimizes or cancels completely the objectionable 15 Hz flicker at the vertical transitions.

Although the combination is hereinafter particularly described utilizing a three times subcarrier (10.7) megaHertz phase alternating line encoding (PALE) sampling technique with a PCM encoded NTSC video signal, it is to be understood that other encoding techniques, sampling techniques, frequencies, etc., may be employed. Furthermore, the single lines depicting the inputs and outputs of the block diagram components are representative of digital words of selected numbers of bits, as exemplified in the detailed schematics of FIGS. 48, 49 and 50.

Referring to FIG. 17, there is shown a digital chrominance separating and processing system wherein a 10.7 megaHertz (MHz) PALE PCM color video signal is introduced via input terminal 700 to digital comb filter means 701. The filter means 701 is per se generally typical of digital comb filters presently utilized in various television signal processing systems, but herein is adapted via a specific clocking technique further described hereinbelow, to separate the chrominance from the digital wideband color signal. The outputs from filter means 701 and the associated clocking techniques, include a 1H delayed wideband signal (delayed by one-horizontal-line delay period) on line (terminal) 702, and an extracted chrominance signal (with low frequency components still included) on line (terminal) 703*a*. The term "extracted" is herein used to define the chrominance signal which is separated into a chrominance channel, whether the separation is complete, or incomplete, as previously described with respect to case two (and three) hereinabove.

The extracted chrominance signal is fed to bandpass filter means 704 which removes vertical resolution losses due to the comb filter means, by passing only that frequency band occupied by the chrominance information. The bandpass filter means 704 is centered at 3.58 MHz (the NTSC subcarrier frequency) and has a bandwidth of, for example, 1.5 MHz.

The resulting combed chrominance signal is fed via line (terminal) 703*b* to a digital circuit for inverting the chrominance signal on alternate frames at the frame rate. In FIG. 1 the inverting circuit comprises a digital transversal filter with odd symmetry 705, which herein may be further identified as a modified, digital, "Hilbert" transformer. It is understood that the transversal filter 705 provides one form of inversion; i.e., employs what is basically known as the Hilbert transform, but which is herein modified to provide a specific form of transversal filter with odd symmetry, while further providing a digital rather than analog inversion implementation. The transversal filter of interest has the property of rotating the phase 90° of all frequencies of a selected range which herein, for example, may be two to four MHz.

Thus the term inversion, or inverting is employed to define the circuitry and process of digitally conditioning the chrominance at the frame rate (or field rate if one field is used to reconstitute the four field color coded NTSC color television signal) as by phase shifting, rotating, inverting or otherwise handling the phase. Further, the successive playbacks of either a single stored field or frame is referred to generically as "alternate repretitive reproductions".

The chrominance signal is also fed to a negative input of digital adder (subtractor) means 706. The 1H delayed wideband video signal of terminal 702 is fed to the positive input of the adder means 706. The transversal filter 705 includes a control input at 707 which determines the conditioning of the chrominance signal phase. In one embodiment, for example, the transversal filter may provide a plus and then a minus 90° phase rotation of the chrominance with respect to the luminance signal in alternate repetitive reproductions. The chrominance and luminance signals are then summed in digital adder means 708 to provide the composite color television signal on output terminal 728.

Control means 709 includes various timing and clock inputs thereto which, for example, relate to the overall apparatus timing and thus originate upstream in the apparatus. In turn, the control means 709 generates specific control signals for the comb filter means 701, for the traveral filter control input 707, for the bandpass filter means 704, etc., which control signals include a PALE clock and 1H delay line, four-phase clocks, inter alia. The control means 709 and the various inputs and outputs are further shown and described in detail in FIGS. 48A, 48B, 49A, B and C and thus are not further described here.

Briefly, in FIG. 17, the comb filter means 701 combines the three adjacent television lines A, B, C of prevous mention, and includes a pair of digital, one-horizontal-line (1H) delay lines 710, 711 and a pair of adder means 712, 713. The 10.7 MHz PALE video signal is fed to delay line 710 as well as to adder means 712. The 1H delayed signal is fed to 1H delay means 711, and to the adder means 713. The 2H delayed signal is fed to the other input of adder means 712, whose output in turn is fed to the negative input of the (subtractor) adder means 713.

The digital comb filter means 701 and digital bandpass filter means 704 exemplified in block diagram herein, generate (eight bit) digital words corresponding to the separated chrominance and 1H delayed wideband signals, and are further depicted in the schematic diagrams of FIGS. 48A–B and 50A–B.

The combed chrominance signal is subtracted from the 1H delayed wideband video signal via the digital adder means 706, wherein the resulting combed luminance signal is fed to the digital adder means 708.

FIG. 18 shows the digital transversal filter 705 wherein the digital combed chrominance signal is fed to a series of one-sample-period delays 714*a*–714*c*, and also to the positive input of an adder means 715*b*. The negative input of adder means 715*b* is coupled to the output of the last delay 714*c*. The positive and negative inputs of an adder means 715*a* are coupled to the input and output respectively of the delay 714*b*. The outputs of adder means 715*a*, 715*b* are coupled to respective multiplier programmed read-only memories (PROMs) 716*a*, 716*b*, and thence to adder means 717. The latter is coupled via an inverter stage 718 to the adder means 708 of previous mention, along with the combed luminance signal from adder means 706, whereby means 708 generates the composite color television signal. The control input 707 is coupled to the inverter stage 718.

In operation, the transversal filter 705 provides digital circuits for conditioning the phase of the chrominance signal with respect to the luminance signal; i.e., for providing the digital implementation of phase inversion of the chrominance on alternate color frames. To this end, the 1H delayed wideband signal, and the chrominance signal are introduced to the adder means 706 via terminals 702, 703*b* respectively, whereupon the resulting luminance signal is introduced to adder means 708. The chrominance signal is delayed one-sample period (e.g., 93 nanoseconds) in each of the delays 714*a*–714*c*, whereby the undelayed chrominance and the three-sample delayed chrominance are introduced to the adder means 715*b*, and the one-sample and two-sample delayed chrominance signals are introduced to adder means 715*a*. The delays 714*a*–714*c* may comprise a single stage of a shift register. The adder means 715*a*, 715*b* provide signals to multiplier PROMs 716*a*, 716*b* respectively, which perform a multiplication of the respective signals by 0.575 and 0.096 in a digital approximation of a conventional convolution operation. The resulting signals are then summed via adder means 717, and the summed signal has all of its frequency components advanced 90° with respect to the luminance signal, to define the conditioned chrominance signal of previous mention. The output of adder means 717 is delivered to the adder means 708 via the inverter stage 718. During one color frame the inverter means 718 has a high, or "1", introduced thereto via the control input 707 from control means 709, whereby the (eight) bits of the output word are delivered unchanged to the adder means 708. On alternate video color frames the control input 707 is a low (or "0") invert enable signal (see FIG. 49). Data is represented in this device in the signed two's complement negative system where negative numbers have a "1" in the sign bit position and the magnitude is the 2's complement of its absolute value. Therefore, inversion amounts to changing the sign and forming the 2's complement, via the "0" invert enable input 707. Thus the conditioned chrominance signal (which is rotated +90°) is directly added to the luminance in one frame, and is inverted and then added to luminance in the alternate frame, to provide the composite color television signal on output terminal 728. Alternately, the chroma first may be rotated −90° on each frame by reversing the inputs to the adder means 715*a*, *b* and then adding directly in one frame and inverting 180° and adding in the next.

In another alternative, the transversal filter 705 may be implemented whereby during one color frame the phase of the chrominance signal is advanced by 90°, and during the alternate color frame is retarded by 90°, to provide in essence the 180° inversion of the frequency components between frames.

Figure 48B:
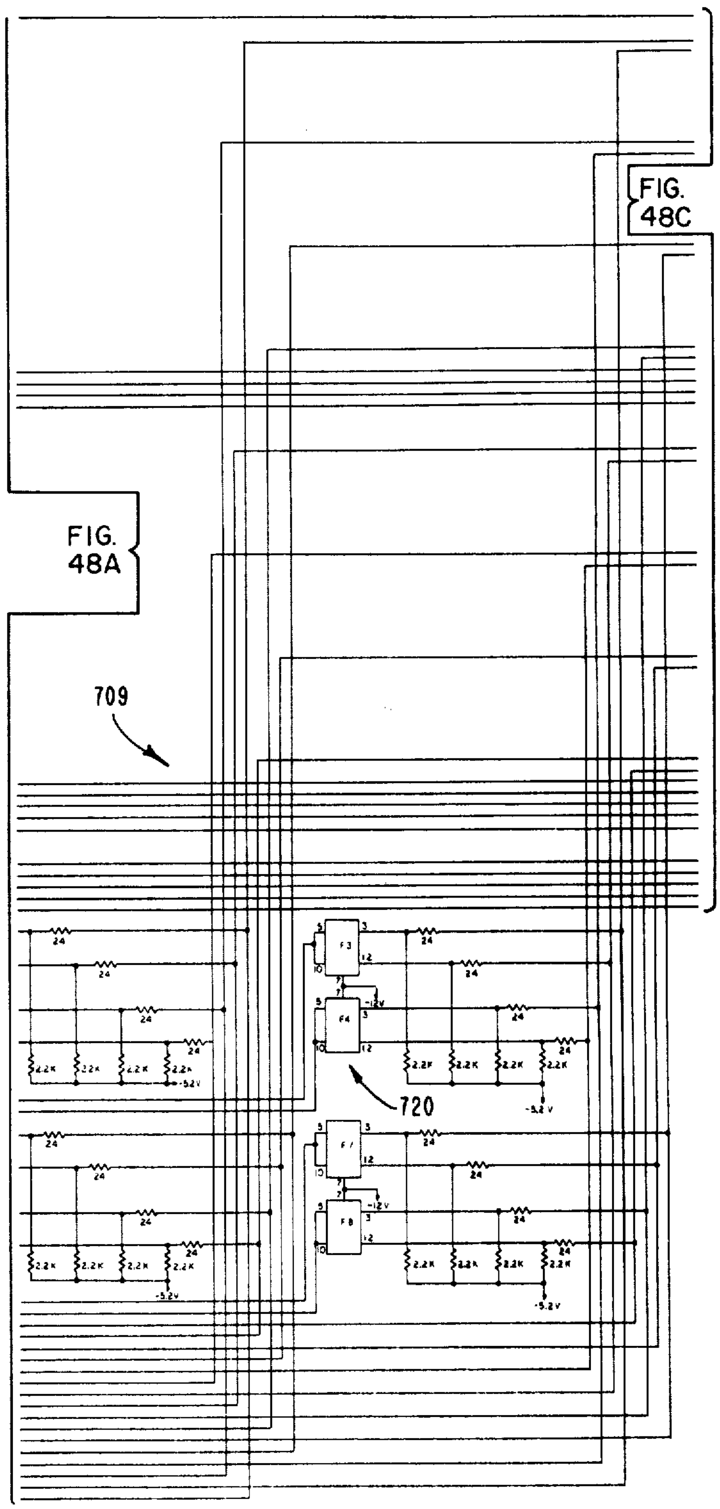

FIGS. 48A–C, 50A–B and 49A–B illustrate one schematic implementation of the embodiment of FIGS. 17 and 18 utilizing the digital transversal filter with odd symmetry 705. FIGS. 48A–C illustrate one implementation of the digital comb filter means 701, and part of the control means 709 of FIG. 17; FIGS. 50A–B illustrate one implementation of the digital bandpass filter 704; and FIGS. 49A–B illustrate one implementation of the digital transversal filter 705, signal re-combining adder means 706, 708, and the remaining circuits of the control means 709. In all figures, like components of FIGS. 17 and 18 are indicated by similar numerals.

Thus, in FIG. 48A the 10.7 MHz PALE video signal is introduced via the input terminal 700 to the digital comb filter means 701. The output thereof (FIG. 48C) comprises the separated chrominance and 1H delayed wideband signals on terninals 703*a* and 702 respectively. The inputs at terminal 719, 725 comprise a group A and B control signals and a symmetrical PALE clock, generated in the respective portion of control means 709 of FIG. 49B further described below. The terminals 719, 725 are coupled to a four-phase clock generator 720 of control means 709 depicted in FIG. 48A. The clock generator 720 forms part of the timing circuits for clocking the shift registers which comprise the 1H digital delay lines 710, 711. The delay lines 710, 711, adder means 712, 713 and terminals 702,703*a*, are interconnected via integral latching circuits 712*a*, 713*a* and 721 which conventionally temporarily store the respective digital products of the preceding shift registers, adders, etc. Terminal 703*a* provides the input to the succeeding digital bandpass filter means 704 of FIGS. 50A–B, and the terminal 702 provides the input to the adder means 706 of succeeding FIG. 49B.

The delay line 710, 711 further each include a series of two-phase shift registers 750, 751 respectively, employing two-phase clocks, wherein the register stages are further arranged into groups 750A, 750B of delay line 710, and 751A, 751B of delay line 711. Shift register stage selectors 752A, 752B select portions of the digital word corresponding to specific clock phases of groups A, B of delay line 710, and shift register stage selectors 753A, 753B do the same for delay line 711. Wideband signal selectors 754, 755 of delay line 710, 711 respectively, then provide selection of the digital words corresponding to the 1H and 2H delayed wideband signals, respectively.

The wideband video signal word is split, and is clocked into four bits stages of the shift registers 750A, 750B by the four-phase clocks, which are in effect, four phases of the symmetrical PALE clock. The stage selector 752A receives and loads the pairs of four bits in response to PALE clock, alternately from different pairs of stages of shift register 750A. Stage selector 752B does the same with shift register 750B stages. The group A stage selectors 752A unload into one (four bit) wideband signal selector 754, while the group B stage selectors 752B unload into the other (four bit) selector 754, in response to timed PALE clocks respectively. At selected times, the group B selectors are clocked whereby the combined group A and B registers provide a total of 680 bits per television line. On NTSC horizontal television line sampled at three times subcarrier rate will contain 682½ samples. However, as will be described in more detail hereinbelow, the clocks for the shift registers are generated and applied to the registers so that the total bits per television line output by the registers for each bit line is equal to an integral number of samples. In the embodiments described herein, 680 samples per television line are clocked through the registers. The clocking of the registers is arranged so that the discarded interval of 2½ sample intervals occurs outside the active video information portion of the television line during the horizontal blanking interval.

The control circuits 720 of FIG. 48A, which provide the four-phase clocks for the shift registers 750A, 750B and 751A, 751B, and which receive a symmetrical PALE clock, are further described in operation in the block diagram and clock waveforms of the combined control means 709 in FIGS. 49C–D infra, with one implementation thereof illustrated in the schematic diagrams of FIGS. 48A, 49A–B.

FIGS. 50A–B depict the bandpass filter means 704 with terminal 703*a* providing the incoming extracted chrominance signal from the comb filter 701 output, FIG. 48B. The combed chrominance signal from the bandpass filter means 704 is provided at terminal 703*b* of FIG. 50B, which forms the input to the transversal filter with odd symmetry 705 of succeeding FIGS. 49A–B. Immediately preceding the terminal 703*b* is an adder/latch stage 756, wherein the latches are clocked by a chroma invert enable signal via a terminal 757. In the embodiment employing the transversal filter 705 (FIGS. 17, 18, 49), the chroma invert enable signal does not enable the clear input of the latches, and the signal into the adder/latch stage 756 appears at the terminal 703*b*. The PALE clock of terminal 725 couples to various inverters (FIG. 50B) to provide a plurality of clocks for the adders and latches that comprise the bandpass filter means 704. The latches are thus clocked by the PALE clock to deliver the digital output from the preceding logic processor component (viz, the adders) to the succeeding logical processor components (also adders).

The final adder/latch stage 756 of the bandpass filter means 704 delivers the combined chrominance signal.

One-horizontal-line delay lines are required to provide the comb filtering process of chrominance signal separation from a wideband signal. The delay lines, and thus the comb filter 701, must be in synchronism with the overall system timing, which inter alia is represented by the input termed PALE flag. As discussed herein with reference to the video signal system of FIG. 9A and the reference logic circuit 125B of FIG. 11A in particular, the PALE flag signal is asymmetrical, i.e., has one phase for a longer time period while the alternate phase has a shorter time period, and the phase of the PALE clock changes coherently with the asymmetrical PALE flag. However, the PALE clock utilized by the instant chrominance separating and processing circuit utilizes a symmetrical PALE clock, i.e., one in which clock has alternate phases for the same time duration.

A paramount problem when attempting to reconstitute the composite color television signal from a single stored color field of frame, stems from the fact that each line of a field is of a duration equal to 227½ cycles of subcarrier $f_{SC}$. That is, it is equal to an integral number of cycles plus one-half cycle of subcarrier time. It follows that a required condition of 1H delay lines, when they are formed of digital shift registers such as, for example, those in the comb filter means 701, is that there is an integral number of samples per line of television and thus one horizontal line of delay.

Accordingly, the present invention provides the control means 709 which inter alia generates the symmetrical PALE clock from the overall apparatus asymmetrical PALE flag, and which, during the horizontal blanking period deletes an integral number plus one-half of subcarrier cycles, to shift by 180° with respect to previous samples at the line rate. The PALE clock thus is in the proper phase relationship with the subcarrier frequency as required to reconstitute the four fields required to color encode the television signal, while also being in proper timing relationship with the overall apparatus.

Accordingly, FIG. 49C depicts in block diagram form the digital control means 709 shown in one schematic implementation in FIGS. 48A–B and 49A–B. FIG. 49D is a timing diagram of the waveforms generated at various points along the circuit of FIG. 49C, as well as FIGS. 48A–B and 49A–B. Inputs from the overall system include the asymmetrical PALE flag, a six times phase continuous subcarrier frequency ($6f_{SC}$), a one-half times phase continuous subcarrier frequency ($\frac{1}{2}f_{SC}$) and a field index pulse, on respective terminals 758, 759, 760 and 761. The signals are introduced to a PALE clock generator generally indicated at 762, which in turn is coupled to the four-phase clock generator 720 of that portion of control means 709 in FIG. 48A. The latter provide the four-phase clocking of the shift registers 750A–B and 751A–B, as further described below.

The PALE clock generator 762 receives the PALE flag via terminal 758, and feeds it to an exclusive OR 763. The latter is coupled to a D-type flip-flop 764, together with the $\frac{1}{2}f_{SC}$ clock from terminal 760. The exclusive OR 763 and flip-flop 764 define a gated phase detector. A D-type flip-flop 765 is coupled to flip-flop 764 and is clocked by a correction pulse 766 corresponding to the group A control signal (719), further described infra. A JK-type flip-flop 767 is coupled at pin K thereof to flip-flop 765, and is clocked by the 6 $f_{SC}$ clock from terminal 769. The flip-flop 767 is coupled to an AND gate 768 and back to the clear pin of the flip-flop 765. The flip-flops 765, 767 and the AND gate 768 together define a gated phase corrector. AND gate 768 also received the 6 $f_{SC}$ clock, and is coupled in turn to a divide-by-two (÷2) JK-type flip-flop 769 and to a divide-by-1365 (÷1365) counter 770. The ÷1365 counter 770 receives the field index pulse from terminal 761, and is coupled to the ÷2 flip-flop 769 via a reset pulse generator means 771. As shown in FIG. 49B, the field index pulse first is reclocked to inverted 2 $f_{SC}$ via a flip-flop stage. The counter 770 is also coupled to a count decoder 772 which generates the group A and B control signals on terminal 719. The group A control signal defines the correction pulse 766 which clocks the flip-flop 765. The output of the ÷2 flip-flop 769 comprises the symmetrical PALE clock which is fed back to the second input of the exclusive OR 763 to define a closed loop in the PALE clock generator 762. The PALE clock is also fed via terminal 725 to the front-phase clock generator 720 of FIGS. 48A–B and 49C, which as shown, only generates group A four-phase clocks.

In operation, referring to FIGS. 49C and 49D, when the chrominance separating and processing system is turned on, the counter 770 is not properly set and accordingly is reset via the reclocked field index pulse. The latter is a 30 Hz pulse which occurs on a selected field wherein sync pulses coincide with vertical interval. After reset, the PALE clock generator starts generating an initial PALE clock which resembles true PALE clock. However, the PALE clock must be in phase with the apparatus PALE flag, during the active part of a television line. That is, when PALE flag is up, the rising edge of $\frac{1}{2}f_{SC}$ is supposed to coincide with a rising edge of PALE clock, and vice versa. To this end, the (initial) PALE clock, which may resemble the waveform of either FIG. 49D-17 or 18 when the circuit is turned on, is fed back to the exclusive OR 763 together with the PALE flag. When PALE flag is high, the excusive OR output is low when PALE clock is low. When PALE flag is low, the exclusive OR output is low when PALE clock is high. Thus the PALE clock is de-PALEd to provide 3 $f_{SC}$ which is fed to the flip-flop 764 together with $\frac{1}{2}f_{SC}$. The flip-flop 764 compares the de-PALEd signal and the $\frac{1}{2}f_{SC}$ signal (waveforms 49D-16, 17 and 18). If flip-flop 764 takes the data the PALE clock is not in phase with the PALE flag, and vice versa. Thus the exclusive OR and the flip-flop 764 provide the gated phase detection.

If the PALE clock is not in proper phase, the gated phase corrector formed of flip-flops 765, 767 and AND gate 768, deletes one cycle of the 6 $f_{SC}$ clock to shift the phase by 180° and bring PALE clock into the proper phase relative to PALE flag. The correction pulse 766 delays the time that the detection and correction is made, i.e., during the active part of the television line where it is known that the phase is the same. Because PALEing of the sampling clock used in the video signal system does not occur during the horizontal blanking interval as described hereinbefore with reference to FIGS. 9 and 11, detection of the proper phase of the symmetrical PALE clock cannot occur during the horizontal interval. However, once the proper symmetrical PALE clock phase is detected, the PALE clock phase thereafter changes during the horizontal blanking interval.

The counter 770 counts down 1365 counts of 6 $f_{SC}$ (FIG. 49D-1) corresponding to one television line, and delivers a carryout (FIG. 49D-3) to the reset pulse generator 771 on a rising edge of 2 $f_{SC}$ (FIG. 49D-2). The latter includes a series of D-type flip-flops which provide six counts after carryout goes low, and thus the succession of highs depicted in FIG. 49D-4 through 8. The inverse output signals corresponding to the waveforms of FIG. 49D-6, 8 provide the start and end of a low state of the ÷2 JK-type flip-flop 769 (FIG. 49D-9), which in turn generates the symmetrical PALE clock at 3 $f_{SC}$ (FIG. 49D-10) which appears at terminal 725.

As may be seen by comparing FIG. 49D-10, 11, the phase of the PALE clock is shifted by 180° by deleting 2½ cycles of the phase continuous 3 $f_{SC}$ signal. To this end, after the input to the ÷2 flip-flop 769 goes low, the rising edge of the PALE clock corresponding to the next rising edge of 6 $f_{SC}$ stays low, as do the two following rising edges of PALE clock. On the following rising edge of 6 $f_{SC}$ after the input to flip-flop 769 goes high, the PALE clock goes high, but with 180° phase shift relative to its phase during the prior line (FIG. 49D-11), thus the requirement of deleting the ½ cycle of subcarrier each television line is accomplished.

The count decoder 772 is coupled to the counter 770 and generates the group A and B control signals after a selected count, the signals being introduced via terminal 719 to the four-phase clock generator 720. The group A control signal is also fed to the gated phase corrector as pulse 766 as previously mentioned.

The four-phase clock generator 720 provides for selected timing control of the comb filter shift registers 750A–B and 751A–B, whereby the outputs thereof fulfill the requirement of generating an integral number of samples per television line, e.g., 680, utilizing the symmetrical PALE 3 $f_{SC}$ sample clock. This circumvents a further problem caused by the integral number of subcarrier cycles plus one-half cycle per line, wherein the one-half cycle prevents proper sampling from line-to-line and must be deleted, or otherwise compensated for. To this end, the four-phase clock generator 720 includes a divide-by-four (÷4) binary counter 773 coupled to the PALE clock via terminal 725, and thence to a one-out-of-four binary decoder 774, and to the shift register stage selector 752A (and selector 753A) of previous mention in FIGS. 48A–B. The binary decoder 774 data input is connected to a high, wherein the selected output equals a low, and the unselected outputs equal highs. The shift register stage selectors 752A and 752B are coupled to the wideband selector 754 (FIG. 48A) which selects digital words from shift register group A or B in response to the group A and B control signals from the count decoder 772. Binary decoder 774 is coupled to a latch 775 and thence to four D-type flip-flops **776*a–d*. The latch 775, whose output follows its input, is coupled to PALE clock and flip-flops 776*a–d* are also coupled thereto via an inverter 777. The four phase clocks are generated on outputs ∅1, ∅2, ∅3 and ∅4 of the flip-flops 776*a–d* via inverter stages, and are shown in FIG. 49D-12 through 15. the clocks ∅1, ∅2, ∅3 and ∅4 are introduced to the shift registers 750A (and 750B) of comb filter 710, as well as to shift registers 751A (and 751B) of comb filter 711 (FIGS. 48A–B). The video input signal is introduced to the shift registers at terminal 700**.

In operation, the overlapping four-phase clocks ∅1–∅4 (of the order of 150 nanoseconds) are applied to the multi-stage, two-phase shift registers 750A (750B) to clock successive four bit pairs into alternate stages to provide the clocking rate required, which rate the shift registers could not handle without employing the four-phase clocking into alternate stages. Note that the four-phase clocks are disabled, FIG. 49D-12–15, during the 2½ cycles of PALE clock. FIG. 49D-10, to provide the exact 1H delay. In addition, since shift registers having a capacity of 512 bits are readily available, they are employed to provide the 680 bits corresponding to one-horizontal-line delay.

Although only the group A shift registers 750A and timing controls therefor, of only the 1H delay line 710, are shown in FIG. 49C, it is understood that the PALE clock (725) and group B control signal (719) also are introduced to the group B shift registers of comb filter 710 (FIG. 48A). Furthermore, the comb filter 711 (FIG.

48B) is identical to comb filter 710 and similarly employs the PALE clock and group A and B control signals.

FIGS. 49A–B depict one digital implementation of the control means 709 of FIG. 49C, and also of the transversal filter with odd symmetry 705 of FIG. 18, the latter including terminals 703*b l and 702 for receiving the combed chrominance and* 1H delayed wideband signals, respectively.

The various components 714–718 of the filter 705 are shown in schematic, and define means for rotating the phase of the chrominance signal +90°, whereupon inverter means 718 inverts the signal 180° in response to the control input 707. A −90° rotation may be generated by corresponding sign changes, i.e., by clocking the latches of adders 715*a*, 715*b*, with inputs that are opposite in sign to those shown in FIG. 18. Inverter means 718 is defined herein as a plurality of exclusive ORs which essentially perform the 180° inversion.

The bandpass filter inherently has a gain of 27/32, hence the gain of the wideband signal must match this gain. Therefore, in FIGS. 49A–B, the 1H delayed wideband signal is coupled to a 27/32 multiplier PROM 722 which multiplies the wideband signal by 27/32, to provide an overall gain of unity. The wideband signal is then fed through an (eight stage) delay 723, which equalizes the delays in the wideband channel with the delays in the chrominance channel caused by the bandpass filter means 704, and thence to the adder means 706. Various latches 724 are provided between the adder means 706 and 708, which provide a temporary store of the intermediate signal while clocking the luminance signal from adder means 706. The composite color television signal is provided on output terminal 728 via the adder means 708 of FIG. 49B, by combining alternate repetitive reproductions of the stored video signal.

The block diagram of the PALE clock generator 762 of FIG. 49C is shown in schematic in FIGS. 49A–B while the four-phase clock generator 720 of FIG. 49C is shown in schematic in FIGS. 48A–B. Since the operation of the generators 762 and 720 were described in FIG. 49C, no further explanation is required in the schematic diagrams of FIGS. 49A–B, wherein like components are identified by similar numerals.

However, in addition, FIG. 49A includes a terminal 778 for receiving a chroma switch and a frame switch input, which are provided by the computer control system 92 via the blanking insertion and bit muting circuitry 127 and the reference clock generator 94, respectively. The frame switch input is a chrominance inversion enable signal which determines the color frame which is to be inverted and that which is not. Thus the frame switch input generates the control input 707 to the transversal filter 705 in the form of the chroma invert enable signal, as further described below, which is the same chroma invert enable signal which is fed to the adder/latch stage 756 (FIG. 50B) on the terminal 757 of FIGS. 49B and 50A. As previously described in FIG. 18, the chroma invert enable is high during one color frame to pass the input unchanged through the exclusive ORs 718. In the alternate frame, the invert enable is low to change the sign and form the 2's complement to thus invert the chrominance. The chroma switch input of terminal 778 couples to the frame switch input via AND gate 779 and prevents the frame switch signal from enabling inversions when the apparatus is not receiving signals from the (disc/tape) storage, e.g., when the apparatus is in electronics-to-electronics mode and chrominance inversion is not desired.

Referring still to FIG. 49A–B, the PALE clock generator also provides the PALE clock on lines 781, 782 via the inverse pin of the ÷2 JK flip-flop 769 and inverters 780. The PALE clock is used conventionally to clock the various latches associated with the adder means 715*a*, *b*, the multiplier PROMs 716*a*, *b*, the one-sample delay lines 714*a*, *b*, *c* and the delay 723.

Referring now to FIG. 19, there is shown an alternative embodiment of the chrominance separating and processing system, wherein like components are similarly numbered as in FIG. 17. The transversal filter 705 of FIGS. 17, 18, 49 is replaced by digital inverting means 705*a*, which is selectively enabled via a control input 707*a* thereto. In one frame the inverting means passes the incoming signal from the bandpass filter means 704 without changing it, whereas in the alternate frame the control input 707*a* provides an invert enable signal to the inverting means to shift the bits of the incoming digital word by 180° prior to introducing them to the adder means 708. The luminance signal derived from adder means 706 is delivered to the adder means 708, which latter means generates the composite color television signal on terminal 728, as previously described.

FIG. 20 depicts a modification of the alternative embodiment of FIG. 19, wherein adder means 706 is deleted and the inverting means 705*a* is replaced by inverting means 705*b*. Like components in the block of FIG. 20 are also similarly numbered. The inverting means 705*b* constitutes a digital multiply-by-two (×2) stage 756*a* coupled to the bandpass filter 704, and thence to a negative input of an adder means 708*a* adapted to perform a subtraction process. As shown in FIGS. 49E-F, the ×2 stage 756*a* is actually disposed at the output of the bandpass filter means 704, and corresponds to the adder/latch stage 756 of FIG. 50B. The 1H delayed wideband signal on terminal 702 is introduced to the positive input of the adder means 708*a*.

In operation, the ×2 stage 756*a* is controlled via the control input 707*b*, i.e, the chroma invert enable signal, whereby in one frame the stage provides a zero output such that the adder means 708*a* reconstitutes the composite color television signal from only the 1H delayed wideband signal. On alternate frames the chroma invert enable (707*b*) disables the ×2 stage 756*a* to allow passage of the digital signal to the negative input of the adder means 708*a*, together with the wideband signal from the comb filter means 701. The multiply-by-two process is actually performed by shifting the lines one bit, whereby subtraction of the doubled chrominance signal from the wideband signal via the adder means 708*a* sums the alternate repetitive reproductions to define the composite color television signal on terminal 728.

It may be seen that the system of FIG. 20 is simplified in that the adder means 706 is deleted. In any event, the systems of FIGS. 19 and 20 provide a lesser degree of conditioning of the chrominance signal on repetitive playbacks than does the system of FIGS. 17,18,49. Thus the systems of FIGS. 19,20 provide full saturation of the chrominance in the non-inverted frame, with of the order of ½ saturation in the inverted frame. However, the stability improvement provided by the all-digital processing, including the inversion process, correspondingly visually improves the color edges.

FIGS. 49E-F depict in schematic the inversion means and control means therefor, for the digital chrominance separating and processing system shown in FIG. 20. To this end, the 1H delayed wideband signal is introduced from the comb filter means 701 (FIG. 48B) via terminal 702, and the bandpass filter means 704 output of the combed chrominance signal is introduced via the adder/latch stage 756a (which herein froms part of the inverting means) from the terminal 703b of FIG. 50B. To simplify the specification, the portion of the inverting means 705b corresponding to the adder/latch stage 756 of FIG. 50B, is depicted in FIG. 49E hereof, by the dashed block 756a inserted after the terminal 703b. The control input 707b, corresponds to the chroma invert enable signal of terminal 757 as previously described. Thus the latter enable signal enables the clear input of the latches of stage 756a on the non-inverting frame, to prevent passage therethrough of the signal and provide in effect the zero input from the bandpass filter to the adder means 708a. On the inverting frame, the chroma invert enable signal disables the clear input of the latches of stage 756a to pass the chrominance signal. The multiply-by-two process is conducted by shifting the wire connections to provide a bit shift of the digital word to double the chrominance signal.

The 1H delayed wideband signal is introduced to a delay 723a (FIG. 49E) similar to delay 723 of FIG. 49A, which equalizes the delays in the wideband signal with those of the chrominance signal introduced via the bandpass filter means 704. The wideband signal is then introduced to a 27/32 multiplier, 722a (FIGS. 49E-F), which performs a gain adjusting function. The wideband signal from the 27/32 multiplier 722a is introduced to the adder means 708a, along with the output from the adder/latch stage 756a. The composite video signal is provided on terminal 728 via the subtraction process conducted on alternate frames, i.e., on alternate repetitive reproductions, by adder means 208a.

As in the circuit of FIGS. 49A-B, FIGS. 49E-F include the control means 709 having the inputs 758, 759, 760 and 761, the PALE clock generator 762, and the count decoder 772, as well as the group A, B control signals on terminal 719, and the PALE clock on terminal 725. As previously mentioned, the chroma invert enable on terminal 757 is introduced to the adder/latch stage 756a. The PALE clock provided by the JK flip-flop 769 via inverters 780, is introduced via lines 781, 782 to the various latches associated with the delay 732a, the 27/32 multiplier 722a, and adder means 708a, to clock the digital signals from the preceeding logical processor component to the succeeding logical processor component, as well known in the art. The various logical elements of FIGS. 49E-F are thus essentially similar to those of FIGS. 49A-B.

FIG. 21 illustrates in block diagram a digital chrominance separating and processing system which generally functions as those previously described, but which reconstitutes the composite color television signal by repetitive reproductions of a single stored color field. As in the previous figures, like components are similarly numbered. Thus the chrominance signal is separated from the color field wideband signal via comb filter means 701, and is introduced to bandpass filter means 704 via terminal 703a. The 1H delayed wideband signal is introduced to the adder means 706 via terminal 702. The combed chrominance signal is introduced via terminal 703b to an inverting means 705c, and more particularly to: a transversal filter with odd symmetry 705 similar to that of FIGS. 17,18,49; a third input to an electronic switch means 737; and a first input to a second electronic switch means 738. The number of the inputs of the switches corresponds to the playback number of the single field used to reconstitute the four fields of the composite color television signal. Accordingly, the output from the transversal filter 705 is coupled to a second input to the switch means 737, and to a fourth input to the switch means 738. The output from switch means 737 is coupled to an inverting means similar to 705b of FIGS. 20,49E-F (or inverting means 705a of FIG. 19), which in turn is coupled to second and third inputs of switch means 738. The output of the latter is coupled to one input of the adder means 708, and the output of adder means 706 is coupled to the other input of adder means 708. Control means 709 provides switching signals via control input 707c to step the switch means 737 and 738 through the inputs thereof at the field rate, to enable the transversal filter 705 and inverting means 705b, and to control the filter means 701, 704, adder means 706, 708, etc., as described above.

As is well known, a 90° phase rotation is required between fields since there is an integer number plus three-fourths cycles of subcarrier in a field. Thus the inverting means 705c provides shifting of the single stored field by 90° on each of four successive plays thereof, to reconstitute the four fields of the composite color television signal. To this end, on first playback of the stored field, the switch means 738 is stepped to the first input thereof, to deliver the combed chrominance signal from the bandpass filter means 704 directly to adder means 708 through switch means 738, together with the incoming luminance signal from adder means 706. The first field at 0° phase shift is thus delivered to terminal 728.

On the second playback of the stored field, switch means 737, 738 are stepped to the second inputs thereof, and the chrominance signal is delivered to the adder means 708 via the transversal filter 705, switch 737, the inverting means 705b and the second input of switch means 738. The transversal filter 705 provides a phase shift, for example, of +90° and the inverting means 705b a phase shift of 180°, to rotate the frequency components of the chrominance signal through +270°.

On the third playback of the field, switch means 737, 738 are stepped to the third inputs thereof, whereby the chrominance signal is delivered to the adder means 708 via switch means 737, the inverting means 705b and the third input of switch means 738. The chrominance signal is thus rotated +180°.

On the fourth playback, the switch means 738 is stepped to the fourth input, whereby the chrominance signal is delivered to adder means 708 via the transversal filter 705 only, to provide a +90° rotation of the chrominance signal. The four fields are combined on successive playbacks via adder means 708 to generate the composite color televison signal on terminal 728.

The sign of the phase shifting may be changed, and the circuit connections and clocks thereto adapted correspondingly, whereby on the second playback of the field the transversal filter 705 rotates the chrominance −90° and is then coupled to the adder means 708. On the third playback the inverting means 705b rotates the chrominance −180°, and on the fourth playback the transversal filter 705 provides −90° rotation, and is coupled to the inverting means 705b which provides −180° rotation, wherein the combination shifts the chrominance −270°, thus providing the 90° phase shift between playbacks.

The control means 709 provides the PALE clock, the four-phase clocks, the chroma invert enable signal, etc., to the various components of the inverting means 705c, the filter means 701, 704 and to the adder means 706, 708, as described and shown in the embodiments of the previous figures.

As well known, when a composite color television signal is reconstituted from a single field, the horizontal sync pulses are not aligned on successive playbacks without the addition of one-half horizontal line delay on alternate fields. Although the chrominance processor of FIG. 21 is not directly concerned with this problem and will deliver the desired succession of fields, the use thereof would require adjunct means for detecting the vertical interval and for inserting the one-half line delay in response thereto as required, and as conventionally known in the art.

Although a 3 $f_{SC}$ sampling rate is employed in the description above, other sampling rates may be used. For example, 4 $f_{SC}$, 16/5 $f_{SC}$, etc., may be employed. A sampling rate which provides an integral number of samples per television line is advantageous since PALE clock is not required; i.e., the PALE clock generator 762 may be omitted. Thus, the PALE clock per se is not necessary to provide the chrominance separating and processing functions herein. In addition, components such as the 27/32 multiplier and multiplier PROMs may be deleted from the systems, in the event a bandpass filter of unity gain is employed.

BLANKING INSERTION AND BIT MOVING CIRCUITRY

The functions carried out by the blanking insertion and bit muting circuitry are primarily those of inserting a black level during the blanking period as well as inserting a grey level during the time in which one picture or still image has been played and another has been addressed for playback. The disc drive head movement may take from one to four fields of time duration in which to change from one still to another, the time increasing the greater the radial movement. Thus, if a track on the outside of a disc pack was being played and the next still that was addressed happened to be on an inside track of the same disc pack, then almost four full fields of time would be required for the heads to move to the new position. Since it is aesthetically pleasing not to have a black picture during this time period, a grey level is inserted. The circuitry also is adapted to perform bit muting operations which essentially enables one or more of the bits defining samples of a field to be set to the logical zero state for the purpose of performing special effects during playback. The circuitry shown in block 127 of FIG. 9A also generates a PALEd 3SC clock signal from a PALE flag signal for use by the digital-to-analog converter circuitry 103 and it also generates a continuous subcarrier sine wave signal that can be phase adjusted from the continuous phase 6SC and ½SC square wave signals that are applied to the circuitry by the reference clock generator circuitry 98. Moreover, the circuitry is also adapted to adjust the ½ cycle of 3SC that is present during the second playback of a frame that was detected in the reference clock generator circuitry 98 as previously discussed. The chroma inversion enable signal that enables the chroma separator and processing circuitry 101 to invert the phase of chrominance of alternate frames of the receive television signal during playback operations is also generated by the circuitry 127 and is output over line 874.

The operation of the blanking insertion and bit muting circuitry 127 will now be described in connection with a block diagram shown in FIG. 22. The frame delay signal from the reference clock generator is input on line 857 to one input of an exclusive OR gate 872, the other input of which is supplied by line 878 carrying the PALE flag signal received from the reference logic circuitry 125B. The output of the gate 872 appears on line 878' extending to steering logic 876. The frame delay signal serves to invert the PALE flag signal at a frame rate, thereby superimposing a frame-to-frame ½ 6SC clock period offset onto the PALE clock, which effects the repositioning of the final output video.

In order to insure reliable strobing of the video data within the digital-to-analog converter 102 by the PALE digital-to-analog converter clock that is modified by the frame delay switch signal through the EXCL OR GATE 872, the video data itself is selectively delayed by a ½ clock period, so that strobing of the data does not occur during a transition between bits. This is accomplished by the upper portion of the circuitry shown in FIG. 22 as follows. The video data from the chroma processing circuitry 101 is applied on lines 850 which extends to an 8 bit latch 851, the output of which appears on lines 852 which extend to another latch 853 as well as to a 4 to 1 by 8 bit data multiplexer 854. The latches 851 and 853 are clocked by the continuous phase 6SC clock on line 855 and the output of the 8 bit latch 853 is also applied to the multiplexer 854 on lines 856. Each of the latches effectively clocks the data from lines 850 through with a ½ cycle of 3SC delay, so that the data appearing on line 852 is delayed ½ cycle of 3SC, whereas the data on line 856 has a full cycle of 3SC delay, by virtue of having been clocked through the two latches. While the same data is applied to the multiplexer 854 by lines 852 and 856, the data on line 856 is ½ cycle of 3SC delayed relative to the data on line 852.

The frame delay signal from the reference clock generator circuitry 98 on line 857 also extends to address control logic, indicated generally at 858, which controls the multiplexer 854 through lines 859. During alternate frames, the frame delay signal commands the address control logic to alternately pass the data from lines 852 and 856 to correct for the ½ cycle of 3SC offset that is present on the second playing of the first field as previously described.

When the black mute, or grey mute commands provided by the computer control system 92 via the signal system interface 119 are applied on lines 860 and 861, respectively, they are strobed into a latch 862 by the V drive (strobe 1) generated by the reference input circuit 93A and provided on line 862'. The latch 862 controls address control logic 858 in accordance with its stored command to cause the logic to provide the appropriate levels on lines 859 to insert the black or grey level digital information on lines 863 and 864, respectively, so that the black level or grey level data inserted in the video data stream appears on output lines 865. The black and grey levels are produced by setting switches 866 and 867 with the appropriate 8 bit word digitally defining the black or grey levels. When selective bits are to be muted, bit mute control lines 868 are applied to the multiplexer via line 869, assuming that gates 870 are enabled by a bit mute enable signal on line 871 that originates at the address control logic 858. Bit muting is inhibited during the blanking interval so as not to change the setup level of the video. The inhibiting is accomplished by the H and V gated blanking signal provided to the address control logic 858 by the D/A converter and sync insertion circuitry 102 over line 858'.

With respect to the generation of the PALE SC signal, the continuous phase ½ SC and 6SC inputs appear on lines 873 and 855, respectively, with the ½SC signal being applied to a pulse former 875 that forms ½ SC pulses that extend to steering logic 876 via line 877. A PALE flag signal appearing on line 878 steers the ½ SC pulses to either the set (879) or reset (880) inputs of 881, and a divide by two divider that is clocked by the 6 SC signal on line 855. The output is a 3SC signal on line 882 that is changed in its phase by the ½ SC pulses appropriately steered by steering logic 876 in accordance with the level of the PALE flag signal on line 878.

The 6SC and ½ SC signals are also applied to a coarse burst phase circuit 884, the output of which appears on line 885 into a 6 bit shift register 886 that is clocked by 6SC and has 6 lines to permit the picking up of every 60° of burst phase that extends through a line 887 into a voltage variable capacitor network 888 which permits fine burst phase adjusting with control 889. The outlet is a SC suare wave signal on line 890 that is applied to a limiter and filter 891 to produce a continuous sine wave SC signal on output line 892 for use in generating the burst for the composite analog television signal.

Figure 22:
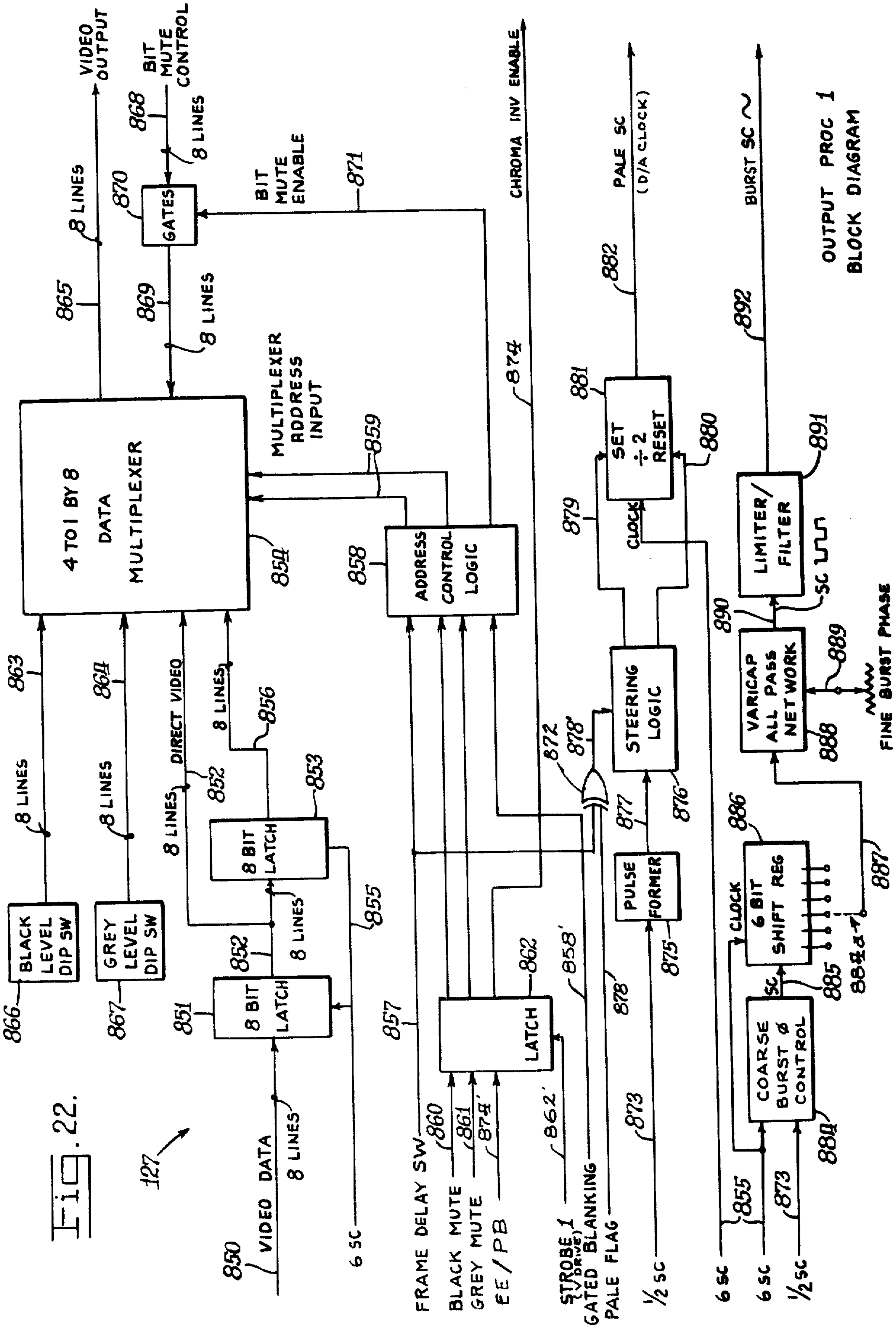
FIG. 22 is a functional block diagram of the blanking insertion and bit muting circuitry which is a portion of the signal system shown in FIG. 9A.

Specific circuitry that can be used to carry out the operation of the block diagram of FIG. 22 is illustrated by the detailed electrical schematic diagrams of FIGS. 51A and 51B. Since the operation of the circuitry shown in FIGS. 51A and 51B operates substantially as does the circuitry exemplified in the block diagram of FIG. 22, it will not be explained in detail.

However, with respect to the address control logic 858, it provides appropriate commands on lines 859, 871 and 874 to operate the blanking insertion and bit muting circuitry 127 to pass data to the following D/A converter and sync insertion circuitry 102 in accordance with the control inputs at lines 860, 861, 862' and 874'. The EE/PB signal provided by the encoder switch 126 over line 874 from control signals provided by the computer control system 92 is strobed into the latch 862 by the V drive signal on line 862'. When playback operations are performed, the latch 862 places the chroma invert enable command on line 874 which extends to enable two circuits. One of the circuits is the chroma separator and processing circuitry 101 as previously mentioned. The other is a NAND gate 857*a* in the frame delay switch line 857. The NAND gate 857*a* is enabled by the command to pass the frame delay switch to the address control logic 858 for use as previously described. During E to E operations, the chrominance of the video signal is not inverted and the previously mentioned frame to frame 46 nanosecond jitter does not occur in the video signal processed by the playback system 91 because a continuous four field color encoded television signal is provided to the electronics of the playback system 91. The EE/PB signal latched into latch 874' disables the NAND gate 857*a* and removes the chroma inversion enable signal status from line 874.

The address control logic 858 includes NAND gates 883*a*, 883*b* and 883*c* and a multiplexer 858*a* for directing the commands provided by NAND gates 883*a* and 883*b* onto the appropriate multiplexer control lines 859. NAND gate 883*c* inhibits bit muting during blanking for reasons discussed above and is provided with three inputs connected to receive the gated blanking signal over line 858' and the black and grey mute commands from the latch 862. Should any of these three functions become active, associated inputs of 883*c* will go low forcing line 858 high, disabling the bit muting circuitry. Consequently, NAND gate 883*c* provides a bit mute enable signal on line 871 except during blanking intervals and grey and black mute operations.

NAND gates 883*a* and 883*b* have their inputs connected so that during normal playback operations NAND gate 883*b* provides a low level signal output and NAND gate 883*a* provides a high level signal output. The multiplexer 858*a* switches these output signals at the two lines 859 each frame in response to the frame delay switch signal 857 to cause the 4×1 multiplexer 854 to alternately pass the data received from the two latches 852 and 856 as previously described.

When a grey mute command is placed on line 861, latch 862 provides a low disabling signal to one of the inputs of the NAND gate 883*c*, thereby removing the bit mute enable signal from line 871. However, the inverter 861*a* inverts the low level provided by the latch 862, causing the output of the NAND gate 883*a* to be low. The multiplexer 858*a* activates lines 859 to cause the 4×1 multiplexer 854 to couple grey level digital information from lines 864 to the data output lines 865.

Black level mute operations are selected by the switch 860*a* being placed in a condition to couple the black mute command output of the latch 862 to one input of each of the NAND gates 883*a*, *b* and *c*. The black mute command causes all of these gates to issue high level signals. Hence, the bit mute enable signal is removed from line 871. Also, the multiplexer 858*a* activates lines 859 to cause the 4×1 multiplexer 854 to place black level digital information from lines 863 on data output lines 865.

DIGITAL-TO-ANALOG CONVERTER AND BURST AND SYNC INSERTION

The final playback functions that are performed in the signal system shown in the block diagram of FIG. 9A involve the converting of the digitized video signals to an analog signal in a proper manner as well as generating and inserting the color burst and the composite sync signals. The functions that are carried out will be described in connection with the block diagram of FIG. 23 which has the digitized video information on the eight bit lines 900 that extend from the blanking insertion and bit muting circuitry 127 to latches 901 which latch each of the bits on the bit lines to align them so that the digital-to-analog conversion can be made. A 3SC PALE clock generated by the blanking insertion and bit muting circuitry 127 is applied on line 902 which clocks the latches 901 as well as a second latch 903 and a resampling gate 904. The output of the latches 901 containing the digitized video information is clocked through output lines 905 into current switches 906 that have reference current generators connected thereto and the current switches 906 are connected via lines 907 to a resistor ladder network 908 that provides a weighted analog value of each eight bit digital word, thus providing an analog value having 256 possible levels.

The analog output signal from the ladder network appears on line 909 that splits into two paths, an upper path 910 and a lower path 911, the upper path 910 of which represents the normal path during which the video information is passed into a switch 912. The lower path 911 extends to a blanking filter 913 which is switched during the blanking time for the purpose of shaping the blanking pulse so it has the proper transition rate.

If the reshaping filter is not utilized, then the rapid video to blanking transition time can cause ringing in many television receivers. Accordingly, the output of the filter 913 appears on line 914 into the switch 912 which is controlled by line 915 that comes from the latch 903 which is clocked by the 3SC PALE clock on line 902. During operation, the analog signal on line 909 extends through both paths 910 and 911 and the switch 912 is in the upper position passing the video information except during the blanking period when it is switched to the lower position which connects the signal that has been filtered by the blanking filter 913.

The signal from the switch 912 appears on line 916 that is connected to the resampling gate 904 which operates to sample the level of the signal immediately before a level transition at a point where all transients from the previous transition have disappeared. For example, in the eight bit digital word, a change in value may result in up to seven or eight changes between logical states, i.e., from 1 to 0, each of which will produce a transient condition in the switch. The resampling gate 904 provides a sample and hold operation while blocking the transients so that they do not affect the analog information that is present on line 917 that extends to the buffer and low pass filter 918.

The low pass filter is then connected to an amplifier and equalizer 919 via line 920 which performs a sine x/x roll off compensation and the signal is then applied to a black clipper circuit 921 which clips any luminance components of the video signal which appear below black level. The output 922 of the equalizer is also part of a DC restoration loop comprising a switch 923, and a loop amplifier 924 which produces a feedback signal to the low pass filter, with the switch being controlled by a clamp pulse on line 925, effecting DC restoration of the video signal on line 922. The clamp pulse is contained in the blanking and composite sync signals provided on a pair of lines 933 by the reference input circuitry 93B.

The output of the black clipping circuit 921 appears on line 927 that extends to the sync and burst adder 928 where burst is added by line 929 and sync added by line 930 so that a complete composite analog television signal appears on line 931 to output amplifiers 932. The sync signal is generated by a sync shaping circuit 934 that utilizes a sync pulse contained in the blanking and composite sync signals appearing on line 933, with the sync shaper providing the proper 140 nanosecond rise time and proper shaping. The burst is produced by a burst flag signal provided by the reference input circuitry 93B on line 935 that triggers a burst envelope generator 936 having output line 937 extending to a multiplier 938 that modulates the SC sine wave on line 939 that was generated in the bit muting and blanking insertion circuitry 127 previously described. The output on line 929 contains the burst envelope with the 9 to 11 cycles of burst therein which are added to the analog video signal supplied on line 927.

Figure 23:
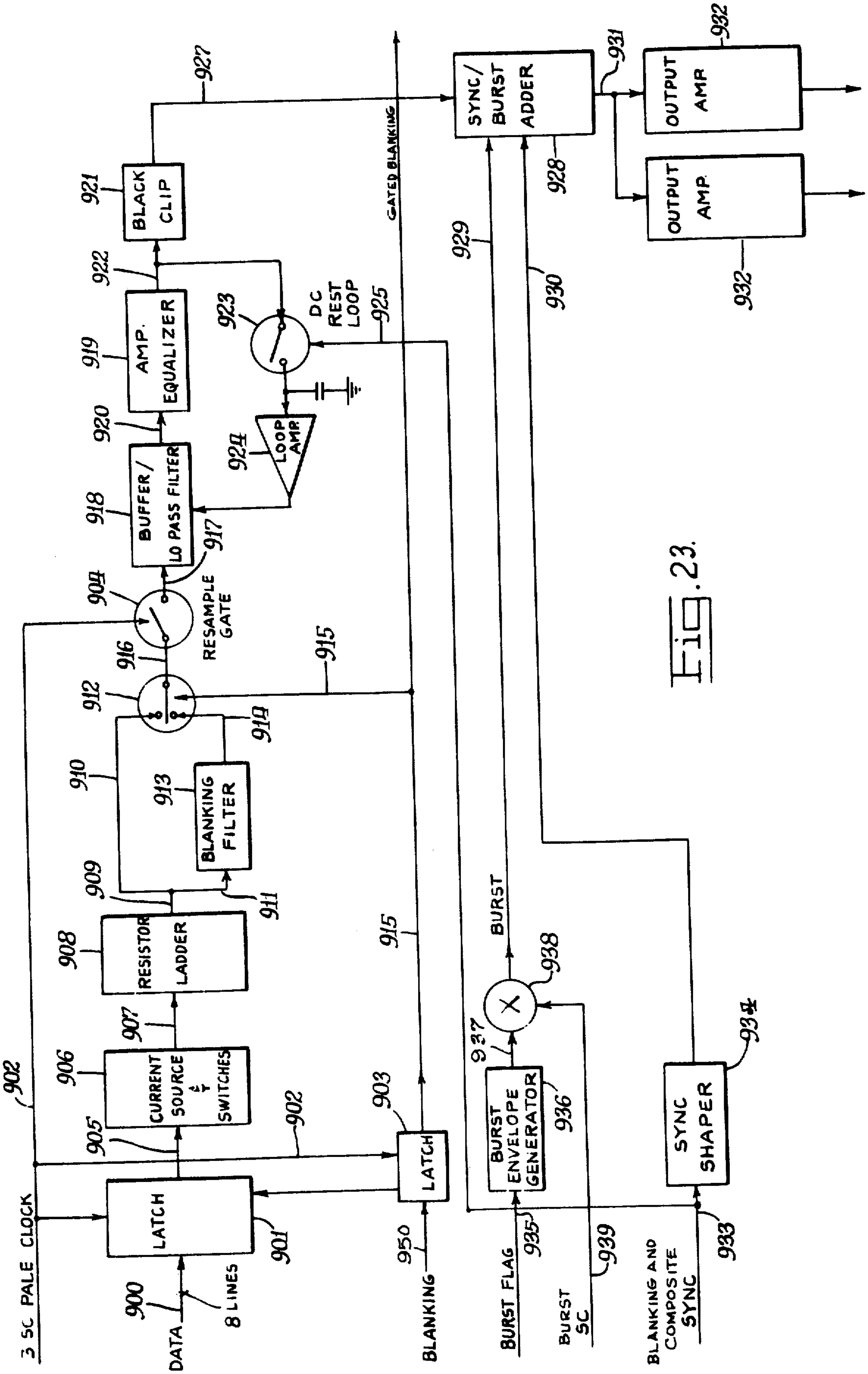
FIG. 23 is a functional block diagram of the digital-to-analog converting and burst and sync insertion circuitry which is a portion of the signal system shown in FIG. 9A.

One embodiment of specific circuitry that can be used to carry out the operation of the block diagram of FIG. 23 is shown in FIGS. 52A through 52D which operates in the manner as described with respect to the block diagram of FIG. 23 and therefore will not be described in detail. However, referring to FIGS. 52A and 52B, a blanking signal is applied on line 950 which extends to the latch 903 and produces an output which extends via lines 915 to a number of switching transistors 953 which together with two transistors 954 and 955, respectively comprise the switch 912 that selects either the signal on the upper path 910 or on the lower path 914 from the filter 913. When blanking occurs, the transistors 953 effectively cut off transistor 954 while placing transistor 955 into conduction and during all other times, the reverse switching occurs.

With respect to the resampling gate 904, a clock appearing on line 902 extends to a number of inverters 957 and 958 which have the effect of providing a small amount of propagation delay to the signal so that the clock signal on line 902 that extends to transistors 961 and 959 are out of step with one another which has the effect of providing a positive transition in the primary side of a transformer 960, the secondary of which is connected to a diode bridge 904 that blocks signal flow during the period of the pulse to prohibit passing of the transients or spikes during switching of the digital-to-analog converter switches 906.

EQUALIZERS AND RECORD AND PLAYBACK AMPLIFIERS

FIG. 24 shows a portion of the data detector and equalizer 99 of the record/playback channel, including a reproduce head 1008 coupled to a preamplifier 1009, the combination of elements 1008 and 1009 being designated as block 1001. The magnetic flux patterns recorded on a disc drive surface are picked-up by the reproduce head 1008 and amplified by the preamplifier 1009. Due to the differentiating action of the reproduce head, which is well known in the magnetic recording art, the output signal of block 1001 at terminal 1006 is a voltage proportional to the time-derivative of the recorded flux. Hence, the transfer function of block 1001 in the conventional symbolic notation of the Laplace transformation is $$G_1 = k_1 s \quad (1)$$

where $G_1$ is a complex transfer function $k_1$ is a gain constant, and s is the complex Laplace variable.

Note: With respect to the above-indicated symbolic notations G; k; s; these will be maintained throughout the specification while only the indexes thereof will be changed, indicating specific circuits to which the notations pertain. In the following equations symbolic notations R,C with indexes attached thereto indicate respective resistance and capacitance values pertaining to corresponding circuit elements indicated by identical notations and indexes in the specification and drawings.

To the output of block 1001 of FIG. 24 an equalization circuit 1000 is coupled, the later circuit being shown in an idealized form suitable for theoretical explanation of the equalization operation which follows. The equalization circuit 1000 has an input terminal 1006, to which the output signal of block 1001 is fed. To the input terminal 1006, inputs of an integrating circuit 1002 and a differentiating circuit 1003 are coupled, respectively. The transfer function of the integrating circuit is $$G_2 = k_2/s \quad (2)$$

and the transfer function of the differentiating circuit is $$G_3 = k_3 s \quad (3)$$

In the differentiating signal path, a variable gain control circuit 1004 is shown which enables to change linearly the high frequency boost effected by the differentiating circuit 1003, as it will be explained later in more detail. The difference of the respective output signals of the integrating and differentiating circuit is taken, as it is schematically shown by a subtraction circuit 1005. The resulting difference signal at output terminal 1007 of the equalization circuit 1000 is the required amplitude and phase-equalized signal with respect to the input signal at terminal 1006. The resulting record/playback channel has an overall flat amplitude response and linear phase response for all transmitted signal frequencies, as will be seen from the more detailed description below.

The overall transfer function of the portion of the record/playback channel shown in FIG. 24 comprising block 1001 and the equalization circuit 1000 coupled thereto is $$G_{overall} = G_1(G_2 - G_3) \quad (4)$$

and after substituting for $G_1$, $G_2$ and $G_3$ from (1), (2) and (3)

$$G_{overall} = k_1 s\,(k_2/s - k_3 s) = k_1 k_2\left(1 - \frac{k_3}{k_2}\,s^2\right) \quad (5)$$

When substituting $s = jw$, the following is obtained $$G_{overall}(jw) = k_1 k_2\left(1 + \frac{k_3}{k_2}\,w^2\right) \quad (6)$$

The overall phase shift introduced by the portion of the record/playback channel shown in FIG. 24 is determined by $$\text{phase of } G(jw) = \arctan\frac{Im\ G(jw)}{Io\ G\ (jw)} \quad (7)$$

Since the expression on the right side of equation (6) is a real number (the imaginary part being zero), the overall phase shift determined by equation (7) is zero. At zero phase shift, the requirement of a linear phase response for all frequencies transmitted through the channel is satisfied.

It is essential for the equalization circuit to provide a difference signal at the output terminal 1007, rather than a sum of the respective output signals of the integrating and differentiating circuit. Each of the latter circuits introduces an equal phase shift of 90° but opposite in sense, lagging in the integrator and leading in the differentiator. Thus, the respective output signals of circuits 1002 and 1003 in FIG. 24 are out of phase by exactly 180° with respect to each-other and a difference signal yields a resulting signal combination, for which the respective signal amplitudes are added together, rather than subtracted from each other. Besides that, a −90° phase shift of the integrator output signal combined with the +90° phase shift of the differentiating action of the reproduce head yields an 0° overall phase shift. On the other hand, the +90° phase shift of the differentiator output signal combined with the +90° phase shift of the differentiating head yields a 180° overall phase shift which is simply an inversion. Whether the resulting overall phase shift of the record/reproduce channel is 0° or 180°, that is, whether the output signal at the terminal 1007 is in phase or inverted with respect to the polarity of the recorded flux, depends on the sense of the 90° phase shift introduced by the equalizer 1000 as it will be described later in more detail.

Besides providing a linear phase response for all the frequencies transmitted through the channel, the equalization circuit also compensates for the non-constant amplitude-frequency response of the reproduce head, as it will be disclosed below. As it is well known in the art, the output voltage of the reproduce head 1008 and preamplifier 1009 combination of FIG. 24 rises at low frequencies at a rate of 6 dB/octave, levels off at mid-band frequencies and falls at high frequencies. Such an amplitude response is shown as an example at $G_R$ in FIG. 27. Consequently, if an overall flat amplitude response of the record/playback channel is to be obtained, it is necessary for the equalizer to boost the amplitude at both low and high frequencies. This required equalizer characteristic is obtained by the circuit of FIG. 24 in a following manner. As an example, FIG. 28 shows a graph representing the gain $G_2$ of the integrating circuit 1002 and the gain $G_3$ of the differentiating circuit 1003 in dB, respectively, as dependent on frequency, the frequency values being plotted on a logarithmical scale. The characteristic $G_2$ falls and the characteristic $G_3$ rises with frequency at a rate of 6 dB/octave. There are also shown diagrams of two other transfer functions $G_3'$ and $G_3''$ of the differentiating circuit, representing linear variation of these functions with variation of the gain control circuit 1004 output signal, as it will be described in more detail later. At $G_E$ a resulting transfer function of the equalization circuit 1000 is shown, obtained by adding the linear magnitudes $G_2$ and $G_3$. It can be seen that the transfer characteristic $G_E$ of the equalization circuit 1000 is complementary to the transfer characteristic $G_R$ of the reproduce head. Consequently, when combining the two characteristics $G_R$ and $G_E$, as it is provided by the circuit shown in FIG. 24, the equalizer characteristic $G_E$ compensates for the departures from flatness of the reproduce head characteristic $G_R$ both at low and high frequencies and an overall flat amplitude characteristic results.

There is an additional advantage provided by the presently described equalization circuit which allows linearly varying the amount of high frequency boost provided by the differentiating circuit. For this purpose a variable gain control circuit is utilized in the differentiating signal path, shown for example at 1004 in FIG. 24. By adjusting the gain of the differentiating signal path by means of circuit 1004, the frequency at which the high frequency boost of the equalizer amplitude response begins may be changed. For this purpose a variable resistor or potentiometer may be utilized or in case an amplifier is employed in the differentiating signal path, the gain of that amplifier may be changed in a well known manner, as it will be described in connection with the embodiment of FIG. 26. The group of curves $G_3$, $G_3'$, $G''_3$ shown in FIG. 28 is obtainable for three different values of gain provided by the differentiator 1003 in FIG. 24 and adjusted by the variable gain control circuit 1004. The gain adjustment affects only the gain constant $k_3$ in the transfer function (3) presented above and therefore, it changes only the corner frequency at which the high frequency boost begins, in accordance with the formula for the corner frequency $$w_c \cong \sqrt{\frac{k_2}{k_3}} \quad (8)$$

As the corner frequency increases, the amount of signal amplitude boost decreases linearly as the curves obtained move from $G_3$ to $G'_3$ to $G''_3$, etc. Increasing the amplitude boost linearly at the high frequency end of the equalizer response is an important feature because it enables to compensate, for example, for changes in the relative head-to-recording medium speed, such as due to the variations in track length of a magnetic disc. When recording digital signals on magnetic disc, this feature allows to compensate for higher density of recorded bits, also called pulse crowding which occurs on the inner tracks of the disc.

Examples of practical implementation of the above-described idealized form of the equalization circuit shown in FIG. 24 are shown in the form of block diagrams in FIGS. 25 and 26. Elements similar to those previously described and shown in FIG. 24 are designated in FIGS. 25 and 26 by the same reference characters as in FIG. 24. With respect to the relatively low signal level at the output of playback amplifier 1009, it is necessary for practical purposes to amplify the signal in both the integrating signal path as well as in the differentiating signal path. Thus, in the diagram of FIG. 25 the integrating circuit of FIG. 24 is implemented by inverting integrating amplifier circuit 1002, comprising an inverting operational amplifier 1010, a negative feedback capacitor $C_1$ and a series input resistor $R_1$. On the other hand, the differentiating circuit of FIG. 2 is implemented by an inverting differentiating amplifier circuit 1003, comprising an inverting operational amplifier 1011, a negative feedback variable resistor $R_2$ and a series input capacitor $C_2$. The variable resistor $R_2$ represents a variable gain control for the differentiating signal path. The transfer function of the integrating amplifier circuit 1002 of FIG. 25 is:

$$G_2 \cong -(1/R_1C_1s) \quad (9)$$

When comparing equation (9) with (2) we obtain $$k_2 = -(1/R_1C_1) \quad (10)$$

The transfer function of the differentiating amplifier circuit 1003 of FIG. 26 is $$G_3 \cong -R_2C_2s \quad (11)$$

When comparing equation (11) with (3) we obtain $$k_3 = -R_2C_2 \quad (12)$$

The subtraction circuit of FIG. 24 is implemented in the circuit of FIG. 25 by a differential amplifier 1005. The output of the inverting integrating circuit 1002 is coupled to an inverting input of the differential amplifier 1005 while the output of the inverting differentiating circuit 1003 is coupled to a non-inverting input of amplifier 1005. The output signal at terminal 1007 is the difference signal which also represents the equalized signal of the recording/reproducing channel. The resulting equalized signal has 0° phase difference with respect to the signal recorded on the magnetic medium, that is, it is in phase therewith. Thus, the phase response of the overall channel becomes linear when the equalization circuit 1000 is utilized.

However, the circuit of FIG. 25 is still considered idealized to the extent that exact implementation of the above transfer functions (9) and (11) would require unlimited gain in the integrating amplifier circuit 1002 at low frequencies and in the differentiating amplifier circuit 1003 at high frequencies. In practical applications both these extremities are avoided, for example, by adding a shunt resistor R″ to $C_1$ and a series resistor R′ to $C_2$ as shown in FIG. 25, to truncate the respective integrating and differentiating approximations at selected frequencies below and above the frequency range of interest. Considering the presence of the respective resistors R′, R″ in the circuit of FIG. 25, the respective transfer functions $G_2$, $G_3$ will be $$G_2 \cong -\frac{k_2}{s + \frac{1}{R''C_1}} \quad (13)$$

$$G_3 \cong -\frac{k_3}{R'C_2} \cdot \frac{s}{s + \frac{1}{R'C_2}} \quad (14)$$

where $R_1$, $R_2$, R′, R″, $C_1$ and $C_2$ are component values pertaining to corresponding circuit elements.

When considering in equation (13)

$$R''C_1s >> 1 \rightarrow s >> 1/R''C_1 \quad (15)$$

we obtain $$G_2 \cong -(k_2/s) \quad (16)$$

which is identical to the transfer function of (2).

When considering in equation (14)

$$R'C_2s << 1 \rightarrow s << 1/R'C_2 \quad (17)$$

we obtain $$G_3 \cong -k_3s \quad (18)$$

which is identical to the transfer function of (3).

It follows from the above discussion that when substituting for s=jw, the respective transfer functions of the integrating and differentiating circuit of the equalization circuit 1000 shown in FIG. 25 will approach that of an ideal integrator and differentiator in the frequency range $$1/R''C_1 << w << 1/R'C_2 \quad (19)$$

In FIG. 26 still another example of practical implementation of the equalization circuit is shown. The integrating circuit of FIG. 24 is here implemented by a passive integrating network 1002 comprising series resistor $R_A$ and parallel capacitor $C_A$ followed by a non-inverting amplifier 1012 providing the necessary amplification in the integrating signal path. Analogously, the differentiating circuit of FIG. 24 is implemented in FIG. 26 by a passive differentiating network 1003 comprising a series capacitor $C_B$ and a parallel resistor $R_B$ followed by a non-inverting amplifier 1013 providing the necessary amplification in the differentiating signal path. Similarly as in the circuit of FIG. 25 the subtraction circuit is implemented by a differential amplifier 1005. In the circuit of FIG. 26 the integrated and subsequently amplified signal at the output of amplifier 1012 is fed to a non-inverting input of the differential amplifier 1005, while the differentiated and subsequently amplified signal at the output of amplifier 1013 is fed to an inverting input of amplifier 1005. The output signal at terminal 1007 of the circuit in FIG. 26 is the resulting difference signal which represents the equalized signal of the record/playback channel. The resulting equalized signal has a 0° phase difference with respect to the signal recorded on the magnetic disc. Thus, the phase difference caused by the presently described equalization circuit does not introduce non-linearities in the phase response of the overall channel, but to the contrary, it yields an overall linear phase response.

The respective transfer functions of the integrating and differentiating circuit of FIG. 26 are $$G_2 \simeq A_2 \frac{\frac{1}{C_A s}}{R_A + \frac{1}{C_A s}} = \frac{A_2}{R_A C_A s + 1} \tag{20}$$

$$G_3 \simeq A_3 \frac{R_B}{R_B + \frac{1}{C_B s}} = \frac{A_3 R_B C_B s}{1 + R_B C_B s} \tag{21}$$

where $A_2$ is the gain of amplifier 1012 and $A_3$ is the gain of amplifier 1013.

When comparing equation (20) with (2) we obtain for $w >> 1/R_A C_A$ $$k_2 = A_2/R_A C_A \tag{22}$$

When comparing equation (21) with (3) we obtain for $w << 1/R_B C_B$ $$k_3 = A_3 R_B C_B \tag{23}$$

A potentiometer 1014 in FIG. 26 connected to the amplifier 1013 in the differentiated signal path represents a variable gain control circuit. By adjusting the gain $A_3$ of amplifier 1013, the gain constant $k_3$ expressed by (23) and the corner frequency of the boost changes as it has been described above in connection with the description of FIG. 28 and equation (8).

A detailed electrical circuit diagram of the data detector and equalizer 99 is shown as an example in consecutive FIGS. 53A and 53B and will now be described. In the video frame storage recording and reproducing system, a color television signal is encoded in digital form and recorded on a magnetic disc. The digital code utilized in the DC free self clocking channel code described in the above identified application by Jerry Wayne Miller, Ser. No. 668,679. Upon playback, the digital data is reproduced by a reproduce head and amplified by a reproduce preamplifier (reproduce head and preamplifier are shown in FIG. 54B). FIGS. 53A and 53B show two identical playback equalizer and data detector circuits utilized for the ten separate data streams received from the disc drive data interface 151. However, only one of these circuits will be described. In the circuit of FIGS. 53A and 53B the preamplified playback data in the channel encoded format, for example, of the type described in the aforementioned Miller application Ser. No. 668,679, is equalized by an equalization circuit 1000 corresponding to the above-described equalization circuit with reference to FIGS. 24 to 26. The equalized signal is filtered in a low pass filter circuit 1018, and thereafter amplified and amplitude limited to produce a rectangular pulse sequence in an amplifier-limiter circuit 1019. The pulse sequence from the limiter is fed through a pulse former circuit 1020 which forms output pulses for each detected signal transition. The pulses from circuit 1020 are fed to the data decoder and time base corrector circuitry 100 which decodes and removes timing errors from the playback data from which the original color television signal is recovered.

As shown in FIGS. 53A and 53B, the playback data from the preamplifier is applied to differential input terminals 1021 and 1022 of a differential amplifier 1033, such as manufactured by RCA, type CA 3004. This type of amplifier contains open-collector differential output transistors connected to output terminals 1034 and 1035. Resistor 1036 is the load resistor for the non-inverting output terminal 1034. The gain of the amplifier 1033 to output terminal 1034 is constant throughout the frequency range of interest. The non-inverted signal is buffered by emitter follower 1037 and then applied to a differentiating network 1003 comprising capacitor 1038 and resistor 1039. This network 1003 performs differentiation for signal frequencies below 60 MHz. Its transfer function is $$G_3 \simeq \frac{(1039)(1038)s}{1 + (R1039)(1038)s} \tag{22}$$

and for $w < \frac{1}{(1039)(1038)}$ $$G_3 \simeq (1039)(1038)s \tag{23}$$

Equation (23) corresponds to previously discussed equation (3) related to the block diagram of FIG. 24 where $k_3 = (1039)(1036)$. Since signals of interest in this particular embodiment extend only to about 10 MHz, this network 1003 may be viewed as a true differentiator. The output of the differentiator 1003 is applied to input terminal 1040 of differential amplifier-multiplier circuit 1041, such as manufactured by Motorola, type MC1496. Input terminals 1040 and 1042 of 1041 are differential input terminals biased by connection to +7.5 V. The amplifier-multiplier 1041 receives a second input signal at differential input terminals 1043 and 1044 and at output terminal 1045 an output current is provided proportional to the negative of the product of the input signals at terminals 1040, 1042 and 1043, 1044. In the present circuit a direct current gain control voltage is applied to input terminal 1043, while terminal 1044 is grounded. The control voltage at 1043 corresponds to an output voltage from a remote variable gain control circuit (not shown on FIG. 53), such as previously described in connection with circuit 1014 of FIG. 26. In the presently described embodiment of the frequency equalizer, the gain of the circuit 1041 in the differentiated signal path is remotely and automatically controlled by a digital-to-analog converter to obtain desired gain variations dependent on the variations of the recording track length of the magnetic disc. A particular track number (corresponding to a specific track length) from which a particular data is being reproduced is decoded in a digital decoder and converted in the digital-analog converter to a direct current voltage level which is then applied as a gain control signal to input terminal 1043 of circuit 1041. As it has been mentioned before, the variable gain adjustment in the differentiated signal path is designed to compensate for higher pulse density on inner tracks of the disc while linearity of the high frequency boost of the equalized signal is maintained for the entire frequency band transmitted.

The magnitude of the current at output terminal 1045 of the amplifier-multiplier circuit 1041 is proportional to the input signal at input terminal 1040 and to the gain value determined by the control voltage at terminal 1043. The output current from terminal 1045 of 1041 is applied as an input current to the emitter of a common-base transistor amplifier serving as the subtraction circuit 1005 which has been previously described and shown in FIGS. 24, 25 and 26. This input current produces an output voltage at the collector of the amplifier which is proportional to both the input current and resistance of a collector load resistor 1047. Thus, the above-indicated part of the transistor 1005 output voltage is proportional to the negative of the signal derivative amplified by the amplifier-multiplier circuit 1041.

The inverting output terminal 1035 of the differential amplifier 1033 has a load resistor 1048 and a parallel load capacitor 1049. The direct current gain of the amplifier 1033 to output terminal 1035 is higher than the gain to the non-inverting output terminal 1034 by the ratio of the respective load resistances 1048/1036, that is, by the factor of about 3. For signal frequencies above 80 kHz the gain to output terminal 1035 is determined by 1049 and is inversely proportional to the frequency. Thus, the output circuit 1048, 1049, connected to terminal 1035 functions as an integrating network for frequencies above 80 kHz and throughout the frequency range of interest which is approximately from 0.3 MHz to 10 MHz. The transfer function of the amplifier 1033 to the output terminal 1035 is $$G_{1033} = -3A_{1033}\frac{(1)}{(1048)(1049)s + 1} \quad (24)$$

where $A_{1033}$ is the gain of the differential amplifier 1033 to output terminal 1034.

$$\text{For } w > \frac{1}{(1048)(1049)} \quad (25)$$

$$G_{1033} \approx -3A_{1033}\frac{1}{(1048)(1049)s}$$

Equation (25) corresponds to previously discussed equation (2) related to the block diagram of FIG. 24, where $$k_2 = \frac{-3A_{1033}}{(1048)\,(1049)}.$$

The inverted and subsequently integrated signal from the output terminal 1035 of amplifier 1033 is applied to the common emitter transistor amplifier 1005. Transistor 1005 inverts this input signal and multiplies it by the ratio of its respective collector and emitter load resistances 1047/1050. The transistor 1005 operates as a common emitter amplifier in the integrating signal path and as a common base amplifier in the differentiating signal path. The resulting output signal at the collector of transistor 1005 is the sum of two input signal contributions, one proportional to the integral of the playback signal from the reproduce head and preamplifier combination, the other one proportional to the negative of the derivative of the playback signal. Thus, the resulting output signal at the collector of transistor 1005 corresponds to a difference signal, such as previously described with reference to the output signal at the output terminal 1007 of the previously described embodiments of the equalization circuit shown in FIGS. 24, 25 and 26. Thus, the output signal of the equalization circuit 1000 of FIGS. 53A and 53B corresponds to the equalized signal of the record/playback channel as previously disclosed with respect to the embodiments of FIGS. 24, 25 and 26.

Now the remaining part of the detailed circuit diagram shown in FIGS. 53A and 53B will be described. The equalizer 1000 converts the voltage peaks of the playback signal provided by the playback preamplifier 1009 (FIG. 54B), which represent zero crossings of the recorded flux, back into properly positioned zero crossings at the output of the equalizer. This equalized output signal is present at the collector of transistor 1005 of the equalizer and is filtered by a low pass filter circuit 1018 and thereafter fed through a first buffer amplifier 1051, such as type MC10116P, of an amplifier-limiter circuit 1019. The output signal from the buffer amplifier is fed through a series of five amplitude-limiting amplifiers, preferably of the same type as the buffer amplifier. The equalized playback signal provided at the input of the amplitude-limiting circuit 1019 is in the channel encoded form with the transitions properly positioned. Amplitude limiting the playback signal serves to restore the rectangular shape of the playback data signal which has been considerably distorted by the record and reproduce processes. Furthermore, the amplitude-limiting circuit 1019 also serves to provide opposite phased waveforms of the restored data signal which are subsequently used to generate a pulse for each transition of the rectangularly shaped channel encoded playback data signal. As previously described herein with reference to the channel encoding of the data signals by the encoder 96 and subsequent recording of such signals, the transition-related pulses are generated so that a precisely defined edge, the leading edge being selected in this embodiment, can be sent through a transmission channel without introducing errors to the data although the data signal may be distorted by the channel. As described hereinbefore, the high bit rate data streams, such as processed by the apparatus described herein, are particularly susceptible to have errors introduced into them because of the response characteristics of transmission lines such as used to couple channel encoded data between disc drives and the signal system.

To generate a pulse for each transition of the playback data signal so that only leading, positive edges of the pulses identify the data signal transitions, the amplifier-limiter circuit 1019 provides two opposite phased waveforms of the data signal. First, a rectangular pulse sequence of non-inverted polarity is provided at the output terminal 1052 of the last amplifier 1053 of the series of amplitude-limiting amplifiers and second, an identical pulse sequence of inverted polarity is provided at the output terminal 1054 of the same amplifier 1053. Both these pulse sequences are applied respectively to two identical one-shot multivibrators 1055 and 1056, such as type NC10131L of the pulse former circuit 1020. Each multivibrator forms a positive pulse, respectively, for each positive going transition of the playback data signal received at its clock input. Consequently, the one-shot multivibrator 1055 receiving the non-inverted form of the playback data signal provides a positive pulse at each positive going transition in the data signal. On the other hand, the other one-shot multivibrator 1056 receiving the inverted form of the playback data signal provides a positive pulse at the location of each negative going transition in the data signal. Since the leading edges of the positive pulses generated by the multivibrators 1055 and 1056 are defined by rapidly switching the multivibrators from its stable state to its quasi-stable state (there being no significant time constant determining components involved), each leading edge will be identical to all others and occur at a precise time following the occurrence of the positive clocking transition of the playback data signal. Because the transmission channel over which the pulses are sent will act on identical pulse edges the same, the locations of the transition-related positive pulse edges, hence, data signal transitions themselves, are not lost as a result of any distortion that may be introduced to the pulses by the action of the transmission channel. If necessary, an amplitude level sensitive detector means can be coupled to the output of the transmission channel, such as is used at the input of the decoder circuitry portion of the previously described decoder and time base corrector 100, to accurately redefine the relative locations of the playback data signal transitions.

For transmission of the transition related pulses to the signal system, the output pulses of both one shot multivibrators 1055 and 1056 are applied to separate inputs of a positive OR-gate 1057 which forms an output pulse for each input pulse. The output pulses of the OR-gate 1057 are applied to the disc drive data interface 151 (FIG. 9B) for transmission over lines 154 to the data select switch 128, which couples the transmitted pulses to the input of the data decoder portion of the decoder and time base corrector circuitry 100 of the selected playback channel 91 for decoding of the playback data and subsequent processing to recover the original color television signal.

FIGS. 54A and 54B show consecutive parts of a deleted electrical circuit diagram including the record driver and playback preamplifier circuits of four identical data record and playback channels, designated 1058, 1059, 1060 and 1061 utilized in the video frame storage record and playback system. A fifth channel designated 1062 includes a servo track head permanently connected to a servo playback preamplifier and it also includes a data track record and playback channel. In the video frame storage record and playback system, five more data record and playback channels (not shown) identical with the above-indicated data record and playback channels shown in FIGS. 54A and 54B are utilized. A relay 1063 in channel 1058 is shown having its contacts in a position connecting one of the heads 1064 and 1065 for recording as occurs when a record command is received from the disc control circuitry on line 1066, as described hereinbefore. In absence of a record command, the relay 1063 is in the playback position. In this position, the contacts of relay 1063 are in their alternative positions. Heads 1064 and 1065 are utilized for both recording and playback and are switched alternatively for odd and even television fields. Switching of these heads 1064 or 1065 is controlled by the 30 Hz head switch signal continuously provided on line 1067 provided by the record timing circuit of FIG. 38A located in the disc drive electronics. The playback data received alternatively from the heads 1064 and 1065 of the respective channels 1058, 1060 and 1061 is fed into the playback equalizer and data detector circuits associated with the respective channels such as shown in previously described FIGS. 53A and 53B. The record/-playback heads utilized in the video frame storage recording and reproducing system are conventional head such as manufactured by Applied Magnetic Corporation or Information Magnetics Corporation, for digital recording on disc packs of the kind employed in the apparatus.

CENTRAL PROCESSING UNIT INTERFACE

With respect to the computer control system 92 that has been previously described in connection with FIG. 8, the various interfaces will now be described in more detail beginning with the central processing unit or CPU interface 108, which has the various subsections 109 relating to the teletype, paper tape reader 111, read only memory 112 and device address decode portion 113, and which selects various devices and places them in communication with the address and data bus 105.

Referring to the CPU interface block diagram shown in FIG. 29, 13 lines of the address and data bus 105 are shown in the top portion thereof, which extend to the CPU 106. These 13 lines carry the 13 bit address word and are coupled together with a bus bank 7 select signal to the input of a latch 1100 which is responsive to the bus sync or BSYNC signal issued by the CPU over one of the control lines 144 at the address time of the address/data multiplex cycle to store the address word and the bus bank 7 select signal identifying the peripheral device to be interfaced with the CPU 106. A decoder/demultiplexer 1101 is connected to receive the address word and the bus bank 7 select signal stored in the latch 1100 and decode the address to activate one of the 21 device select lines 114 in accordance with the address information. The decoder/demultiplexer 1101 decodes the address and activates the appropriate device select line in response to the bus bank 7 select signal or BBS 7 signal provided by the CPU 106 over one of the control lines 144 when the 3 most significant bits of the address identifies a peripheral device request. A device select line is activated by switching it from a high to a low level, which appropriately interconnects the associated device that has been requested with the main bus 105 for data transmission with the CPU 106. As described hereinbefore 15 of the 21 drive select lines 114 extend to peripheral interfaces 115, 118, 119, 120 and 121 and the remaining 6 device select lines extend to logic circuitry indicated by block 1102 for controlling the interfacing of the teletype 109, paper tape reader 111 and read only memory 112.

The control program is loaded into the memory unit 107 using a paper tape reader 111 that has 8 data bit lines 1103 which are connected through AND gates 1104, the outputs of which are connected through lines 1105 to 8 lines of the data bus 105. Loading of the memory unit 107 is initiated by the actuation of a switch 1125 which, when pressed, provides a command to the CPU 106 that instructs it to issue the appropriate device address and control signals over the main bus 105 and control lines 144, respectively, to permit the control program provided by the paper tape reader 111 to be gated onto the bus 105. Initially, the CPU 106 provides device address and control signals that activate appropriate device select lines 114 for enabling an encoding circuit 1126 to cause ROM 112 to send a load command sequence to the CPU. Following receipt of the load command sequence, the CPU 106 executes the necessary routines and arithmetic functions determined by the computer micro-code program to direct the loading of the control program from the paper tape reader 111, character by character. More specifically, the load command sequence is generated by the ROM 112 and includes a sequence of six characters followed by a load command character, each character comprising a 7-bit word. Each 7-bit character of the sequence is encoded by ROM 112 under control of the encoding circuitry 1126 and is individually sent to the CPU 106 by gating it onto the main bus 105 following sending a ROM data available status command to the CPU. Each character is coupled to the bus 105 by ROM data and status AND gates 1127 enabled by gate signals placed on lines 1128 and 1130 by logic circuitry 1102. Following the command issued by operation of switch 1125 (as well as the sending of each 7-bit character of the load command sequence), the demultiplexer 1101 receives an address signal and control signals from the CPU 106 and activates a line F of the device select lines 114. The logic circuitry 1102 responds to the activated device select line and a bus data in control slgnal provided by the CPU 106 on line 1113 to provide a status command at one of the inputs to the ROM data available status AND gate 1127. A ROM data available status command is sent to the CPU 106 by enabling the status AND gate 1127 with a ROM status gate signal provided to its second input by the logic circuitry 1102, the status command being coupled from the output 1129 of the status AND gate 1127 to the main bus 105 via line 1105. In response to the receipt of each ROM data available status command, the CPU 106 sends the appropriate address and control signals to the CPU interface 108 to cause the next 7-bit character of the load command sequence to be returned to the CPU. The demultiplexer 1101 activates line C of the device select lines 114 which causes the logic circuitry 1102 to provide the gate signal on line 1128 that enables the data character AND gates 1127 when the CPU 106 sends the bus data in signal to the CPU interface on line 113. The enabled character data AND gate 1127 places the 7-bit character word generated by the cooperative action of the ROM 112 and encoding circuitry 1126 on the main bus 105 via lines 1105 for transmission to the CPU 106. In the foregoing manner, the encoding circuit 1126 and ROM 112 provide a preceding sequence of six 7-bit characters followed by a 7-bit load command to the CPU 106. In the illustrated apparatus, the encoding circuit 1126 and ROM 112 generate a load command sequence of 7-bit characters in the same ASCI code language commonly originating from a teletypewriter.

In response to the receipt of the load command of the seven character load command sequence, the CPU 106 provides the device address and control signals to activate the appropriate device select lines and, through the logic circuitry 1102, cause the control program to be loaded from the paper tape reader 111 into the memory unit 107. Initially, the demultiplexer 1101 receives an address from the CPU causing the activation of the paper tape reader line M of the device select lines 114. Subsequently, the CPU 106 provides a command over one of the lines of the main bus 105. Upon the occurrence of a bus data out control signal on line 1114, an advance tape reader command is sent to the tape reader 111 over one of the lines 1103. The tape reader 111 returns a signal to the CPU interface 108 over one of the lines 1103 when the requested data has been sent to the CPU interface 108. The logic circuitry 1102 responds to the returned signal and a bus data in control signal by causing the AND gate 1143 to issue a data available command to the CPU 106. The data available command is placed on the main bus 105 via line 1105 and transmitted to the CPU 106. Following receipt of the data available command, the CPU 106 provides the address and control signals to the CPU interface 108 to cause the data available from the paper tape reader to be transmitted to the memory unit 107. The demultiplexer 1101 activates line L of the device select lines 114, which permits the logic circuitry 1102 to enable the AND gates 1104 by placing a gate signal on line 1106 when a bus data in signal is provided by the CPU on line 1113. The enabled AND gates 1104 places the data received from the paper tape reader over line 1103 on the main bus 105 for transmission to the memory unit 107. The CPU 106, CPU interface 108 and paper tape reader 111 are operated in foregoing manner until the control program stored on paper tape is transferred to the memory unit 107.

Similarly, if a teletype 110 containing serial data is addressed by the CPU 106, then the data will be gated onto the bus 105 by AND gates 1108, which are enabled through line 1109 by the logic 1102 after the serial data on line 1107 has been converted to 8 bit parallel data by a universal asynchronous receiver-transmitter (UART) 1110. Conversely, in the event that the CPU is sending data to the teletype, then the 8 bit parallel data appears on lines 1105 that extend to the UART 1111, which converts the parallel data to a serial data that appears on line 1112 extending to the teletype. It should be appreciated that the UART identified by the blocks 1110 and 1111 are typically one unit that performs both functions.

A bus data in command is applied to the logic 1102 via line 1113 and a bus data out command is applied to the logic 1102 through line 1114. The bus data in and out commands are provided by the CPU 106 over one of the control lines 114 according to whether data is to be received or transmitted over the main bus 105. Similarly, a bus initialize signal from the CPU 106 is applied on line 1115 for the purpose of setting a number of flip-flops in the logic circuitry to a known state during start-up or equivalent operating sequences. The logic 1102 also has a bus reply signal issued by the multiple input OR gate 1132 on line 1116 which extends to the CPU 106 for the purpose of notifying the CPU that the addressed device has been communicated with, i.e., the data is ready if it is to be sent out, or it has been received if the CPU is sending data. In the event that a bus reply signal is not present on line 1116 to the CPU 106 within about 10 microseconds, then the CPU aborts rather than waiting for a signal that may not be forthcoming.

Timing signals for the UARTs and the RAS interface 115 are generated by an oscillator 1118 that provides a 3SC signal on line 1119. The 3SC signal is connected to a divide by 11 counter 1120, the output of which appears on line 1121 extending to a counter 1122 as well as to the RAS interface 115 circuitry as a clock signal for its operation. The counter 1122 further divides the divided 3SC signal output of the divide by 11 counter and provides an output on line 1123 that is used to clock the UARTs at the rate that is compatible for operation of the teletypewriters and is at a frequency of about 1758 Hz.

One embodiment of specific circuitry that can be used to carry out the operations of the block diagram of FIG. 29 is shown in FIGS. 58A through 58D, which together comprise a single electrical schematic circuit diagram. The operation of the circuitry shown in FIGS.

Figure 58D:
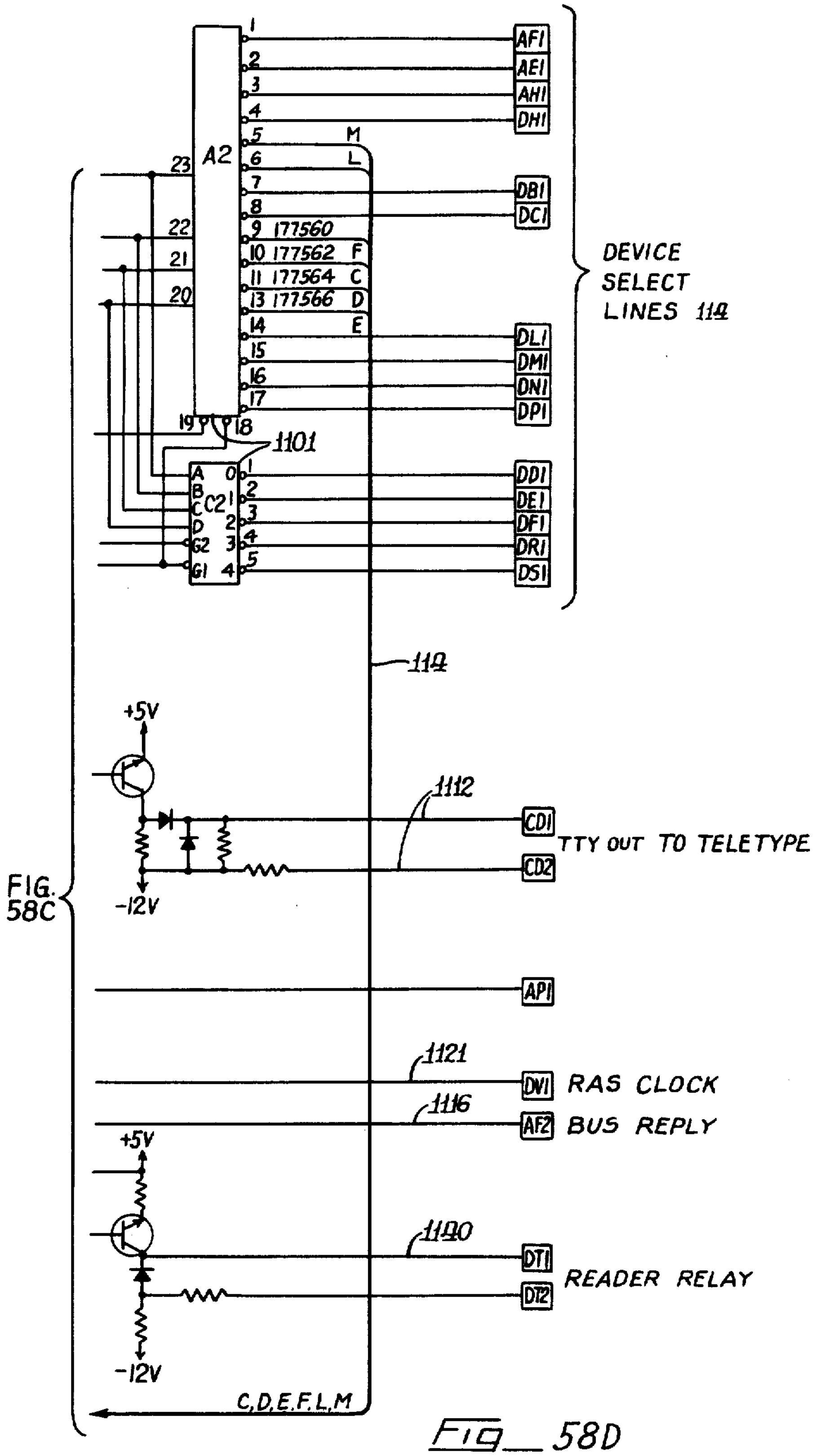

58A–58D will not be specifically described except for certain portions thereof which were not previously explained. Referring to the circuitry for activating the device select lines, the latch 1100 is enabled by the BSYNC signal provided by the CPU 106 at the address time of the bus multiplex cycle to latch the 13 bit address word and bus bank 7 select signal (or BBS7 signal) to the input of a first decoder comprising a plurality of exclusive OR gates 1098 and an AND gate 1099. The AND gate 1099 has two inputs, one being the latched BBS7 signal and the other the wired OR outputs of the exclusive OR gates 1098 associated with the seven most significant bits plus the least significant bit of the 13 bits address word. If both the BBS7 signal and the exclusive OR gates having their outputs wired OR'ed are in the correct state for a peripheral device request, AND gate 1099 provides an enabling signal to the decoder/demultiplexer 1101 which responds to activate device select lines 114 in accordance with the states of the remaining 5 bits of the address word. The 15 device select lines 114 shown in the block diagram of FIG. 8 are shown in FIG. 58D as extending to the right and the 6 device select lines used internally of the CPU interface 108 as previously discussed are labeled as lines C, D, E, F, L and M.

With respect to the operation of the paper tape reader 111, it should be appreciated that the data that is read therefrom is quite slow relative to the speed of operation of the computer system 92 and, accordingly, when the paper tape reader is being run to place data on the lines 1105 as shown in FIG. 58B, circuitry is provided to inform the CPU 106 when the data is available as well as to control the speed of operation of the reader to an appropriate value and gate data to CPU 106. Thus, when the paper tape reader 111 is selected by activating the switch 1125, the switch latch circuit 1124 issues two commands to the CPU 106 over lines 1150 and 1151 to cause the CPU to execute a microcode routine that conditions it to wait for data input from the paper tape reader 111. The switch latch circuit 1131 also clears a shift register 1117 of the encoding circuitry 1126 and shortly thereafter causes, through the operation of a delay circuit 1133, the setting of the shift register to provide a logical "0" output at the first and a logical "1" output at the other seven of its eight bit position outputs. This prepares the shift register 1117 for effecting the generation of the seven character load command sequence by the ROM 112 that leads to the transfer of the control program to the memory unit 107. Following the setting of the shift register 1117, the delay circuit 1133 also removes the command provided to the CPU 106 over line 1150 by presetting the flip-flop of the switch latch circuit 1124 thereby readying the switch latch circuit to respond to another actuation of the switch 1125. To distinguish between the identically encoded paper tape reader and teletype data and prevent the erroneous transfer of data to the CPU 106, the delay circuit 1133 is coupled to disable a teletype data available status AND gate 1159 when switch 1125 is actuated.

With the shift register 1117 set as described, its eighth bit position provides an enabling signal over line 1153 that causes the generation of the ROM data status signal on 1130 by a flip-flop and following AND gate circuit 1154. In addition, one input of a two input AND gate 1155 is enabled for the eventual generation of the gate signals on line 1128 for enabling the character data AND gate 1127 to send the ROM load command sequence to the CPU 106 when the device select line C is activated and a bus data in signal is received as described hereinbefore. The gating circuitry 1156, formed of AND and OR gates and connected together to receive the device select signals and bus data in and out signals, set the various status and data gates in the appropriate conditions to effect the desired information transfer between the CPU, CPU interference and various peripheral device interfaces.

Each time character data is transmitted to the CPU 106 by enabling the data AND gates 1127, the AND gate 1155 also provides a signal that clears the flip-flop of the circuit 1154 to disable the status AND gate 1127. In addition, this signal clocks a one shot 1157 which responsively issues a pulse to the shift register 117 to shift the logical "0" one bit position. The one shot 1157 also clocks the flip-flop of the circuit 1154 when reset to transfer the logic level of the eighth bit position of the shift register 1117 to the following AND gate. As long as the eighth bit position of the shift register 1117 outputs a logical "1" signal, the status AND gate 1127 will receive an enabling signal from the circuit 1154 when closed by one shot 1157.

When the logical "0" reaches the eighth bit position of the shift register 1117, line 1153 couples a low logical "0" equivalent signal level to the data input of the flip-flop of the circuit 1154 and one of the inputs of the AND gate 1155. Thus, when the flip-flop of circuit 1154 is clocked by the one shot 1157, the status AND gate 1127 is not enabled and the AND gate 1155 does not provide an enabling gate signal to the data AND gates 1127. The CPU 106 interprets the first 6 characters of the load sequence as the address of the paper tape reader and retains it for use in transferring the control program to the memory unit 107 and the 7th character as a command to initiate the loading of the control program.

One of the lines from the paper tape reader 111, i.e., line 1141, carries a clock to an FF 1142, a clock pulse being generated by each sprocket hole on the tape being read. When a pulse appears on line 1141 to clock the FF 1142, the output of the FF provides a signal indicating that data is available and this signal is gated onto one of the lines 1105 by NAND gate 1143 which is enabled by a command on line 1144. When the data is read, a pulse on line 1145 is gated through AND gate 1146 to a delay one shot 1147 which times out to activate a one shot 1148 that produce an output pulse on line 1149 back to the paper tape reader that commands it to advance the tape. The delay of the one-shot 1147 thereby effectively determines the speed of operation of the paper tape reader and is preferably maintained at a rate of about 300 characters per minute to minimize the possibility of damaging the tape due to excessive speed.

The apparatus described herein employs a teletype, for example, in the execution of a diagnostic program, the diagnostic program having been loaded into the memory unit 107 by, for example, the paper tape reader 111 as previously described with respect to the loading of the control program. In the execution of the diagnostic program, data is sent by the teletype to the CPU 106 and data is sent to the teletype by the CPU 106. Referring to the CPU interface 108 portion used to transfer data between the CPU 106 and the teletype, data is transferred from the teletype to the CPU 106 by either operation of the teletype keyboard or the teletype paper tape reader. The programmed CPU determines when data is to be sent by the teletype paper tape reader.

When data from the teletype keyboard is needed by the CPU 106, the demultiplexer 1101 is addressed to activate line F of the device select lines 114. This conditions the gating circuitry 1156 to cause the status AND gate 1127 to issue a data available status command to the CPU when the needed data has been received from the teletype. The teletype sends an 8-bit character to the CPU interface 108 over line 1107. The 8 bits are transmitted serially and are clocked into the UART 1110 by UART clock signals on line 1123. When the UART 1110 has received and assembled the 8 bits of serial data transmitted by the teletype over line 1107, it causes through the operation of AND gate 1159 (enabled by the not high speed paper tape reader status signal provided by the shift register 1117 over line J) an enabling gate signal to be provided over line H to one input of the AND gate 1127. Upon the occurrence of either a bus data in or bus data out control signal on one of the lines 1113 or 1114, the gating circuitry 1156 causes the AND gate 1127 to issue the data available status command to the CPU 106. The CPU responds by issuing an address signal to the demultiplexer 1101 to cause the activation of line C of the device select lines 114. When the CPU 106 provides a following bus data in control signal at line 1113, the gating circuitry 1156 issues a data transfer command over line I to the UART 1110 and the enabled AND gate 1159'. This resets the UART data available flag data and causes AND gate 1159' to enable NAND gates 1108 to place the assembled data on lines 1105 for coupling to the main bus 105 and transmission to the CPU 106. Following receipt of the transmitted data, the CPU 106 again causes the demultiplexer 1101 to activate line F of the device select lines 114 in preparation to receive further data from the teletype. When the final data has been received from the teletype by the CPU, the teletype routine is terminated.

When data from the teletype tape reader is needed, the operation of the CPU interface 108 to transfer data from the teletype to the CPU 106 is the same as described above with respect to the teletype keyboard operation. However, in addition, when the line F of the device select lines 114 is activated by an address sent to the demultiplexer 1101 by the CPU 106, the CPU provides a paper tape advance status signal to the CPU interface 108 over the bit "0" line of the main bus 105. Upon the occurrence of either a bus data in or a bus data out control signal at lines 1113 or 1114, the gating circuitry 1156 places an enabling signal on line K that causes the AND gate circuitry 1139' to clock the latch 1139. The clocked latch 1139 issues an advance teletype paper tape reader command over line 1140 to the teletype reader relay, which causes the reader to be advanced. Latch 1139 is cleared to ready it for the generation of the next advance command by the counter 1138. The counter issues a clear signal to the latch 1139 after receipt of the 8th UART clock through the AND gate 1136, which is enabled by the start bit of the serial data sent by the teletype. Sixteen UART clocks are provided during each interval of the bits sent by the teletype.

When the CPU 106 sends data to the teletype 110, the CPU addresses the demultiplexer 1101 to cause activation of the device select line D. When the data buffer in the UART 1111 is empty, a logic high enabling status signal is placed on line A, which, together with the activated device select line D, conditions the gating circuitry to issue a teletype available status command to the CPU 106. This status command is issued by AND gate 1152 upon the occurrence of either a bus data in or a bus data out control signal on lines 1113 or 1114. Upon receipt of the teletype available status command, the CPU 106 addresses the demultiplexer 1101 to cause activation of the device select line E. This conditions the gating circuitry 1156 to issue a command over line G that causes the UART 1111 to load the 8-bit parallel data presented at its input by the CPU over the main bus 105 and lines 1105. The load command is issued by the gating circuitry upon its receipt of a bus data out or a bus data in control signal from the CPU 106 over line 1114 or line 1113, respectively. Following the loading of the CPU data into the UART 1111, the UART clock on line 1123 clocks the data out serially onto line 1112 for transmission to the teletype. After the CPU 106 sends the data to the UART 1111, it again activates the device select line D to wait until the teletype is ready to receive additional data. When the last data has been sent to the teletype by the CPU 106, this teletype routine is terminated.

To provide a forced interrupt to the CPU 106 and enable it to restart its operation, a restart control switch 1148 and associated latch circuitry are provided. Depressing the switch 1148 causes the forced interrupt and returning it to its home position restarts the CPU 106. A run/halt control switch 1148' and associated circuitry is provided to halt the CPU 106 operation if, for example, a system failure occurs. When the run/halt control switch 1148' is reset to its run position, the run/halt circuitry causes the CPU 106 to issue the bus initialize control signal over line 1115 to condition the CPU interface 108 as previously described.

REMOTE ACCESS STATION INTERFACE

Figure 30:
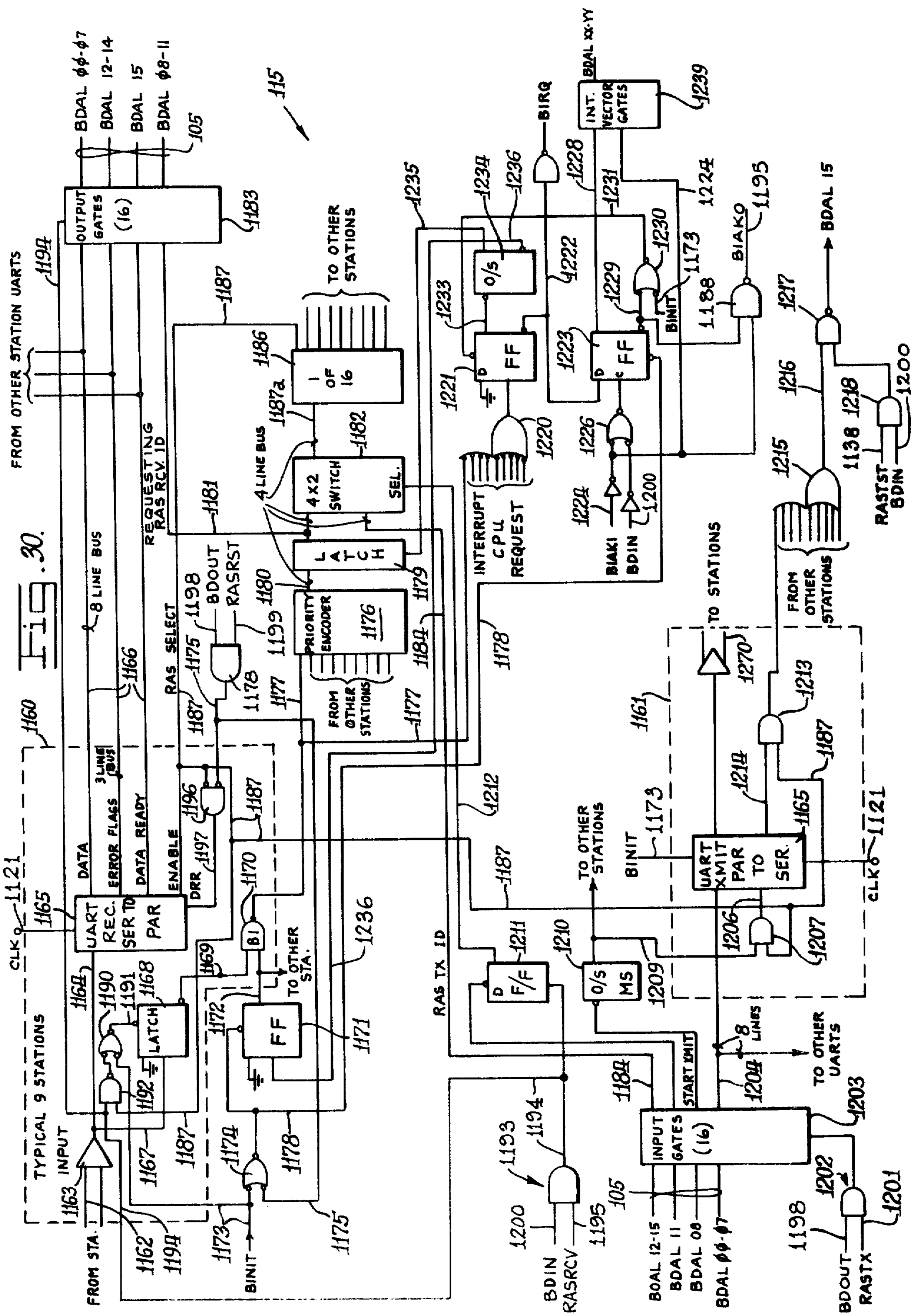
FIG. 30 is a functional block diagram of the remote access station interface portion of the computer control system of the apparatus.

During operation of the apparatus described herein, it is necessary for the internal access station, auxiliary access panel, as well as any one of the seven remote access stations to communicate with the central processing unit and accordingly, a remote access station interface interfaces the access stations with the address and data bus so that communication between the central processing unit and the access stations can be achieved. The remote access station interface 115 referred to during the discussion of the computer control system 92 shown by the block diagram of FIG. 8 will now be described in connection with the block diagram of FIG. 30 which shows the address and data bus 105 at both the upper right hand and lower left hand corners of the drawing. It should be understood that each of the access stations 76, 78 and 116 have interface circuitry associated with them and that the block diagram of FIG. 30 shows representative interface circuitry that would be duplicated for the various stations, together with common circuitry that is not repeated. Thus, the dotted line enclosure 1160 shown in the upper left includes interface circuitry that is typical for each station as is the circuitry shown in the dotted line enclosure 1161 near the lower portion of the diagram. The electrical schematic diagram shown in FIGS. 55A through 55D illustrates one embodiment of the circuitry that can be used to carry out the operation of the remote access station interface 115 shown in the block diagram of FIG. 30.

Communication between the remote access station interface 115 and each of the access stations is done using serial transmission on two pairs of lines of the sets of lines 1162 and 1270, whereas the address and data bus 105 comprises 16 lines. Hence, conversion between serial and parallel data is necessary for communicating between the access stations and the bus. When a selected access station sends data to the CPU 106, serial data from the station is present on the station's lines 1162 shown in the upper left hand portion of the drawing and it is applied to a line receiver 1163 which has an output on line 1164 extending to the receiver portion of a UART 1165. The UART 1165 is clocked by a clock signal received over line 1121 from the CPU interface 108 to convert the serial information to parallel on the lines 1166 to which all UARTs provided for interfacing access stations are connected. The lines 1166 comprise data lines, error flags and data ready lines. There are three error flags, i.e., the parity error, framing error and an overrun error, the latter indicating that a second character has been received before the first character has been read from the UART buffer. When data is to be transmitted from the CPU 106 to a selected access station, the parallel data received over bus 105 is applied to the transmitter portion of the UART 1165 provided for the selected station via an input gate circuit 1203 and lines 1204. The clock signal provided over line 1121 from the CPU interface 108 clocks the UART 1165 to convert the parallel data to serial on lines 1270 extending to the selected access station. A 1 of 16 decoder 1186 determines the UART to be used by activating the RAS select line 1187 extending to the UART.

Figure 62A:
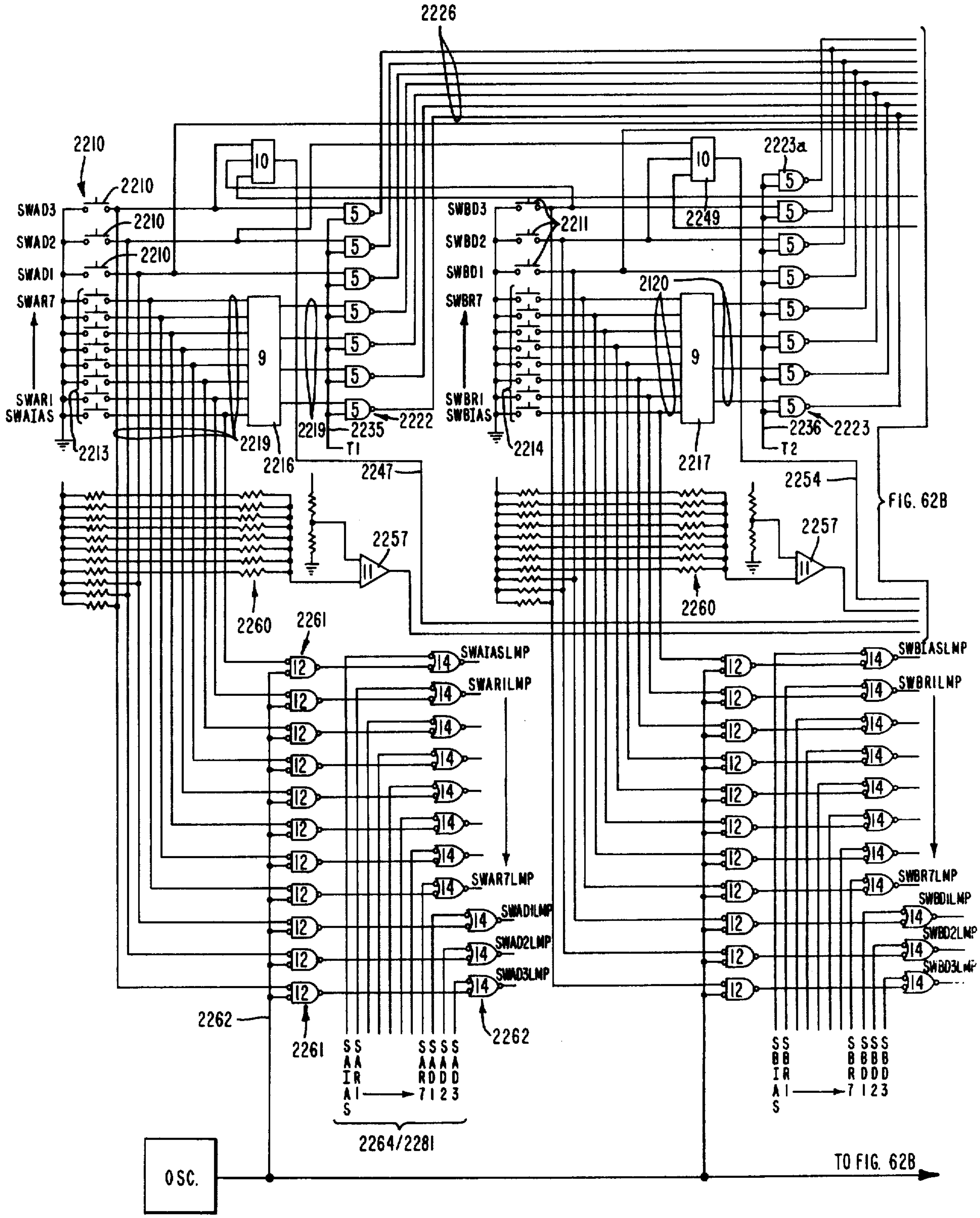

The apparatus described herein also includes an access assignment control panel 140 illustrated by FIGS. 62A–62C which enables playback channels and disc drives to be assigned in certain permissible combinations to the exclusive use of a remote or internal access station. The pair of lines 1162*a* of the set of input lines 1162 and the pair of lines 1270*a* of the set of the output lines 1270 connect the access assignment panel 140 and the remote access station interface 115. These pairs of lines transmit data between the CPU 106 and the access assignment panel 140 through the remote access station interface 115 for effecting the desired channel and disc drive assignments to the access stations.

If data is being sent by an access station to the CPU 106, a four bit binary identification number of the station is caused by the sending station to be placed on lines 1181 at the input of a 4×2 switch 1182. The switch 1182 is set in a manner to be described below to place the identification number received over lines 1181 on its output lines 1187*a* extending to the input of the decoder 1186. The decoder 1186 activates the one of the nine possible decoder RAS select outputs identifying the station sending data. The RAS select output is coupled to the UART 1165 provided for receiving data from the sending access station. Activation of the RAS select output enables the UART to place received data onto the address and data bus 105.

If data is being transmitted from the CPU 106 to one of the access stations, a four bit binary identification number of the station is sent by the CPU to the remote access station interface 115 as a RAS TX ID signal and is placed on lines 1184 at the input of the 4×2 switch 1182. The switch is set to place the identification number received over lines 1184 on its output lines 1187*a* extending to the decoder 1186. The decoder responds as described above by activating the RAS select output that is coupled to line 1187 associated with the UART 1165 provided for the selected access station. Activation of the RAS select line 1187 permits data recived from the CPU 106 to be loaded into the UART's transmitter buffer.

The transmission of data between the CPU 106 and one of the access stations is effected by control signals and access station device address signals issued by the CPU 106. As described hereinabove with reference to FIG. 29, the device address signals cause the demultiplexer 1101 of the CPU interface 108 to activate designated device select lines 114 by placing device select signals on the lines 114. The access station device select signals together with control signals provided by the CPU 106 on designated lines of the control siganl bus 144 are coupled to the remote access station interface 115 to condition the interface logic circuitry to enable the transmission of data between the CPU and the selected access station.

For transmission of data from an access station to the CPU 106, the operation of the CPU must first be interrupted and caused to branch to a interrupt service routine of the controlling program. This interruption is initiated by data being received from an access station, which causes a bus interrupt request to be placed on a line 1222 that is coupled to the interrupt bus 143 that extends to the CPU 106. The requesting access station sends its data over its set of input lines 1162 to an associated line receiver 1163. The line receiver 1163 applies the data over line 1167 to clock its associated input latch 1168 to place a first enabling signal on line 1169 extending to one input of a following NAND gate 1170. In the event the CPU 106 is not servicing another access station interrupt request, the interrupt enabling FF 1171 is in a state that places a second enabling signal on line 1172 that extends to the other input of each of the NAND gates 1170 provided for each of the access stations interfaced with the CPU. Because only the NAND gate 1170 associated with the transmitting access station receives the first enabling signal, it is enabled to provide an output on line 1177 which extends to one of the inputs of an OR gate 1220. The OR gate responsively provides a signal to clock the FF 1221 causing it to send the bus interrupt request to the CPU 106 over line 1222.

Concurrently with the generation of the bus interrupt request, the output of the latch 1168 which is gated through the NAND gate 1170 is also applied to a priority encoder 1176 via line 1177 and the encoder generates the four bit binary identification number of the station originating the interrupt request that is decoded by the decode 1186 to activate the RAS select line 1187 extending to the enabling input of the appropriate UART 1165. The identification number is coupled to an input of a latch 1179 via lines 1180. The latch 1179 is clocked to set the identification number therein by a pulse provided by a one-shot 1234 over line 1235 in response to the low level signal received over line 1233 when FF 1221 is clocked by the OR gate 1220. The identification number that is latched appears on line 1181 that extends to the 4 by 2 switch 1182 as well as to output gates 1183 that gate the information onto the address and data bus 105 when line 1194 is high. The second output of the one-shot 1234 on line 1236 is coupled to clock the interrupt enabling FF 1171 causing a low level signal to be placed on line 1172 extending to the various NAND gates 1170. This disables the gates, thereby preventing further interrupt requests from being sent to the CPU 106 until FF 1171 is reset upon receipt by the remote access station interface 115 of a RASRST device select signal provided by the CPU interface 108 as described below.

The CPU 106 acknowledges receipt of the bus interrupt request by returning a bus interrupt acknowledge in (BIAKI) command on line 1224 which is gated through an OR gate 1226 to the clock input of FF 1223. When this occurs, the high level signal placed on line 1222 by the interrupt enable FF 1221 in response to the previously received interrupt request is clocked onto the output line 1228 and a low level signal appears on the output line 1229. The high level signal on line 1228 together with the inverted BIAKI signal from line 1224 activates interrupt vector gates 1239 to place the vector address on bus 105 that causes the CPU 106 to branch to the interrupt service routine of its control program. At the same time, the FF 1223 causes a bus reply signal to be placed on line 1245 that extends to the multiple input OR gate 1246 (see FIGS. 55B and 55D) which issues the bus reply signal to the CPU 106 over line 1247. A bus reply signal is also sent to the CPU by the OR gate 1246 each time a remote access station interface device select line is activated by the CPU interface 108 and the appropriate control signal provided by the CPU 106 is received by the remote access station interface 115. As will be described in further detail below, gate circuits 1178, 1193, 1202 and 1218 are coupled to device select lines and CPU control signal lines and, among other functions, initiate the generation of bus reply signals by the OR gate 1246. The bus reply signal sent by the remote access station interface 115 serves the same purpose as described above with respect to the CPU interface 108, i.e., it notifies the CPU 106 that communication has occurred with the addressed device.

Because the low level signal placed on line 1229 extending from FF 1223 appears at one of the two inputs of a NAND gate 1188, the BIAKI signal received at the other input of the NAND gate 1188 is inhibited from being transmitted further over the BIAKO line 1195. The BIAKO line 1195 extends to BIAKI inputs of all interfaces included in the apparatus for systems that cause interrupts and serves to transmit the BIAKI signal sent by the CPU 106 to only the interface associated with the system that initiated the interrupt request.

The low level signal on line 1229 is also coupled by the OR gate 1230 onto line 1231 that extends to the FF 1221 for resetting it for response to subsequent interrupt requests.

The CPU 106 also responds to the bus interrupt request to cause the return of RASRCV device select and bus data in (BDIN) control signals to the remote access station interface 115. These signals are provided to an AND gate circuit 1193 over lines 1195 and 1200, respectively. The AND gate circuit 1193 responds to the device select and conrol signals by issuing an output signal that is coupled to clear an FF 1211. An output of the FF 1211 is connected to a line 1212 that extends to the control input of the 4×2 switch 1218. When FF 1211 is cleared, its output connected to the line 1212 is placed in a state that places the switch 1218 in the condition that connects lines 1181 to the input lines 1187*a* of the 1 of 16 decoder 1186. Thus, the identification number of the requesting access station generated by the priority encoder 1176 is passed to the decoder 1186 for effecting the activation of the RAS select line 1187 that extends to the enabling input of the UART 1165 associated with the requesting station to enable the UART's receiver to place assembled data on the lines 1166.

The AND gate circuit 1193 is also coupled by lines 1194 to a following NAND gate 1192 and to the output gates 1183. If the UART 1165 has received and assembled a complete 8 bit character from the transmitting access station, a data ready signal is issued over one of the lines 1166 to the output gates 1183. The output gates respond to the receipt of the data ready signal and the high level signal placed on the line 1194 by the AND gate circuit 1193 by placing the data in the UART on the bus 105. The NAND gate 1192 connected to the activated RAS select line 1187 also satisfies the OR gate 1190. The output of the satisfied OR gate is applied to line 1191 which extends to the reset terminal of the latch 1168. The latch 1168 is reset by the satisfied OR gate 1190 to remove the first enabling signal from its output coupled over the line 1169 to its associated AND gate 1170.

The first BDIN control signal sent to the remote access station interface 115 by the CPU 106 following receipt of the bus interrupt request also is employed to remove the activating signal provided over line 1228 to the interrupt vector gates 1239. To this end, the BDIN line 1200 of the CPU control line bus 144 is also coupled to the OR gates 1226 which passes the signal to the FF 1223 for clocking onto the line 1228, the low level signal present at this time on the line 1222 and the input of the FF 1223.

After the data sent by the UART 1165 has been received by the CPU 106, RASRST device select and bus data out (BDOUT) control signals are returned to the remote access station interface 115 at the inputs of an AND gate circuit 1178. The BDOUT control signal and RASRST device select signal are received on lines 1198 and 1199, respectively, coupled to the input of the AND gate circuit 1178. These signals satisfy the AND gate circuit 1178 which responsively provides an enabling signal over line 1175 extending to one input of a NAND gate 1196 and one input of an OR gate 1174. The NAND gate 1196 connected to the activated RAS select line 1187 is enabled to provide over line 1197 a data ready reset signal to the UART 1165. The OR gate 1174 responds to the enabling output provided by the AND gate circuit 1178 by placing a low level signal state on its output that is connected to the interrupt enable FF 1171. The low level signal state resets the FF 1171 which causes it to place the second enabling signal on line 1172 extending to the NAND gates 1170, conditioning the NAND gates for response to another interrupt request from an access station.

To transmit data from the CPU 106 to one of the access stations, the CPU causes RASTX device select and BDOUT conrol signals to be sent to the remote access station interface 115. These signals are provided to an AND gate circuit 1202 over lines 1201 and 1198, respectively, and satisfy the AND gate circuit. This enables the input gates 1203 to pass data from the bus 105 to the interface 115. In addition to the data to be transmitted to the selected access station, the CPU 106 sends over bus 105 the station address or identification number (RAS TX ID) identifying the access station which is to receive the transmission and switch control and transmit initiating signals. The latter signals condition the remote access station interface logic circuitry for effecting the transmission of the data to the selected access station. The line of the bus 105 coupled by the input gates 1203 to the FF 1211 receives the switch signal which places the FF 1211 in its set state. When FF 1211 is set, its output connected to the line 1212 extending to the control input of the 4×2 switch is placed in a state that conditions the switch 1218 to connect the input lines 1187*a* of the decoder 1186 to the output lines 1184 of the input gate circuit 1203. This enables the four bit RAS TX ID data identifying the access station to receive data from the CPU 106 to be coupled to the decoder 1186. The decoder responds to the RAS TX ID station identification number by activating the RAS select line 1187 associated with the selected access station. This places an enabling condition on one of the inputs of each of the AND gates 1207 and 1213. The AND gate 1207 initiates the UART's transmission of data from the CPU 106 to the selected access station. However, transmission is not initiated until the UART 1165 is ready to process the data from the CPU 106. AND gate 1213 serves the purpose of initiating the sending of a status signal to the CPU 106 notifying it that the UART 1165 is ready to receive, process and transmit data.

To this end, the CPU 106 causes RASTST device select and BDIN control signals to be sent to the remote access station interface 115. These signals are provided to an AND gate circuit 1218 over lines 1188 and 1200, respectively, and satisfy the AND gate circuit. This enables an AND gate circuit 1217 to send the UART ready status signal to the CPU 106. When the data buffer in the UART 1165 associated with the selected access station is empty and ready to receive data from the CPU 106, an enabling signal is provided over an output line 1214 of the UART to a second input of the AND gate 1213 connected to the activated RAS select line 1187. The AND gate 1213 responds by sending an enabling signal to the multiple input OR gate 1215, which is connected to receive similar signals from the other AND gates 1213 associated with the other access stations. The enabling signal is passed by the OR gate 1215 to the AND gate 1217 which responds by sending the UART ready status signal to the CPU 106.

The CPU 106 responds to the ready status signal by causing RASTX device select and BDOUT control signals to be returned to the remote access station interface 115 and the data to be sent to the selected access station together with the transmit initiating signal. The device select and BDOUT control signals enable the input gates 1203 as previously described. The transmit initiating signal is coupled by the input gates 1203 to a one-shot 1210 which issues a signal over line 1209 to all of the AND gates 1207 of the remote access station interface 115. The AND gate 1207 connected to the activated RAS select line 1187 is enabled to cause a signal to be provided to the associated UART 1165 causing it to load its transmitter buffer with the parallel data that is sent by the CPU 106 over bus 105 and placed on the input lines 1204 to the UART by the input gates 1203. Clock signals provided to the loaded UART 1165 over line 1121 cause the UART transmitter to output the data serially onto lines 1270 extending to the selected access station.

In assigning playback channels, such as shown by FIG. 7, and disc drives 73 to the exclusive use of a remote or internal access station 76 or 78, the access assignment panel 140 communicates via its circuitry shown and described herein with reference to FIGS. 62A–62C with the computer control system 92 through the remote access station 115 in the same manner as described above with respect to the access stations and panel 76, 78 and 116. An operator controls the access assignment panel as described herein through its keyboard illustrated in FIG. 61 to set up desired access station, playback channel and disc drive assignments. A desired assignment is set up by operation of the DRIVE, IAS and RAS keys and the assignment effected through the operation of the ENTER key. Operation of the ENTER key causes data to be sent to the remote access station interface 115 over the pair of input lines 1162*a*, causing a bus interrupt request to be sent to the CPU 106 and subsequent servicing of the request. A requested assignment is achieved by entering the identification of the assigned playback channels, disc drives and access station in the memory unit 107 of the computer control system 92 which, through the control program, prevents the assigned playback channels and disc drives from being accessed by any access station other than that to which they are assigned.

The remote access station interface 115 is also provided with bus initialize line 1173 connecting it to the control signal bus 144 extending to the CPU 106. As described during the discussion of the CPU interface 108, a bus initialize control signal is issued by the CPU 106 and is applied to the line 1173 for the purpose of setting the remote access station logic circuitry to a known state during start-up or equivalent operating sequences.

The operation of the computer control system 92 in effecting the transmission of data between the CPU 106 and one of the access stations is conducted in accordance with the control program loaded into the memory unit 107, which control program is described by the flow chart diagram of FIG. 63.

ACCESS STATION CIRCUITRY

The overall operation of the apparatus using the access stations has been described in terms of the sequence of entries that must be made in the keyboard to carry out the desired tasks. Moreover, the remote access station interface 115 (FIG. 8) which communicates the address and data bus 105, hence, CPU 106 with the access stations has been described and the circuitry associated with the access stations themselves will now be described in conjunction with the block diagram of FIG. 31.

Figure 31:
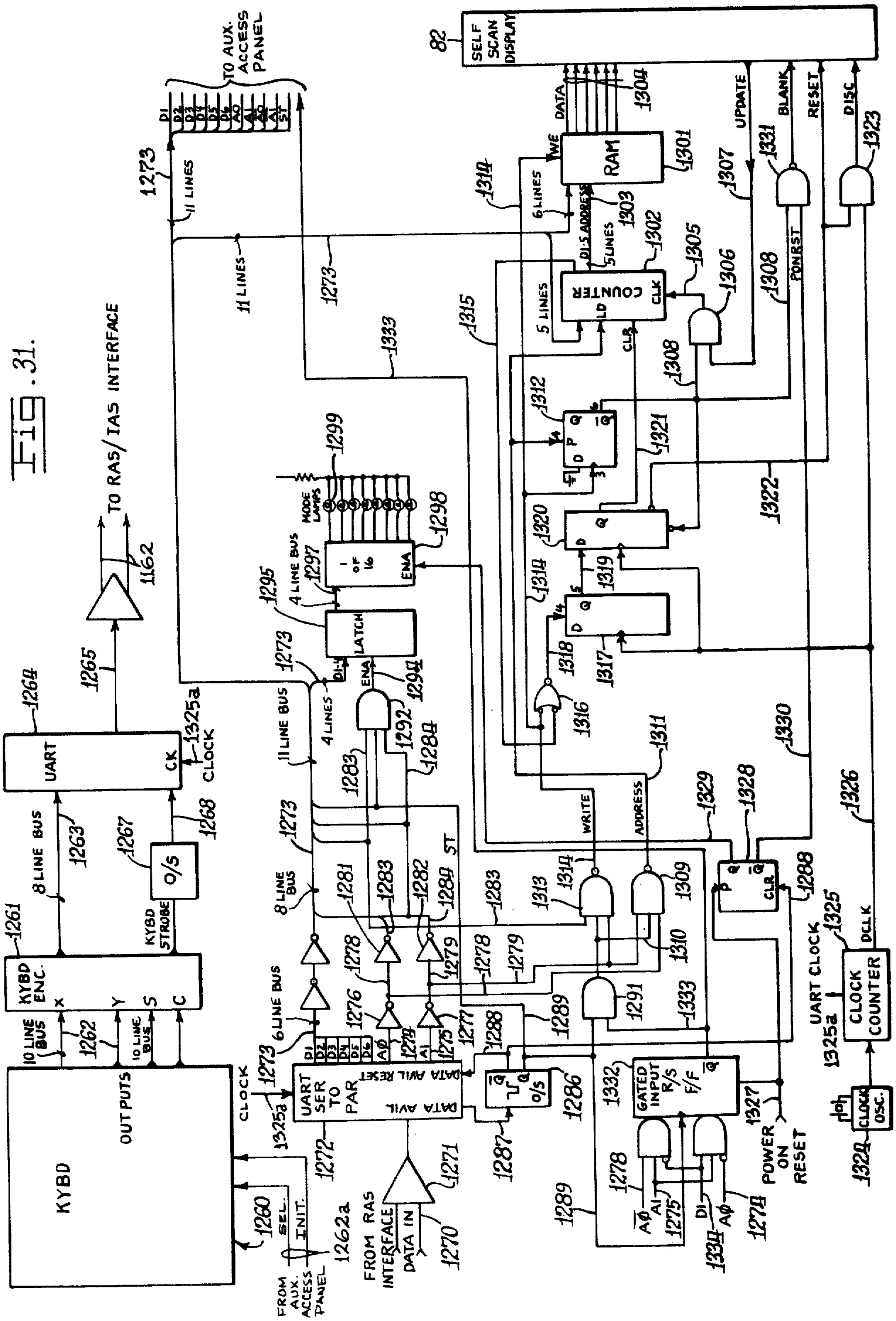
FIG. 31 is a functional block diagram of the remote access station and internal access station portion of the computer control system of the apparatus.

When a command is to be sent to the CPU 106 via the RAS interface 115, the operator presses the appropriate keys and function bars on the keyboard, e.g., the IAS keyboard 83, indicated generally by the block 1260 which contains the keys and bars 84, 85, 86 and 104 shown in detail in the perspective drawings of FIG. 3 as well as on the electrical schematic diagram of circuitry that can be used to carry out the operation of the block diagram of FIG. 31, the electrical schematic drawings appearing in FIGS. 56A through 56D. Each of the keys or function bars in the keyboard 83 is connected to a transmission gate 1266 (FIGS. 56A and 56B) and some of them also to shift and control lines 1269 and 1269*a*. Each transmission gate 1266 interconnects two lines corresponding to predetermined X and Y coordinates that together with the status on X lines 1269 and 1269*a* are encoded by encoder 1261. The lines 1262, 1269 and 1269*a* comprise the total lines that provide this interconnection with the various keys and the encoder 1261. Thus, the keyboard encoder 1261 comprises a grid network that selects one of 99 possible combinations and generates a seven bit word on lines 1263 that are connected to a UART transmitter 1264 which converts the parallel information to serial information on output line 1265 that is sent to the RAS interface via lines 1162 when it is strobed by a pulse provided by a one-shot 1267 coupled to the UART by line 1268 clocked by a UART clock provided by a clock conter 1325 over line 1325*a*.

When data is received from the RAS interface 115 on lines 1270, it passes through line receiver 1271 into a UART receiver 1272, which, under the control of the UART clock, converts the serial data to parallel data and places the parallel data on six data lines 1273 and two routing lines 1274 and 1275. The UART receiver and transmitter 1272 and 1264 are included in a single integrated circuit and have single control and clock circuits for controlling its receiver and transmitter portions. The data and routing lines route the data to different locations in the circuitry, i.e., to a self-scanning display 82 (also shown in FIGS. 1 and 2) or to lamps associated with the keyboard for lighting specific keys as previously discussed. The routing information appearing on lines 1274 and 1275 is inverted by respective inverters 1276 and 1277 producing inverted signals on respective lines 1278 and 1279. These lines are also connected to inverters 1281 and 1282, respectively, the outputs therefrom appearing on respective lines 1283 and 1284. A one-shot 1286 is triggered by a data available pulse on line 1287 from the UART 1272 and provides a data available reset pulse on line 1288. Its high output is connected to line 1289 which extends to an AND gate 1291 in addition to another AND gate 1292 and provides a strobe pulse for gating through the information to either the self-scan display 82 or lamps associated with the keys. With respect to the latter, the AND gate 1292 has the routing information on lines 1283 and 1284 so that when these inputs of AND gate 1292 are satisfied and the strobe pulse is present, the output of AND gate 1292 on line 1294 enables a latch 1295 which latches in the status of four lower order bits of the data lines 1273 and provides the four bit address on lines 1297 that extends to a one of 16 decoder 1298 that enables the appropriate lamps 1299 to be lighted.

The data lines 1273 also extend to a random access memory 1301 with the lower order five bits extending to a counter 1302 that addresses the RAM 1301 through five address lines 1303. The memory 1301 has six output lines 1304 extending to the self-scanning display 82, which is a 32 character dot matrix display manufactured by Burroughs Corporation, that displays each character that is addressed from memory. During operation, the counter 1302 will be clocked through its 32 addresses with the self-scanned display 82 displaying the alphanumeric character in accordance with the data on lines 1304 and will count through addresses in accordance with a clock pulse on line 1305 that is produced by AND gate 1306 that is satisfied by an update pulse generated by the display 82 on line 1307 together with a normally high signal on line 1308. Thus, the counter is clocked successively through its addresses by the update pulses generated by the display.

When it is desired to write new data into the RAM 1301, the proper RAM address must be first selected, and the following sequence occurs. The routing information at the input of NAND gate 1309 together with a strobe pulse on line 1310 which is generated by the one-shot 1286 output through AND gate 1291 causes NAND gate 1309 to provide a preset pulse on line 1311 that extends to counter 1302 as well as to FF 1312 which has an output 1308 that disables AND gate 1306 and stops the clocking of the counter 1302. During this time, the desired address that is to be rewritten is forced into the counters via lines 1273 so that on the next strobe pulse and the proper routing information enables NAND gate 1313 which provides a write pulse on line 1314 that commands the memory 1301 to write in the data that is present on the data lines 1273. After this has occurred, then the FF 1312 changes state and line 1308 enables AND gate 1306, and the update line 1307 again clocks the counter 1302. Whenever the counter 1302 reaches the terminal count of 32, then its output line 1315 is gated through OR gate 1316 into a FF 1317 via line 1318. The FF 1317 has output line 1319 connected to another FF 1320 which provides a clear signal to the counter via line 1321 so that it can be cleared and again be clocked through the addresses that are sent to the RAM 1301. The FF 1320 also has line 1322 which extends to the self-scan display 82 as well as to AND gate 1323 and provides a reset signal for the display itself. The AND gate 1323 inhibits the display clock for about 2 clock pulses so that it can be reset. An oscillator 1324 and counter 1325 produce a 15 kHz clock signal on line 1326 that is used to clock the FF 1317 and 1320, in addition to the display 82 through the AND gate 1323. A power on reset signal on line 1327 presets a FF 1328 having high and low outputs on lines 1329 and 1330, with the line 1329 inhibiting the decoder 1298 and line 1330 blanking the display 82 via NAND gate 1331. The output of FF 1312 on line 1308 also blanks the panel when an address is being sent when the counter 1302 is stopped.

The circuitry shown in the block diagram of FIG. 31 is present in all internal and remote access stations, with the internal access station 78 (FIG. 8) having the entire complement of numerical and function keys and bars for operating the apparatus. The remote access stations 76 (FIG. 8) have fewer function keys and therefore cannot perform certain operations as has been previously described. Another type of control station, namely the auxiliary access panel 116 (FIG. 8) is adapted to be used with and adjacent to a remote access station for the purpose of letting an operator control somewhat independent operations that are used in the sequence play mode from the working tracks 1–64 of a disc drive. An auxiliary access panel has only an INITIATE bar and a SELECT bar connected to keyboard transmission gates 1266 (FIG. 56A) by lines 1262*a* and permits a remote access station to use one disc drive and an auxiliary access panel adjacent to it to use a second disc drive as well as separate playback channels. By sequencing alternately between the remote access station 78 and the auxiliary panel 116, the still images can be transmitted through one channel alternately from two disc drives thereby eliminating any muting of the resulting picture so that a very quick, almost instantaneous, transition from one still image to another can be produced. An auxiliary access panel 116 contains much of the circuitry shown in the block diagram of FIG. 31, and has a display with the associated memory and circuitry, but does not have a full keyboard as previously mentioned. The remote access station and the auxiliary access panel both contain a FF 1332 which receives from the UART 1272 routing information on the lines 1274, 1275, and 1278, together with the strobe pulse on line 1289 and a steering signal on line 1334, and provides an output signal on line 1333 which is connected to AND gate 1291 and to the auxiliary access panel. When the FF 1332 is steered by a low level signal on line 1334, AND gate 1291 is disabled which then disables AND gates 1309 and 1313, so that data in the display 82 of the RAS, to which the auxiliary access panel is connected, cannot be changed. This low level signal on line 1333 also enables the auxiliary panel, so that its display, memory and associated circuitry become operative and enables it to write data on lines 1273 into its memory for use in its display.

Turning now to the electrical schematic diagram shown in FIGS. 56A through 56D, which illustrate one embodiment of circuitry that can be used to carry out the operation of the block diagram of FIG. 31, and specifically FIG. 56A, the INITIATE bar 1336 has line 1335 connected to an inverter 1337, the output of which is connected to AND gate 1338 and 1339. ENABLE key 1340 has line 1341 connected through inverter 1342 to the AND gate 1338. A third line 1349 from a turn key switch 86 (see FIG. 3) is connected through an inverter 1343 to AND gate 1344 as well as to another AND gate 1345. The outputs of AND gates 1339, 1344 and 1345 are respectively connected to transmission gates 1346, 1347 and 1348, each of which provides a signal that extends to the encoder 1261 just as do the other keys on the keyboard. The logic circuitry described permits the access stations to perform certain operations while prohibiting others. When the INITIATE bar 1336 is pressed by itself, then AND gate 1339 is satisfied and causes its associated transmission gate 1346 to become operative. When INITIATE and ENABLE bars 1336 and 1340 are simultaneously pressed AND gate 1339 is inhibited, but AND gate 1345 is enabled which actives transmission gate 1348, which allows editing of a presassembled sequence to occur. However, by turning the key switch 86 that, presumably, only certain operators would have access to, the pressing of the INITIATE and ENABLE bars 1336 and 1340 will inhibit gate 1345 and enable gate 1344 which actuates transmission gate 1347 which permits the erasing of a single still in the bulk tracks or erasing an entire sequence of working tracks from any address until an end of list (EOL) indication occurs or until track number 65 is reached. Thus, the logic circuitry prohibits certain erasures to be carried out unless a turn key is used.

ACCESS ASSIGNMENT PANEL

An access assignment panel 140 shown in FIG. 61 may be provided with the apparatus described herein for the purpose of assigning one or more selected disc drives and one or more playback channels exclusively to an access station when the apparatus is being used during broadcasting or some other high priority use. As an example, if the apparatus were being used during a news broadcast in a commercial television station and the person operating the apparatus was sequencing through an assembled list of stills during the news broadcast, it would be quite upsetting to all concerned if someone at another remote access station would interfere with the broadcast by interrupting the display of a still, or display some unrelated still or perform some other disrupting operation that would interfere with the newscast at the time. Since the apparatus may have as many as seven remote access stations positioned at various locations around the television station, inadvertent use of the apparatus could be done by unknowing personnel, even with the usual assignment precautions that are taken in most broadcast stations.

To preclude such inadvertent or unauthorized use of the apparatus by personnel at some remote station when the apparatus is being operated in a top priority use, the access assignment panel can be incorporated into the apparatus for the purpose of assigning certain disc drives and certain playback channels exclusively to either a remote or internal access station 76, 78 and thereby prohibit any interruption. By assigning certain combinations, for example, disc drive No. 1, remote access station No. 2 and playback channel B, then other access stations cannot use channel B or disc drive No. 1, but are free to use other playback channels and other available disc drives for their work. In this regard, although only one access station at a time is permitted to control a channel or a disc drive, there can be one, two, three or more disc drives (in the event there are three or more disc drives present with the particular apparatus) and one or more channels assigned to a specific access station. Also, a drive may not be assigned to a specific access station through more than one channel at a time. However, more than one disc drive at a time can be assigned to a channel. If all disc drives are assigned or all channels are assigned, remote access stations not receiving an assignment cannot operate, since either disc drives, channels or both would not be available to them for operation.

The access assignment panel 140 shown in FIG. 61 is adapted to be interconnected with the remote access station interface 115 in a similar manner as the access stations are interconnected. The access assignment panel also communicates with the central processor unit 106 of the computer control system 92 through the remote access station interface 115 in the same manner as an access station. The access assignment panel 140 has three horizontal rows of push buttons as shown in FIG. 61, with the top row representing assignment combinations for playback channel A, the middle and lower rows being associated with the playback channels B and C, respectively. An ENTER key appears below the horizontal rows of push buttons and an ILLEGAL lamp is provided above the rows of push buttons. The push buttons within the rows are preferably mechanical latching push button switches (push to close, push again to open circuit) that when closed mechanically remain at a lower level than the open switches. Internal lamps are provided for the switches so that they can be illuminated. As will be hereinafter described, they can be illuminated at either a full brightness or dim intensity to differentiate between a "present" assignment or a "next" assignment. In this regard, it should be appreciated that if one or more drives and channels are assigned to a particular access station, a full brightness illumination of those push buttons that represent the present assignment is desirable and, if a "next" assignment is to be made, then when these push buttons are placed in the mechanically depressed position, a dim illumination of the push buttons for the next assignment may also be desired. If drives and channels for the next assignment are also included in the present assignment, then their mechanically depressed push buttons will be preferably brightly illuminated. When such dim and bright differentiations together with the push button mechanical levels are used with the access assignment panel, the operator can have a clear understanding of the assignments that are presently made as well as what will be performed when a change in the assignment is made.

The ENTER key is for the purpose of entering assignment and changing the status of assignments from a present assignment to the next assignment. Drives and channels assigned to a particular access station are entered or cleared in favor of a "next" assignment relationship when the ENTER key is depressed. At the time assignments are changed, the keys that had been at a dim brightness level will be changed to full brightness, and the prior full brightness keys will be extinguished, provided they are not part of the new assignment that is entered. In this regard, once the assignment is entered, the assigned button lamps will remain illuminated even if the switch button is again pushed since the present assignment will remain in effect until the ENTER key is again pressed. This is because the lamps in the buttons are driven by independent circuitry once the assignment is entered and is not a function of the switch button position. If it is desired to remove the assignment of a channel to an access station, it is necessary to press and thereby open the specific access station switch located in the appropriate channel row and to press the ENTER button for the new access station assignment.

The access assignment panel 140 has the keyboard arranged so that the three horizontal rows represent playback channels A, B and C as is shown in FIG. 61. Channel A is illustrated as the top horizontal row of push buttons and includes three disc drive buttons (Nos. 1, 2 and 3), an IAS (internal access station) push button and seven RAS (remote access station) push buttons (Nos. 1 through 7). To make an assignment to an access station, an operator pushes the appropriate access station push button together with the push buttons for the drives that he wishes to be assigned to that access station in the row corresponding to the channel to be assigned to that access station and then presses the ENTER key to carry out the assignment that has been made. For example, if an operator wishes to use the apparatus in a news broadcast and he needs to have stills from disc packs located on drives 1 and 2 and the operator is located at remote access station No. 2 (RAS 2), then an assignment can be made to insure that he will have exclusive use of drives 1 and 2 by depressing drive 1 and drive 2 buttons together with RAS 2 button all in the top row corresponding to channel A, depress the ENTER key and these three buttons will be illuminated at full brightness and the assignment will be made. With this assignment, other operators at other access stations will be unable to use drives 1 and 2 and channel A and only access station No. 2 can select stills from these drives and use channel A. RAS 2 may still use other channels and drives if they are not assigned to other access stations. Persons at other remote access stations or the internal access station may use drive No. 3 and channels B and C to carry out other work activities.

The control program associated with the computer includes certain rules with respect to the operation of the access assignment panel including the rule that only one remote access station can have assigned a particular channel. This insures that an operator at an access station does not have his control of the channel affected by another operator at another access station, since the purpose of the assignment is to exclude such dual or multiple use from occurring. However, one access station is permitted to have more than one playback channel assigned to it. This permits previewing/on-air operations from the apparatus as is common in broadcasting as well as other operations requiring the simultaneous use of stills from the apparatus. Another rule permits one or more of the disc drives to be assigned to an access station through a specific channel since stills may be located on different disc packs or a sequence in excess of the preferred maximum of 64 for one disc pack may be required for a certain program, which would require the use of more than one disc pack, hence, more than one disc drive. Another rule prohibits a particular drive from being assigned through two or more channels for the reason that the access station controlling a particular channel could thereby generate conflicting requests. Thus, while one, two or three drives can be assigned to an access station through a specific channel, each of the drives can be assigned to an access station through only one channel at a time. If a drive is assigned through more than one channel at a time by an operator pressing the push buttons on the access assignment panel, for example, drive 1 button for channel A as well as drive 1 button for channel B, the ILLEGAL lamp will be illuminated immediately. Similarly, if more than one access station is assigned for a particular channel, the ILLEGAL lamp will also be illuminated.

Multiple assignments can be simultaneously made, provided that there are disc drives and channels available for those assignments. In the previous example with respect to the assignment of disc drives 1 and 2 and remote access station No. 2 through channel A, another assignment for either of channels B or C could be made with drive No. 3 and the same or any other access station, such as the internal access station, for example. In this condition, there would be two separate assignments in effect simultaneously. It should be also appreciated that with both assignments in effect, there are no drives available for use by other operators at other remote access stations.

Turning now to the circuitry associated with the access assignment panel 140 and referring to FIGS. 62A, 62B and 62C, switches are shown for each of the drives as well as the access station for each of the playback channels A, B and C. Referring specifically to FIGS. 62A and 62B, there are three drive assignment push button switches 2210 associated with channel A, as well as three drive switches 2211 associated with channel B and three drive switches 2212 for channel C. Similarly, channel A has eight access station switches 2213 for channel A and channels B and C have similar switches 2214 and 2215, respectively. The switches 2213, 2214 and 2215 are respectively connected to priority encoders 2216, 2217 and 2218 via lines 2219, 2220 and 2221, with each of the priority encoders providing a four bit binary output which identifies the remote access station or internal access station that is switched. The outputs from the encoders as well as the lines from the drive switches each extend to one input of a number of NAND gates 2222, 2223 and 2224 for the respective channels A, B and C, and the output of the NAND gates extend via lines 2226 to a transmitter portion of a UART 2230 that converts the parallel information on lines 2226 into serial information that is provided on output line 2231. The output line 2231 extends to a driver 2232 having an inhibit line 2233 so that information can be inhibited from being transmitted to the RAS interface 115 via driver output lines 1162*a* if an illegal condition is created as by attempting to establish an assignment that violates one of the aforedescribed assignment pulses.

As will be hereinafter described, the timing of the transmission from the gates 2222, 2223 or 2224 is provided by the other inputs to the various NAND gates and the sequence of channels A, B and C is carried out so that the UART sequentially transmits data relating to the assignments for each of the channels. A high signal on line 2235 enables NAND gates 2222, while signals on lines 2236 and 2237 enable NAND gates 2223 and 2224 with these respective lines being activated with circuitry shown in FIG. 62C as will be hereinafter described. While the data from the channels is sequentially sent, the lines 2236 and 2237 are respectively connected to both inputs of NAND gates 2223*a* and 2224*a*, to provide a signal to the UART that specifies that channels B or C rather than channel A are transmitting. The channel A line 2233 does not have such a NAND gate and its reverse state informs the UART as to the beginning of the sequence and thereby allows synchronization of the access assignment panel operations to those of the computer control system 92.

To generate the visual illegal indication, an ILLEGAL lamp 2240 is provided and is driven by a lamp driver 2241 via an inverter 2242 and line 2233, which are coupled to the output of an OR gate 2243 that has a number of input lines, any one of which will cause the ILLEGAL lamp to be illuminated if active. When the ILLEGAL lamp 2240 is illuminated, an inhibit signal also appears on line 2233 which extends to the driver 2232 as well as to the lamp driver 2241.

The input lines to the NOR gate 2243 are provided by lines associated with circuitry that detects an illegal condition caused by pressing a specific drive's push button switches, for example, for more than one channel. The input lines 2245, 2246 and 2247 come from majority gates 2248, 2249 and 2250, respectively, which indicate whether a particular drive has been selected for more than one channel. For example, majority gate 2248 has three inputs, originating from the No. 3 drive push button switch associated with each of the channels. If more than one of the No. 3 drive switches are closed, then the majority gate 2248 provides a low output on line 2247 and cause the ILLEGAL lamp to be illuminated and the line driver 2232 to be inhibited. Similarly, the majority gate 2249 is coupled to the switches associated with each of the channels for drive No. 2 and majority gate 2250 has input lines from drive No. 1 switches associated with each of the channels. The other inputs to the NOR gate 2243, i.e., lines 2253, 2254 and 2255 originate at comparators 2256, 2257 and 2258, respectively, which have their positive inputs connected through a resistor network indicated generally at 2260, which is interconnected with each of the push button switches for the remote stations through lines 2219, 2220 and 2221 as indicated, so that if more than one remote station for any one channel is closed, then a threshold voltage is generated through the resistor network so that the comparator connected to that resistor network will provide an output signal that will satisfy NOR gate 2243 and cause the ILLEGAL lamp to be illuminated and the line driver 2232 to be inhibited.

With respect to the lighting of the lamps associated with the push button switches themselves, and referring to the channel A switches 2213, when one of them is closed, the lines 2219 that extend to the resistor network 2260 also extend to one input of a number of negative AND gates 2261 which have another input supplied by line 2262 which is connected to an oscillator which preferably provides a chopped DC signal to drive the lamp associated with the push button switch being closed at a low enough duty cycle to provide a dim or less than full brightness illumination. The output of the AND gates 2261 are connected to one input of a number of OR gates 2262 which drive the lamps associated with the switches. The other inputs of the OR gates 2262 are provided by lines indicated generally at 2264 which originate at FIG. 62C and each of which provides a voltage that drives the lamp at full brightness when an assignment is in effect.

Referring to FIG. 62C, parallel data from the CPU 106 via the RAS interface 115 is supplied through lines 1270a which are applied to the serial input line 2270 of the receiver portion of the UART 2230. The parallel data appears on lines 2271, is inverted or buffered by circuits 2272 and applied via lines 2273 to three 8 bit latches 2274, 2275 and 2276 which are associated with channels A, B and C, respectively. The data on lines 2273 are commands for causing the push button lamps to be illuminated at full brightness in accordance with the assignment made. These commands are latched into one of the latches depending upon which enabled line 2278, 2279 or 2280 is active. If the data is latched into one of the latches, for example latch 2274, then the data appears on output lines 2281, which includes three lines for the address drives and four lines of binary coded information that is decoded by a binary to decimal converter 2283. The three lines from the latch 2274 and eight lines 2264 from the converter 2283 provide a latched voltage level to selected ones of the negative OR gates 2262 shown in FIG. 62A for causing full illumination of the push button lamps in accordance with the entered assignment or assignments.

Turning now to the lower portion of the circuitry shown in FIG. 62C, the ENTER push button 2284 is connected via line 2285 to an inverter 2286 that extends to the UART 2230 as well as to a shift register 2287 and a one shot 2288. The signal to the UART provides the master reset of the same and is held in that state until the ENTER switch is opened by releasing the switch. When the ENTER push button is released, the one shot 2288 is triggered and output line 2290 provides a load pulse to the shift register which initializes it and sets output line 2235 to a high level for channel A while the output lines for channels B and C on lines 2236 and 2237 are initially at a low level. As the shift register 2287 is clocked by a signal on line 2295, the high signal sequentially appears on the three output lines so that the UART can sequentially communicate with the CPU 106 concerning each channel. The shift register has an output on line 2292 which extends to a one shot 2293 through inverter 2294 and line 2295. If the shift register 2287 does not provide a pulse on line 2292, then the one shot 2288 will trigger the one shot 2293 on the trailing edge of its pulse providing a pulse on output line 2298 to the UART telling it to load the UART transmitter buffer.

When the information from channel A is to be sent to the CPU 106, the one shot 2288 initializes the shift register 2287, the high level on line 2235 enables the gates 2222 (FIG. 62A) for channel A and information is sent through the transmitter portion of the UART 2230 to the CPU 106 via lins 1162a extending to RAS interface 115. The CPU then sends back information to the UART via lines 1270a (FIG. 62C) for illuminating fully any depressed push buttons associated with channel A. The information is received by the UART 2230 receiver portion and applied to the channel A eight bit latch 2274 because line 2235 of the shift register enables the channel A latch as is desired. This is accomplished by line 2235 satisfying one input of an AND gate 2300 which has enabling line 2278 as its output. When the CPU has sent information back to the UART, the UART generates a data available flag indicating that the UART has received an eight bit character and is ready to put it on the parallel output lines 2271 for loading into the latches 2274, 2275 and 2276. The data available signal is present on line 2301 which triggers a one shot 2302, producing a signal on output line 2303 that extends to the AND gate 2300 through inverter 2304 and line 2305. This enables the AND gate 2300 which enables the latch 2274 for receiving the eight bit character. The signal on line 2303 is also applied to the shift register 2287 and clocks the shift register to advance to the channel B information. The one shot 2302 output line 2303 is also connected to another one shot 2307 which has an output line 2308 that provides the data ready reset flag for the UART. The one shot 2307 also has output line 2309 that extends to a gate 2311 having output line 2312 extending to the one shot 2293 and triggers one shot 2293 for commanding the UART to load another character into the transmitter buffer. Thus, while the ENTER key 2284 initially starts the operation sequence and the one shot 2288 initializes the shift register and triggers the load buffer one shot 2293 for channel A data transmission, once the operation sequence has been started, the circuitry automatically sequences through the other channels B and C. The presence of the data available flag on the input of one shot 2302 produces a signal on line 2303 that advances the shift register and also has the effect of enabling the appropriate AND gate, such as AND gate 2300 for channel A, to selectively load the latches 2274, 2275 and 2276. In this manner, the information concerning the status of the assignments that are to be entered are communicated to the CPU 106 and the programmed CPU carries out the above rules and precludes interference by nonassigned access stations in the operation of assigned disc drives and channels. The lighted lamps provide an indication to the operator of the present assignments that are in effect as well as any next assignments that will be put into effect if and when the ENTER bar is pressed.

SIGNAL SYSTEM INTERFACE

As is shown in the block diagram of the computer control system of FIG. 8, signal system interface circuitry 119 interfaces the CPU 106 with the signal system shown in the block diagram of FIG. 9A. The inputs marked with an asterisk adjacent thereto on the block diagram of FIG. 9A show commands that are provided by the computer control system through the signal system interface circuitry 119. The operation of the signal system interface will now be described in connection with the detailed schematic electrical diagrams of FIGS. 32A and 32B.

The purpose of the signal system interface is to convey data between the CPU 106 and the signal system, being cognizant of the fact that the operation of the computer control system 92 is essentially asynchronous. When information or data is to be sent from the CPU 106 to the signal system, it is strobed into latches and is transferred to other latches. These other latches are strobed by signal system control signals to synchronize the sending of the information to the signal system so that it is synchronized with the signal system timing. When data or information is being sent from the signal system to the CPU 106, gates on the input lines are enabled by the CPU which provides control signals to transmit the information to the CPU.

To transmit information to the signal system, data from the address and data bus 105 appears on lines 1350 and 1351. The data on lines 1350 is split and is applied to two 8 bit latches 1352 and 1353. Similarly, input lines 1351 are split into two paths and are connected to input latches 1354 and 1355. Input latches 1352 and 1354 operate as a pair, as do latches 1353 and 1355. The data is strobed into one of the pairs of input latches by device select signals provided by the CPU interface 108 and applied to lines 1357 and 1362, together with bus data out signals provided by the CPU 106 and applied to line 1366. When signals appear on lines 1357 and 1366, an AND gate 1359 is satisfied which triggers a one-shot 1360 to produce a pulse on line 1361 that extends to latches 1352 and 1354 for latching the data therein. Conversely, when signals appear on lines 1362 and 1366, AND gate 1363 is satisfied and triggers another one-shot 1364 to produce an output on line 1365 that operates the pair of latches 1353 and 1355. Thus, the data on lines 1350 and 1351 is either latched into one pair of latches or the other. The device select lines 1357 and 1362 are activated by the CPU interface 108 in response to an address signal provided by the CPU 106 whenever the status of the commands and strobes output of the signal system 119 is changed in accordance with the functions to be performed by the apparatus.

After the data has been latched in one of the pairs of input latches, it is immediately present on its associated output lines 1367, 1368, 1369 and 1370. Another set of latches 1371, 1372, 1373 and 1374 receive the data on the lines 1367 through 1370, respectively, when latch enable signals initiated by strobe signals generated by the sync generating circuitry of the video and reference input circuitry 93A and 93B of the signal system are received. The strobe signals (also sometimes referred to as V drive signals) are continuously generated 60 Hz pulses, with strobe #1 signals provided by the reference input circuitry 93B and strobe #2 signals provided by the video input circuitry 93A. In this regard, strobe lines 1376 and 1377 originating from the video or reference input circuitry 93A or 93B, respectively, are coupled to control one-shots 1378 and 1379 shown in FIG. 32B. One-shot 1378 is controlled by the strobe #1 signal provided by the reference input circuitry 93B over line 1377 and issues a latch enable pulse signal which appears on line 1380 for enabling the latches 1371 and 1373. Similarly, the pulse appearing on output line 1381 from one-shot 1379 enables latches 1372 and 1374 so that the data is available on the output lines from the latches at the proper signal system time. Either one of strobe #1 signal or the strobe #2 signal provided over the strobe lines 1376 and 1377, respectively, will satisfy OR gate 1383 which clocks FFs 1375, 1384, 1385 and 1386 to latch the information on the D inputs thereof. The strobe #2 signal on line 1376 passes through a delay 1387 and produces a delayed strobe on line 1390 which provides one input of NAND gates 1391, 1392, 1393 and 1394. Similarly, the strobe #1 signal one line 1377 passes through a delay 1396 which provides a delayed strobe on line 1397 that satisfies one input of NAND gates 1398, 1399, 1400 and 1401. NAND gates 1392 and 1399 have their outputs gated through OR gate 1404 which has an output on line 1405 that triggers the one-shot 1379. FF 1384 is clocked by either strobe signal received by the OR gate 1383 over the strobe lines 1376 or 1377. However, the following NAND gates 1392 and 1399 serve to trigger the one-shot 1379 with the properly selected delay strobe since only one of the NAND gates will be enabled by FF 1384 for passing the delayed strobe over line 1405 to the trigger input of the one-shot. Enabling of the NAND gates depends on the logical state at the D-input of FF 1384 when it is clocked by a strobe signal. The logical state is determined by the control signal input to the latch 1355 from the CPU and, by the operation of the one-shot 1364, provided on the output line of the latch coupled to the D-input of FF 1384. Thus, the triggered one-shot 1379 provides the latch enable pulse on line 1381 to transfer the information from latches 1353 and 1355 to the output lines of the latches 1372 and 1374 at the proper signal system time. The output of the OR gate 1404 on line 1405 also is employed to provide the encoder strobe pulse. The outputs of NAND gates 1398 and 1391 are connected to OR gate 1403 to produce a drive 3 strobe on line 1410 upon receipt of the delayed strobe AND gates 1400 and 1393 have their outputs connected to OR gate 1406 to produce a drive 2 strobe pulse on line 1407 upon receipt of the delayed strobe. Similarly, NAND gates 1401 and 1394 have their outputs connected to OR gate 1408 to produce a drive 1 strobe on line 1409 upon receipt of the delayed strobe. Only one of the NAND gates of each pair of NAND gates causing the generation of a drive strobe is enabled by the associated flip-flop. As described hereinabove with respect to FF 1384, the logical states of the outputs provided by FF's 1375, 1385 and 1386 are determined by control signals provided by the CPU 106 that are present at the output lines of the latch 1355 when these FF's are clocked by a strobe signal. The drive strobes on lins 1407, 1409 and 1410 are connected to the reference logic circuits for selecting either reference logic circuit 125A or 125B as the source of the drive sync signals for the disc drives.

Referring to FIG. 32B, output lines will now be described with respect to the functions they perform in the signal system. Beginning at the lower portion of the drawing, a line 1413 serves to couple a bus reply signal back to the CPU and comes from OR gate 1414 that has inputs from each of the gated device select input lines from the CPU interface. The bus reply signal notifies the CPU 106 that the addressed device has been communicated with. Lines 1415 couples command signals to the encode switch 126 according to the operating mode requested, i.e., the E-E mode, transfer mode, test mode or video input for record mode. Line 1416 couples commands to the encoder switch 126 to use either the reference or video sync as the sync source. Lines 1417 couple drive select signals for selecting one of three drive outputs for playback channel A, B or C and enables any one of three drives to be coupled to one or more of the channels. Lines 1418 provide an automatic picture level command to the blanking insertion and bit muting circuitry 127 for inserting an average picture level on the channel carrying playback signals when a seek operation is occurring, i.e., when the playback heads in the disc drive are moving from one track to another. The encoder strobe issued over line 1405 is sent to the encoder switch 126 and supplies the strobe pulse for selecting the mode of operation of the encoder switch, i.e., whether it is in a test, delete, transfer or record mode of operation. In other words, when the strobe signal is sent, the levels on the two input lines 422 of the encoder switch (see FIG. 13C) provide a 2 bit binary word that determines the operating mode in accordance with the truth table shown to the right of FIG. 13B. Lines 1419 provide a sync select signal for each of the three drives and lines 1420 provide a black level command to the blanking insertion and bit muting circuitry 127, in the event that a true tally check indicates error, in which case the channel will be commanded to go to black level. The true tally check error is derived by the CPU 106 from the disagreement of the requested track number and the number from the data track surface on the disc pack during playback. Lines 1421 issue a command to turn on the chroma inverter of the chroma portion 101 of the apparatus during normal playback, but turn off the chroma inverter during the E-to-E mode of operation, because during the E-to-E operation no playback is being processed and there is no necessity of providing any chroma inversion since the full four frame sequence of the television signal is present. The chroma inversion is necessary when a complete color encoded sequence is being produced from a signal that is received having less than the number of fields required to provide a complete color encoded sequence. In the NTSC television standard, four television fields are required and in the PAL television standard eight fields are required. The other lines not having a specified function are not used.

When information or data is to be sent to the CPU 106 from the signal system, the CPU interface 108 activates the device select line 1356. Upon receipt of the bus data in control signal provided on line 1358 by the CPU 106, AND gate 1411 is enabled to place an enabling gate signal on one of the inputs of the AND gates 1412. In this manner, data received from the signal system over lines 122 is transferred directly to the main bus 105 for transmission to the CPU 106.

FIRST DATA TRACK INTERFACE

The computer control system shown in the block diagram of FIG. 8 includes data track interfaces 1 and 2 that are used to perform various functions and interfacing operations between the CPU 106 and the data track disc surface for the stills in a disc pack. The data track disc surface contains the pack identification number as well as the track identification number for each of the 815 tracks on each disc pack. Additionally, the data track identifies whether a track is available for the recording of a still or whether a still recorded on it should be protected. The pack and track information contained in the data track is used to perform a true tally check following a head position change to assure that the heads have gone to the right location. Since the information that is recorded on the data track surface is in serial form, the data track interface circuitry must convert it to parallel data that can be asserted on the address and data bus 105 for communication with the CPU 106. Additionally, the data track surface information is recorded using the normal signal system data rate which is 3SC. This rate is substantially higher than that which can be handled by the CPU. Thus, the data track interface circuitry handles the data transmitted to and from the signal system so that when it is asserted on the address and data bus 105, it is compatible with the CPU rate clock.

The first data track interface circuitry performs the actual translation of parallel data to serial data for recording on the disc data track surfaces, while other portions of the circuitry translate the serial data to parallel data as the data is being read or played back from the data track surfaces. Moreover, the first data track interface performs level translations for converting between ECL logic and transistor-transistor logic. The operation of the first data track circuitry must be described in connection with two block diagrams, FIGS. 33A and 33B, which respectively illustrate circuitry that converts from serial to parallel and from parallel to serial translations.

Figure 33A:
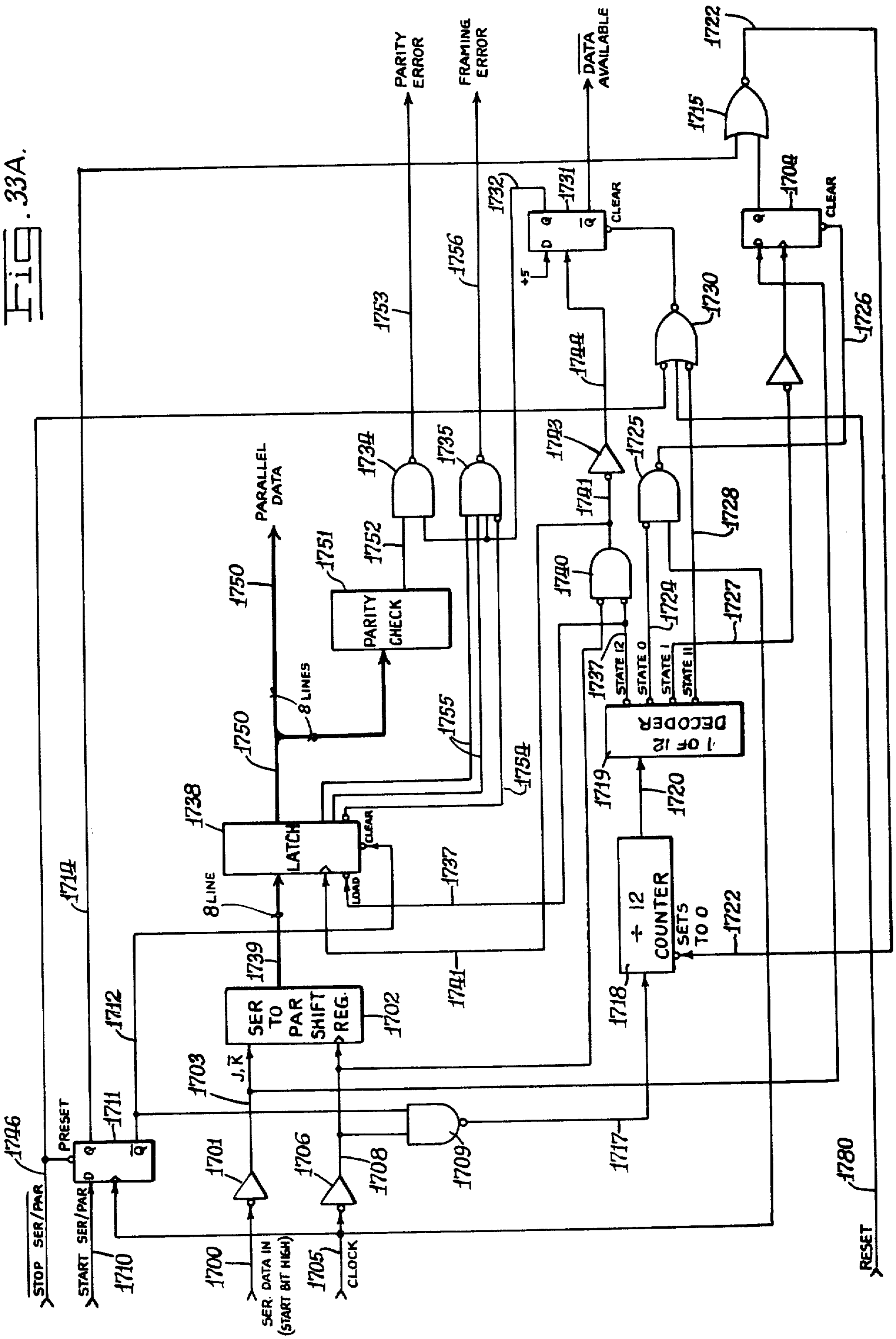
FIGS. 33A and 33B are functional block diagrams of the first data track interface portion of the computer control system of the apparatus.

Turning firstly to FIG. 33A, the serial data is read from the data track of a disc pack and is applied on line 1700 by the data decoder portion of the data decoder and time base corrector circuitry 100 operatively associated with the data track disc surface. The data on line 1700 is inverted by inverter 1701 and applied to a serial in, parallel out shift register 1702 via line 1703 which also extends to a FF 1704. A 3SC rate data clock is input by the data decoder circuitry on line 1705 and inverted by inverter 1706 and clocks the shift register 1702 via line 1708 which also extends to one input of a NAND gate 1709. A start command from the data track interface 2 (FIGS. 34A-34H) on line 1710 is clocked to a FF 1711 which has a low output line 1712 that extends to the NAND gate 1709 and a high output on line 1714 extending to a NOR gate 1715. When the NAND gate 1709 is satisfied, the clock appears on its output line 171 and clocks a divide by 12 counter 1718 which is connected to a decoder 1719 via line 1720 and the decoder has four separate output states that perform various functions during the operation of the circuit. The counter 1718 normally sequences states one through twelve and then to state one. It reaches state zero only through reset.

It should be understood that the format of the data transmission includes a high start bit, eight data bits, a parity bit and two low stop bits. When the serial data comes in, the start bit must be high to prevent a signal on line 1722 which would clear the counter to zero. This is done by examining the start bit using line 1703 into the FF 1704 which is clocked to the NOR gate 1715 which zeros the counter via line 1722 when the start bit is improper, i.e., when it is low. The outputs of the decoder include a state zero line 1724 which clears the FF 1704 when state zero is reached. Entering state 1 line 1727 clocks the FF 1704 and state 11 on line 1728 extends to a NOR gate 1730 which clears a FF 1731 that provides a data available indication on line 1732 that is gated to NAND gates 1734 and 1735. When the decoder reaches state 12, line 1737 goes low and provides a load enable signal to a latch 1738 that receives the data from the shift register 1702 via lines 1739. State 12 line 1738 is also applied to a NOR gate 1740 which has an output on line 1741 that clocks the latch and loads the data into the latch 1738, in addition to providing a clock pulse to the FF 1731 via inverter 1743 and line 1744 to indicate to the data track interface 2 that data is available.

When a stop serial to parallel command is present on line 1746 extending from the data track interface 2, the FF 1711 is preset which causes FF 1711 to clear the latch 1738 as well as the counter 1718 by means of line 1714, NOR gate 1715 and line 1722. The data in the latch 1738 is provided on output lines 1750 for coupling to data track interface 2. These lines also extend down to a parity check circuit 1751 which provides an output on line 1752 that is gated through NOR gate 1734 to provide a parity error on line 1753 which is sent to data track interface 2. Similarly, framing errors are checked by the NAND gate 1735 which has input line 1754 examining the start bit and lines 1755 examining the two stop bits. In the event the stop bits are not low or the start bit is not high, then a framing error signal will appear on line 1756.

Figure 33B:
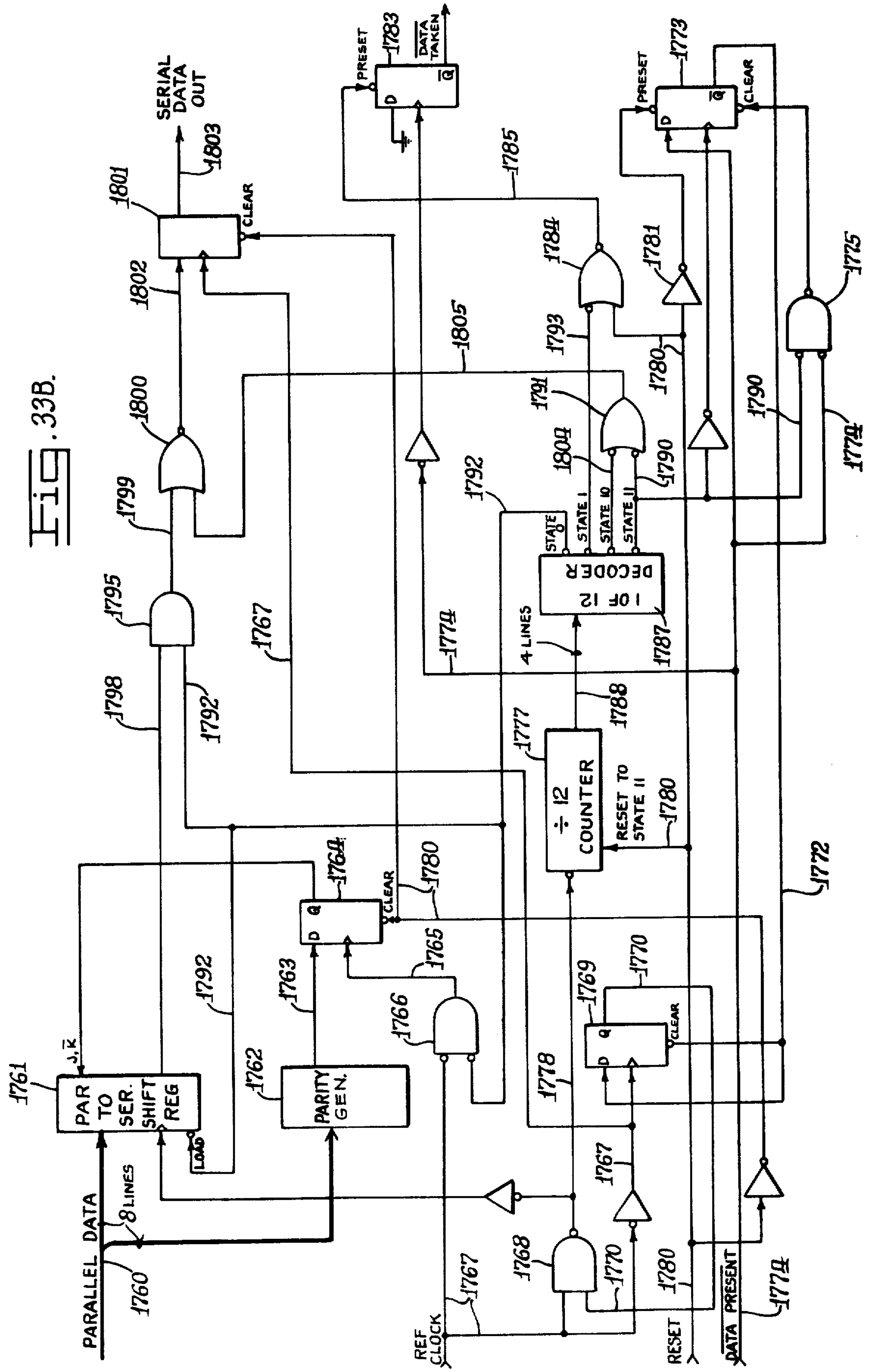

Turning now to the other portion of the first data track interface circuitry which converts parallel information to serial data for recording on the disc data track surface shown in FIG. 33B, parallel data from data track interface 2 appearing on eight lines 1760 is applied to a parallel in, serial out shift register 1761 as well as to a parity generator circuit 1762, the output of the parity generator appearing on line 1763 that is loaded into FF 1764 at the next clock pulse on line 1765 that is generated by a NOR gate 1766 from a reference clock input line 1767. A 3SC reference clock signal provided on line 1767 by the encoder 126 is also applied to a NAND gate 1768 which is enabled by a FF 1769 via line 1770. FF 1769 disables the NAND gate 1768 when it has been cleared with a clear signal on line 1772 that is provided by a FF 1773. When the parallel data is present on lines 1760, a data present signal placed on line 1774 by the data track interface 2 is applied to the FF 1773 as well as to an OR gate 1775. The data present signal also clocks a FF 1783 to place it in the data not taken state. The circuitry has a divide by 12 counter 1777 which is clocked by the NAND gate 1768 via line 1778 and is reset to state 11 by a reset line 1780 from disc track interface 2 which also presets FF 1773 through inverter 1781 and presets a FF 1783 to its data taken state via a NOR gate 1784 and line 1785. The counter 1777 is connected to a decoder 1787 via line 1788 and provides output lines of the various states 0, 1, 10 and 11. When the counter is reset it is reset to state 11 which, when decoded, provides the signal on line 1790 to a NAND gate 1791 as well as to the OR gate 1775 which clears FF 1773 and enables the clock via line 1772, FF 1769 and line 1770 to the NAND gate 1768. At the next clock transition of the reference clock, the state zero line 1792 is active which extends to the NAND gate 1766 and clocks the parity information into the FF 1764 from the parity generator circuit 1762. At state 1, line 1793 becomes active and is gated through NOR gate 1784 to preset the FF 1783, to its data taken state, indicating to the data track interface 2, that the data on line 1760 has been loaded into the shift register 1761, the loading having been accomplished by line 1792 which extends to the load input of the shift register as well as to an AND gate 1795. The AND gate 1795 will have the input 1792 in a normally high condition except for the zero state, so that after the start bit has occurred, the AND gate 1795 will pass the serial data from the shift register 1761 on line 1798 onto line 1799 and through NOR gate 1800 into a FF 1801 via line 1802 and be clocked out on line 1803 to be recorded in the appropriate data track of the disc pack on the selected disc drive. When states 10 and 11 are decoded, then either line 1790 or line 1804 produce a high on line 1805 which extends to the NOR gate 1800. The serial data appearing on line 1803, because of the gates 1795 and 1800 always have the start bit high and the two stop bits low as is desired.

Specific circuitry that can be used to carry out the operation of the block diagrams of FIGS. 33A and 33B are shown in FIGS. 57A and 57B. The operation of the circuitry shown in FIGS. 57A and 57B is substantially similar to that previously described with respect to FIGS. 33A and 33B and will therefore not be described in detail, except for one aspect thereof. Referring to FIG. 57A, the serial data that is on line 1700 can originate from any one of the three separate channels, as can the data clock signal on line 1705. Similarly, a serial line identification signal on a line 1757 can originate from the time base corrector portion of the decoder and time base corrector circuitry 100 any of three channels. The line 10 from the selected channel is sent to the data track interface 2. Channel control lines **1560*a*, 1560*b* and 1560*c* respectively control one input of NAND gates 1759*a*, 1759*b* and 1759*c* for respectively gating the data, clock and line identification of channels A, B of C to OR gates 1776*a*, 1776*b* and 1776*c*. One of the channel select lines 1560*a*, 1560*b* or 1560*c* is activated by FF 1542** (FIG. 34C) of the second data track interface.

SECOND DATA TRACK INTERFACE

The second data track surface interface performs three basic functions, i.e., that of providing a storage mechanism for the data that is being played back from the disc pack data track surface so that it can be sent to the CPU 106 at the rate of the CPU clock, which is slower than the 10.7 MHz (3SC) rate it is recorded onto and played back from the disc pack data track surface. The second function is to control the sending of serial data from the interface to the disc for recording and the third is to control the receiving of serial data from the CPU for storage.

As will be described in detail hereinafter, a random access memory provides the storage mechanism for the data that is to be recorded on or played back from the disc data track surface and the RAM acts a buffer device between the disc drive and the CPU. The RAM is a 64 address by nine bit RAM that is thereby capable of handling 64 bytes of information that can be transferred between the CPU and the RAM as well as between the RAM and the disc. As will be evident from the ensuing discussion, the transferring of the data from the RAM to the disc involves much different circuitry than that used to transfer the information from the disc to the RAM, and the circuitry distinguishes these operations by referring to them as RAM-to-disc mode and conversely disc-to-RAM mode.

During recording, i.e., recording the information from the RAM onto the disc surface, the data that is needed to be recorded is placed in 16 address locations of RAM, each location containing eight bits of information. Thus, four bytes of information are stored in the first four locations of RAM and they are repeated a second, third and fourth time, filling 16 locations of the RAM. This is converted to serial information which is then sent through the encoder 96 of the signal system for recording on the disc drive recording surface of each disc pack in the channel encoded form. While each of the four bytes is repeated four times which fills ¼ of the RAM, all 64 addresses are recorded on the data track surface for each track. The reason for the redundancy of the four bytes of information is to provide a comparison to indicate whether the data received during the playback is valid. Each of the bytes to be recorded is serialized into one start bit followed by eight bits of data, a parity bit, and ending with two stop bits, which total 12 bits of information. During the recording process, a sync word gate from the encoder 96 is used to start recording the 64 bytes from the memory and the 64 bytes provided by the data track interface 120 are coupled to the encoder 96 which inserts a sync word in the data track data and encodes it into the channel code format. Since each sync word appears every other television line, i.e., 1 sync word each two lines, the 64 bytes occupy about ⅜ of the total data track surface of two lines. In other words, the recording of the 64 bytes takes approximately ⅜ of the time period between successive sync words. Since the sync word appears about 131 times per television field, the 64 bytes are recorded on the data track surface about 120 times, it being less than the 131 times because the information is not recorded during the vertical blanking period.

During playback of the data track surface, logic circuitry waits for the sync word to be detected by the data decoder portion of the decoder and time base corrector circuitry 100 and then reads the data from the disc surface, all 64 bytes, then generates an operation complete flag which informs the CPU 106 to examine the RAM in the data track interface 120. The data track interface 1 circuitry converts the serial information from the data track surface to parallel information and presents it to the data track interface 2 where it is written into the RAM in the event that no errors are present. The address counter of the RAM is advanced after each data is written into an address. However, if during the transmission from the disc to the RAM, a framing or parity error is detected during playback, the operation is aborted and the circuitry waits for the next sync word to appear to repeat the operation. This operation is repeated until all 64 bytes are received with no parity or framing error and then the operation complete flag will appear for the CPU. Each time the circuitry fails to read 64 consecutive bytes from the disc, it advances an error counter which provides an excessive error flag if a certain error count is reached, which indicates the deterioration of the particular data channel being used.

Figure 34A:
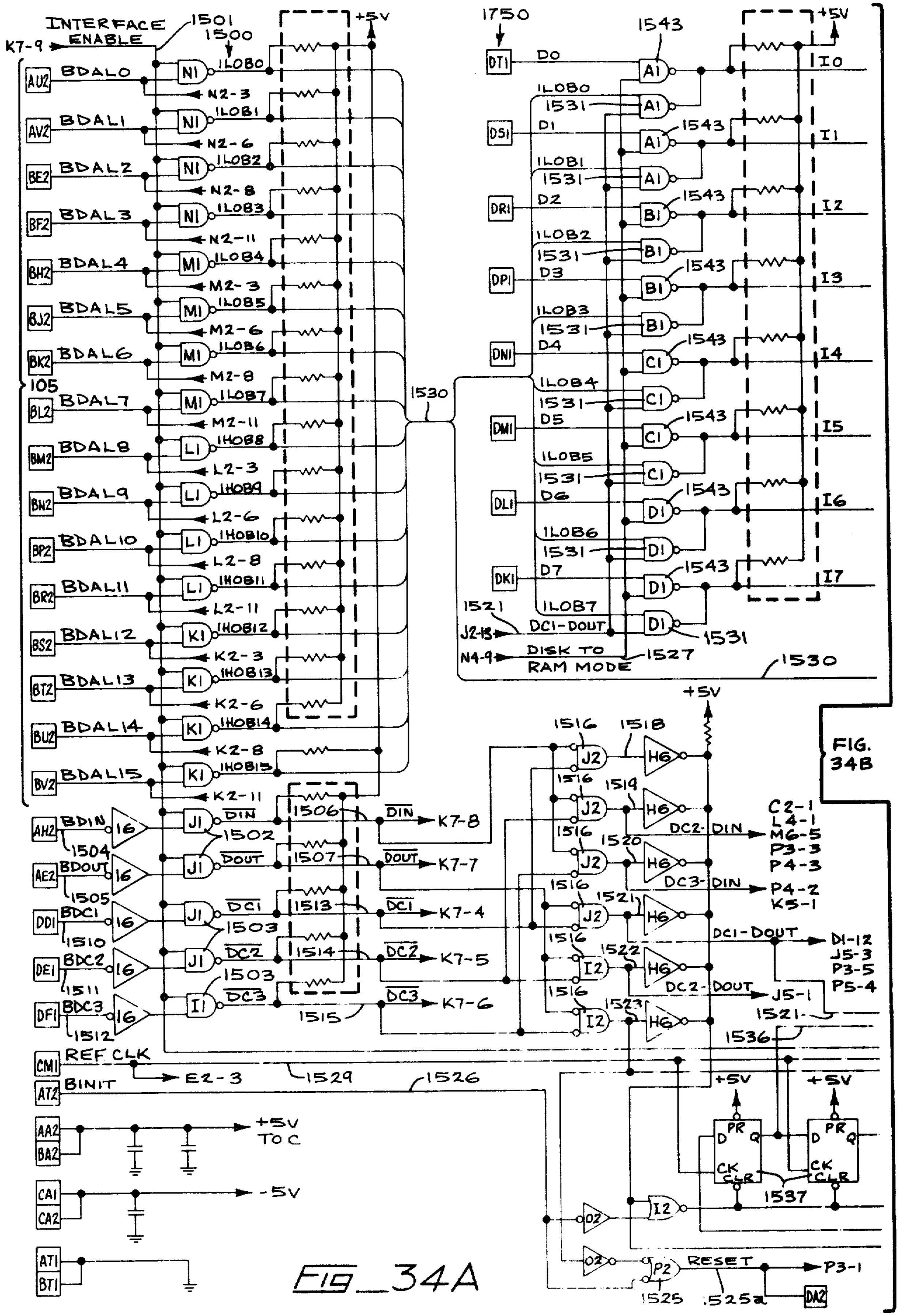
Figure 35A:
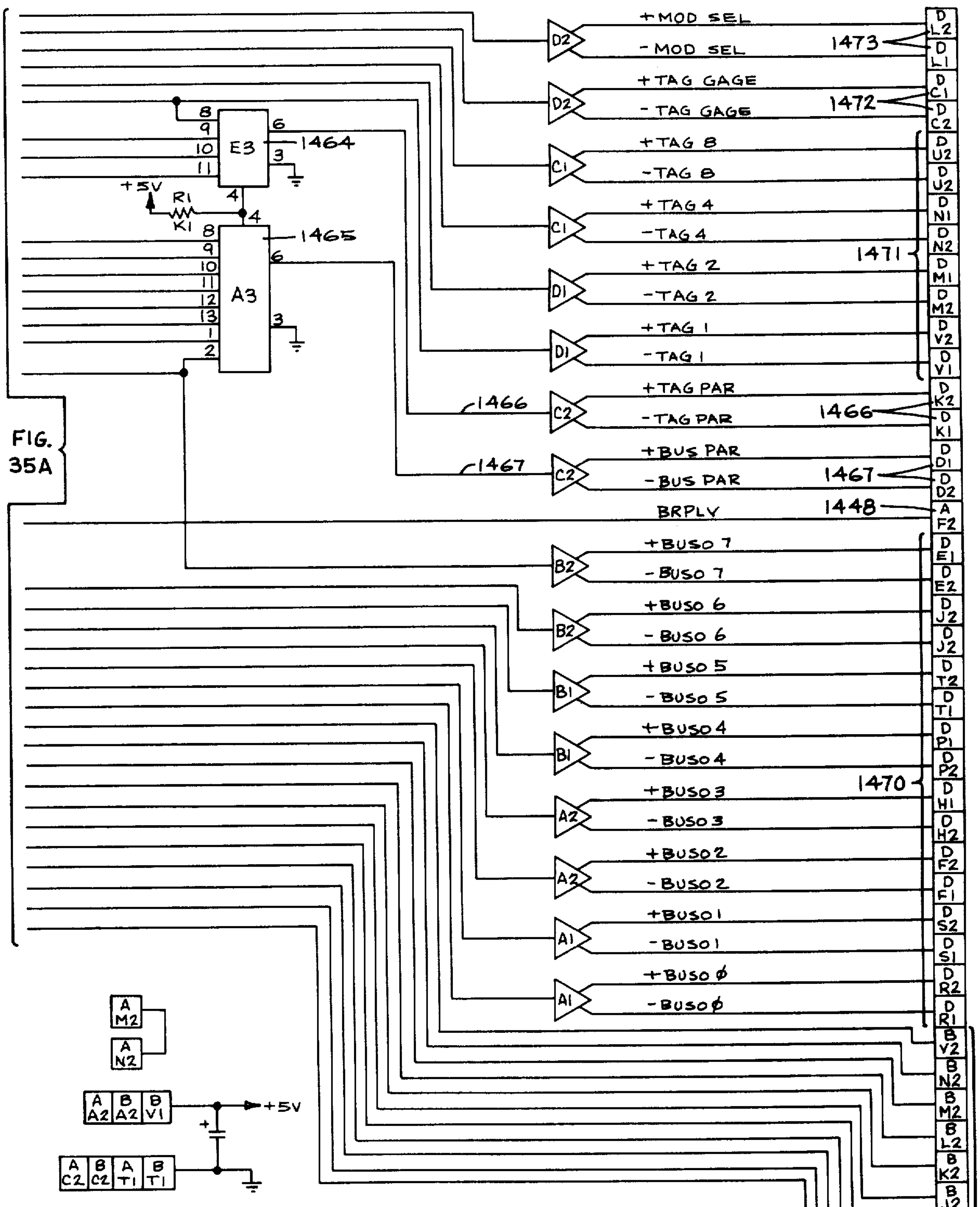

Turning now to the drawings and particularly FIGS. 34A through 34D which together comprise the logic circuitry for controlling the flow of information over the address and data bus 105 between the CPU 106 and the RAM of the data track interface 120, the address and data bus lines 105 are shown on opposite ends of the drawng (FIGS. 34A and 34D) which respectively illustrate the data being gated from the CPU 106 on the left (FIG. 34A) an to the CPU on the right (FIG. 34D). The 16 lines are gated by NAND gates 1500 when interface enable line 1501 is placed high by a manually controlled switch. The purpose of this line is to disable the interface when it is being tested by a piece of equipment that is not an operational part of the apparatus. The interface enable line 1501 also extends to NAND gates 1502 and 1503 and is high during normal operation and is low only during testing when it is desired to isolate the circuitry from the bus lines 105. The NAND gates 1502 are connected to bus data in and bus data out control lines 1504 and 1505 coupled to the control lines 144 of the CPU 106 (FIG. 8) and produce "not data in" 1506 and "not data out" signals on lines 1506 and 1507, respectively. The NAND gates 1503 have their respective other inputs supplied by device select lines 1510, 1511 and 1512 coupled to the device select lines 114 of the CPU interface 108 (FIG. 8) which produce outputs on lines 1513, 1514 and 1515 that are gated through a series of NAND gates 1516, together with the not data in and not data out lines 1506 and 1507, to produce controlling signals on lines 1518, 1519, 1520, 1521, 1522 and 1523. These lines provide signals to other locations in the circuitry shown in FIGS. 34B through 34D and satisfy logic conditions to perform certain operations which will be described. Line 1518 is active when BDIN on line 1504 and BDC1 on line 1510 are active which occurs when data from the disc drive is to be written into the RAM 1533. Line 1519 is active when BDIN on line 1504 and BDC2 on line 1511 are active which occurs when data in the RAM is to be sent to the CPU 106. Line 1520 is active when BDIN on line 1504 and BDC3 on line 1512 are active which occurs when data relating to the status of the interface logic is to be sent to the CPU 106. Line 1521 is active when BDOUT on line 1505 and BDC1 on line 1510 are active which occurs when data from the CPU is to be sent to the RAM 1533. Line 1522 is is active when BDOUT on line 1505 and BDC2 on line 1511 are active which occurs when data is being sent from the CPU 106 to the data track circuitry specifying either the disc-to-RAM or the RAMto-disc mode of operation and identifying drives and channels that are to be used. Line 1523 extends downwardly to NOR gate 1525 to provide a reset pulse on line 1525*a* which occurs when the device select line 1512 and a bus data out line 1504 are active. The reset pulse sets the logic circuitry in both the data track interfaces 1 and 2 to an initial condition for performing interface operations between the CPU 106 and the data track surface. A reset pulse is also produced during the presence of the bus initialize command received on line 1526 from the CPU 106. As described herein before, the bus initialize command is used to set the logic to a known state during, for example, start up.

Data from the CPU on address and data bus lines 105 is gated through NAND gates 1500 and appears on line 1530 that extend to a series of NAND gates 1531 which gate the data onto lines 1532 into the input of a random access memory 1533 when line 1521 is active by receipt of the appropriate device select signal and a bus data out control signal. Thus, the data from the CPU 106 can be written into the RAM when gates 1531 are enabled and a write command appears on line 1534 from NAND gate 1535 which has inputs supplied by line 1521 and lines 1536 that come from a shift register comprising four FFs 1537 clocked by the 3SC reference clock signal received from the data track interface 1 on line 1529. The shift register 1537 also provides a bus reply signal on line 1544 to the CPU after the data has been written into the RAM 1533. In addition to the data from the CPU being written in the RAM 1533, data from the disc drive appearing on lines 1750 can be written into the RAM 1533 when NAND gates 1543 are enabled which occurs when line 1527 is active and this occurs when the circuit is operating in the disc-to-RAM mode.

While only the eight lower order bit lines of the group 1530 extend to the NAND gates 1531, the entire group of 16 bit lines extends downwardly to FIGS. 34B and 34C, with the six lower order bit lines being connected to a pair of one of eight decoders 1540 while the eight higher order bits are connected to a pair of latches 1541 as well as to another pair of latches 1542. Additionally, six of the bit lines extend to FIG. 34D into NAND gates 1545 which provide address information on address lines 1546 when line 1521 is active. The lines 1546 comprise the address lines that are connected to the address inputs of RAM 1533. In this manner, the data from the NAND gates 1531 can be written into the RAM at the addressed locations when a write command is present on line 1534. Data in the RAM 1533 is sent out to the disc drive on output lines 1548 that are connected to the lines 1760 extending to the data track interface 1 shown in FIG. 33B.

The decoders 1540 shown in FIG. 34C receive the binary number defined by the six low order bits from data lines 1530 when lines 1522 and 1536 are active and hae outputs that are connected to NAND gates 1550, 1551 and 1552. These gates provide outputs on lines 1553, 1554 and 1555. Line 1553 enables latches 1541 and enables the address to be written into the latches. Line 1554 enables the latches 1542 in addition to presetting a FF 1557 which has a pair of output lines 1538 and 1539 that specifies the RAM-to-disc mode of operation. Similarly, line 1555 also sets the latches 1542 and presets a FF 1558 which is connected to a pair of output lines 1527 and 1528 that specifies the disc-to-RAM mode of operation. The output lines 1559*a*, 1559*b* and 1559*c* of FF 1542 extend to the NAND gates 1600 (FIG. 34E) and define the respective drive to which data is to be recorded and output lines 1560*a*, 1560*b* and 1650*c* from the other FF 1542 extend to the three of the NAND gates 1572 which define which of the channels A, B or C that is to be used for processing the playback data track information.

The latches 1541 provide address information on lines 1562 which are gated by NAND gates 1563 when line 1519 is active to pass the address information onto lines 1546 extending to the RAM address inputs. This provides a command to read the RAM 1533 which contains data from the disc. Lines 1546, in addition to going to the RAM, are also connected to NAND gates 1565 which are also enabled by line 1519 and thereby gate the address information onto the CPU address and data bus lines 105 when associated output NAND gates 1566 are enabled by lines 1567. Lines 1567 are active when either of lines 1519 and 1520 (generated from the bus data in command and the appropriate device select signal), together with an interface enable signal on line 1568 are present. Line 1568 will generally be low except during test operations provided by testing apparatus that can be connected to cable connectors 1569 by operating personnel.

While the high order address bits are gated onto the address and data bus 105 by the NAND gates 1565, the low order bit information on lines 1548 from the RAM are gated to bus 105 by a number of NAND gates 1570 which are enabled by line 1519 so that the eight bits of data are sent to the bus 105 via lines 1571. Lines 1571 also extend back to the outputs of another set of NAND gates 1572 which also provide the eight low order bits of information when line 1520 is active enabling the NAND gates 1572, and status information concerning the interface circuitry can then be sent to the CPU. For example, status information concerning whether the data track interface 120 is operating in a RAM-to-disc or disc-to-RAM mode is sent, and if it is reading data from a disc or putting data onto the disc provides an operation in progress signal on line 1528, generated by the interface circuitry illustrated in FIGS. 34E–34H. An excessive read error status is provided on line 1547 from the excessive read error detector 1654 (FIG. 34H) as well as an operation complete signal on line 1549 from the interface circuitry shown in FIGS. 34E–34H and a signal indicating what channel has been selected to playback the information.

When the circuit is operating in either the RAM-to-disc or disc-to-RAM mode, an OR gate 1574 has an output on line 1575 which enables a number of NAND gates 1576 which gate address information present on lines 1577 that is generated by counters 1578 and 1579. The counters sequentially count through the 64 addresses under control of count incrementing signals provided over either lines 1639 or 1691 (FIG. 34H) to input line 1582. The incremented counter selects the information to be placed onto the disc from the RAM or the converse. The counter is cleared by a signal provided on line 1583 by the circuitry shown in FIGS. 34E–34H. The outputs 1577 are also gated to produce signals on line 1580 indicating that the address counter is less than 63 and also a signal on line 1581 in the event that the address counter is greater or equal to count 64. These indications are used by the circuitry shown in FIGS. 34E–34H which will be described herein.

Turning now to FIGS. 34E through 34H which together comprise a single electrical schematic diagram of a portion of the second data track interface, the total composite drawings (FIGS. 34E–34H) can generally be considered to have two halves, the upper half that is for controlling the RAM-to-disc mode during which the parallel data from the RAM 1533 is converted into serial form for recording on the disc data track surface. The lower half of the circuitry is for controlling the disc-to-RAM mode where the serial information from the disc data track surface is converted to the parallel information and written into the RAM 1533.

Referring to the top portion of FIG. 34E relating to the RAM-to-disc mode, when one of the disc drives 73 has been selected, one of the three NAND gates 1600 will be enabled and provide a signal on their respective outputs to satisfy OR gate 1601 when the other input to one of the NAND gates 1600 is active which occurs when a recording is being performed. Thus, a data timing pulse appears on line 1602 when a drive is recording and it disappears when the recording is complete. The data that is to be recorded on the disc data track surface is not recorded during the vertical blanking period, nor is it desired to record it until after the sync word has been inserted. Accordingly, the data timing pulse on line 1602 extends to a NAND gate 1603, the output of which indicates that a RAM-to-disc operation is in progress which occurs when a RAM-to-disc mode input on line 1538 is active and line 1605 is true as a result of a signal from the signal system indicating that it is not in vertical blanking. Thus, the output of the NAND gate 1603 appears on line 1604 to a NAND gate 1605 that has another input line 1606 that is satisfied one clock pulse after the sync word gate has ended.

The sync word gate signal from the encoder 96 is applied to line 1607 which is clocked through a shift register comprising FFs 1609 which operate a preset a FF 1610 through NAND gate 1611 which is true one pulse after the sync word gate is stopped. Thus, the output of NAND gate 1605 starts the recording sequence at the end of a sync word. Line 1613 from the NAND gate 1605 is applied to a shift register comprising FFs 1614 which have outputs to a NAND gate 1615 and provide a clear address counter pulse on line 1616 which extends to the input line 1583 of the address counter 1578 and 1579 shown in FIGS. 34C and 34D for clearing the counters to ready them for the 64 address count sequence. The shift register 1614 also is connected to NAND gate 1618 that clocks a signal on line 1619 after the clear address counter pulse is produced and line 1619 is connected to NOR gate 1620 for clocking a shift register comprising FFs 1621 for producing a data present signal on line 1622 which informs the parallel to serial converter in data track interface 1 that parallel data is present on the output of the RAM 1533 for any address. A shift register comprises FFs 1625 and the output of the shift register appears on line 1626 enabling one input of a NAND gate 1627 which provides a test to determine if the address of the counter is less than 63 which is provided by input line 1580 from FIG. 34D.

If the address is less than 63 then line 1629 presets a FF 1630 having an output on line 1631 to a NAND gate 1632 which waits for a signal on line 1633 indicating that data has been taken by the parallel to serial converter which is generated by FFs 1634 and the input data not taken on line 1635. When the data has been taken, then NAND gate 1632 is true and provides an output on line 1637 to FF 1638 that increments the address counter via line 1639 and also has line 1640 to another FF 1641 which has an input line 1642 extending back to the NOR gate 1620 which generates the data present signal on line 1622. Thus, addresses 0 through 63 will be clocked through to be recorded until the data at all addresses of the RAM 1533 have been clocked out. When address 63 is reached, NAND gate 1627 will not be satisfied and the circuitry will merely wait for the next sync word gate to start again. When the data timing pulse disappears NAND gate 1645 will be satisfied after two clock pulses through a shift register comprising FF 1646, and the output of NAND gate 1645 will preset a FF 1647 to provide a signal that a RAM-to-disc operation has been completed.

Figure 34G:
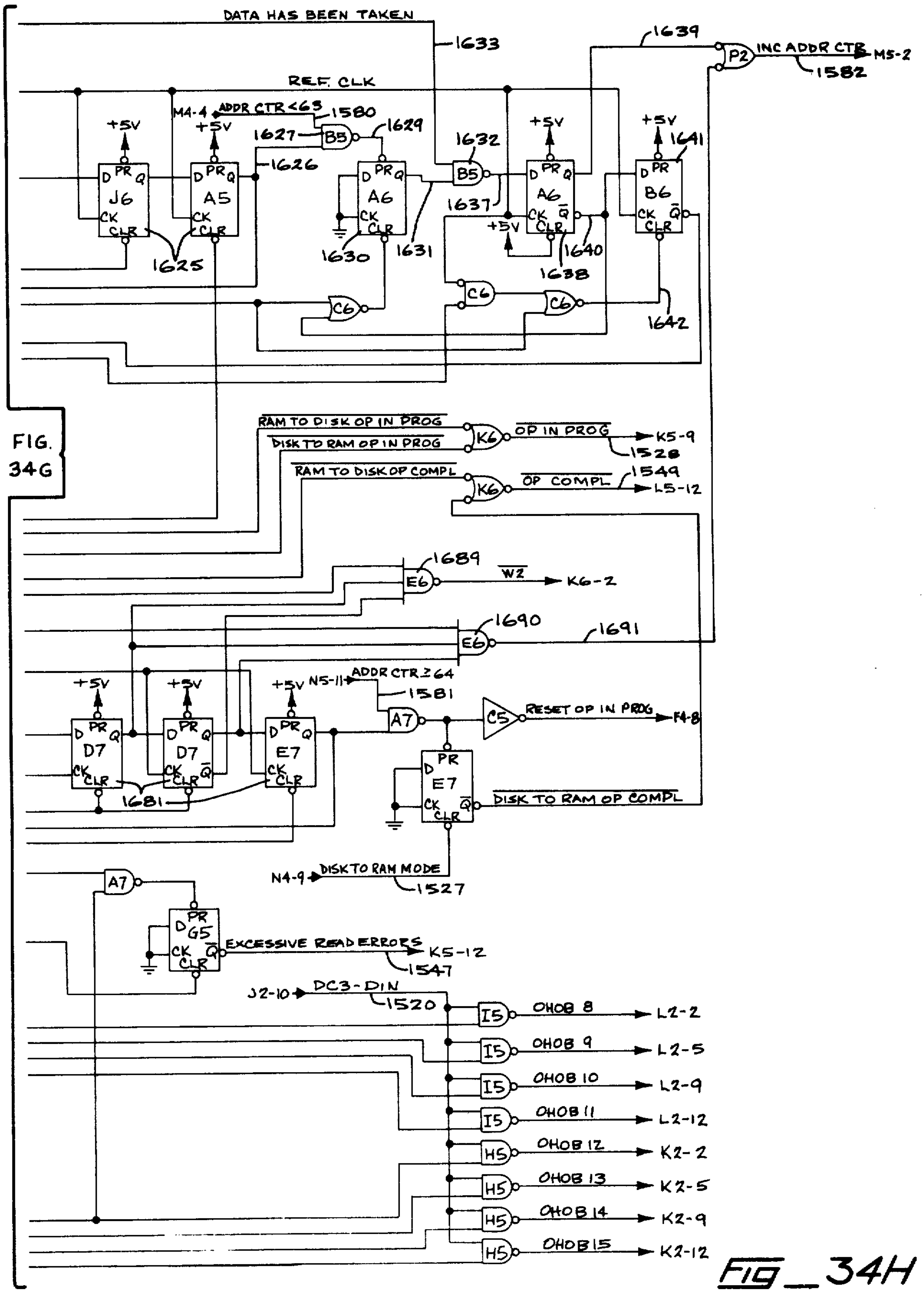

Turning now to the lower portion of the drawing which describes the operation of the circuitry during a disc-to-RAM mode, the presence of a disc-to-RAM mode signal on line 1527 allows FF 1651 to be set which provides a signal on line 1652 which clears the error counter 1653 shown in FIGS. 34G and 34H. The error counters keep track of the number of times that the reading of a complete 64 byte sequence is aborted due to the presence of a framing error or parity error as previously discussed. The data that is to be played back from the disc data track surface into the RAM was not written during the vertical blanking period so that the not vertical blanking signal on line 1605 is applied to a NAND gate 1656 having the other inputs supplied by the line identification signal provided by the data track interface 1 on line 1657. Thus, NAND gate 1656 rejects any sync word or line identification that occurs during the vertical blanking period.

When NAND gate 1656 is satisfied, indicating that a serial line ID is present, line 1658 clocks a FF 1659 which comprises one portion of a shift register that also includes FFs 1660, 1661 and 1662, FFs 1660 and 1661 of which are clocked by a clock line 1663 that is extracted from the data being read off of the disc. When the serial line ID signal appears on line 1658, the shift register provides a clear address counter command on line 1664 and provides a start serial to parallel csonversion command on line 1665 which also extends to one input of a NAND gate 1666. During 12 clock cycles, the data is clocked into the serial to parallel converter, i.e., the eight bits of data, one start bit, two stop bits and one parity bit, a data available flag on line 1667 will be produced and AND gate 1666 is satisfied, providing a signal on line 1669 to another NAND gate 1670 which has its other inputs satisfied by a shift register comprising a FF 1671 after the pulse has been clocked through. The output of NAND gate 1670 appears on line 1672 which effectively tests to see if any errors are present when data available is exerted into the RAM. Thus, line 1672 supplies one input of a NAND gate 1673 which provides a no error indication on line 1674 when neither a parity error or framing error is present from lines 1675 and 1676, respectively, which are applied to an OR gate 1677 having output 1678 to the NAND gate 1673.

In the event that either a parity error or framing error occurs, then line 1678 together with the test pulse on line 1672 satisfies NAND gate 1680 which presets a FF 1681 that is clocked to a FF 1662 and provides a signal on line 1683 that increments the error counter 1653, in addition to clearing FF 1662 via OR gate 1684 and line 1685. The FF 1662 then provides a stop serial to parallel conversion signal on line 1686 which aborts the operation. The sequence will then begin again as soon as another serial sync word on line 1658 appears. If no error was detected, then line 1674 presets a shift register comprising FF 1688 and 1681 which provides outputs to NAND gates 1689 and 1690. A NAND gate 1689 provides the write enable pulse to the RAM shown in FIG. 34B while a signal on line 1691 from NAND gate 1690 increments the address counter to receive the next byte of information from the disc and load it into the next address in the RAM.

DISC DRIVE INTERFACE

The circuitry that interfaces the disc drive with the address and data bus 105 will now be discussed in connection with FIGS. 35A and 35B which together comprise an electrical schematic diagram of the disc drive interface circuitry 118 that is shown in the computer control system block diagram of FIG. 8.

Data provided by the CPU 106 over the address and data bus 105 enters the circuitry on the left side of FIG. 35A and is loaded into associated latches 1440 and 1441 when a one-shot 1442 receives a command (DRVGO) on a device select line 1443 from the CPU interface 108 together with a bus data out command signal from the CPU 106 on line 1444. This satisfies NAND gate 1445 causing a signal on line 1446 which triggers the one-shot 1442 in addition to being input to a NOR gate 1447 which generates a bus reply signal sent to the CPU 106 on output line 1448, as do similar signals on lines 1449 and 1450 from other device select lines when the BDIN signal is present. The output of the one-shot 1442 appears on lines 1452 which loads the latches with the data appearing on the data and address bus lines 105. The latched information appears on output lines extending to the right to FIG. 35B which will be described hereinafter.

When the device select line 1454 is active (DRVSTI) indicating that the address from a selected drive is to be received on lines 1451, together with a BDIN signal on line 1455, NAND gate 1456 is satisfied and provides a low output on line 1449 extending to the NOR gate 1447. The signal is also inverted by inverters 1462 and applied to a number of line receivers 1458 which contain drive address information relating to a selected drive. Similarly, when another device select line 1459 is active (DRVST2), indicating that drive status information is to be sent back to the CPU 106, together with a BDIN signal on line 1455, NAND gate 1460 is satisfied which provides a low level on line 1450, which causes the bus reply signal to be generated. The signal on line 1450 is also inverted by inverters 1463 and applied to another set of line receivers 1461 which receive status information from a selected drive. The status information from the selected drive is sent to the CPU 106 on output bus lines 105.

Certain of the output lines from the latches 1440 and 1441 are connected to respective parity generators 1464 and 1465 which produce output signals on lines 1466 and 1467 which are tag and bus parity signals, respectively. Output lines 1470 transmit 8 bits of data to the bus lines in the disc drives themselves and lines 1471 comprise 4 bits of tag line information that defines a category of bus signal to the disc drive to determine its mode of operation. Tag gate lines 1472 are raised and tell the disc drive to accept information when they are active.

To select a disc drive, the number three generated by tag lines 1471 must be active, together with a drive number on bus lines 1470, an active module select line 1473 and, as a final step, an active tag gate line 1472. For the selected drive to be maintained in the selected conditions, the module select line must stay active.

Thus, the drive interface circuitry interconnects the 16 bus address lines 105 with the bus, tag, and other lines of the disc drive circuitry itself.

DISC DRIVE RECORD AND PLAY CONTROL

As previously mentioned, the disc drives 73 that are used in the present apparatus are preferably substantially unmodified so that advantage can be taken of the reliable operation that has been achieved through years of refinements in the design and manufacture of disc drives. Accordingly, the disc drives that are used in the present apparatus are relatively unchanged, except as previously mentioned, i.e., the 8 bits of video data together with one parity bit are simultaneously recorded on 9 parallel surfaces and the data track surface is also recorded with its information. The disc pack drive maintenance manual for the Ampex Model DM 331 disc drive, the manual having Ampex Part No. M300211 which has been incorporated by reference herein, includes Table 2-1 which illustrates the command decodes for the bus within the disc drive as well as the tag lines that control the operation that is occurring. In the Ampex Model DM 331 disc drive, tag line 11 relates to operation and status functions that are not particularly applicable to the operation of the disc drive when used with the present apparatus and, accordingly, several of the circuits that are used therein have been modified as well as replaced with circuits which are uniquely applicable to the present apparatus.

More particularly, since the normal computer data processing application of the disc drive utilizes rapid switching between read and write operations within one revolution and also utilizes small sectors of the total disc circumference, many of the standard tag 11 operation and status functions deal with this type of operation. However, with respect to the present apparatus, each revolution of the disc pack is used to either record or playback a single field of television information and a single frame will require two revolutions of the disc pack, with one field of video information being written on one set of 8 surfaces and the other field of video information being written on 8 different disc surfaces.

Since switching between read and write operations only occurs at the completion of whole revolutions of the disc, with respect to a defined point (specifically referred to as sector 000 or index) and it was chosen to be done during the vertical interval of the television signal, very rapid switching is not particularly critical with the present apparatus.

It should also be appreciated that normal data processing disc drive recording and playback is at a data rate of about 6.5 megabits per second whereas the video information that is recorded on the disc pack surfaces in the present apparatus is at a rate of about 10.7 megabits per second. Since electronic switching of the heads between the record and play circuitry of standard disc drives causes some deterioration in the signal-to-noise ratio, the electronic switches have been replaced with relays which result in an increase of about 2 dB in the signal-to-noise ratio of the resulting signal that comes off the disc pack.

Since the majority of the circuitry that is associated with the disc drive remains unchanged, only those circuits which have been added or modified will be described herein in a general manner, since they must interrelate with existing circuitry that is not shown, but which has been incorporated by a reference herein.

Figure 37A:
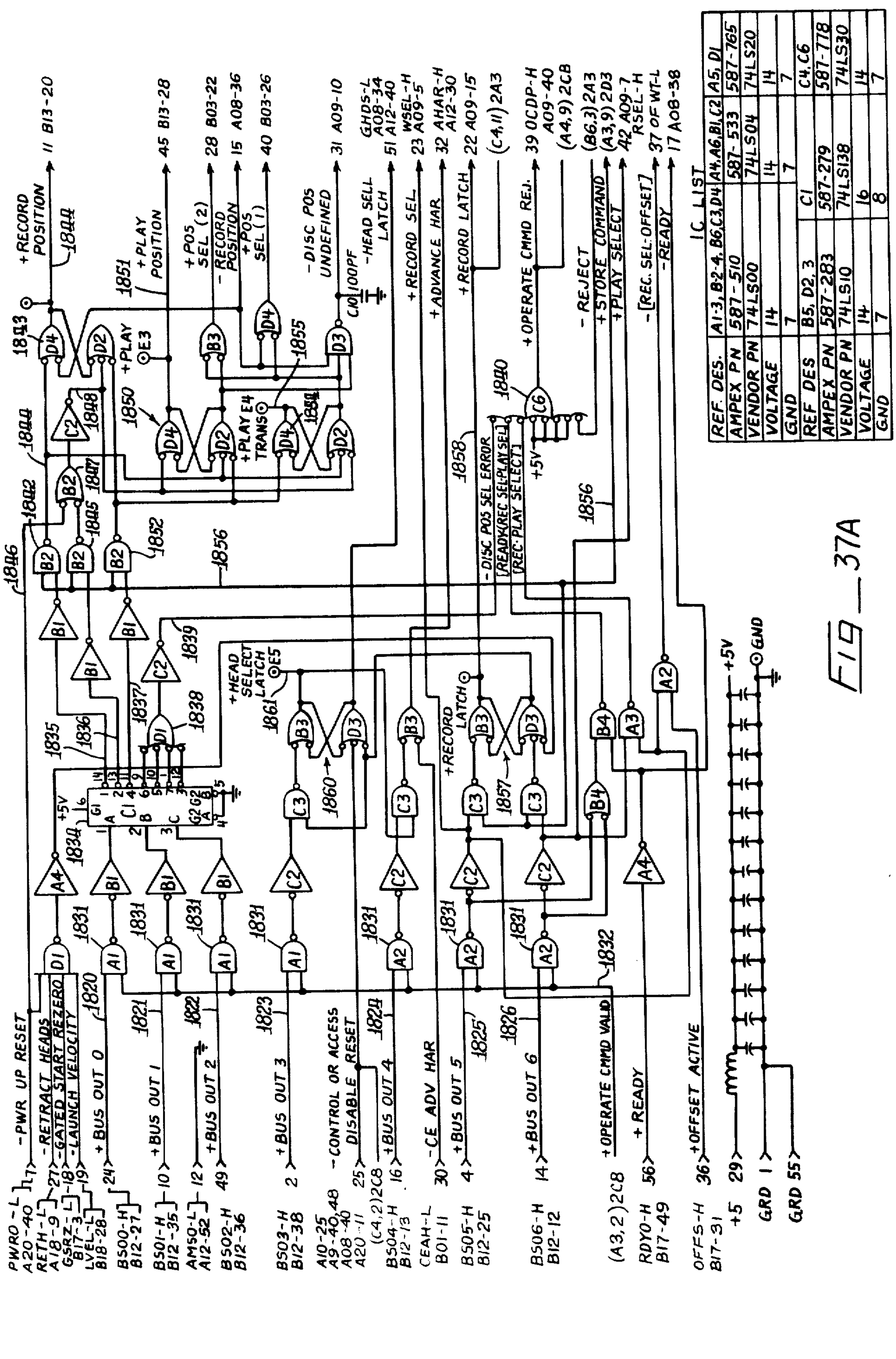
FIGS. 37A and 37B are electrical schematic circuit diagrams of the record play control circuitry for the disc drive portion of the apparatus.
Figure 37B:
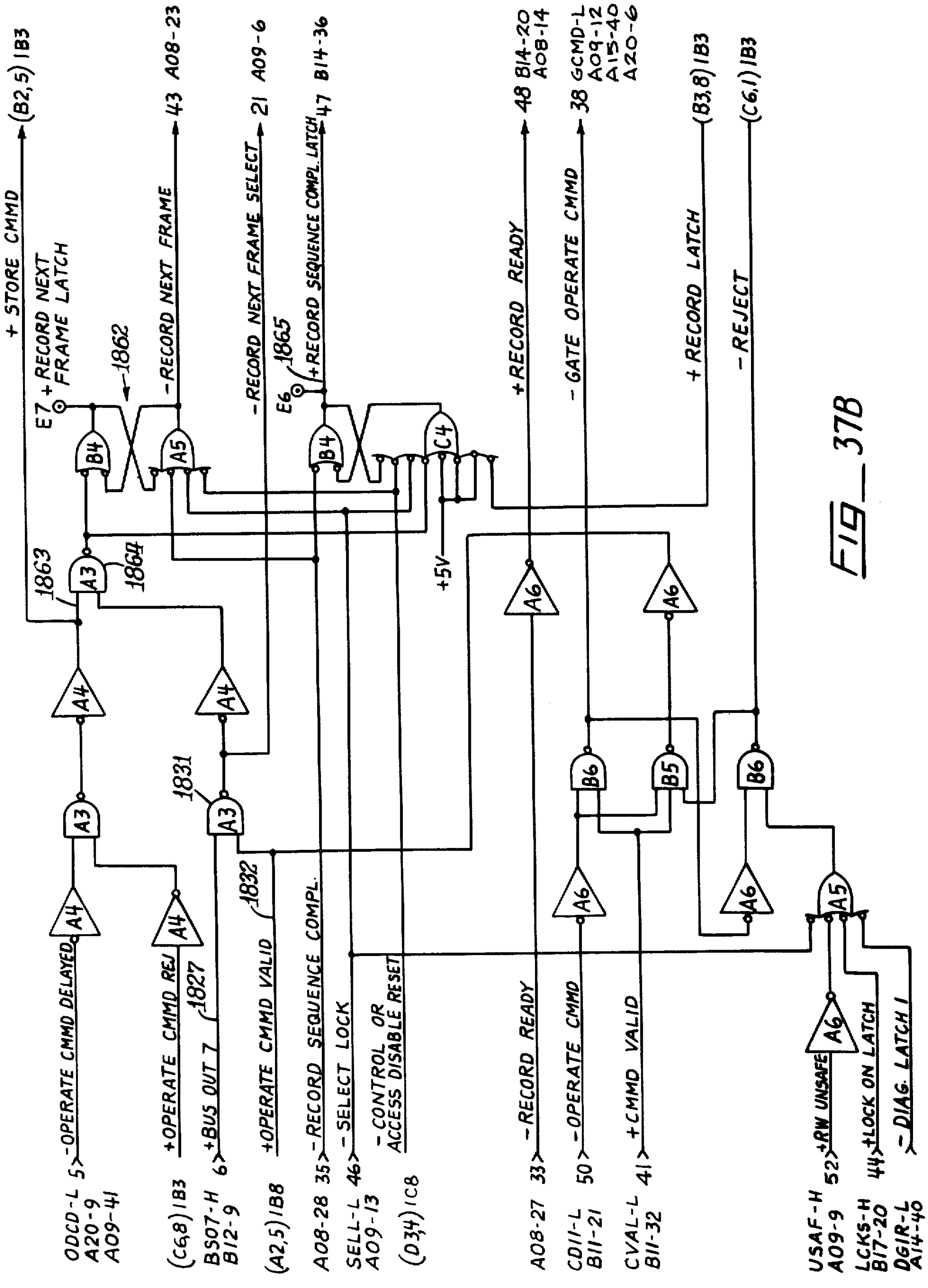

Referring firstly to FIGS. 37A and 37B, which illustrate electrical schematic diagrams of record and play control circuitry, bus out lines 1820 through 1826 are shown to the left of drawing 37A (one bus line 1827 being shown on FIG. 37B) which are gated through NAND gates 1831 when an operate command valid appears on line 1832. This results when tag line 11 in the disc drive is raised and is checked and determined to be valid. The purpose of the circuitry of FIG. 37A is to latch in commands from the computer control system 92 relating to whether the relays controlling head currents should be placed in a record position or a play position for the purpose of recording on or playing from a disc pack 75 and to command through additional circuitry the spindle servo to provide correct rotational phase of the disc pack with respect to the reference vertical sync. This phasing is as follows: (a) during record, the servo reference signal coincides with the vertical sync pulse of television signal; (b) during play-transfer, the servo reference is advanced one horizontal line duration with respect to the vertical sync pulse of television signal; and (c) during play, the servo reference is advanced two horizontal lines duration with respect to vertical sync pulse of television signal. The signals on the top three bus lines 1820, 1821 and 1822, when gated through NAND gates 1831, are inverted and applied to a 1 of 8 decoder 1834. The decoder 1834 has three of its output lines 1835, 1836 and 1837 that determine in accordance with the input commands the spindle servo phasing and are defined to be legitimate. All other decoded outputs are ORed into OR gate 1838 which, after being inverted, is sent via line 1839 to an OR gate 1840 which generates an operate command reject. This indicates that an improper command has been sent on the first three lines 1820–1823.

Referring to the decoder 1834, output line 1835 is inverted and applied to a NAND gate 1842 which, when enabled, sets a latch, indicated generally at 1843, having output line 1844. This line 1844 provides a signal directing the spindle servo to rotationally phase the spinning disc pack to the record position. Output line 1836 is applied to NAND gate 1845 after having been inverted, which is ORed with a power up reset signal on line 1846 by OR gate 1847. The output of the OR gate 1847 resets the latch 1843 via line 1848 which also sets a latch indicated generally at 1850 and directs the spindle servo to provide the play rotational phase command which appears on line 1851. When line 1837 from the decoder is active, it is inverted and gated through a NAND gate 1852 which resets latches 1843 and 1850 and sets a latch 1854 which specifies a play-transfer rotational phase command on line 1855. Thus, any one of the three legitimate outputs of the decoder specify a play-transfer record or play rotational phase when the NAND gates 1842, 1845 and 1852 receive an enable store command on line 1856.

Bus lines 1825 and 1826 carry mutually exclusive command signals to set the relays to the record or play position, respectively. When bus line 1825 is high, and the operate command valid is present, NAND gate 1831 will set a latch 1857 which will provide a high on line 1858 which places the relays in the record position and permits a recording to be carried out when the timing is correct. Bus line 1823, when gated through NAND gate 1831, sets a latch 1860 which provides a head select signal on line 1861 which is used for maintenance purposes.

Referring to FIG. 37B, a signal on bus line 1827 together with an operate command valid enabling NAND gate 1831 sets a latch 1862 provided that a store command is present on line 1863 which enables a NAND gate 1864. The output of the latch 1862 provides a record next frame signal that is used in the record timing circuitry shown in FIGS. 38A and 38B. The other commands that are generated by the circuit shown in FIGS. 37A and 37B are a signal on line 1865 indicating that the record sequence has been completed which is sent to the CPU 106 and also resets the record next frame latch 1862.

DISC DRIVE RECORD TIMING CIRCUITRY

Figure 38A:
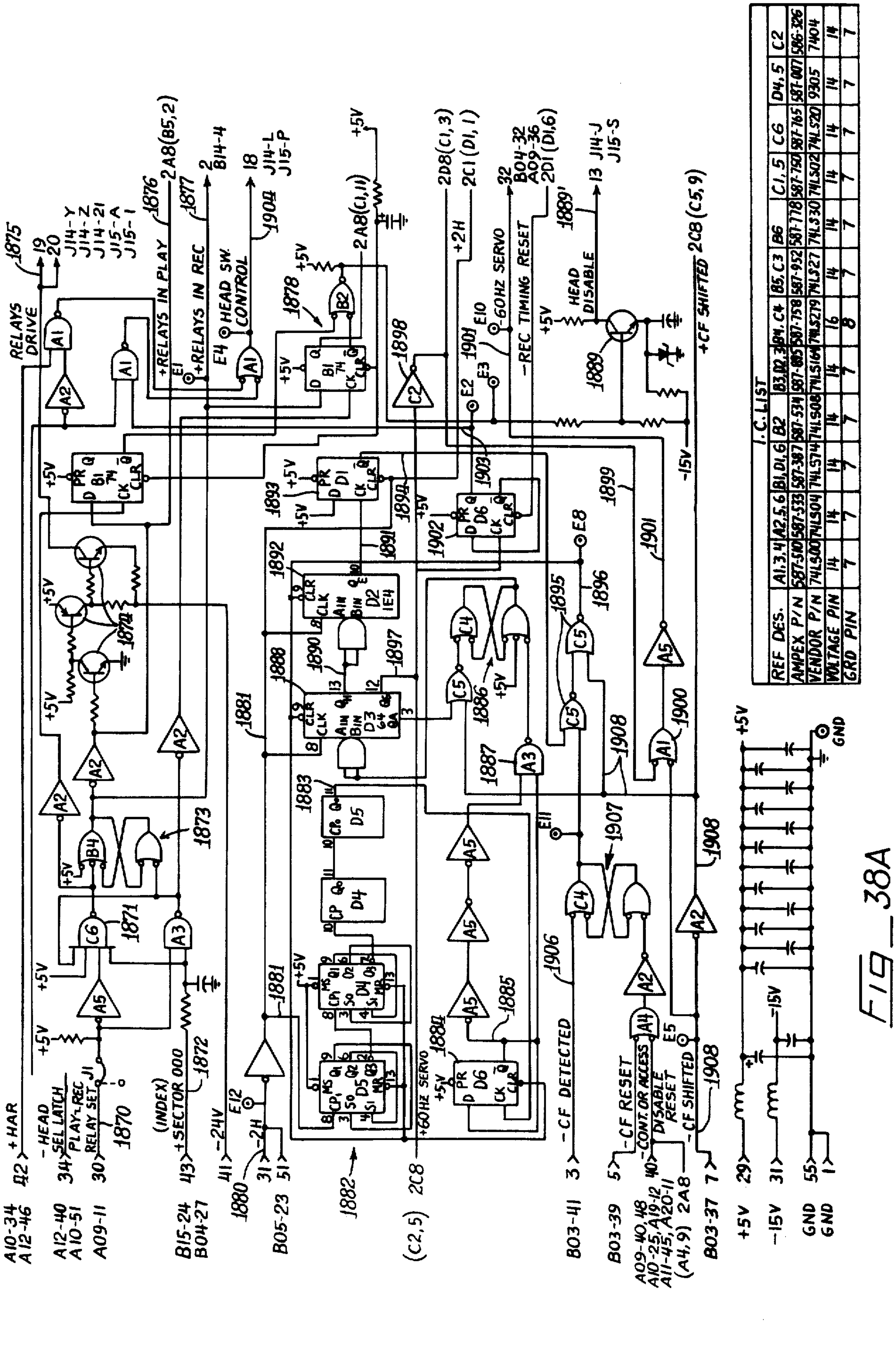

The circuitry shown in FIGS. 38A and 38B provides the 60 Hz reference signal for the spindle servo control system for the pack drive motor. Using the pack drive motor, the spindle servo controls the rotational phase of the disc pack utilizing as the servo reference the color frame shifted signal that is produced by the timing generator circuitry that will be hereinafter discussed. However, as previously mentioned, the television signal must be advanced either one or two television lines relative to its position during recording to compensate for delays that are experienced by the playback video data during playback as a result of the operation of the playback channel 91 circuitry. The color frame shifted signal that is asserted in the record timing circuitry shown in FIGS. 38A and 38B is positioned correctly with reference to the required timing for each of the operating modes of record, playback and transfer. The circuitry shown on FIG. 38A provides the 60 Hz servo reference signal that is derived from the multiplex sync signal of 2H frequency which is provided by the signal system. In this regard, the 2H signal is divided by 525 to derive the basic 60 Hz reference signal which is phase position controlled by the color frame shifted signal from the timing generator.

The record timing circuitry also provides drive signals for placing the relays in the record or play positions and also provides signals back to the CPU 106 through the drive control lines informing the CPU of the relay position. Moreover, in the described apparatus, a head disable signal is also generated which inhibits head current for at least one revolution of the disc pack after the record/play relay has been switched between its two positions. The recording timing circuitry also generates the signal for switching from one set of recording heads to another set for recording one field on one set of disc surfaces while the other video field is recorded on a second set as described hereinbefore. A basic 30 Hz signal controls the head switching.

Referring specifically to FIG. 38A, a relay set line 1870, which is high when the relays are in the play position and low when they are in the record position, provides an input to a NAND gate 1871, the other inputs of which are essentially supplied by a pulse on line 1872 that indicates the sector 000 (index) on the disc passing the servo head which during normal operation occurs during the vertical interval. When the relays are in the record position and the pulse appears on line 1872, NAND gate 1871 sets a latch 1873 which is coupled to transistors 1874 that provide a relay drive signal that extends to the preamplifier circuitry (FIGS. 54A and 54B) via line 1875. The state of the latch 1873 also provides a signal on line 1876 extending to FIG. 38B indicating that the relays are in the play position or, alternatively, a signal on line 1877 extending to FIG. 38B indicates the relays are in record position.

To produce the reference signal for the servo, a 2H rate signal called multiplex sync and whose timing originates from the signal system circuitry is applied on line 1880 which is inverted and appears on line 1881 that extends to a divide by 256 counter 1882 which has output line 1883 that clocks a divide by 2 FF 1884 producing a divide by 512 resulting division of the 2H signal on line 1885 that sets a latch 1886 via NAND gate 1887. The latch 1886 is connected to a shift register 1888 that is clocked by the 2H signal on line 1881. The shift register 1888 has output line 1890 that is connected to a shift register 1892. The pulse clocked out on line 1891 from the shift register 1892 represents count 525 and clocks a FF 1893. The FF 1893 provides a pulse on line 1894 that is gated through NOR gates 1895 onto a line 1896 and clears shift registers 1892, 1888 as well as the counters 1882 and 1884. Thus, the terminal count of 525 resets the counters and shift registers. It should be appreciated that the rate of 2H divided by 525 is 60 Hz which appears on line 1897 that passes through an inverter 1898 onto line 1899 and to a NOR gate 1900 producing the 60 Hz signal servo reference on line 1901. The output of the shift register 1888 on line 1897 is also divided by 2 by the FF 1902 producing a 30 Hz rate on line 1903 that is gated to produce the properly phased head switch control signal on line 1904.

If a color frame detected signal appears on line 1906, a FF 1907 is set which inhibits the first NOR gate 1895 and thereby inhibits the clearing of the dividers and shift registers so that the later appearing color frame shifted signal on line 1908 will provide the clear pulse through the second NOR gate 1895 so that the color frame shifted signal will reset the shift registers and FFs to 0 rather than the terminal count. This permits the 60 Hz servo reference signal to be properly positioned relative to the line advancements that are required to have the video information at the proper location during the playback and transfer modes as has been previously described.

The head disable signal provided to the preamplifier circuitry (FIGS. 54A and 54B) for one revolution of the disc pack during a switching of the heads from playback to record is provided on line 1889' by the transistor 1889 in response to the latch circuit 1878 being clocked by the appearance of the index pulse on line 1872 when the latch circuit 1873 is in the record state.

Turning now to the remainder of the timing generator circuitry shown in FIG. 38B, circuitry is illustrated which generates the timing commands that are used to perform the record sequence. The 60 Hz servo signal present on line 1901 from the circuitry shown in FIG. 38 together with a sync present signal on line 1953 will enable a NAND gate 1909 which is ORed with the color frame shifted pulse on line 1936 by NOR gate 1910 and sets a latch 1911 which provides one input of a NAND gate 1912 associated with a shift register 1913. The NAND gate 1912 is satisfied with the latch 1911 being set together with the shift register 1913 having a low state in all pertinent outputs. When this occurs, the 60 Hz servo reference signal on line 1897 clocks the shift register and output lines 1914 have high signals on them as the shift register is clocked and the lines are extended to various logic gates to perform the sequence of signals that are needed for recording.

A record ready signal on line 1915 results when NAND gate 1916 is satisfied which happens when certain qualifiers are present, i.e., the relays are in the record position, a ready signal is present, a control or access disable reset is not activated, the disc pack has correct rotational phase and the sync is alright. When these qualifiers occur, the record/ready signal is exerted. Similarly, a record next frame signal producing NAND gate 1917 sets a latch 1918 when certain qualifiers are present, including the sync alright signal, record next frame command, the relays are in record position signal, the timing from the shift register 1913, together with a disc being correctly positioned signal. If these conditions are met, the latch 1918 is set and a record sequence signal appears on line 1919. The latch 1918 is reset after four fields as timed by the shift register 1913 and the resetting thereof produces a record sequence complete signal on line 1920. A prerecord signal on line 1921 is gnerated by a latch 1922 which lasts for a time period of two fields and is reset two fields sooner than the record sequence latch 1918. During the prerecord interval, the black level signal is recorded on the first two revolutions of the four revolution sequence used by the apparatus described herein to record two fields of video data as previously described. It should be appreciated that the latches 1918 and 1922 are both set at the same time. Similarly, a data timing pulse appears on line 1923 for use by the data track circuitry if the record/playback relay is to be toggled at the end of a four field record sequence and it lasts for one field occurring during the last field of the four field record sequence. The data track circuitry provides a head disable switch to the preamplifier circuitry (FIGS. 54A and 54B) to prevent head current from flowing after the sequence when the record/playback relay is toggled.

DISC DRIVE TIMING GENERATOR

The timing generator shown in the electrical shematic diagram of FIG. 39 generates the signals that are used to provide the timing functions of the drive, including the operation of the servo system such that the disc pack rotation is phased to the television signal during record and playback. The circuitry utilizes the multiplex sync signal received from the signal system that consists of narrow horizontal rate pulses in addition to a color frame signal that occurs in the form of 3 consecutive wide horizontal rate pulses every fourth television field. This multiplex sync signal is used to generate a horizontal rate as well as to provide a color frame output signal that is the basic pulse for the timing functions of the drive. The color frame shifted signal, in addition to other functions, provides the basic phasing of the servo reference so that when a recording operation is occurring, the servo reference coincides with the vertical sync signal of the video signal being recorded. However, when a playback operation is occurring, the servo reference is shifted so that the television signal is advanced by a time period equal to two television lines to compensate for two television lines of delay that occur in the playback channels 91 of the apparatus.

More specifically, the time base corrector portion of the data decoder and timebase corrector circuitry 100 of each playback channel 91 introduces one television line of delay during playback and the chroma separating and processing circuitry 101 of each playback channel 91 also introduces one television line of delay. Thus, when the video information is played back, it would be present at the output two lines later than it should and, accordingly, the servo reference position is adjusted so that the video information is advanced by the two lines during normal playback. However, when a transfer mode is being performed, i.e., a still frame of information is being transferred from one disc pack 75 to another, the playback channel of the apparatus produces only one television line of delay because the information goes through the decoder and time base corrector circuitry 100, but not through the chroma separating and processing circuitry 101. Since the delay introduced by the chroma circuitry is not present in the transfer mode, the position of the servo reference is advanced 1 television line so that it is recorded with a vertical sync pulse coincident with sector 000 (index) on the other disc pack 75. The circuitry associated with the timing generator provides the shifting of the color frame so that the servo reference is in the proper position and also produces a stable H rate signal that is not appreciably affected by reasonable noise levels or the occasional absence of pulses in the multiplex sync signal.

Referring to FIG. 39, the multiplex sync signal is applied at input line 1920' which occurs at H rate and which has the color frame information in the form of 3 consecutive wide pulses occurring every fourth television frame. The multiplex sync is then converted from emitter coupled logic level to transistor-transistor logic level by a converter 1921' and passes through an inverter 1922' having output line 1923' that extends to a NOR gate 1924. Line 1923' is also connected to two AND gates, through an inverter 1925 to one AND gate 1926 and directly to another AND gate 1927. The lower path of the signal to the AND gates 1926 and 1927 operate to detect the presence or absence of information indicating a color frame.

The color frame is detected by strobing NAND gates with a one-shot 1928, providing a short duration pulse to enable the AND gates 1926 and 1927 so that the pulses that are gated through will either increment or clear a counter 1929. When a color frame is present, three successive counts will be passed by AND gate 1927 which will provide a high output on both lines 1930 which will load a high into a shift register 1931. In the event that a color frame is not present, then 3 successive pulses will not occur and the absence of either the second or the third pulse will satisfy AND gate 1926 that is gated to clear the counter 1929. The shift register 1931 is clocked by a 2H signal on line 1932 and clocks the input through the shift register with the successively appearing high levels in 1H intervals on lines 1933, 1934 and 1935.

The timing of the signals on lines 1933, 1934, and 1935 provide the 1 Line, 2 line or 3 line delays (the 3 line delay being defined as a 0 advance a 1 line delay being defined as a 2 line advance and a 2 line delay being defined as a 2 line advance) to be present on a color frame shifted output line 1936 from a decoder 1937. Two position select control lines 1938 provide a binary input command for decoding one of the input lines 1933, 1934 or 1935 to the output line 1936 to provide the basic shifted color frame reference timing information for the record timing circuitry.

The circuitry also generates a stable horizontal rate signal using a phase lock loop with a voltage controlled oscillator in an integrated circuit 1940 which receives the sync signal from the NOR gate 1924 through inverter 1941, AND gate 1942 and line 1943. The output of the oscillator 1940 appears on line 1944 which is divided by a divide by 10 counter 1945 having a 2H output on line 1946 which is in turn divided by a divide by 2 counter 1947 yielding a 1H signal on line 1948 that, ultimately, appears as the H rate output signal. The line 1948 is also carried back to the phase comparator input of the circuit 1940. The filtered error signal input to the voltage controlled oscillator is carried by line 1949 which extends through a transmission gate 1950 which is conducting whenever a multiplex sync is present on the input line 1920. This is detected by line 1951 which triggers one-shot 1952 that goes high for about 3H pulses before it times out and is always high whenever the multiplex sync is present.

If the multiplex sync is not present and does not resume after a 3H period, output line 1953 will go low disabling the AND gate 1942 as well as the gate 1950 and will, through inverter 1954, enable another transmission gate 1955 which produces an "artificial" error signal for use by the VCO in maintaining the H rate approximately at the correct frequency until multiplex sync is resumed. A NOR gate 1956 having its inputs connected to the phase comparator's outputs in circuit 1940 provides a lock indicating which drives a light emitting diode 1957 when the phase lock loop is not locked up. A signal indicating that sync is correct appears on line 1959 which is one of the qualifiers that are needed for a recording operation and the sync alright signal is generated when the servo is locked and the phase lock loop is locked, these signals being provided at the input of the NAND gate 1960.

DISC DRIVE ERROR CHECK LOGIC CIRCUITRY

The circuitry shown in FIGS. 40A and 40B illustrate error check logic that is similar in many respects to the error check logic of the existing disc drive circuitry that is used in data processing. However, with the present apparatus, additional fault conditions can occur and the error checking logic has been modified and expanded to provide this capability. Referring initially to FIG. 40A, the playing of a frame of video information requires two revolutions of the disc as previously mentioned and the position of the heads are changed when a seek command is exerted on line 1975. However, since changing the position of the heads from one track to another would provide a discontinuity in the television picture, it is desired that the changing of the head position starts only during the vertical interval and, accordingly, the seek command is timed to start at a specific location with respect to the vertical rate that is applied on line 1976 so that a timed start seek command appears on line 1977 that is properly timed with respect to vertical. The vertical rate signal is provided by the timing generator circuitry shown in FIG. 39 and the record timing circuitry (FIG. 38A).

Referring to FIG. 40B which illustrates the other section of the error check logic circuitry, this section of the circuitry performs a check to determine if the recording current is behaving as it should, i.e., when it is turned on, it is checked to determine if it is in fact on and, conversely, after it has been turned off, the circuitry checks to see that it is off. It should be appreciated that if the instructed condition was not occurring, then data existing on the disc could be endangered.

More specifically, record current sense line 1978 is applied to the NAND gate 1979 as well as to an inverter 1980 which provides an input to a second NAND gate 1981. A record sequence line 1982 is also connected to the NAND gate 1979 and through an inverter 1983 to the NAND gate 1981. While the line 1978 actually indicates if current is flowing and originates from the record power supplies, the record sequence line 1982 should have a logical low level when current is flowing and a logical high level when it is off. When a strobe on line 1984 occurs, one of the NAND gates 1979 and 1981 will provide an active signal on its respective output lines 1986, 1987 that set corresponding FFs 1988 and 1989 which are connected to NOR gate 1990 and provide a signal that signifies conditions are unsafe and that the data on the track may be endangered. In this regard, FF 1988 will indicate that current is flowing in the recording heads when it should not be and FF 1989 will provide an active signal to NOR gate 1990 when the recording head current has been turned on and no current is flowing. A horizontal rate signal appears on line 1992 and clocks FFs 1993 which produces an output on line 1994 that strobes the NAND gates 1979 and 1981 to determine if the sensed record current is what it should be. In other words, after the record current is shut off, the operation of the FFs 1993 places a high level on line 1994 one TV line later to strobe the NAND gates and determine if the current is behaving properly. The strobe signal lasts for one television line and begins one television line after the command has been given. The H rate is used because it provides adequate time for the current to reach its new level after a command has been given.

If an offset condition occurs, which indicates that the heads are mispositioned so that they are not following the center of a recording track, a signal on line 2000 will set a FF 2001 which will provide a true signal to a NOR gate 2002 which provides a select lock on line 2003 which disables the disc drive because of conditions that could endanger the data or indicate to the disc drive that something is wrong.

DISC DRIVE DATA INTERFACE

The disc drive data interface 151 shown on the block diagram of FIG. 9B is adapted to receive the video data from the encoder 96 and send it to the associated disc pack 75 as well as receive the detected video data from the associated disc pack and send it to the data select switch 128. There are two disc drive data interface circuits that are used to interface the 10 bits of data that are sent to and taken from each disc pack 75 with only one representative interface being shown in FIGS. 60A and 60B. The data received from the encoder 96 appears on lines 2020 which are gated through AND gates 2021 onto the output lines 2022 which are recorded on the disc pack surfaces. The AND gates 2021 are enabled by a record sequence command on line 2023 originating in the record sequence circuitry shown in FIGS. 38A and 38B. When data is taken off disc, it appears on lines 2025 that is gated through AND gate 2026 onto lines 2027 when the AND gate 2026 is enabled by a high level on line 2028 that is produced by a high level on line 2029 that also comes from the record timing circuitry. When line 2029 is low, the complementary output buffer 2030 produces a low level on line 2028 and a high level on line 2031 which enables NAND gates 2032, which permits the data being received from the encoder to be transmitted back on lines 2027. This condition occurs during the E-to-E and the seek operations during which the signal is processed by both the record and playback electronics, but the recording step is not carried out. The data on lines 2020 is converted from emitter coupled logic having complementary levels to TTL logic before it arrives at AND gates 2021 and, conversely, the data on lines 2027 has been converted to emitter coupled logic from TTL logic for transmission.

DISC DRIVE SERVO PHASE LOCK CONTROL

In the disc drives utilized in typical computer processing apparatus, such as the aforementioned Ampex model DM 331 disc drive, the disc spindle motor drive is free running. To provide desired servo control for the disc spindle motor drive, the motor drive circuits have been modified for the unique application in the present apparatus. The operation of the motor driving the disc will now be described in connection with FIG. 36 which is a block diagram illustrating the operation of such circuitry for controlling the driving of the motor in the disc drive so that it is locked to vertical sync and correctly positioned relative to the timing so that recording, playback and transfer operations are carried out with the proper timing.

Figure 36:
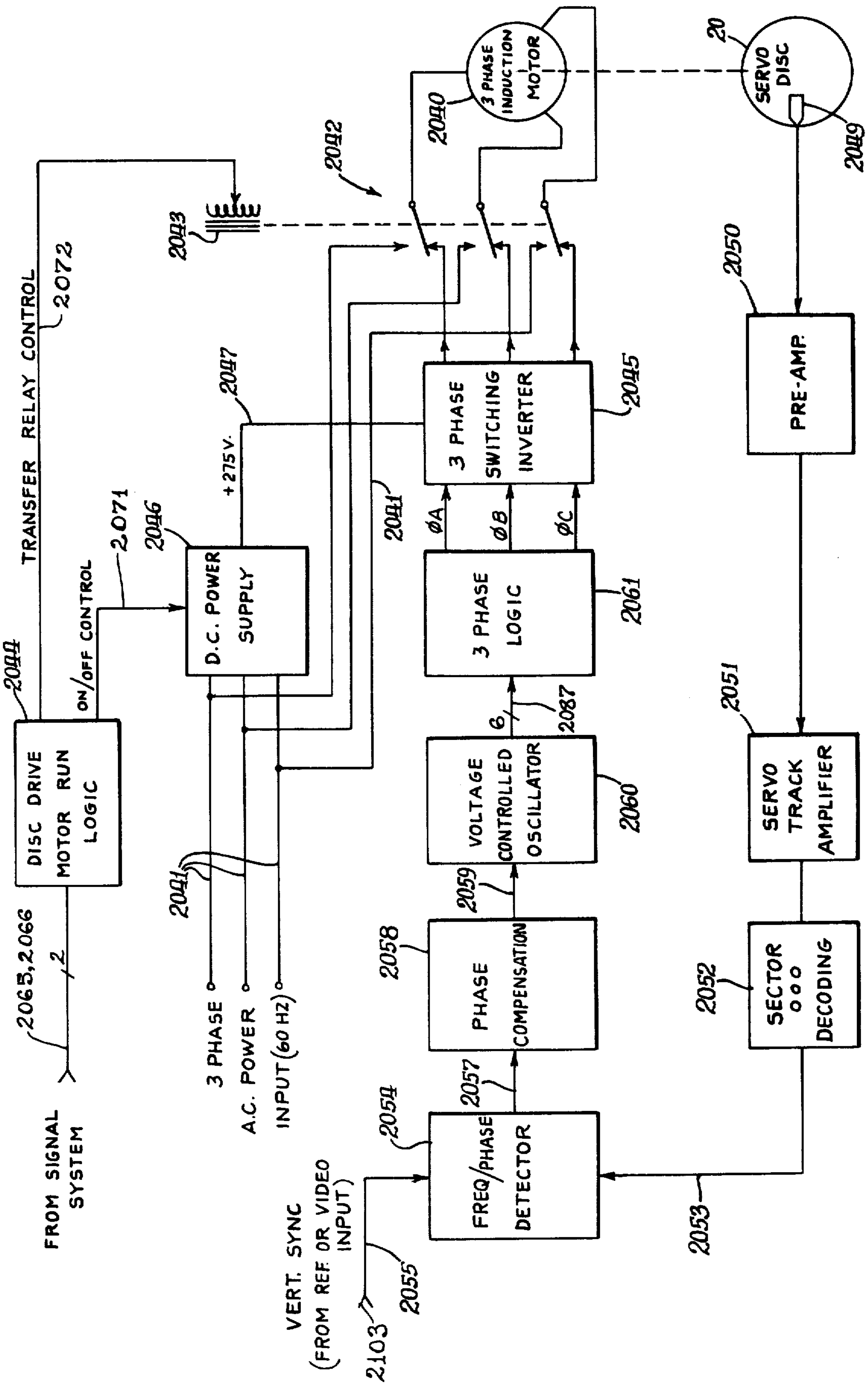
FIG. 36 is a functional block diagram of the disc drive servo phase lock circuitry of the disc drive portion of the apparatus.

Referring to FIG. 36, a block diagram of the circuitry which operates the drive motor and servo control system is illustrated. The detailed electrical circuitry of the modified Ampex model DM 331 disc drive that carries out the functions that will be generally described with respect to FIG. 36 are contained in FIGS. 41A and 41B which are schematic diagrams of the disc drive phase lock control and FIGS. 59A and 59B which are schematic diagrams of the disc drive motor logic and predriver circuitry which is used during start up of the disc drive motor. Referring to FIG. 36, when the three phase induction motor 2040 for the drive is to be started up, it is started using three phase AC power from the power lines 2041 which pass through relays 2042 and power the motor until it has come up to speed. After it has come up to speed, the relay 2042, which is controlled by coil 2043 from disc drive motor run logic circuitry 2044 is switched from the power lines 2041 to the three phase output lines of a switching inverter 2045. The inverter is powered by a DC power supply 2046 through line 2047 with the power supply being connected to the power lines 2041. The positional phase of the motor 2041 is derived from a servo read head 2049 that provides a signal for every revolution of the disc drive to a preamp 2050 whose output is amplified by amplifier 2051. Decoding circuitry 2052 provides a pulse for the sector 000 (index) mark of the disc when it occurs during each rotation. The pulse appears on line 2053 at the input of a phase detector 2054. The phase of the index pulse is compared with the vertical sync appearing on line 2055 at the input of the detector 2054 and provides an error signal on line 2057 that is phase compensated by a phase compensation network 2058 and then applied to a voltage controlled oscillator 2060 to adjust the frequency and phase of its output in accordance with the error signal. The frequency and phase adjusted output of the oscillator 2060 is coupled by line 2093 to control logic circuitry 2061 that drives the 3 phase switching inverter 2045. In this manner, the motor 2040 can be servo controlled so that an associated index position for the driven discs is locked to vertical sync that may be derived from either the station reference for playback or a video input signal in the event a recording is being performed.

Turning now to the schematic drawings and particularly FIG. 59B, when the drive motor 2040 is turned on in response to a motor run command on the input line 2065 from the disc drive control circuitry and after it has come up to speed, a signal from disc drive control circuitry will appear on line 2066 which is gated through NAND gate 2067 and will actuate a one-shot 2069 which has a time delay of about four seconds. Following the four second delay, an FF 2070 is clocked by the one-shot 2069 and provides a command on line 2071 that turns on the DC power supply 2046 providing the power for the switching inverter 2045. The output of the FF 2070 after gating with a power supply verification signal also is applied to line 2072 which triggers a one-shot 2073 that has a delay of about 50 milliseconds. After one-shot 2073 times out, it clocks an FF 2074 that provides a signal on line 2075 to short out a 50 ohm resistor that is in series with the inverter for the purpose of protecting it from transients during the switching period. A signal on line 2072' also provides the command to actuate the relay 2043 to change over from the power lines 2041 to the switching inverter 2045. The output line 2075 also triggers yet another one-shot 2076 which has a 40 millisecond delay and clocks an FF 2077 that provides a signal on output line 2078 that shorts out a 10 ohm resistor which is also series connected to the inverter and performs the same protection function as the 50 ohm resistor.

Turning to FIG. 59A, the power line phase reference is detected and applied to a line 2080 that is connected to a voltage controlled oscillator 2081 which phase locks its output on line 2082 to the phase of the power line so that during change over from the power line to the inverter, the phase of the voltage drive to the motor provided by the inverter will be synchronous with the phase of the power line and no substantial disruption will occur. The outputs of the voltage controlled oscillator 2081 and 2060 (see FIG. 41B) are coupled through gating circuitry that selects the appropriate output for application to the following 3 phase logic 2061 in accordance with operating condition of the disc drive system. For example, the signal appearing on line 2082 is at a frequency of 720 Hz (12×60 Hz) which is gated through NAND gate 2083, OR gate 2084 into a ring counter 2085 via line 2086 which provides 60 Hz square wave outputs on six lines 2087 that have a 30° phase relationship between them and provide signals for phases A, B and C as indicated for driving the switching inverter 2045 (not shown in FIG. 59A). The outputs of the 3 phase logic 2061 are sent to opto-isolaters and provide drive signals for the power switching inverter. The NAND gate 2083 gates the output of the oscillator 2081 into the ring counter when a high signal is present on line 2090. When the line 2090 is low, inverter 2091 enables a NAND gate 2092 to gate through pulses from line 2093 which are provided by the voltage controlled oscillator 2060 (see FIG. 41B) at a frequency of 720 Hz.

Referring to FIG. 41B, the voltage controlled oscillator 2060 and frequency/phase detector 2054 are included within a single integrated circuit component which has the input reference signal present on line 2055 as well as the feedback signal on line 2053 for use by the detector 2054. An error output signal from the detector 2054 on line 2057 extends to a storage capacitor 2095 and through an impedance matching operational amplifier 2096 to the phase lead compensation networks 2058. The network 2058 conditions the error signal generated by detector 2054 for application to the oscillator 2060. The reference and feedback signals on lines 2055 and 2053 that are used by the frequency/phase detector 2054 are produced by circuitry shown in FIG. 41A which have sector 000 (index) pulses applied to line 2100. The index pulses are shaped by a voltage translator 2101 to produce the narrow pulses on line 2053 at the correct voltage levels for the following logic for application to the detector 2054. Similarly, the reference vertical pulses appear on line 2103 and are shaped by a voltage translator 2104 and are applied to a one-shot 2105 which cooperates with a following one-shot 2106 to inhibit a second pulse from occurring for a time period of about 8 milliseconds. The one-shot 2106 has output line 2055 that provides the reference input to the detector 2054. The one-shot 2106 produces a 5 microsecond delay which also controls a switch 2107 to turn it on for 5 microseconds during every vertical pulse. This produces a 5 microsecond offset which improves the performance of the servo by removing jitter which is present when the sector 000 (index) pulse and reference pulse are coincident. The line 2108 extends to the capacitor 2095 in the phase comparator output line 2057 that controls the oscillator 2060. The one-shot 2106 has output line 2055 also connected to another one-shot 2110 which has a two millisecond delay and produces an output on line 2111 which is differentiated by differentiator 2112 and applied to NAND 2113 and 2114 via line 2115 and inverter 2116. A one-shot 2117 triggered by the sector 000 (index) pulse produces a 4 millisecond window, i.e., a high level on line 2118 to the NAND gate 2113 as well as a low level on line 2119 to the NAND gate 2114. When the pulse appearing on line 2115 first falls within the 4 millisecond window generated by the one-shot 2117, indicating that the two signals are particularly close to being phase locked, then NAND gate 2113 will set a latch 2120 and will activate a one-shot 2121 which has output 2122 that is applied to NOR gate 2123. The output of NOR gate 2123 closes a switch 2124 that applies a voltage from the voltage divider 2125 onto the line 2108 to the capacitor and thereby changes the time constant and gain characteristics of the control loop to speed up the locking procedure. The one-shot 2121 closes the gate 2124 for a period of about 10 milliseconds.

The output line 2055 from the one-shot 2106 also extends to trigger a one-shot 2127 that has a 15 microsecond delay, and a differentiator 2128 produces a narrow pulse on the trailing edge of the signal that is applied to a NAND gate 2129, the other input of which is supplied by a one-shot 2132 that is triggered by the sector 000 (index) pulse from line 2053. The one-shot 2131 produces a 30 microsecond window which inhibits the pulse 2130 to NAND gate 2129. When phase lock is achieved within plus or minus 15 microseconds, a one-shot 2132, which has a relatively long one second delay, will time out producing a low signal on line 2133. This indicates that the servo is locked up, i.e., the motor is being timed with respect to reference vertical as is desired.

COMPUTER CONTROL SYSTEM FLOW CHARTS

Figure 63A:
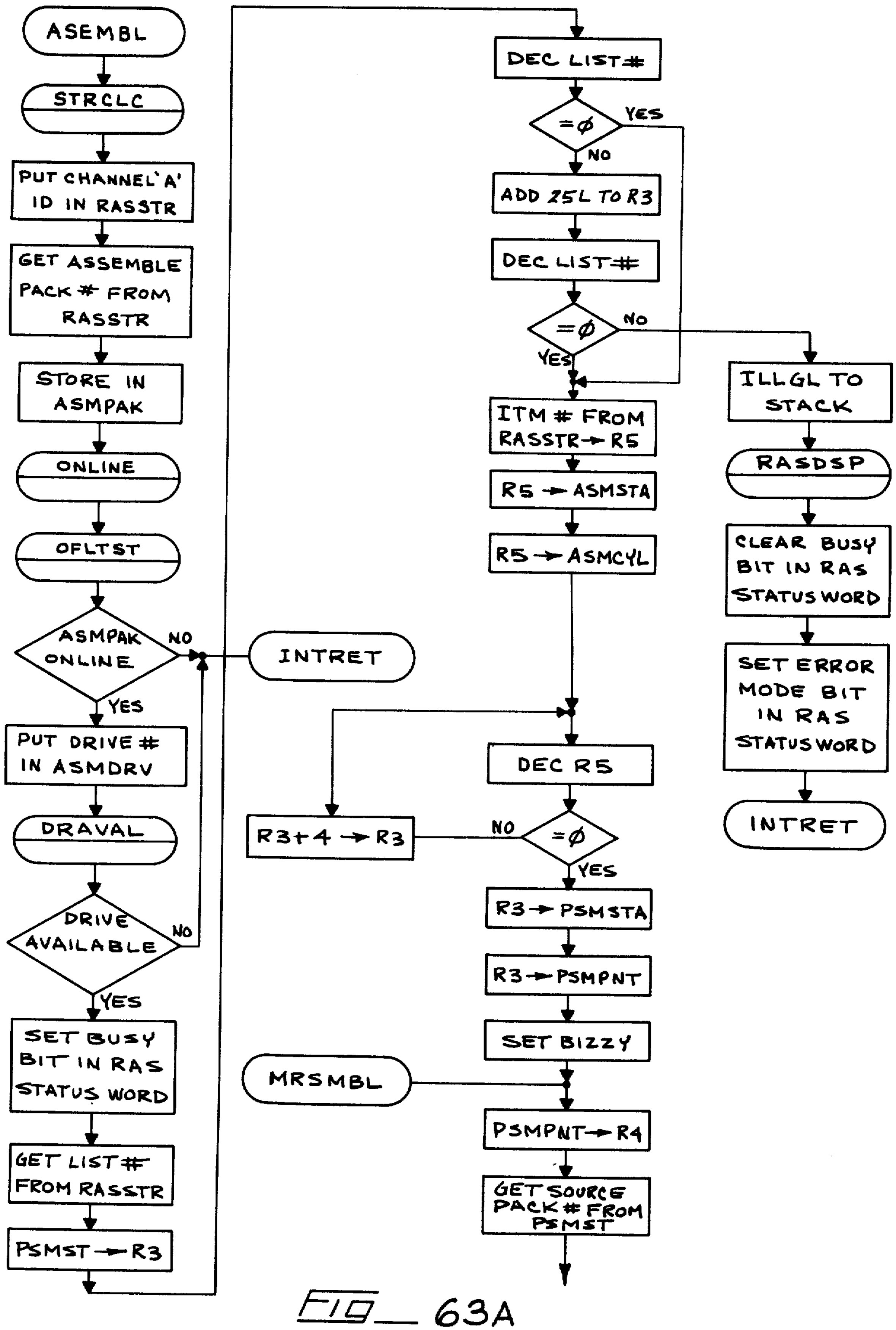
FIGS. 63A through 63X and 63AA through 63XX inclusive consist of sheets which together comprise a flow chart of one control program for the computer control system illustrating the program steps followed in causing requested functional operations to be performed by the apparatus.
Figure 63F:
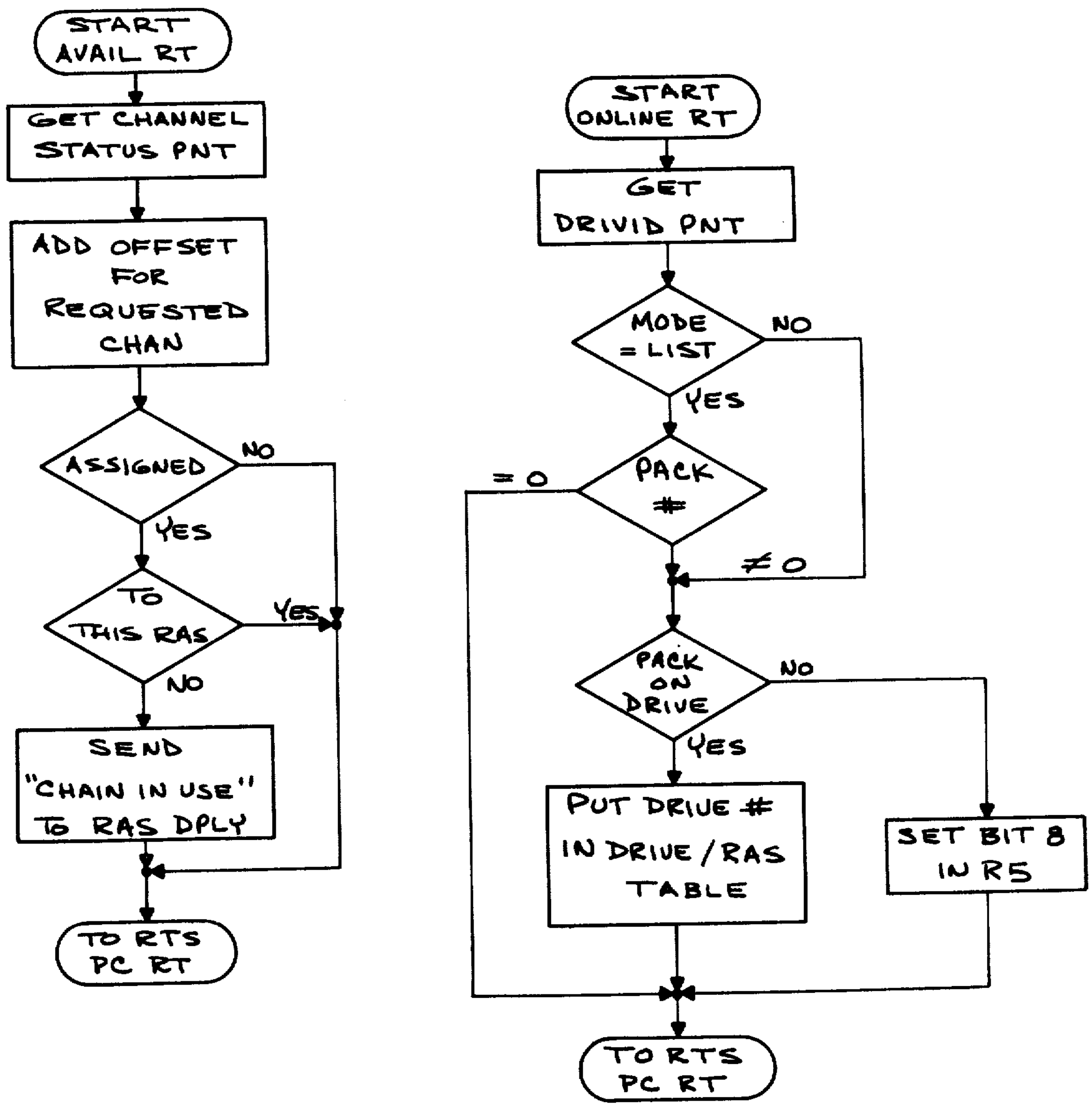
Figure 63H:
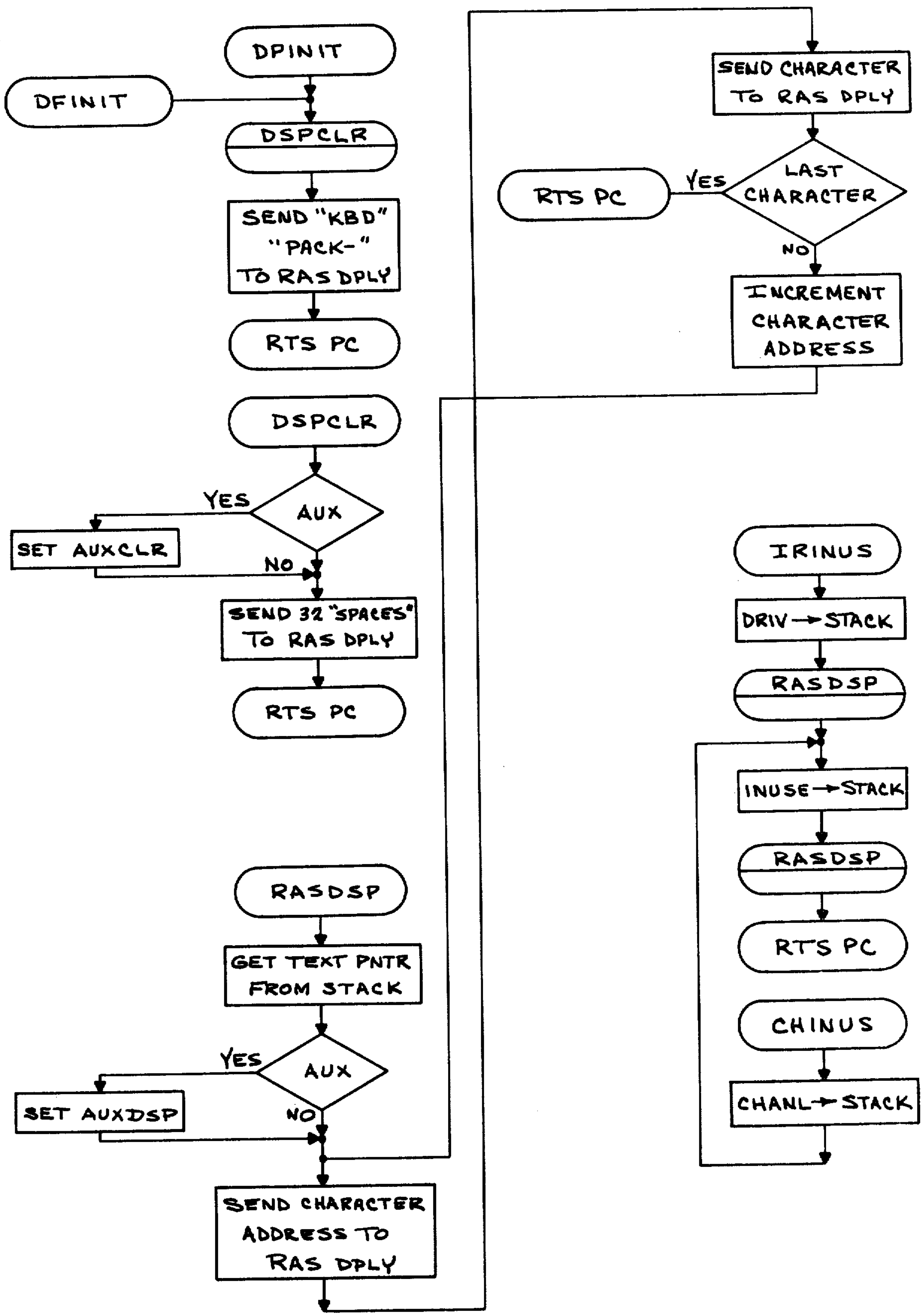
Figure 63K:
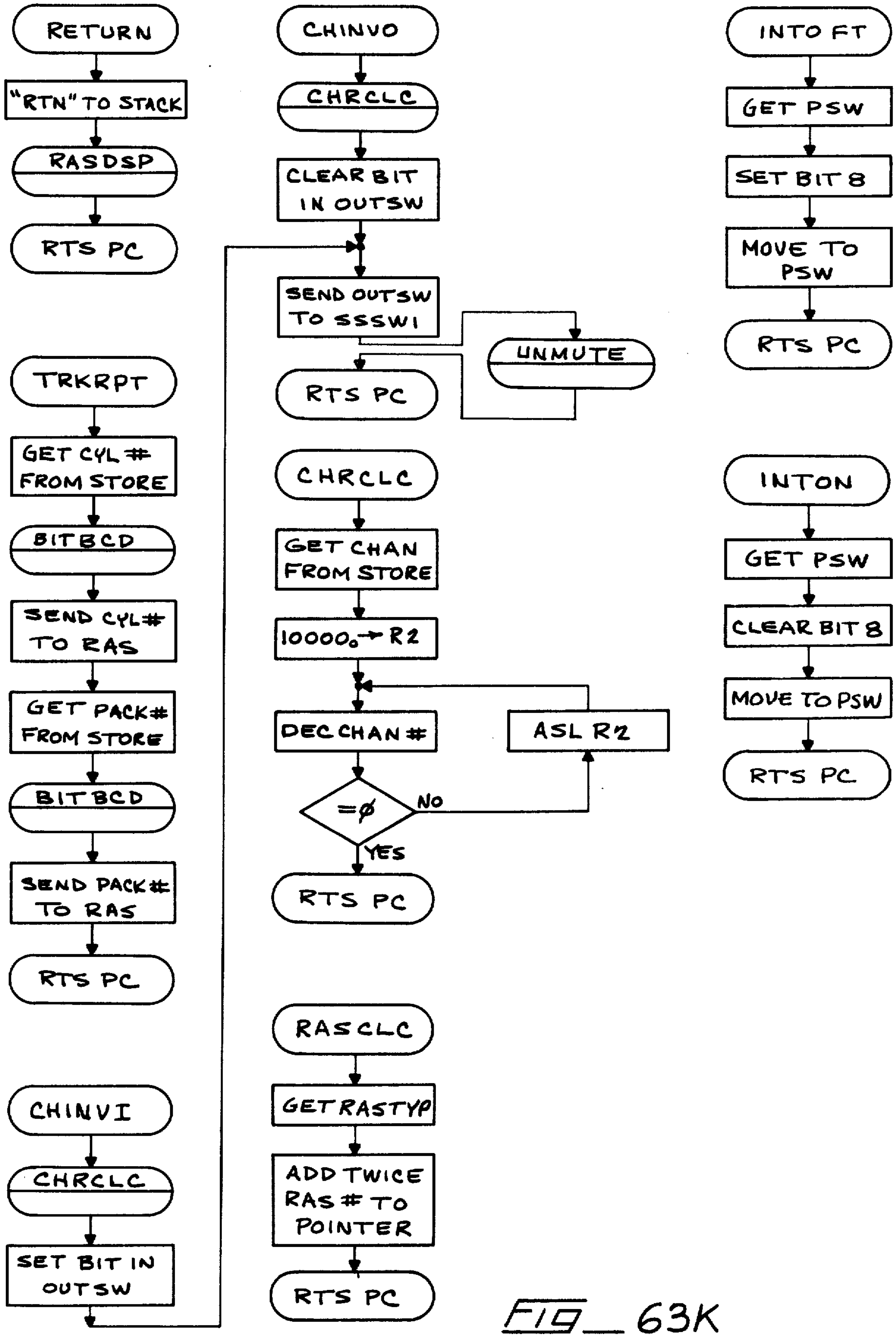
Figure 63M:
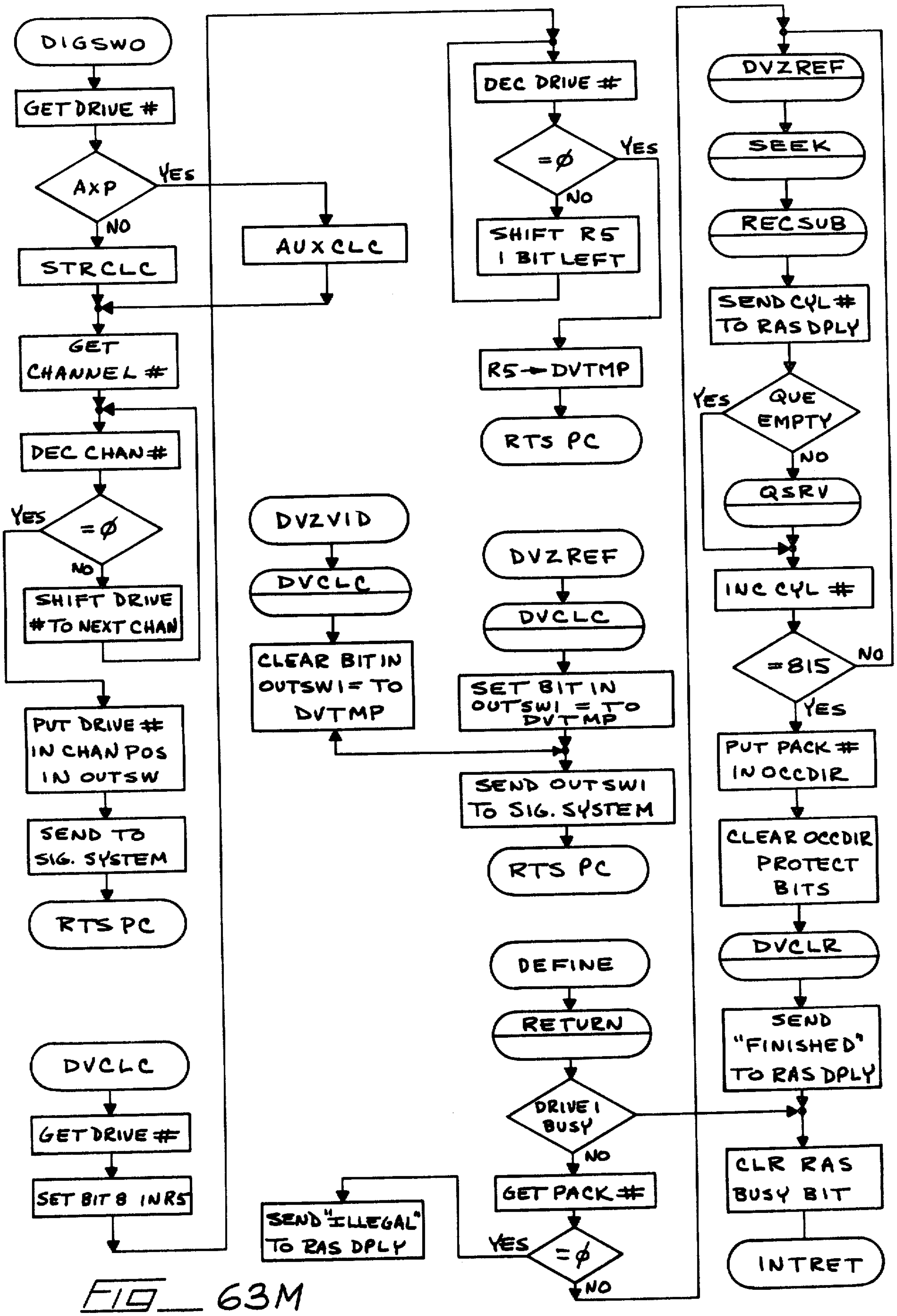
Figure 63N:
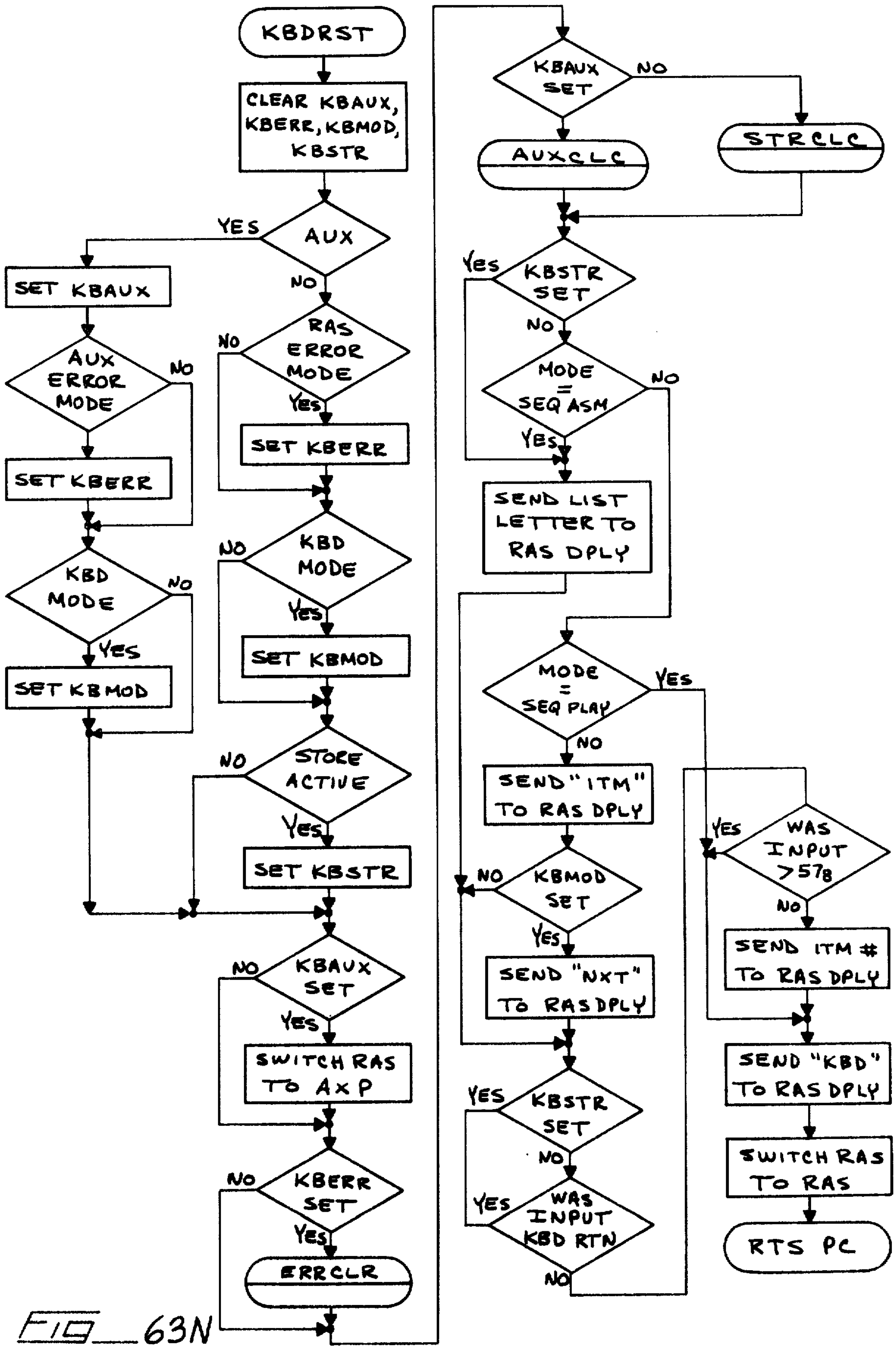
Figure 630:
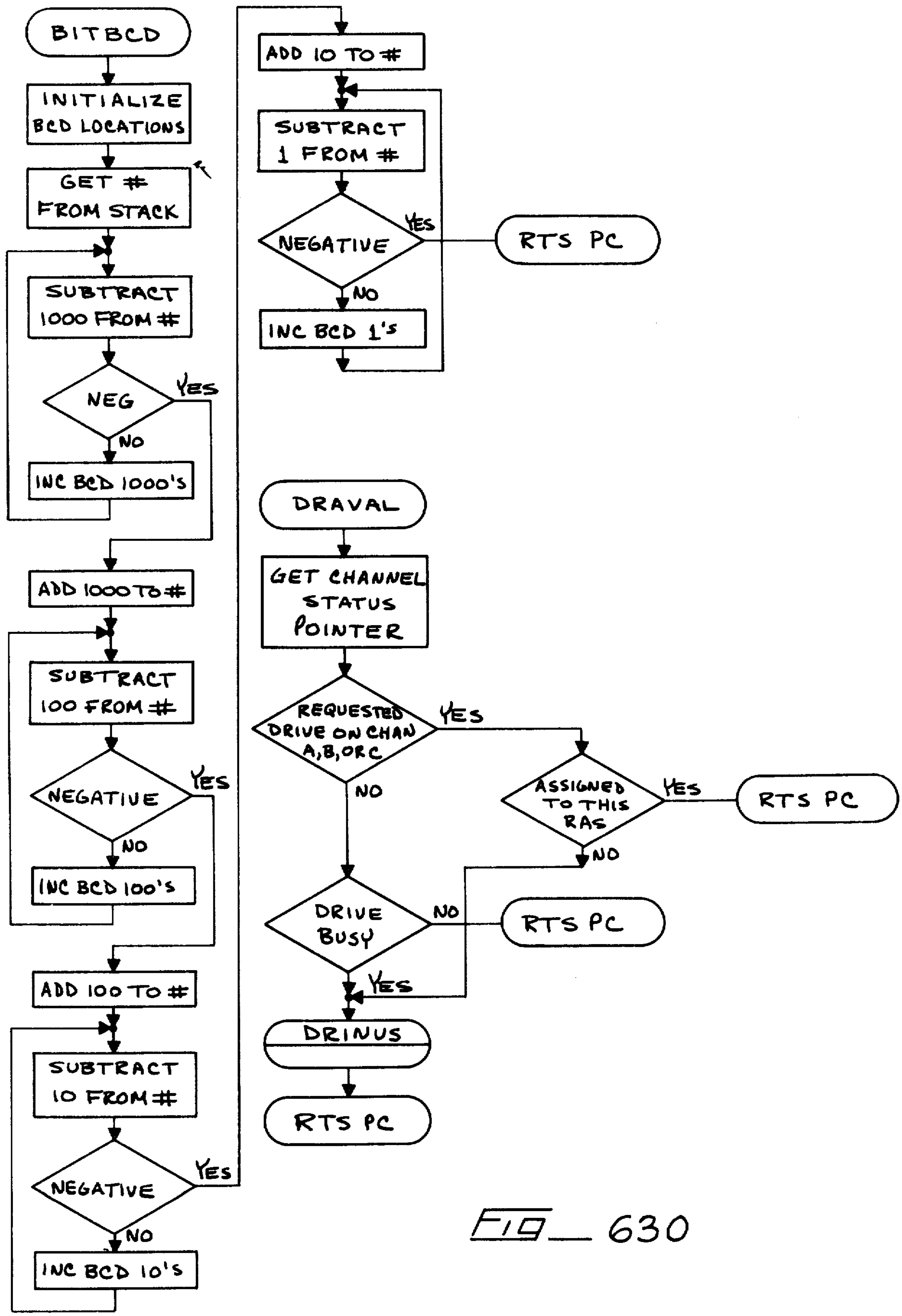
Figure 63P:
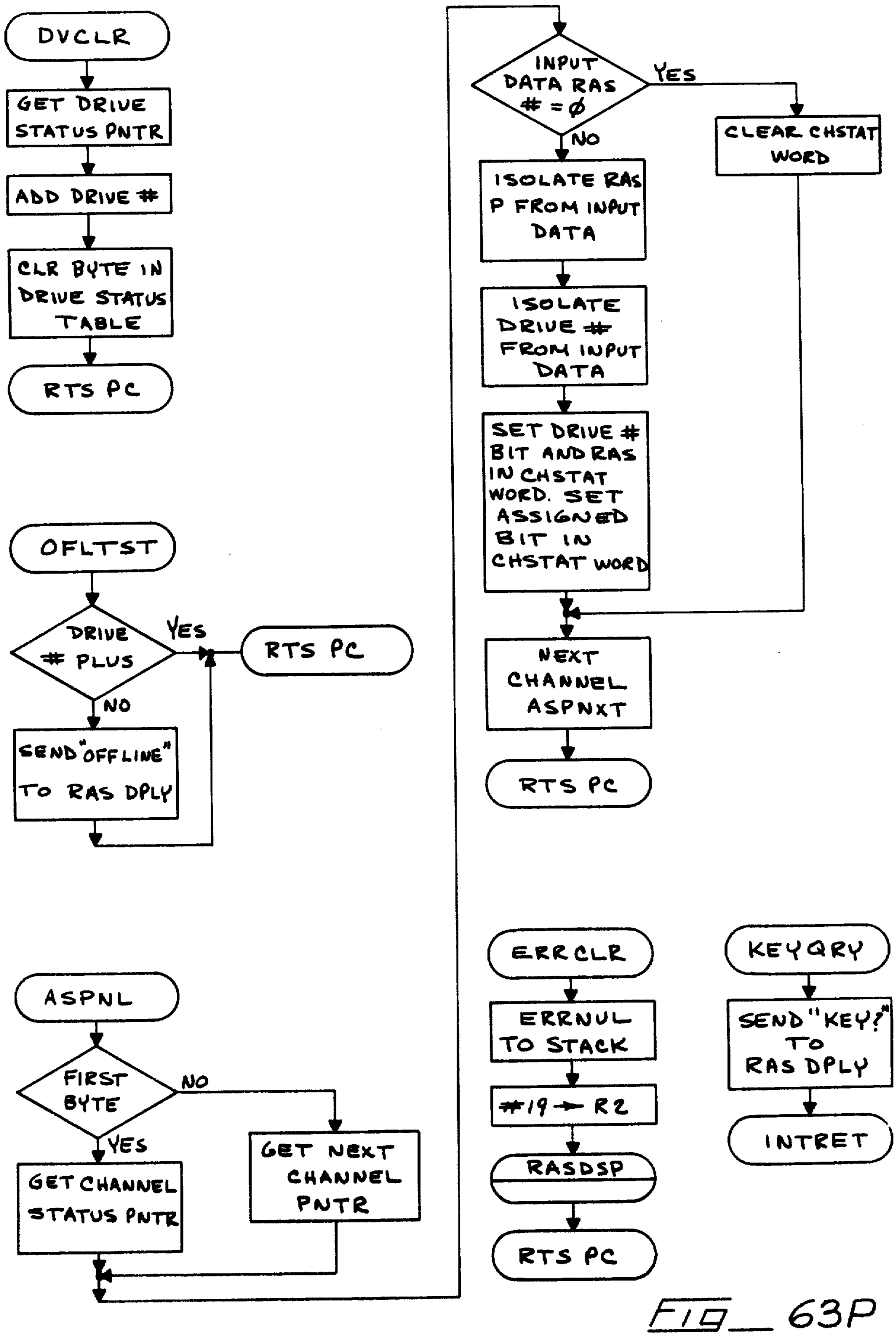
Figure 63G:
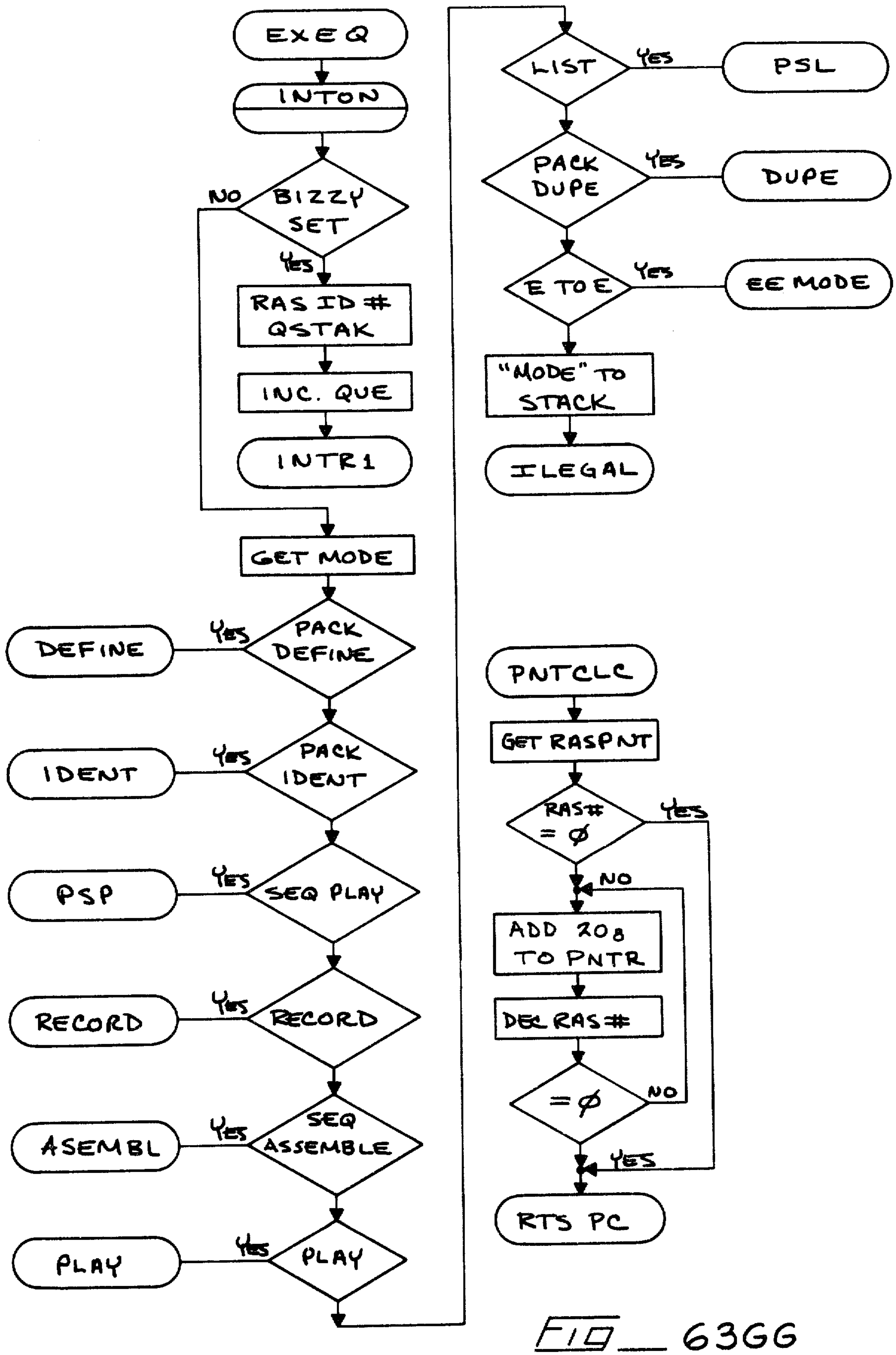
Figure 63H:
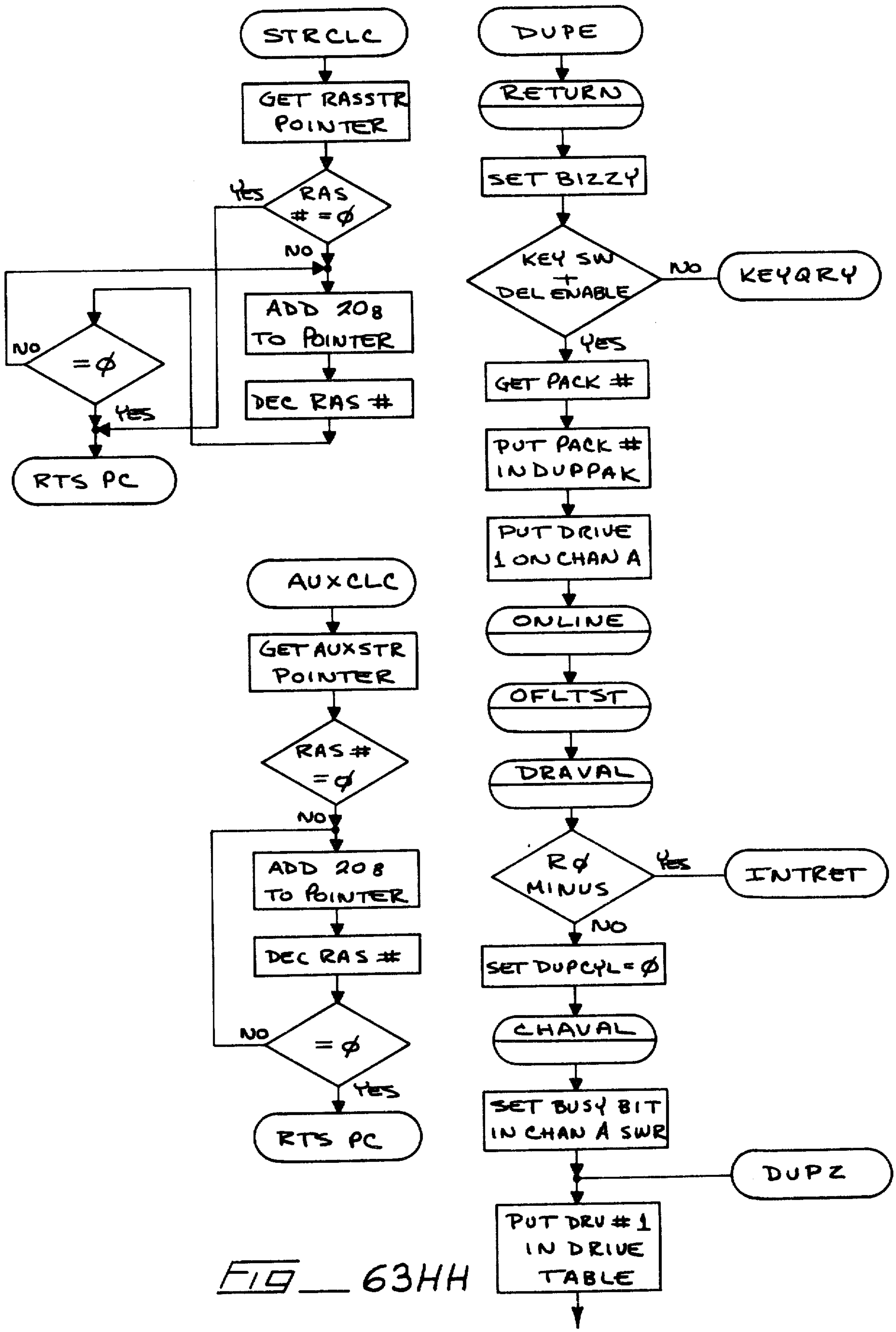
Figure 63J:
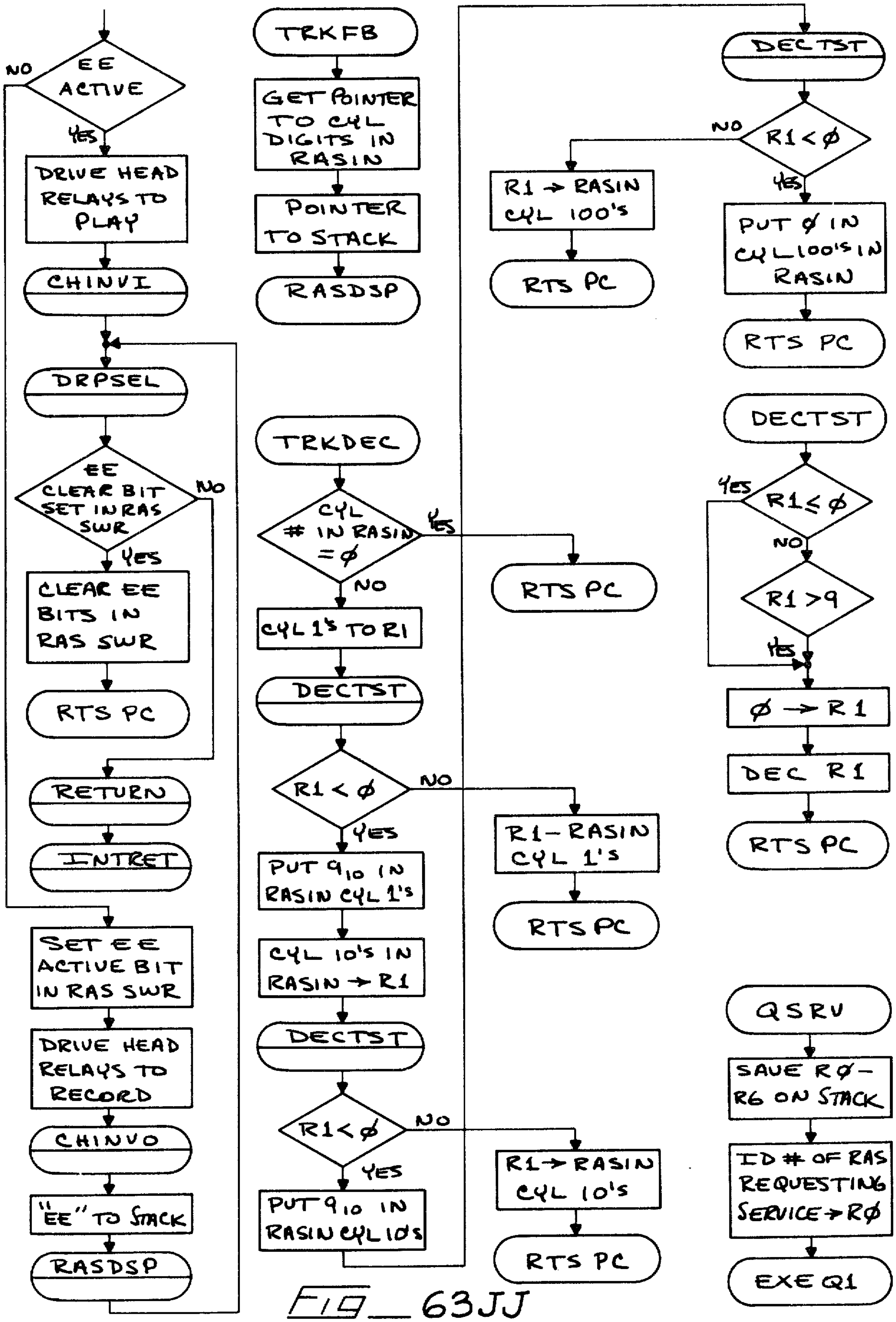
Figure 63L:
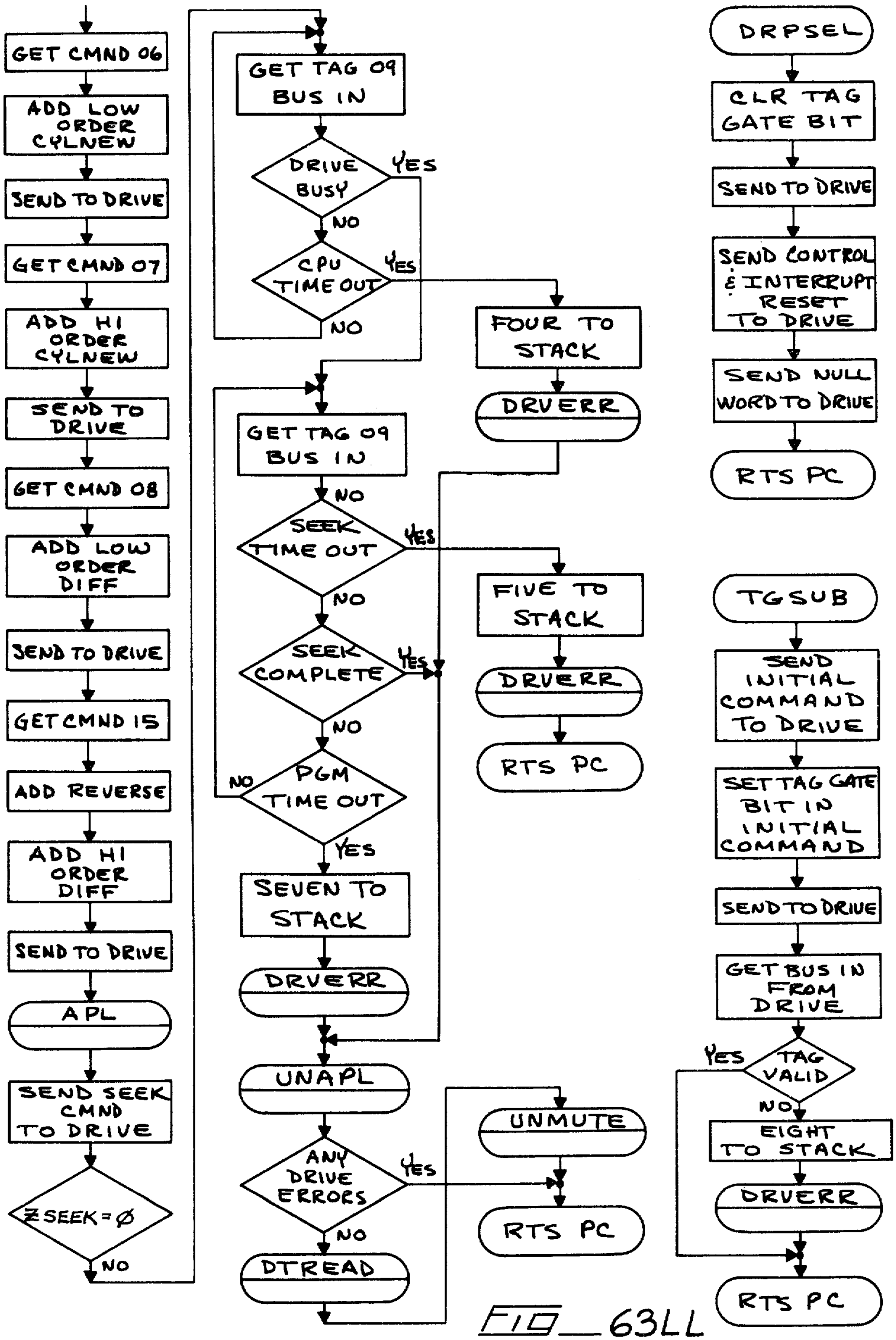

The flow charts for operating the computer control system are shown in FIGS. 63A through 63VV and describe the various programs for carrying out the operations that have been described herein. Additionally, Tables I and II together comprise a dictionary of terms that are used in the flow charts and are included to provide a greater understanding of the flow charts. Certain terms in the flow charts that are not contained in Tables I and II are standard for the DEC microcomputer that is used herein or are conventionally used terms.

TABLE I

| | |
|---|---|
| APLCLC: | Calculate Bit Position to Cause Average Picture Level in Channel. |
| ASEMBL: | Assemble Subroutine. |
| ASLR2: | Arithmetic Shift Left. |
| ASMCLR: | Assemble Cleanup Routine. |
| ASMCMP: | Assemble Complete. |
| ASMCYL: | Current Track Number for Assemble. |
| ASMDRV: | Drive Number on which Drives are being Assembled. |
| ASMEOL: | End of List Flag for Assemble. |
| ASMPAK: | Assemble Pack Number. |
| ASMSTA: | First Item Number of Assemble. |
| ASPNXT: | Pointer to Next Storage Location for AAP InPut. |
| AUXCLC: | Calculate Location of Input Buffer for Current RAS. |
| AUXDSP: | Storage Area for Contents of Particular RAS Display. |
| BCDIK: | Pointer to Binary Coded Decimal $10^3$. |
| BCDTBI: | Binary Coded Decimal to Binary Conversion Routine. |
| BIT: | Mnemonic for Bit Test (PDP-11 Assembly Language). |
| BITBCD: | Binary to Binary Coded Decimal Conversion Routine. |
| BUFDRV: | Drive Number for Buffer Pack. |
| BUFFER: | Video Data Buffer Subroutine. |
| BUFPAK: | Pack Number Used for Buffer. |
| BUSERR: | Reinitialize Subroutine for CPU Time Out or Illegal Address Trap. |
| CHAVAL: | Channel Available. |
| CHCHNG: | Flag Set Indicating New Drive is Coming onto a Channel. |
| CHINUS: | Channel in Use Test Routine. |
| CHINVO: | Chroma Inverter Disable Routine. |
| CHKRPT: | Drive Device Fault Check Report Routine. |
| CHRCLC: | Calculate Bit Position to Cause Chroma Inversion in a Channel. |
| CHSTAT: | Channel Status Locations. |
| CMND: | Command. |
| CYLNEW: | Track Number Drive is seeking To. |
| CYLOLD: | Track Drive is On. |
| DECFLG: | Indicates Item Number Has Been Decremented. |
| DEFINE: | Initial Pack Subroutine. |
| DEVCHK: | Drive Device Check Analysis. |
| DRINUS: | Drive Availability Check. |
| DRPSEL: | Drive Deselect Routine. |
| DRVERR: | Drive Error Report Routine. |
| DRVID: | Pack Number Versus Drive Table. |
| DRVTST: | Temporary Location for Playback Drive Number During Transfer. |
| DSKCYL: | Track Number Read From Data Track. |
| DSKEOL: | Last Track Read was EOL Track. |
| DTREAD: | Data Track Reading Routine. |
| DUPCYL: | Track Number being Duplicated. |
| DUPPAK: | Pack Number being Duplicated. |
| DUPVID: | Duplicate Mode Flag. |
| DVCLC: | Calculate Bit Position of Drive In Data Word in Digital System. |
| DVERR: | Pointer to "Driver Error"Message. |
| DVTMP: | Temporary Drive Number Location. |
| EOLTST: | End of List Test. |
| ERRCLR: | Subroutine for Sending Blank Message. |
| ERRDT: | Flag Indication Error in Reading Data Track. |
| ERRDTP: | Indicate Number of Incorrect Pack Number as Read from Data Track. |
| ERRNUL: | Pointer to Blank Message. |
| EXEQ: | Jumps to Correct Routine for RAS. |
| FAIL: | Point to Test "FAILED". |
| FLGAUX: | Auxiliary Access Station Active Flag. |
| IDDTR: | Flag Set During Pack Identification. |
| ILEGAL: | Subroutine for Printing "Illegal". |
| ILLGL: | Pointer to text "Illegal". |
| KBAUX: | Auxiliary Access Station Active Flag. |
| KBERR: | RAS is in Error Message Mode. |
| KBMOD: | Flag Indicating RAS is in Keyboard Mode. |
| KBSTR: | RAS is in Sequence List Mode. |
| KEYQRY: | Subroutine for Printing "Key?" |
| MODREF: | Illuminate RAS Mode Button On Power Up. |
| MUTFIN: | Termination Point for Mute and APL Routine. |
| MUTYP: | Constant That Initials to Black Level Mute. |
| NULL | Pointer to Series of Blanks. |

TABLE I-continued

| | |
|---|---|
| NXT: | Pointer to "NEXT". |
| OCUPYD: | Pointer to "OCCUPIED". |
| OFLFLG: | Flag That is Set When Pack is Off Line. |
| OFLINE: | Routine for Printing "OFF LINE". |
| OFLN: | Pointer to "OFFLINE". |
| OUTSW: | Storage Location for Data to be Sent to Signal System. |
| OUTSWI: | Storage Location for Data to be Sent to Signal System. |
| PC: | Program Counter. |
| PGM: | Program. |
| PNTCLC: | Calculates Input Buffer Position. |
| PRCYL: | Track Number of Current Seek. |
| PROTEK: | Flag Indicating Track is Protected. |
| PRPAK: | Pack Number for Current Seek. |
| PSI: | List Item Number. |
| PSMPNT: | Pointer to Item List. |
| PSMST: | Starting Point in List. |
| QPNTR: | Current Location in Que Stack. |
| QSRV: | Routine for Servicing Ques. |
| QSTK: | Block of Memory for Ques. |
| RANDAT: | Pointer to Block of Memory for Data Track Information. |
| RASCLC: | Routine for Calculating Position in Table for Current RAS. |
| RASDSP: | Routine for Sending Messsages to RAS. |
| RASFMT: | Routine for Obtaining and Formating Input Data to Storage. |
| RASPNT: | Pointer to Beginning of Input Buffer. |
| RASSTR: | Formatted RAS Input. |
| RASTYP: | Pointer to RAS Status Table. |
| RCABRT: | Abort Record Routine. |
| RCINIT: | Puts Initial Text on Display. |
| RECDUN: | Completion Routine for Current Item. |
| RECFAL: | Routine for Printing "FAILED". |
| RECSBI: | Secondary Entrance Point to Record Routine. |
| RECTRY: | Retry Counter for Rerecord. |
| REREC: | Flag Set in Case of Record Failure. |
| RPTOFL: | Routine for Printing "OFFLINE*". |
| SEEKA: | Secondary Entry into Seek Routine. |
| SELLOK: | Routine for Printing "SELLOCK". |
| SPNXT: | Next Item to be Played. |
| SPRTIM: | Drive Newly On Line Monitoring and Service Routine. |
| SPSTRT: | First Item in Sequence to be Played. |
| SRCCYL: | Track Number for the source Drive of Still in Assemble. |
| SRCDRV: | Drive Number of Source Drive in Assemble. |
| SRCPAK: | Source Pack Number in Assemble. |
| SSSW1: | An Output Register for Signal System. |
| SSSW2: | Output Register for Signal System. |
| STINIT: | Routine for Printing "ITM" on Display on List Mode. |
| STRCLC: | Calculates Position in RASSTR Table. |
| SYSERR: | Pointer to Text "SYS ERR". |
| TENPE: | General Purpose Temporary Location. |
| TRKDEC: | Decrements Track Number in Input Buffer. |
| TRKFB: | Routine for Sending Track Digits to Display. |
| TRKINC: | Increments Track Number in Input Buffer. |
| UNAPL: | Routine for Removing Channel for APL Mode. |
| ZSEEK: | Flag for Zero Seek. |

TABLE II

| | |
|---|---|
| AAP: | Access Assignment Panel. |
| AMDSEQ: | Load Pointer in Register 3 for Locations of Returned Data in Display and for Input Data from RAS in Input Buffer. |
| ASPNL: | Assignment Panel. |
| AUXCLC: | AXP Formatted Data Storage Calculation. |
| AUXFLG: | AXP Selected Flag. |
| AUXSTR: | AXP Formatted Data Storage. |
| AVAIL: | Channel Available. |
| AXP: | Auxiliary Access Station. |
| BIZZY: | System Busy Status. |
| BMDSEQ: | Load Pointer in Register 3 for Locations of Returned Data in Display and for Input Data from RAS in Input Buffer. |
| BRINIT: | Initialize Display of Play Data Request. |
| BULK: | Seek and Record or Erase on Specified Cylinder # Greater than 65. |

TABLE II-continued

| | |
|---|---|
| BULKI: | Erase Process. |
| CALC: | Calculate. |
| CHAR: | Character. |
| CHINVI: | Chroma Inverter Enabled Routine. |
| CLR: | Clear. |
| COMMA: | Remote Teletype Comma Key Depressed. |
| CYL: | Cylinder. |
| DEC: | Decrement. |
| DELT: | Deleted. |
| DFINIT: | Initialize Display of Pack Define Data Request. |
| DIGSWO: | Drive to Channel Select. |
| DMDSEQ: | Load Pointer in Register 3 for Locations of Returned Data in Display and for Input Data from RAS in Input Buffer. |
| DPINIT: | Initialize Display of Duplicate Data Request. |
| DPLY: | Display. |
| DRAVAL: | Drive Available Routine. |
| DRIVID: | Drive Identification. |
| DRPSEL: | Deselect Drive Currently Selected. |
| DUPE: | Duplicate. |
| DVCLR: | Drive Busy. |
| DVSLCT: | Drive Select Routine. |
| DVZREF: | Send Playback Reference to Drive. |
| DVEVID: | Send Video Input Reference to Drive. |
| ECHO: | Send Requested Data. |
| EDTEOL: | Edit End of List. |
| EE: | Electronic-to-Electronic. |
| EEINIT: | Initialize Display of EE Data Request. |
| EMDSEQ: | Load Pointer in Register 3 for Locations of Returned Data in Display and for Input Data from RAS in Input Buffer. |
| ENDSEQ: | End Play Sequence Flag. |
| EOL: | End of List. |
| EOLFLG: | EOL Flag. |
| ERASE: | Delete Recording on Cylinder. |
| ERS: | Erase. |
| FMT: | Format. |
| FRSTRK: | Seek and Record on First Available Cylinder. |
| IDCYL: | Current Cylinder Identifies. |
| IDDRV: | Current Drive Indentification Memory Location. |
| IDENT: | Pack and Cylinder Indentification. |
| IDPACK: | Current Pack Indentification Memory Location. |
| INDSEQ: | Load Pointer in Register 3 for Locations of Returned Data in Display and for Input Data from RAS in Input Buffer. |
| INC: | Increment. |
| INIT: | Initiate. |
| INTOFF: | Disable Interrupts. |
| INTON: | Enable Interrupts. |
| INTR 1: | Interrupt Return One. |
| INTRET: | Interrupt Return |
| INTRFC: | Interface. |
| ITM: | Item. |
| ITMRT: | Cylinder Number Display. |
| KBDRST: | Keyboard Return Routine. |
| KD: | Key Depressed. |
| KYBD: | Key Board. |
| LSTCLR: | Clear Display Positions 30 Through 32. |
| LSTFLG: | End of Play Sequence Flag for List/List Mode. |
| MODIT: | Mode Identification Routine. |
| NEG: | Negative. |
| NTRFRST: | Enter First Initiation. |
| OCCDIR: | Occupied Directory. |
| OFLTST: | Test Requested Pack On-Line Routine. |
| ONLINE: | Requested Pack On-Line. |
| PAINIT: | Initialize Display of Sequence Assembly Data Request. |
| PB: | Playback. |
| PLASUB: | Playback Command(s) Subroutine. |
| PLSMIN: | Plus or Minus. |
| PLUS: | Most Significant Bit Not 1. |
| PMDSEQ: | Load Pointer in Register 3 for Locations of Returned Data in Display and for Input Data from RAS in Input Buffer. |
| PNT: Pointer. | |
| PNTRST: | Reset Pointer Routine. |
| PRTFND: | Locate Position of Cylinder ID in OCCDIR. |
| PRTSET: | Set "Occupied" Bit in OCCDIR. |
| PSI: | Play Sequence Item. |
| PSINIT: | Initialize Display of Sequence Play Data Request. |
| PSL: | Play Sequence List. |
| PSM: | Play Sequence Memory. |
| PSP: | Sequence Play. |
| PSPLOC: | Storage Location for PSPSTR/PSPSTA Pointer. |
| PSPMOR: | Play Sequence Memory Again. |
| PSPSTA: | AXP Sequence Play Cylinder Location. |
| PSPSTR: | RAS Sequence Play Cylinder Location. |
| QSRU: | Process Service Request List. |
| QUE: | Service Request List. |
| R ______: | Register Followed by its Number. |
| R3 × $167_8$: | Initiate Key Depressed Without Previously Selecting a Mode. |
| RAS: | Remote Access Station or Internal Access Station. |
| RASIN: | Remote Access Station Input Buffer. |
| RASRCV: | Remote Access Station Interface Data Register. |
| RASRST: | Remote Access Station Interface Interrupt Enable. |
| RECGO: | Set-up for Record Process. |
| RECRET: | Return from Record Process. |
| RECSUB: | Record Process. |
| REINIT: | Initialize Display of Record Data Request. |
| RETURN: | Display "RTN". |
| RNDSEQ: | Load Pointer in Register 3 for Locations of Returned Data in Display and for Input Data from RAS in Input Buffer. |
| RPT: | Repeat. |
| RST: | Reset. |
| RT: | Routine. |
| RTN: | Return. |
| RTS PC: | Return from Subroutine. |
| SEQ: | Sequence. |
| SEQDEL: | Erase Specified Working Cylinders. |
| SP: | Stack Pointer. |
| SPACE: | Remote Teletype Space Key Depressed. |
| STORIT: | Data to RASIN. |
| STRINIT: | Display "ITN" Routine. |
| SRV: | Service Routine. |
| SUB: | Subtract. |
| SW: | Switch. |
| SWR: | Status Word Register. |
| SYS ERR 1: | Pack Number in OCCDIR for Drive Wrong. |
| TGCLR: | Disable Drive from Accepting Commands. |
| TGSUB: | Enable Drive to Accept Commands. |
| TRKRPT: | Display Current Cylinder Number. |
| TSTJPN: | Direct Return to INTRET Routine if Errors Occur in Previous Routine. |
| TSTRTN: | Direct Return to Calling Routine from Subroutine if Errors Occur in See Operation. |
| UNMUTE: | Disable Mute. |

What is claimed is:

1. In a disc drive magnetic recording and reproducing apparatus having removable rotatable disc means and wherein said disc means have a multiplicity of separate tracks upon which recording and reproducing can be performed, apparatus for conditionally permitting selected recording operations to thereby minimize the probability of unwanted destruction of recorded information by an operator, said apparatus comprising:

means independent of said disc means for storing track address information, bulk and working track address identification information, and status information indicating whether information is recorded on each of said tracks;

means associated with said storing means for classifying one plurality of said multiplicity of tracks as bulk tracks and another plurality of said multiplicity of tracks as working tracks;

means associated with said storing means for identifying tracks which have information recorded thereon and which are therefore occupied;

means responsive to the working and bulk track identification information and to said recorded status information for prohibiting recording on an occupied bulk track unless an enabling signal is received, and for permitting recording on any one of said multiplicity of tracks that is unoccupied and on an occupied working track without receiving an enabling signal;

controlling means for selecting the tracks upon which said recording and reproducing is to be performed and for providing said enabling signal to said recording prohibiting means to thereby permit recording on an occupied bulk track.

2. Apparatus for recording and reproducing video information and for selectively prohibiting certain operations to thereby minimize the probability of unwanted destruction of portions of said recorded information by an operator, said apparatus comprising:

disc drive means for receiving and rotating a removable disc means and having transducing means for recording on and reproducing from said disc means, said disc means having a plurality of generally flat circular discs with magnetically recordable surfaces;

means for moving said transducing means on said disc surfaces to selected radial locations relative to the center thereof, each of said radial locations defining a separate track upon which recording and reproducing can be performed, each of said disc means having a multiplicity of said tracks;

means for classifying one group of said multiplicity of tracks as bulk tracks and another group of said multiplicity of tracks as working tracks;

means for identifying tracks that have information recorded thereon and are therefore occupied;

means for controlling the operation of said transducing means for recording on and reproducing from said tracks, said controlling means being responsive to said track classifying means and said recorded track identifying means to prohibit recording on an occupied bulk track in the absence of an enabling signal being received, said controlling means permitting recording on any unoccupied one of said bulk and said working tracks and on a single occupied working track without receiving said enabling signal;

means for providing said enabling signal for permitting recording on an occupied bulk track.

3. Apparatus as defined in claim 2 wherein said controlling means prohibits the sequential recording on a plurality of working tracks in the absence of said enabling signal.

4. Apparatus as defined in claim 2 wherein said controlling means includes at least one operator control panel having a plurality of control switching means for controlling the operation of said recording and reproducing apparatus.

5. Apparatus as defined in claim 4 wherein one of said switching means of said controlling means provides said enabling signal.

6. Apparatus as defined in claim 5 wherein said one switching means comprises a lock switch that is physically incapable of being operated unless a key member is inserted in the lock associated therewith.

7. Apparatus as defined in claim 2 wherein operating said transducing means for recording on one of said tracks without an information signal being applied thereto effectively erases any information present on said track.

8. Apparatus as defined in claim 2 wherein said disc means has several hundred of said bulk tracks and fewer than about one hundred of said working tracks.

9. In a disc drive magnetic recording and reproducing apparatus having removable rotatable disc means and wherein said disc means having a multiplicity of separate tracks upon which recording and reproducing can be performed, apparatus for conditionally permitting selected recording operations to thereby minimize the probability of unwanted destruction of recorded information by an operator, said apparatus comprising:

means for classifying one plurality of said multiplicity of tracks as bulk tracks and another plurality of said multiplicity of tracks as working tracks;

means for identifying tracks which have information recorded thereon and which are therefore occupied;

means responsive to said classifying means and said recorded track identifying means for prohibiting recording on an occupied bulk track unless an enabling signal is received and for permitting recording on any one of said multiplicity of tracks that is unoccupied without receiving an enabling signal;

controlling means for selecting the tracks upon which said recording and reproducing is to be performed and for providing said enabling signal to said recording prohibiting means to thereby permit recording on an occupied bulk track.

10. Apparatus as defined in claim 9 wherein recording on an occupied track effectively erases the information previously recorded thereon.

11. Apparatus as defined in claim 9 wherein said prohibiting means prohibits recording on a sequence of working tracks in the absence of said enabling signal being received.

12. Apparatus as defined in claim 9 wherein said controlling means includes at least one operator control panel having a plurality of control switching means for controlling the operation of said recording and reproducing apparatus and for selecting the tracks upon which said recording and reproducing is to be performed.

13. Apparatus as defined in claim 12 wherein one of said switching means of said controlling means provides said enabling signal.

14. Apparatus as defined in claim 13 wherein said one switching means comprises a lock switch that is physically incapable of being operated unless a key member is inserted in the lock associated therewith.

15. Apparatus for recording and reproducing video information on a disc means associated with a disc drive, said disc means being rotated at a predetermined speed and having a plurality of disc surfaces upon which information signals can be recorded on a multiplicity of separate tracks spaced from one another in a radial direction relative to the center of said rotating disc means, said apparatus having at least one transducing means movable in said radial direction for selectively recording on and reproducing from any of said multiplicity of tracks, said apparatus selectively prohibiting certain recording operations to thereby minimize the probability of unwanted destruction of recorded information on certain tracks by an operator, said apparatus comprising:

means for classifying a plurality of said multiplicity of tracks as bulk tracks upon which information signals are stored and which generally comprise a relatively permanent library of information and another plurality of said multiplicity of tracks as working tracks upon which information can be recorded on and reproduced from with relatively little restriction;

means for identifying bulk and working tracks which have information recorded thereon and which are therefore occupied, said identifying means providing an occupied signal for a track to a controlling means for identifying occupied tracks;

controlling means for selecting the tracks upon which said recording and reproducing is to be performed and responsive to said track classifying means and recorded track identifying means for prohibiting recording on occupied bulk tracks in the absence of an enabling signal being received, while allowing recording on any of said bulk and working tracks that does not have information recorded thereon and which is therefore unoccupied without receiving said enabling signal, said controlling means further including means for providing said enabling signal to thereby permit recording on an occupied bulk track.

16. Apparatus as defined in claim 15 wherein said controlling means includes at least one operator control panel having a plurality of switching means for identifying the tracks upon which recording and reproducing is to be performed and for initiating said recording and reproducing.

17. Apparatus as defined in claim 16 wherein one of said switching means provides said enabling signal when actuated.

18. Apparatus as defined in claim 17 wherein said one switching means comprises a lock switch that is physically incapable of being operated unless a key member is inserted in the lock associated with said lock switch.

* * * * *